US006023587A

United States Patent [19]

Watts, Jr. et al.

[11] Patent Number: 6,023,587

[45] Date of Patent: Feb. 8, 2000

[54] SYSTEM FOR RESOURCES UNDER CONTROL OF DOCKING STATION WHEN STANDALONE AND RESOURCES UNDER CONTROL OF CENTRAL PROCESSING UNIT OF PORTABLE COMPUTER WHEN DOCKED

[75] Inventors: LaVaughn F. Watts, Jr., Temple; John C. Linn, Richarson, both of Tex.

[73] Assignee: Texas Instruments Incorporated, Dallas, Tex.

[21] Appl. No.: 08/651,165

[22] Filed: May 2, 1996

[51] Int. Cl.[7] .......... G06F 9/00

[52] U.S. Cl. .......... 395/892; 395/858; 395/828

[58] Field of Search .......... 364/708.1, 280.2; 395/281, 306, 500, 892, 858, 828; 3/892

[56] References Cited

U.S. PATENT DOCUMENTS

| | | | |
|---|---|---|---|
| 5,265,238 | 11/1993 | Canova, Jr. et al. | 395/500 |
| 5,297,272 | 3/1994 | Lu et al. | 395/500 |
| 5,444,869 | 8/1995 | Strickin et al. | 455/89 |
| 5,463,742 | 10/1995 | Kobayashi | 395/281 |
| 5,515,514 | 5/1996 | Dhuey et al. | 395/282 |
| 5,579,528 | 11/1996 | Register | 395/671 |
| 5,598,539 | 1/1997 | Gephardt et al. | 395/281 |
| 5,625,829 | 4/1997 | Gephardt et al. | 395/800 |
| 5,668,977 | 9/1997 | Swanstrom et al. | 395/500 |
| 5,671,366 | 9/1997 | Niwa et al. | 395/281 |

OTHER PUBLICATIONS

Apple Computer, Macintosh Family Hardware Reference, 1988, pp. 16–116–117.

*Primary Examiner*—Thomas C. Lee
*Assistant Examiner*—Anderson I. Chen
*Attorney, Agent, or Firm*—Ronald O. Neerings; Robby T. Holland; Richard L. Donaldson

[57] ABSTRACT

The described embodiments of the present invention provide a computer docking station (12, 32, 58, 68, 76, 84, 90, 92, 94, 96) that can have its functionality reconfigured by a docked portable personal computer (10, 38, 62, 66, 74, 82). In at least one embodiment of the invention, the computer docking station is configured as a stand alone computer prior to docking with a portable computer, may have its functionality reconfigured when docked to the portable computer, and reconfigures itself to be a stand alone computer when undocked from the portable computer. In one embodiment of the invention, docking station resources are placed under the control of a docked portable computer. In another embodiment of the invention, docked portable computer resources are placed under the control of the docking station. The invention contemplates docking via direct connection, radio requency "RF" communications, infrared "IR" communications, 1394 high performance serial bus communications, or card bus communications, and/or combinations of one or more of these communications techniques.

28 Claims, 328 Drawing Sheets

28

28

28

28

28

28

28

SYSTEM FOR RESOURCES UNDER CONTROL OF DOCKING STATION WHEN STANDALONE AND RESOURCES UNDER CONTROL OF CENTRAL PROCESSING UNIT OF PORTABLE COMPUTER WHEN DOCKED

TECHNICAL FIELD OF THE INVENTION

This invention relates to the field of computer docking stations and more particularly to a computer docking station that can have its functionality reconfigured when docked with a portable computer. In at least one embodiment of the invention, the computer docking station is configured as a stand alone computer prior to docking with a portable computer, may have its functionality reconfigured when docked to the portable computer, and reconfigures itself to be a stand alone computer when undocked from the portable computer.

BACKGROUND OF THE INVENTION

The growth in the use of Personal Computers marks the present age. Personal computers typically fall into one of two categories, Desktop (by far the most widely used) and Portable (also referred to as portable notebook or laptop). Individuals requiring mobility and maximum functionality commonly use both types of computers. The use of the two computers, one for desktop use and one for portable use, has created a problem that when a user returns to the office the information stored in the desktop and portable computers may now have inconsistent information. As an example, the portable computer may contain additional files created by the user while away from the office while the desktop computer, on the other hand, may contain new E-mail or other information forwarded to the desktop computer while the user is away from the office. Many a user of such two computers is frustrated by the continuous effort required to keep both systems updated with each other.

Another problem associated with the effort to maintain two computer systems is that complex systems of lap-link type cables and software haven't developed to speed up the exchange of information from the portable computer to the desktop or base computer. One attempt at solving the problems associated with using both desktop and portable computers is to simply have only a portable computer and use it as a base station or desktop in combination with a means referred to as a "docking station" in which the portable computer is mounted to the docking station which itself connects up to a real size keyboard and monitor and to a modem and LAN or local area network. Typical docking stations typically include optional devices such as CD ROM, stereo audio system, additional I/O connectors and perhaps additional RAM memory. Yet, while the development of the docking station has been impressive over the last few years and has resulted in improved functionality when combined with a portable computer, the docking station concept has yet to reach its full potential.

SUMMARY OF THE INVENTION

The described embodiments of the present invention provide a computer docking station that can have its functionality reconfigured by a docked portable personal computer. In at least one embodiment of the invention, the computer docking station is configured as a stand alone computer prior to docking with a portable computer, may have its functionality reconfigured when docked to the portable computer, and reconfigures itself to be a stand alone computer when undocked from the portable computer. In one embodiment of the invention, docking station resources are placed under the control of a docked portable computer. In another embodiment of the invention, docked portable computer resources are placed under the control of the docking station. The invention contemplates docking via direct connection, radio requency "RF" communications, infrared "IR" communications, 1394 high performance serial bus communications, or card bus communications, and/or combinations of one or more of these communications techniques.

DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 266 illustrates a block diagram of a card 30 having a monitor controller coupling a monitor connector to a card slot connector.

FIG. 267 illustrates a block diagram of a card 30 having a VGA controller coupling an analog VGA monitor connector to a card slot connector.

FIG. 268 illustrates a block diagram of a card 30 having a keyboard scanner coupling a keyboard connector to a PCI/XD bridge which is coupled to a card slot connector.

FIG. 269 illustrates a block diagram of a card 30 having a keyboard scanner coupling a key/mouse connector to a PCI/XD bridge which is coupled to a card slot connector.

FIG. 270 illustrates a block diagram of a card 30 having a keyboard scanner coupling a keyboard connector and a key/mouse connector to a PCI/XD bridge which is coupled to a card slot connector.

FIG. 271 illustrates a block diagram of a card 30 having a parallel port coupling a printer connector to a PCI/ISA bridge which is coupled to a card slot connector.

FIG. 272 illustrates a block diagram of a card 30 having a PCI Super I/O coupling a printer port to a card slot connector.

FIG. 273 illustrates a block diagram of a card 30 having a floppy controller coupling a floppy disk drive to a PCI/ISA bridge which is coupled to a card slot connector.

FIG. 274 illustrates a block diagram of a card 30 having a PCI Super I/O coupling a floppy disk drive to a card slot connector.

FIG. 275 illustrates a block diagram of a card 30 having a hard disk IDE interface coupling a hard disk drive to a PCI/ISA bridge which is coupled to a card slot connector.

FIG. 276 illustrates a block diagram of a card 30 having a PCI Super I/O coupling a hard disk drive to a card slot connector.

FIG. 277 illustrates a block diagram of a card 30 having a hard disk ide interface coupling a compact disk drive and a hard disk drive to a PCI/ISA bridge which is coupled to a card slot connector.

FIG. 278 illustrates a block diagram of a card 30 having a PCI Super I/O coupling a compact disk drive and a hard disk drive to a card slot connector.

FIG. 279 illustrates a block diagram of a card 30 having an SCSI device coupling a compact disk drive to a PCI/ISA bridge which is coupled to a card slot connector.

FIG. 280 illustrates a block diagram of a card 30 having a PCI Super I/O coupling a compact disk drive to a card slot connector.

FIG. 281 illustrates a block diagram of a card 30 having a hard disk ide interface coupling a DVD drive (digital video disk/device) and a hard disk drive to a PCI/ISA bridge which is coupled to a card slot connector.

FIG. 282 illustrates a block diagram of a card 30 having a PCI Super I/O coupling a DVD drive and a hard disk drive to a card slot connector.

FIG. 283 illustrates a block diagram of a card 30 having an SCSI device coupling a DVD drive to a PCI/ISA bridge which is coupled to a card slot connector.

FIG. 284 illustrates a block diagram of a card 30 having a PCI Super I/O coupling a DVD drive to a card lot connector.

FIG. 285 illustrates a block diagram of a card 30 having a PCI/ISA bridge coupling an IR interface to a card slot connector.

FIG. 286 illustrates a block diagram of a card 30 having a PCI Super I/O coupling an IR interface to a card slot connector.

FIG. 287 illustrates a block diagram of a card 30 having a PCMCIA controller coupling PCMCIA card slots to a PCI bus interface which is coupled to a card slot connector.

FIG. 288 illustrates a block diagram of a card 30 having a memory controller coupling a memory array to a PCI bus interface which is coupled to a card slot connector.

FIG. 289 illustrates a block diagram of a card 30 having an IDO controller coupling an MO drive to a PCI bus controller which is coupled to a card slot connector.

FIG. 290 illustrates a block diagram of a card 30 having an SCSI device coupling an MO drive to a PCI/SCSI interface which is coupled to a card slot connector.

FIG. 291 illustrates a block diagram of a card 30 having a PCI interface coupling a video controller to a card slot connector and an R.F. front end coupling a satellite TV antenna connector to a decoder.

FIG. 292 illustrates a block diagram of a card 30 having a video controller coupling a DMD (digital micromirror device) projection system connector to a PCI bus controller which is coupled to a card slot connector.

FIG. 293 illustrates a block diagram of a card 30 having a 1394 controller coupling a 1394 compatible connector to a PCI bus interface which is coupled to a card slot connector.

FIG. 294 illustrates a block diagram of a card 30 having a PCI bus interface coupling a video controller to a card slot connector and a decoder coupling a camera connector to the video controller.

FIG. 295 illustrates a block diagram of a card 30 having a PCI bus interface coupling a video controller to a card slot connector and a decoder coupling a VCR connector to the video controller.

FIG. 296 illustrates a block diagram of a card 30 having a 1394 controller coupling a VCR connector to a PCI bus interface which is coupled to a card slot connector.

FIG. 297 illustrates a block diagram of a card 30 having an SCSI device coupling a scanner connector to a PCI/SCSI controller which is coupled to a card slot connector.

FIG. 298 illustrates a block diagram of a card 30 having a scanner controller coupling a scanner connector to a PCI bus controller which is coupled to a card slot connector.

FIG. 299 illustrates a block diagram of a card 30 having a PCI bus interface coupling a card reader connector to a card slot connector.

FIG. 300 illustrates a block diagram of a card 30 having a communications port coupling a cellular telephone connector to a PCI/ISA controller which is coupled to a card slot connector.

FIG. 301 illustrates a block diagram of a card 30 having a communications port coupling a fax machine connector to a PCI/ISA controller which is coupled to a card slot connector.

FIG. 302 illustrates a block diagram of a card 30 having an ISDN modem coupling an ISDN connector to a PCI bus interface which is coupled to a card slot connector.

FIG. 303 illustrates a block diagram of a card 30 having a communications port coupling an ISDN connector to a PCI/ISA controller which is coupled to a card slot connector.

FIG. 304 illustrates a block diagram of a card 30 having a serial port coupling a GSM to a PCI/ISM controller which is coupled to a card slot connector.

FIG. 305 illustrates a block diagram of a card 30 having a home security system (HSS) to interface controller coupling a homne security system (HSS) to a PCI bus interface which is coupled to a card slot connector.

FIG. 306 illustrates a block diagram of a card 30 having an SCSI device coupling a tape drive connector to a PCI bus interface which is coupled to a card slot connector.

FIG. 307 illustrates a block diagram of a card 30 having a tape drive controller with PCI bus interface coupling a tape drive connector to a card slot connector.

FIG. 308 illustrates a block diagram of a card 30 having a PCI interface coupling a peripheral device control system to a card slot connector.

FIG. 309 illustrates a block diagram of a card 30 having a PCI bus interface coupling a set top box interface to a card slot connector.

FIG. 310 illustrates a block diagram of a card 30 having a PCI bus interface coupling an R.F. transmitter to a card slot connector.

FIG. 311 illustrates a block diagram of a card 30 having a PCI bus interface coupling an IRDA receiver to a card slot connector.

FIG. 312 illustrates a block diagram of a card 30 having a PCI bus interface coupling an R.F. transmitter and an IRDA receiver to a card slot connector.

FIG. 313 illustrates a block diagram of a card 30 having a USB (universal serial bus) controller coupling a USB to a card slot connector.

FIG. 314 illustrates a block diagram of a card 30 having a PCI/ISA bridge coupling a digital audio system to a card slot connector.

FIG. 315 illustrates a block diagram of a card 30 having a PCI Super I/O coupling a digital audio system to a card slot connector.

FIG. 316 illustrates a block diagram of a card 30 having a LAN (local area network) controller coupling a LAN to a PCI bus interface which is coupled to a card slot connector.

FIG. 373 illustrates an alternative embodiment of a docking station 90 in which a MUX is located on the system card 28, not located separately in the docking station.

Figure 372:
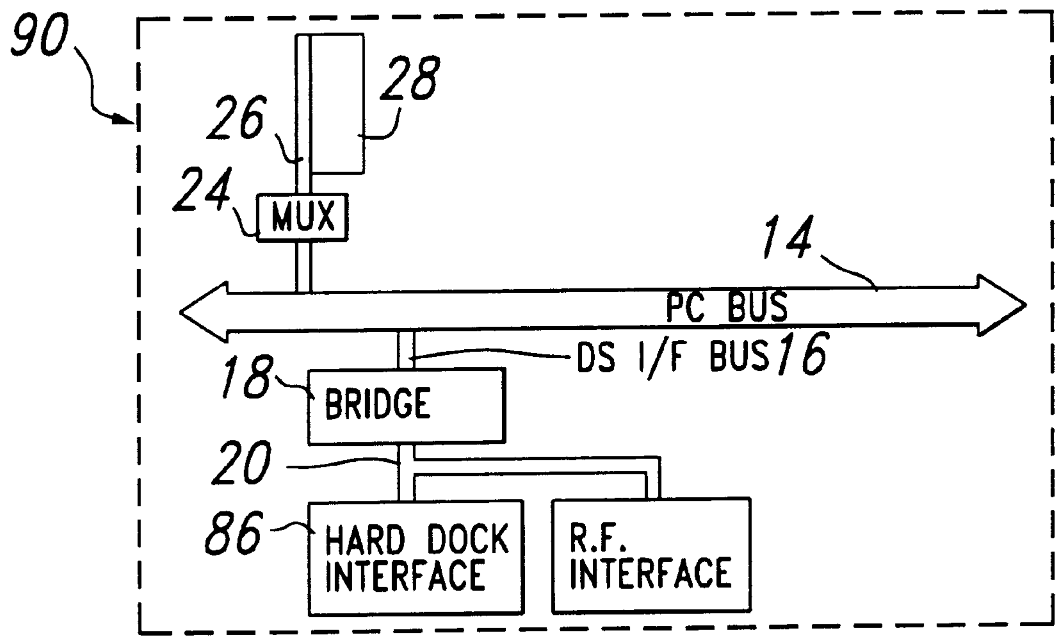
FIG. 372 illustrates a block diagram of a multi-configurable docking station 90 to which a notebook computer may dock via a hard dock interface or a radio frequency "RF", according to another embodiment of the invention.
Figure 374:
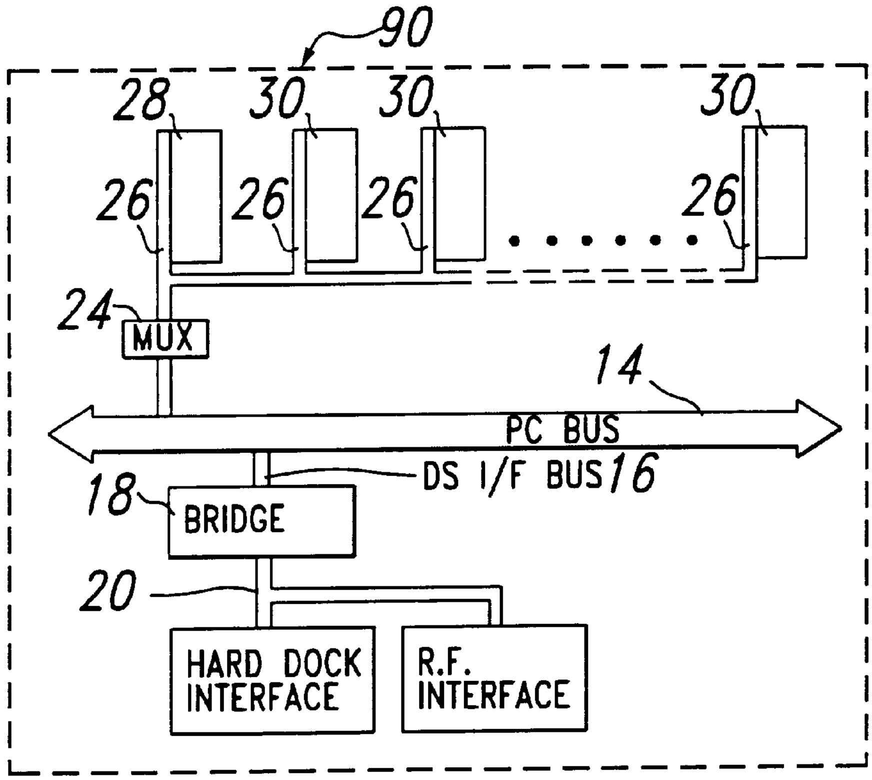

FIG. 374 illustrates an embodiment of the invention in which at least one additional card slot (three actually shown) is added to the docking station of FIG. 372. Each additional card slot 26 is coupled to mux 24. Each additional card slot is coupleable to a card 30. Each card 30 contains at least one resource that is an addition to the resources available on system card 28.

Figure 373:
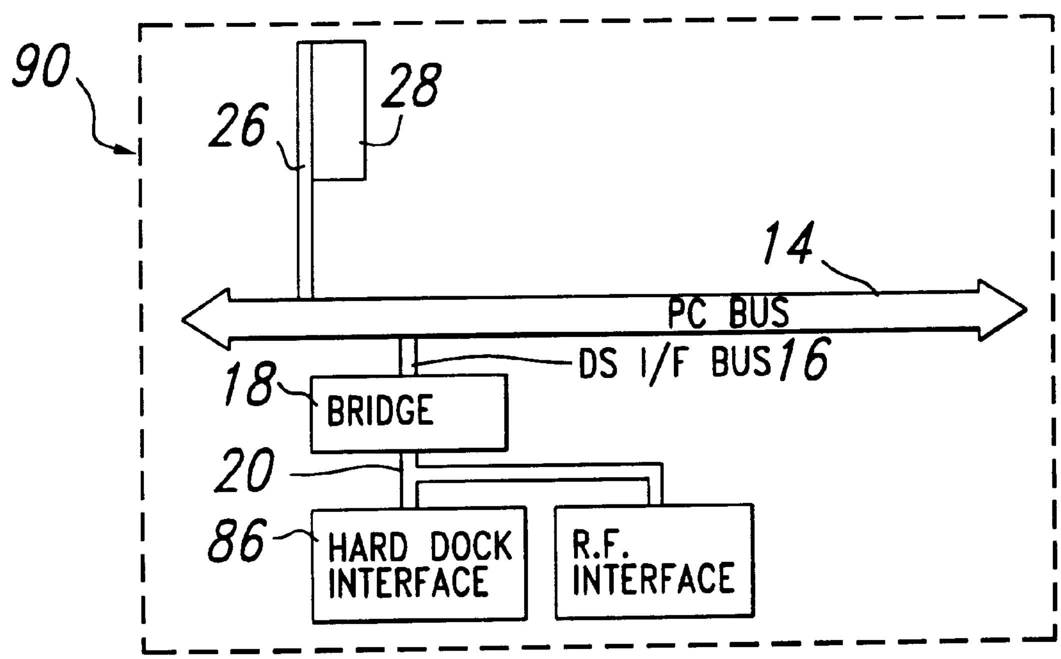
Figure 375:
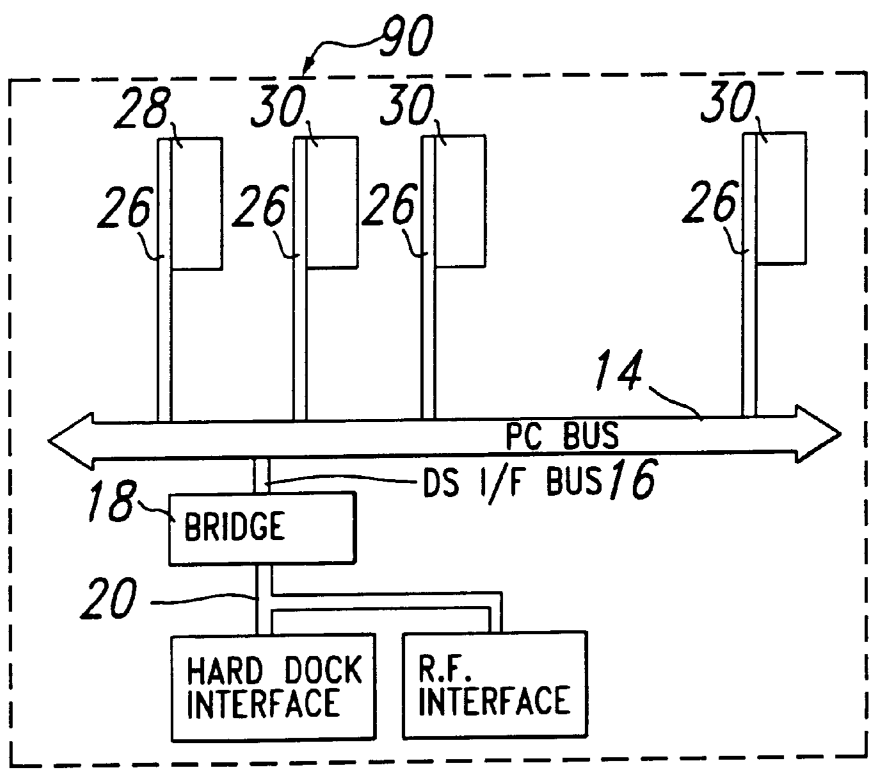

FIG. 375 illustrates an embodiment of the invention in which at least one additional card slot (three actually shown) is added to the docking station of FIG. 373. Each additional card slot is coupleable to a card 30. Each card 30 contains at least one resource that is an addition to the resources available on system card 28.

Figure 376:
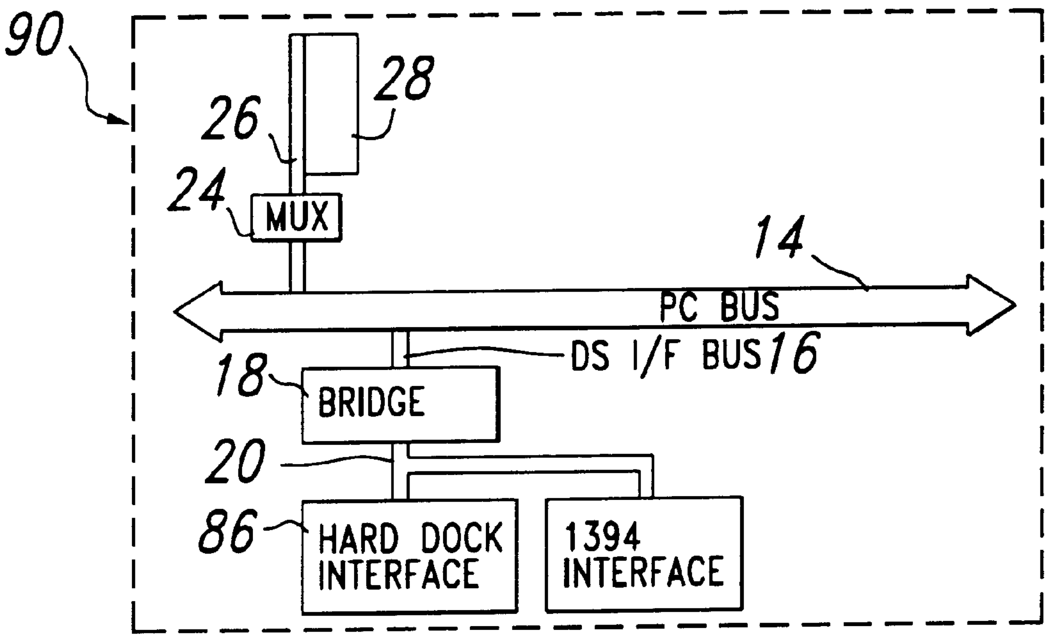

FIG. 376 illustrates a block diagram of a multi-configurable docking station 90 to which a notebook computer may dock via a hard dock interface or 1394 interface, according to yet another embodiment of the invention.

Figure 377:
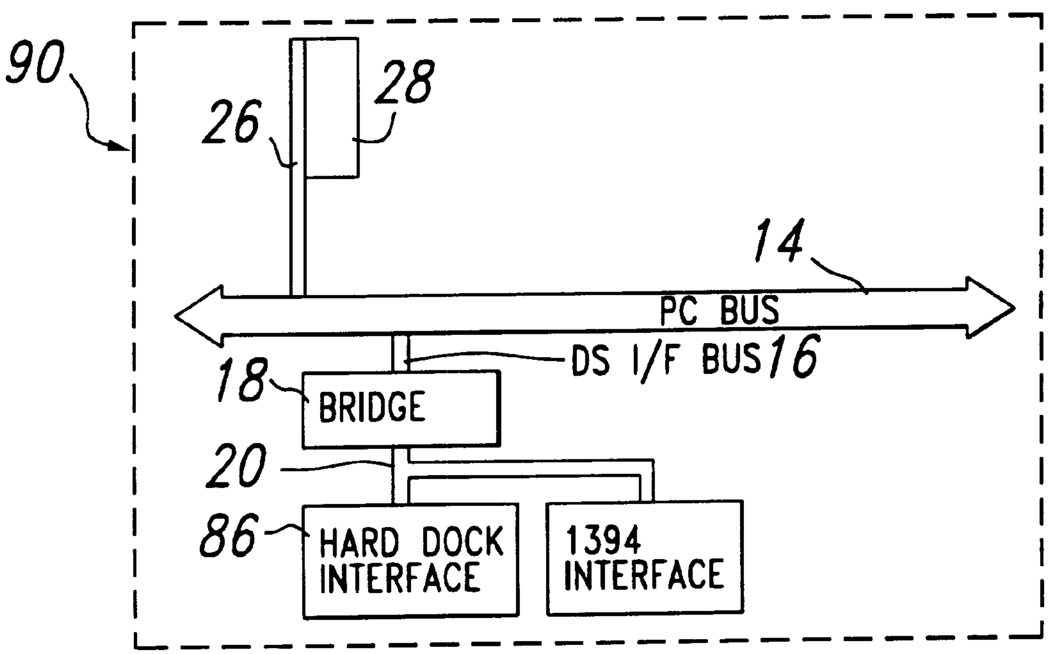

FIG. 377 illustrates an alternative embodiment of a docking station 90 in which a MUX is located on the system card 28, not located separately in the docking station.

Figure 378:
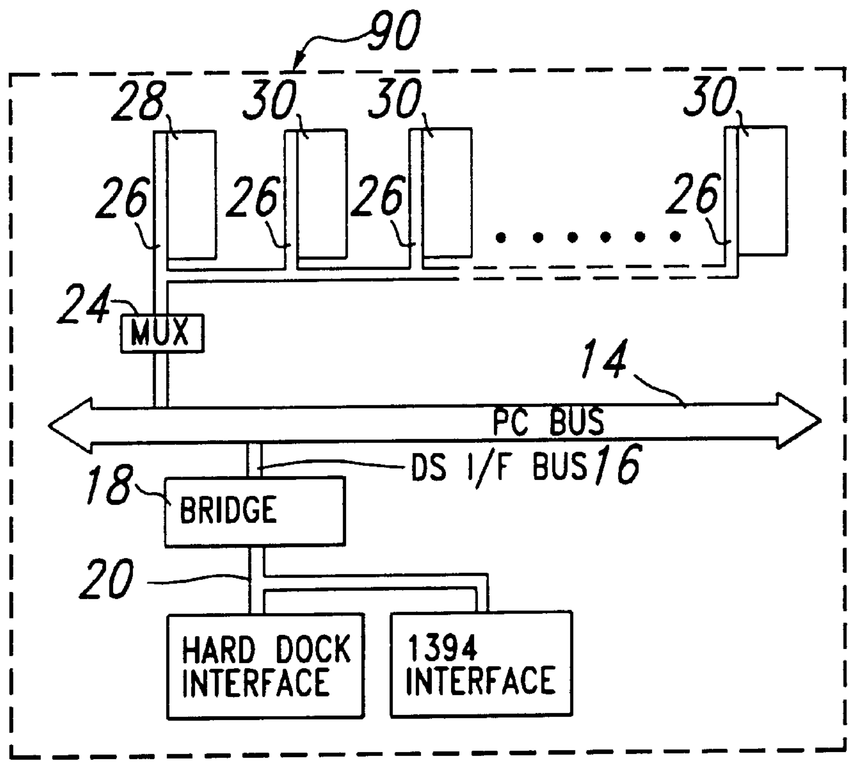

FIG. 378 illustrates an embodiment of the invention in which at least one additional card slot (three actually shown) is added to the docking station of FIG. 376. Each additional card slot 26 is coupled to mux 24. Each additional card slot is coupleable to a card 30. Each card 30 contains at least one resource that is an addition to the resources available on system card 28.

Figure 379:
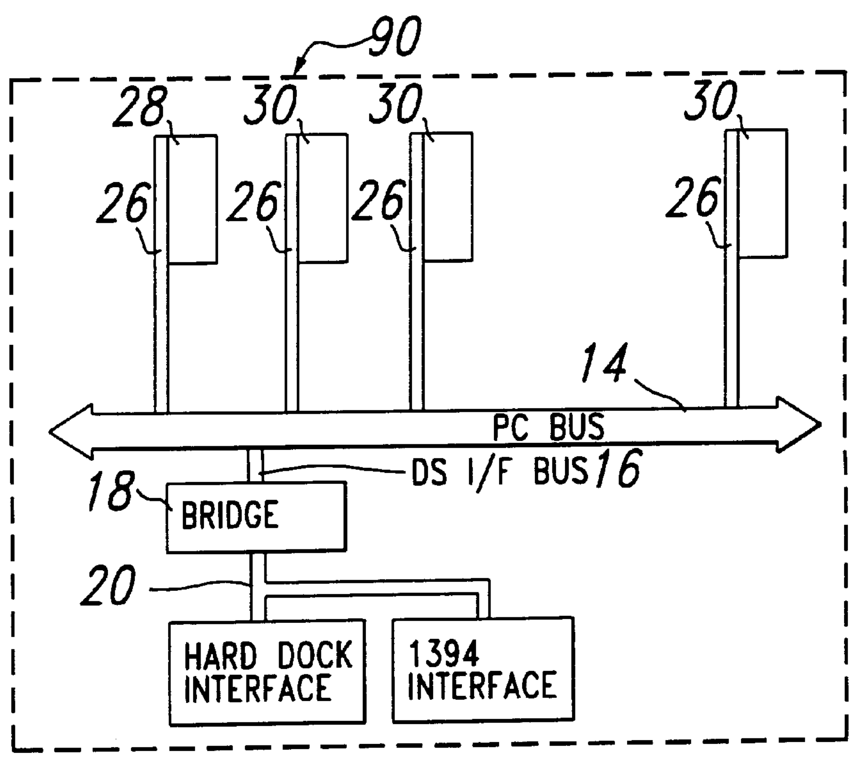

FIG. 379 illustrates an embodiment of the invention in which at least one additional card slot (three actually shown) is added to the docking station of FIG. 377. Each additional card slot is coupleable to a card 30. Each card 30 contains at least one resource that is an addition to the resources available on system card 28.

Figure 380:
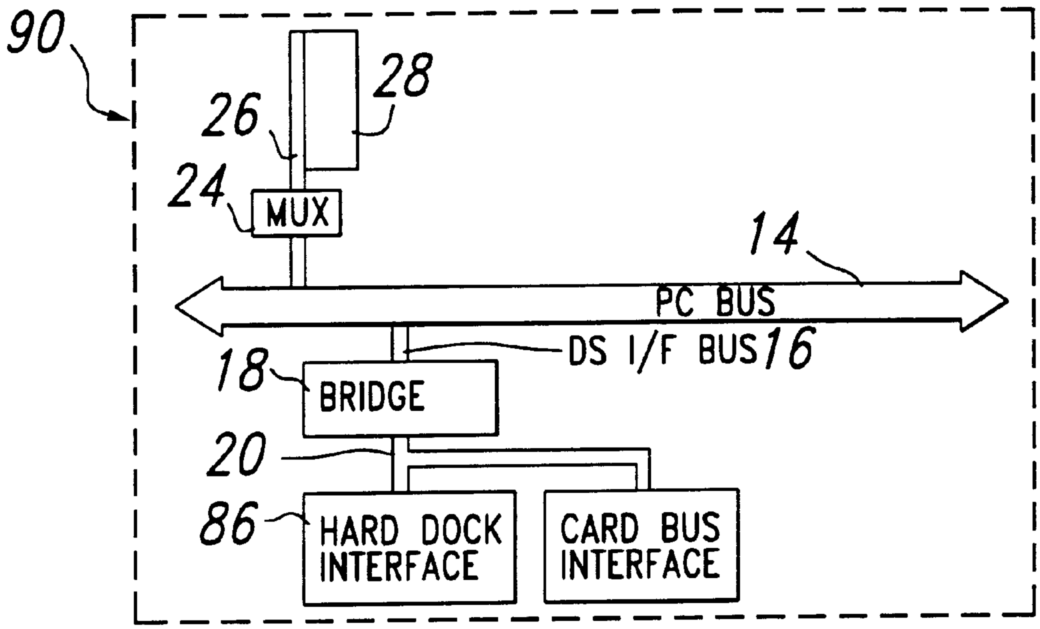

FIG. 380 illustrates a block diagram of a multi-configurable docking station 90 to which a notebook computer may dock via a hard dock interface or a card bus interface, according to yet another embodiment of the invention.

Figure 381:
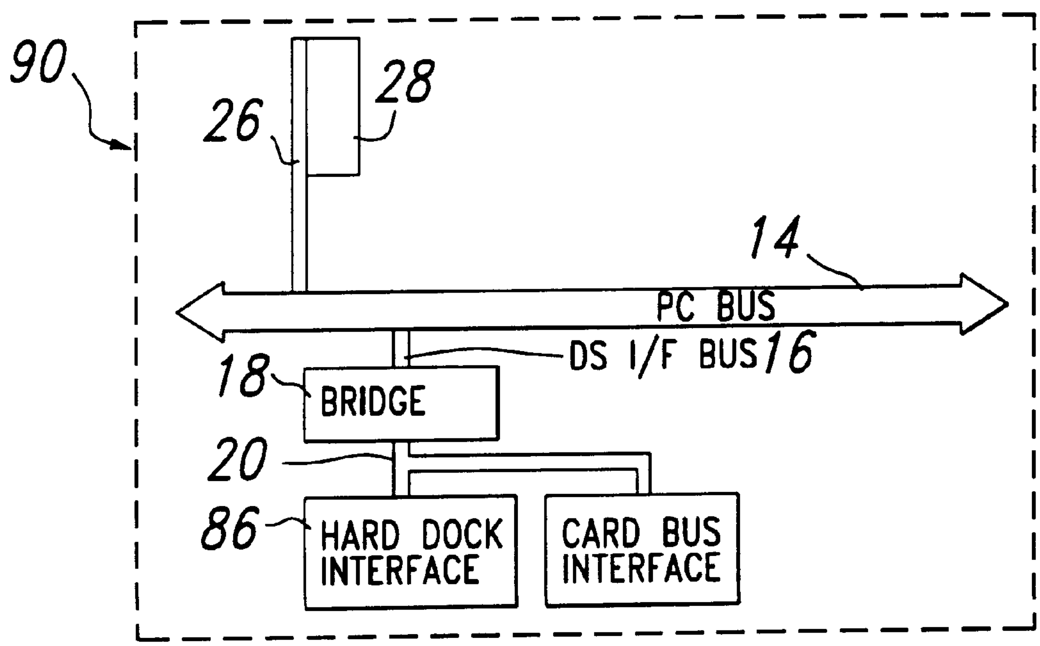

FIG. 381 illustrates an alternative embodiment of a docking station 90 in which a MUX is located on the system card 28, not located separately in the docking station.

Figure 382:
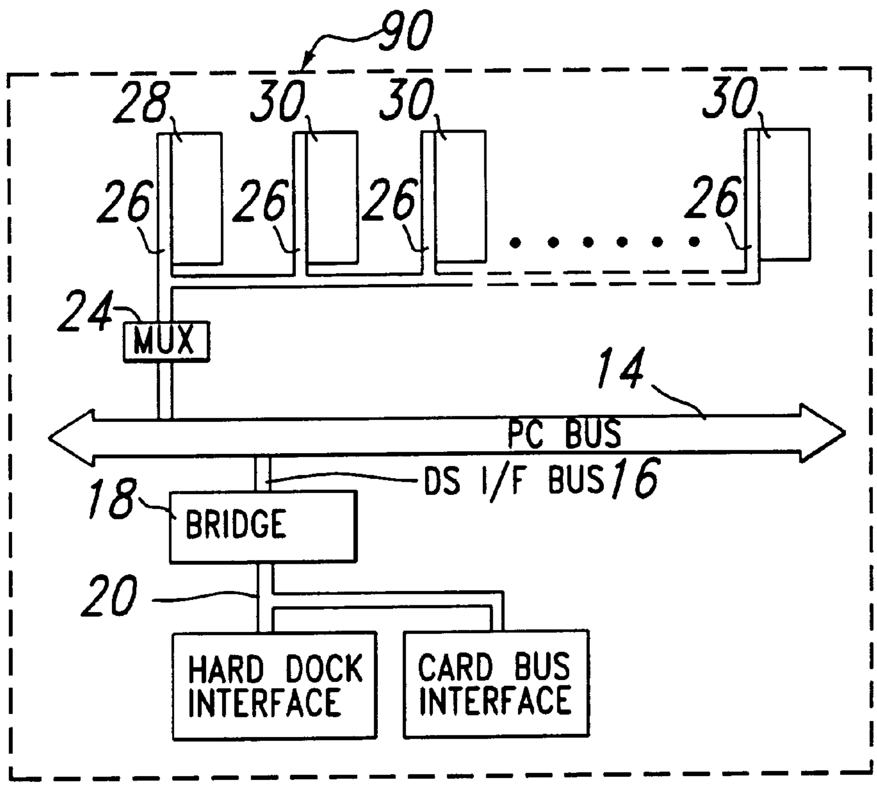

FIG. 382 illustrates an embodiment of the invention in which at least one additional card slot (three actually shown) is added to the docking station of FIG. 380. Each additional card slot 26 is coupled to mux 24. Each additional card slot is coupleable to a card 30. Each card 30 contains at least one resource that is an addition to the resources available on system card 28.

Figure 383:
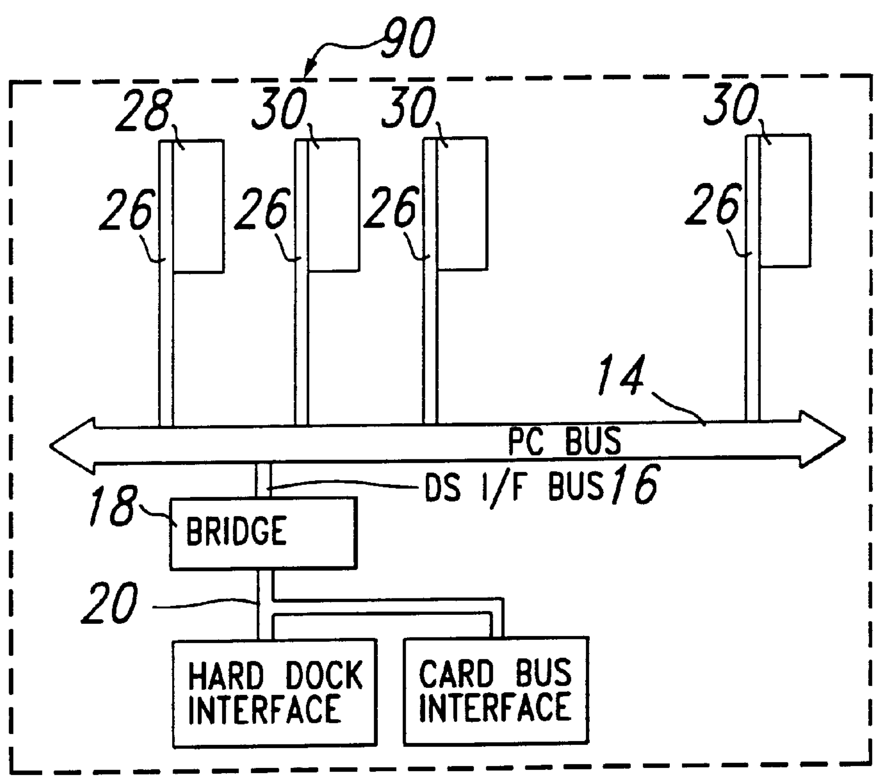

FIG. 383 illustrates an embodiment of the invention in which at least one additional card slot (three actually shown) is added to the docking station of FIG. 381. Each additional card slot is coupleable to a card 30. Each card 30 contains at least one resource that is an addition to the resources available on system card 28.

Figure 384:
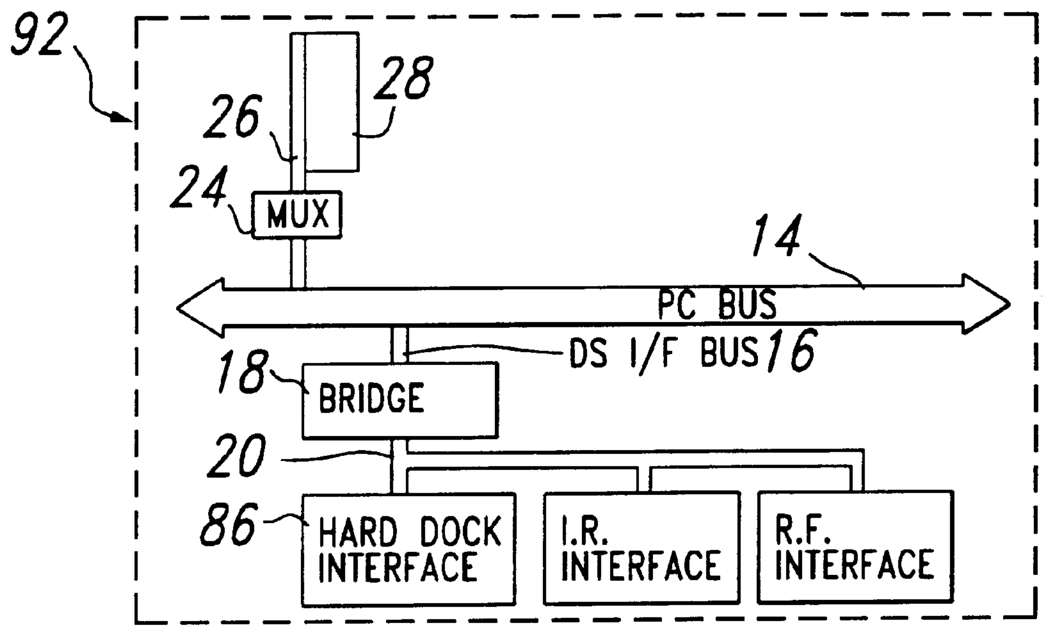

FIG. 384 illustrates a block diagram of a multi-configurable docking station 92 to which a notebook computer may dock via a hard dock interface, an infrared "IR" or a radio frequency "RF" interface, according to yet another embodiment of the invention.

Figure 385:
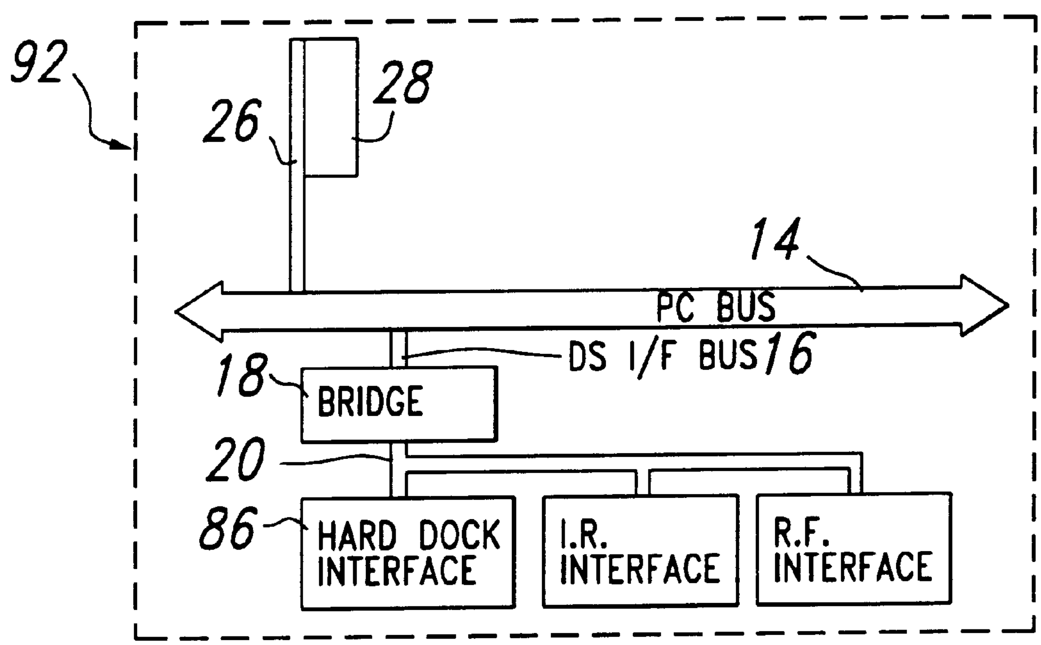

FIG. 385 illustrates an alternative embodiment of a docking station 92 in which a MUX is located on the system card 28, not located separately in the docking station.

Figure 386:
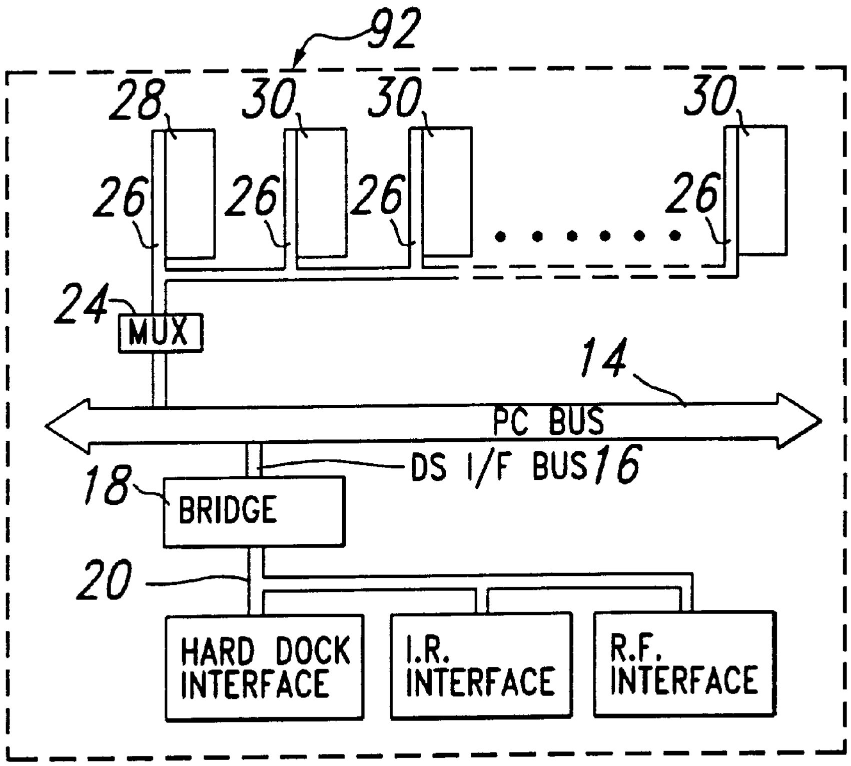

FIG. 386 illustrates an embodiment of the invention in which at least one additional card slot (three actually shown) is added to the docking station of FIG. 384. Each additional card slot 26 is coupled to mux 24. Each additional card slot is coupleable to a card 30. Each card 30 contains at least one resource that is an addition to the resources available on system card 28.

Figure 387:
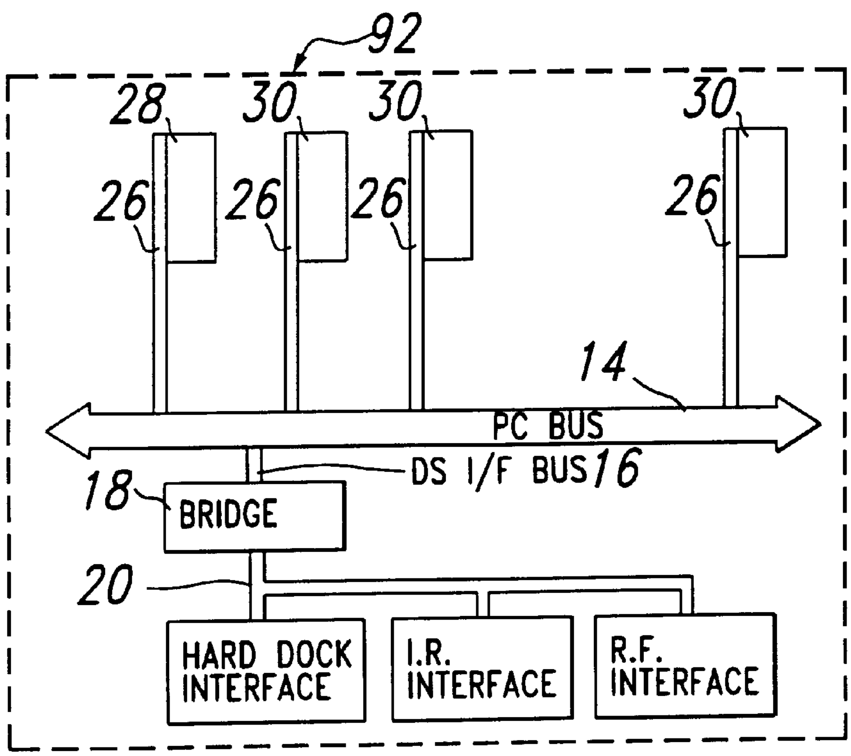

FIG. 387 illustrates an embodiment of the invention in which at least one additional card slot (three actually shown) is added to the docking station of FIG. 385. Each additional card slot is coupleable to a card 30. Each card 30 contains at least one resource that is an addition to the resources available on system card 28.

Figure 388:
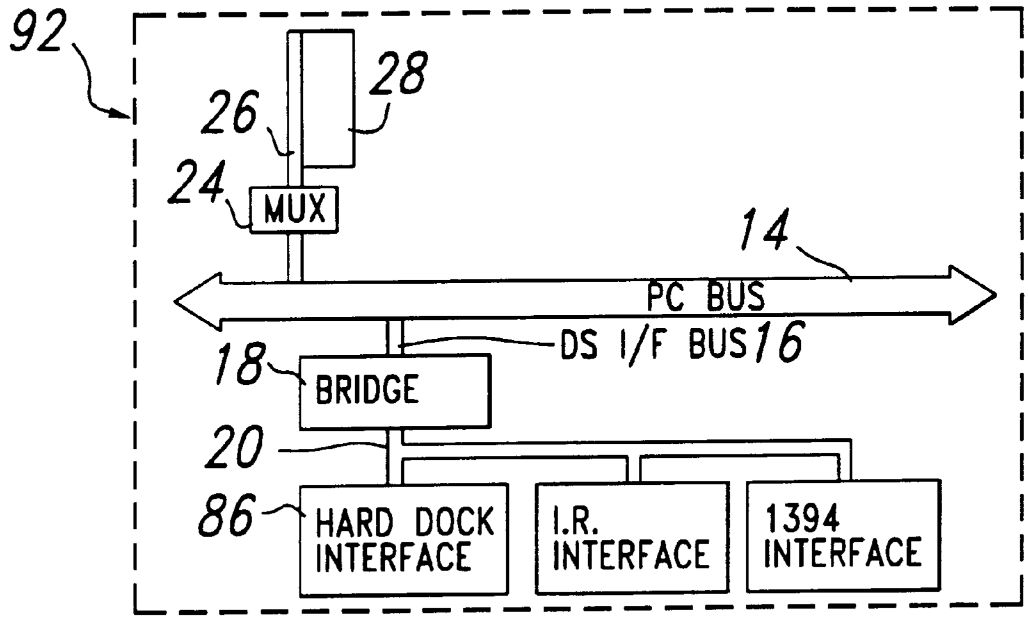

FIG. 388 illustrates a block diagram of a multi-configurable docking station 92 to which a notebook computer may dock via a hard dock interface, an infrared "IR" interface or a 1394 interface, according to another embodiment of the invention.

Figure 389:
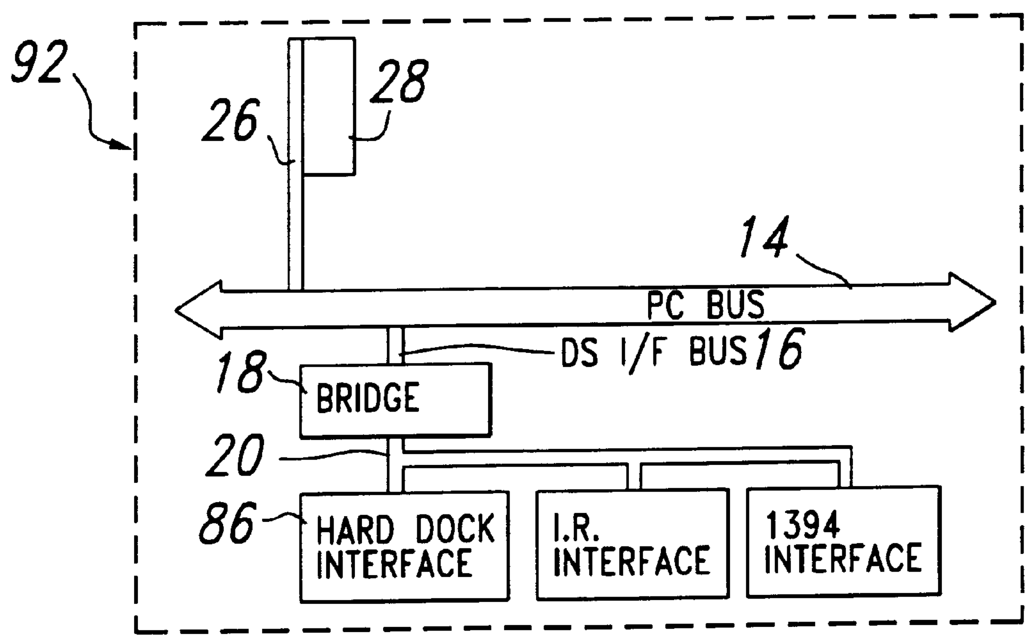

FIG. 389 illustrates an alternative embodiment of a docking station 92 in which a MUX is located on the system card 28, not located separately in the docking station.

Figure 390:
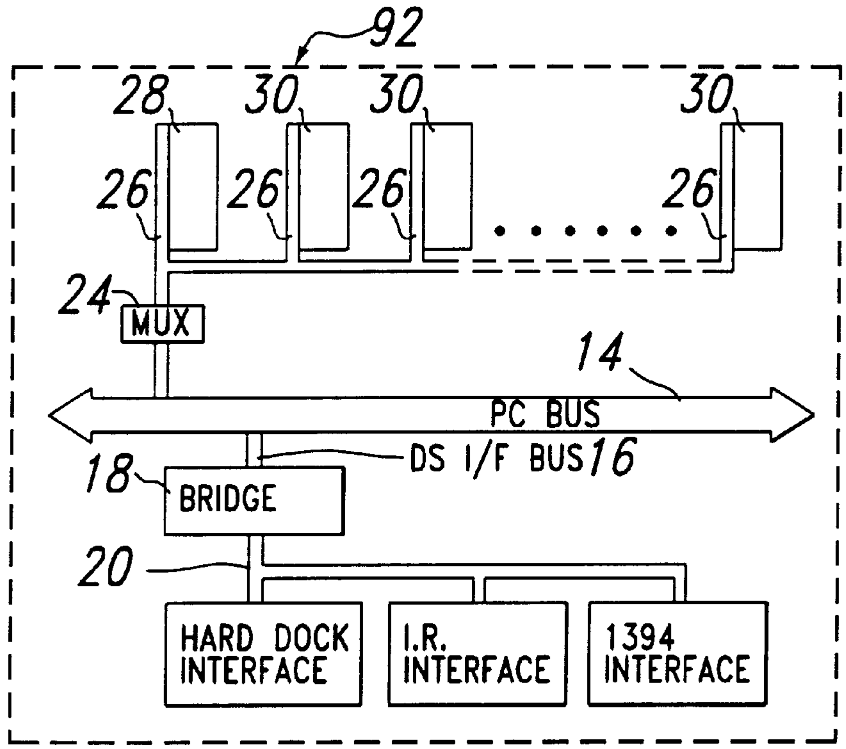

FIG. 390 illustrates an embodiment of the invention in which at least one additional card slot (three actually shown) is added to the docking station of FIG. 388. Each additional card slot 26 is coupled to mux 24. Each additional card slot is coupleable to a card 30. Each card 30 contains at least one resource that is an addition to the resources available on system card 28.

Figure 391:
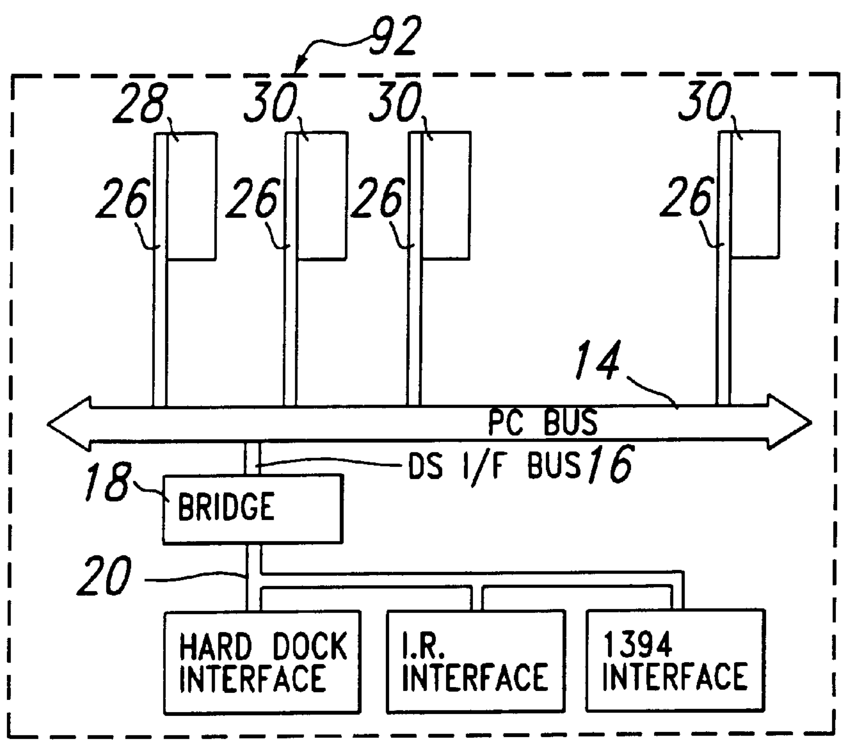

FIG. 391 illustrates an embodiment of the invention in which at least one additional card slot (three actually shown) is added to the docking station of FIG. 389. Each additional card slot is coupleable to a card 30. Each card 30 contains at least one resource that is an addition to the resources available on system card 28.

Figure 392:
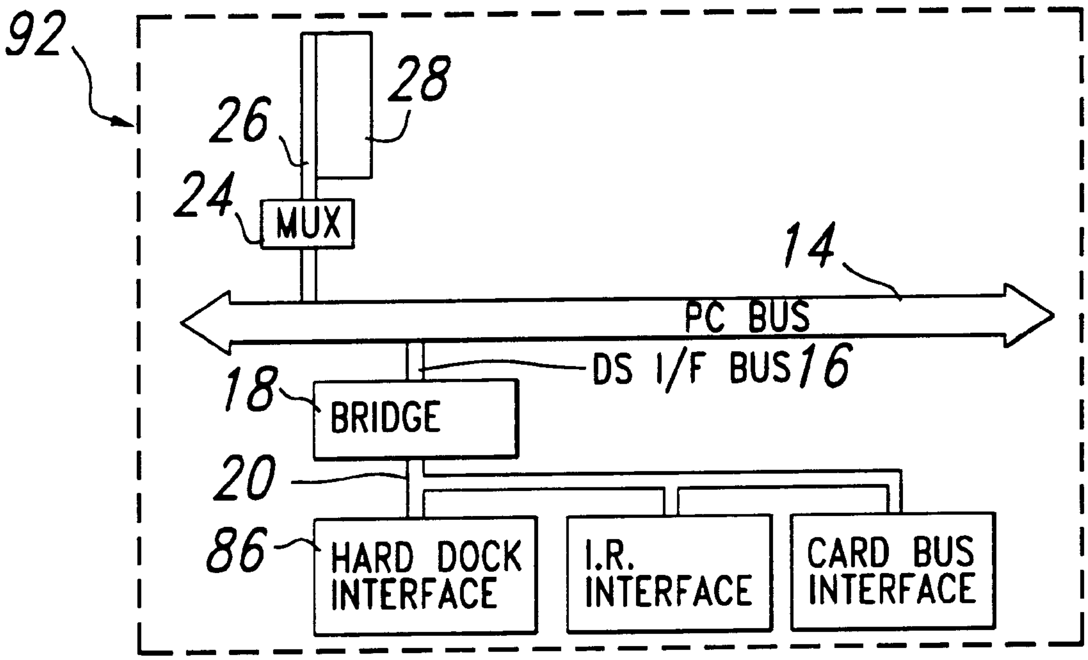

FIG. 392 illustrates a block diagram of a multi-configurable docking station 92 to which a notebook computer may dock via a hard dock interface, an infrared "IR" or a card bus interface, according to yet another embodiment of the invention.

Figure 393:
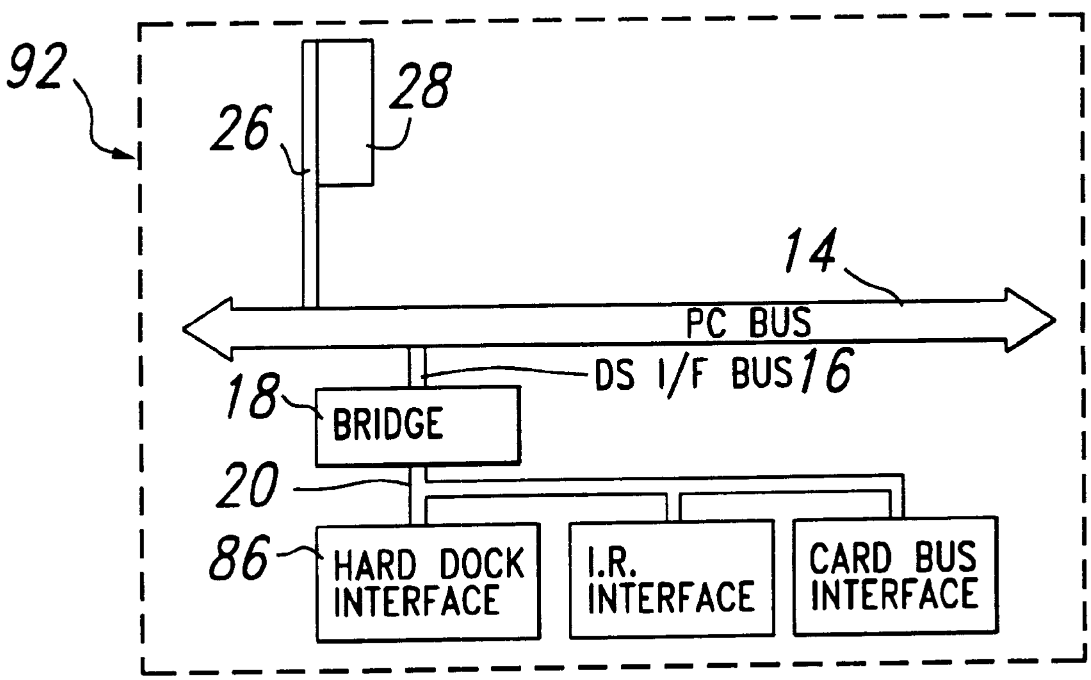

FIG. 393 illustrates an alternative embodiment of a docking station 92 in which a MUX is located on the system card 28, not located separately in the docking station.

Figure 394:
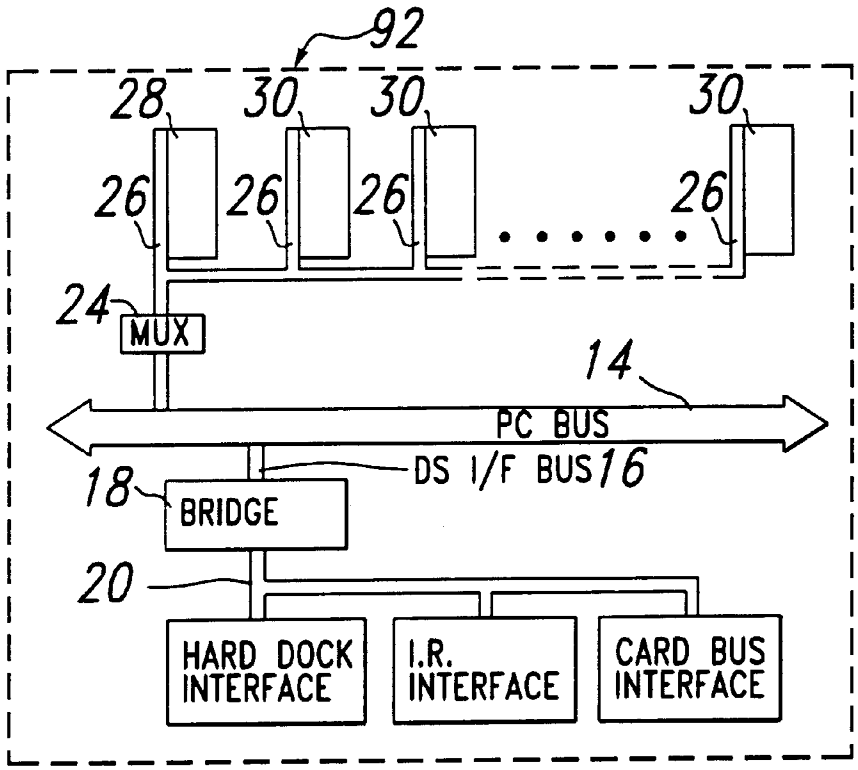

FIG. 394 illustrates an embodiment of the invention in which at least one additional card slot (three actually shown) is added to the docking station of FIG. 392. Each additional card slot 26 is coupled to mux 24. Each additional card slot is coupleable to a card 30. Each card 30 contains at least one resource that is an addition to the resources available on system card 28.

Figure 395:
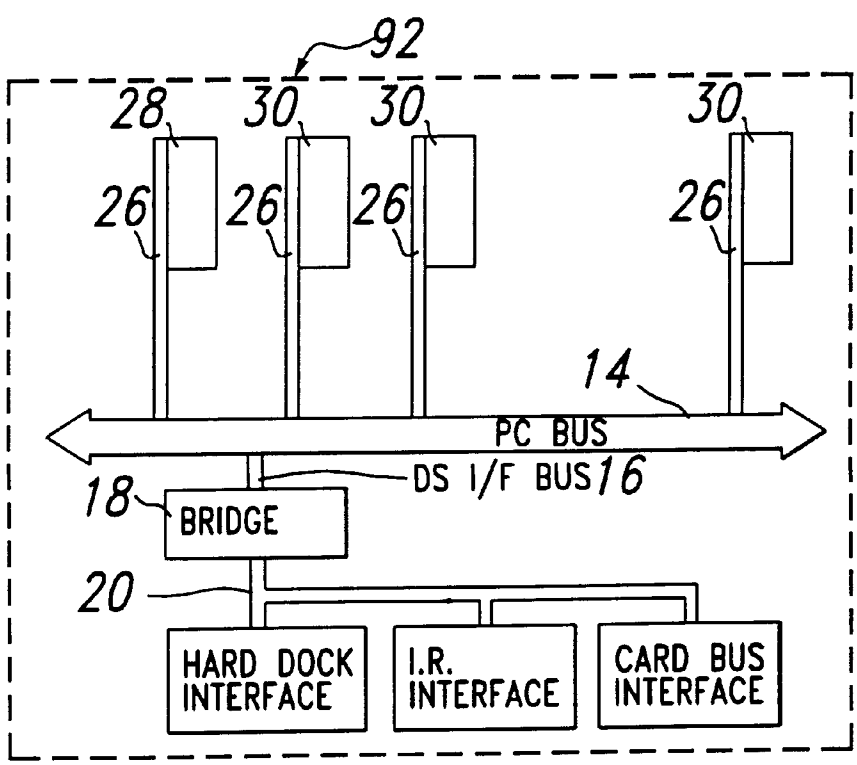

FIG. 395 illustrates an embodiment of the invention in which at least one additional card slot (three actually shown) is added to the docking station of FIG. 393. Each additional card slot is coupleable to a card 30. Each card 30 contains at least one resource that is an addition to the resources available on system card 28.

Figure 396:
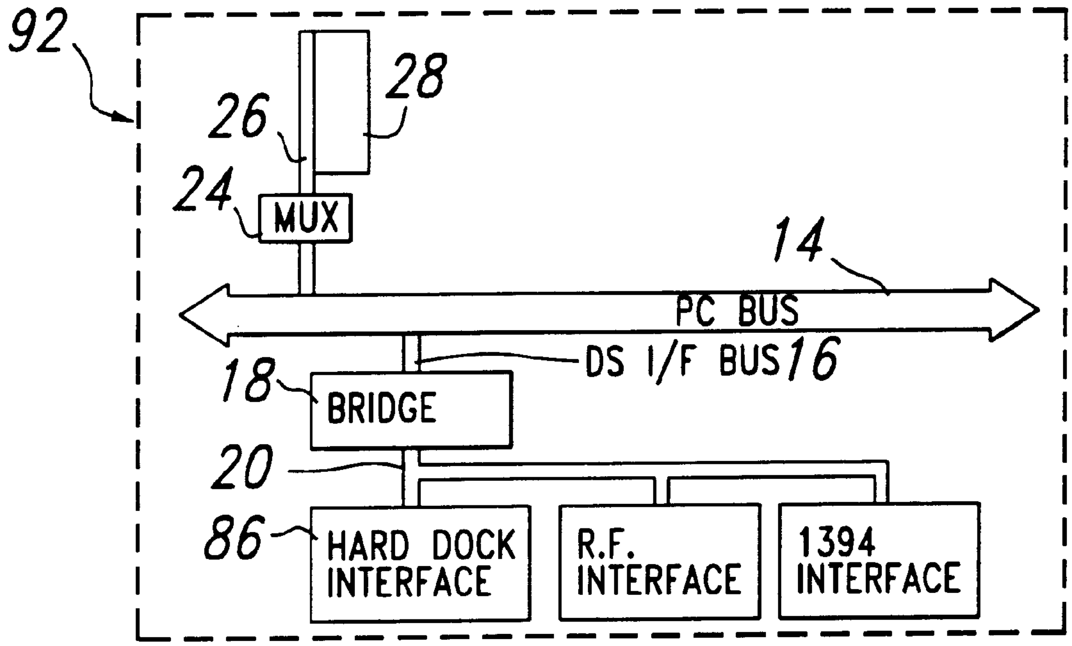

FIG. 396 illustrates a block diagram of a multi-configurable docking station 92 to which a notebook computer may dock via a hard dock interface, an infrared "IR" interface, or a 1394 interface, according to yet another embodiment of the invention.

Figure 397:
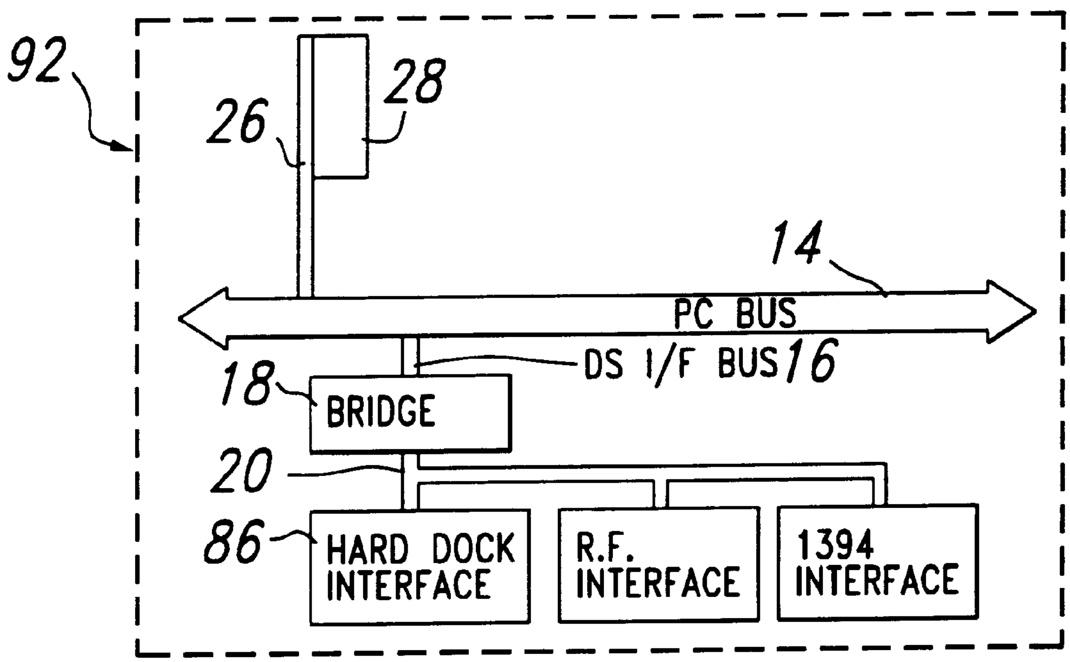

FIG. 397 illustrates an alternative embodiment of a docking station 92 in which a MUX is located on the system card 28, not located separately in the docking station.

Figure 398:
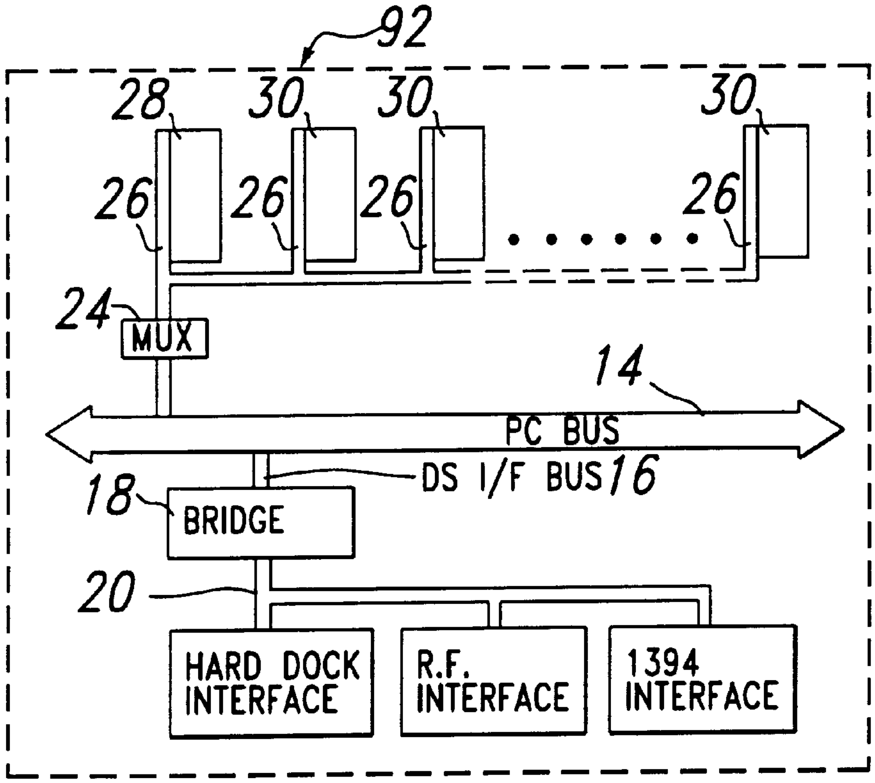

FIG. 398 illustrates an embodiment of the invention in which at least one additional card slot (three actually shown) is added to the docking station of FIG. 396. Each additional card slot 26 is coupled to mux 24. Each additional card slot is coupleable to a card 30. Each card 30 contains at least one resource that is an addition to the resources available on system card 28.

Figure 399:
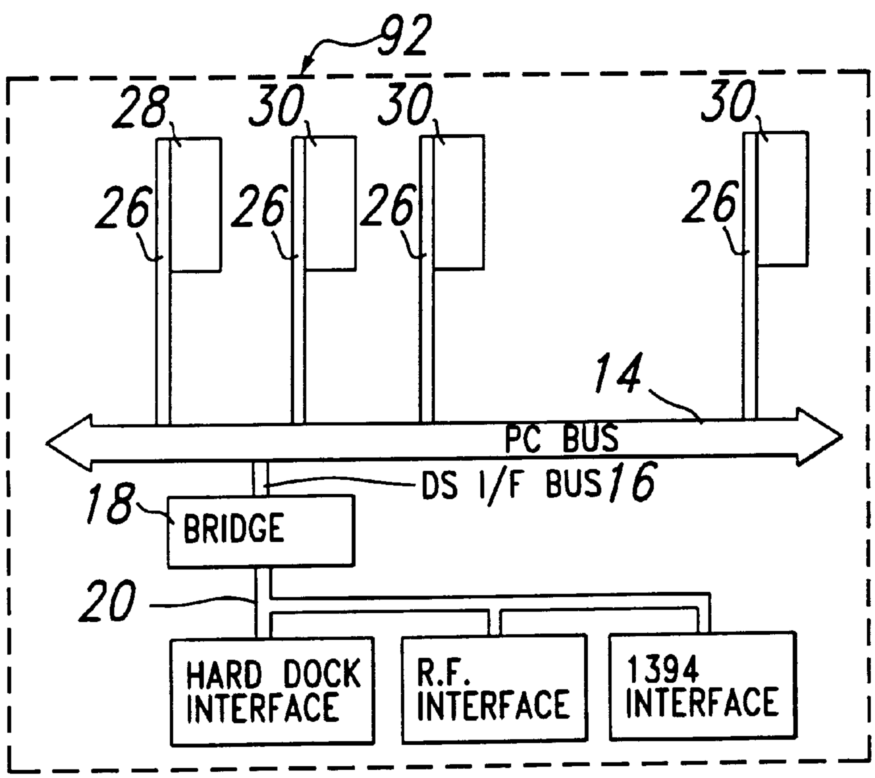

FIG. 399 illustrates an embodiment of the invention in which at least one additional card slot (three actually shown) is added to the docking station of FIG. 397. Each additional card slot is coupleable to a card 30. Each card 30 contains at least one resource that is an addition to the resources available on system card 28.

Figure 400:
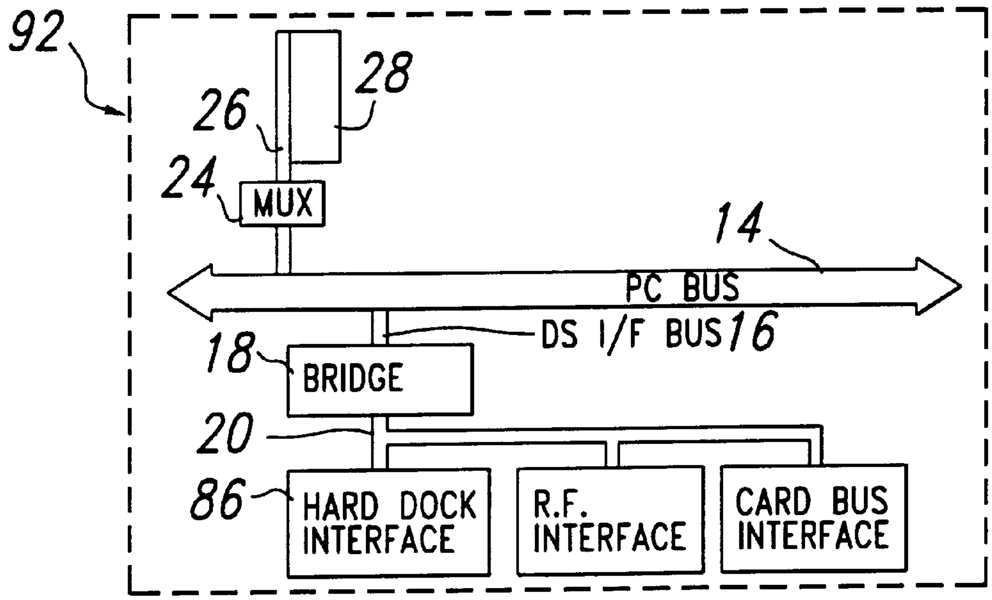

FIG. 400 illustrates a block diagram of a multi-configurable docking station 92 to which a notebook computer may dock via a hard dock interface, a radio frequency "RF" interface or a card bus interface, according to still yet another embodiment of the invention.

Figure 401:
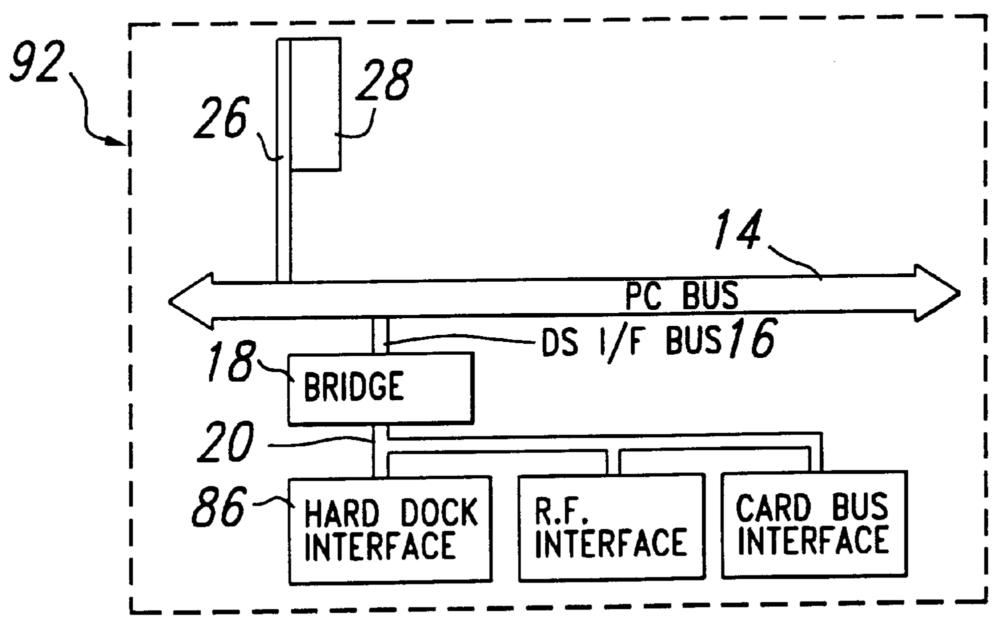

FIG. 401 illustrates an alternative embodiment of a docking station 92 in which a MUX is located on the system card 28, not located separately in the docking station.

Figure 402:
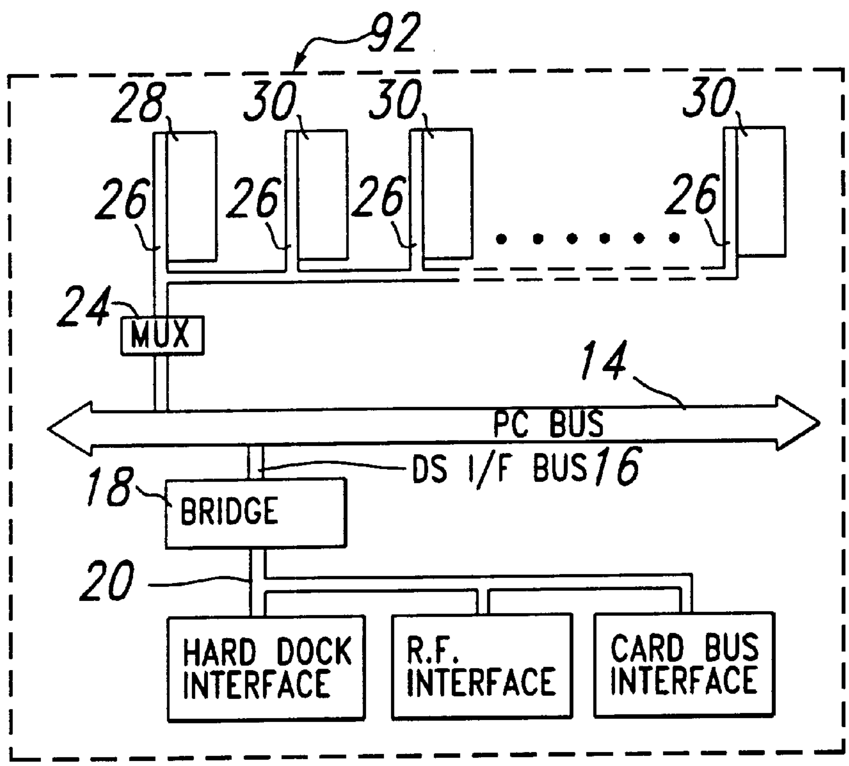

FIG. 402 illustrates an embodiment of the invention in which at least one additional card slot (three actually shown) is added to the docking station of FIG. 400. Each additional card slot 26 is coupled to mux 24. Each additional card slot is coupleable to a card 30. Each card 30 contains at least one resource that is an addition to the resources available on system card 28.

Figure 403:
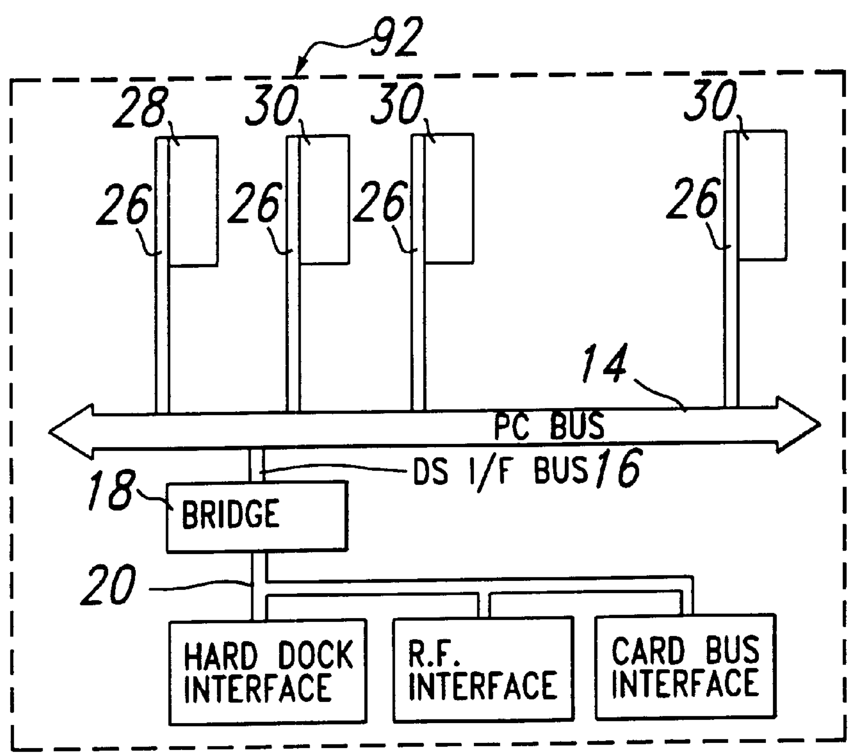

FIG. 403 illustrates an embodiment of the invention in which at least one additional card slot (three actually shown) is added to the docking station of FIG. 401. Each additional card slot is coupleable to a card 30. Each card 30 contains at least one resource that is an addition to the resources available on system card 28.

Figure 404:
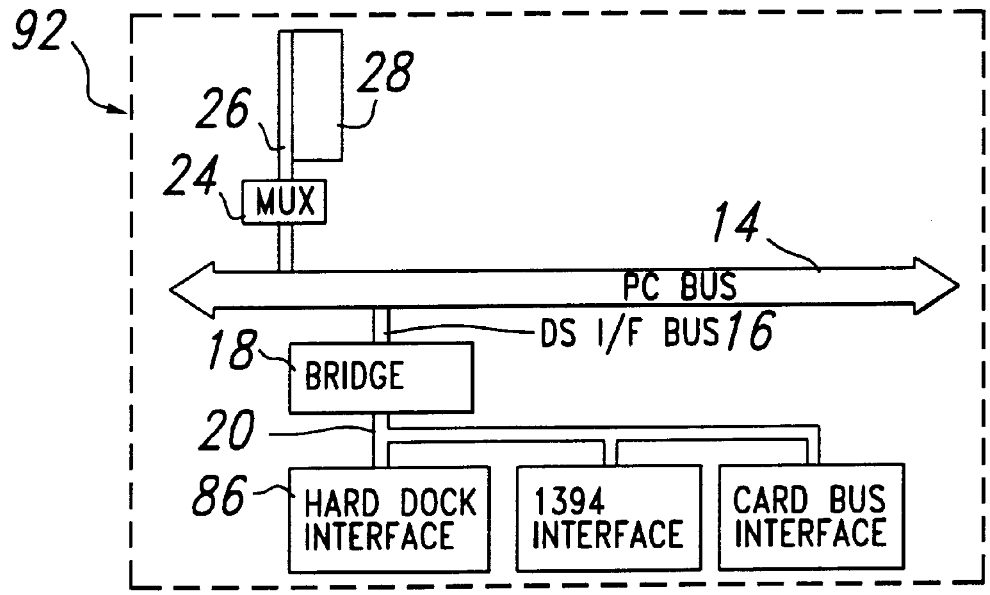

FIG. 404 illustrates a block diagram of a multi-configurable docking station 92 to which a notebook computer may dock via a hard dock interface, 1394 interface or a card bus interface, according to yet another embodiment of the invention.

Figure 405:
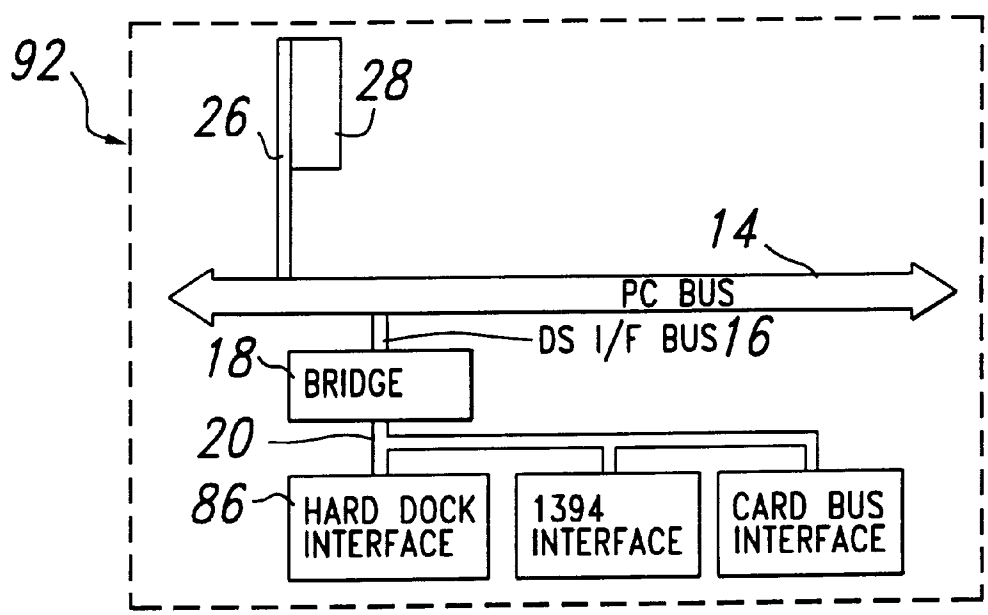

FIG. 405 illustrates an alternative embodiment of a docking station 92 in which a MUX is located on the system card 28, not located separately in the docking station.

Figure 406:
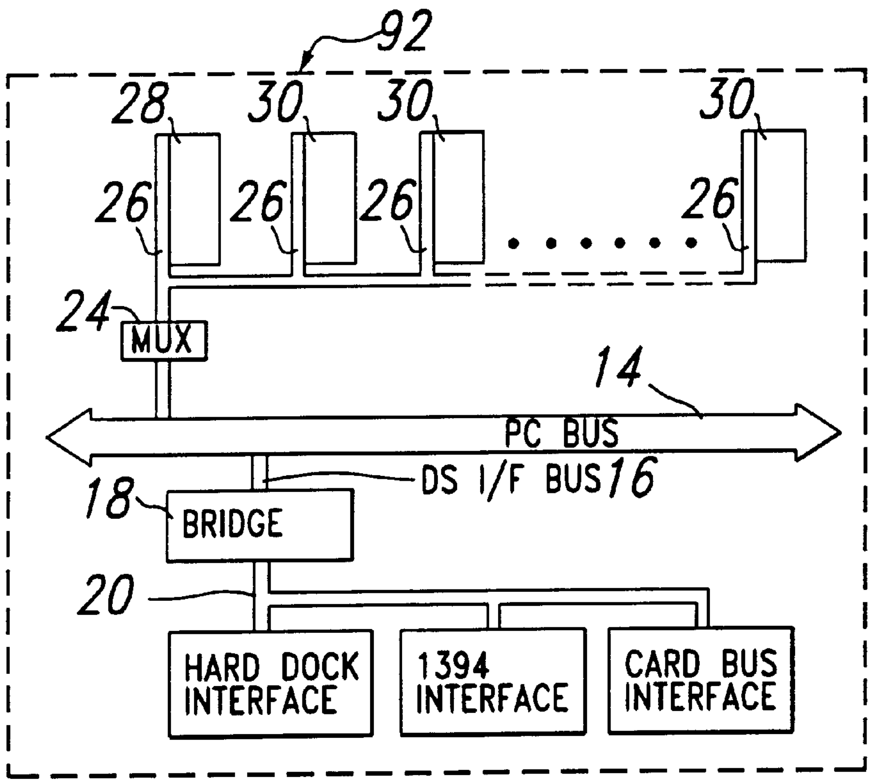

FIG. 406 illustrates an embodiment of the invention in which at least one additional card slot (three actually shown) is added to the docking station of FIG. 404. Each additional card slot 26 is coupled to mux 24. Each additional card slot is coupleable to a card 30. Each card 30 contains at least one resource that is an addition to the resources available on system card 28.

Figure 407:
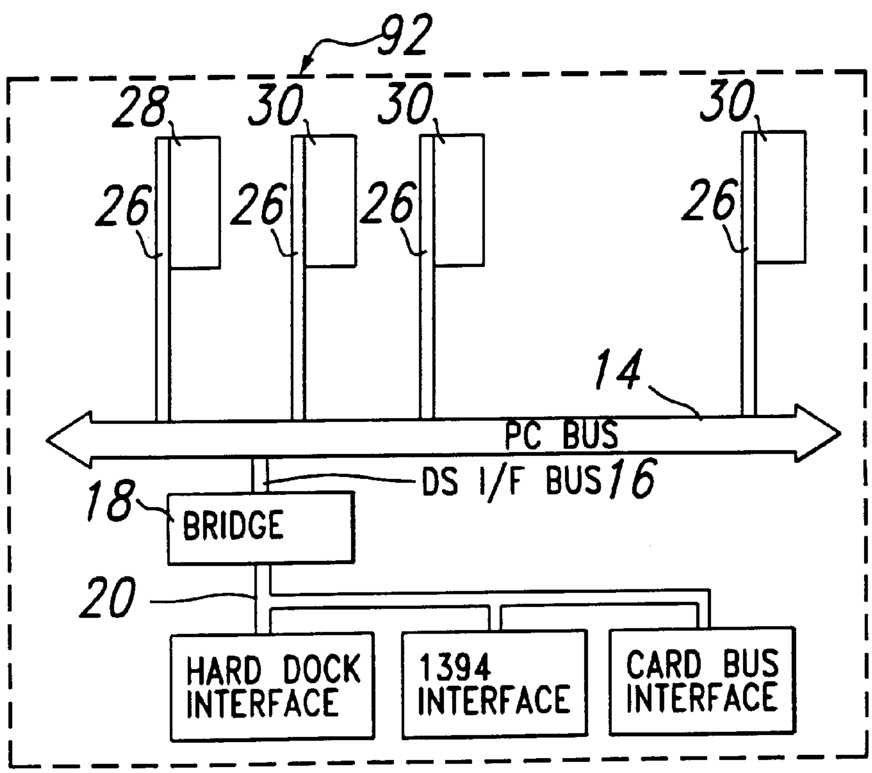

FIG. 407 illustrates an embodiment of the invention in which at least one additional card slot (three actually shown) is added to the docking station of FIG. 405. Each additional card slot is coupleable to a card 30. Each card 30 contains at least one resource that is an addition to the resources available on system card 28.

Figure 408:
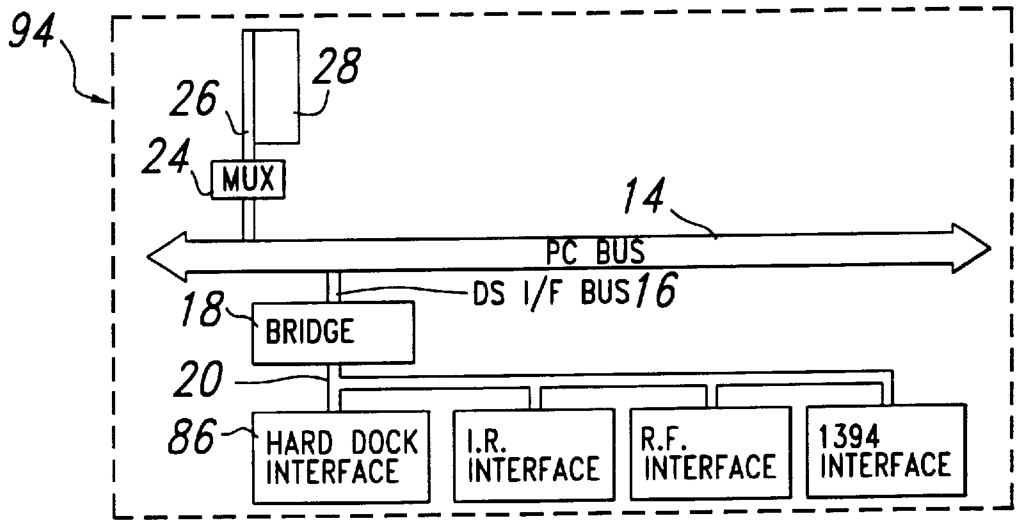

FIG. 408 illustrates a block diagram of a multi-configurable docking station 94 to which a notebook computer may dock via a hard dock interface, an infrared "IR" interface, a radio frequency "RF" interface, or a 1394 interface, according to still another embodiment of the invention.

Figure 409:
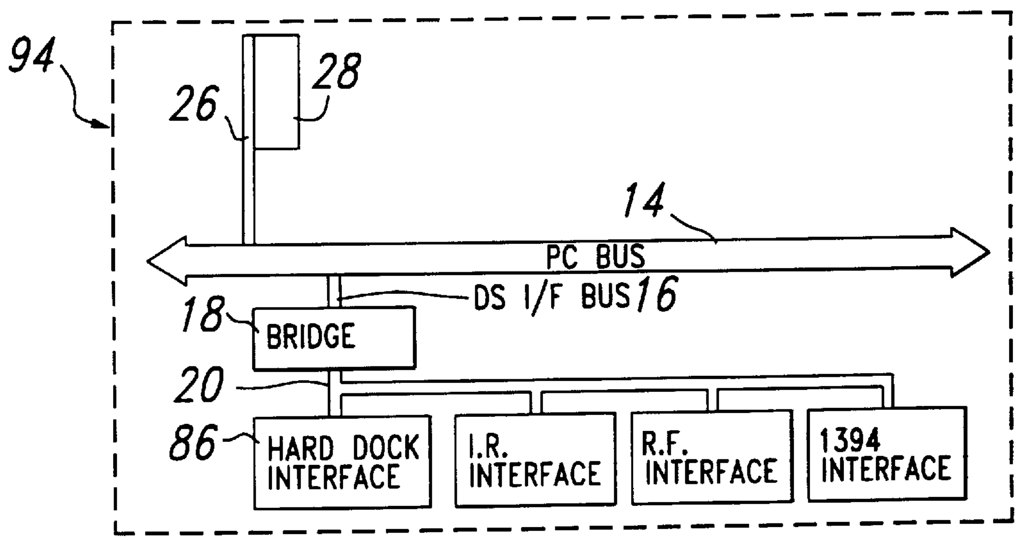

FIG. 409 illustrates an alternative embodiment of a docking station 94 in which a MUX is located on the system card 28, not located separately in the docking station.

Figure 410:
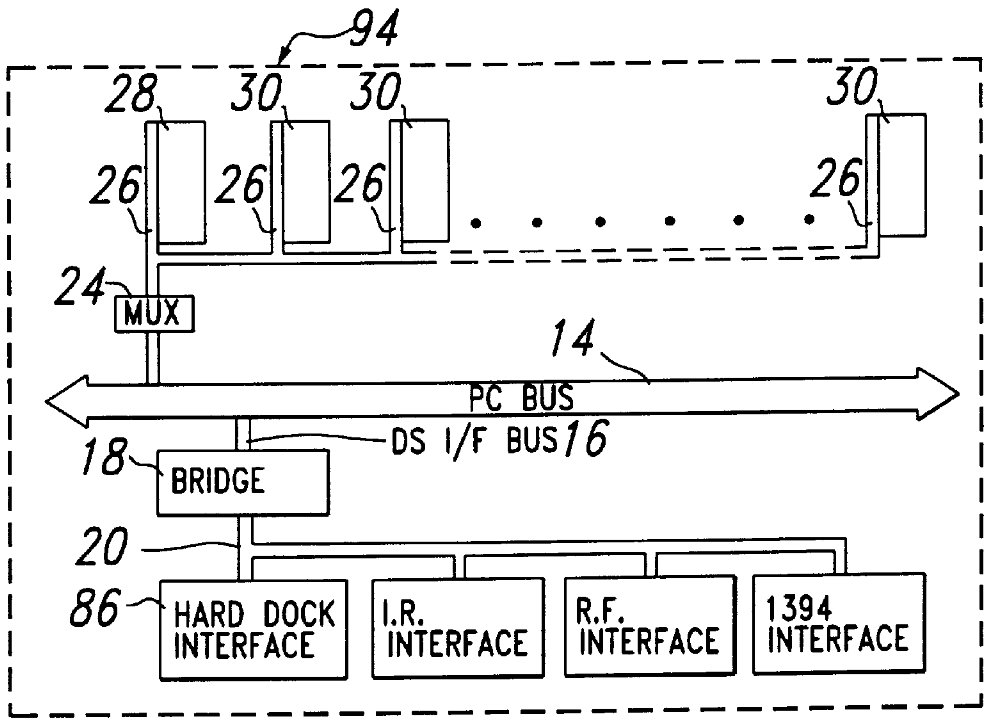

FIG. 410 illustrates an embodiment of the invention in which at least one additional card slot (three actually shown) is added to the docking station of FIG. 408. Each additional card slot 26 is coupled to mux 24. Each additional card slot is coupleable to a card 30. Each card 30 contains at least one resource that is an addition to the resources available on system card 28.

Figure 411:
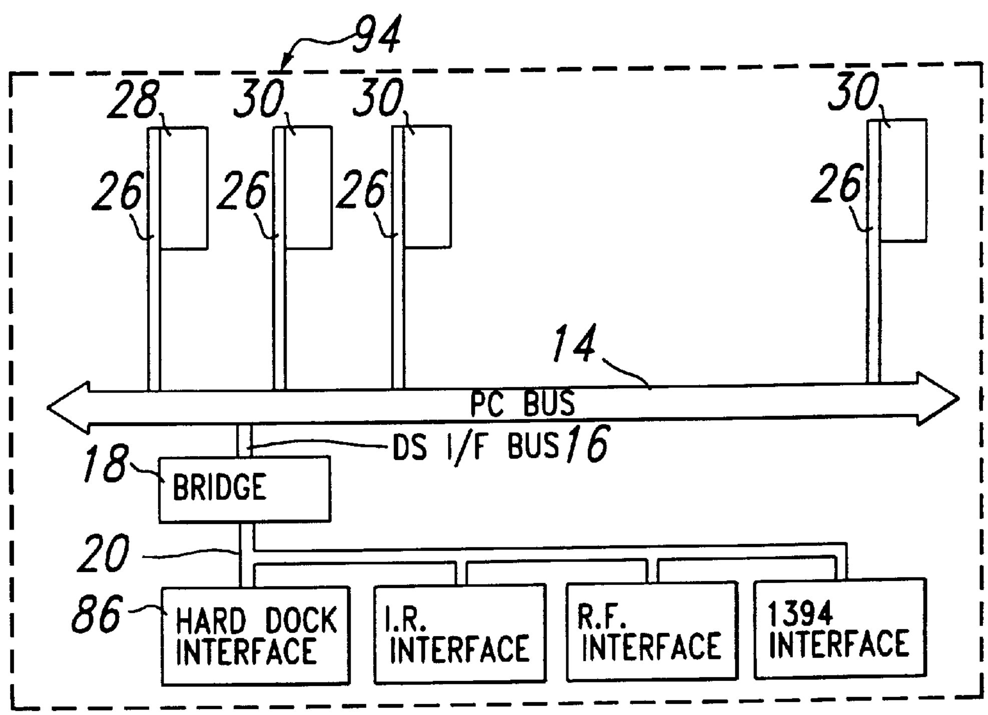

FIG. 411 illustrates an embodiment of the invention in which at least one additional card slot (three actually shown) is added to the docking station of FIG. 409. Each additional card slot is coupleable to a card 30. Each card 30 contains at least one resource that is an addition to the resources available on system card 28.

Figure 412:
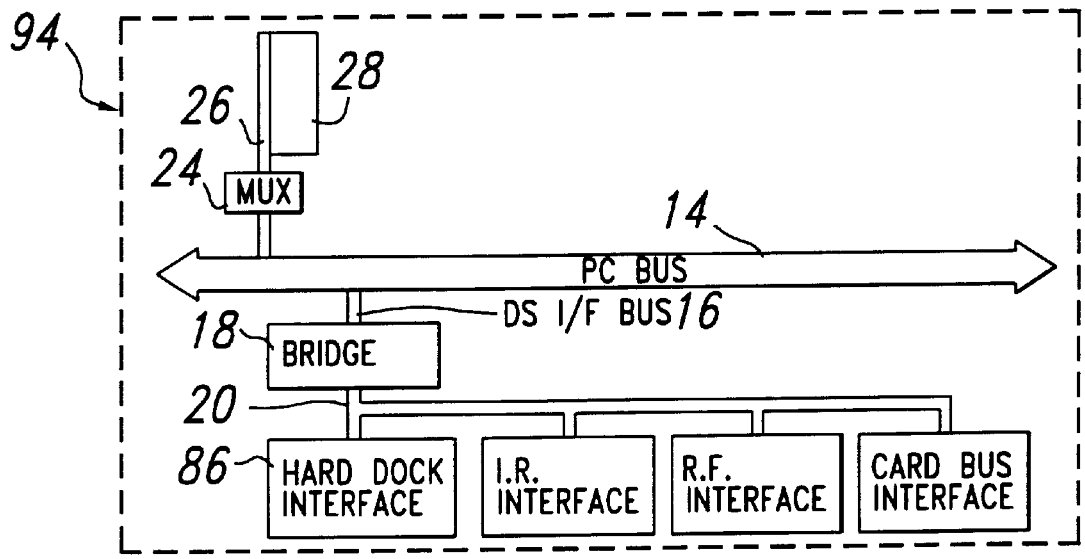

FIG. 412 illustrates a block diagram of a multi-configurable docking station 94 to which a notebook computer may dock via a hard dock interface, an infrared "IR" interface, a radio frequency "RF" interface, or a card bus interface, according to still another embodiment of the invention.

Figure 413:
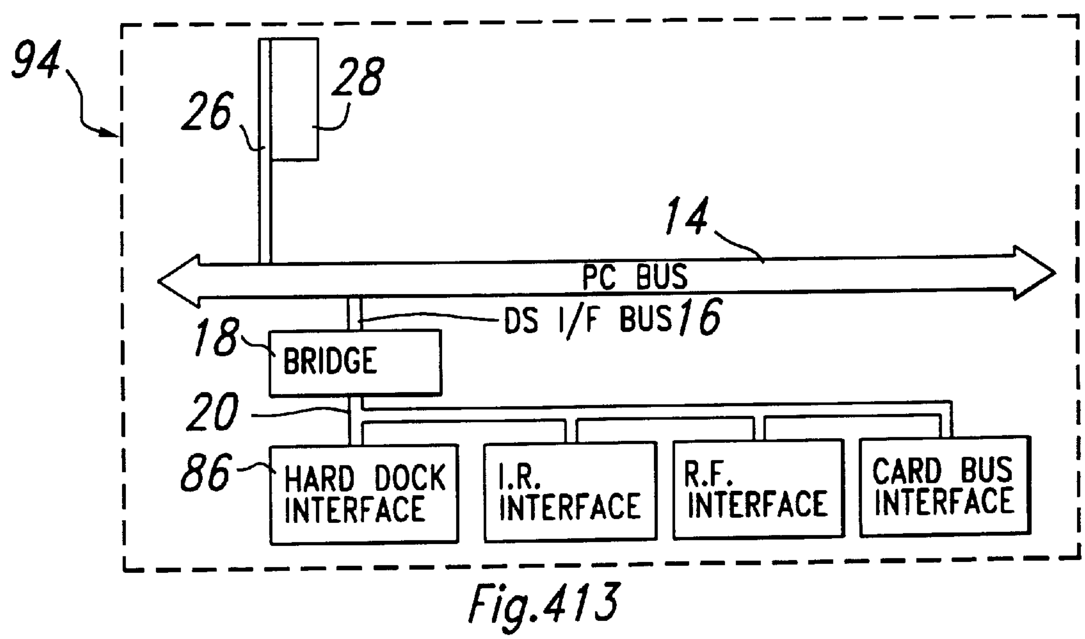

FIG. 413 illustrates an alternative embodiment of a docking station 94 in which a MUX is located on the system card 28, not located separately in the docking station.

Figure 414:
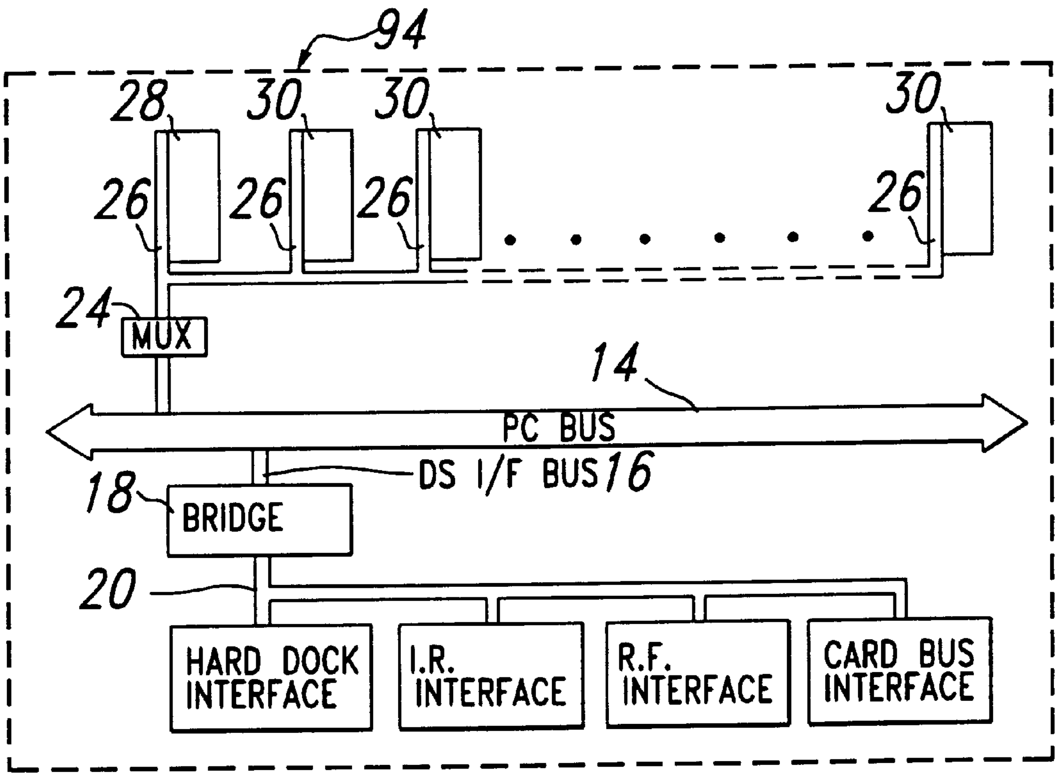

FIG. 414 illustrates an embodiment of the invention in which at least one additional card slot (three actually shown) is added to the docking station of FIG. 412. Each additional card slot 26 is coupled to mux 24. Each additional card slot is coupleable to a card 30. Each card 30 contains at least one resource that is an addition to the resources available on system card 28.

Figure 415:
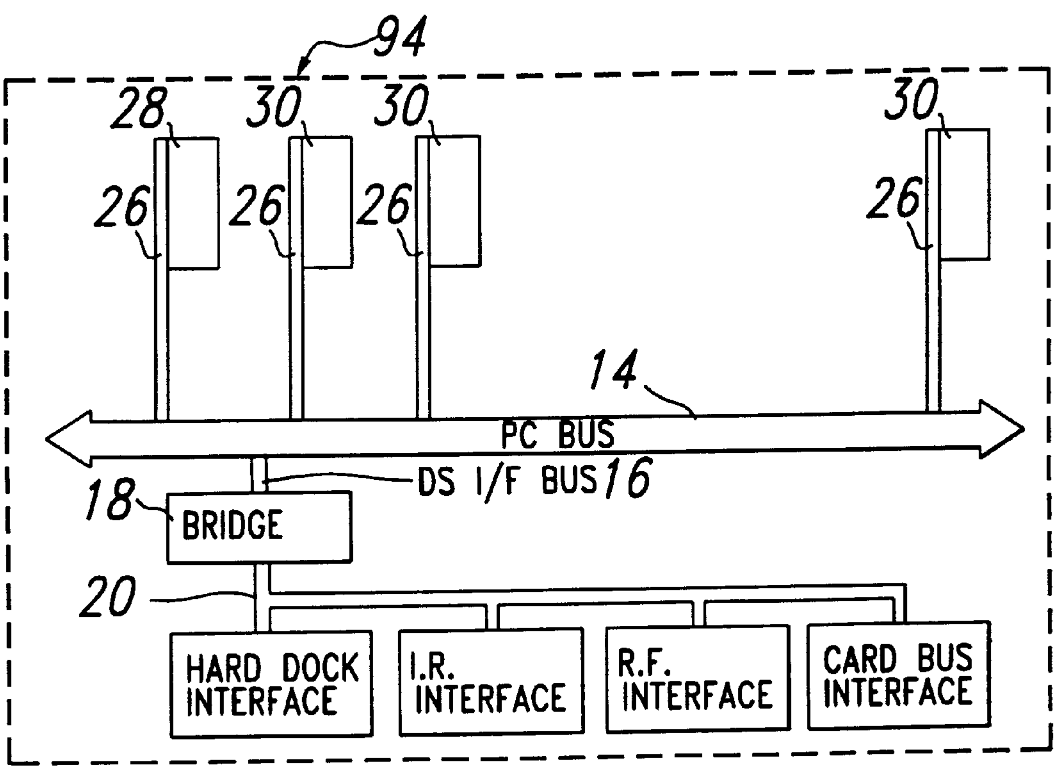

FIG. 415 illustrates an embodiment of the invention in which at least one additional card slot (three actually shown) is added to the docking station of FIG. 413. Each additional card slot is coupleable to a card 30. Each card 30 contains at least one resource that is an addition to the resources available on system card 28.

Figure 416:
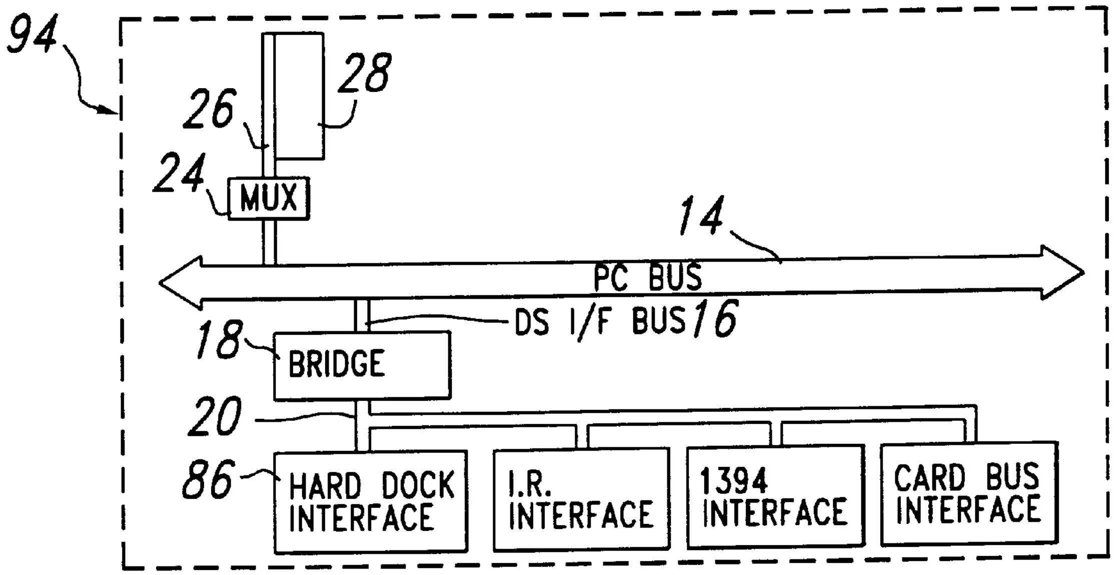

FIG. 416 illustrates a block diagram of a multi-configurable docking station 94 to which a notebook computer may dock via a hard dock interface, an infrared "IR" interface, a 1394 interface, or a card bus interface, according to yet still another embodiment of the invention.

Figure 417:
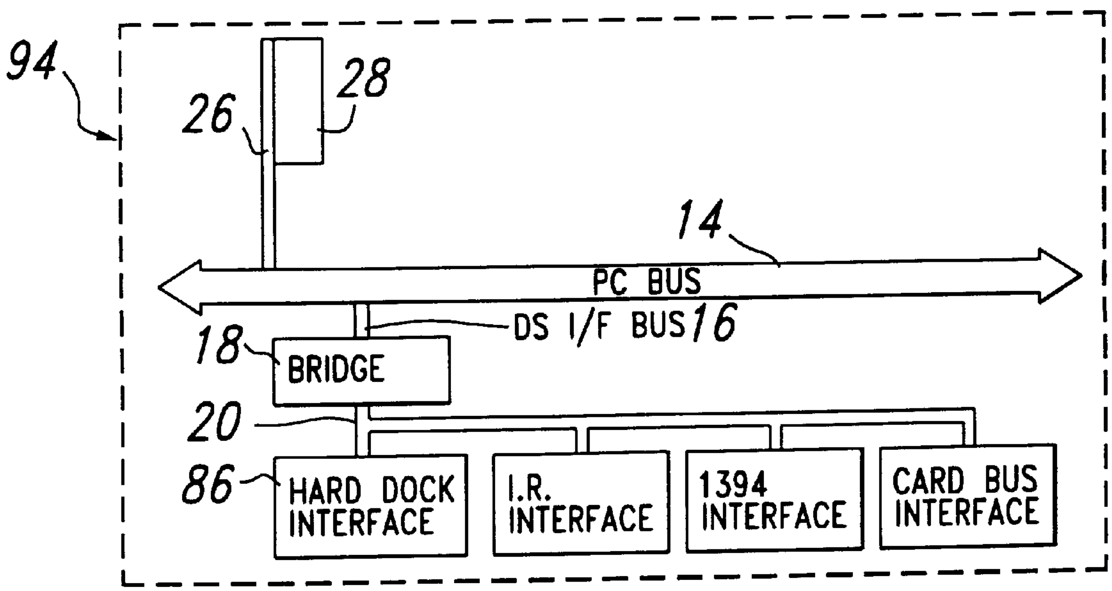

FIG. 417 illustrates an alternative embodiment of a docking station 94 in which a MUX is located on the system card 28, not located separately in the docking station.

Figure 418:
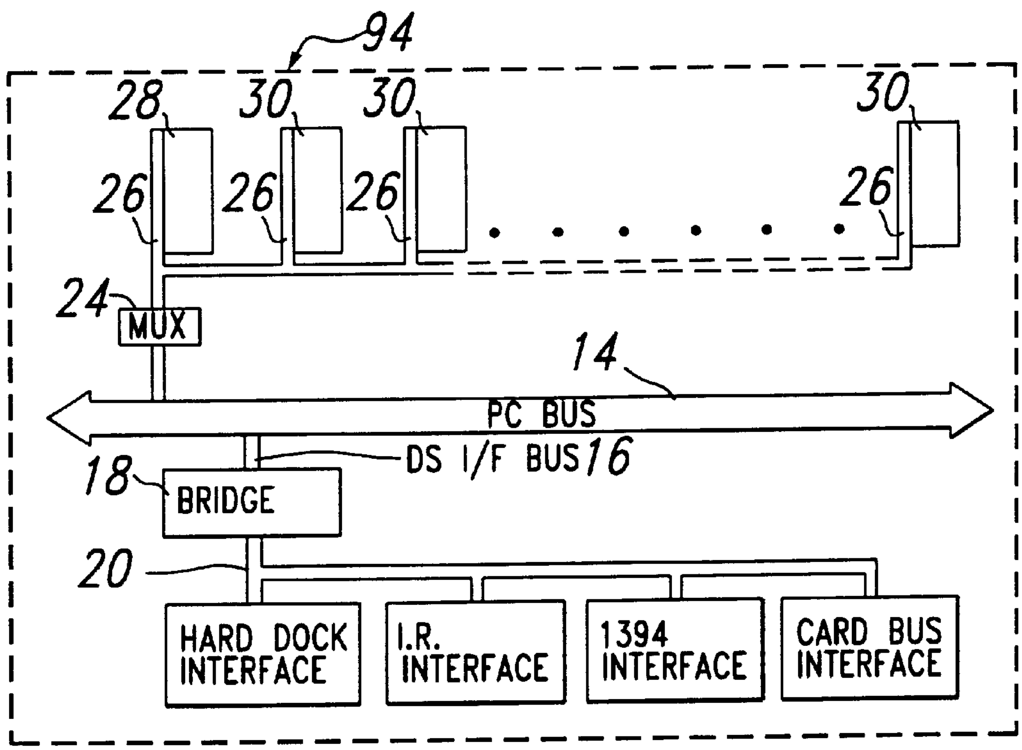

FIG. 418 illustrates an embodiment of the invention in which at least one additional card slot (three actually shown) is added to the docking station of FIG. 416. Each additional card slot 26 is coupled to mux 24. Each additional card slot is coupleable to a card 30. Each card 30 contains at least one resource that is an addition to the resources available on system card 28.

Figure 419:
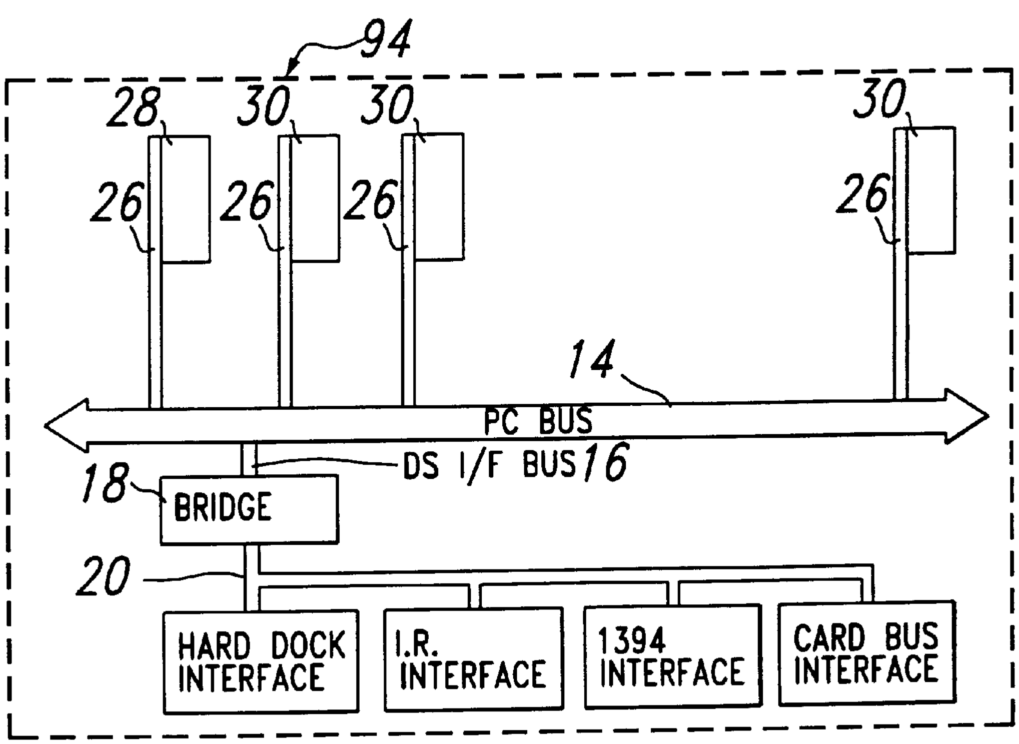

FIG. 419 illustrates an embodiment of the invention in which at least one additional card slot (three actually shown) is added to the docking station of FIG. 417. Each additional card slot is coupleable to a card 30. Each card 30 contains at least one resource that is an addition to the resources available on system card 28.

Figure 420:
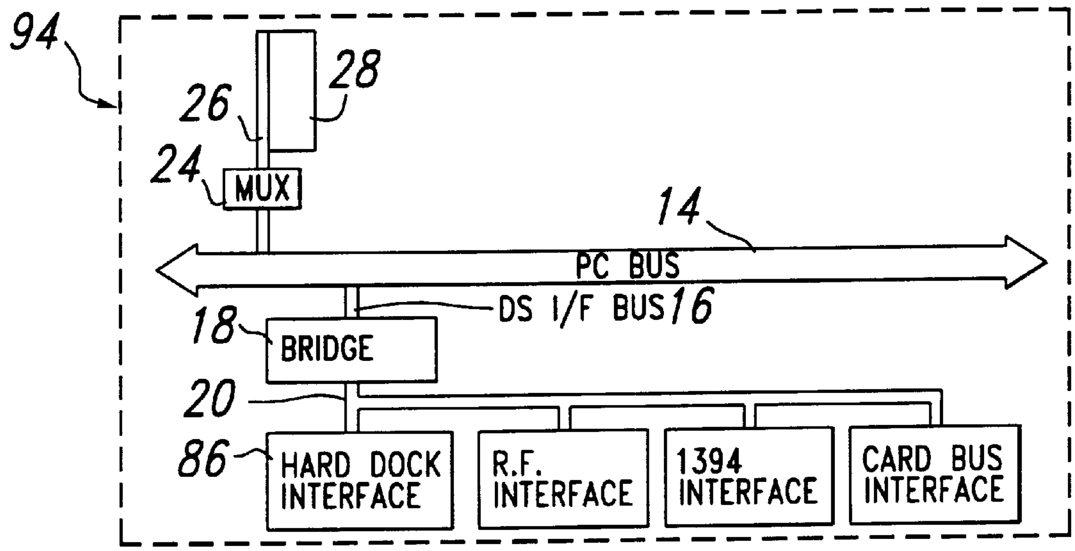

FIG. 420 illustrates a block diagram of a multi-configurable docking station 94 to which a notebook computer may dock via a hard dock interface, a radio frequency "RF" interface, a 1394 interface or a card bus interface, according to another embodiment of the invention.

Figure 421:
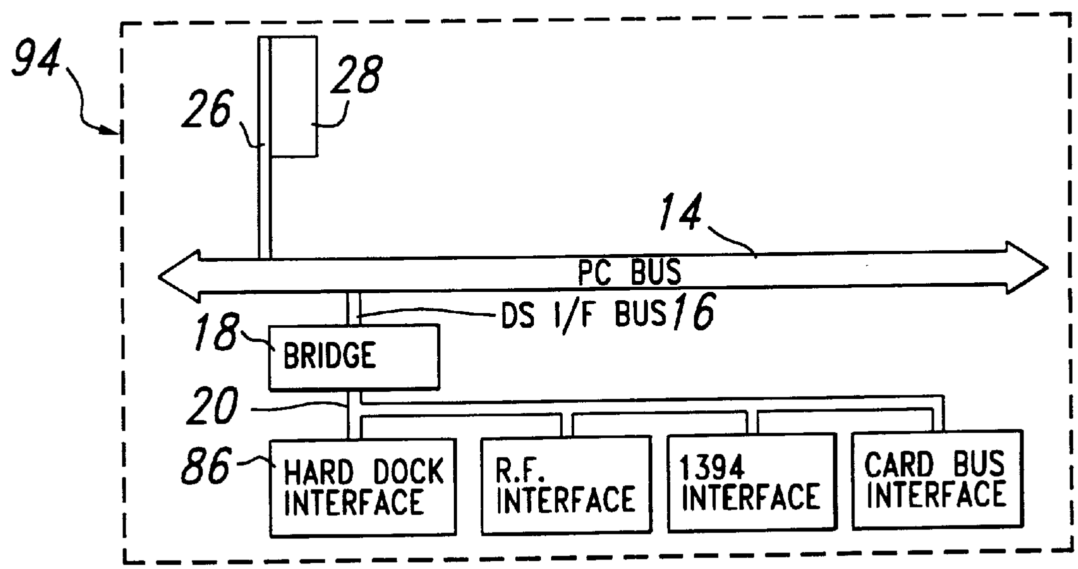

FIG. 421 illustrates an alternative embodiment of a docking station 94 in which a MUX is located on the system card 28, not located separately in the docking station.

Figure 422:
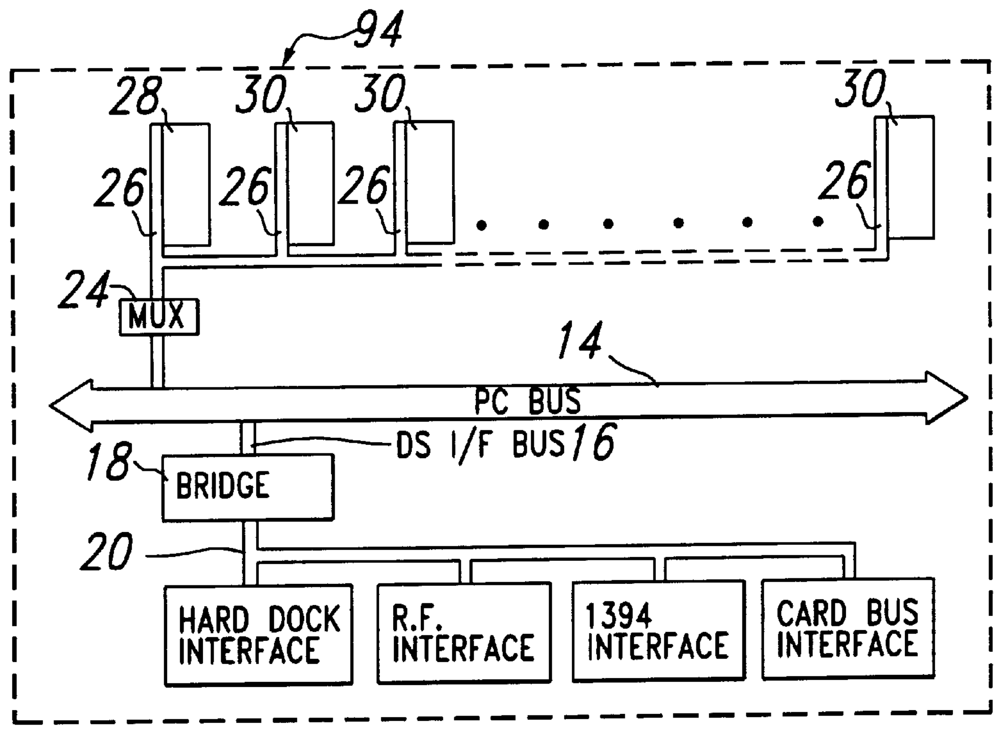

FIG. 422 illustrates an embodiment of the invention in which at least one additional card slot (three actually shown) is added to the docking station of FIG. 420. Each additional card slot 26 is coupled to mux 24. Each additional card slot is coupleable to a card 30. Each card 30 contains at least one resource that is an addition to the resources available on system card 28.

Figure 423:
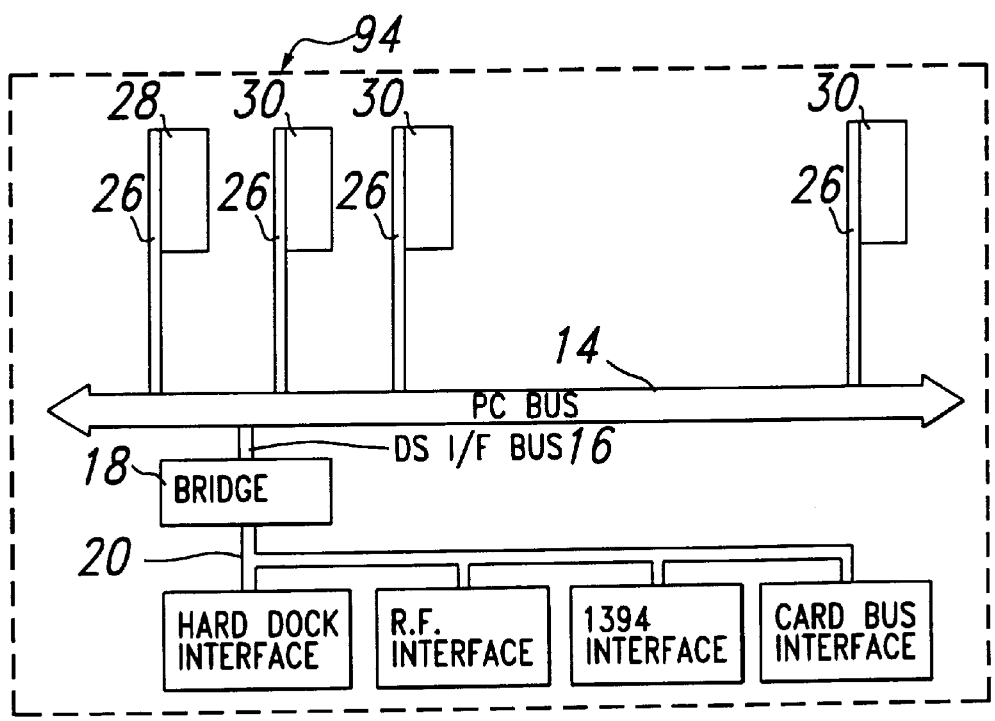

FIG. 423 illustrates an embodiment of the invention in which at least one additional card slot (three actually shown) is added to the docking station of FIG. 421. Each additional card slot is coupleable to a card 30. Each card 30 contains at least one resource that is an addition to the resources available on system card 28.

Figure 424:
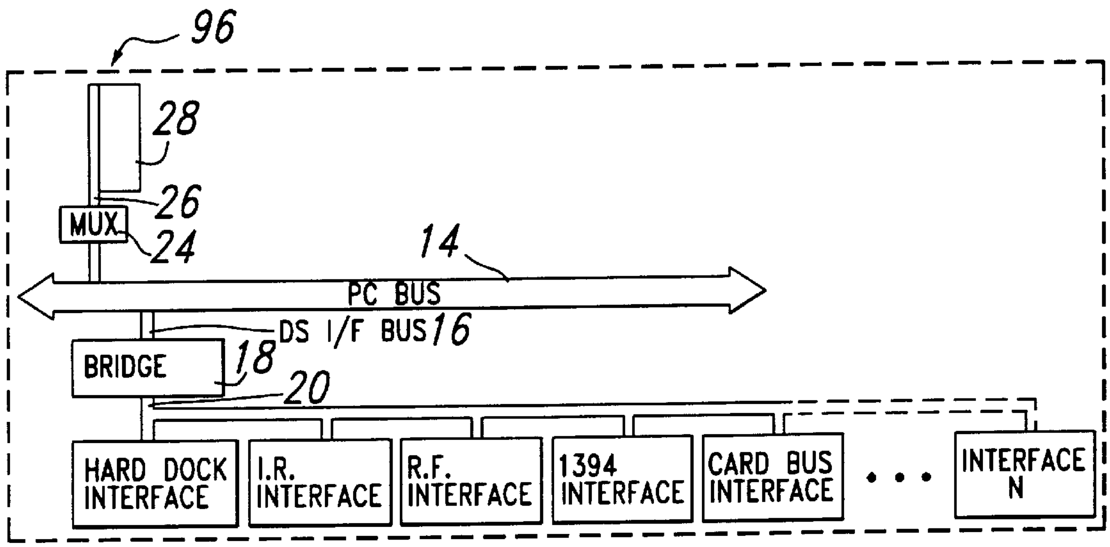

FIG. 424 illustrates a block diagram of a multi-configurable docking station 96 to which a notebook computer may dock via a hard dock interface, an infrared "IR" interface, a radio frequency "RF" interface, a 1394 interface, a card bus interface and possible other interfaces, according to still another embodiment of the invention.

Figure 425:
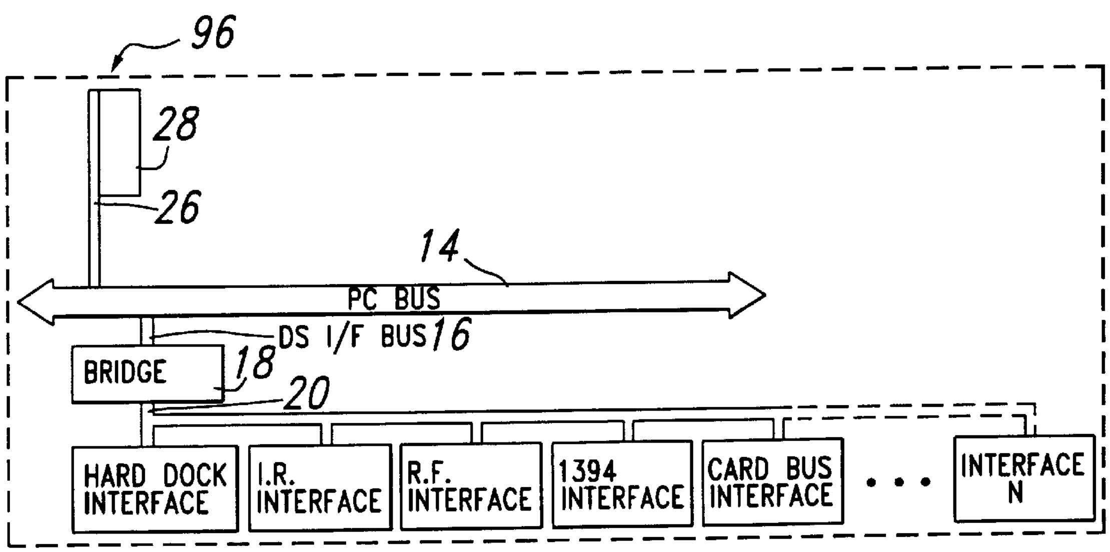

FIG. 425 illustrates an alternative embodiment of a docking station 96 in which a MUX is located on the system card 28, not located separately in the docking station.

Figure 426:
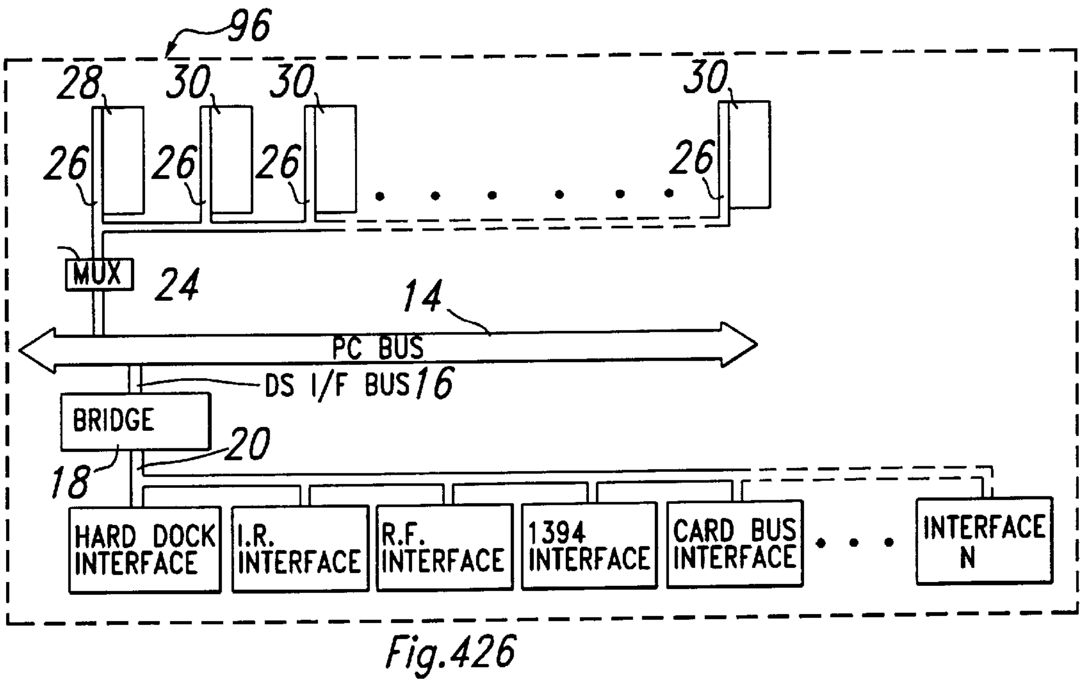

FIG. 426 illustrates an embodiment of the invention in which at least one additional card slot (three actually shown) is added to the docking station of FIG. 424. Each additional card slot 26 is coupled to mux 24. Each additional card slot is coupleable to a card 30. Each card 30 contains at least one resource that is an addition to the resources available on system card 28.

Figure 427:
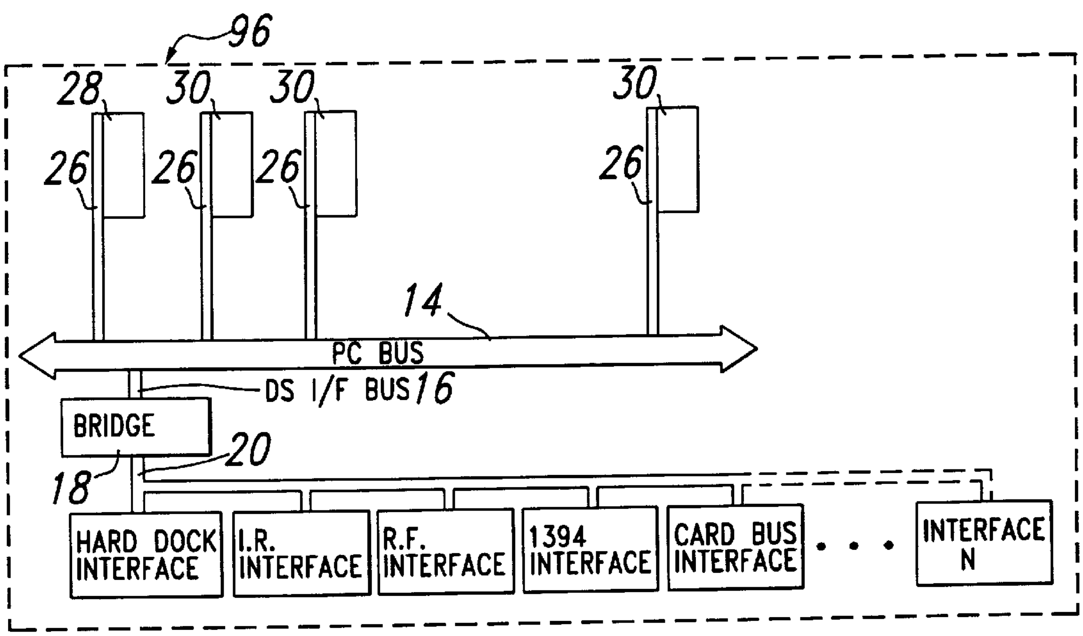

FIG. 427 illustrates an embodiment of the invention in which at least one additional card slot (three actually shown) is added to the docking station of FIG. 425. Each additional card slot is coupleable to a card 30. Each card 30 contains at least one resource that is an addition to the resources available on system card 28.

DETAILED DESCRIPTION OF PREFERRED EMBODIMENTS

The present invention discloses a computer docking station that can have its functionality reconfigured when docked with a portable personal computer. The following "Terms and Definitions" provides a definition for the new and/or less familiar terms used in the description of the present invention.

Terms and Definitions

| TERM | DEFINITION |
|---|---|
| Docking Station | A computer device that attaches or connects with a notebook computer to provide additional functions. |
| Hard Dock | A connection between a notebook computer and a docking station in which the notebook plugs directly into the docking station. |
| Soft Dock | Any other connection between a notebook computer and a docking station. link can be established and the dock can be initiated. |
| Local Dock | A form of Soft Dock in which a notebook computer is connected to a docking station in a point-to-point connection and is physically close by. This includes proximity docking where when the docking station and notebook computer come within range of each other via IR or RF communications. |
| Remote Dock | A form of Soft Dock in which a notebook computer is connected to a docking station via a phone line or digital network. |
| Server | A process on another computer that communicates with a client. |
| Client/Server | A system consisting of one or more client processes connected via some communications path to a server process. |
| Symmetric Client Server processes. | A system of two or more computers each running both client and server |

Figure 1:
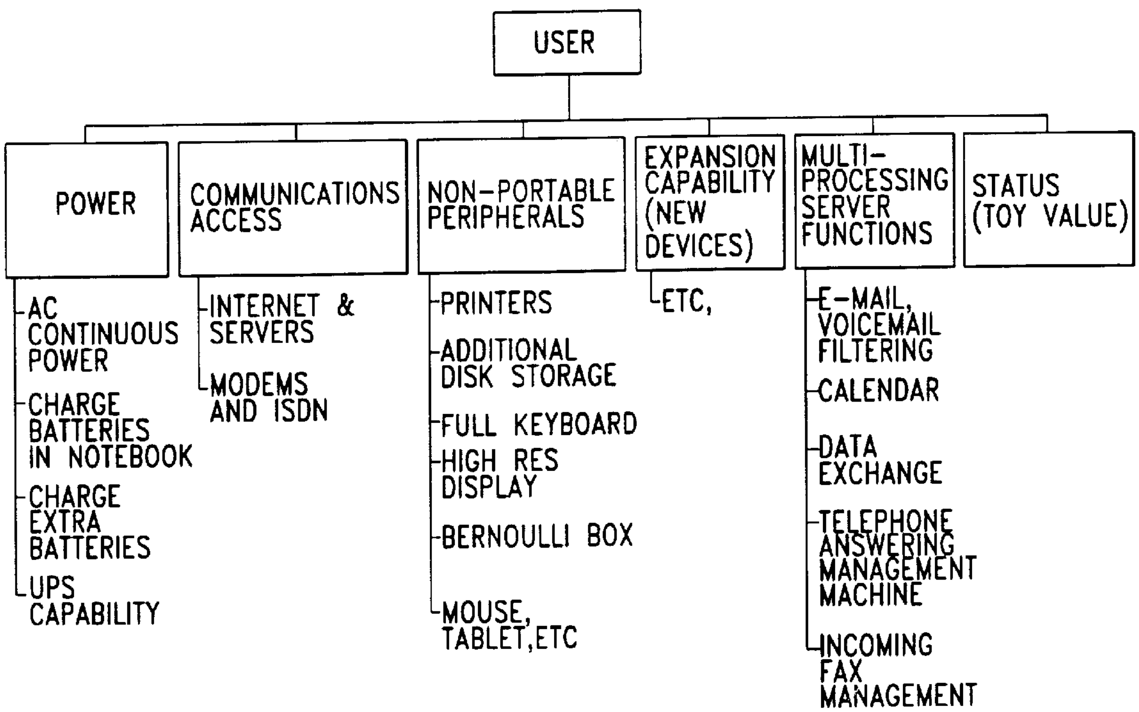
FIG. 1 is a block diagram of some of the reasons for a notebook computer user to acquire and use a docking station according to an embodiment of the present invention.

FIG. 1 illustrates some of the reasons for a notebook computer user to acquire and use a docking station:

Power: A docking station provides a convenient means for supplying power to a notebook computer. Conversion of AC power from a wall outlet into the DC power required to operate the notebook computer over extended periods of time. DC power required to recharge the notebook computer's batteries. DC power required to recharge accessory batteries at the same time as the notebook computer's internal batteries. Power conditioning of input power, spike filtering of all computer connections, and uninterruptable power for the notebook computer. Additional battery power for a portable dock.

Communications: A docking station provides access to communications facilities that may be more convenient or easier to hook up than to a notebook computer. Internet and/or Ethernet connections, including thick Ethernet. Modems and direct access to digital telephony, such as ISDN or voice.

Non-Portable Peripherals: A docking station provides access to peripherals that cannot be conveniently attached to the notebook, either because they are not portable and are unavailable, or because it is inconvenient to provide all the discrete connections to the notebook within the connector size and weight constraints.

Examples of such peripherals are:

- Additional disk drives.
- Printers.
- Full size keyboard.
- High resolution display.
- CD ROM.
- Bernoulli box or other removable disks.
- Full size mouse or data tablet.
- Video and video conferencing equipment.
- Etc.

Additional Portable Function: The user would like to have additional peripherals and functions that can be carried with the notebook. These are sometimes needed, and sometimes not needed, so they need to be detachable to minimize bulk and weight when not needed.

Expansion Capability: If the docking station contains a CPU, they it can provide server (and maybe client) functions. Examples of these functions are: Unattended receipt of e-mail, voice mail, fax, and appropriate filtering prior to access by the notebook. Unattended access and update of a user calendar or other groupware by other people while the notebook is unconnected. Automatic compression, decompression, and "smart" transmission of data during exchange with the notebook.

Status: A docking station provides a degree of status for the user above and beyond what might be reasonably expected from a notebook computer alone. The docking station remains on the desk while the user is gone with the notebook, providing status even when the user is away.

Elimination of Desktop Clutter: A docking station can effectively package and/or remove many wires and other obstructions from the desktop creating a more ergonomic work area.

Figure 2:
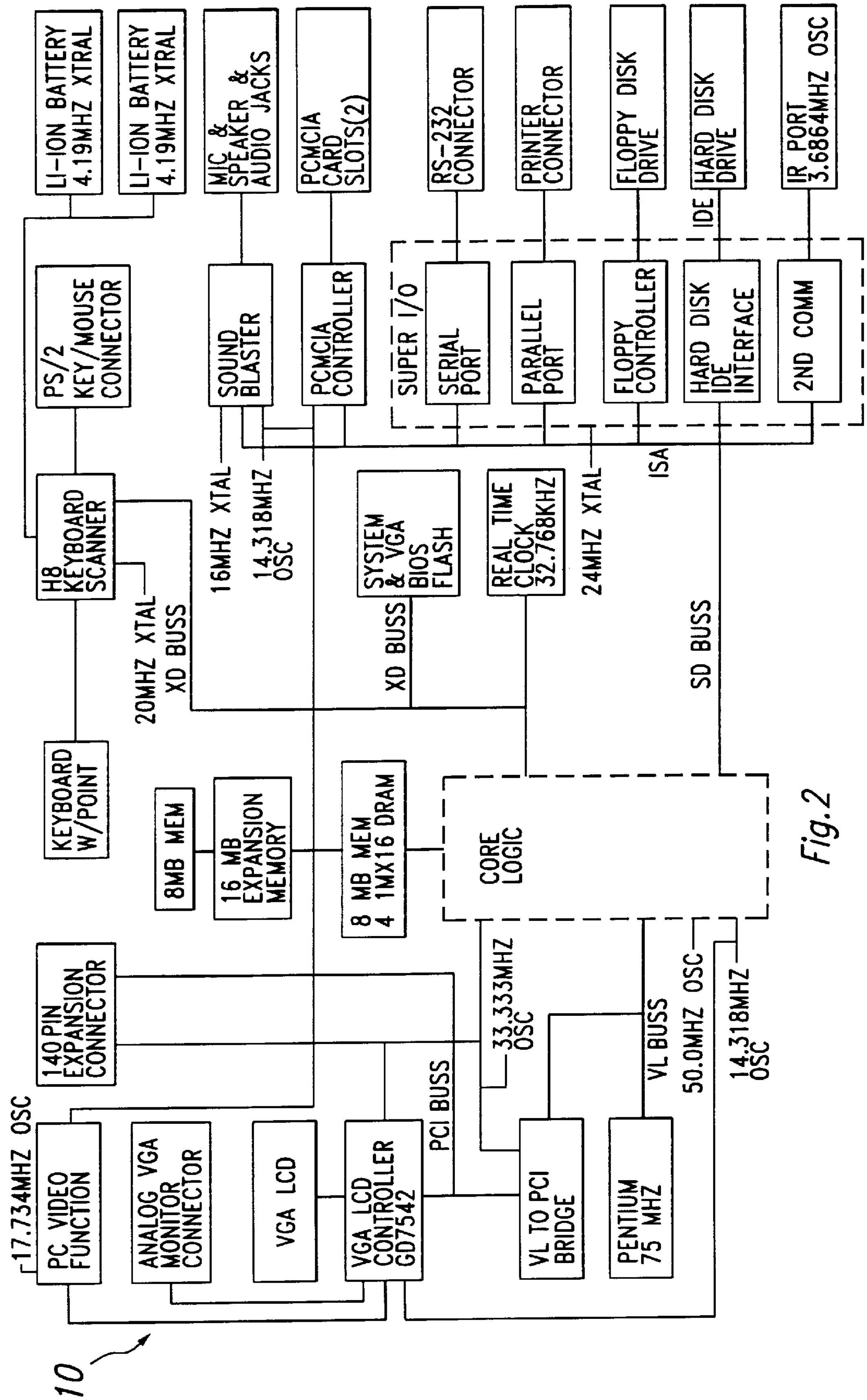
FIG. 2 illustrates a block one example of a notebook computer 10 that may couple or "dock" with a hard dock docking embodiment of the multi-configurable docking station of the present invention.

FIG. 2 illustrates one example of a notebook computer 10 that may couple or "dock" with the multi-configurable docking station of the present invention. More specifically, FIG. 2 illustrates a block diagram of a Texas Instruments Travel Mate 5000 color portable notebook computer based upon the Intel Pentium microprocessor. Operating speed of the Pentium is 75 Mhz internal to the processor but with a 50 Mhz external bus speed. A 50 Mhz oscillator is supplied to the ACC Microelectronics 2056 core logic chip which in turn uses this to supply the microprocessor. This 50 Mhz CPU clock is multiplied by a phase locked loop internal to the processor to achieve the 75 Mhz CPU speed. The management features of the present invention may cause the CPU clock to stop periodically to conserve power consumption which reduces CPU temperature. The processor contains 16 KB of internal cache and 256 KB of external cache on the logic board.

The 50 Mhz bus of the CPU is connected to a VL to PCI bridge chip from ACC microelectronics to generate the PCI bus. The bridge chip takes a 33.333 Mhz oscillator to make the PCI bus clock. The Cirrus Logic GD7542 video controller is driven from this bus and this bus has an external connector for future docking options.

The GD542 video controller has a 14.318 Mhz oscillator input which it uses internally to synthesize the higher video frequencies necessary to drive an internal 10.411 TFT panel or external CRT monitors. When running in VGA resolution modes the TFT panel may be operated at the same time as the external analog monitor. For Super VGA resolutions only the external CRT may be used.

Operation input to the notebook computer is made through the keyboard. An internal pointing device is imbedded in the keyboard. External connections are provided for a parallel device, a serial device, a PS/2 mouse or keyboard, a VGA monitor, and the expansion bus. Internal connections are made for a Hard Disk Drive, a Floppy Disk Drive, and additional memory. The computer contains 8 Megabytes of standard memory which may be increased by the user up to 32 Megabytes by installing optional expansion memory boards. The first memory expansion board can be obtained with either 8 or 16 Megabytes of memory. With the first expansion board installed another 8 Megabytes of memory may be attaches to this board to make the maximum amount.

A second serial port is connected to a Serial Infrared device. This SIR device has an interface chip which uses a 3.6864 Mhz oscillator. The SIR port can be used to transmit serial data to other computers so equipped.

The two batteries in the notebook computer are Lithium Ion and have internal controllers which monitor the capacity of the battery. These controllers use a 4.19 Mhz crystal internal to the battery.

The notebook computer also has two slots for PCMCIA cards. These slots may be used with third party boards to provide various expansion options. The notebook computer further includes an internal sound chip set which can be used to generate or record music and/or sound effects and built in internal speaker and microphone. In addition, three audio jacks are provide for external microphones, audio input, and audio output.

Figure 3:
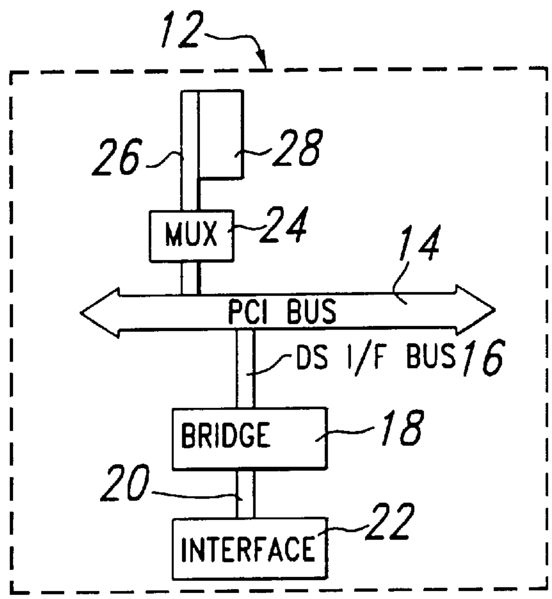
FIG. 3 illustrates a block diagram of a multi-configurable docking station to which notebook computer 10 of FIG. 2 may dock, according to one embodiment of the invention.

FIG. 3 illustrates a block diagram of a multi-configurable docking station to which notebook computer 10 may dock, according to one embodiment of the invention. Multi-configurable docking station 12 comprises a high speed PCI bus 14, a docking station interface bus 16 that couples a bridge 18 to PCd bus 14 and data/signal lines or bus 20 that couples an interface 22 to bridge 18. Mux 24 couples PCI bus 14 to card slot 26. A connector on card slot 26 couples to a mating connector on system card 28. PCI bus 14 is preferably a high speed PCI bus (at least 32 bit wide), but may be any bus that provides performance characteristics similar to a high speed PCI bus. As with PCI bus 14, interface bus 16 is also preferably a high speed PCI bus (at least 32 bit wide), but may be any bus that provides performance characteristics similar to a high speed PCI bus. Data/signal lines or bus 20 (also preferably a high speed PCI bus) couple interface module 22 to bridge 18.

Figure 4:
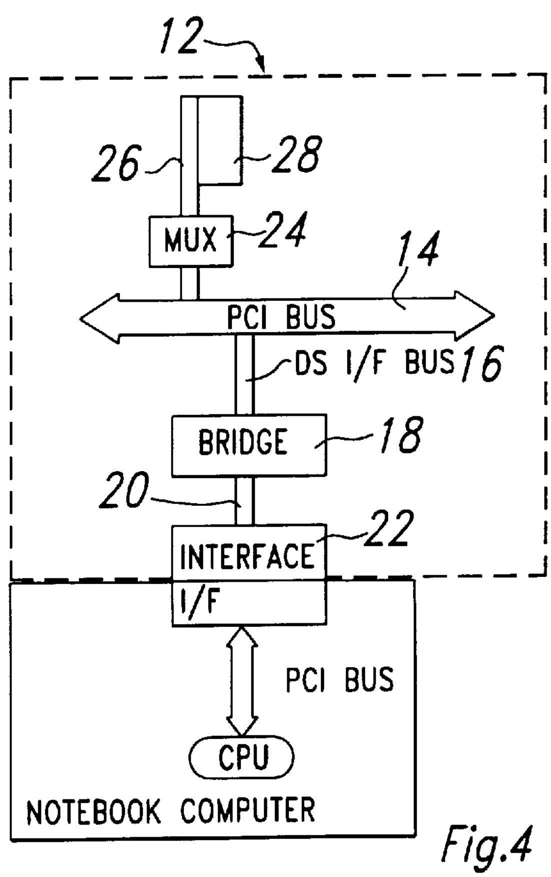
FIG. 4 illustrates a block diagram of notebook computer 10 hard docked to docking station 12, according to an embodiment of the invention.

In docking applications where a notebook computer is to be hard docked to docking station 12, interface 22 is an electrical connector that facilitates a physical and electrical connection between multi-configurable docking station 12 and notebook computer 10, as illustrated in FIG. 4. In the embodiment of FIGS. 3 and 4, interface 22 is a mating connector to the expansion connector on notebook computer 10 (currently a 160-pin connector on the Texas Instruments TM-5000 computer, but could have more more or less pins depending on the computer used, the functionality required, and whether or not multiplexing is used to reduce the number of pins). Mux 24 is a switch with data lines. Mux devices are well known in the art, are commercially available, and will be subsequently described in more detail as needed. Card slot 26 is preferably a dedicated card slot for coupling with system card 28, but could just as easily be a circuit board, part of a circuit board, back plane or apparatus capable of coupling with a circuit card (such as system card 28), circuit board, device, apparatus or combination thereof.

Figure 5:
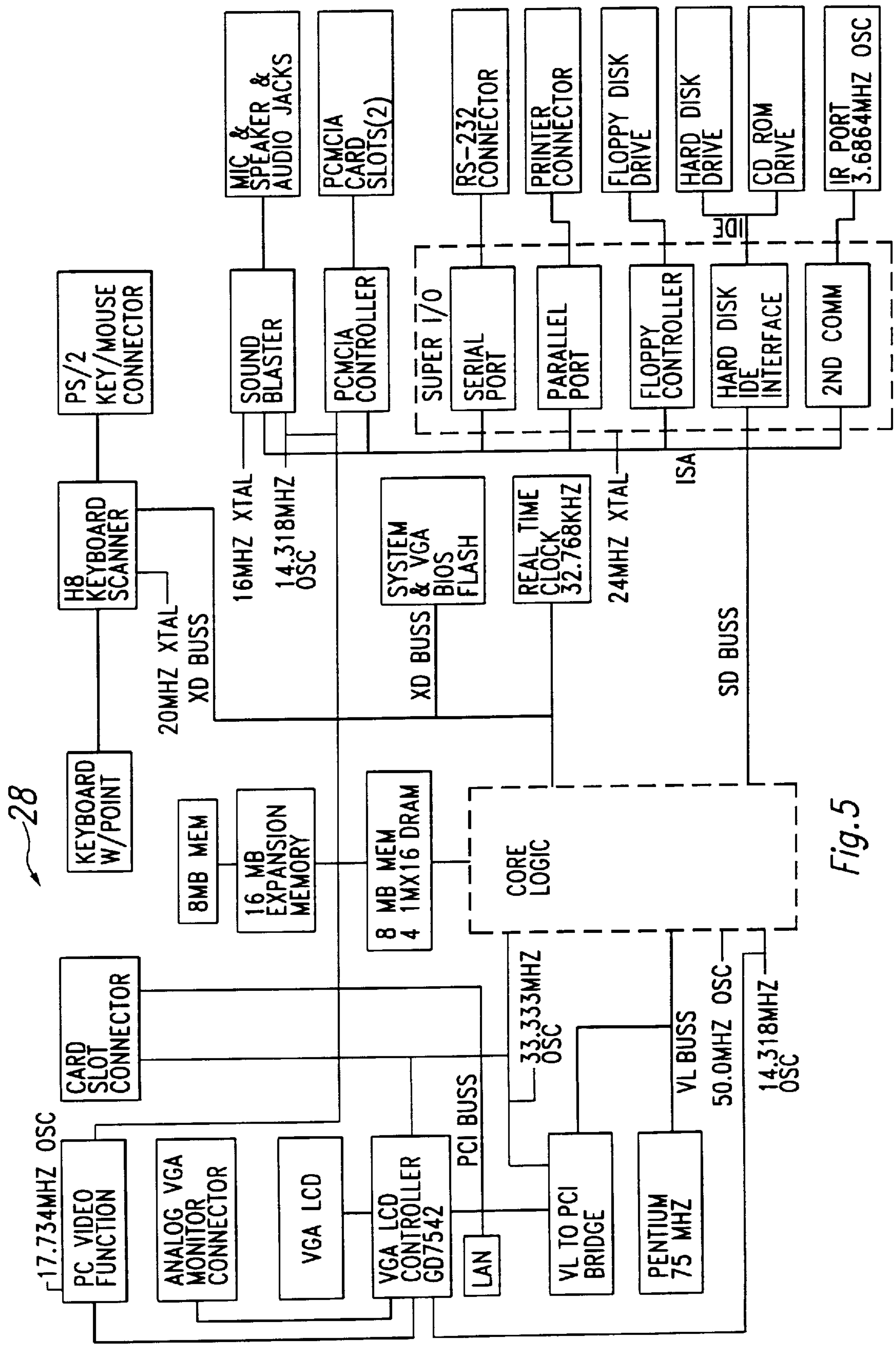
FIGS. 5–133 illustrate block diagrams of system cards that may be used with embodiments of docking stations of the present invention.

A block diagram of a system card 28 is illustrated in FIG. 5. System card 28 provides a robust range of PC (personal computer) capability. The system card illustrated in FIG. 5 contains its own processing unit (while a 75 Mhz Pentium processor is shown, other processors may be used depending on the desired power and functionality of the cpu and the anticipated need for controlling the setup and configuration in such a way as to make it more cost effective or easier to do the docking—at a minimum, the cpu should be able to accommodate a complex operating system), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a PCMCIA controller coupling PCMCIA card slots to the ISA bus, a serial port coupling an RS-232 connector to the ISA bus, a parallel port coupling a printer connector to the ISA bus, a floppy controller coupling a floppy disk drive to the ISA bus, a hard disk interface coupling a hard disk drive and a CD rom drive to the ISA bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

When docking station 12 is powered up and not docked, it has the ability to perform functions such as accepting e-mail, be on a LAN, be a server, updating its hard drive, maintaining communications, controlling docking station resources, and whatever else system card 28 provides and facilitates. When notebook computer 10 docks (hard dock in the present embodiment—which is a physical/electrical connection) to docking station 12, there is a "dock" request when docking and an "undock" request when the physical connection between the notebook computer and docking station is broken. In side the notebook there is a video controller hanging off of the PCI bus, maybe a card bus controller, all kinds of things hanging off the PCI bus and a CPU. When the CPU gets the "dock" request, an interrupt comes in (basically an system management interrupt SMI) and says that we have a dock request, do something about it. Plug-n-play bios goes out to bridge 18 and asks "what do you have". The bridge goes out to mux 24 and asks "what are you?". Mux 24 realizes that this is a configuration cycle and asks system card 28, "what do you have?" System card 28 replies to mux 24—"display, keyboard, LAN, PCMCIA card slots, floppy disk drive, hard disk drive, cd rom drive, etc.". Thus, mux 24 has been signaled that the display, keyboard, LAN, PCMCIA card slots, floppy disk drive, hard disk drive, and cd rom drive of docking station 12 now belong to the master (notebook computer 10) that just docked. This occurs because there was a PCI configuration cycle that said "I'm taking over". So now, the reporting chain comes back to the plug-n-play BIOS and reports that we have a display, keyboard, LAN, PCMCIA card slots, floppy disk drive, hard disk drive, cd rom drive out there that may be controlled by notebook 10. Notebook 10 may selectively control docking station resource made available to it. Notebook 10 may also disable one or more internal duplicates of the offered resources. And therefore, now, when notebook 10 docks with docking station 12, the resources of system card 28 display, keyboard, LAN, PCMCIA card slots, floppy disk drive, hard disk drive, cd rom drive, these features are now controlled by notebook 10. The cpu in system card 28 in the docking station can also relinquish control over part of its own circuitry either directly or indirectly to a docked notebook. Directly means the notebook controls the circuitry. Indirectly means that the cpu on the system card controls the circuitry on behalf of the cpu in the notebook. It could also refuse to give over control over part or all of its circuitry to a cpu on a docking notebook.

When notebook 10 undocks, there is an interrupt signal (signal going from high to low in one embodiment), which is transferred to mux 24 and indicates "undocked situation". This interrupt is transferred to system card 28 where it tells the cpu on system card 28 that there in no other dock or master. The cpu on system card 28 takes over the control of the display, keyboard, LAN, PCMCIA card slots, floppy disk drive, hard disk drive, cd rom drive so that docking station 12 becomes a stand alone computer again which may be used as a stand alone computer by a user, assuming it has a display and a keyboard, or can be collecting a user's E-mail, can be on the LAN, can be the server, can manage the hard drive or what ever is on system card 28 or the rest of the docking system.

An operating system in the docking station facilitates this ability. For a simple operating system, the docking station can get by with a rom coupled to the microprocessor, that contains all the functionality that you need. The rom can be as big as needed, and as long as the system can handle the performance that the rom provides in providing code, an operating system for the docking station completely on rom is acceptable. Microsoft makes DOS on rom. It is also possible to have an operating system for the docking station that does not require rom. In such a case, the first time a notebook docks to docking station 12, the notebook downloads the code into the docking station and as long as the docking station has power, it can remember it. Alternatively, a notebook or LAN can down load a boot to the docking station. But even in these system, the docking station should have at least some rom code, maybe 10 to 20 instructions that are smart enough to bring the code from wherever else it is and it can bring across as much code as it needs. They use to call these five or six card loaders. It is microcode that when it sees power, the first thing it needs to do is to look for an IPL function. Thus, there is a fairly short piece of program that can bring code across from the LAN or from any of the other devices that are connected to it and generate enough code to do what it needs to do. With system card 28 as illustrated in FIG. 5, docking station 12 has the ability to boot its software, which means it has to get it from somewhere e.g., from a disc drive on the docking station, or rom in the docking station, or memory in the notebook, or come from the internet or from a LAN (sti, atm, sonnet, cable/modem, 10×T, 100×T, 10baseC), or from point to point communications used to create a LAN net and most of these are telephone based.

In a simple case, Windows 95 could be used as the operating system on the notebook computer while a Microsoft "MS" operating system is used in the docking station. Other operating systems that can be used on the notebook are Windows NT and IBM's OS2. An alternative operating system for the docking station might be a 32 bit operating system, from Integrated Systems, that runs set top boxes (has java interpreters), and still allows the notebook to come in and run applications. Docking station 12 also contains a power supply (not shown) that is coupled to an ac power source (such as 110v wall outlet) via an electrical cable and/or internal batteries. Peripheral devices that might be connected to docking station 12, via system card 28 illustrated in FIG. 3, include an external monitor, a keyboard, a mouse, a microphone and/or speaker, PCMCIA cards, a telephone cable coupling the RS-232 connector to a wall mounted telephone receptacle, a printer, etc.

Regarding hardware, bridge 18 may be a DEC bridge or an IBM bridge or an INTEL bridge. Other bridges may be used so long as they know how to route the data. The whole point of the bridge is: 1) to control what devices are being allocated and 2) make sure that there is a continuation of the signals on the bus strong enough to support the other devices. The interface itself can be very dumb and only take the default position of what the bridge will pass on, or the interface can be very intelligent and filter what the bridge gets and what the notebook gets on the other side. The reverse is also possible.

MUX 24 is fairly straight forward. It is really a switch with data lines that signal whether or not there is a docked notebook computer to take control over some of the docking station resources. One method pulls a pin high to provide this function. When notebook 10 hard docks to docking station 12, it will pull the pin high on the mux which indicates a docked situation. System card 28 on the other side of mux 24 reads the I/O device and signals that it is being docked. The system pulls mux 24 and lets the cpu in notebook 10 have control over the released resources in docking station 12. One way of accomplishing this is to write simple code to the cpu in system card 28 that says "if there is an input (interrupt) from the mux (which you could hook to external interrupt 1 or 2 off of the SMI interrupt on the CPU), tile codes see this and says, "read the status—docked or undocked". If docked, you turn over the devices, the CPU quits running on the PCI bus (it doesn't issue any PCI cycles) and throws the mux so that the PCI bus is being driven by the external master and not the CPU in the card. When the mux goes back, then the CPU starts driving the internal PCI bus. Thus, in a docked situation with a notebook, notebook may be given partial or full control over the resources of system card 28.

Regarding software, as mentioned previously, an operating system in the docking station is preferred but not mandatory. In the X86 architecture, with the exception of running in T the things that would normally be a BIOS function could just as easily be a HAL (hardware abstraction or architectural layer). It is really cpu or system independent. The concept is that there is a plug-n-play function in all the notebooks or portable devices that get docked and in the docking station. There has to be some intelligence in the docking station. You need software that will boot the system, that understands BIOS (basic input/output systems) and can initialize the systems both in the notebook and in the docking station. Also need plug-n-play BIOS, conforming to the industry standards, that understands docking, undocking, reconfiguration, reenumeration functions, and that has the ability to go out and look at the hardware and report back what hardware is there or not there. Also required is some software on top of the plug-n-play BIOS both in front and in back of it that is called filtering. Filtering controls what devices the plug-n-play BIOS sees and what devices the plug-n-play is allowed to pass on. The filtering can occur in the interface, in the notebook, in the docking station or in all three. In other words, an interface might have a microprocessor that is intelligent about what devices it is passing back and forth to the plug-n-play. Software facilitates this function.

An operating system and third party applications to run are also required. A system designer and a user have to make some decisions as to what kind of software is to be included in the applications—for instance, what is the use of docking to a user if the user is not going to do anything with it? A user may want to take advantage of the hard drive, the net, e-mail, all the general third party features that you find in a desktop environment or in a mobile environment—the software is available and needs to be there. Power management software would be nice, but not required. Software that is intelligent about user configurations and that lets the user have some choice in how his system is configured would be nice. From a setup point of view or a dynamic real time point of view, the user should be able to change the way that he wants to do business—in other words, the speed at which he wants the cpu to run, selecting the unit he wants to be the host or master and the slave. Security software would be a nice addition to the system. One form of security software recognizes security in terms of serial numbers. Who am I? Are we going to let everybody dock to each docking station? Probably not. A user probably wants some kind of security system that says "this is who I am and this is who is allowed to have access to the docking station". Security does not have to be through serial numbers and I.D., however. Security can also be hardware wise, RF, or even voice activated through voice recognition capability. There are many ways to implement security—an unfortunate necessity today in today's business environment.

Docking System Software Overview

The docking system is designed to accommodate combinations of at least the following software:

Windows 95, Windows NT, Windows for Workgroups Add-On, Version 3.11 (for user with Windows 3.1) or OS2. The selected operating system should include features particularly useful for the docking environment, such as networking for both desktop and portable operation. Other desirable features include RAS/PPP server and access to remove printer and files.

BatteryPro and Productivity Software—a collection of TI Utilities including:

BatteryPro Power Saving Utility

SETDOCK—A menu-driven program that allows you to configure a desktop environment. Run this utility for setting up a basic system or prior to running one of the other configuration programs like EZ_SCSI or PCM Plus.

Super Shutdown—a utility that automatically saves all open files, closes all open applications and undocks the notebook.

Collection of other utilities (ALARM, CURSON, GETSTAT, etc.).

TI VGA Utilities—Video installation program with various video device drivers supported by enhanced VGA display modes.

Intel Plug-N-Play Configuration Manager—software that provides for easy configuration of ISA Option Cards.

PCMCIA PhoenixCARD Manager Plus—the supporting software required to install PCMCIA option cards on the docking system.

Adaptec EZ-SCSI for DOS/Windows—the supporting software required to install SCSI devices onto the docking system.

File Synchronization—examples include MS Briefcase or PC anywhere—for keeping portable files in synchronization, updating mail, address book and calendar over the phone.

Encryption and compression software—an example is PC anywhere—for transferring private data over the phone.

Network modem—examples include Stomper, PC Anywhere, Modem Assist Plus, WINport, SAPS—for accessing a phone from the notebook while docked, accessing a phone from the notebook via RF, Internet, or Ethernet link and for sharing a phone line with several users.

Remote control application—examples include PC Anywhere, and Reachout—for accessing dock applications via phone or network.

Voicemail—an example includes Office F/X—to provide an answering machine and/or simple voice response.

E-mail—examples include MS Exchange, Eudora—for sending and receiving e-mail.

Fax—an example includes MS FAX—to send and receive FAXs.

Script Agent—an example includes MS Agent—for automating tasks like dial-up to various services, providing unattended operation like call up AOL and download mail, encapsulate voicemail into e-mail system foe easier access, automatically synchronize file with notebook when attached locally.

E-mail postoffice—examples include POP3 server, and MS Postoffice—to serve mail to office work group, both local and remote.

PIM/Calendar—an example includes MS Schedule+—to keep track of contacts, phone numbers, meetings, to-do lists.

Telephone applications—an example includes MS Sounder?—to auto dial, conference call, forward incoming calls, music on hold, call logging, caller ID display, etc., integrated with notebook and PIM displays.

TCP/IP Router—to provide access to network from docked notebooks.

Loading and operating information for some of the previously listed software is provided in the following reference manuals:

Windows 95, Windows NT and OS2—following instructions in User's Manuals.

Windows for Workgroups User's Manual, P/N 9791790-0001

PCMCIA PhoenixCARD Manager Plus User's Manual, P/N 9791792-0001

Adaptec EZ-SCSI for DOS/Windows User's Manual P/N 978866-0001

TravelMate—Series Notebook Computer User's Reference Manual contains information regarding the VGA utilities.

Intel Plug-N-Play User's Manual, TI Part No. 9791791-0001

Consult User's Manuals for MS Briefcase, PC anywhere, Stomper, Modem Assist Plus, WINport, SAPS, Reachout, Office F/X, MS Exchange, Eudora, MS FAX, MS Agent, POP3 server, MS Postoffice, MS Schedule+, MS Sounder, etc., and other commercially available programs.

TI Utilities (current version)—following instructions received from Texas Instruments.

Current versions of DOCK, SUPER SHUTDOWN, SETDOCK, TI SYSTEM AND BATTFRY PRO and their loading and operating instructions are available from Texas Instruments. The code, loading instructions and some use instructions (as of Nov. 8, 1994), are also in U.S. patent application Ser. No. 08/336,032, herein incorporated by reference. Dock—pages 115–138. DOCK is the DOS version of the docking station control functions. SUPER SHUTDOWN—pages 139–194. SUPER SHUTDOWN is an automatic shutdown configuration (also available on TI's BatteryPro and Productivity Software diskette). This utility allows the docking system to exit Windows faster than the standard Windows exit procedure. The utility provides a selection of user-specified shutdown features that customizes the way a computer shuts down and reboots. SETDOCK—pages 195–268. SETDOCK sets up the I/O ports on the docking station which customizes the docking system hardware configuration for maximum performance. TISYSTEM—pages 269–316. TISYSTEM provides a library of functions. BATTERY PRO—pages 317–396. BATTERY PRO power saving utility provides control of energy usage within the portable computer and better handshaking between the portable computer and the docking station.

SOFTWARE REQUIRED FOR MINIMUM SYSTEM

For a minimum system comprising a docking station, a portable computer (preferably having one or more of an external mouse, a keyboard, an external monitor, and having minimal functionality), there has to be some intelligence in the docking station. A minimal system requires an operating system (at least for the notebook and for the docking station unless the docking station incorporates a BIOS function in HAL (hardware abstraction or architectural layer) and third party applications to run. Software is required that will boot the system, that understands BIOS (basic input/output systems) and can initialize the systems both in the notebook and in the docking station. Also need plug-n-play BIOS, conforming to the industry standards, that understands docking, undocking, reconfiguration, reenumeration functions, and that has the ability to go out and look at the hardware and report back what hardware is there or not there. Also required is some software on top of the plug-n-play BIOS both in front and in back of it for filtering. Filtering controls what devices the plug-n-play BIOS sees and what devices the plug-n-play is allowed to pass on. The filtering can occur in either the interface, in the notebook or in the docking station or in all three. In other words, an interface might have a microprocessor that is intelligent about what devices it is passing back and forth to the plug-n-play. Software is required that facilitates this function.

The power of the present docking system concept is expressed in a docking situation between a notebook computer (usually the master) and a docking station (usually the slave), wherein a signal is sent out to the system card in the docking station, which throws the mux, which now makes resources on the system card into PCI devices of the notebook computer. As a result, the docking station moves from being a stand alone computer having resources to a slave or docked device that turns over docking station resources to the control of a cpu in a docked notebook computer. When the notebook leaves, then the docking station goes back to being a stand alone computer running the things that it needs to do. The system can also be reversed so that the notebook becomes a PCI device to the docking station when it docks. This means that when a dock request to the intelligent docking station comes out and does a plug-n-play request to the notebook, the notebook reports "I've got the following processes, such as wireless com. disc drive, etc". Now, it is the docking station that sucks the information of the notebook rather than the converse. In this situation the notebook might say to the docking station "I don't have a keyboard and I don't have a monitor", which means that the user can still use the notebook keyboard but the hard drive and some other thing might end up under the control of the docking station. But in reality, the notebook will end looking like a big disk and make a disk request across the PCI device. The disk request being in the form of a new PCI notation or identifier and then suck what ever e-mail or files that are off the notebook into the docking station, manipulate the information and then decide whether or not to ship it back. Who the master is strictly system independent.

Figure 6:
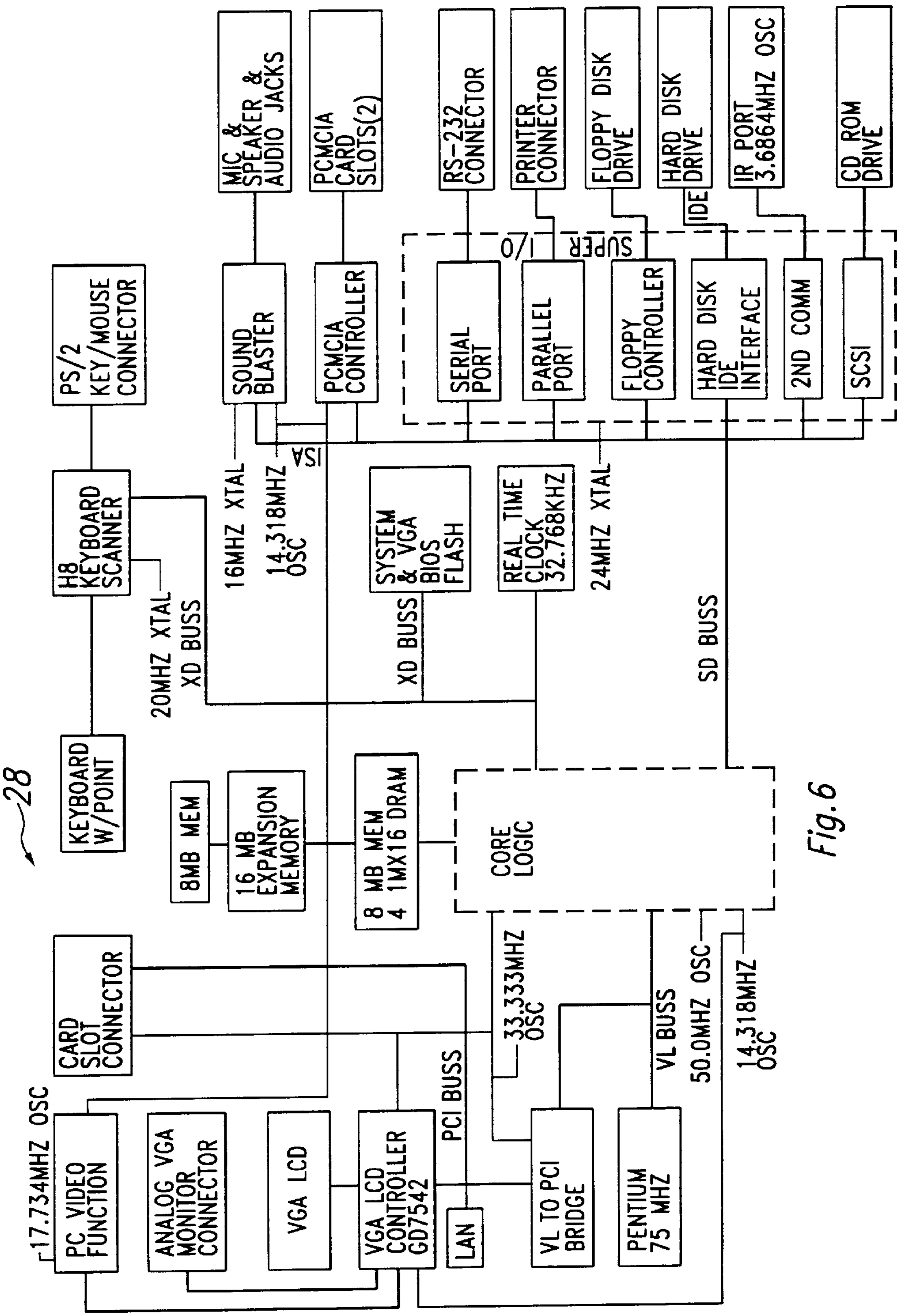
Figure 133:
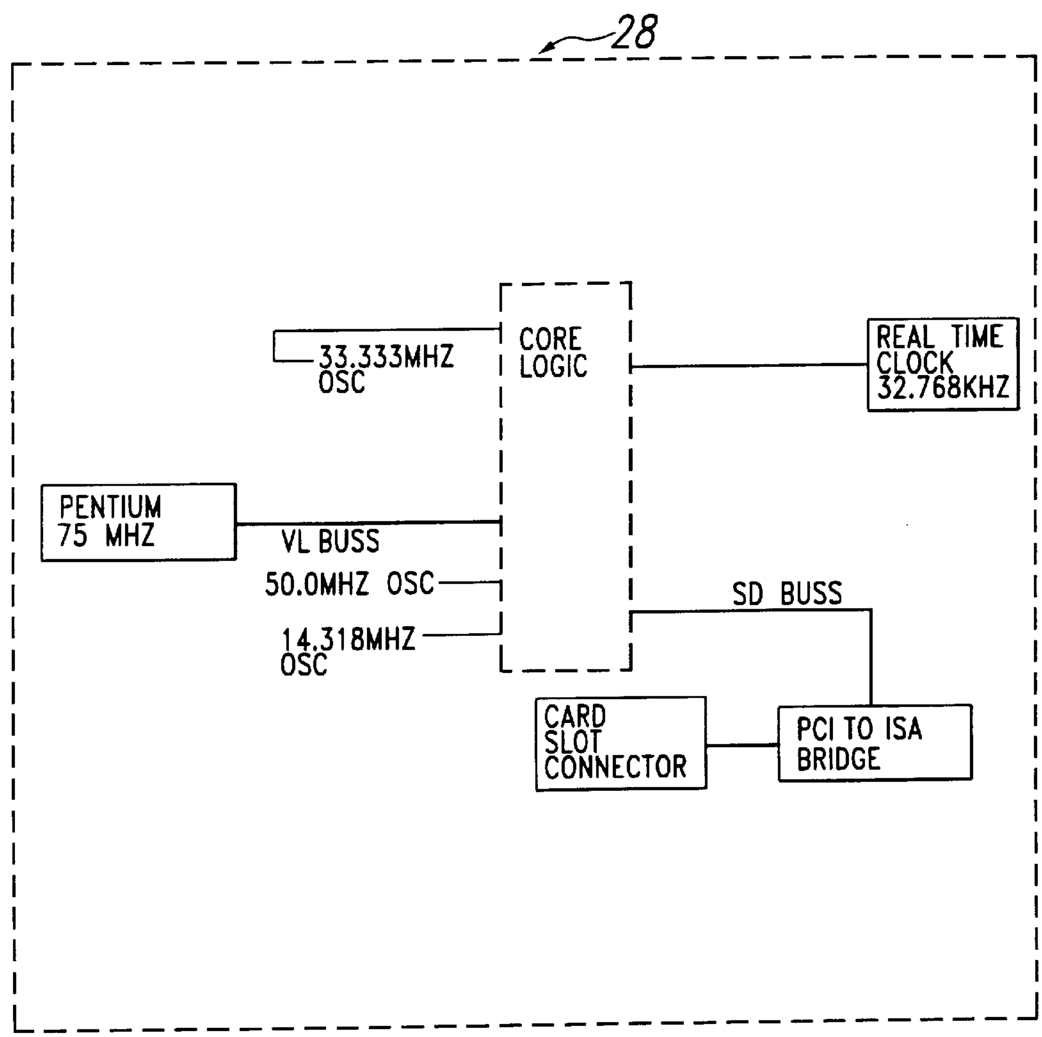

And while docking station 12 has been described utilizing the system card 28 illustrated in FIG. 5, other system cards may be used in lieu of the system card illustrated in FIG. 5. FIGS. 6–133 are block diagrams of alternative system cards 28 that can be used in docking station 12.

The system card 28 illustrated in FIG. 6 also provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a PCMCIA controller coupling PCMCIA card slots to the ISA bus, a serial port coupling an RS-232 connector to the ISA bus, a parallel port coupling a printer connector to the ISA bus, a floppy controller coupling a floppy disk drive to the ISA bus, a hard disk interface coupling a hard disk drive to the ISA bus, a SCSI device coupling a CD rom drive to the ISA bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 7:
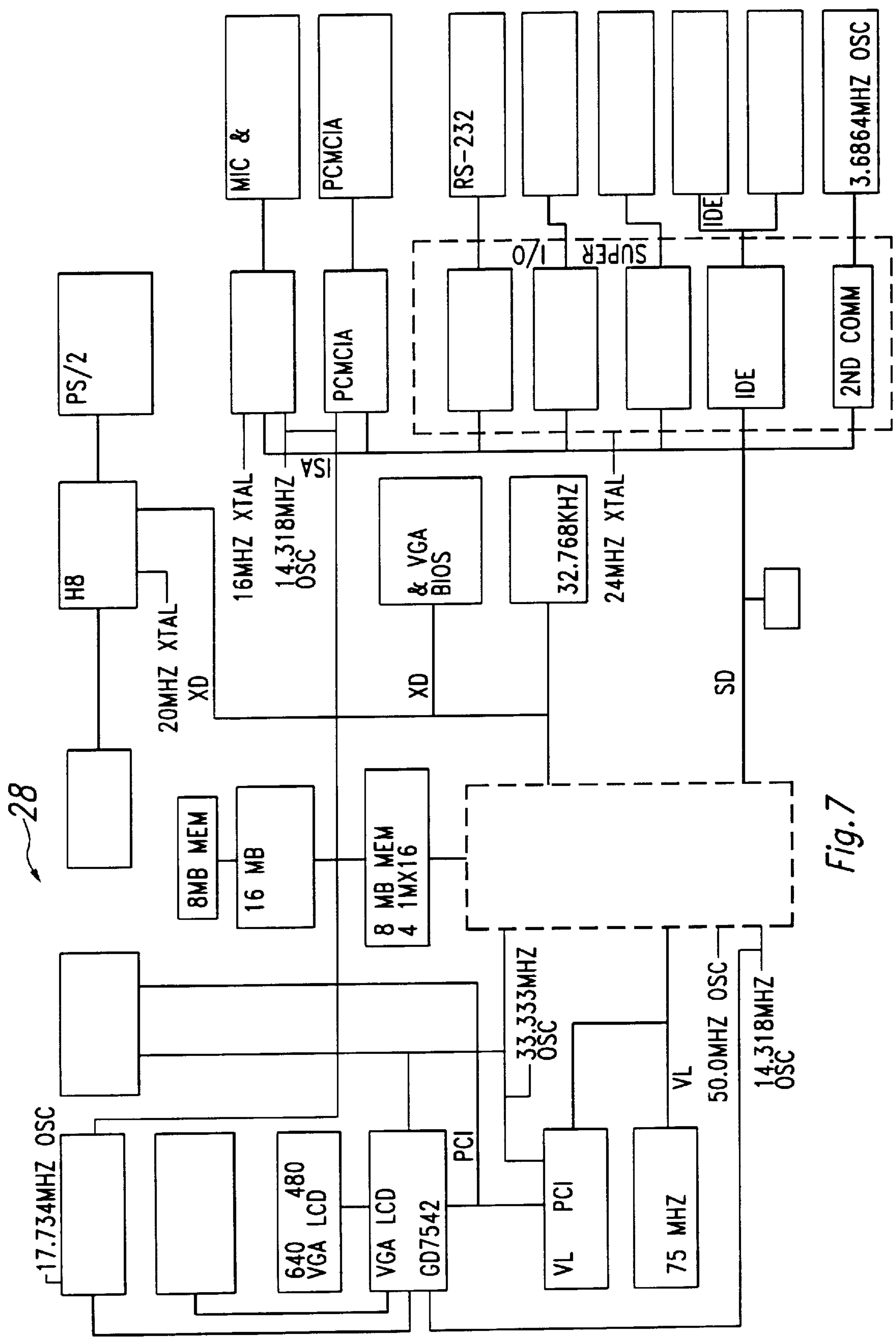

System card 28 illustrated in FIG. 7 similarly provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA bus (SD bus), an XD bus coupling the keyboard scanner, system & VGA bios flash and real time clock to core logic, an ISA bus, a sound blaster coupling microphone and speaker jacks to the ISA bus, a PCMCIA controller coupling PCMCIA card slots to the ISA bus, a serial port coupling an RS-232 connector to the ISA bus, a parallel port coupling a printer connector to the ISA bus, a floppy controller coupling a floppy disk drive to the ISA bus, a hard disk interface coupling a hard disk drive and a CD rom drive to the ISA bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 8:
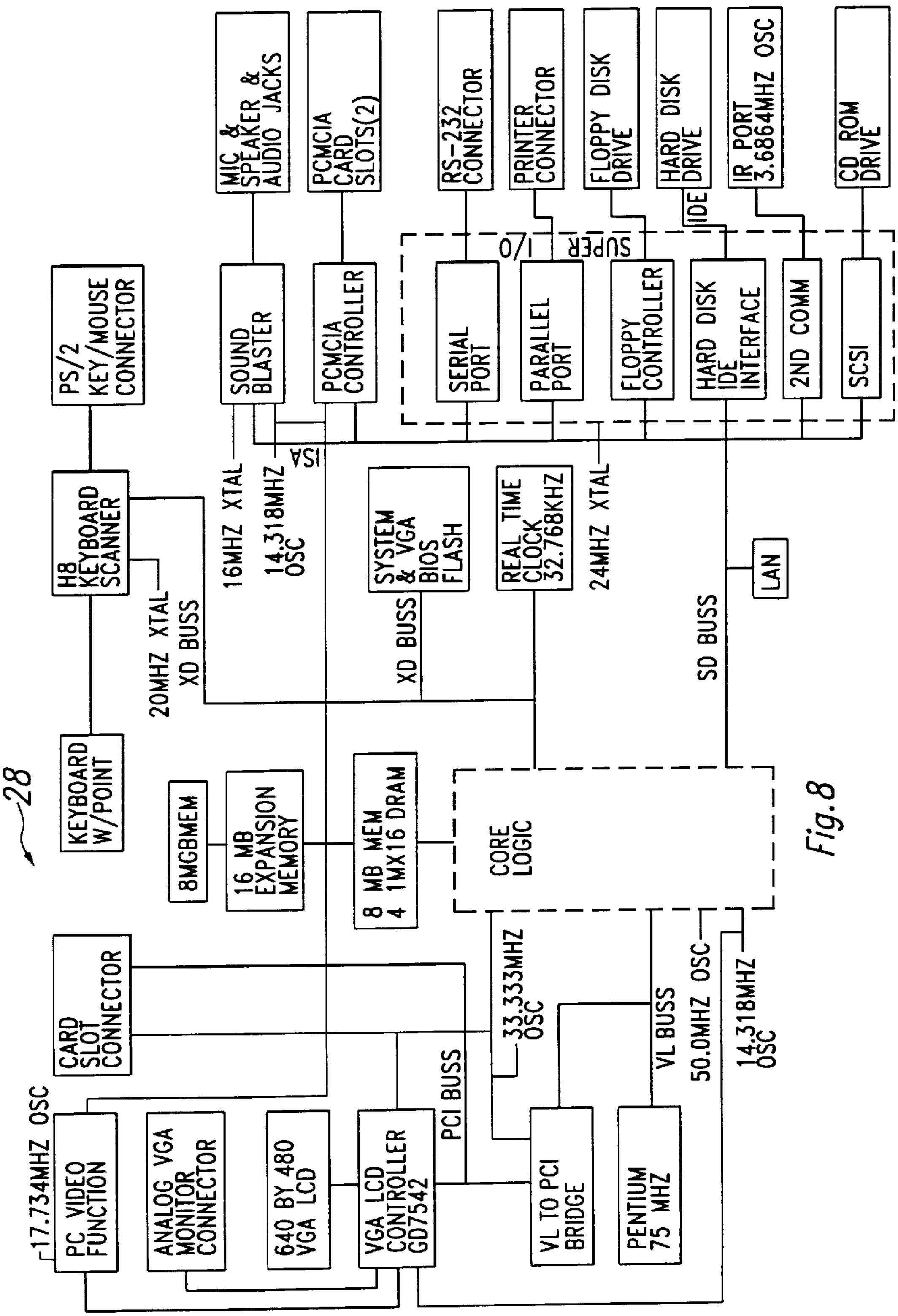

The system card 28 illustrated in FIG. 8 also provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA bus (SD bus), an XD bus coupling the keyboard scanner, system & VGA bios flash and real time clock to core logic, an ISA bus, a sound blaster coupling microphone and speaker jacks to the ISA bus, a PCMCIA controller coupling PCMCIA card slots to the ISA bus, a serial port coupling an RS-232 connector to the ISA bus, a parallel port coupling a printer connector to the ISA bus, a floppy controller coupling a floppy disk drive to the ISA bus, a hard disk interface coupling a hard disk drive to the ISA bus, an SCSI device coupling a CD rom drive to the ISA bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 9:
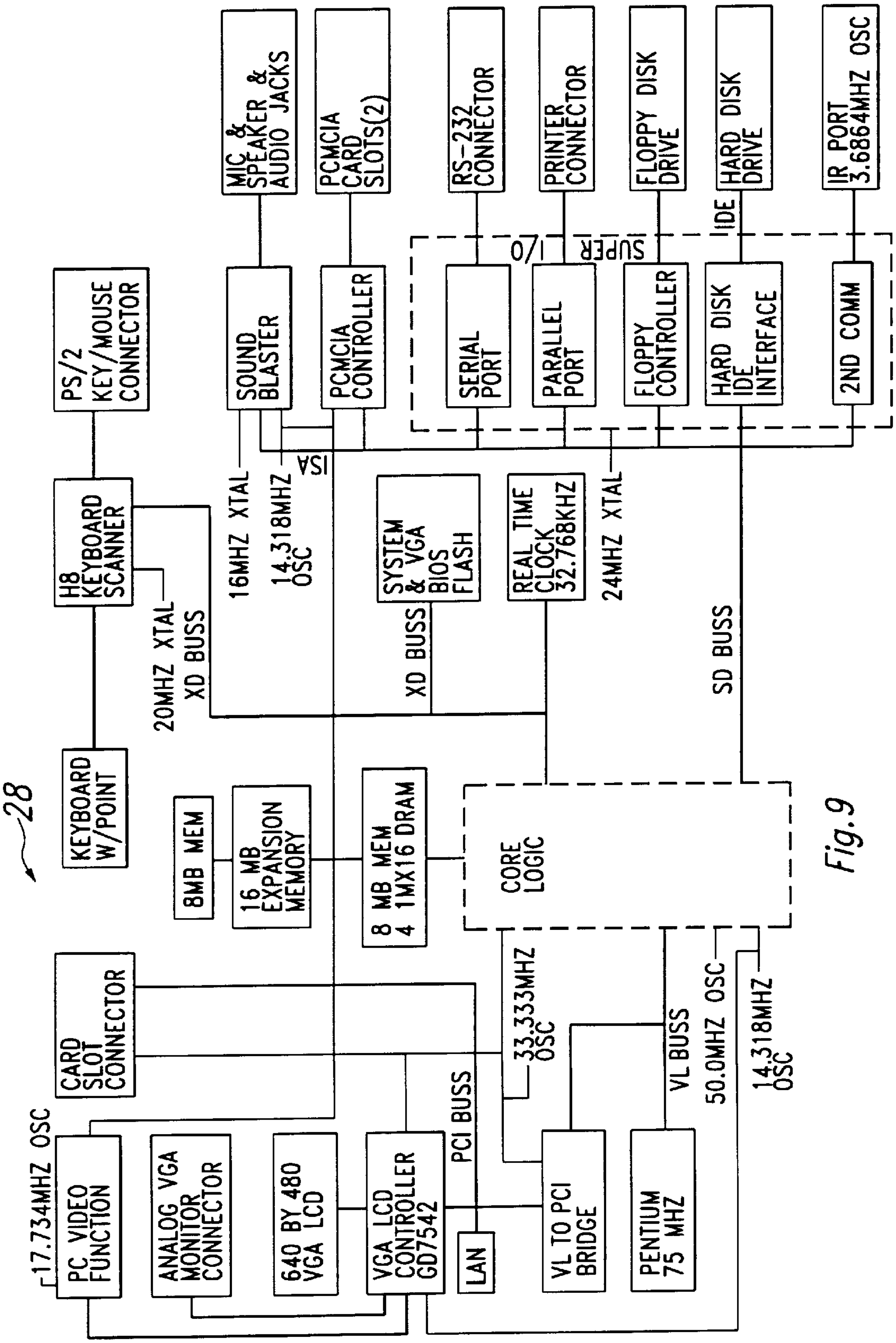

System card 28 illustrated in FIG. 9 also provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a PCMCIA controller coupling PCMCIA card slots to the ISA bus, a serial port coupling an RS-232 connector to the ISA bus, a parallel port coupling a printer connector to the ISA bus, a floppy controller coupling a floppy disk drive to the ISA bus, a hard disk interface coupling a hard disk drive to the ISA bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 10:
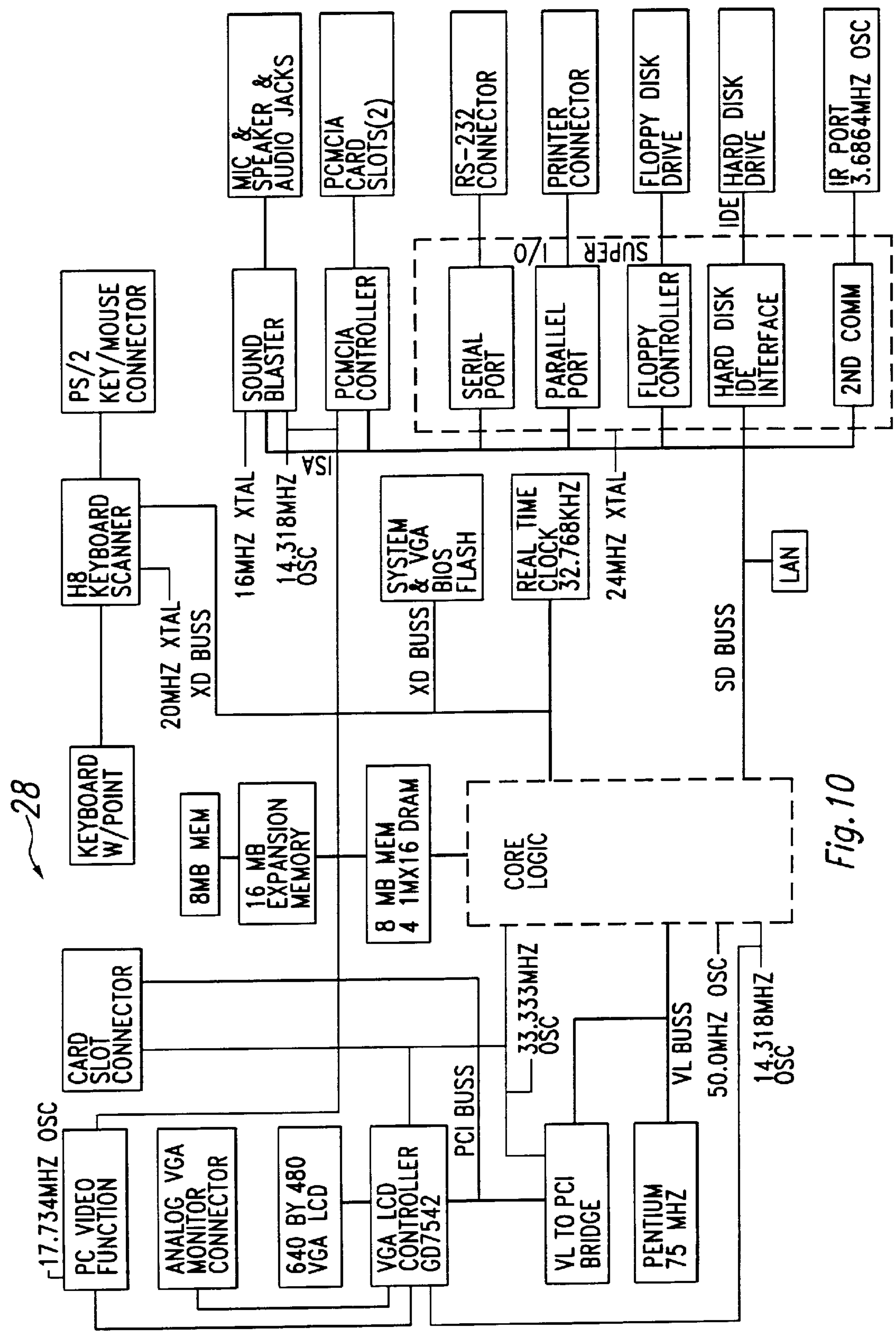

The system card 28 illustrated in FIG. 10 similarly provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA bus (SD bus), an XD bus coupling the keyboard scanner, system & VGA bios flash and real time clock to core logic, an ISA bus, a sound blaster coupling microphone and speaker jacks to the ISA bus, a PCMCIA controller coupling PCMCIA card slots to the ISA bus, a serial port coupling an RS-232 connector to the ISA bus, a parallel port coupling a printer connector to the ISA bus, a floppy controller coupling a floppy disk drive to the ISA bus, a hard disk interface coupling a hard disk drive to the ISA bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 11:
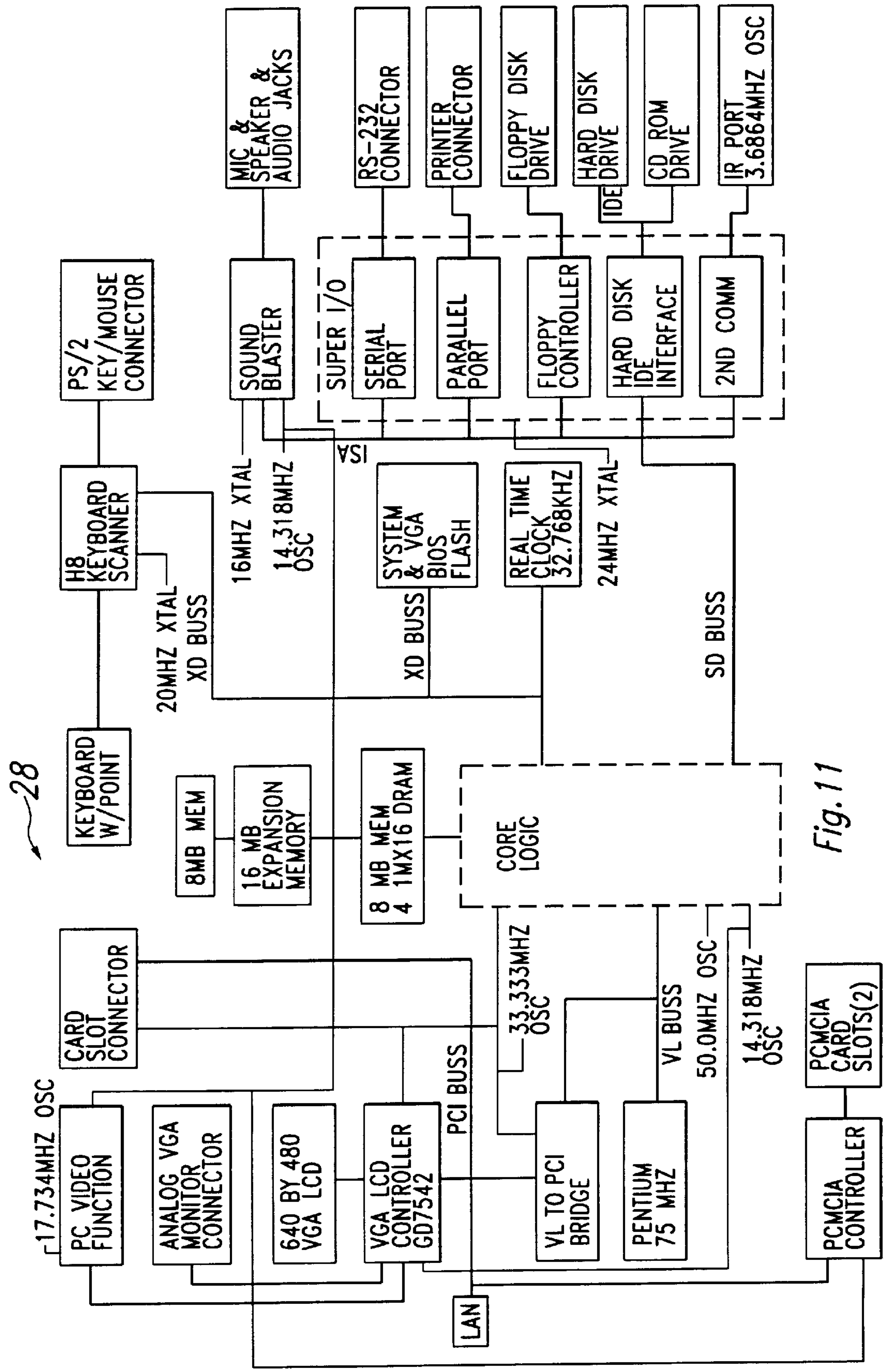

System card 28 illustrated in FIG. 11 provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a PCMCIA controller coupling PCMCIA card slots to the PCI bus, a serial port coupling an RS-232 connector to the ISA bus, a parallel port coupling a printer connector to the ISA bus, a floppy controller coupling a floppy disk drive to the ISA bus, a hard disk interface coupling a hard disk drive and a CD rom drive coupled to the ISA bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 12:
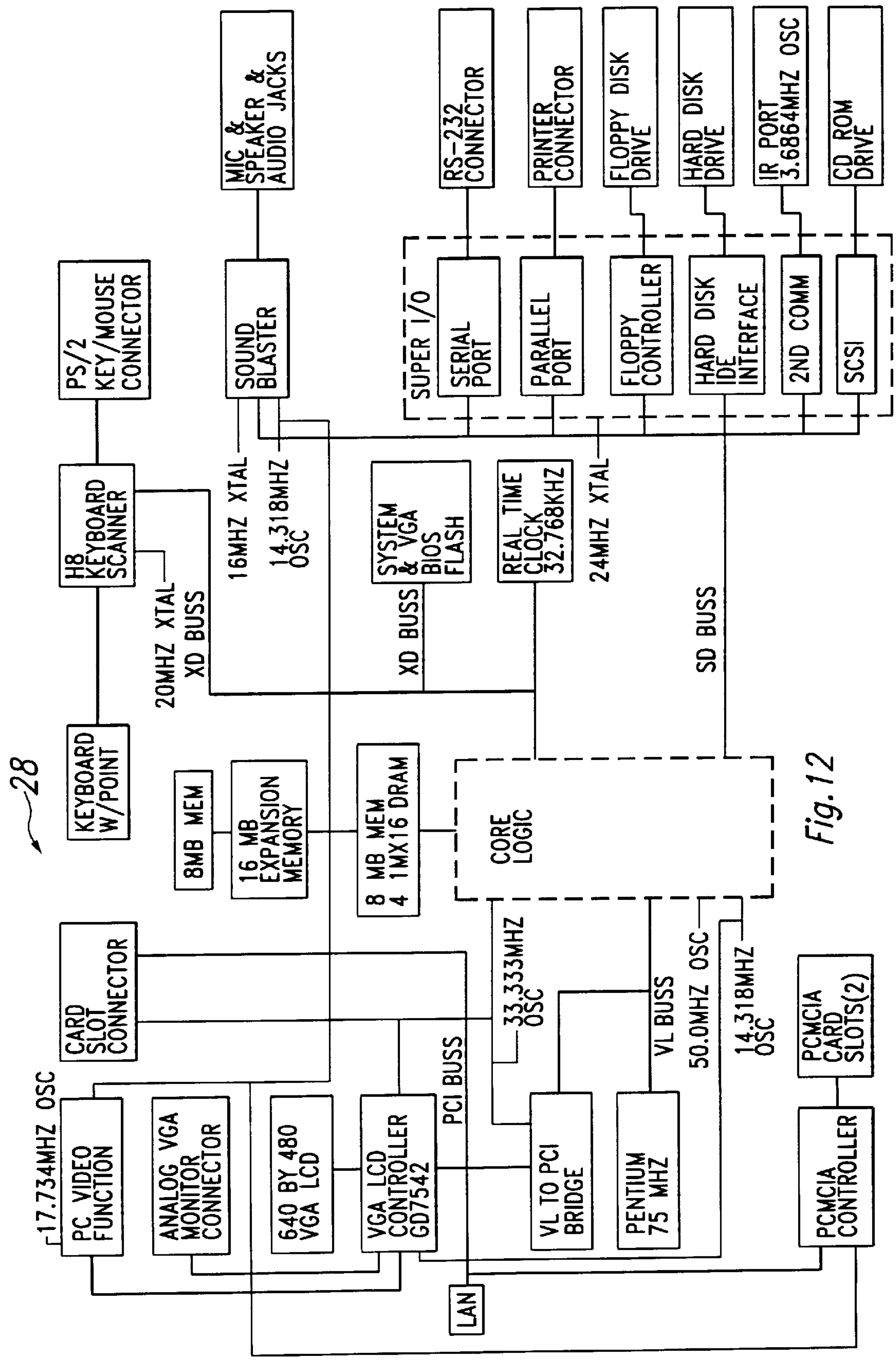

The system card 28 illustrated in FIG. 12 also provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a PCMCIA controller coupling PCMCIA card slots to the PCI bus, a serial port coupling an RS-232 connector to the ISA bus, a parallel port coupling a printer connector to the ISA bus, a floppy controller coupling a floppy disk drive to the ISA bus, a hard disk interface coupling a hard disk drive to the ISA bus, an SCSI device coupling a CD rom drive to the ISA bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 13:
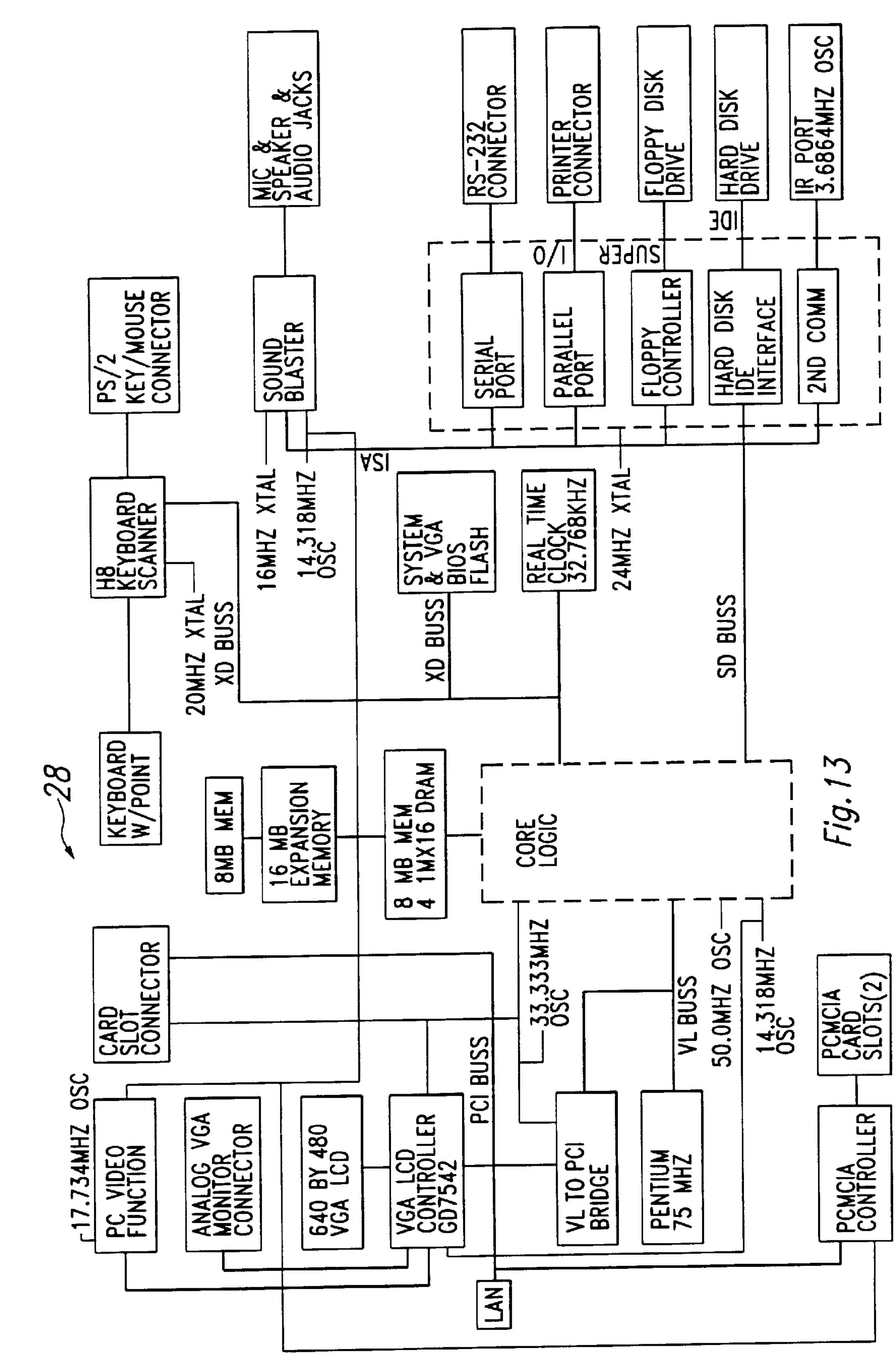

System card 28 illustrated in FIG. 13 similarly provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a PCMCIA controller coupling PCMCIA card slots to the PCI bus, a serial port coupling an RS-232 connector to the ISA bus, a parallel port coupling a printer connector to the ISA bus, a floppy controller coupling a floppy disk drive to the ISA bus, a hard disk interface coupling a hard disk drive to the ISA bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 14:
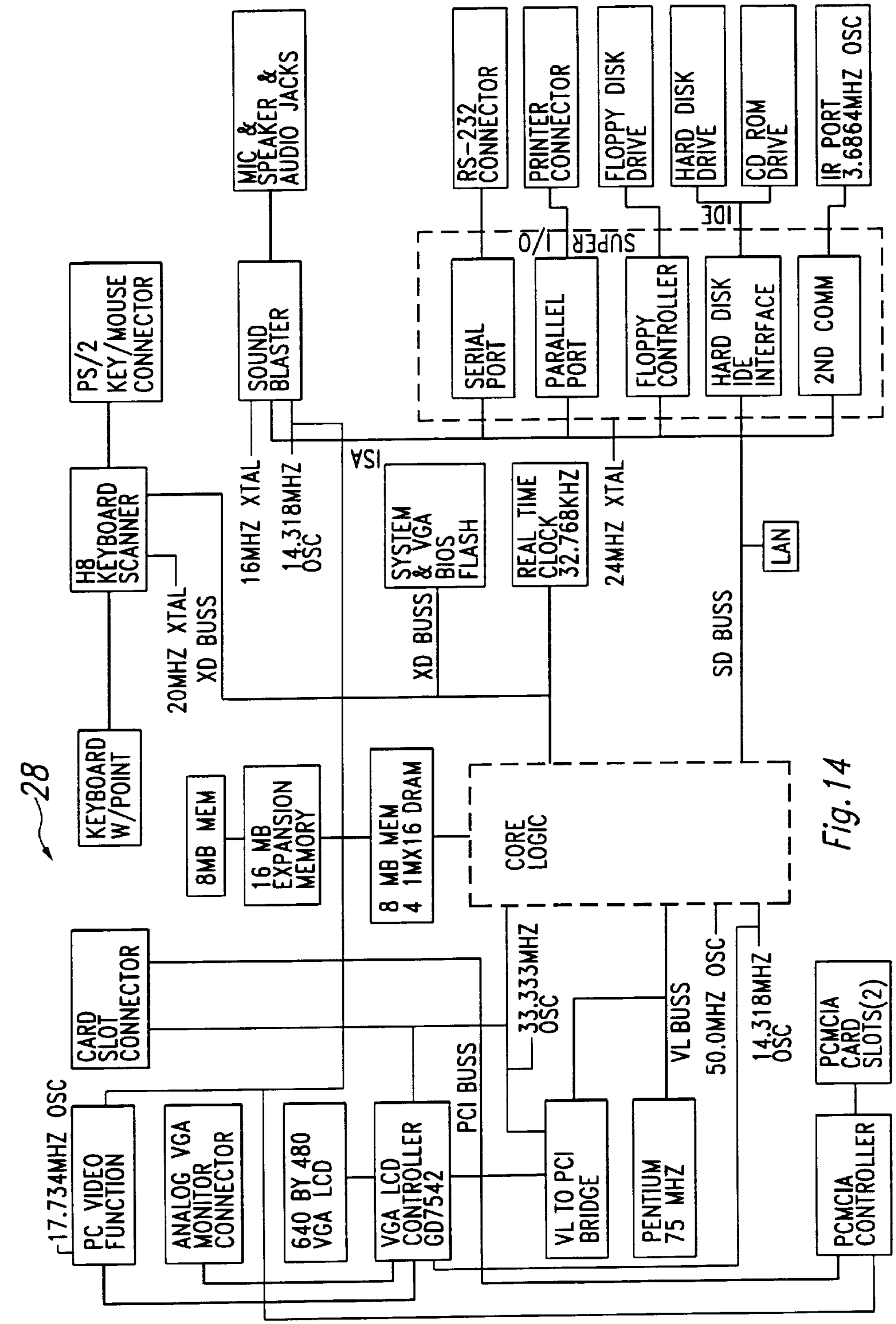

The system card 28 illustrated in FIG. 14 provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA (SD bus), an XD bus coupling the keyboard scanner, system & VGA bios flash and real time clock to core logic, a sound blaster coupling microphone and speaker jacks to the ISA bus, a PCMCIA controller coupling PCMCIA card slots to the PCI bus, a serial port coupling an RS-232 connector to the ISA bus, a parallel port coupling a printer connector to the ISA bus, a floppy controller coupling a floppy disk drive to the ISA bus, a hard disk interface coupling a hard disk drive and a CD rom drive to the ISA bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 15:
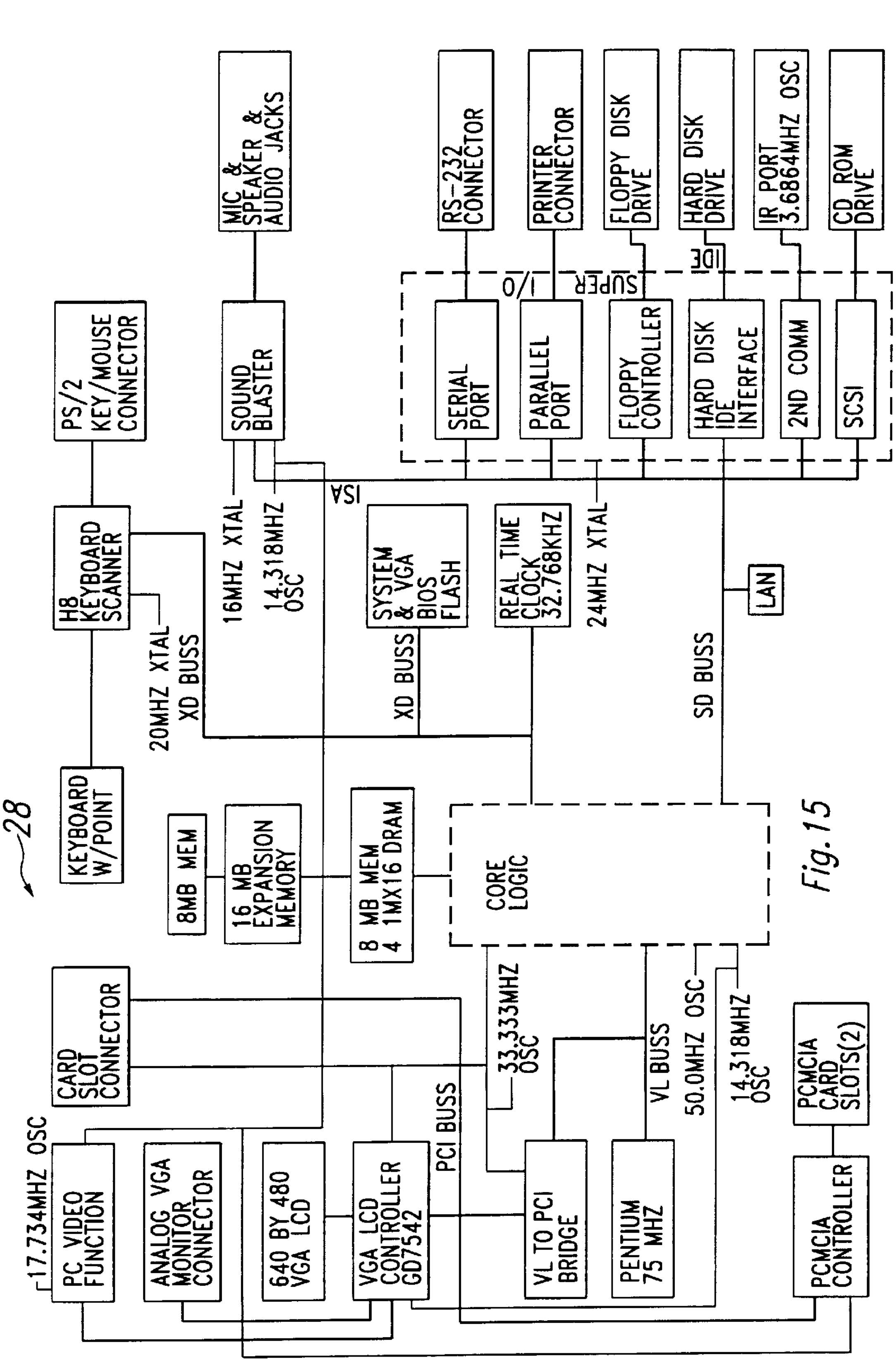

System card 28 illustrated in FIG. 15 also provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA bus (SD bus), an XD bus coupling the keyboard scanner, system & VGA bios flash and real time clock to core logic, a sound blaster coupling microphone and speaker jacks to the ISA bus, a PCMCIA controller coupling PCMCIA card slots to the PCI bus, a serial port coupling an RS-232 connector to the ISA bus, a parallel port coupling a printer connector to the ISA bus, a floppy controller coupling a floppy disk drive to the ISA bus, a hard disk interface coupling a hard disk drive to the ISA bus, an SCSI device coupling a CD rom drive to the ISA bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 16:
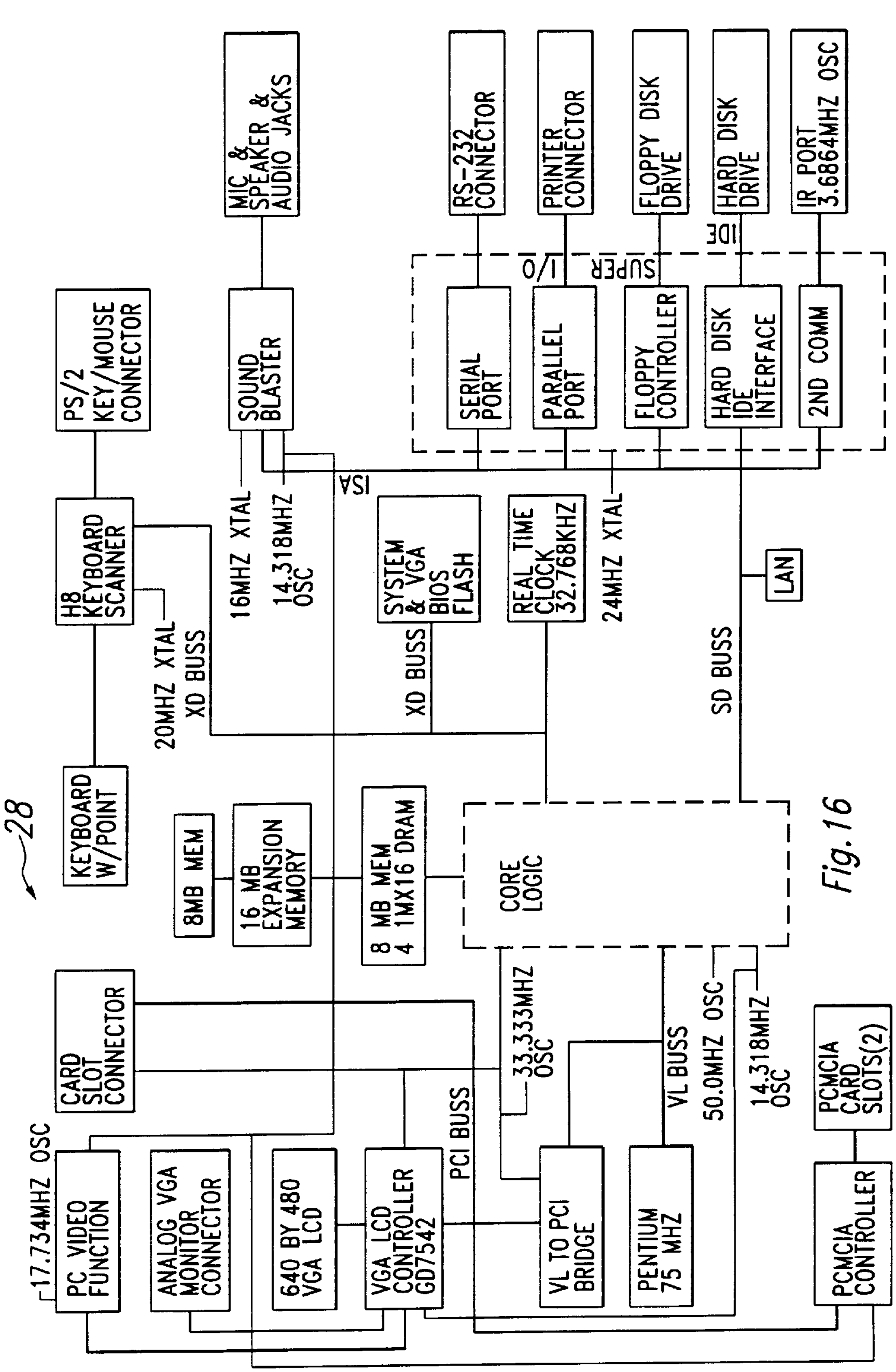

The system card 28 illustrated in FIG. 16 similarly provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA bus (SD bus), an XD bus coupling the keyboard scanner, system & VGA bios flash and real time clock to core logic, a sound blaster coupling microphone and speaker jacks to the ISA bus, a PCMCIA controller coupling PCMCIA card slots to the PCI bus, a serial port coupling an RS-232 connector to the ISA bus, a parallel port coupling a printer connector to the ISA bus, a floppy controller coupling a floppy disk drive to the ISA bus, a hard disk interface coupling a hard disk drive to the ISA bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 17:
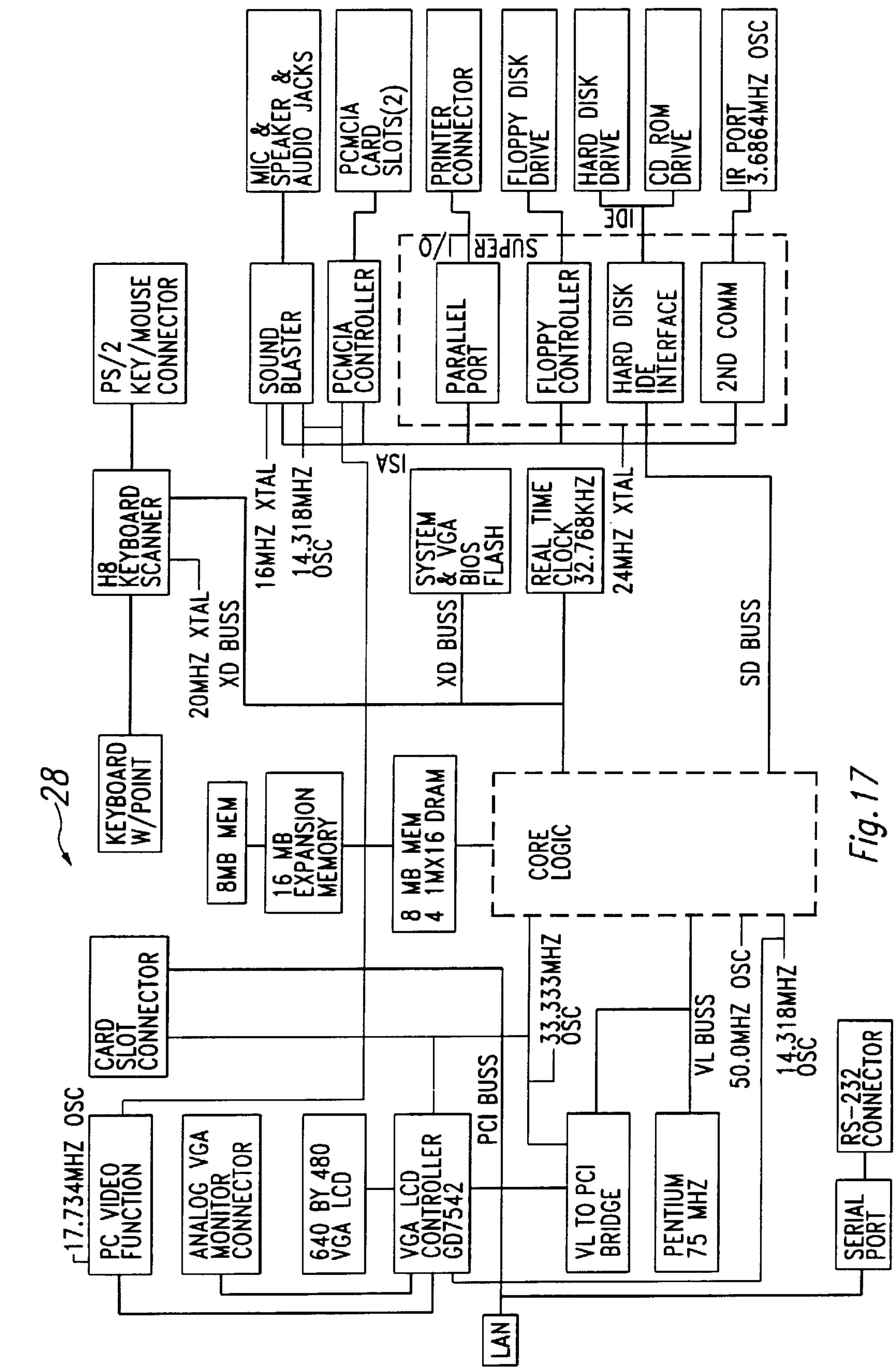

System card 28 illustrated in FIG. 17 provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a PCMCIA controller coupling PCMCIA card slots to the ISA bus, a serial port coupling an RS-232 connector to the PCI bus, a parallel port coupling a printer connector to the ISA bus, a floppy controller coupling a floppy disk drive to the ISA bus, a hard disk interface coupling a hard disk drive and a CD rom drive to the ISA bus, a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 18:
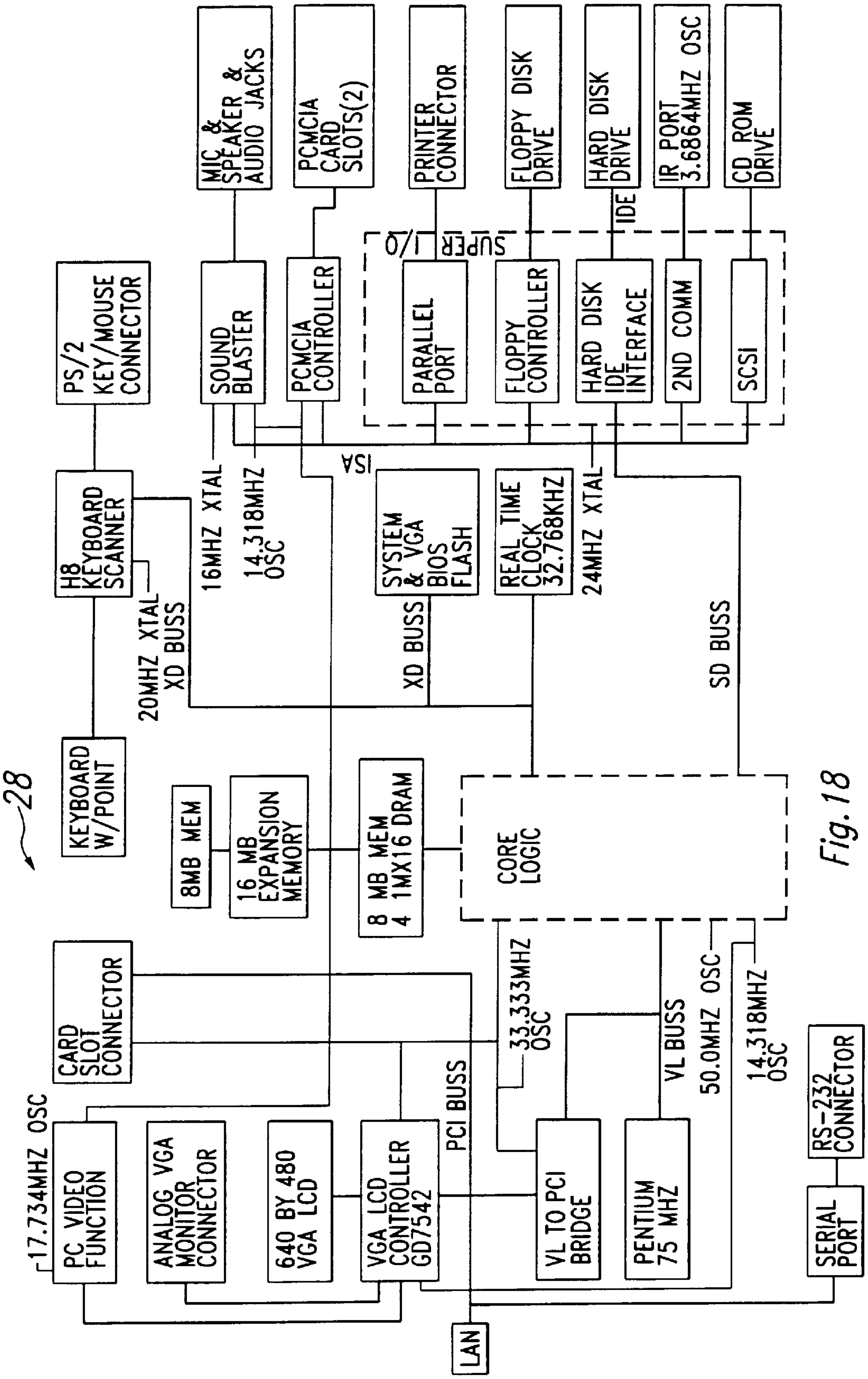

The system card 28 illustrated in FIG. 18 provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a PCMCIA controller coupling PCMCIA card slots to the ISA bus, a serial port coupling an RS-232 connector to the PCI bus, a parallel port coupling a printer connector to the ISA bus, a floppy controller coupling a floppy disk drive to the ISA bus, a hard disk interface coupling a hard disk drive to the ISA bus, an SCSI device coupling a CD rom drive to the ISA bus, a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 19:
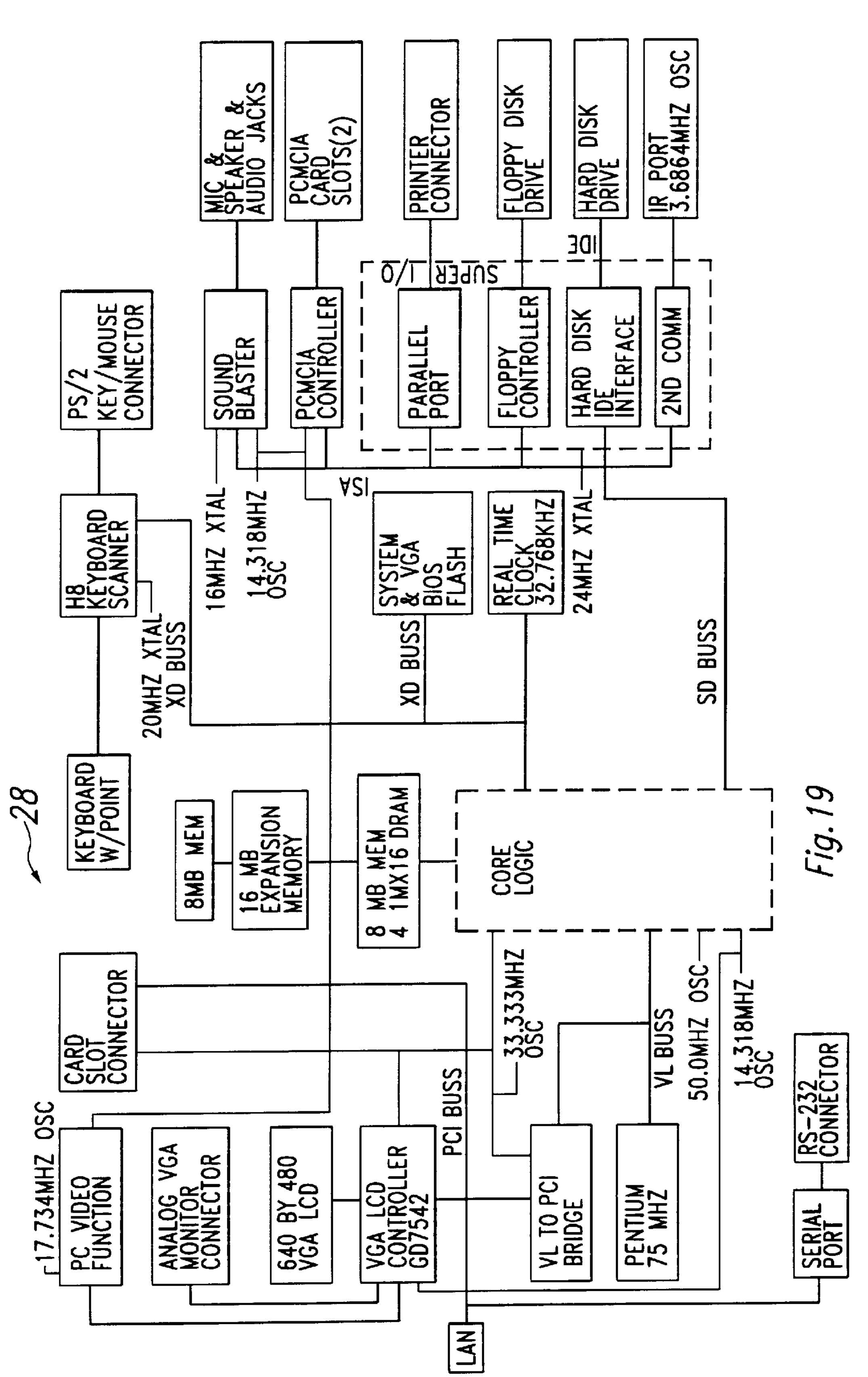

System card 28 illustrated in. FIG. 19 also provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a PCMCIA controller coupling PCMCIA card slots to the ISA bus, a serial port coupling an RS-232 connector to the PCI bus, a parallel port coupling a printer connector to the ISA bus, a floppy controller coupling a floppy disk drive to the ISA bus, a hard disk interface coupling a hard disk drive to the ISA bus, a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 20:
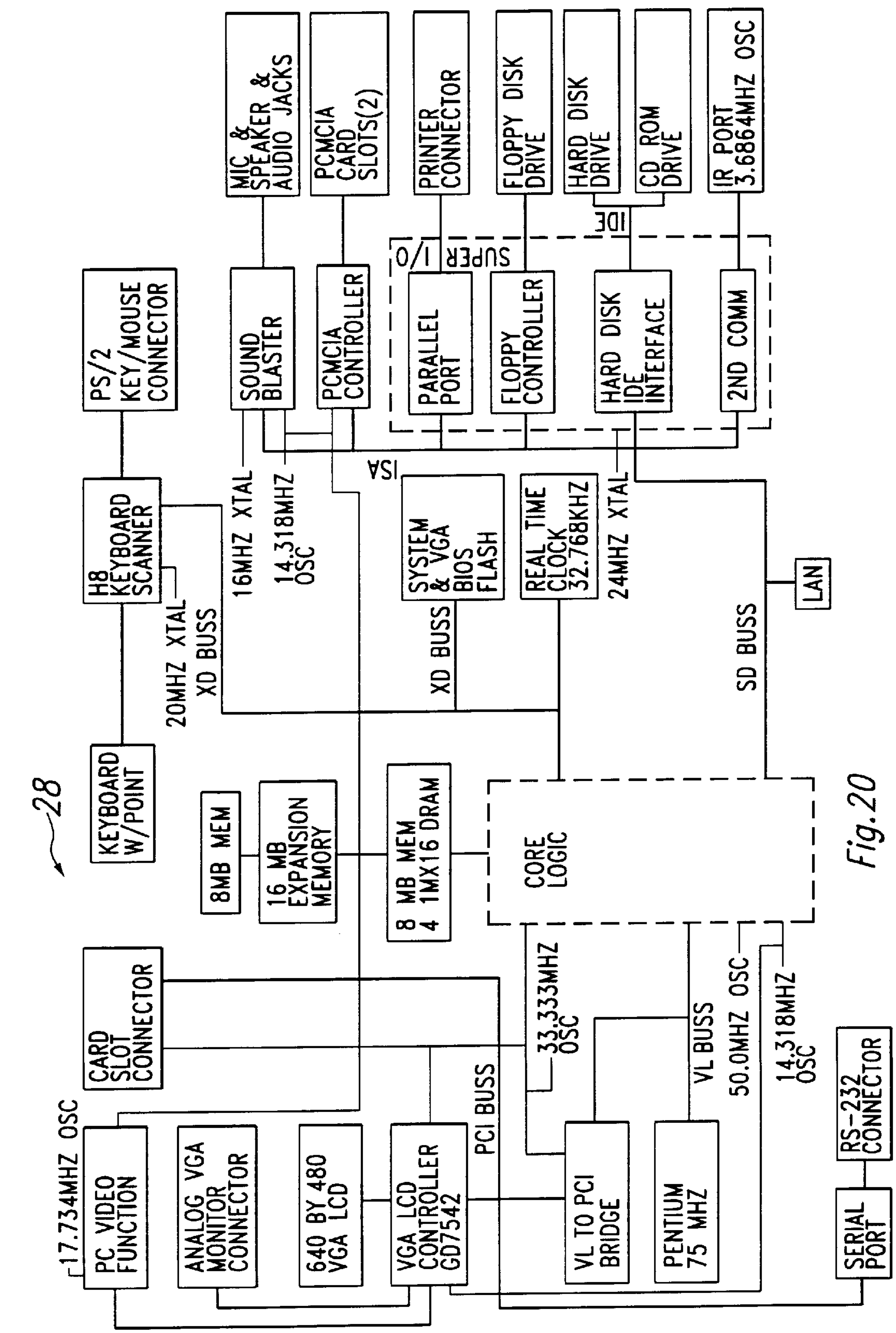

The system card 28 illustrated in FIG. 20 similarly provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA bus (SD bus), an XD bus coupling the keyboard scanner, system & VGA bios flash and real time clock to core logic, a sound blaster coupling microphone and speaker jacks to the ISA bus, a PCMCIA controller coupling PCMCIA card slots to the ISA bus, a serial port coupling an RS-232 connector to the PCI bus, a parallel port coupling a printer connector to the ISA bus, a floppy controller coupling a floppy disk drive to the ISA bus, a hard disk interface coupling a hard disk drive and a CD rom drive to the ISA bus, a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 21:
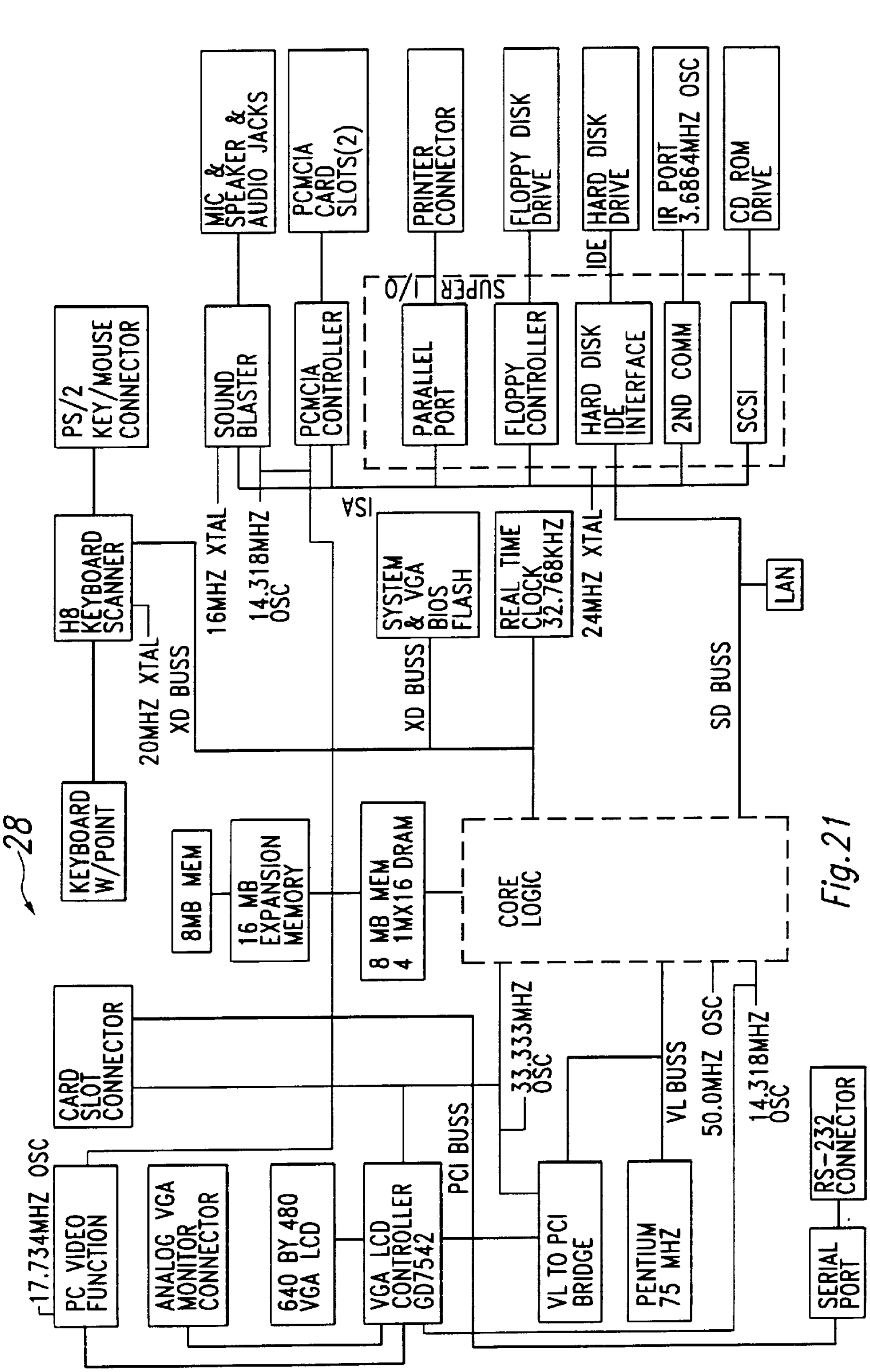

System card 28 illustrated in FIG. 21 provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA bus (SD bus), an XD bus coupling the keyboard scanner, system & VGA bios flash and real time clock to core logic, a sound blaster coupling microphone and speaker jacks to the ISA bus, a PCMCIA controller coupling PCMCIA card slots to the ISA bus, a serial port coupling an RS-232 connector to the PCI bus, a parallel port coupling a printer connector to the ISA bus, a floppy controller coupling a floppy disk drive to the ISA bus, a hard disk interface coupling a hard disk drive to the ISA bus, an SCSI device coupling a CD rom to the ISA bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 22:
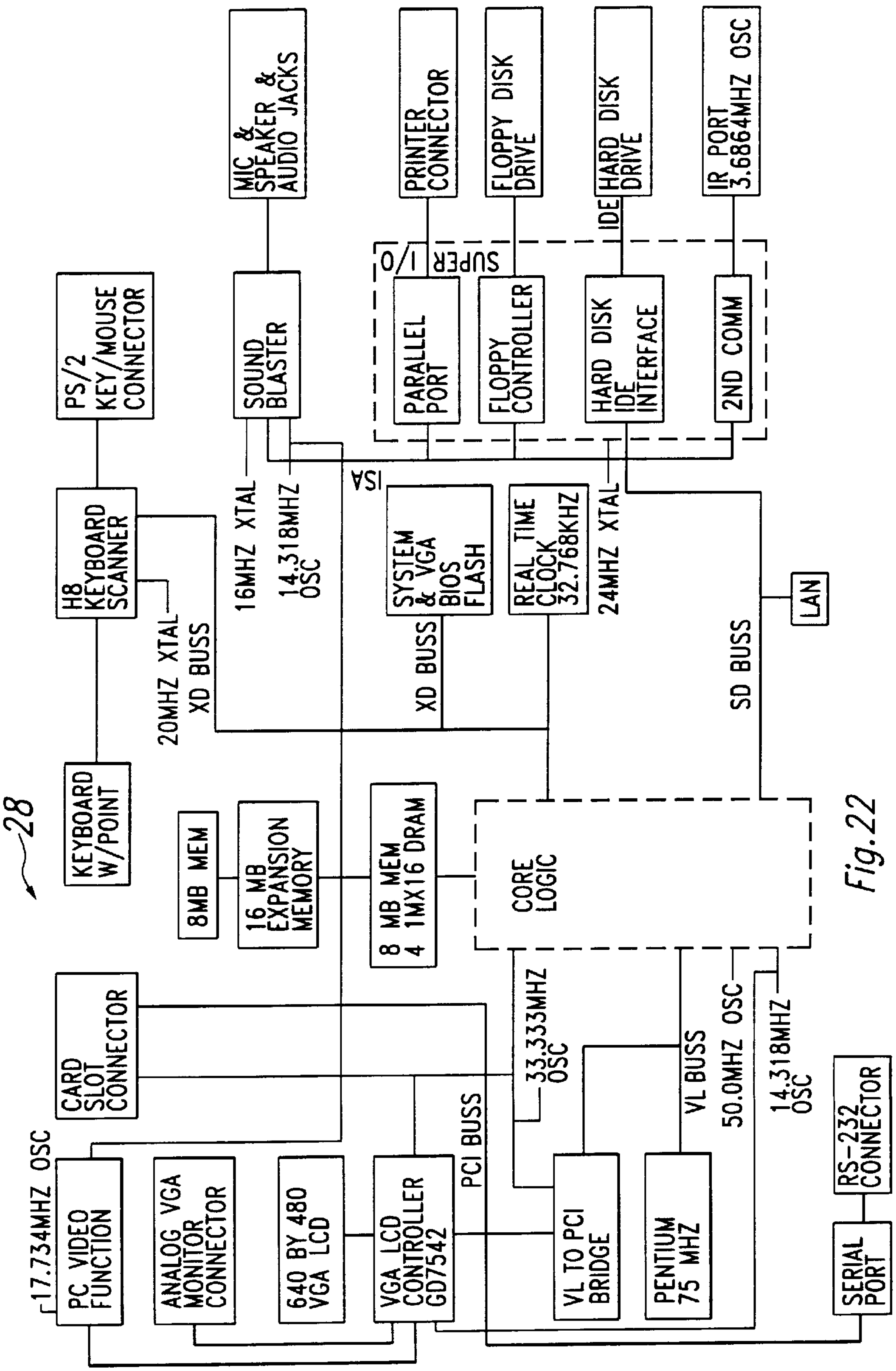

The system card 28 illustrated in FIG. 22 also provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA bus (SD bus), an XD bus coupling the keyboard scanner, system & VGA bios flash and real time clock to core logic, an ISA bus, a sound blaster coupling microphone and speaker jacks to the ISA bus, a PCMCIA controller coupling PCMCIA card slots to the ISA bus, a serial port coupling an RS-232 connector to the PCI bus, a parallel port coupling a printer connector to the ISA bus, a floppy controller coupling a floppy disk drive to the ISA bus, a hard disk interface coupling a hard disk drive to the ISA bus, a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 23:
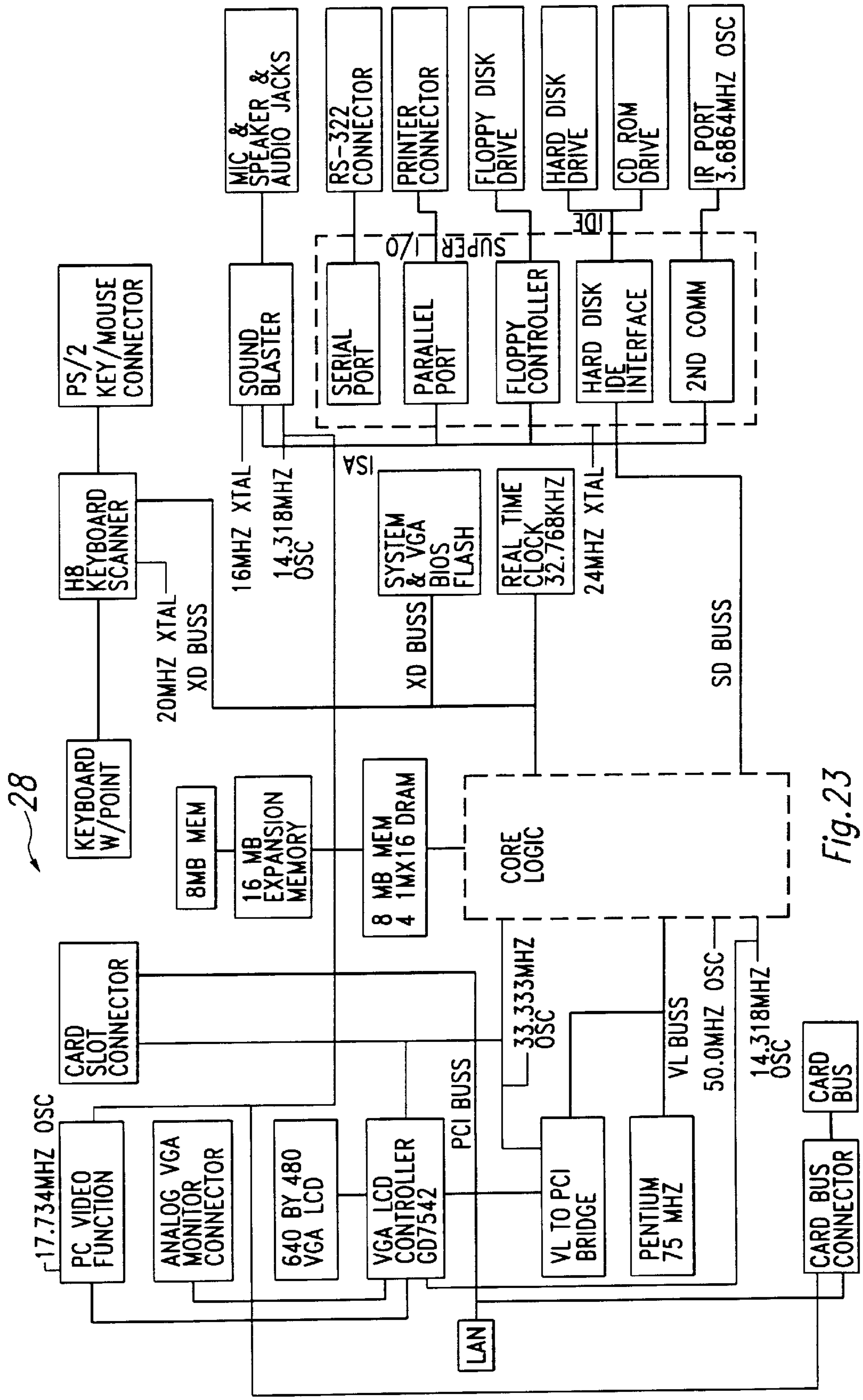

System card 28 illustrated in FIG. 23 similarly provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a card bus controller coupling card bus slots to the PCI bus, a serial port coupling an RS-232 connector to the ISA bus, a parallel port coupling a printer connector to the ISA bus, a floppy controller coupling a floppy disk drive to the ISA bus, a hard disk interface coupling a hard disk drive and a CD rom drive to the ISA bus, a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 24:
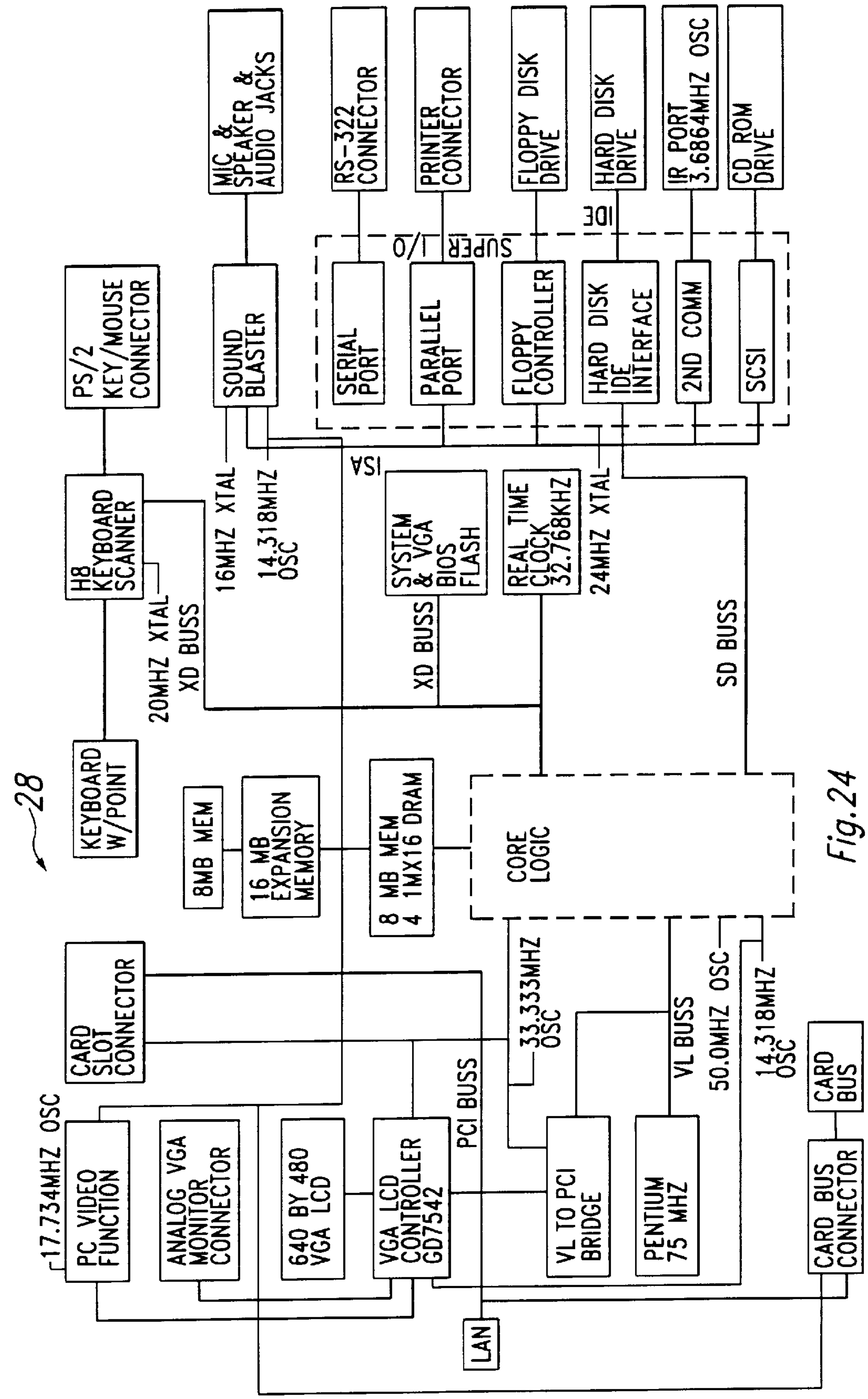

The system card 28 illustrated in FIG. 24 provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a card bus controller coupling card bus slots to the PCI bus, a serial port coupling an RS-232 connector to the ISA bus, a parallel port coupling a printer connector to the ISA bus, a floppy controller coupling a floppy disk drive to the ISA bus, a hard disk interface coupling a hard disk drive to the ISA bus, an SCSI device coupling a CD rom drive to the ISA bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 25:
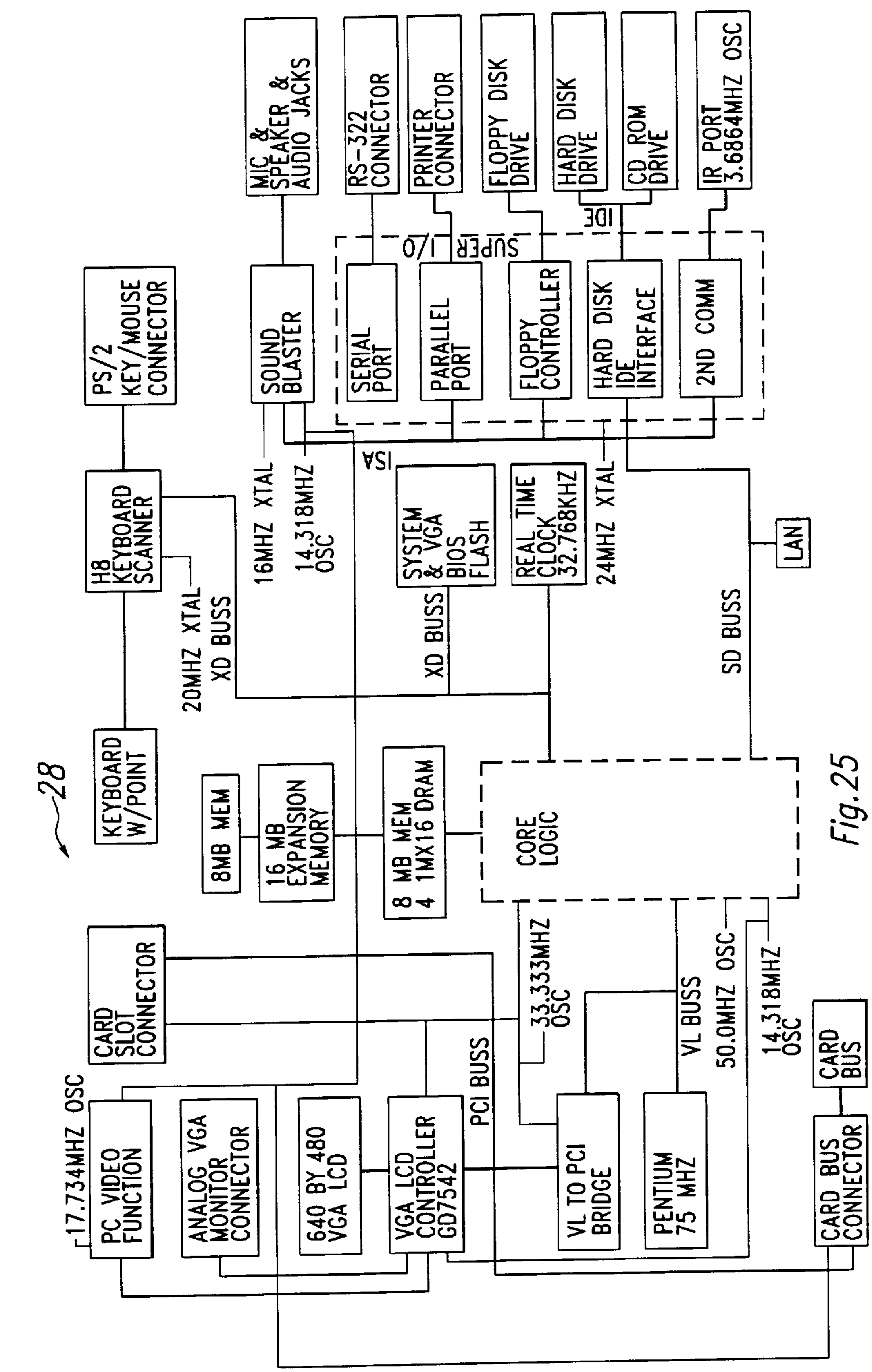

System card 28 illustrated in FIG. 25 similarly provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA bus (SD bus), an XD bus coupling the keyboard scanner, system & VGA bios flash and real time clock to core logic, a sound blaster coupling microphone and speaker jacks to the ISA bus, a card bus controller coupling card bus slots to the PCI bus, a serial port coupling an RS-232 connector to the ISA bus, a parallel port coupling a printer connector to the ISA bus, a floppy controller coupling a floppy disk drive to the ISA bus, a hard disk interface coupling a hard disk drive and a CD rom drive to the ISA bus, a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 26:
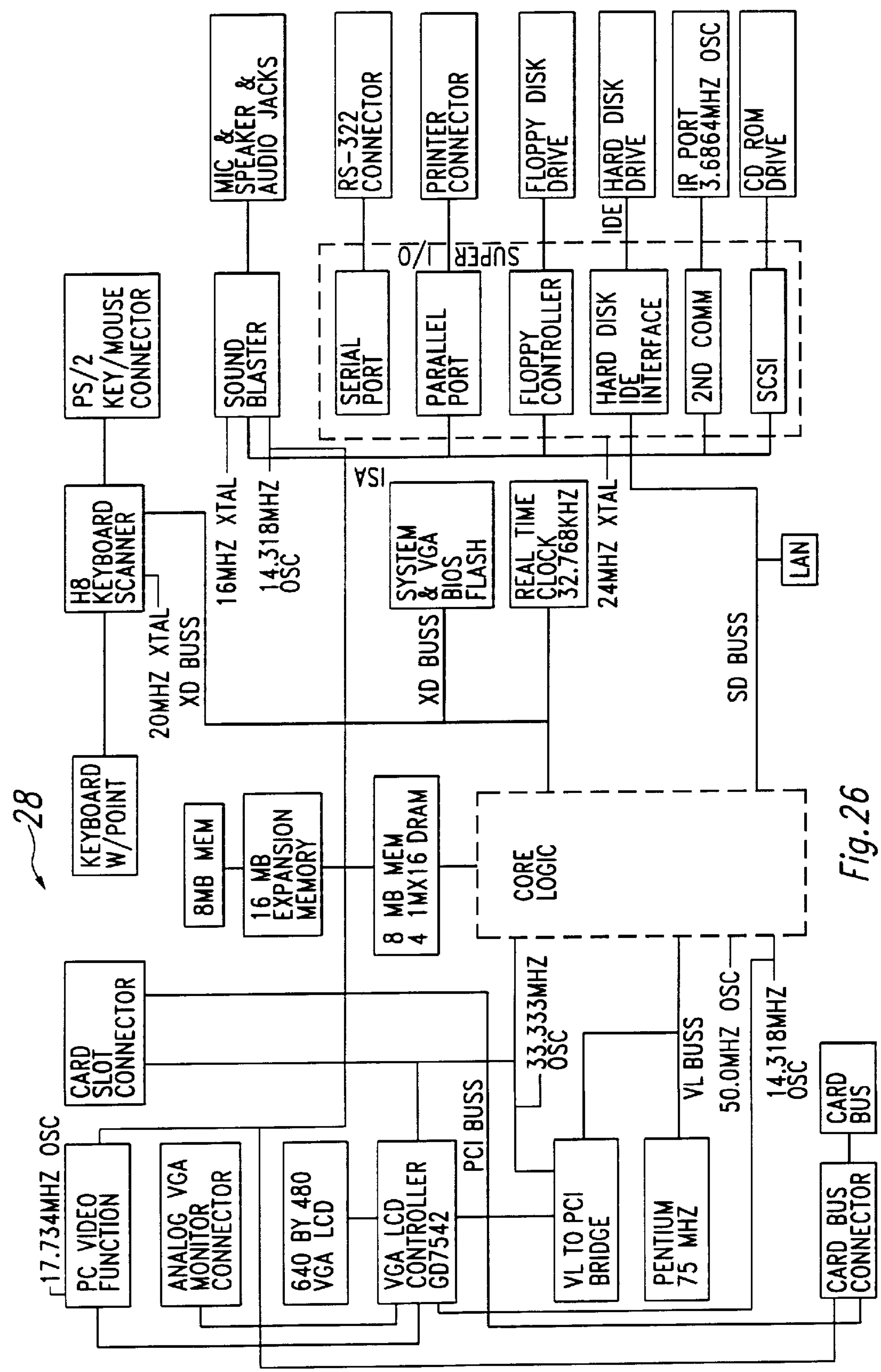

The system card 28 illustrated in FIG. 26 provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA bus (SD bus), an XD bus coupling the keyboard scanner, system & VGA bios flash and real time clock to core logic, a sound blaster coupling microphone and speaker jacks to the ISA bus, a card bus controller coupling card bus slots to the PCI bus, a serial port coupling an RS-232 connector to the ISA bus, a parallel port coupling a printer connector to the ISA bus, a floppy controller coupling a floppy disk drive to the ISA bus, a hard disk interface coupling a hard disk drive to the ISA bus, an SCSI device coupling a CD rom drive to the ISA bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 27:
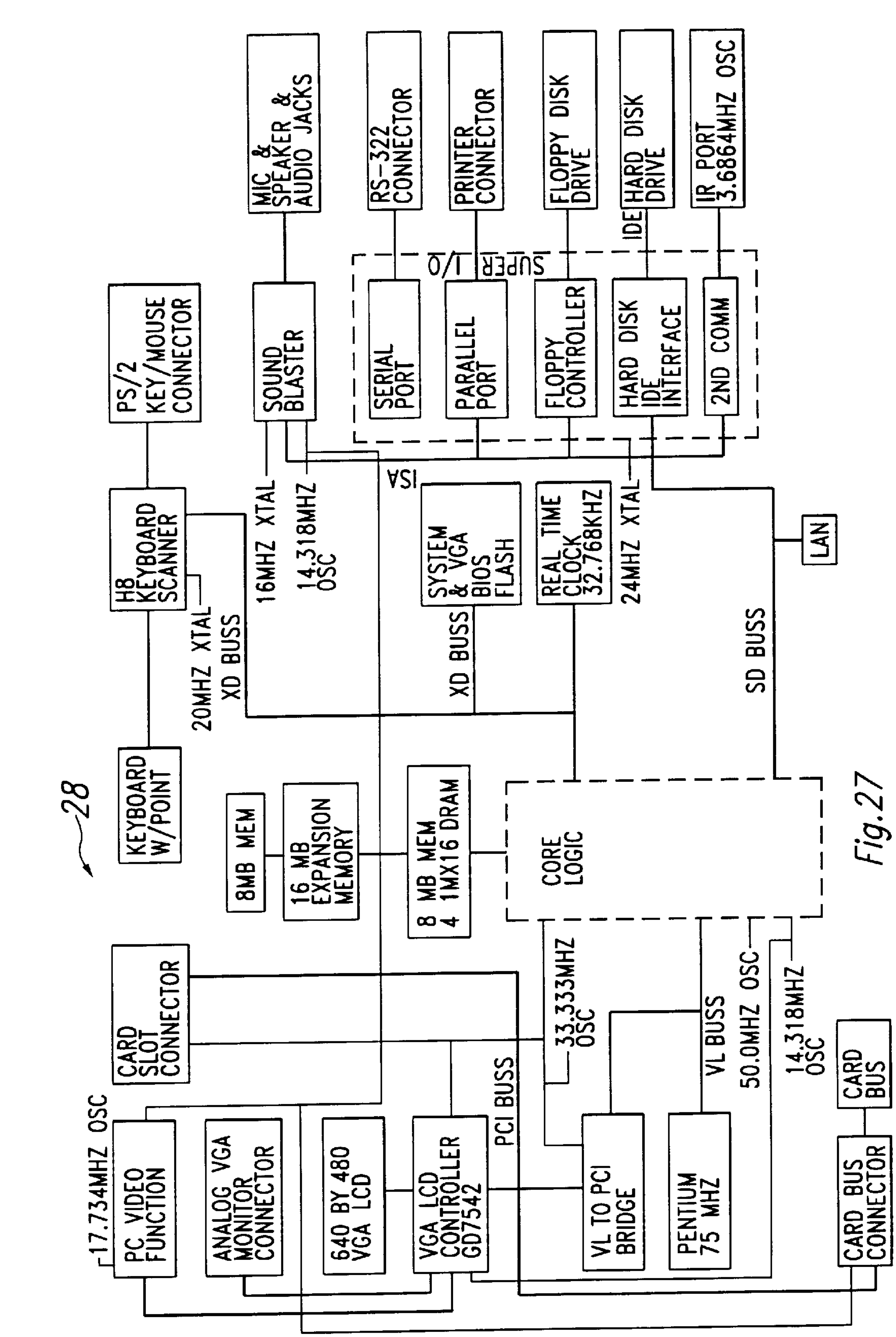

System card 28 illustrated in FIG. 27 also provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a card bus controller coupling card bus slots to the PCI bus, a serial port coupling an RS-232 connector to the ISA bus, a parallel port coupling a printer connector to the ISA bus, a floppy controller coupling a floppy disk drive to the ISA bus, a hard disk interface coupling a hard disk drive to the ISA bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 28:
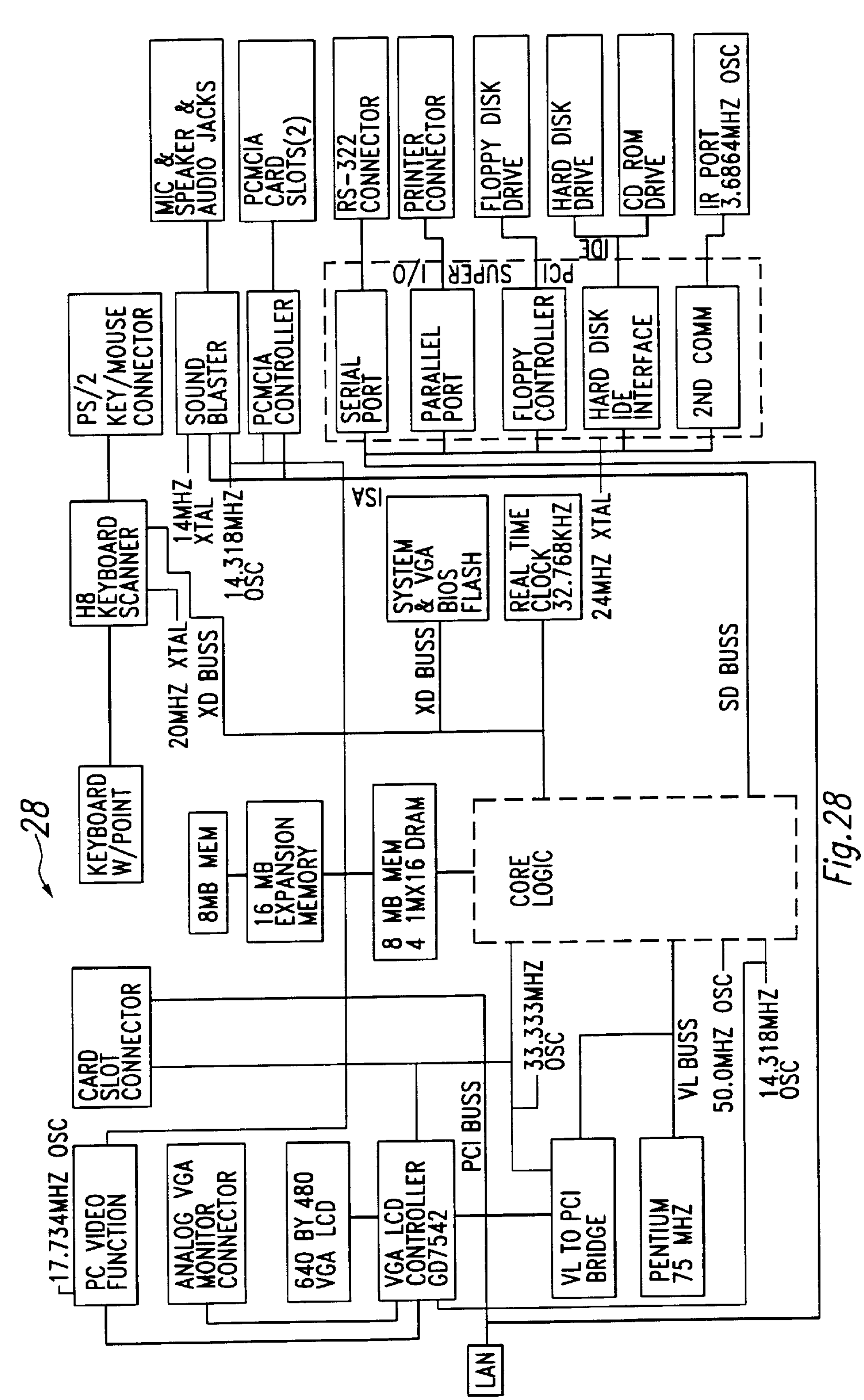

The system card 28 illustrated in FIG. 28 similarly provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a PCMCIA controller coupling PCMCIA card slots to the ISA bus, a serial port coupling an RS-232 connector to the PCI bus, a parallel port coupling a printer connector to the PCI bus, a floppy controller coupling a floppy disk drive to the PCI bus, a hard disk interface coupling a hard disk drive and a CD rom drive to the PCI bus, and a second communications port coupling an infrared (IR) port to the PCI bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 29:
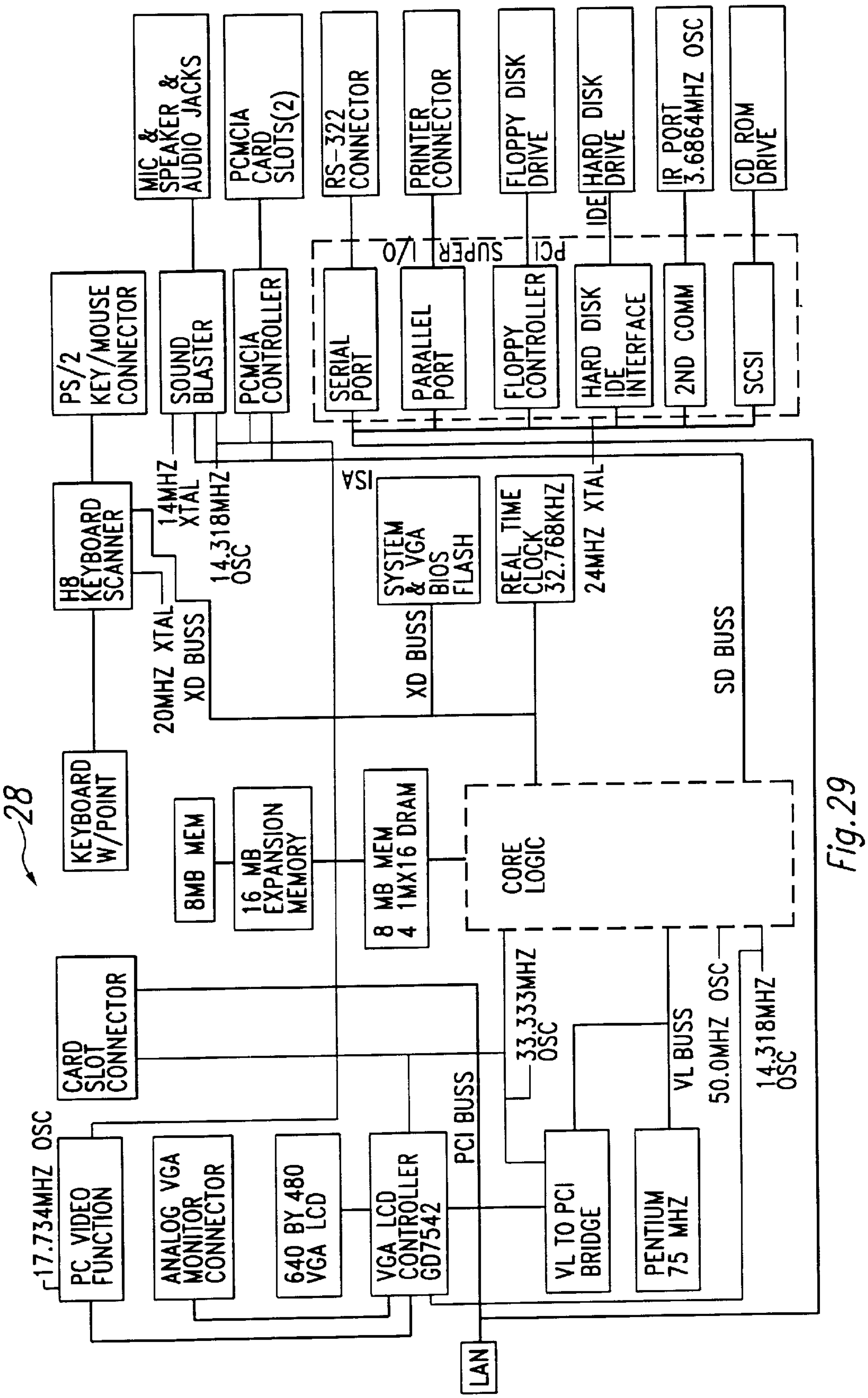

System card 28 illustrated in FIG. 29 provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a PCMCIA controller coupling PCMCIA card slots to the ISA bus, a serial port coupling an RS-232 connector to the PCI bus, a parallel port coupling a printer connector to the PCI bus, a floppy controller coupling a floppy disk drive to the PCI bus, a hard disk interface coupling a hard disk drive to the PCI bus, an SCSI device coupling a CD rom drive to the PCI bus, and a second communications port coupling an infrared (IR) port to the PCI bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 30:
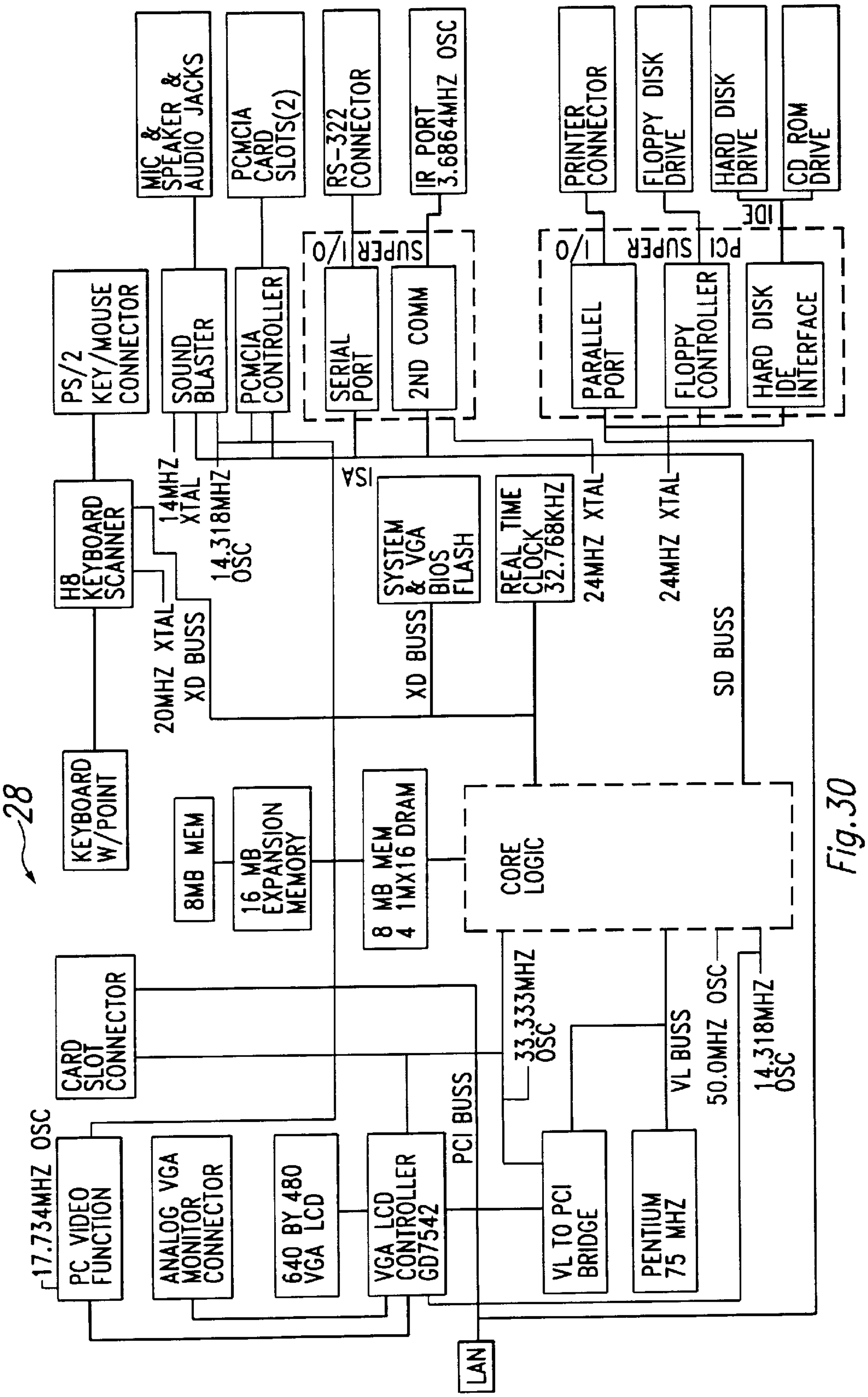

The system card 28 illustrated in FIG. 30 also provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a PCMCIA controller coupling PCMCIA card slots to the ISA bus, a serial port coupling an RS-232 connector to the ISA bus, a parallel port coupling a printer connector to the PCI bus, a floppy controller coupling a floppy disk drive to the PCI bus, a hard disk interface coupling a hard disk drive and a CD rom drive to the PCI bus, and a second communications port coupling an infrared (IR) port to the PCI bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 31:
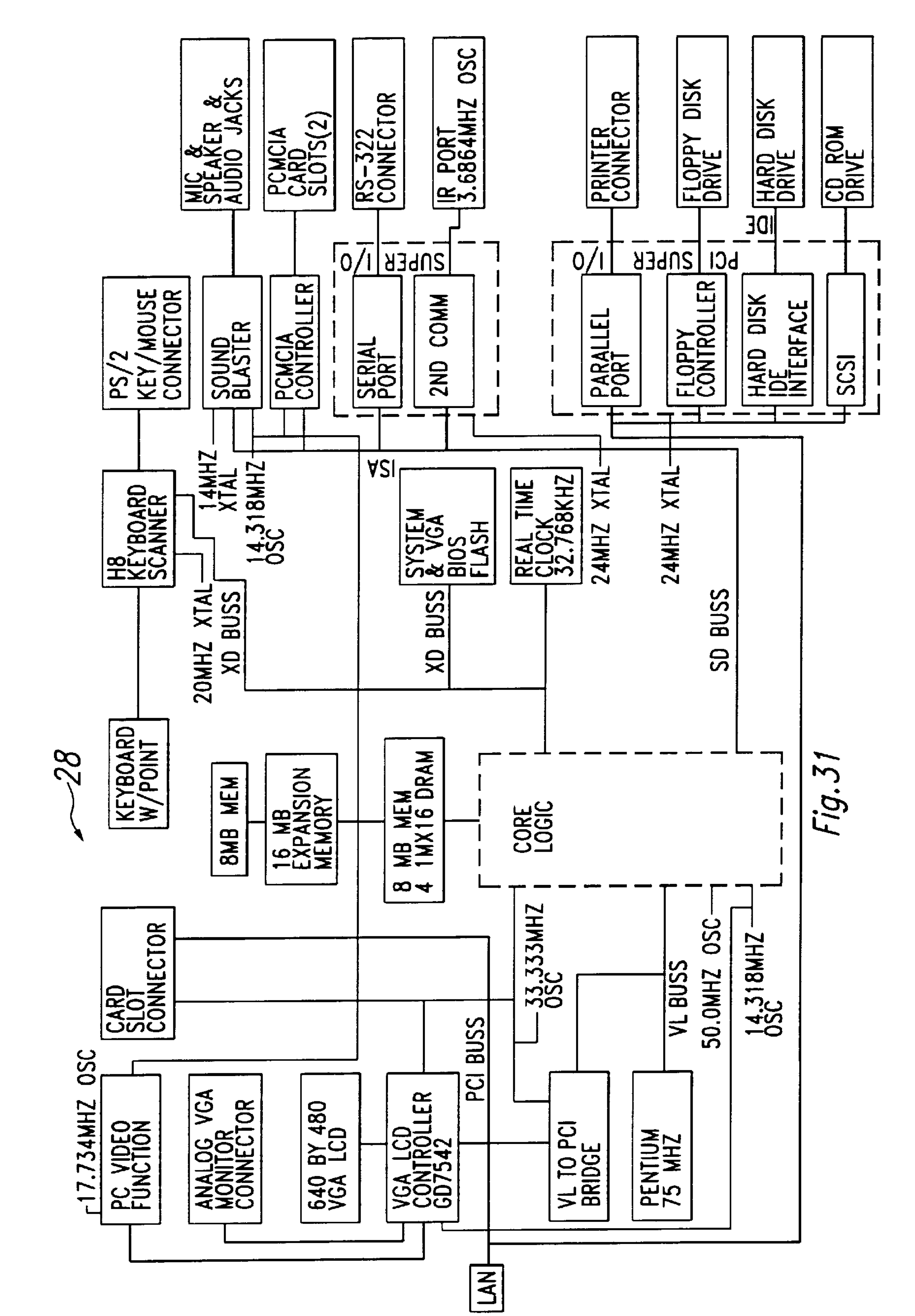

System card 28 illustrated in FIG. 31 similarly provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a PCMCIA controller coupling PCMCIA card slots to the ISA bus, a serial port coupling an RS-232 connector to the ISA bus, a parallel port coupling a printer connector to the PCI bus, a floppy controller coupling a floppy disk drive to the PCI bus, a hard disk interface coupling a hard disk drive to the PCI bus, an SCSI device coupling a CD rom drive to the PCI bus, and a second communications port couplings an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 32:
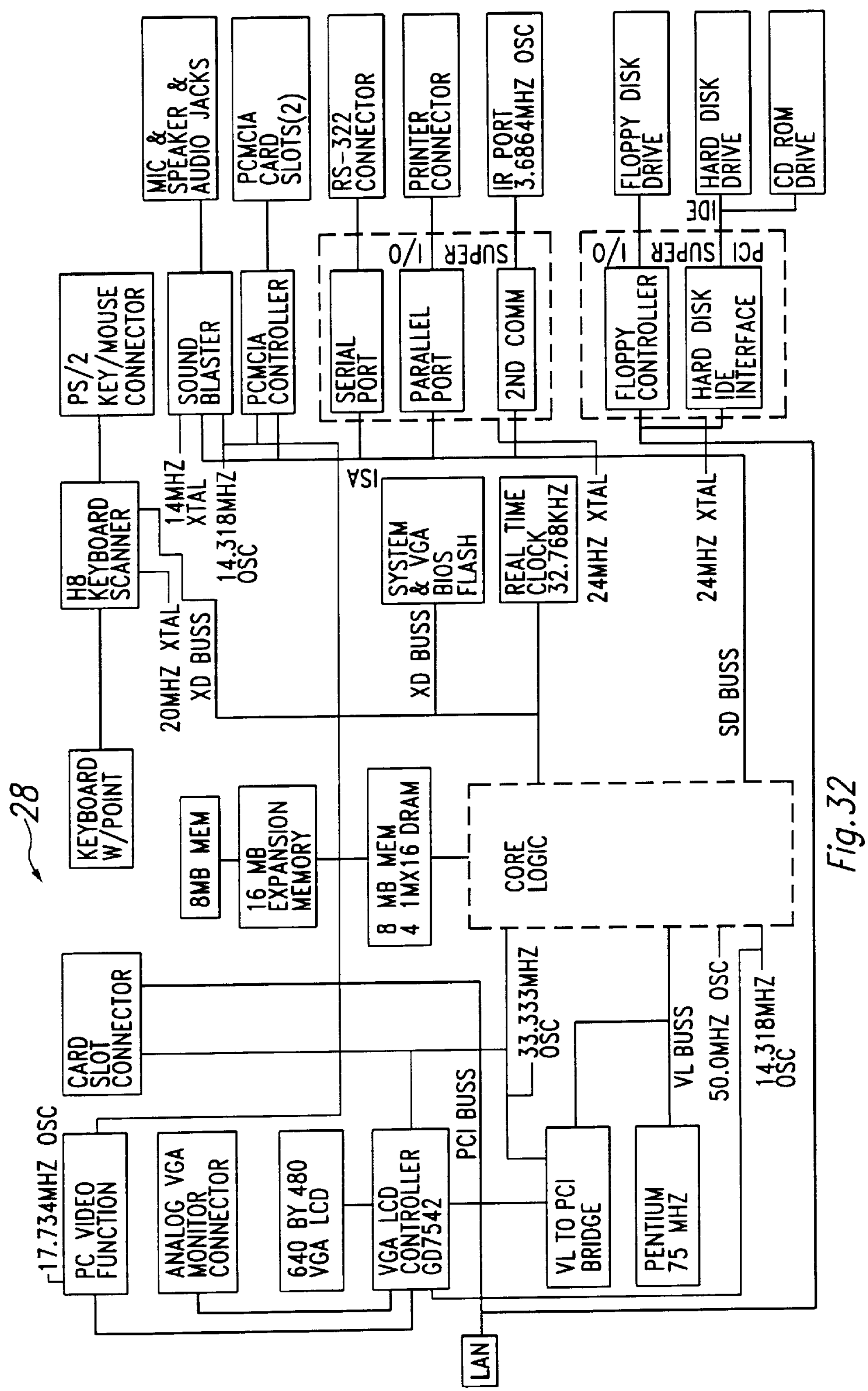

The system card 28 illustrated in FIG. 32 provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a PCMCIA controller coupling PCMCIA card slots to the ISA bus, a serial port coupling an RS-232 connector to the ISA bus, a parallel port coupling a printer connector to the ISA bus, a floppy controller coupling a floppy disk drive to the PCI bus, a hard disk interface coupling a hard disk drive and a CD rom drive to the PCI bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 33:
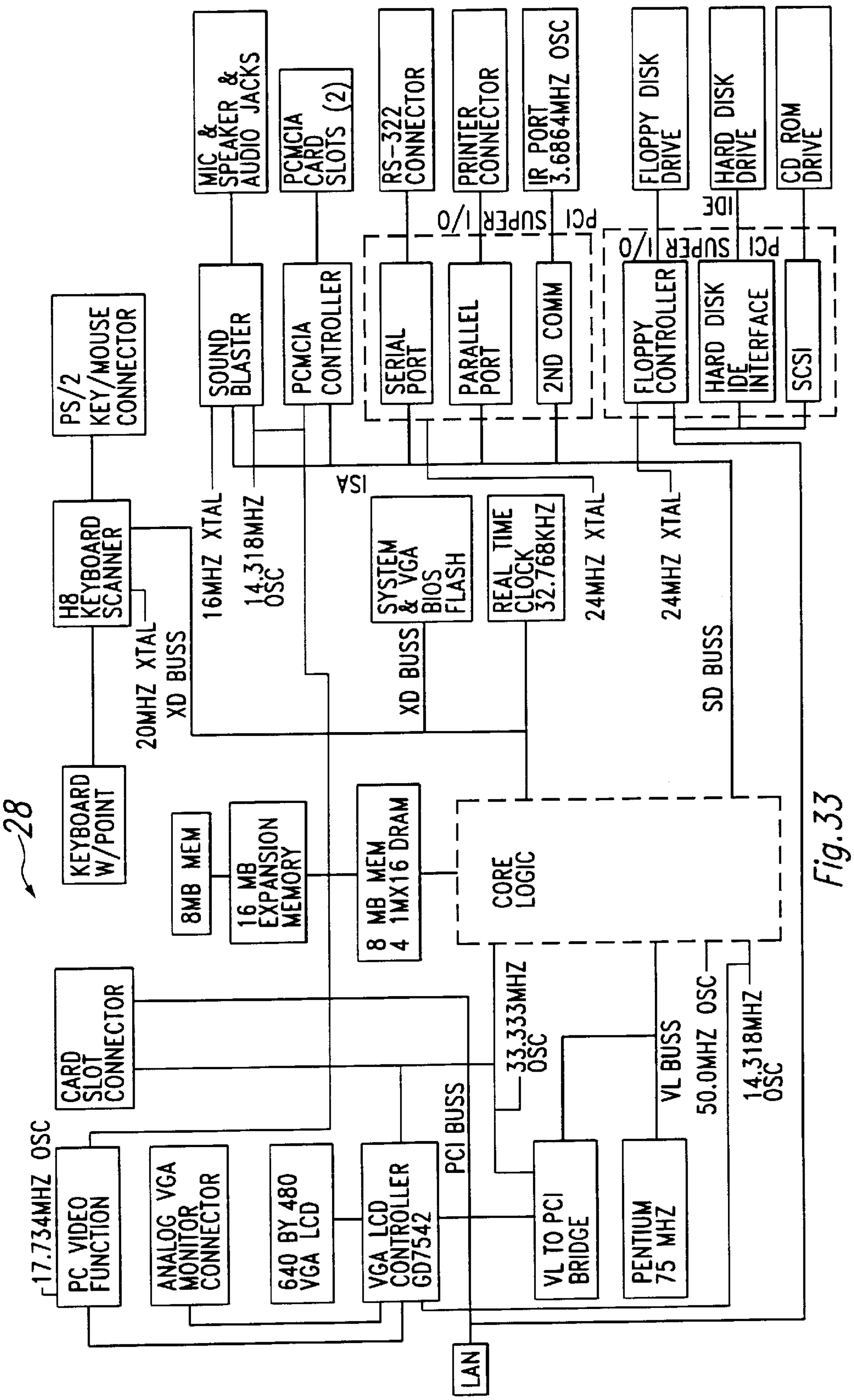

System card 28 illustrated in FIG. 33 also provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a PCMCIA controller coupling PCMCIA card slots to the ISA bus, a serial port coupling an RS-232 connector to the ISA bus, a parallel port coupling a printer connector to the ISA bus, a floppy controller coupling a floppy disk drive to the PCI bus, a hard disk interface coupling a hard disk drive to the PCI bus, an SCSI device coupling a CD rom drive to the PCI bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 34:
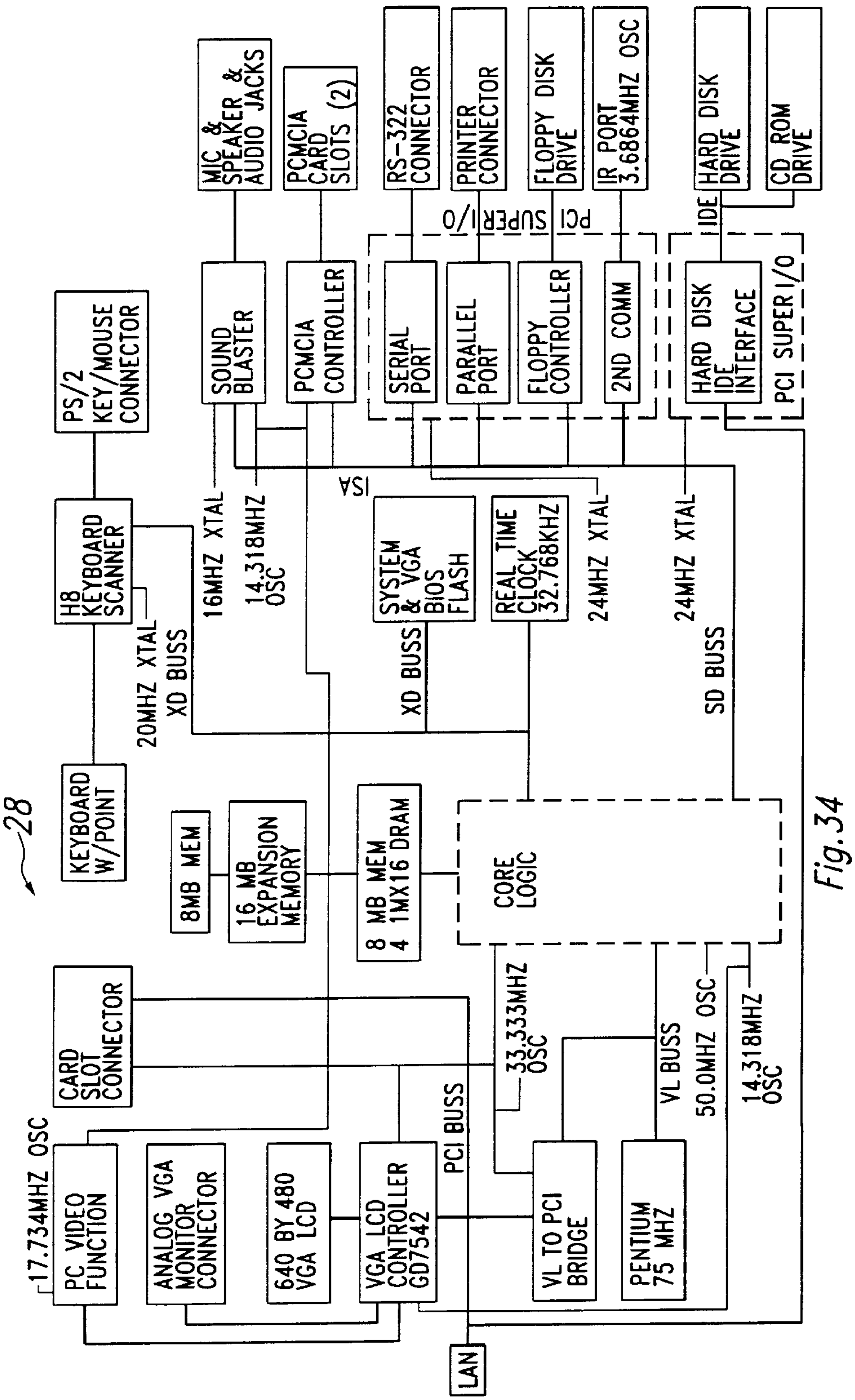

The system card 28 illustrated in FIG. 34 similarly provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a PCMCIA controller coupling PCMCIA card slots to the ISA bus, a serial port coupling an RS-232 connector to the ISA bus, a parallel port coupling a printer connector to the ISA bus, a floppy controller coupling a floppy disk drive to the ISA bus, a hard disk interface coupling a hard disk drive and a CD rom drive to the PCI bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 35:
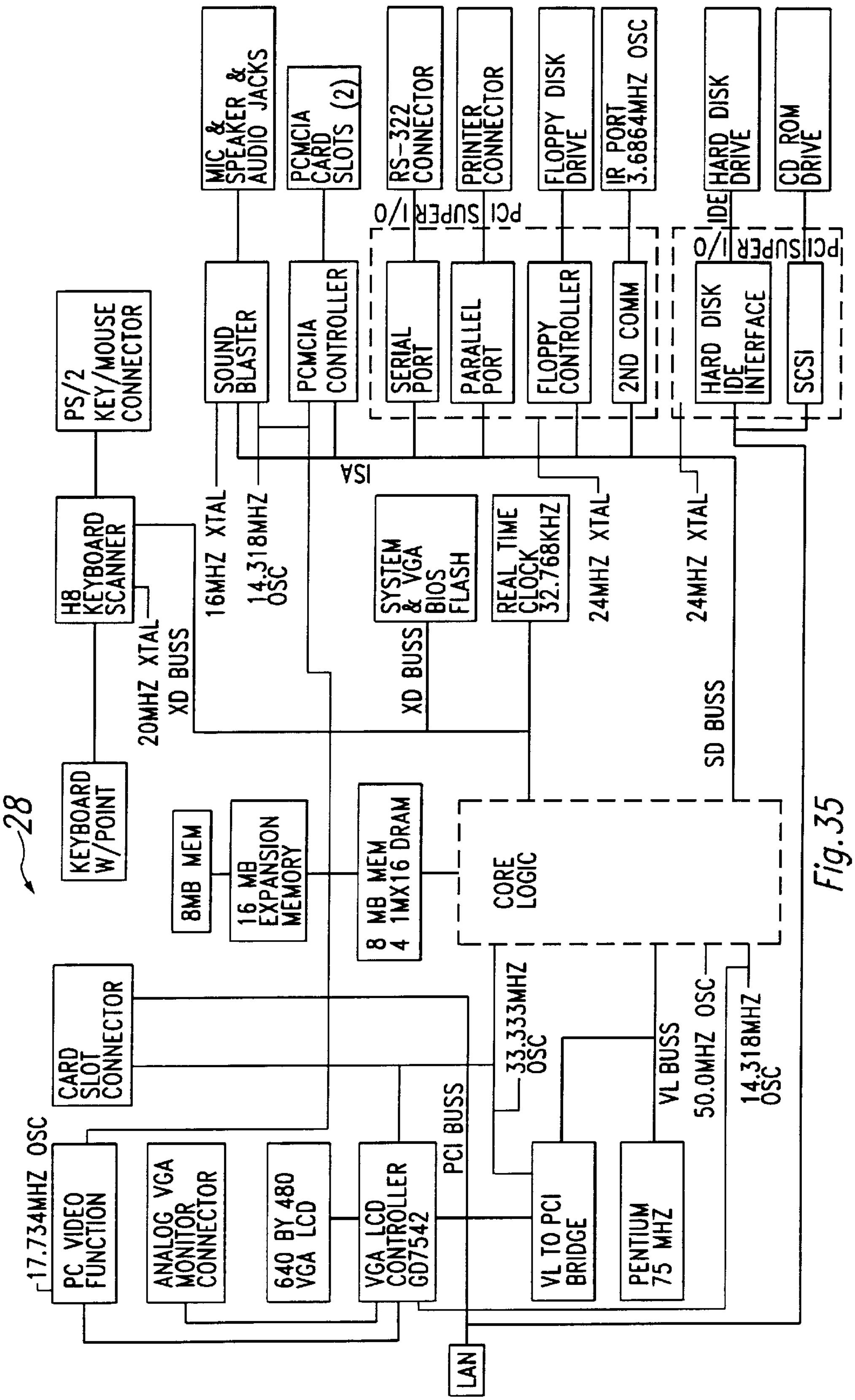

System card 28 illustrated in FIG. 35 provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, an ISA bus (SD bus), a sound blaster coupling microphone and speaker jacks to the ISA bus, a PCMCIA controller coupling PCMCIA card slots to the ISA bus, a serial port coupling an RS-232 connector to the ISA bus, a parallel port coupling a printer connector to the ISA bus, a floppy controller coupling a floppy disk drive to the ISA bus, a hard disk interface coupling a hard disk drive to the PCI bus, an SCSI device coupling a CD rom drive to the PCI bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 36:
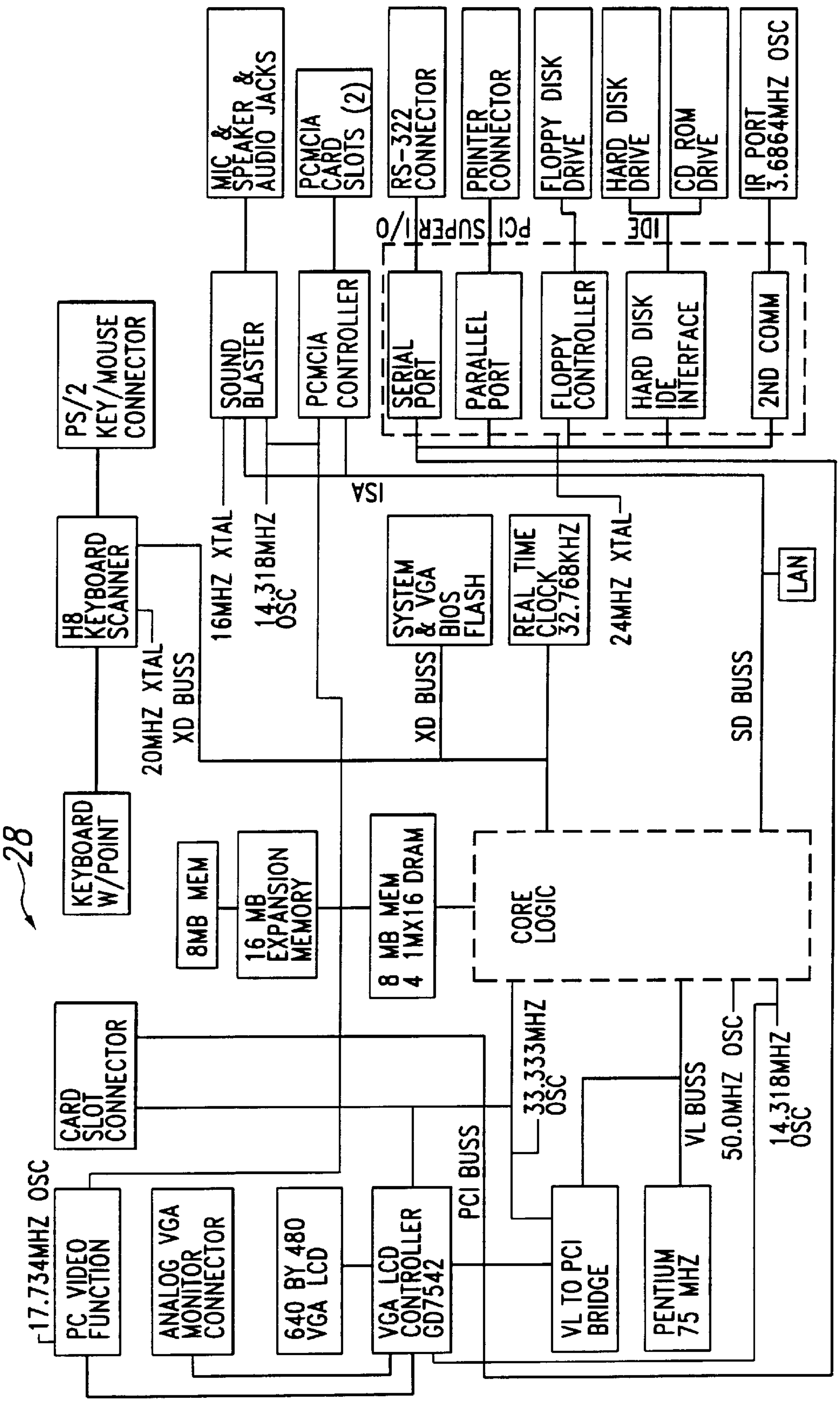

The system card 28 illustrated in FIG. 36 also provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA bus (SD bus), an XD bus coupling the keyboard scanner, system & VGA bios flash and real time clock to core logic, an ISA bus, a sound blaster coupling microphone and speaker jacks to the ISA bus, a PCMCIA controller coupling PCMCIA card slots to the ISA bus, a serial port coupling an RS-232 connector to the PCI bus, a parallel port coupling a printer connector to the PCI bus, a floppy controller coupling a floppy disk drive to the PCI bus, a hard disk interface coupling a hard disk drive and a CD rom drive to the PCI bus, and a second communications port coupling an infrared (IR) port to the PCI bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 37:
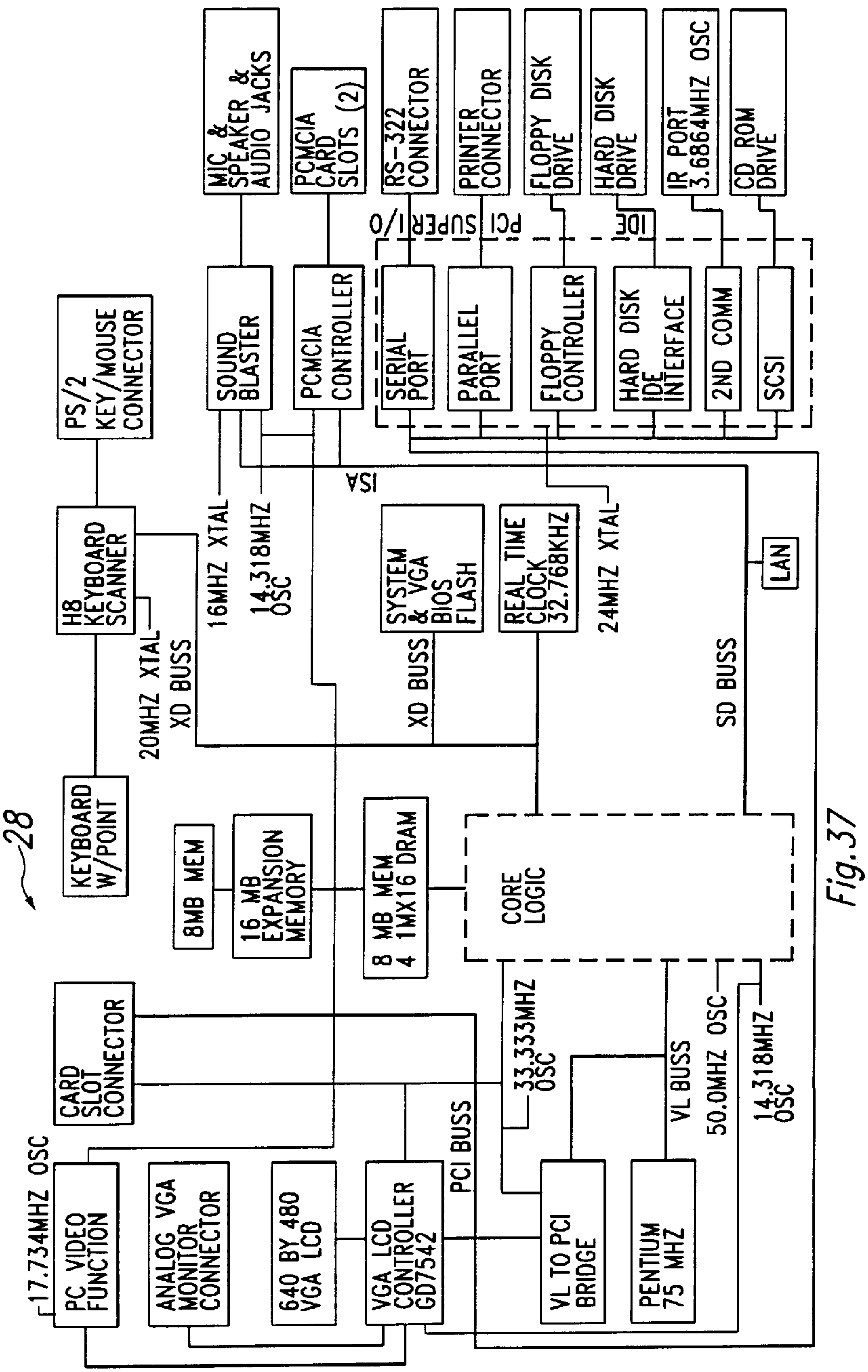

System card 28 illustrated in FIG. 37 similarly provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA bus (SD bus), an XD bus coupling the keyboard scanner, system & VGA bios flash and real time clock to core logic, an ISA bus, a sound blaster coupling microphone and speaker jacks to the ISA bus, a PCMCIA controller coupling PCMCIA card slots to the ISA bus, a serial port coupling an RS-232 connector to the PCI bus, a parallel port coupling a printer connector to the PCI bus, a floppy controller coupling a floppy disk drive to the PCI bus, a hard disk interface coupling a hard disk drive to the PCI bus, an SCSI device coupling a CD rom drive to the PCI bus, and a second communications port coupling an infrared (IR) port to the PCI bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 38:
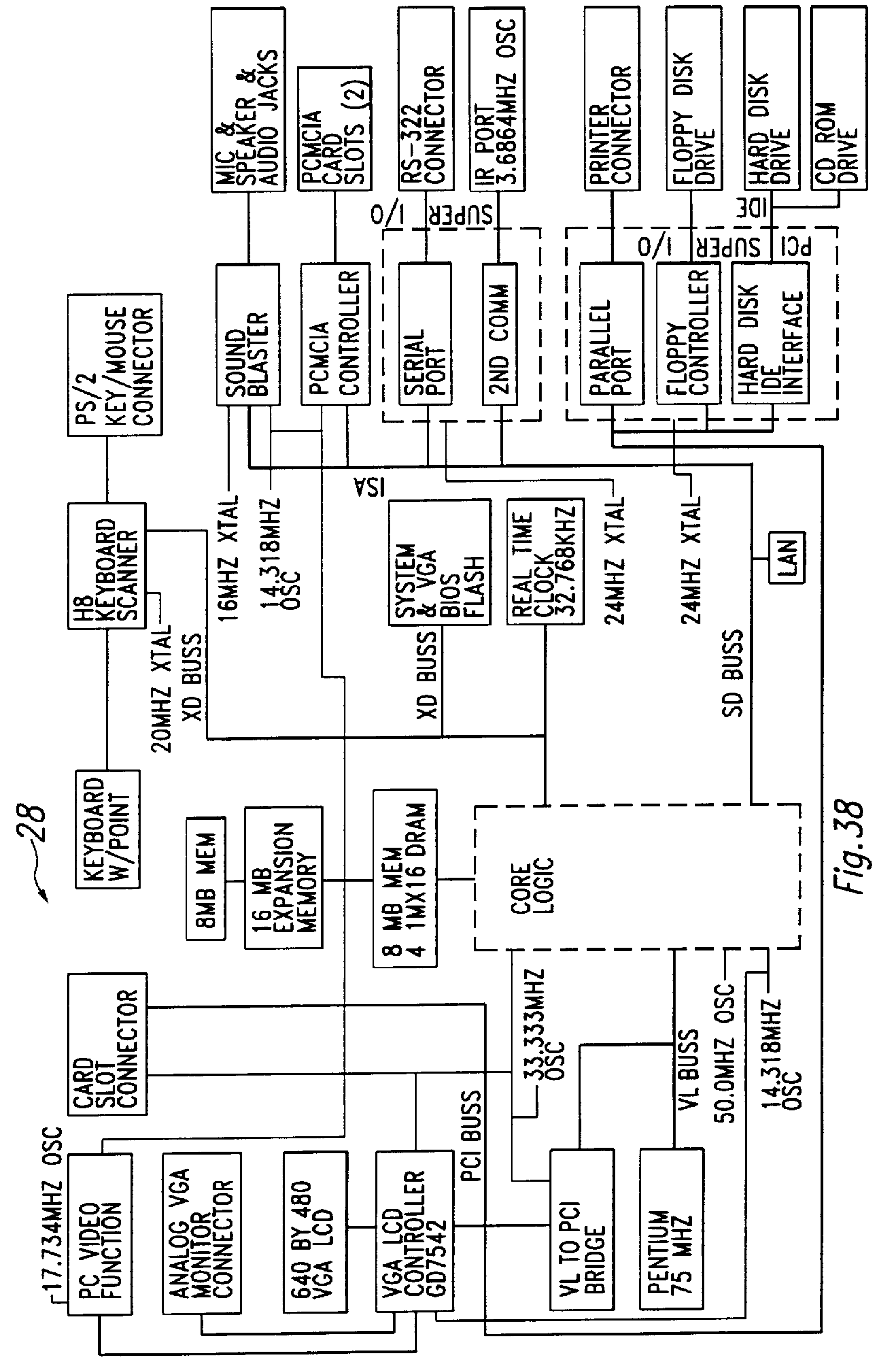
Figure 39:
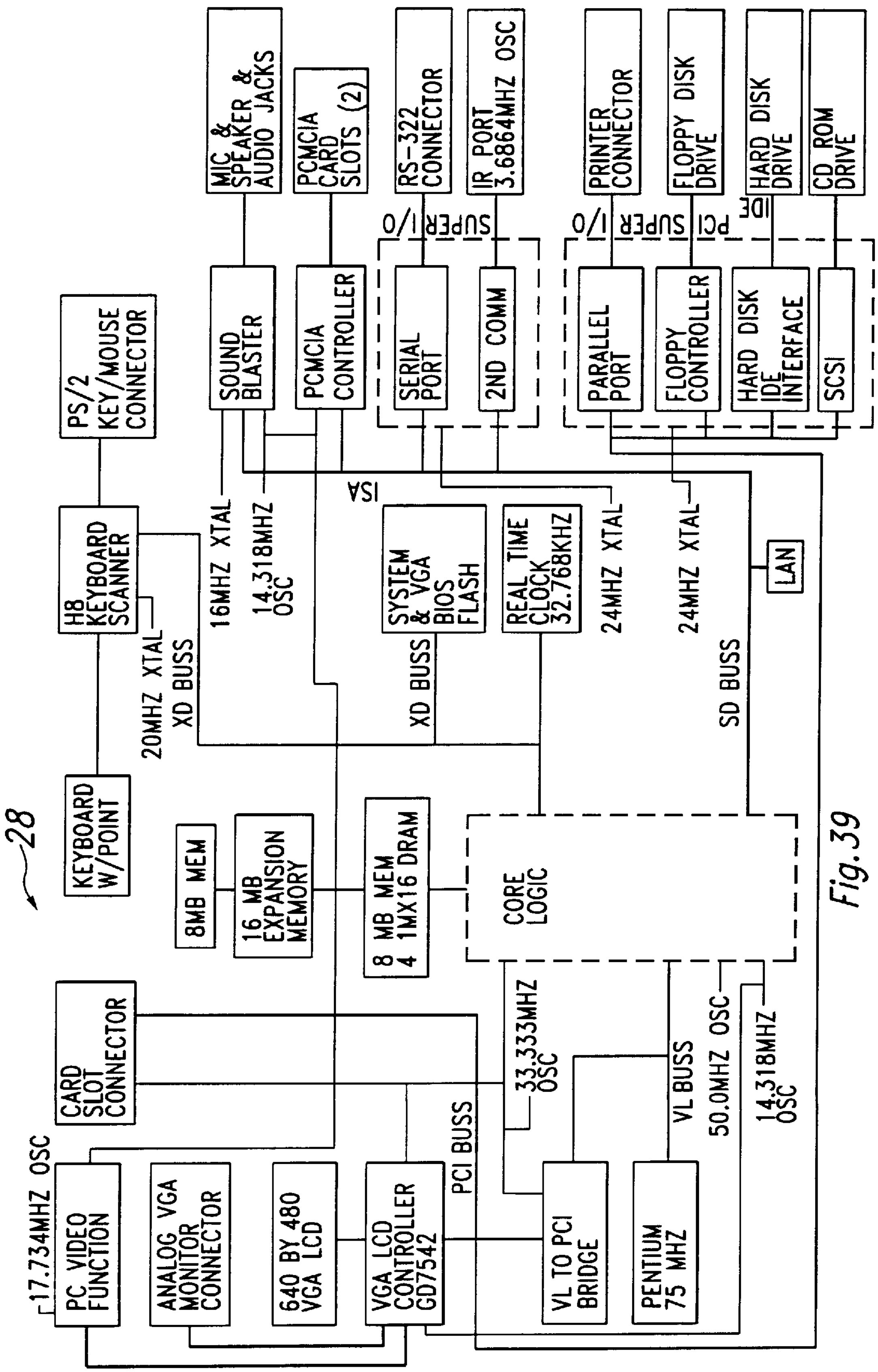

The system card 28 illustrated in FIG. 38 provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA bus (SD bus), an XD bus coupling the keyboard scanner, system & VGA bios flash and real time clock to core logic, an ISA bus, a sound blaster coupling microphone and speaker jacks to the ISA bus, a PCMCIA controller coupling PCMCIA card slots to the ISA bus, a serial port coupling an RS-232 connector to the ISA bus, a parallel port coupling a printer connector to the PCI bus, a floppy controller coupling a floppy disk drive to the PCI bus, a hard disk interface coupling a hard disk drive and a CD rom drive to the PCI bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

System card 28 illustrated in FIG. 33 also provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA bus (SD bus), an XD bus coupling the keyboard scanner, system & VGA bios flash and real time clock to core logic, an ISA bus, a sound blaster coupling microphone and speaker jacks to the ISA bus, a PCMCIA controller coupling PCMCIA card slots to the ISA bus, a serial port coupling an RS-232 connector to the ISA bus, a parallel port coupling a printer connector to the PCI bus, a floppy controller coupling a floppy disk drive to the PCI bus, a hard disk interface coupling a hard disk drive to the PCI bus, an SCSI device coupling a CD rom drive to the PCI bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 40:
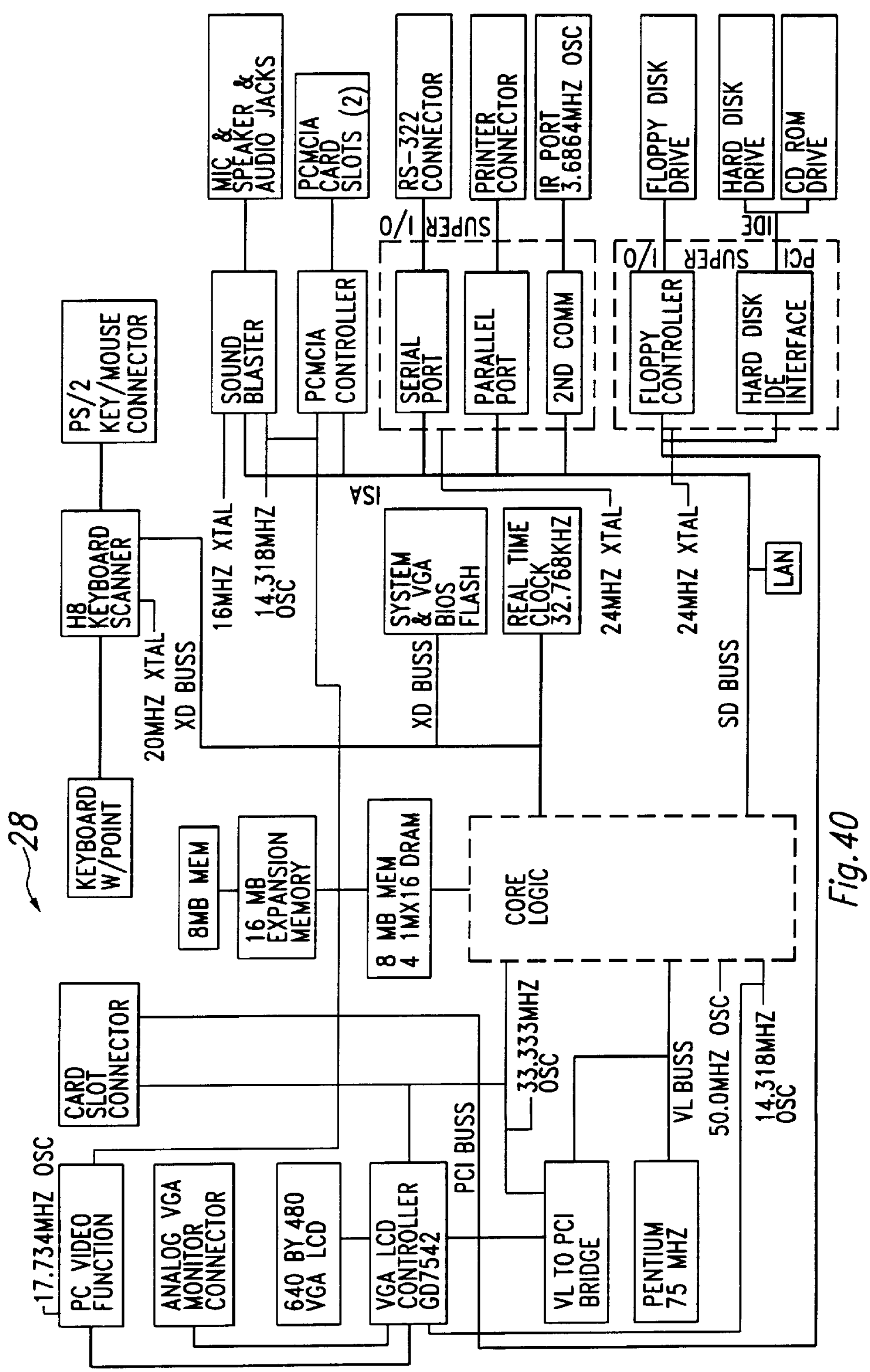

The system card 28 illustrated in FIG. 40 similarly provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA bus (SD bus), an XD bus coupling the keyboard scanner, system & VGA bios flash and real time clock to core logic, an ISA bus, a sound blaster coupling microphone and speaker jacks to the ISA bus, a PCMCIA controller coupling PCMCIA card slots to the ISA bus, a serial port coupling an RS-232 connector to the ISA bus, a parallel port coupling a printer connector to the ISA bus, a floppy controller coupling a floppy disk drive to the PCI bus, a hard disk interface coupling a hard disk drive and a CD rom drive to the PCI bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 41:
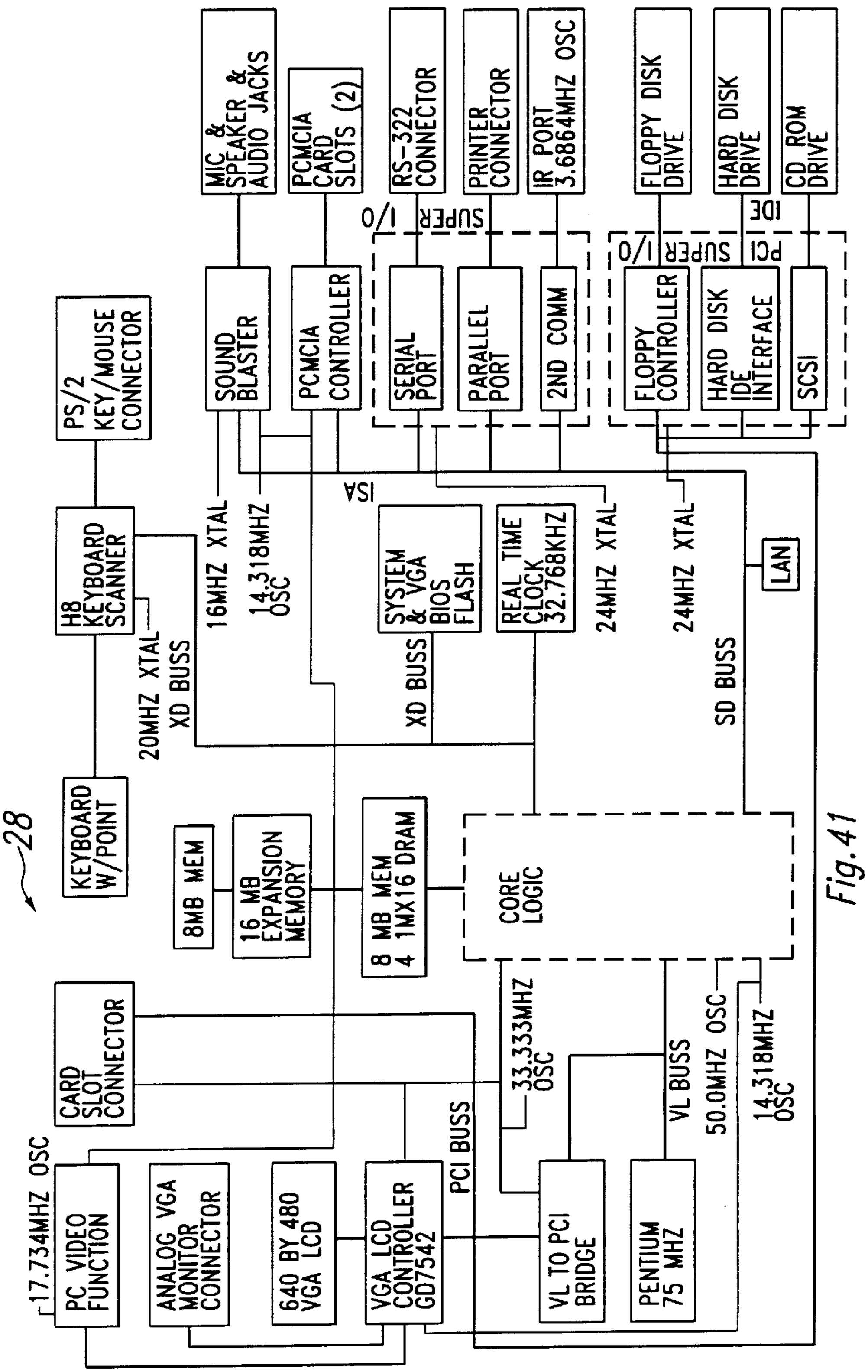

System card 28 illustrated in FIG. 41 provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA bus (SD bus), an XD bus coupling the keyboard scanner, system & VGA bios flash and real time clock to core logic, an ISA bus, a sound blaster coupling microphone and speaker jacks to the ISA bus, a PCMCIA controller coupling PCMCIA card slots to the ISA bus, a serial port coupling an RS-232 connector to the ISA bus, a parallel port coupling a printer connector to the ISA bus, a floppy controller coupling a floppy disk drive to the PCI bus, a hard disk interface coupling a hard disk drive to the PCI bus, an SCSI device coupling a CD rom drive to the PCI bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 42:
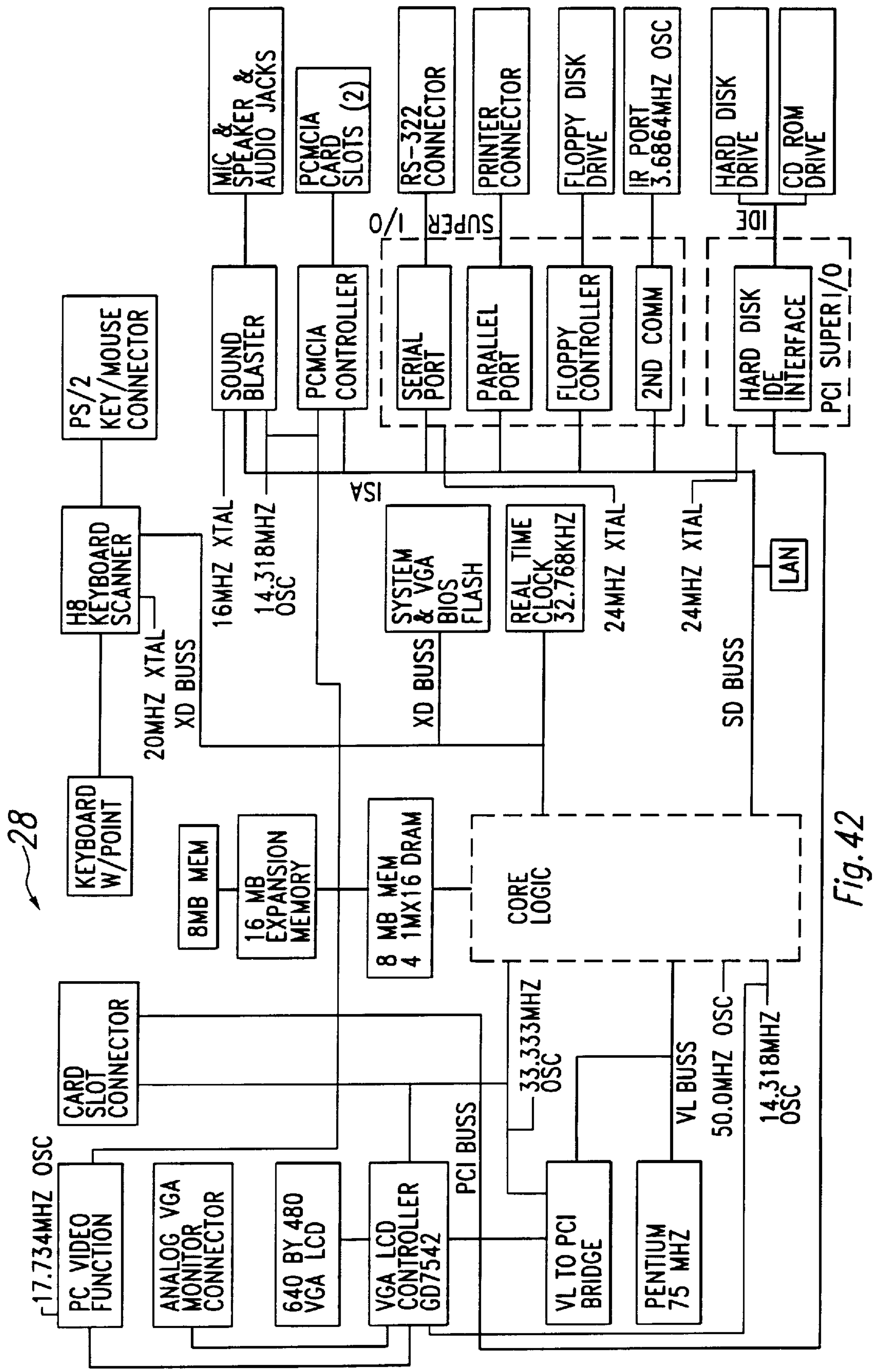

The system card 28 illustrated in FIG. 42 also provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA bus (SD bus), an XD bus coupling the keyboard scanner, system & VGA bios flash and real time clock to core logic, an ISA bus, a sound blaster coupling microphone and speaker jacks to the ISA bus, a PCMCIA controller coupling PCMCIA card slots to the ISA bus, a serial port coupling an RS-232 connector to the ISA bus, a parallel port coupling a printer connector to the ISA bus, a floppy controller coupling a floppy disk drive to the ISA bus, a hard disk interface coupling a hard disk drive and a CD rom drive to the PCI bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 43:
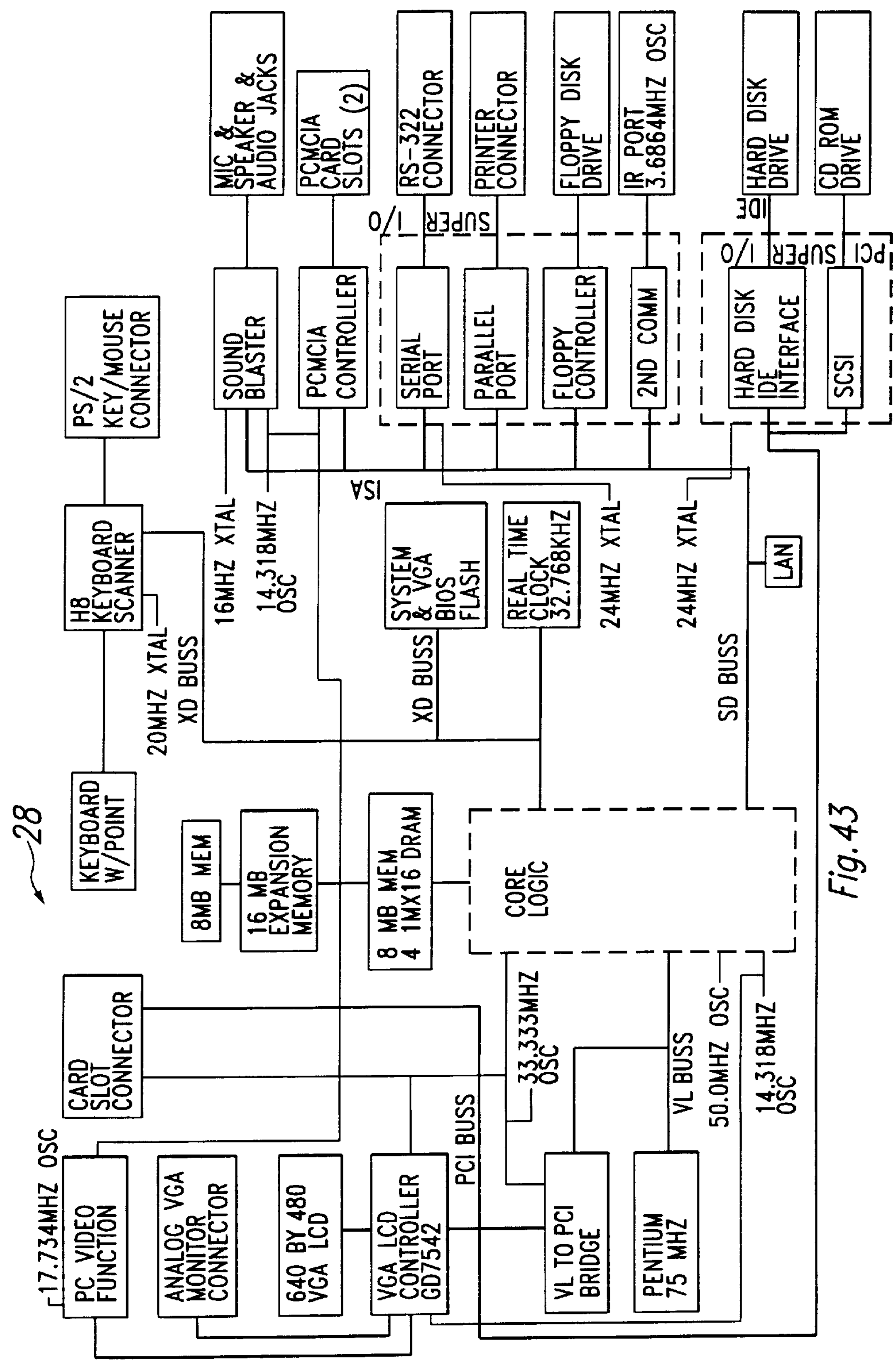

System card 28 illustrated in FIG. 43 similarly provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to an ISA bus (SD bus), an XD bus coupling the keyboard scanner, system & VGA bios flash and real time clock to core logic, an ISA bus, a sound blaster coupling microphone and speaker jacks to the ISA bus, a PCMCIA controller coupling PCMCIA card slots to the ISA bus, a serial port coupling an RS-232 connector to the ISA bus, a parallel port coupling a printer connector to the ISA bus, a floppy controller coupling a floppy disk drive to the ISA bus, a hard disk interface coupling a hard disk drive to the PCI bus, an SCSI device coupling a CD rom device to the PCI bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 44:
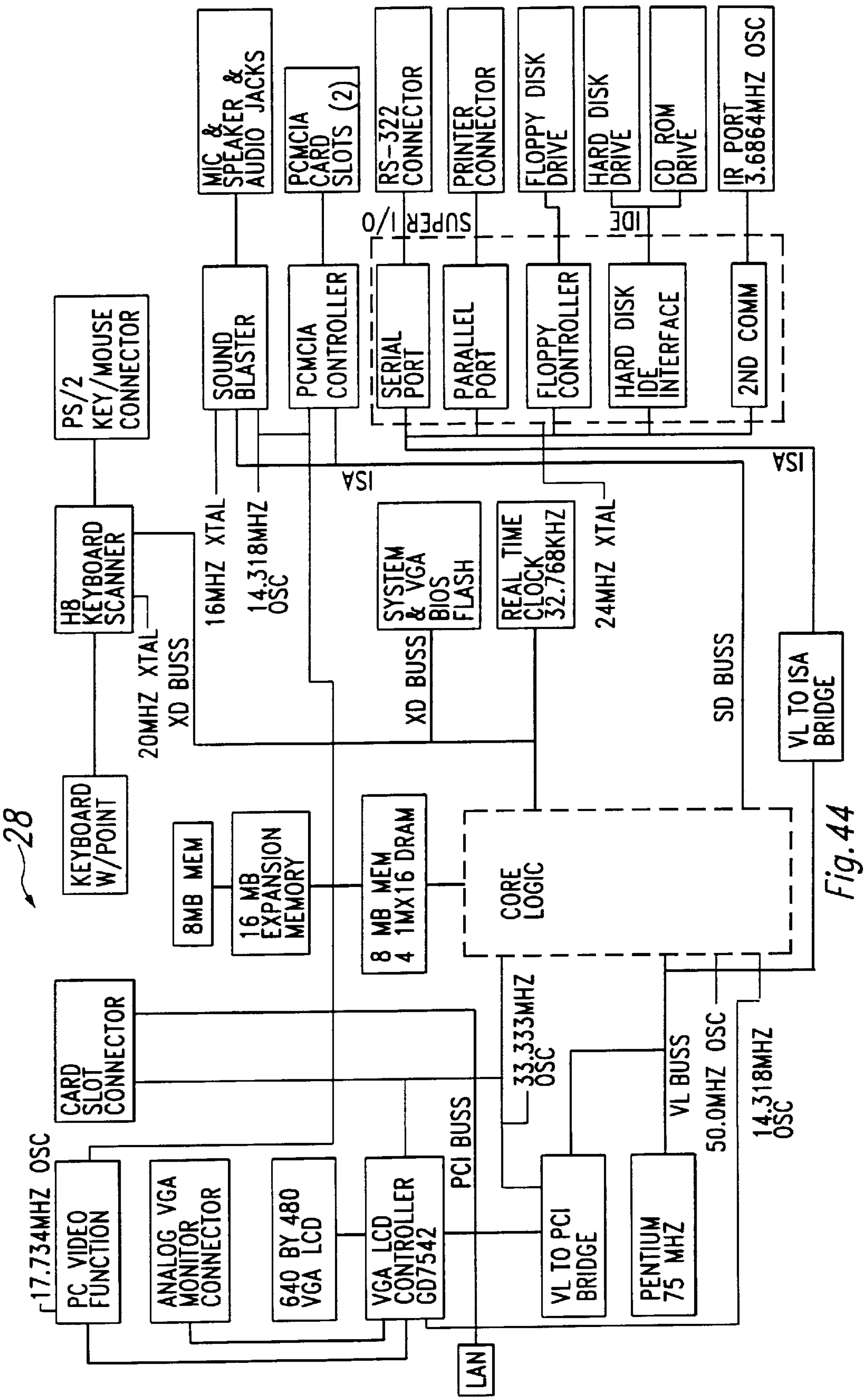

The system card 28 illustrated in FIG. 44 provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, a first ISA bus (SD bus), a sound blaster coupling microphone and speaker jacks to the first ISA bus, a PCMCIA controller coupling PCMCIA card slots to the first ISA bus, a serial port coupling an RS-232 connector to a second ISA bus, a parallel port coupling a printer connector to the second ISA bus, a floppy controller coupling a floppy disk drive to the second ISA bus, a hard disk interface coupling a hard disk drive and a CD rom drive to the second ISA bus, a VL to ISA bridge coupling the VL bus to the second ISA bus, and a second communications port coupling an infrared (IR) port to the ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 45:
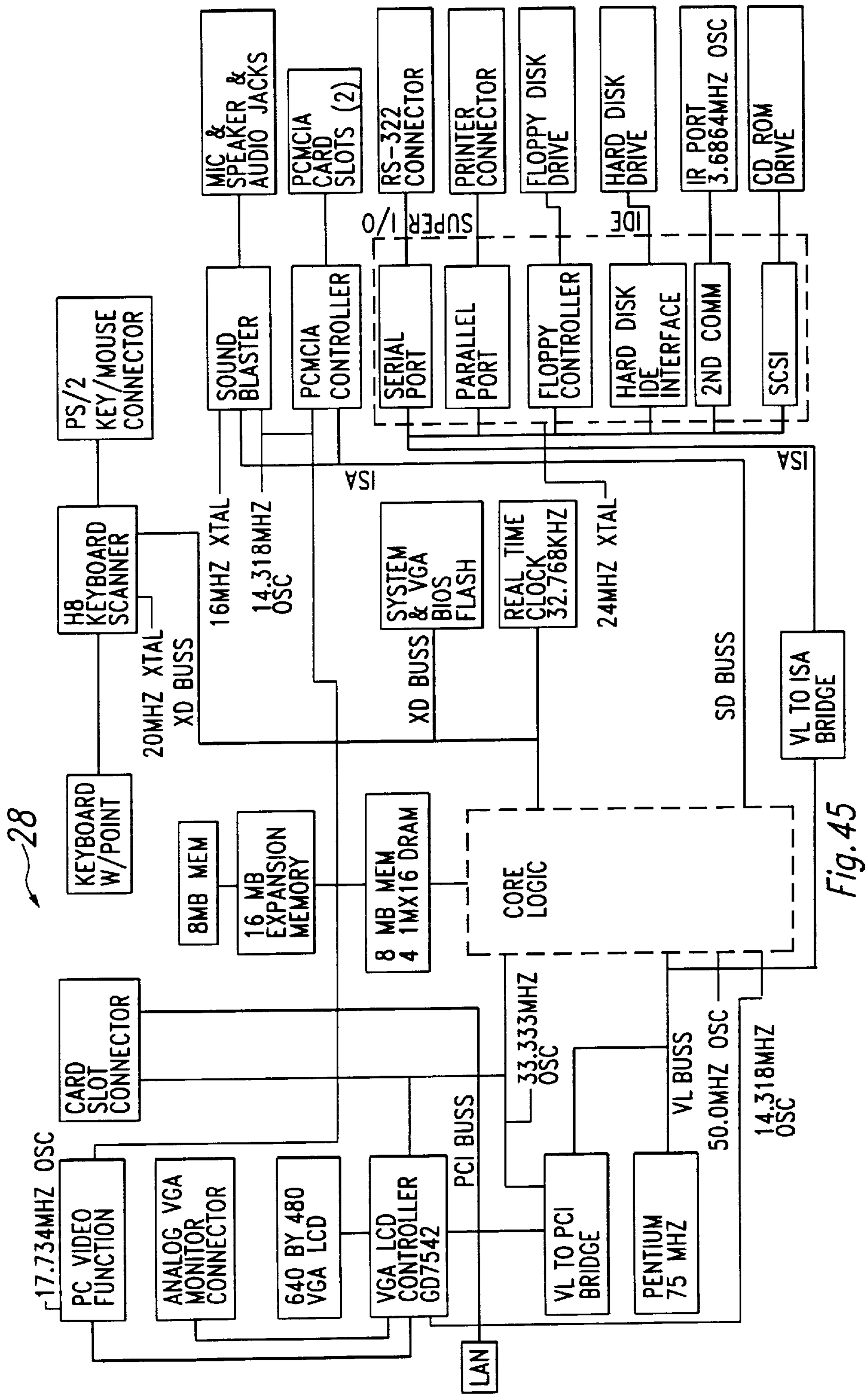

System card 28 illustrated in FIG. 45 also provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, a first ISA bus (SD bus), a sound blaster coupling microphone and speaker jacks to the first ISA bus, a PCMCIA controller coupling PCMCIA card slots to the first ISA bus, a serial port coupling an RS-232 connector to a second ISA bus, a parallel port coupling a printer connector to the second ISA bus, a floppy controller coupling a floppy disk drive to the second ISA bus, a hard disk interface coupling a hard disk drive to the second ISA bus, an SCSI device coupling a CD rom drive to the second ISA bus, a VL to ISA bridge coupling the VL bus to the second ISA bus, and a second communications port coupling an infrared (IR) port to the first ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 46:
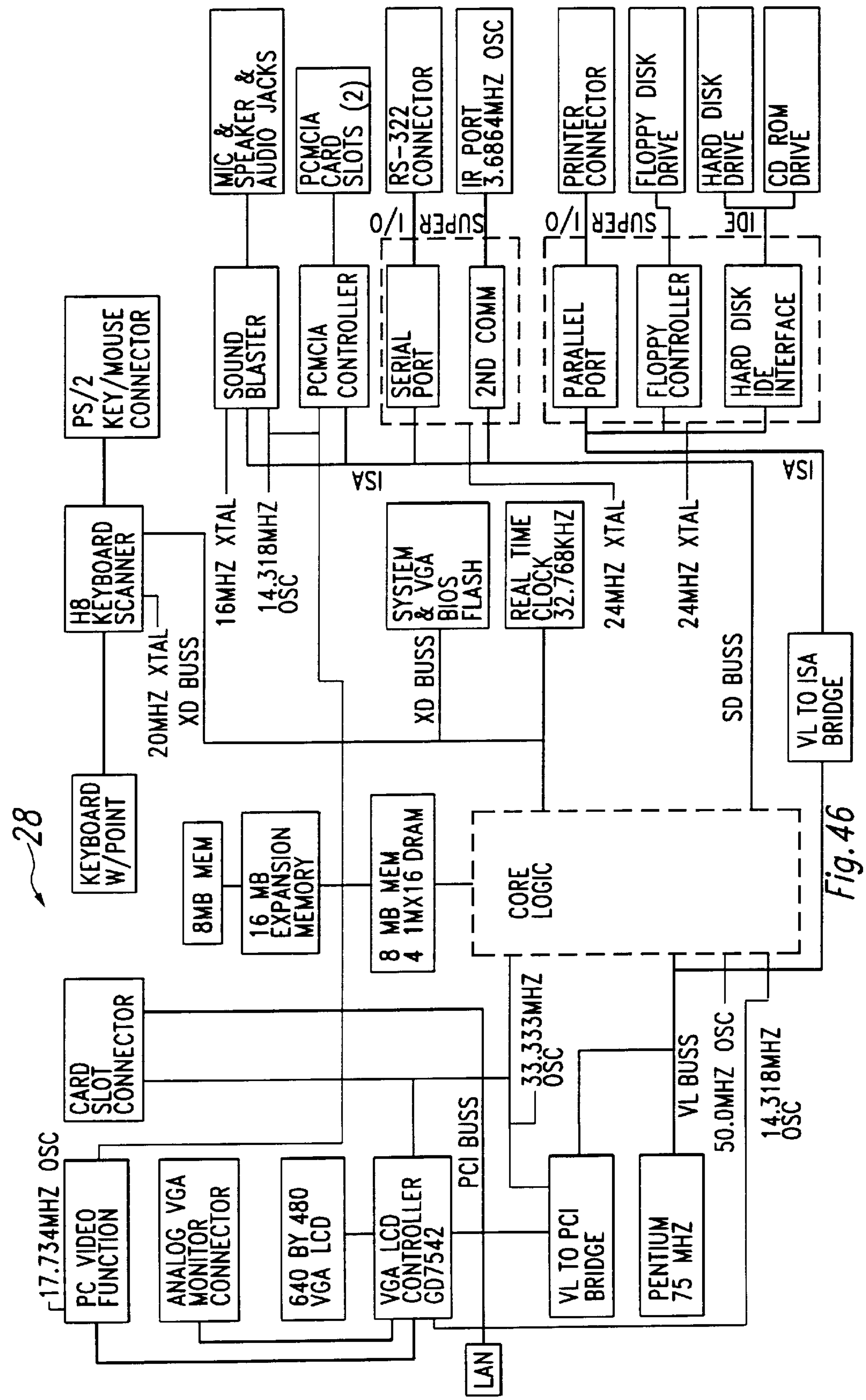

The system card 28 illustrated in FIG. 46 similarly provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, a first ISA bus (SD bus), a sound blaster coupling microphone and speaker jacks to the first ISA bus, a PCMCIA controller coupling PCMCIA card slots to the first ISA bus, a serial port coupling an RS-232 connector to the first ISA bus, a parallel port coupling a printer connector to the second ISA bus, a floppy controller coupling a floppy disk drive to the second ISA bus, a hard disk interface coupling a hard disk drive and a CD rom drive to the second ISA bus, a VL to ISA bridge coupling the VL bus to the second ISA bus, and a second communications port coupling an infrared (IR) port to the first ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 47:
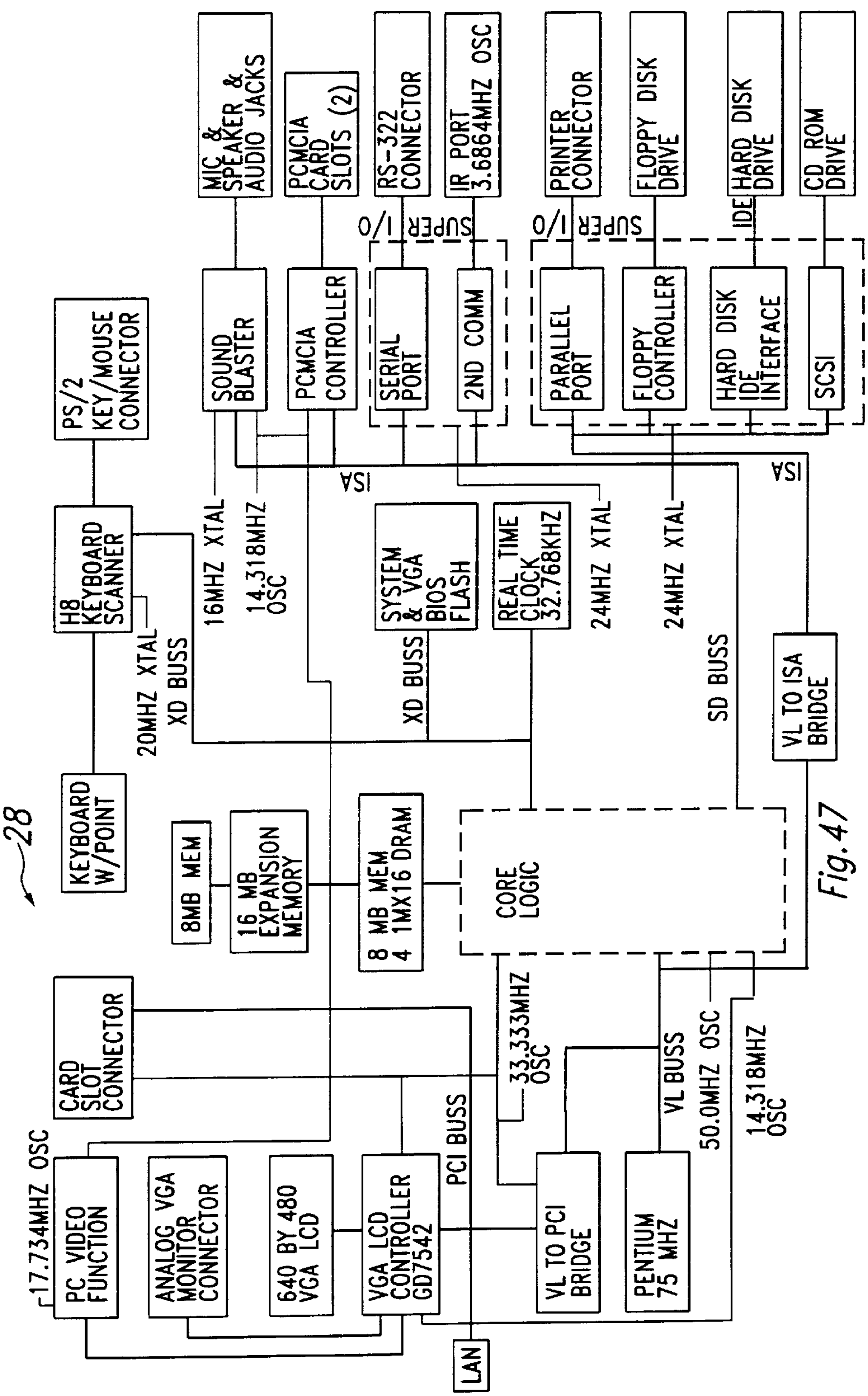

System card 28 illustrated in FIG. 47 provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, a first ISA bus (SD bus), a sound blaster coupling microphone and speaker jacks coupled to the first ISA bus, a PCMCIA controller coupling PCMCIA card slots coupled to the first ISA bus, a serial port coupling an RS-232 connector to the first ISA bus, a parallel port coupling a printer connector to the second ISA bus, a floppy controller coupling a floppy disk drive to the second ISA bus, a hard disk interface coupling a hard disk drive to the second ISA bus, an SCSI device coupling a CD rom drive to the second ISA bus, a VL to ISA bridge coupling the VL bus to the second ISA bus, and a second communications port coupling an infrared (IR) port to the first ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 48:
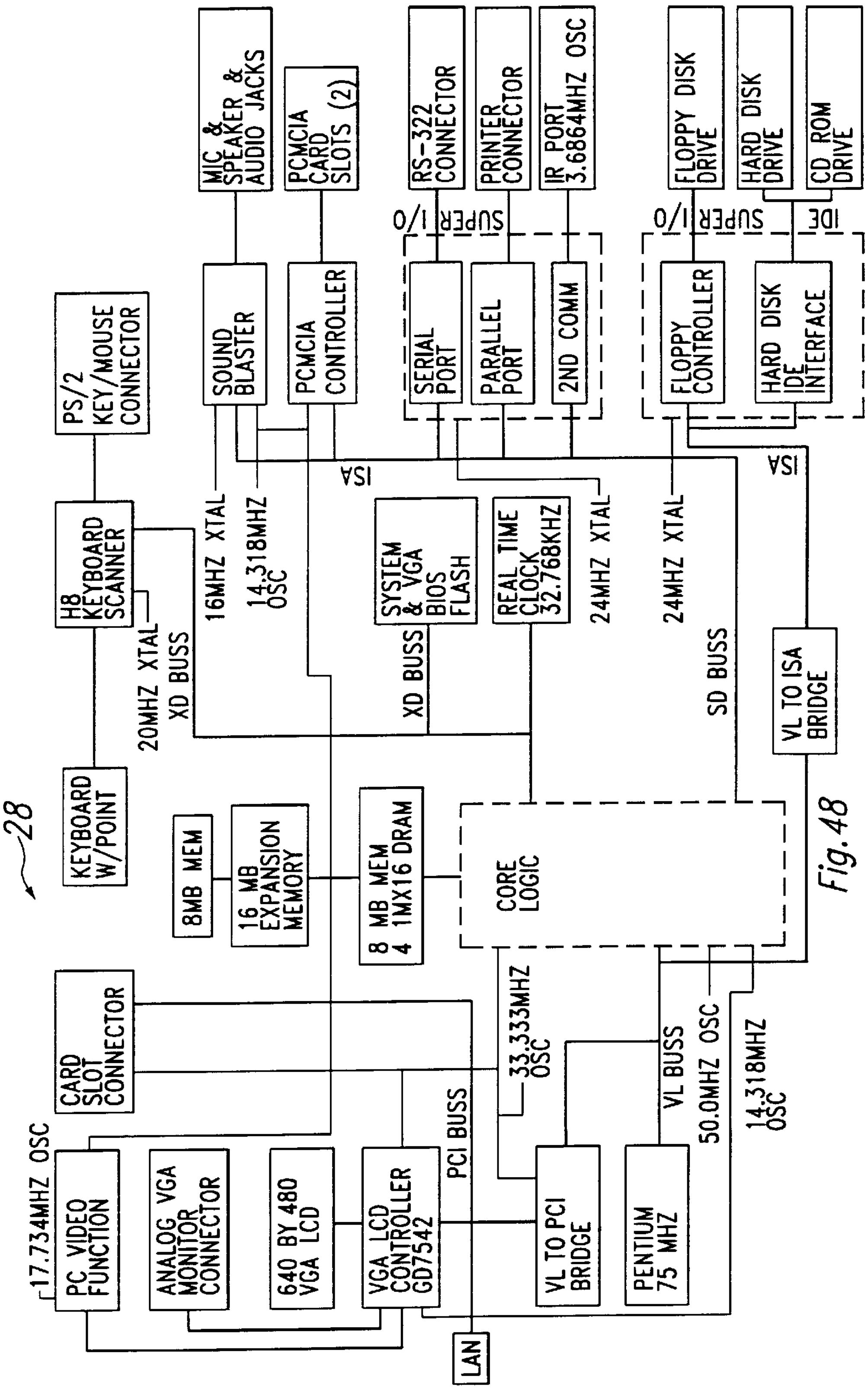

The system card 28 illustrated in FIG. 48 also provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, a first ISA bus (SD bus), a sound blaster coupling microphone and speaker jacks to the first ISA bus, a PCMCIA controller coupling PCMCIA card slots to the first ISA bus, a serial port coupling an RS-232 connector to the first ISA bus, a parallel port coupling a printer connector to the first ISA bus, a floppy controller coupling a floppy disk drive to the second ISA bus, a hard disk interface coupling a hard disk drive and a CD rom drive to the second ISA bus, a VL to ISA bridge coupling the VL bus to the second ISA bus, and a second communications port coupling an infrared (IR) port to the first ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 49:
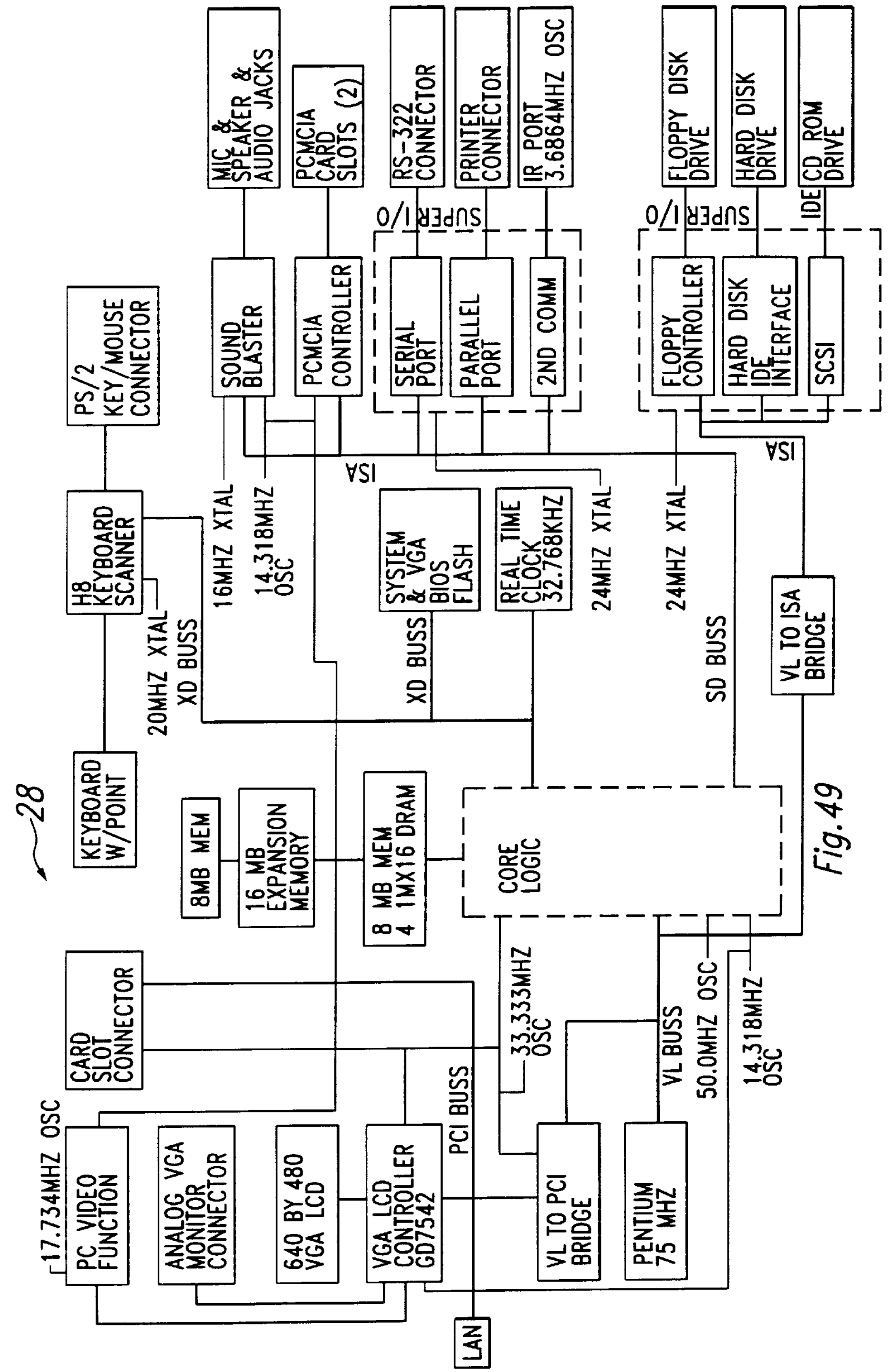

System card 28 illustrated in FIG. 49 similarly provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, a first ISA bus (SD bus), a sound blaster coupling microphone and speaker jacks coupled to the first ISA bus, a PCMCIA controller coupling PCMCIA card slots coupled to the first ISA bus, a serial port coupling an RS-232 connector to the first ISA bus, a parallel port coupling a printer connector to the first ISA bus, a floppy controller coupling a floppy disk drive to the second ISA bus, a hard disk interface coupling a hard disk drive to the second ISA bus, an SCSI device coupling a CD rom drive to the second ISA bus, a VL to ISA bridge coupling the VL bus to the second ISA bus, and a second communications port coupling an infrared (IR) port to the first ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 50:
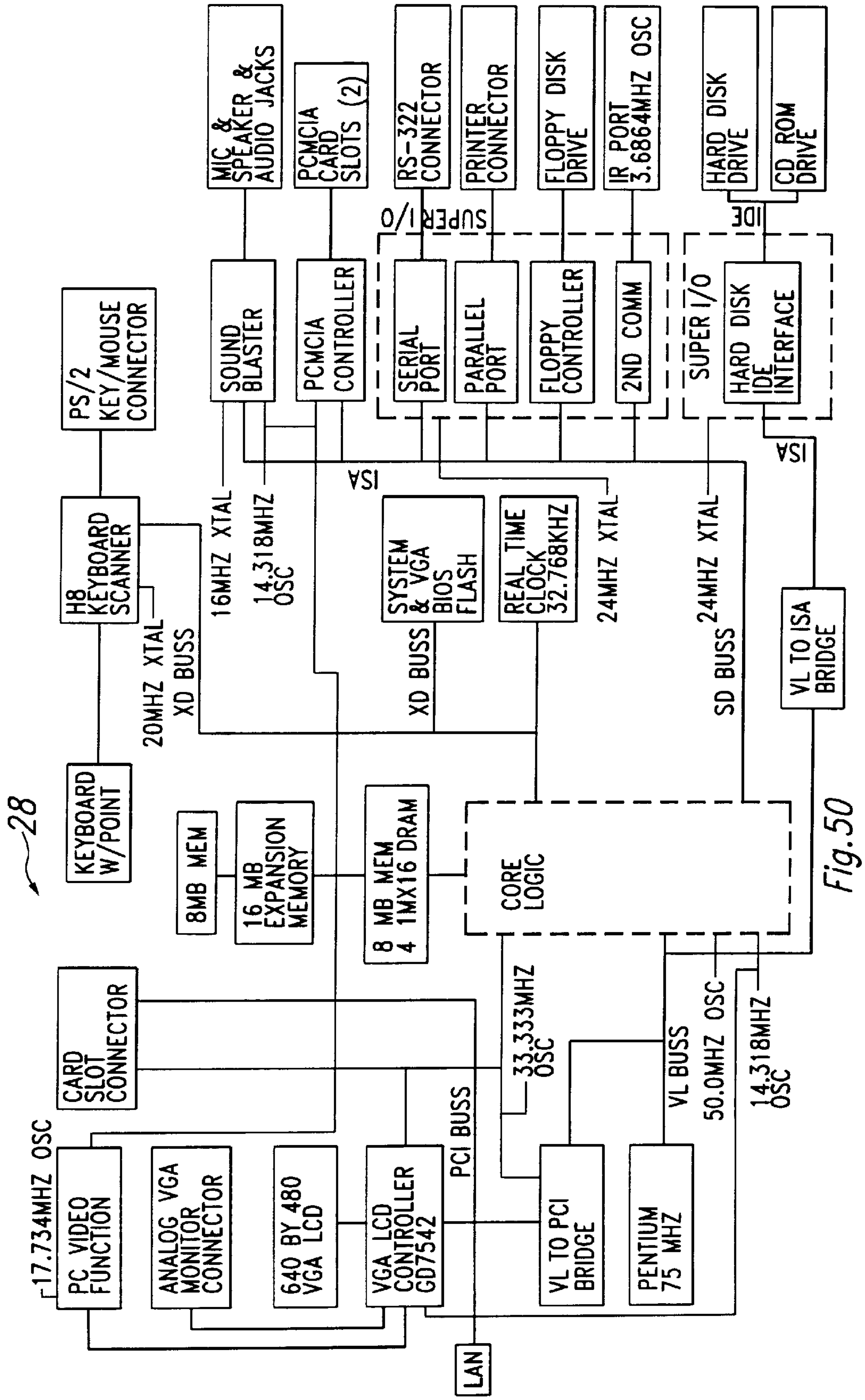

The system card 28 illustrated in FIG. 50 provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, a first ISA bus (SD bus), a sound blaster coupling microphone and speaker jacks to the first ISA bus, a PCMCIA controller coupling PCMCIA card slots to the first ISA bus, a serial port coupling an RS-232 connector to the first ISA bus, a parallel port coupling a printer connector to the first ISA bus, a floppy controller coupling a floppy disk drive to the first ISA bus, a hard disk interface coupling a hard disk drive and a CD rom drive to the second ISA bus, a VL to ISA bridge coupling the VL bus to the second ISA bus, and a second communications port coupling an infrared (IR) port to the first ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 51:
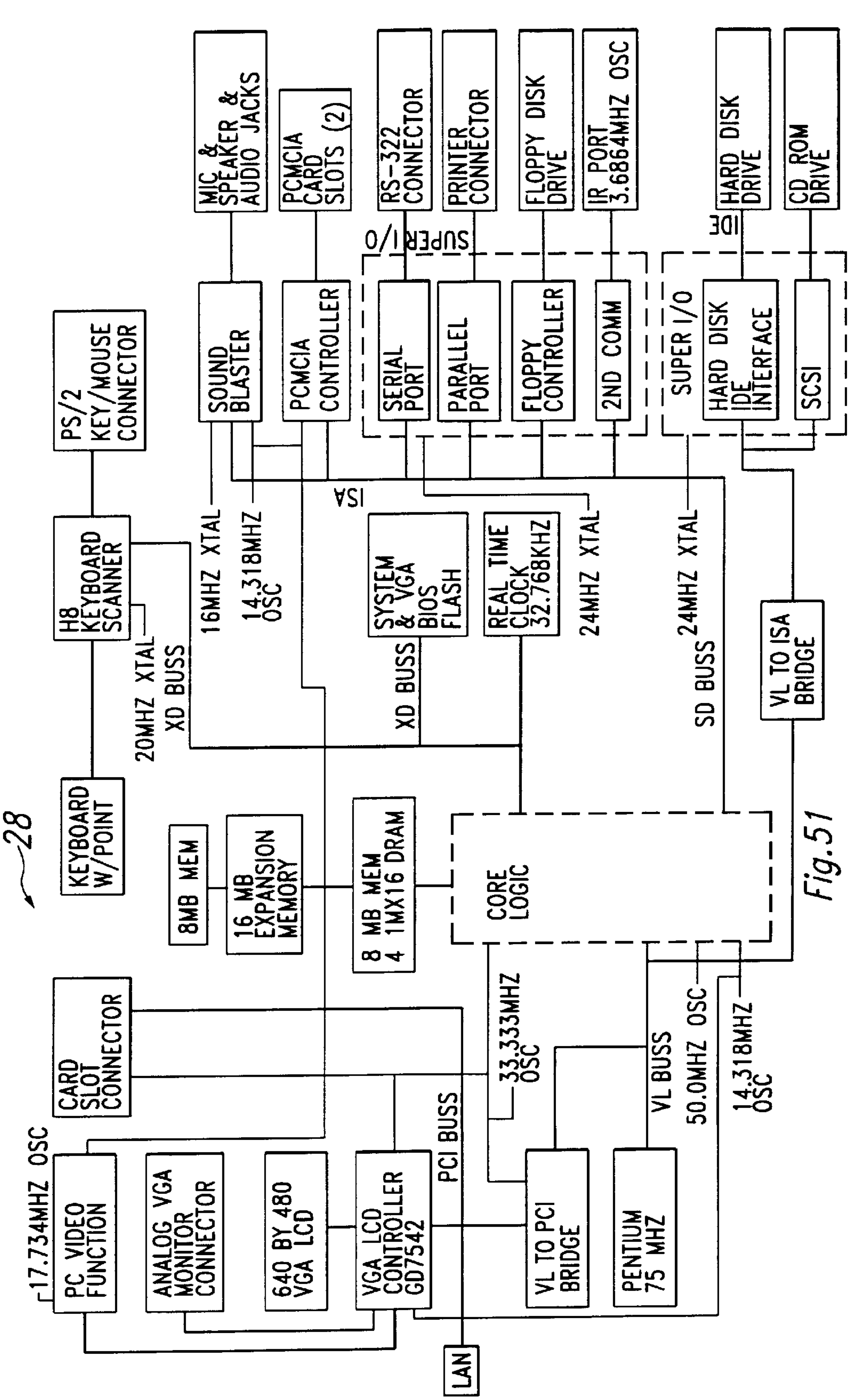

System card 28 illustrated in FIG. 51 also provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to the PCI bus, an XD bus coupling the keyboard scanner, system & VGA bios flash and real time clock to core logic, a first ISA bus (SD bus), a sound blaster coupling microphone and speaker jacks coupled to the first ISA bus, a PCMCIA controller coupling PCMCIA card slots coupled to the first ISA bus, a serial port coupling an RS-232 connector to the first ISA bus, a parallel port coupling a printer connector to the first ISA bus, a floppy controller coupling a floppy disk drive to the first ISA bus, a hard disk interface coupling a hard disk drive to the second ISA bus, an SCSI device coupling a CD rom drive to the second ISA bus, a VL to ISA bridge coupling the VL bus to the second ISA bus, and a second communications port coupling an infrared (IR) port to the first ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 52:
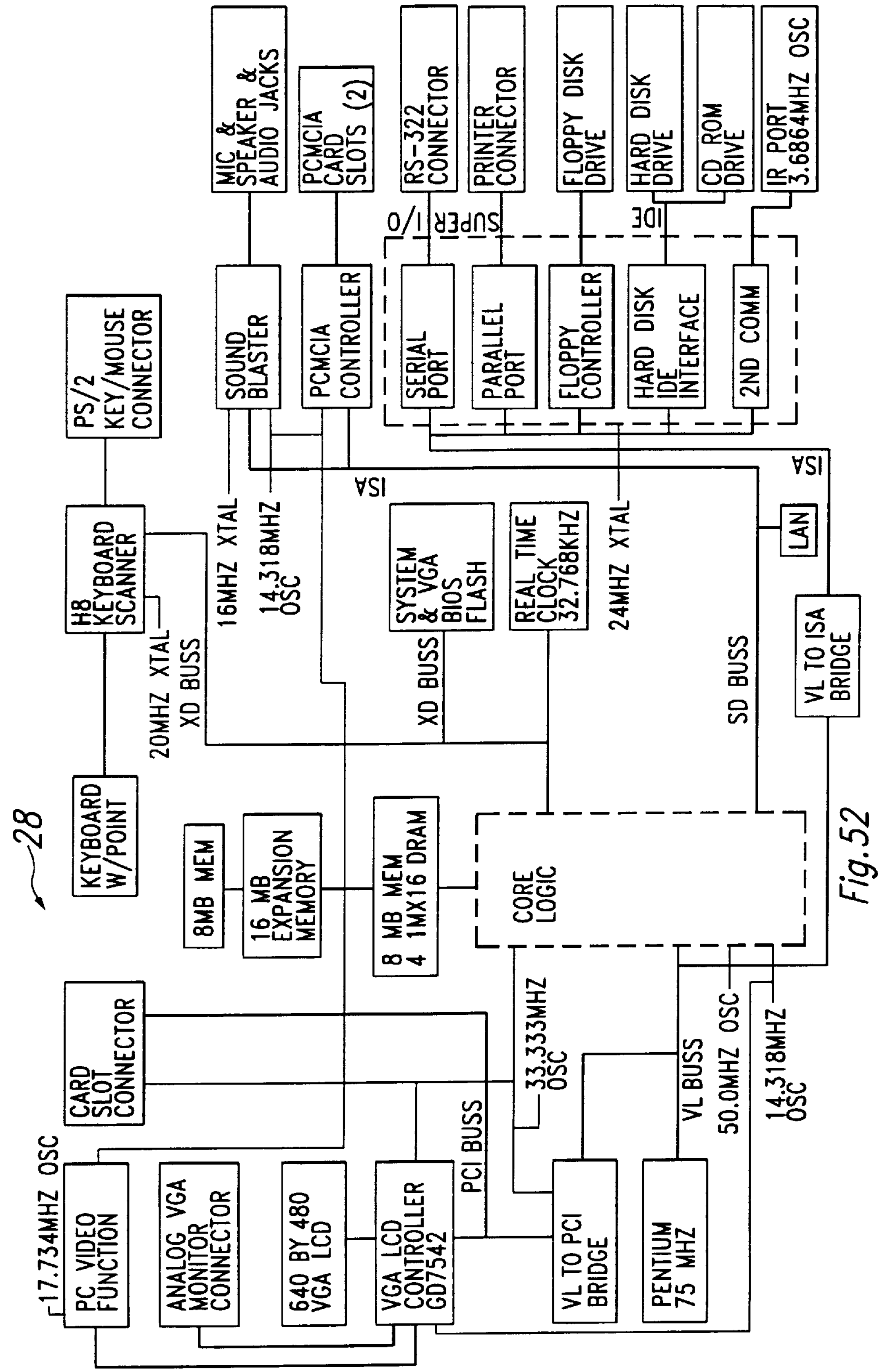

The system card 28 illustrated in FIG. 52 similarly provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to a first ISA bus (SD bus), an XD bus coupling the keyboard scanner, system & VGA bios flash and real time clock to core logic, a sound blaster coupling microphone and speaker jacks to the first ISA bus, a PCMCIA controller coupling PCMCIA card slots to the first ISA bus, a serial port coupling an RS-232 connector to the second ISA bus, a parallel port coupling a printer connector to the second ISA bus, a floppy controller coupling a floppy disk drive to the second ISA bus, a hard disk interface coupling a hard disk drive and a CD rom drive to the second ISA bus, a VL to ISA bridge coupling the VL bus to the second ISA bus, and a second communications port coupling an infrared (IR) port to the second ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 53:
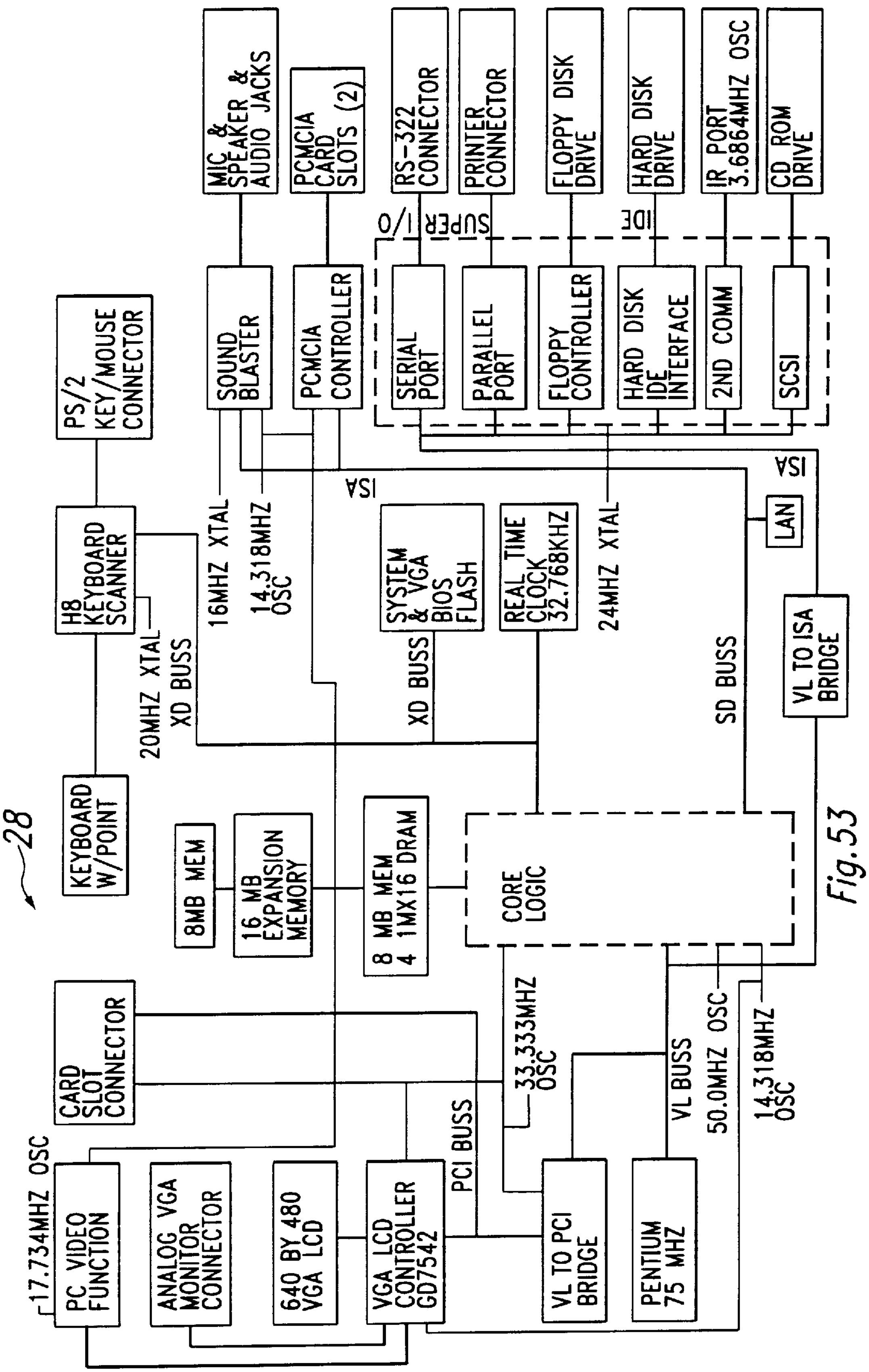

System card 28 illustrated in FIG. 53 provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to a first ISA bus (SD bus), an XD bus coupling the keyboard scanner, system & VGA bios flash and real time clock to core logic, a sound blaster coupling microphone and speaker jacks to the first ISA bus, a PCMCIA controller coupling PCMCIA card slots to the first ISA bus, a serial port coupling an RS-232 connector to the second ISA bus, a parallel port coupling a printer connector to the second ISA bus, a floppy controller coupling a floppy disk drive to the second ISA bus, a hard disk interface coupling a hard disk drive to the second ISA bus, an SCSI device coupling a CD rom drive to the second ISA bus, a VL to ISA bridge coupling the VL bus to the second ISA bus, and a second communications port coupling an infrared (IR) port to the second ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 54:
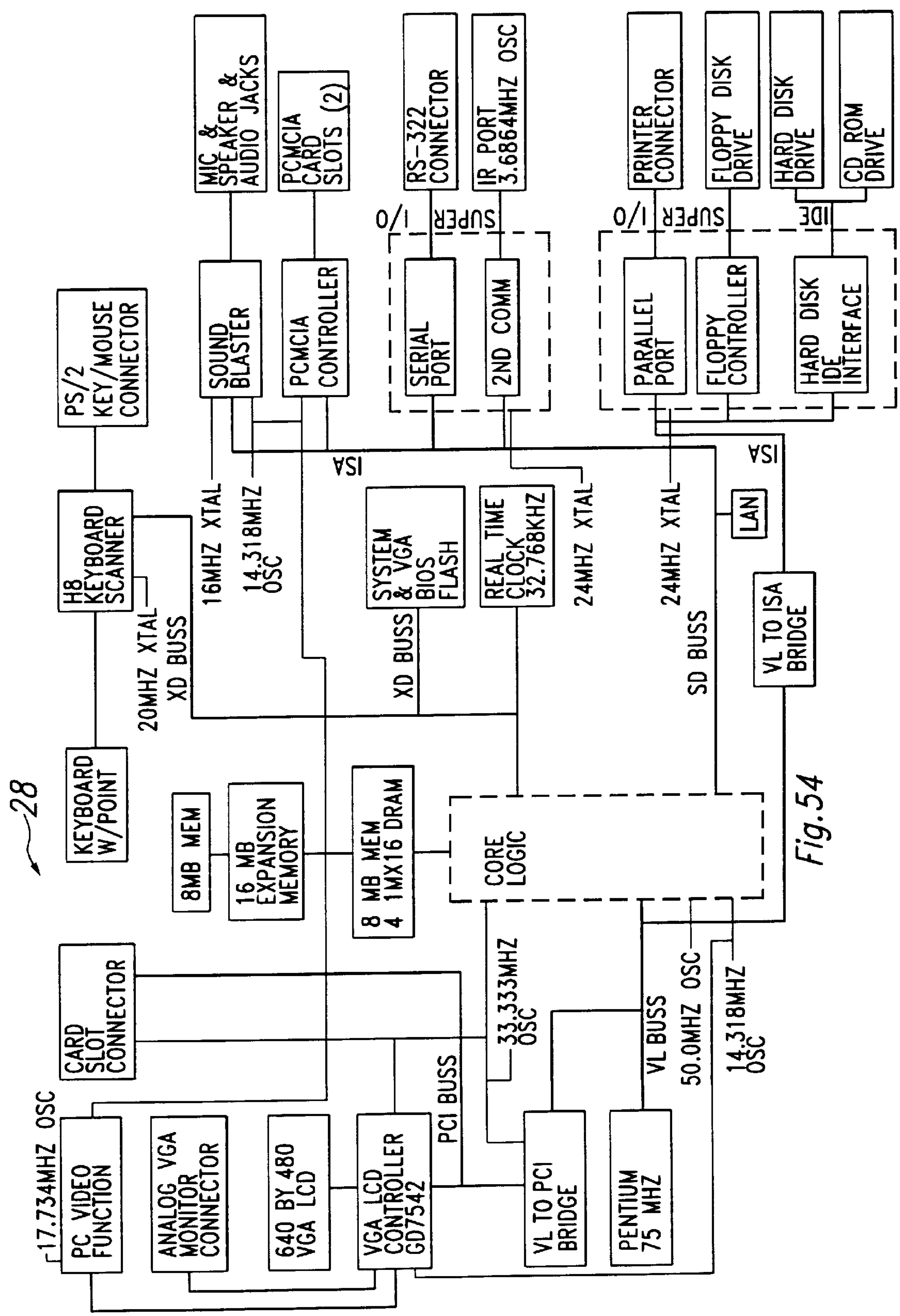

The system card 28 illustrated in FIG. 54 also provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to a first ISA bus (SD bus), an XD bus coupling the keyboard scanner, system & VGA bios flash and real time clock to core logic, a sound blaster coupling microphone and speaker jacks to the first ISA bus, a PCMCIA controller coupling PCMCIA card slots to the first ISA bus, a serial port coupling an RS-232 connector to the first ISA bus, a parallel port coupling a printer connector to the second ISA bus, a floppy controller coupling a floppy disk drive to the second ISA bus, a hard disk interface coupling a hard disk drive and a CD rom drive to the second ISA bus, a VL to ISA bridge coupling the VL bus to the second ISA bus, and a second communications port coupling an infrared (IR) port to the first ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 55:
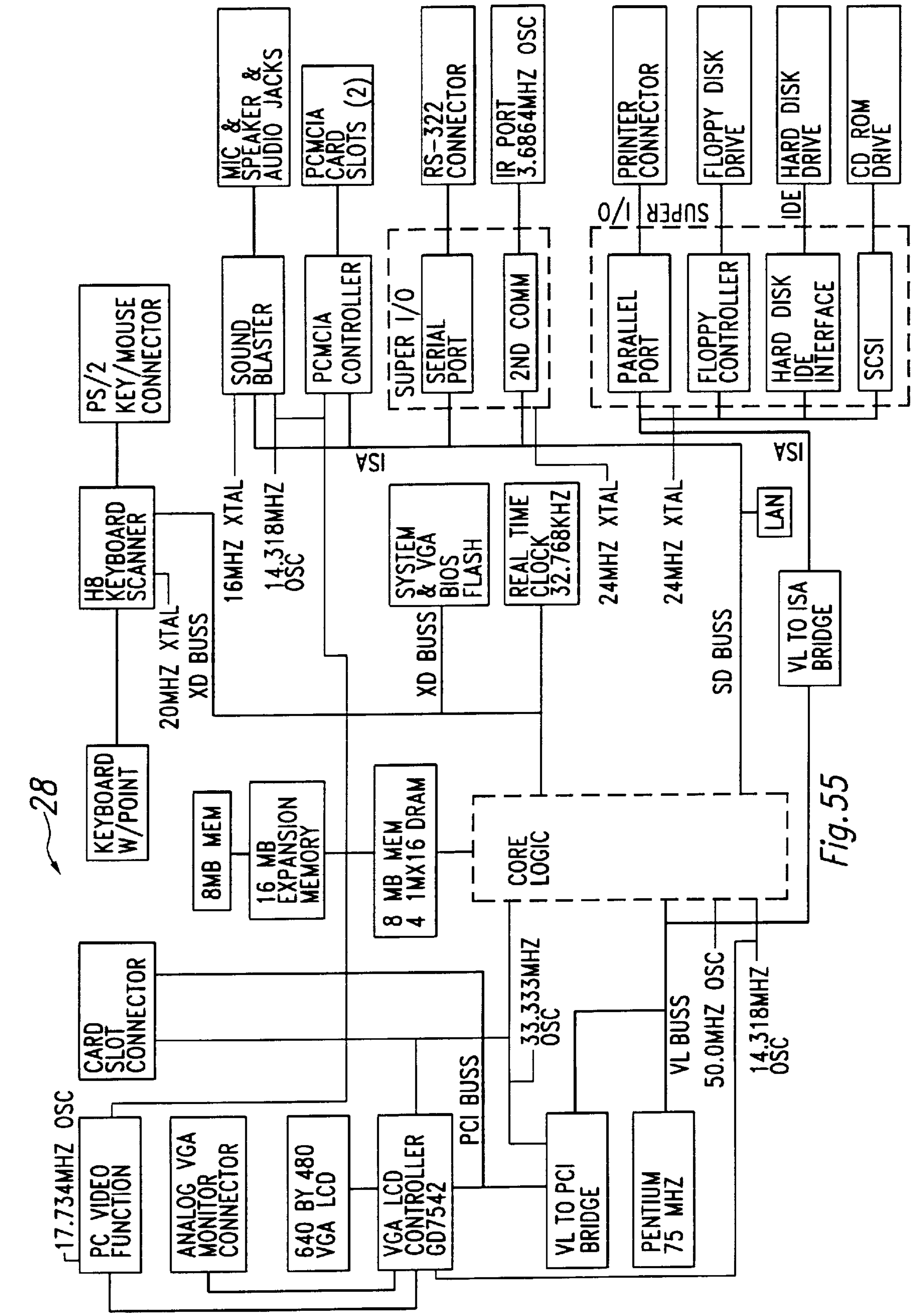

System card 28 illustrated in FIG. 55 similarly provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to a first ISA bus (SD bus), an XD bus coupling the keyboard scanner, system & VGA bios flash and real time clock to core logic, a sound blaster coupling microphone and speaker jacks to the first ISA bus, a PCMCIA controller coupling PCMCIA card slots to the first ISA bus, a serial port coupling an RS-232 connector to the first ISA bus, a parallel port coupling a printer connector to the second ISA bus, a floppy controller coupling a floppy disk drive to the second ISA bus, a hard disk interface coupling a hard disk drive to the second ISA bus, an SCSI device coupling a CD rom drive to the second ISA bus, a VL to ISA bridge coupling the VL bus to the second ISA bus, and a second communications port coupling an infrared (IR) port to the first ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 56:
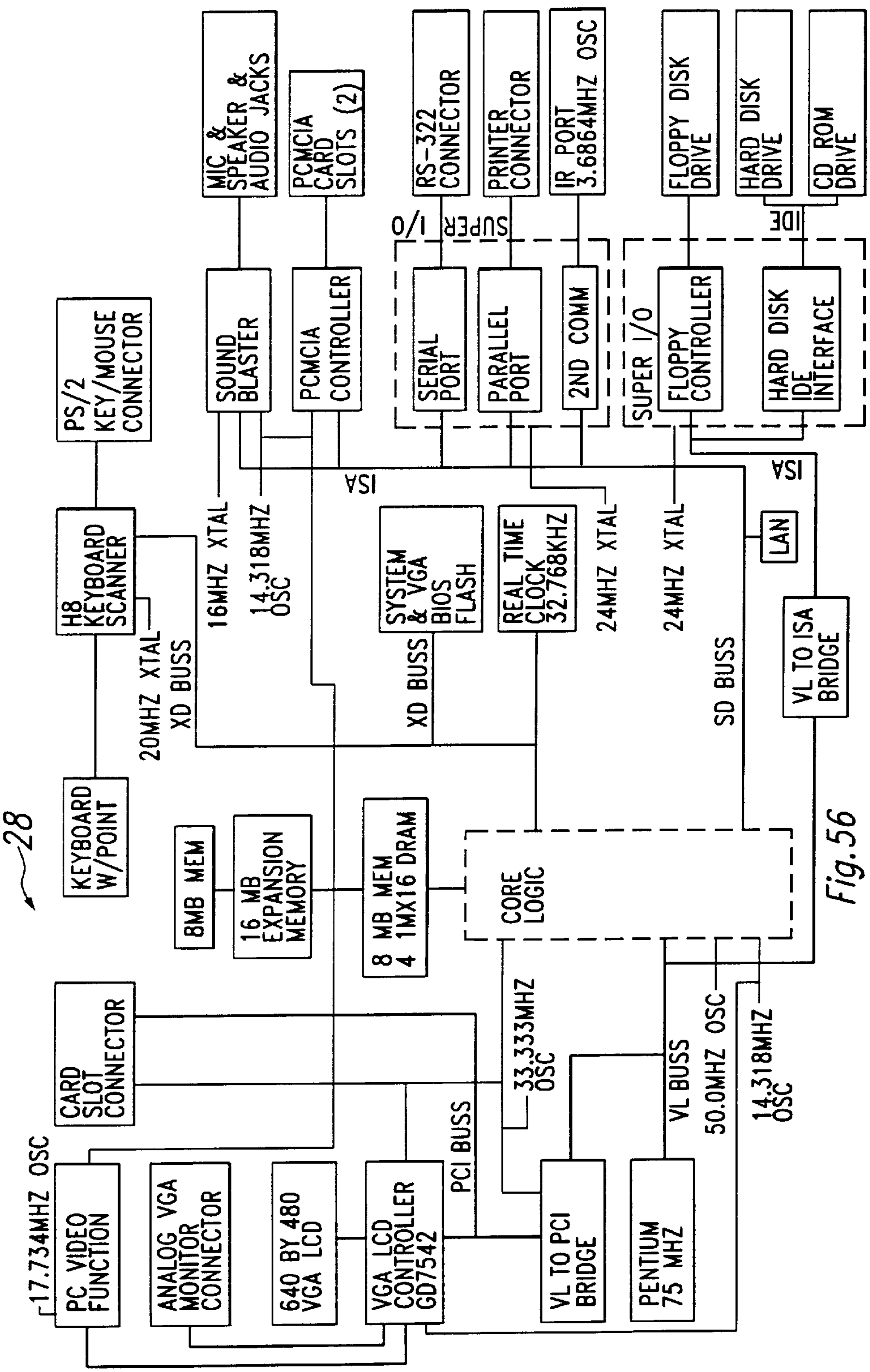

The system card 28 illustrated in FIG. 56 provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to a first ISA bus (SD bus), an XD bus coupling the keyboard scanner, system & VGA bios flash and real time clock to core logic, a sound blaster coupling microphone and speaker jacks to the first ISA bus, a PCMCIA controller coupling PCMCIA card slots to the first ISA bus, a serial port coupling an RS-232 connector to the first ISA bus, a parallel port coupling a printer connector to the first ISA bus, a floppy controller coupling a floppy disk drive to the second ISA bus, a hard disk interface coupling a hard disk drive and a CD rom drive to the second ISA bus, a VL to ISA bridge coupling the VL bus to the second ISA bus, and a second communications port coupling an infrared (IR) port to the first ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 57:
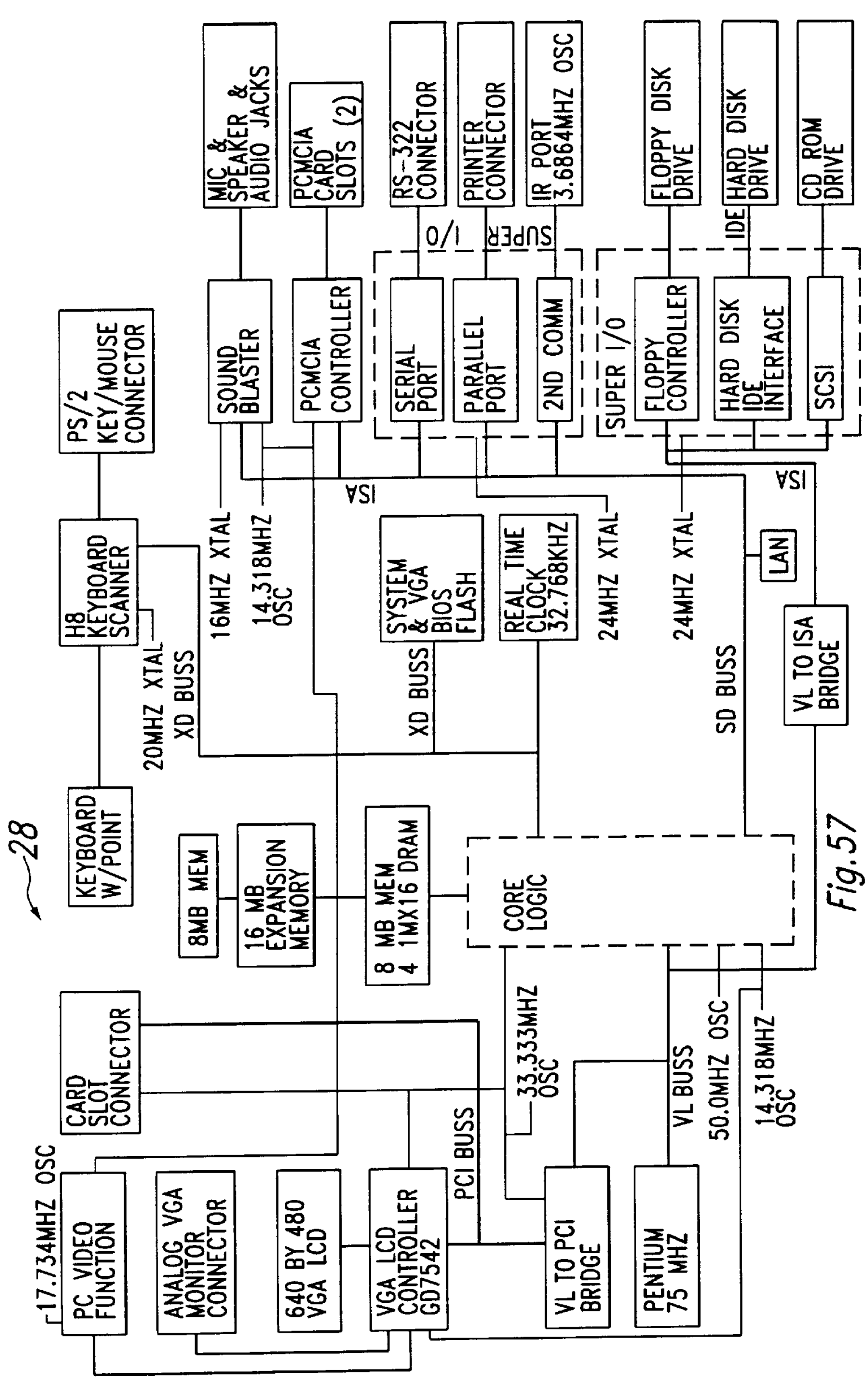

System card 28 illustrated in FIG. 57 also provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to a first ISA bus (SD bus), an XD bus coupling the keyboard scanner, system & VGA bios flash and real time clock to core logic, a sound blaster coupling microphone and speaker jacks to the first ISA bus, a PCMCIA controller coupling PCMCIA card slots to the first ISA bus, a serial port coupling an RS-232 connector to the first ISA bus, a parallel port coupling a printer connector to the first ISA bus, a floppy controller coupling a floppy disk drive to the second ISA bus, a hard disk interface coupling a hard disk drive to the second ISA bus, an SCSI device coupling a CD rom drive to the second ISA bus, a VL to ISA bridge coupling the VL bus to the second ISA bus, and a second communications port coupling an infrared (IR) port to the first ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 58:
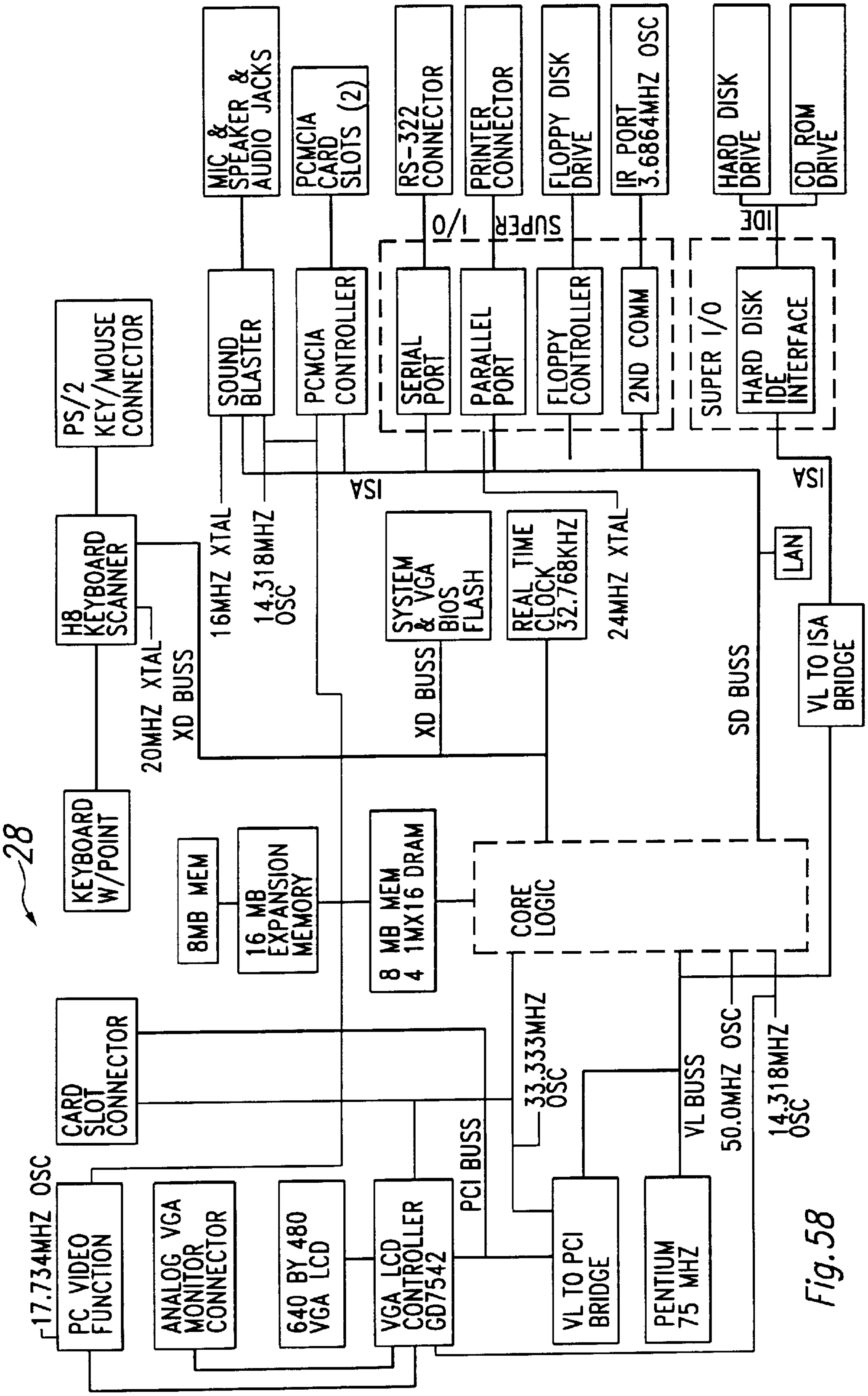

The system card 28 illustrated in FIG. 58 similarly provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to a first ISA bus (SD bus), an XD bus coupling the keyboard scanner, system & VGA bios flash and real time clock to core logic, a sound blaster coupling microphone and speaker jacks to the first ISA bus, a PCMCIA controller coupling PCMCIA card slots to the first ISA bus, a serial port coupling an RS-232 connector to the first ISA bus, a parallel port coupling a printer connector to the first ISA bus, a floppy controller coupling a floppy disk drive to the first ISA bus, a hard disk interface coupling a hard disk drive and a CD rom drive to the second ISA bus, a VL to ISA bridge coupling the VL bus to the second ISA bus, and a second communications port coupling an infrared (IR) port to the first ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 59:
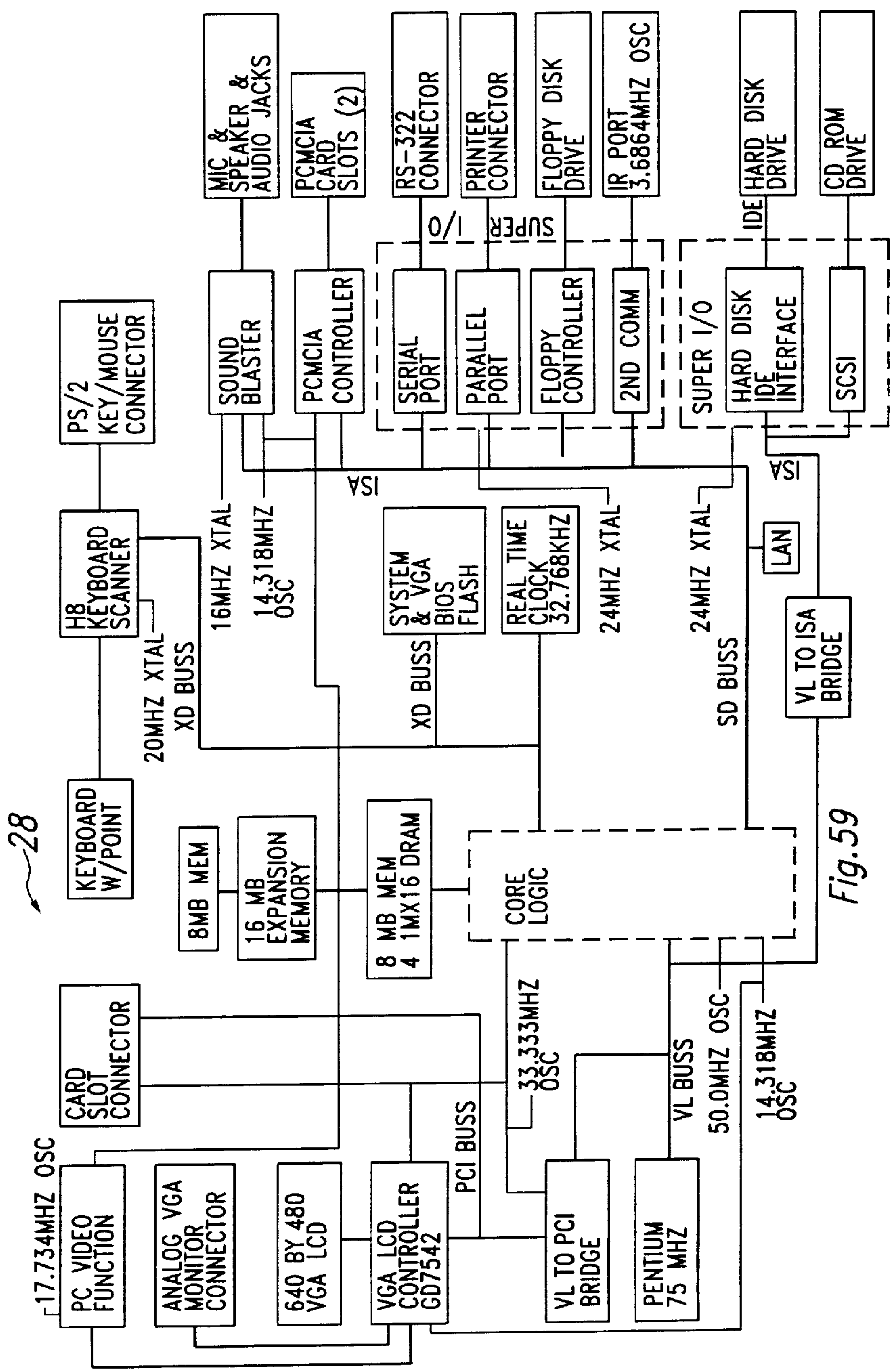

System card 28 illustrated in FIG. 59 provides a robust range of PC (personal computer) capability. The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a local area network (LAN) coupled to a first ISA bus (SD bus), an XD bus coupling the keyboard scanner, system & VGA bios flash and real time clock to core logic, a sound blaster coupling microphone and speaker jacks to the first ISA bus, a PCMCIA controller coupling PCMCIA card slots to the first ISA bus, a serial port coupling an RS-232 connector to the first ISA bus, a parallel port coupling a printer connector to the first ISA bus, a floppy controller coupling a floppy disk drive to the first ISA bus, a hard disk interface coupling a hard disk drive to the second ISA bus, an SCSI device coupling a CD rom drive to the second ISA bus, a VL to ISA bridge coupling the VL bus to the second ISA bus, and a second communications port coupling an infrared (IR) port to the first ISA bus. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 60:
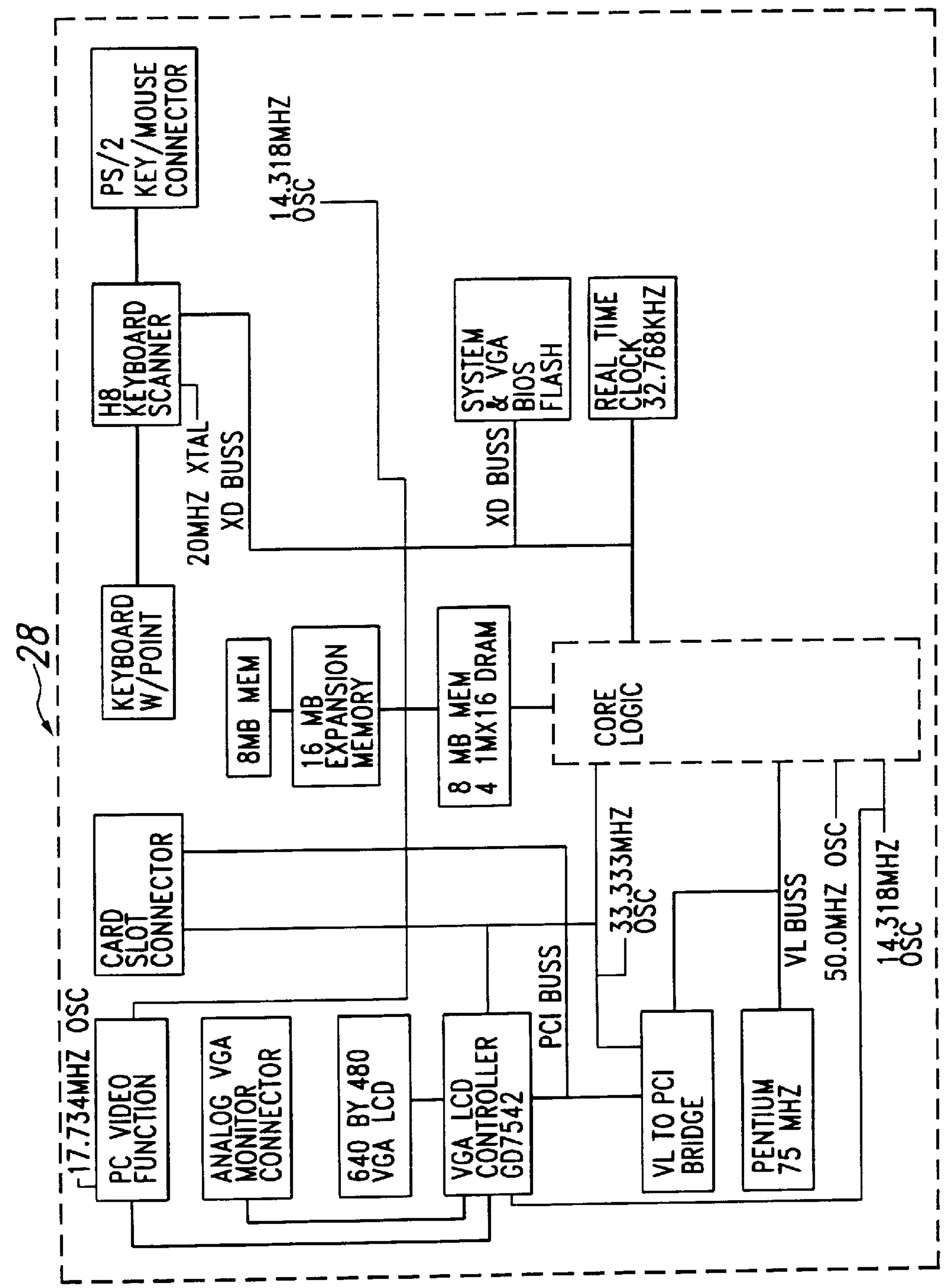

The system card 28 illustrated in FIG. 60 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a keyboard and a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 61:
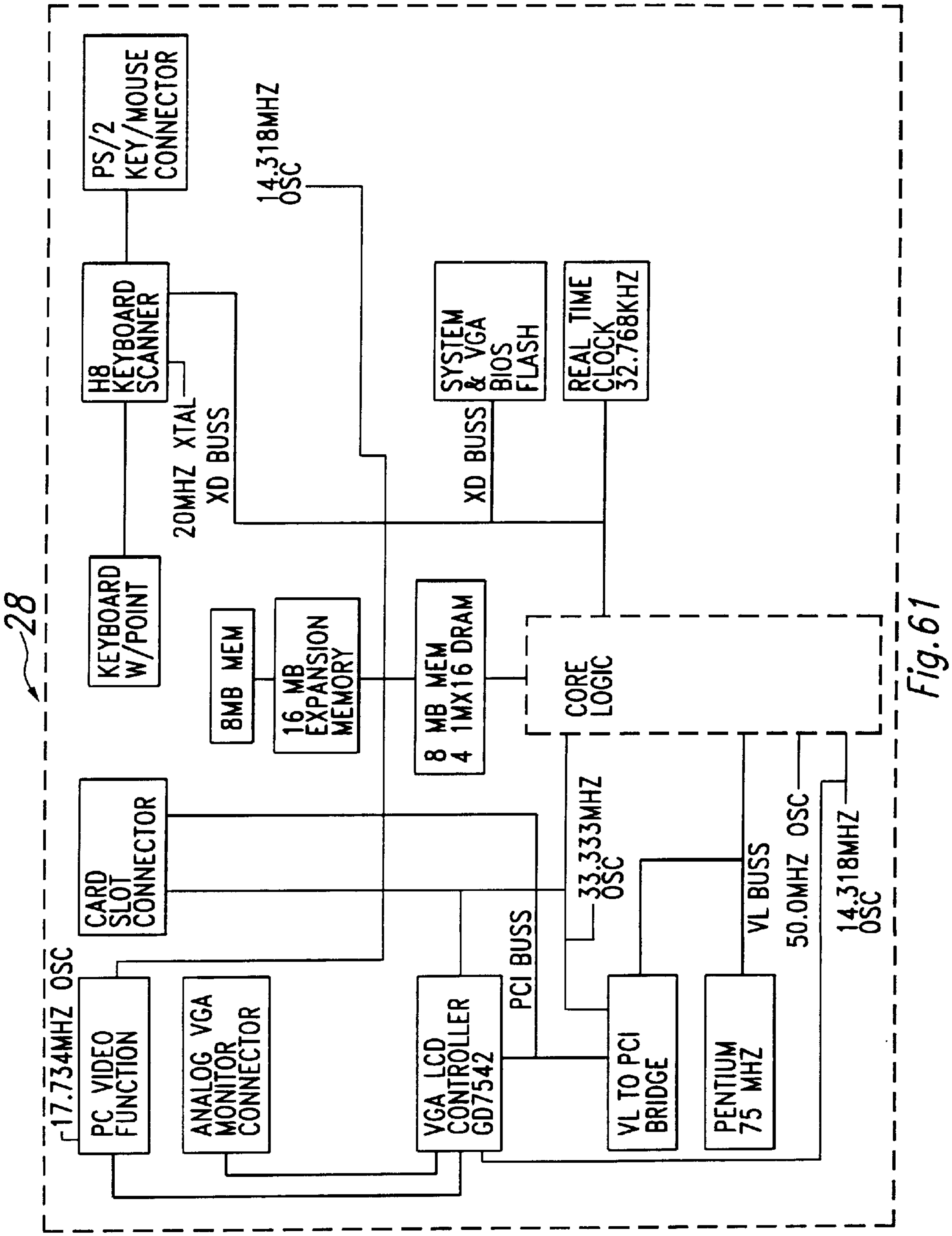

System card 28 illustrated in FIG. 61 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, a controller coupling an analog VGA monitor connector and a PC video function to the PCI bus, a keyboard and a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 62:
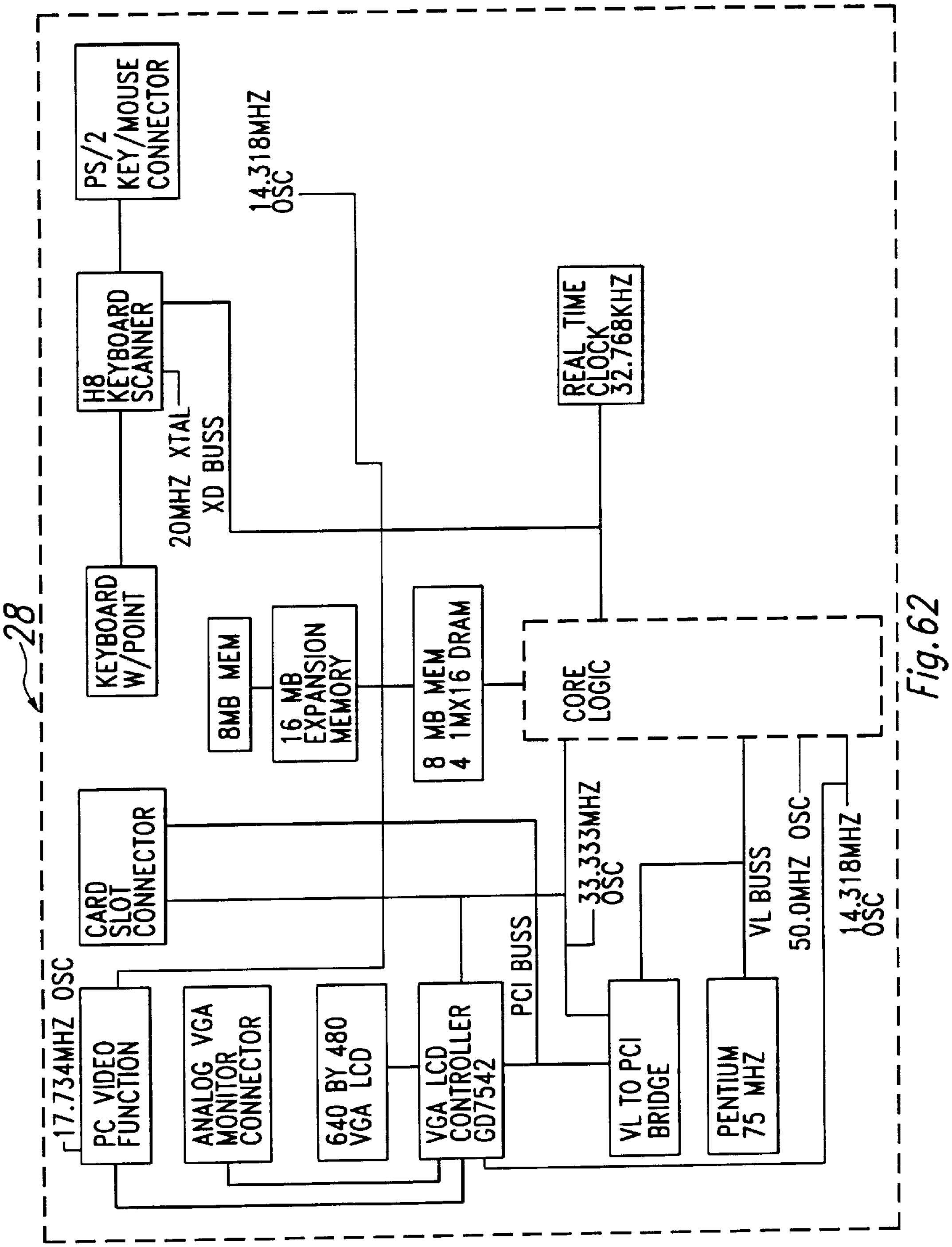

The system card 28 illustrated in FIG. 62 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, an LCD monitor/controller coupling a analog VGA monitor connector, a PC video function and a VGA LCD to the PCI bus, a keyboard and a key/mouse connector coupled to a keyboard scanner and an XD bus coupling the keyboard scanner and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 63:
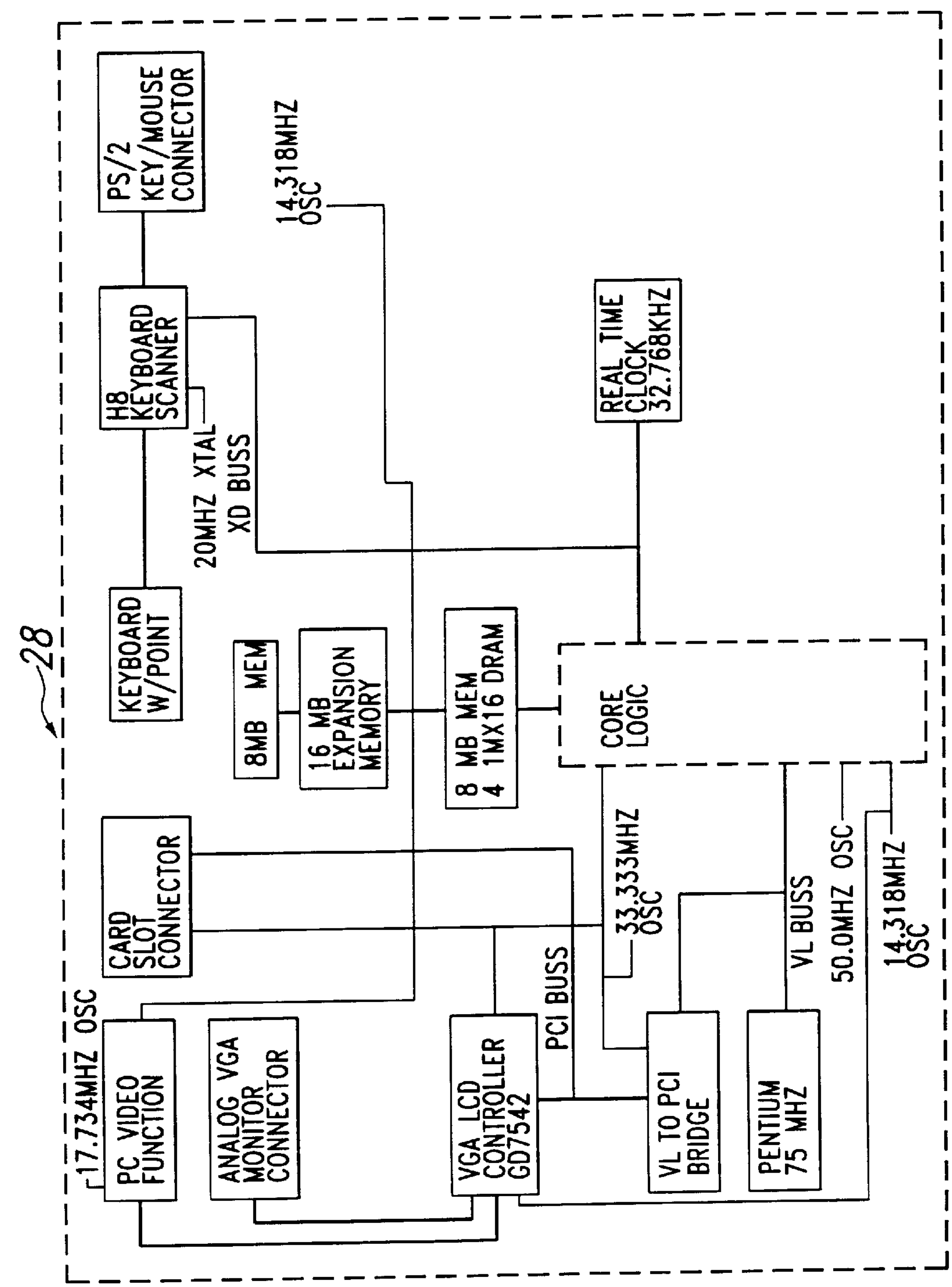

System card 28 illustrated in FIG. 63 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, a controller coupling an analog VGA monitor connector and a PC video function to the PCI bus, a keyboard and a key/mouse connector coupled to a keyboard scanner and an XD bus coupling the keyboard scanner and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 64:
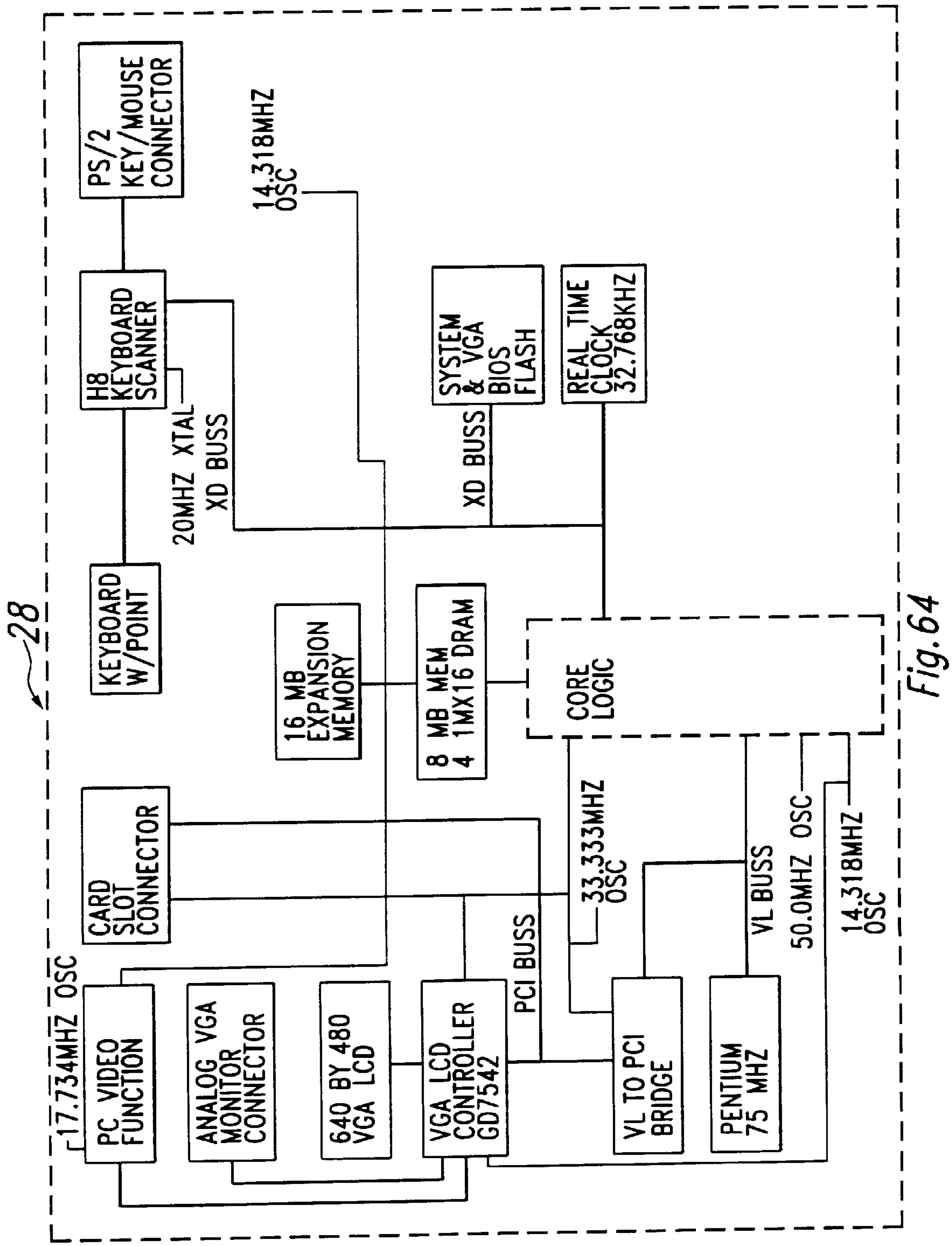

The system card 28 illustrated in FIG. 64 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory to the core logic, an LCD monitor/controller coupling a analog VGA monitor connector, a PC video function and a VGA LCD to the PCI bus, a keyboard and a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 65:
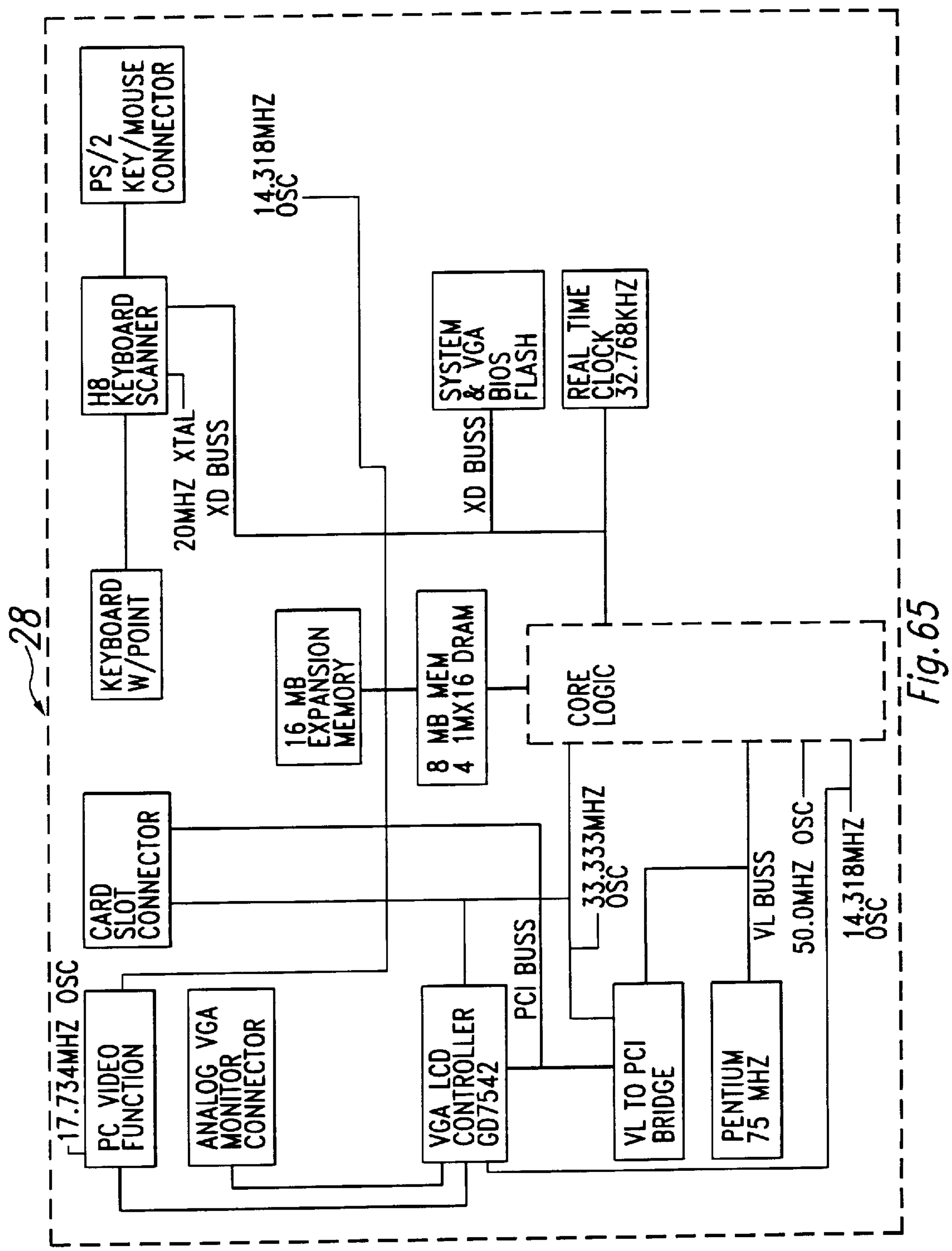

System card 28 illustrated in FIG. 65 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory to the core logic, a controller coupling an analog VGA monitor connector and a PC video function to the PCI bus, a keyboard and a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 66:
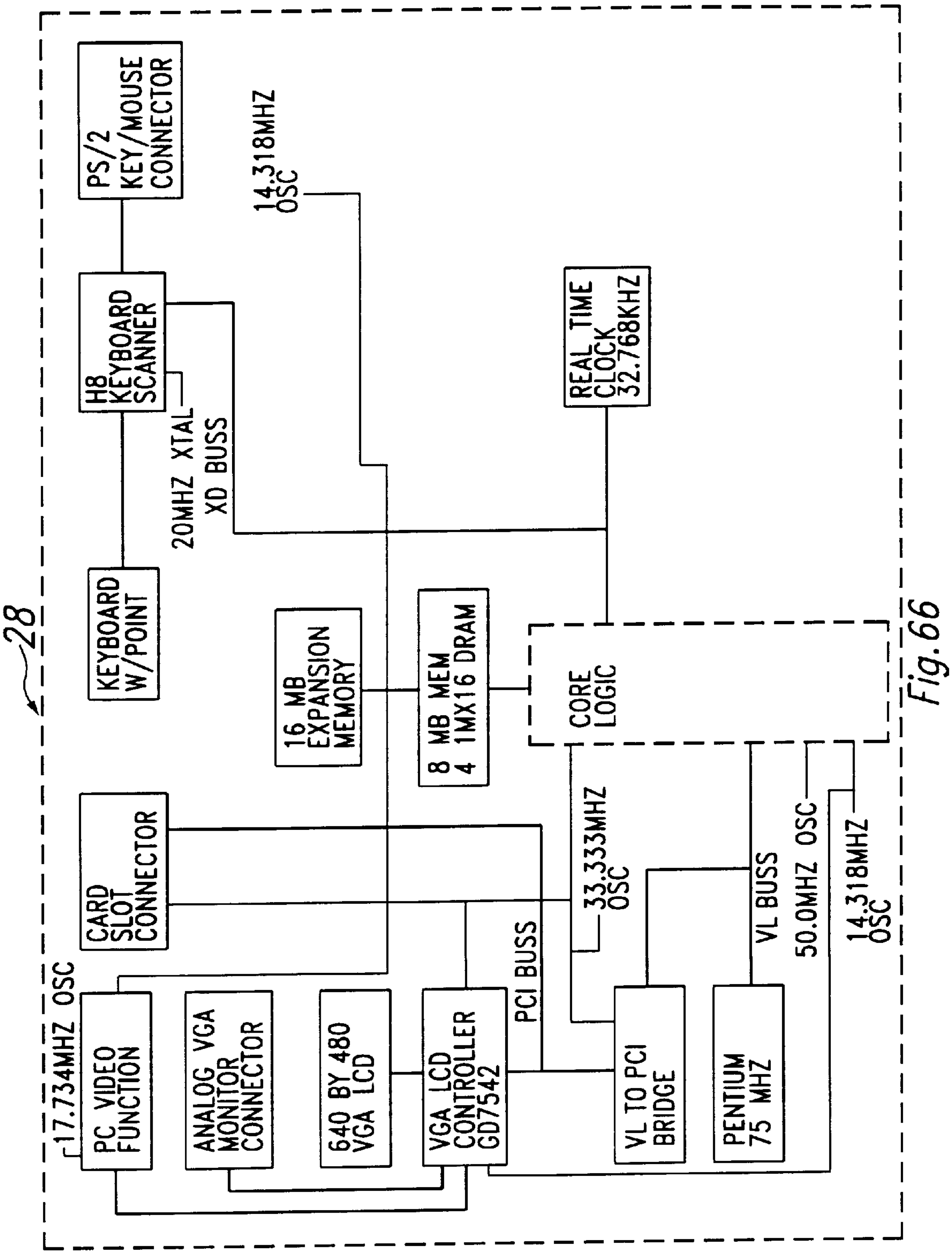

The system card 28 illustrated in FIG. 66 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory to the core logic, an LCD monitor/controller coupling a analog VGA monitor connector, a PC video function and a VGA LCD to the PCI bus, a keyboard and a key/mouse connector coupled to a keyboard scanner and an XD bus coupling the keyboard scanner and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 67:
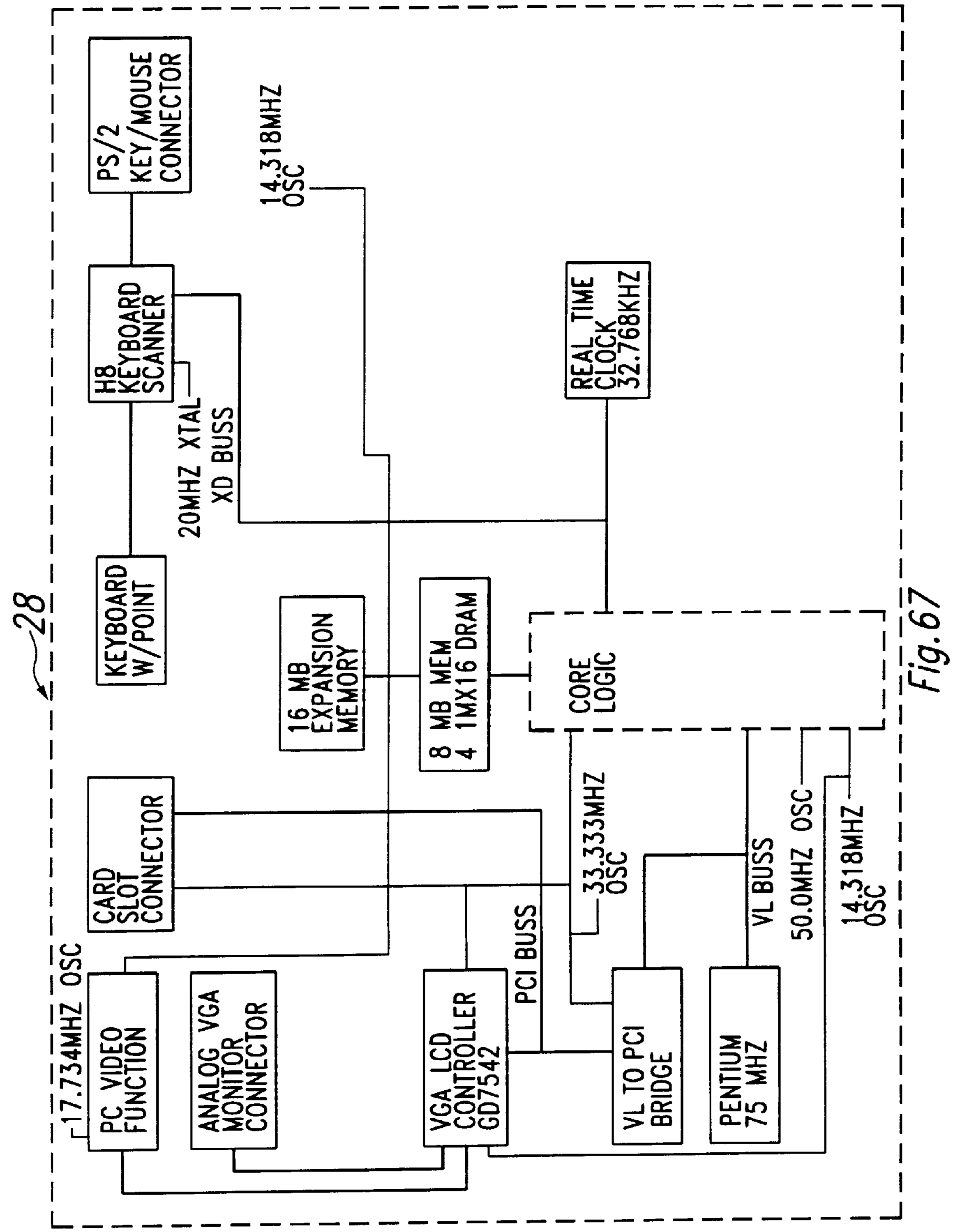

System card 28 illustrated in FIG. 67 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory to the core logic, a controller coupling an analog VGA monitor connector and a PC video function to the PCI bus, a keyboard and a key/mouse connector coupled to a keyboard scanner and an XD bus coupling the keyboard scanner and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 68:
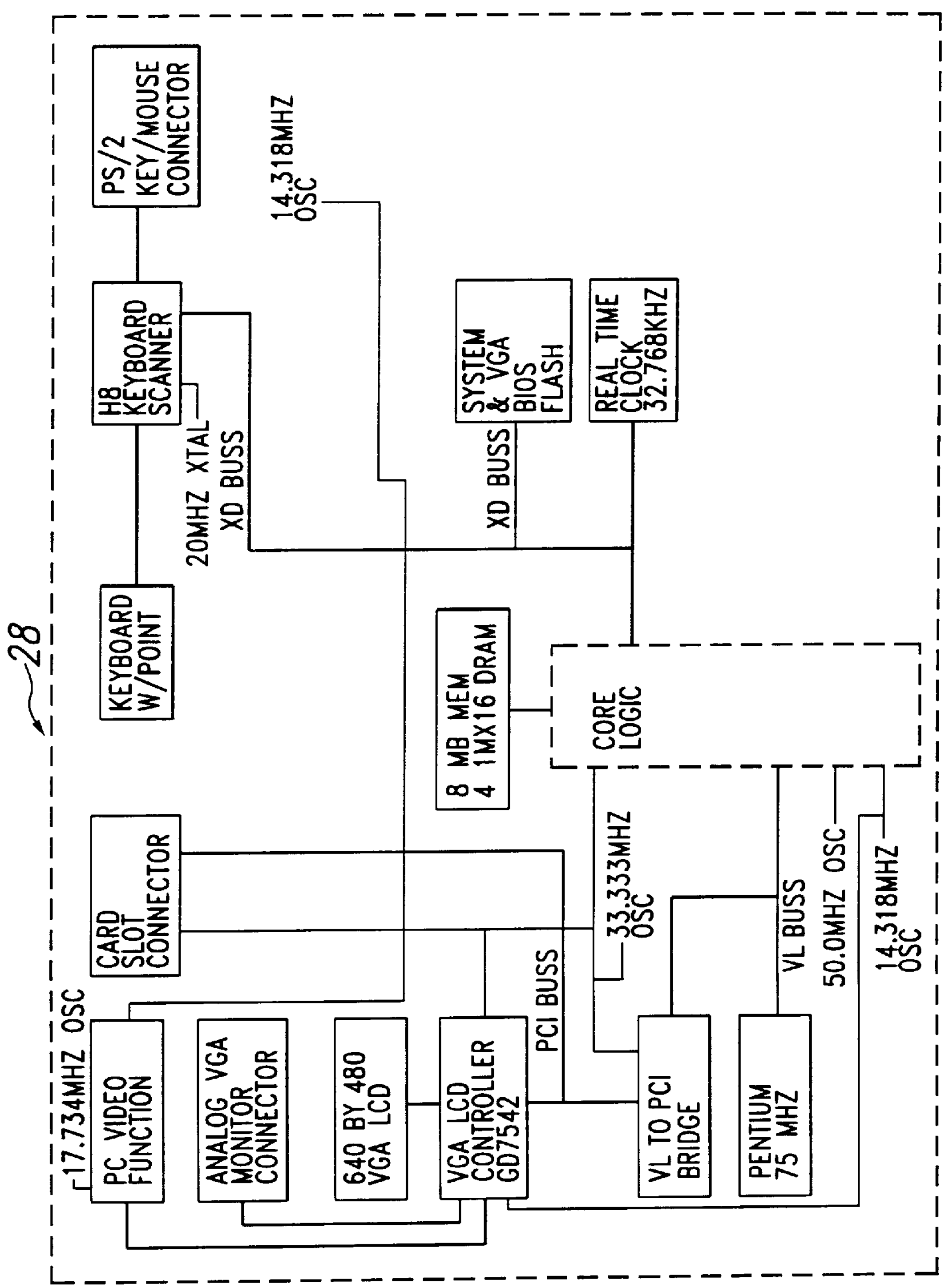

The system card 28 illustrated in FIG. 68 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupled to the core logic, an LCD monitor/controller coupling a analog VGA monitor connector, a PC video function and a VGA LCD to the PCI bus, a keyboard and a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 69:
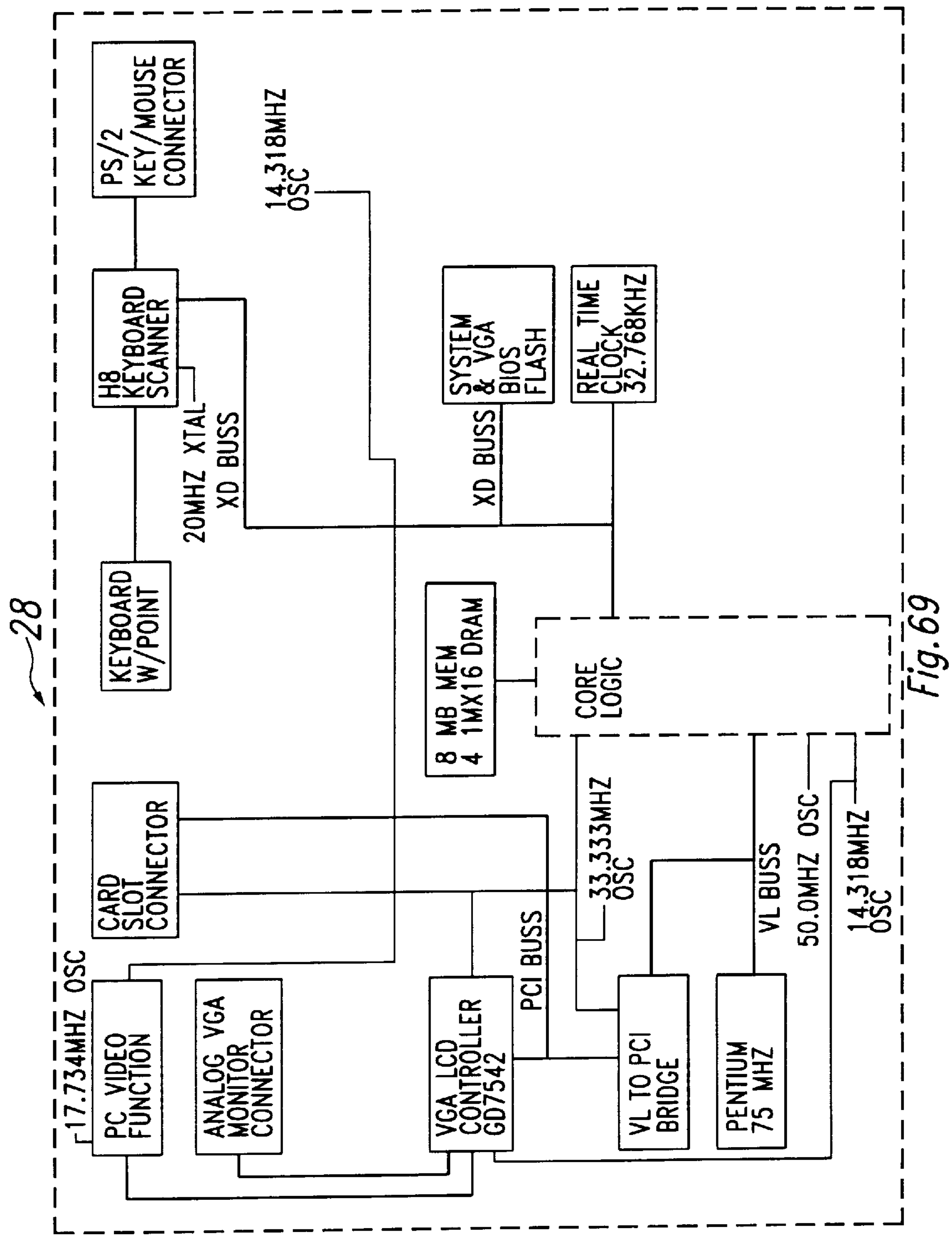

System card 28 illustrated in FIG. 69 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupled to the core logic, a controller coupling an analog VGA monitor connector and a PC video function to the PCI bus, a keyboard and a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 70:
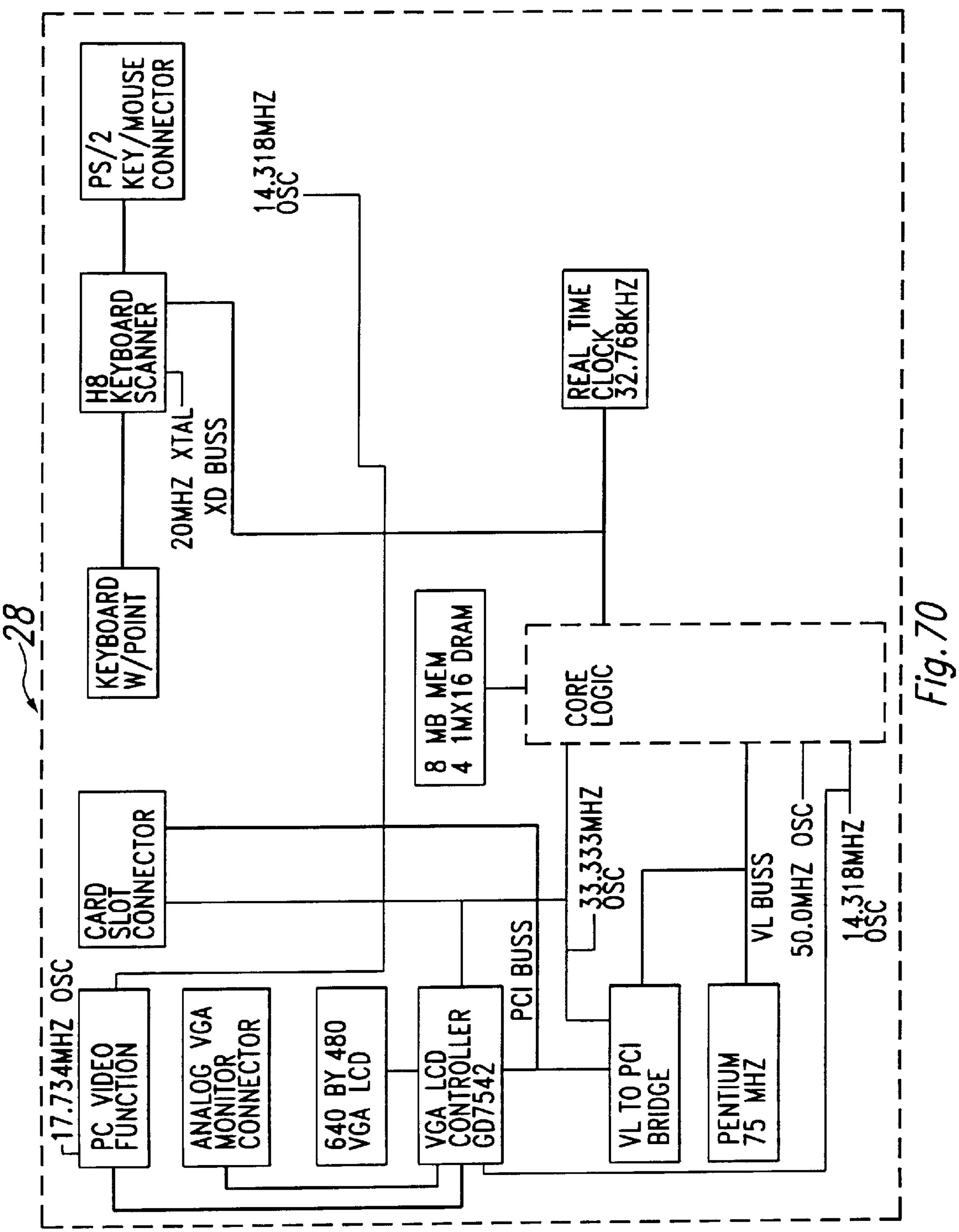

The system card 28 illustrated in FIG. 70 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupled to the core logic, an LCD monitor/controller coupling a analog VGA monitor connector, a PC video function and a VGA LCD to the PCI bus, a keyboard and a key/mouse connector coupled to a keyboard scanner and an XD bus coupling the keyboard scanner and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 71:
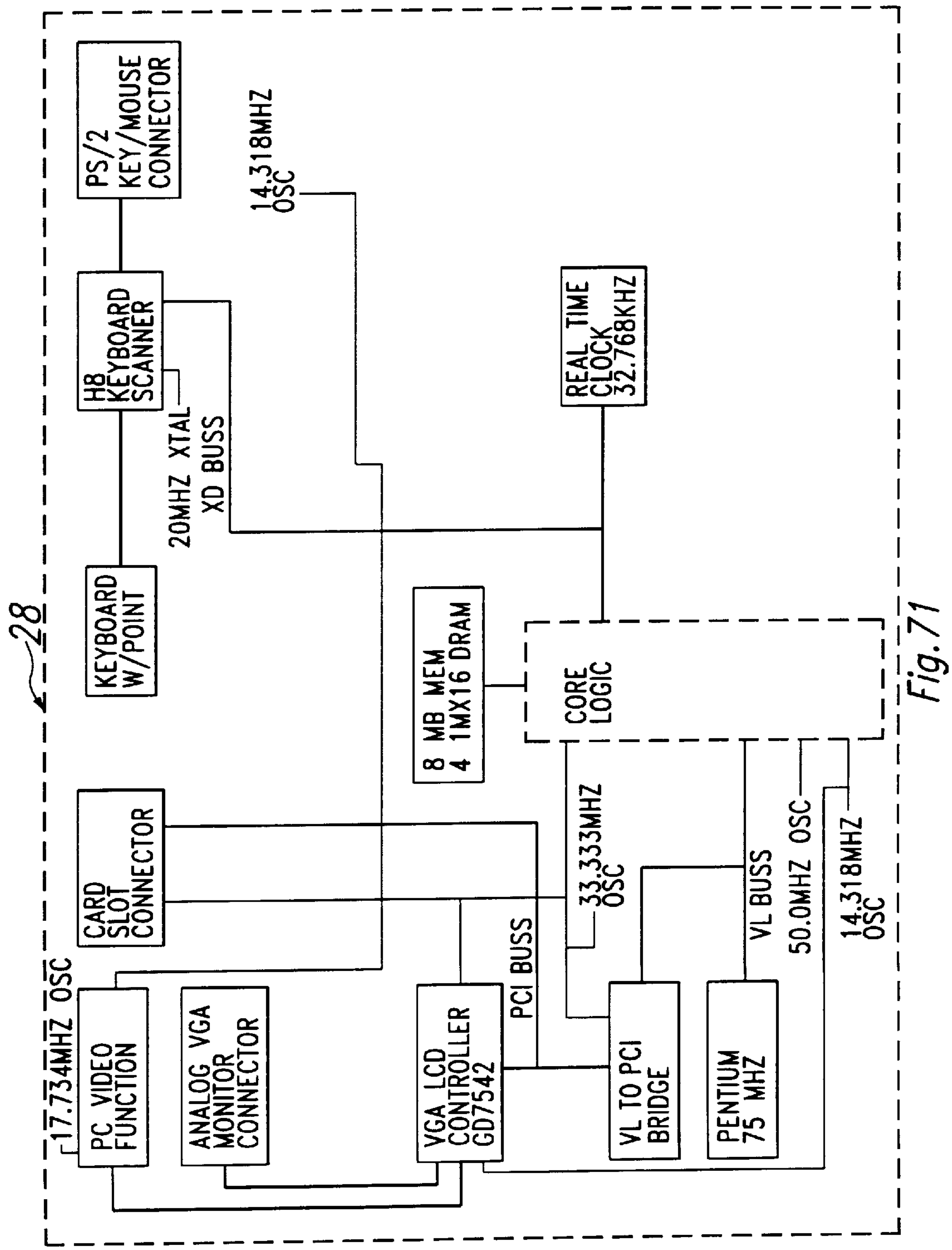

System card 28 illustrated in FIG. 71 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory to the core logic, a controller coupling an analog VGA monitor connector and a PC video function to the PCI bus, a keyboard and a key/mouse connector coupled to a keyboard scanner and an XD bus coupling the keyboard scanner and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 72:
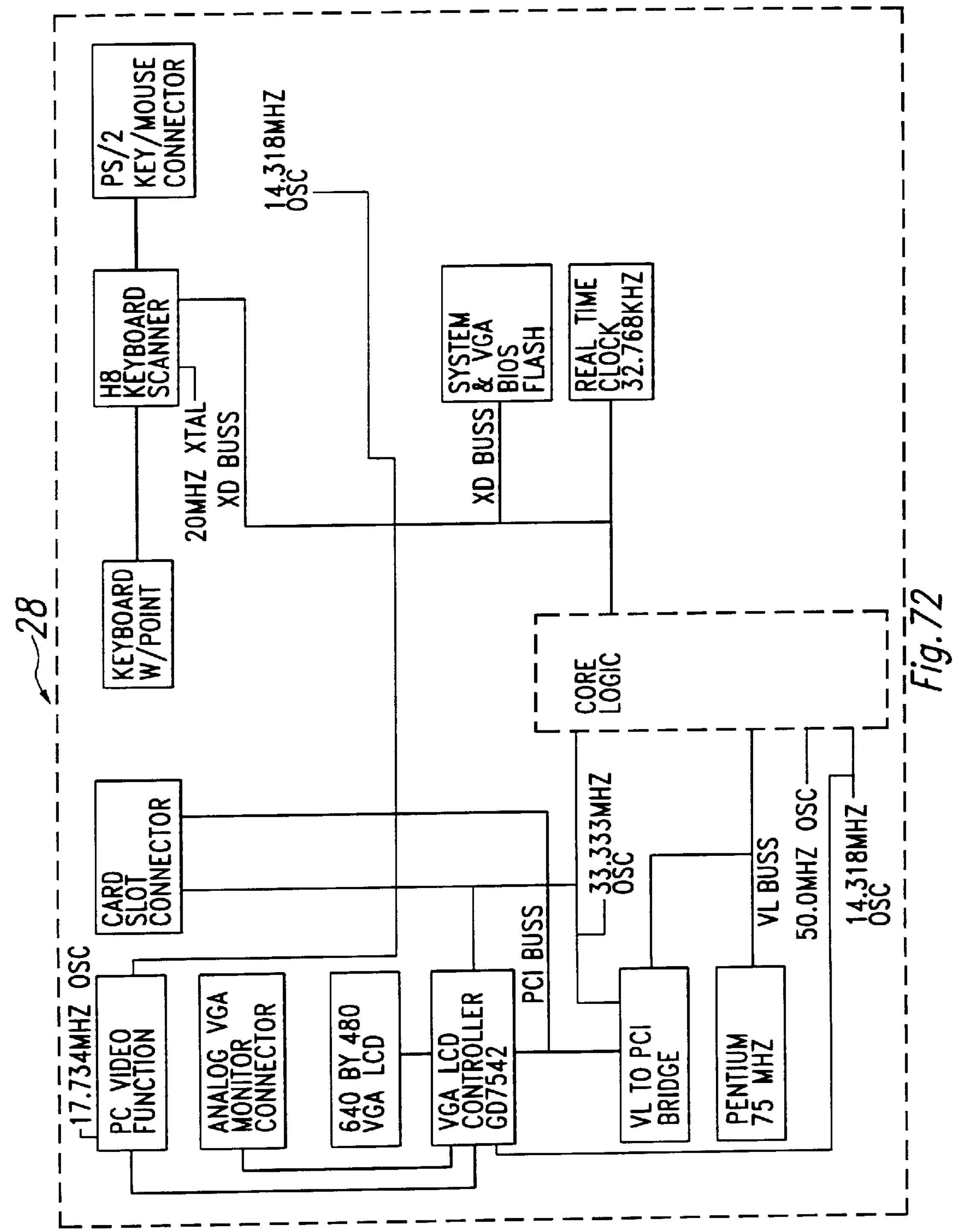

The system card 28 illustrated in FIG. 72 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an LCD monitor/controller coupling a analog VGA monitor connector, a PC video function and a VGA LCD to the PCI bus, a keyboard and a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 73:
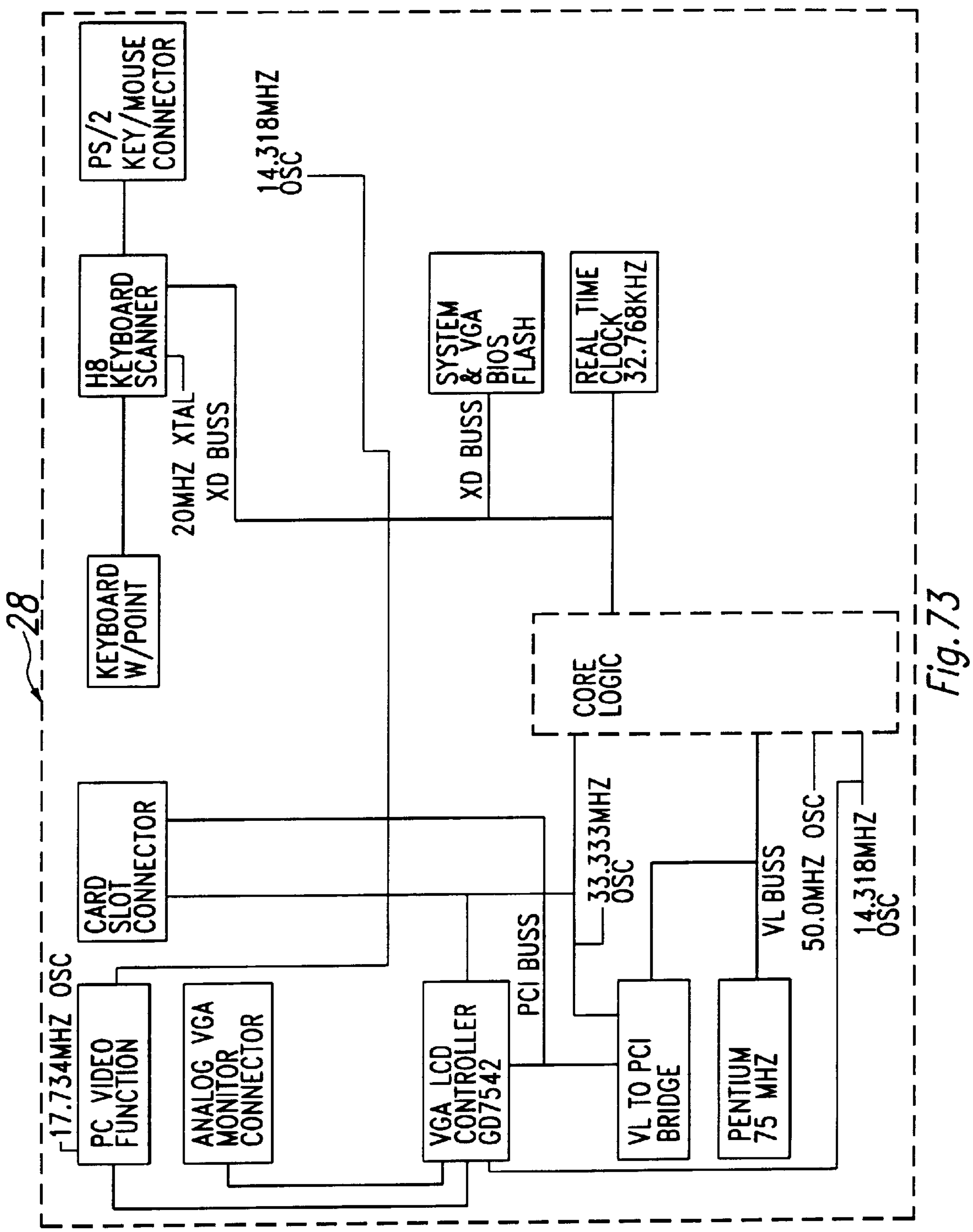

System card 28 illustrated in FIG. 73 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, a controller coupling an analog VGA monitor connector and a PC video function to the PCI bus, a keyboard and a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 74:
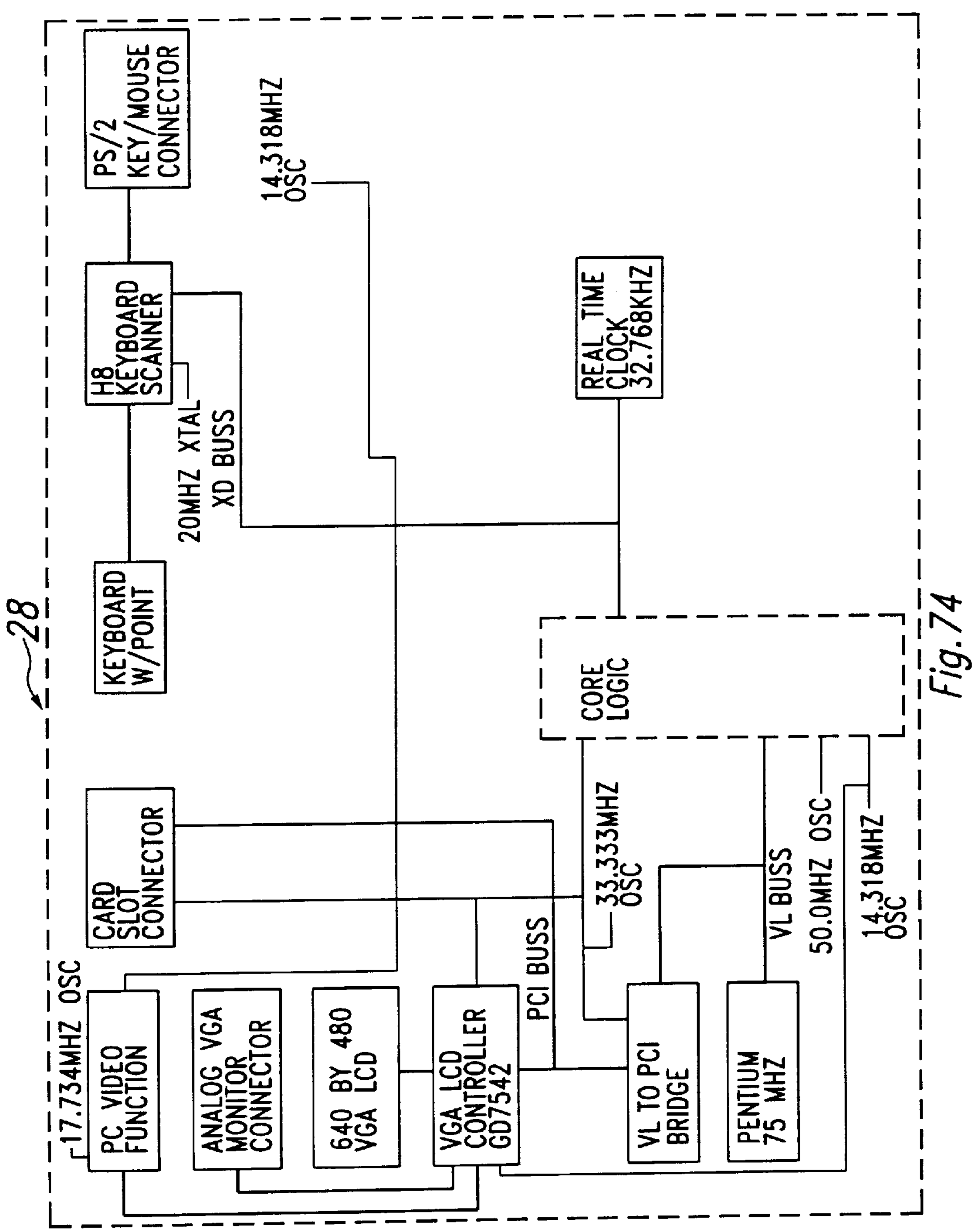

The system card 28 illustrated in FIG. 74 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an LCD monitor/controller coupling a analog VGA monitor connector, a PC video function and a VGA LCD to the PCI bus, a keyboard and a key/mouse connector coupled to a keyboard scanner and an XD bus coupling the keyboard scanner and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 75:
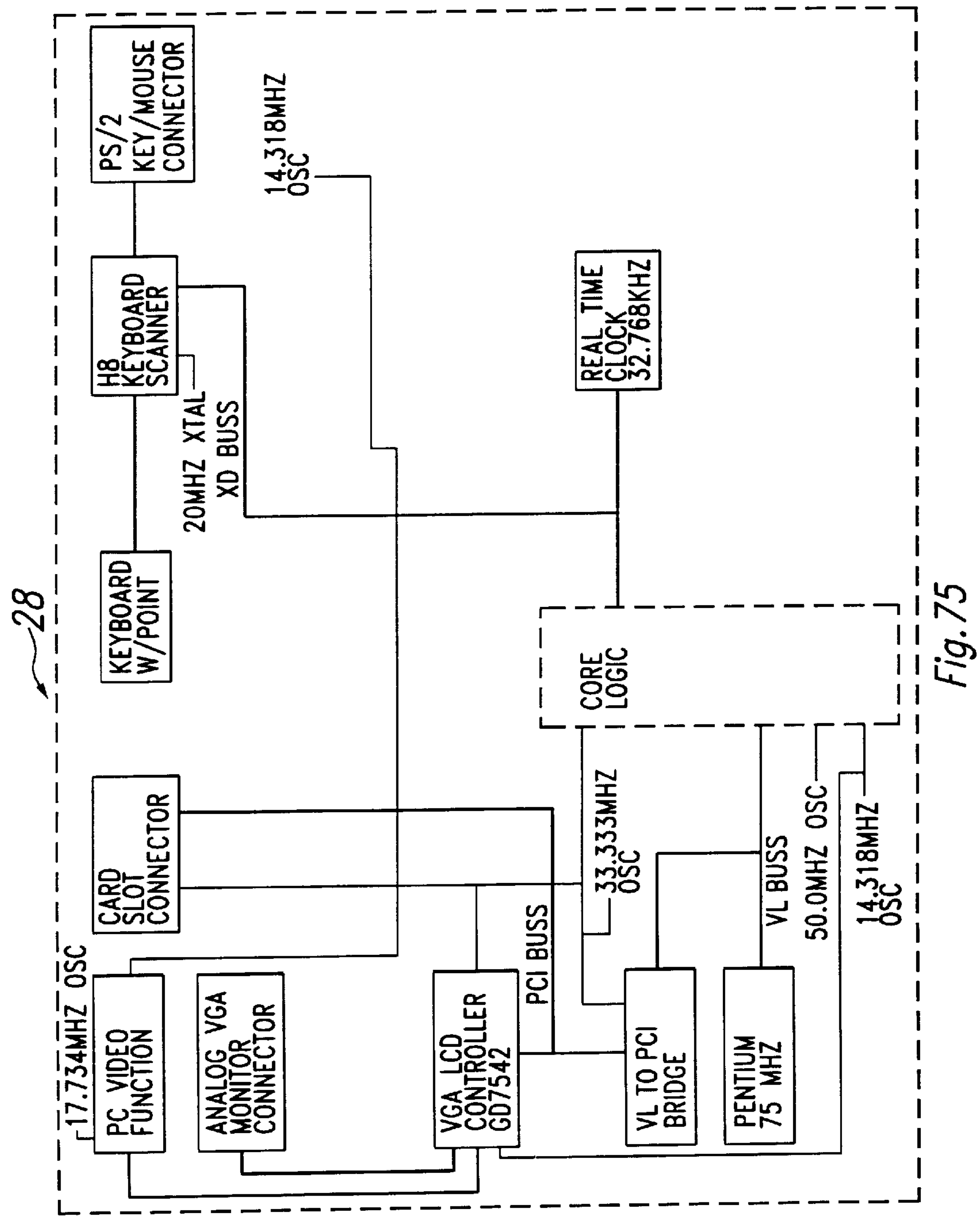

System card 28 illustrated in FIG. 75 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, a controller coupling an analog VGA monitor connector and a PC video function to the PCI bus, a keyboard and a key/mouse connector coupled to a keyboard scanner and an XD bus coupling the keyboard scanner and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 76:
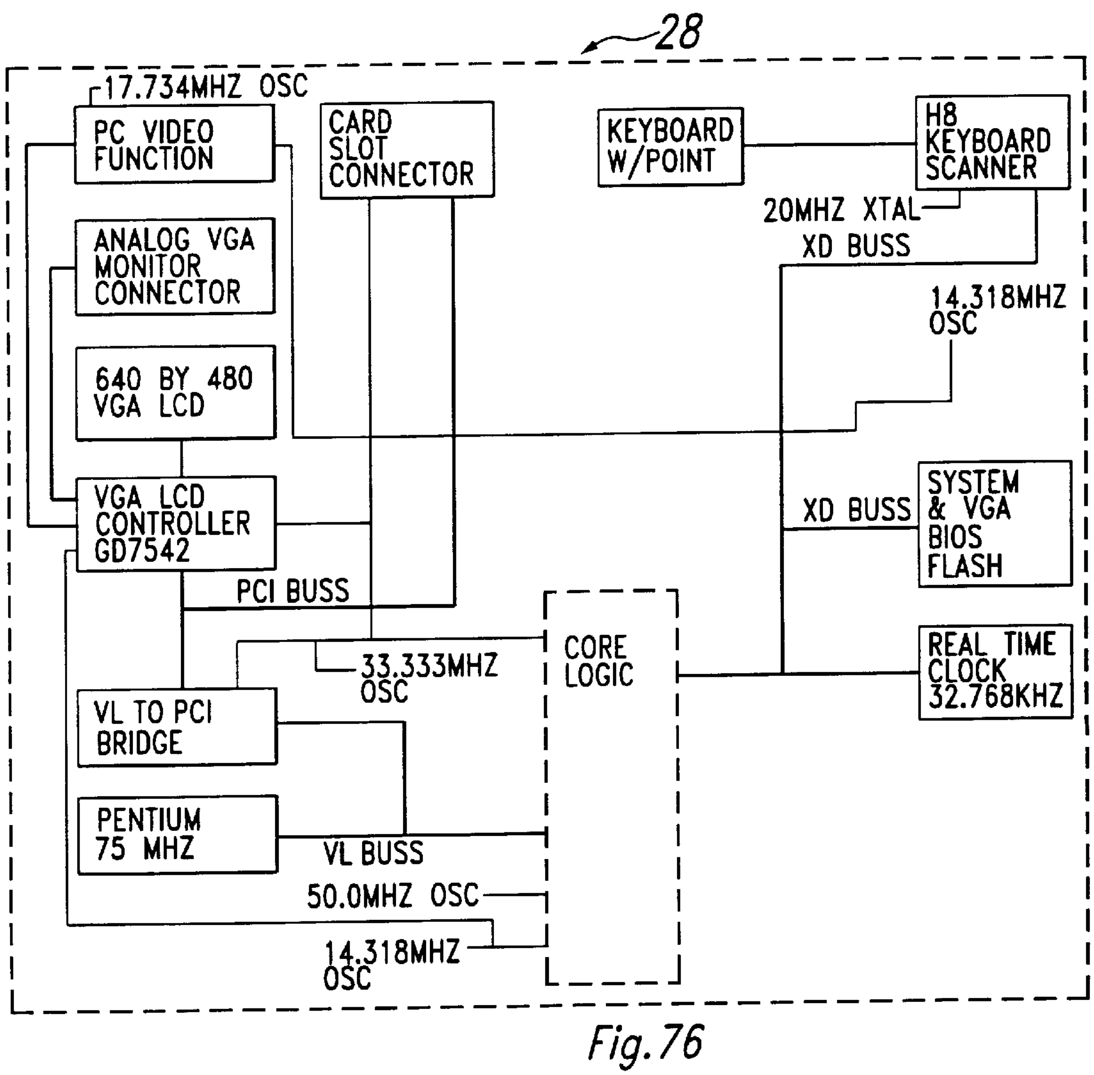

The system card 28 illustrated in FIG. 76 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an LCD monitor/controller coupling a analog VGA monitor connector, a PC video function and a VGA LCD to the PCI bus, a keyboard coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 77:
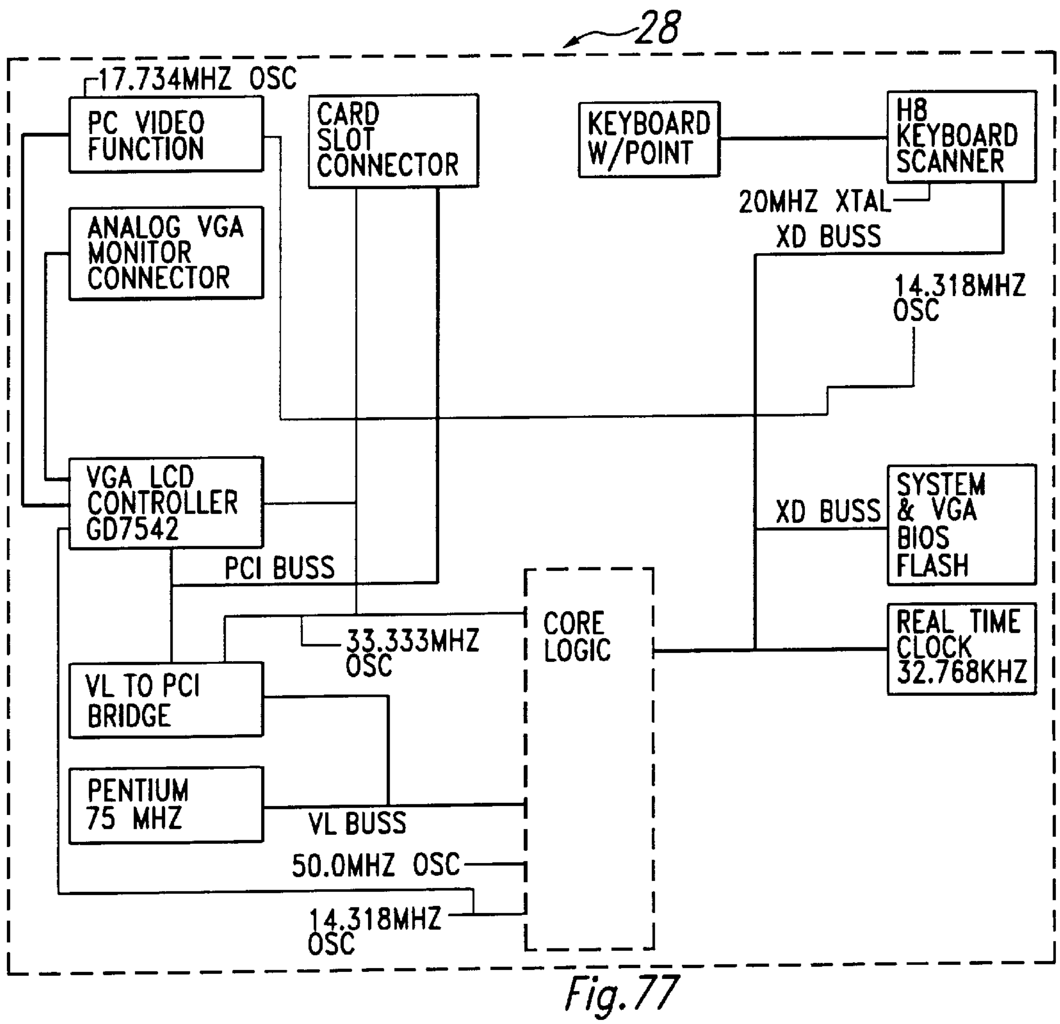

System card 28 illustrated in FIG. 77 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, a controller coupling an analog VGA monitor connector and a PC video function to the PCI bus, a keyboard coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 78:
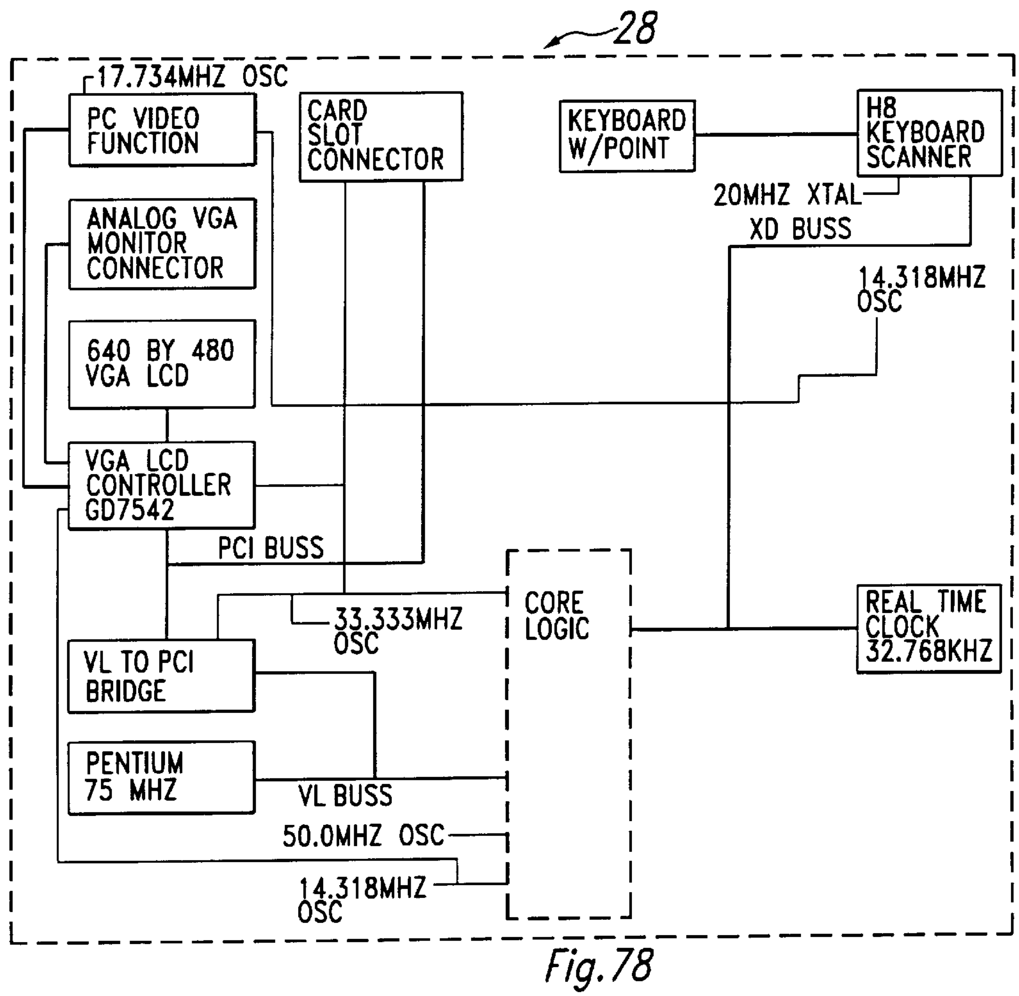

The system card 28 illustrated in FIG. 78 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an LCD monitor/controller coupling a analog VGA monitor connector, a PC video function and a VGA LCD to the PCI bus, a keyboard coupled to a keyboard scanner and an XD bus coupling the keyboard scanner and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 79:
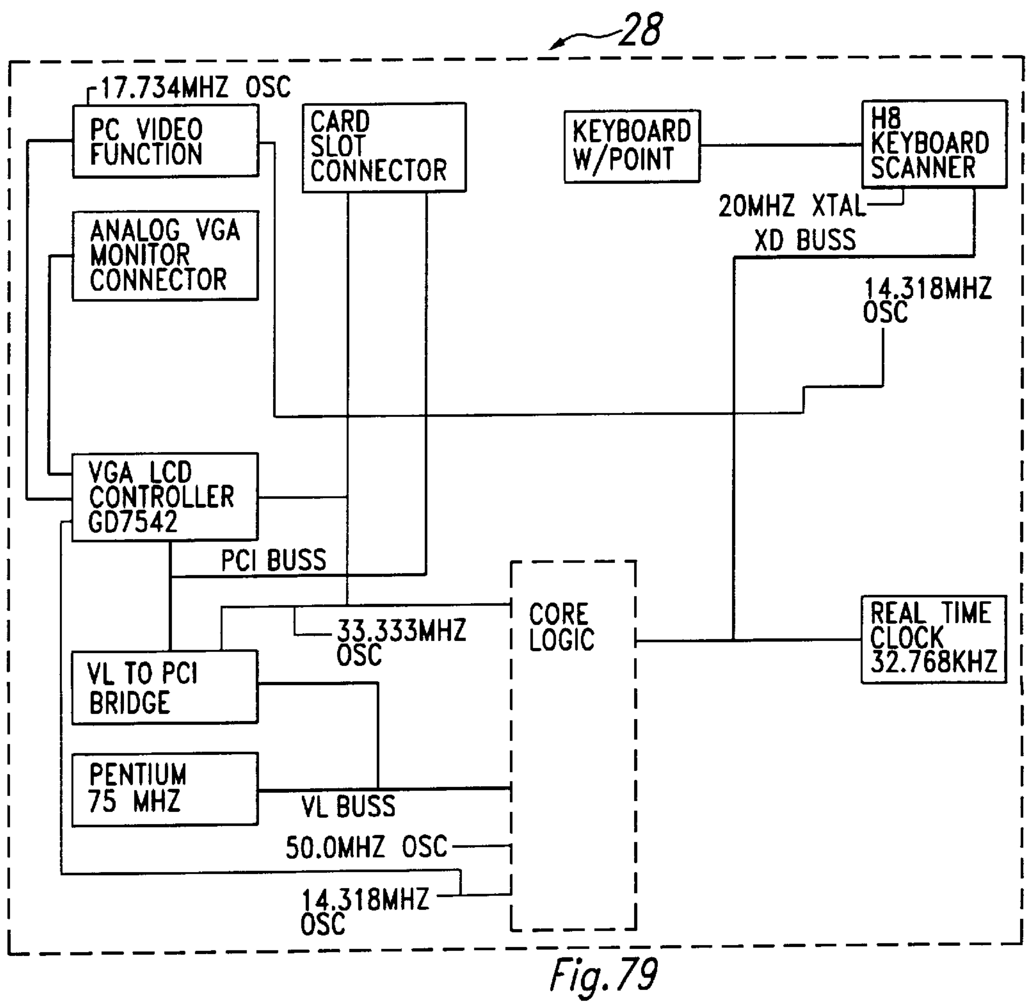

System card 28 illustrated in FIG. 79 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, a controller coupling an analog VGA monitor connector and a PC video function to the PCI bus, a keyboard coupled to a keyboard scanner and an XD bus coupling the keyboard scanner and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 80:
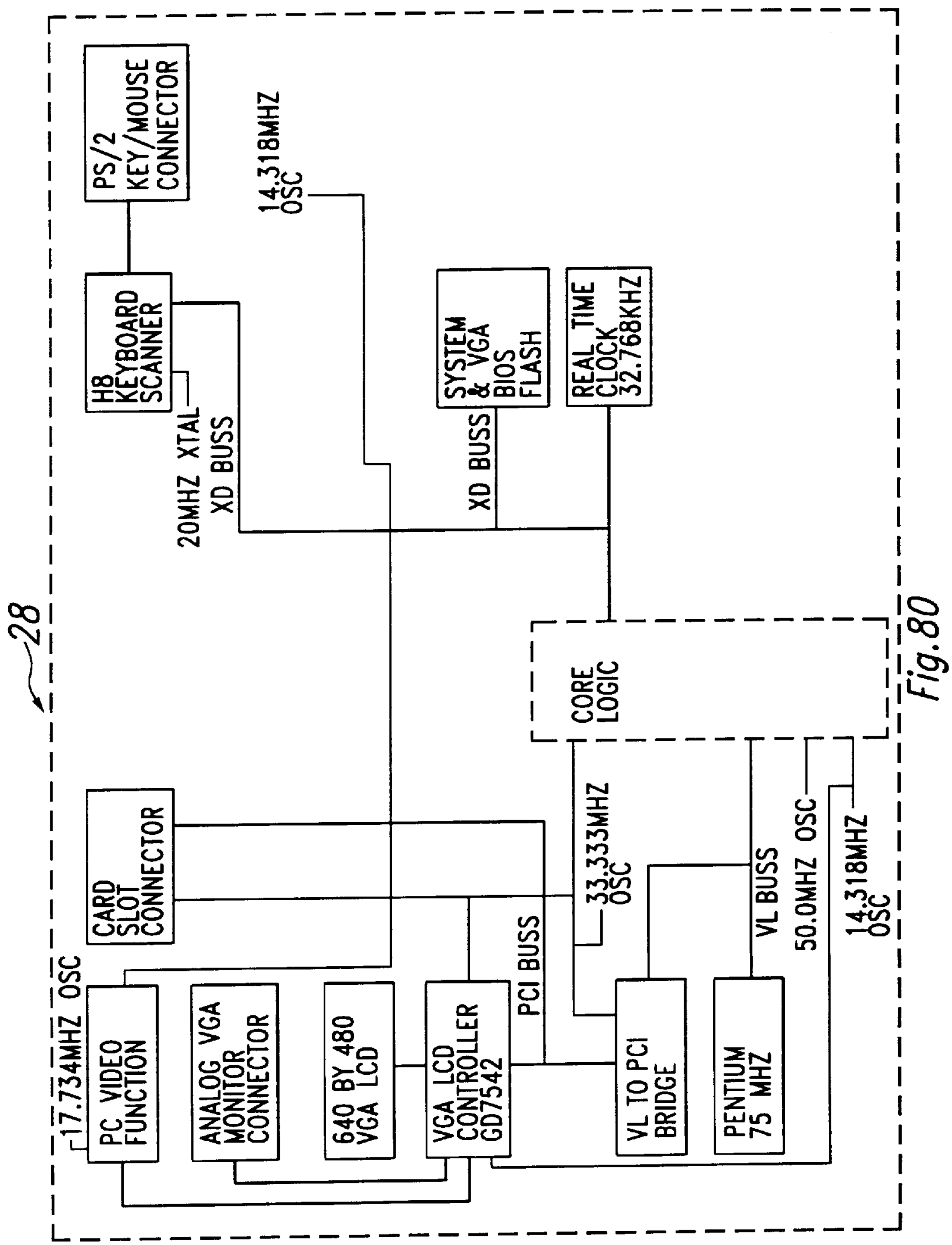

The system card 28 illustrated in FIG. 80 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an LCD monitor/controller coupling a analog VGA monitor connector, a PC video function and a VGA LCD to the PCI bus, a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 81:
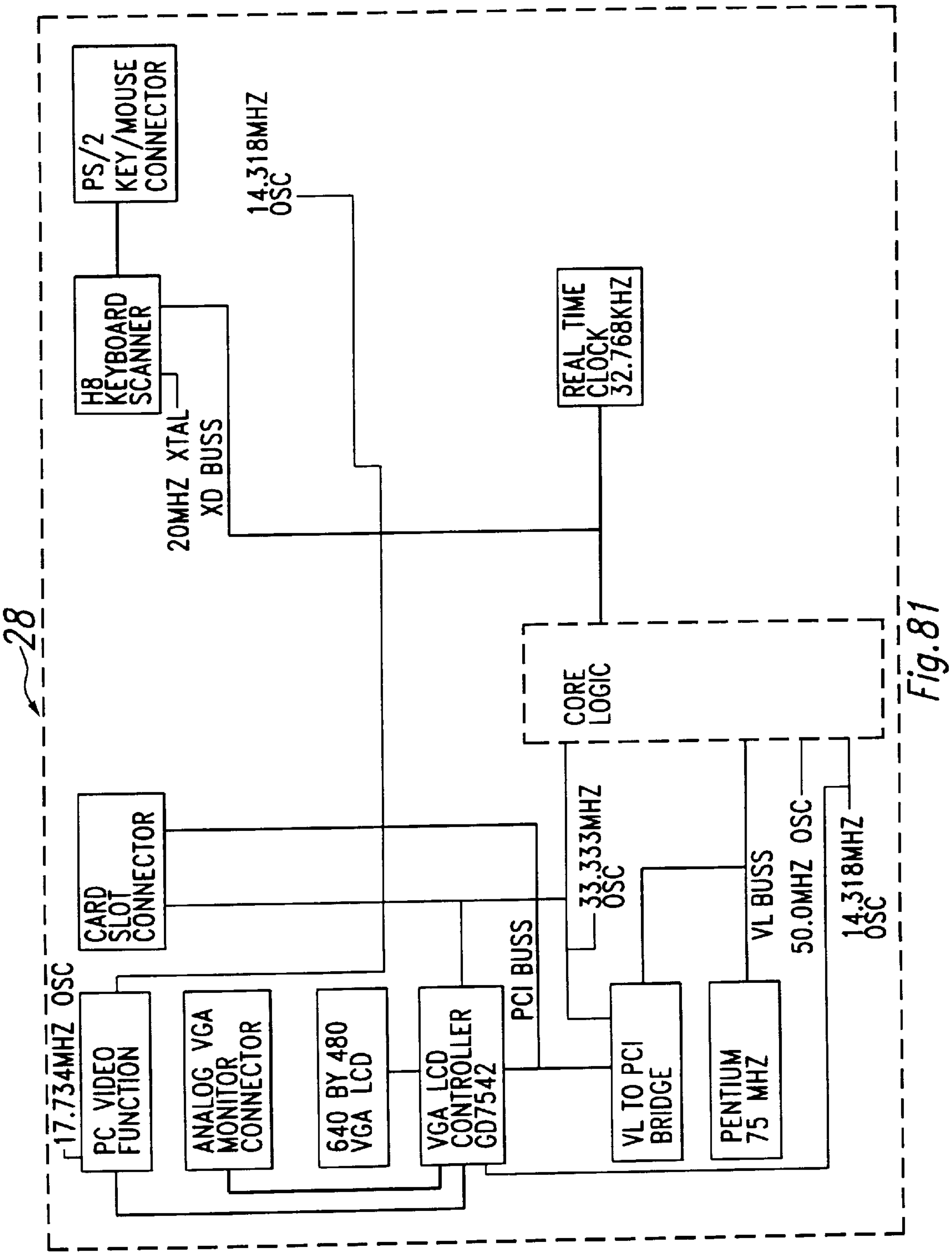

System card 28 illustrated in FIG. 81 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, a controller coupling an analog VGA monitor connector and a PC video function to the PCI bus, a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 82:
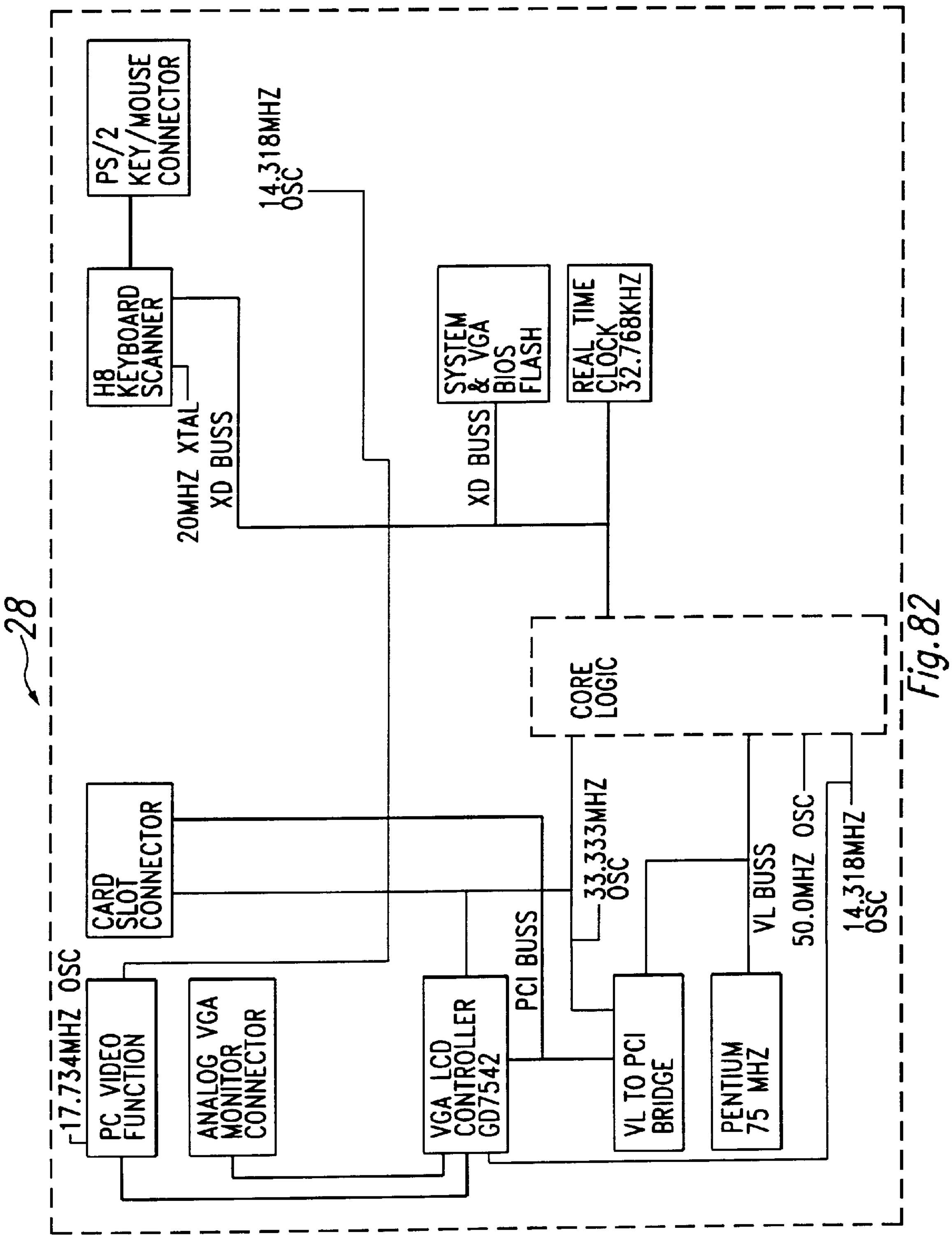

The system card 28 illustrated in FIG. 82 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an LCD monitor/controller coupling a analog VGA monitor connector, a PC video function and a VGA LCD to the PCI bus, a key/mouse connector coupled to a keyboard scanner and an XD bus coupling the keyboard scanner and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 83:
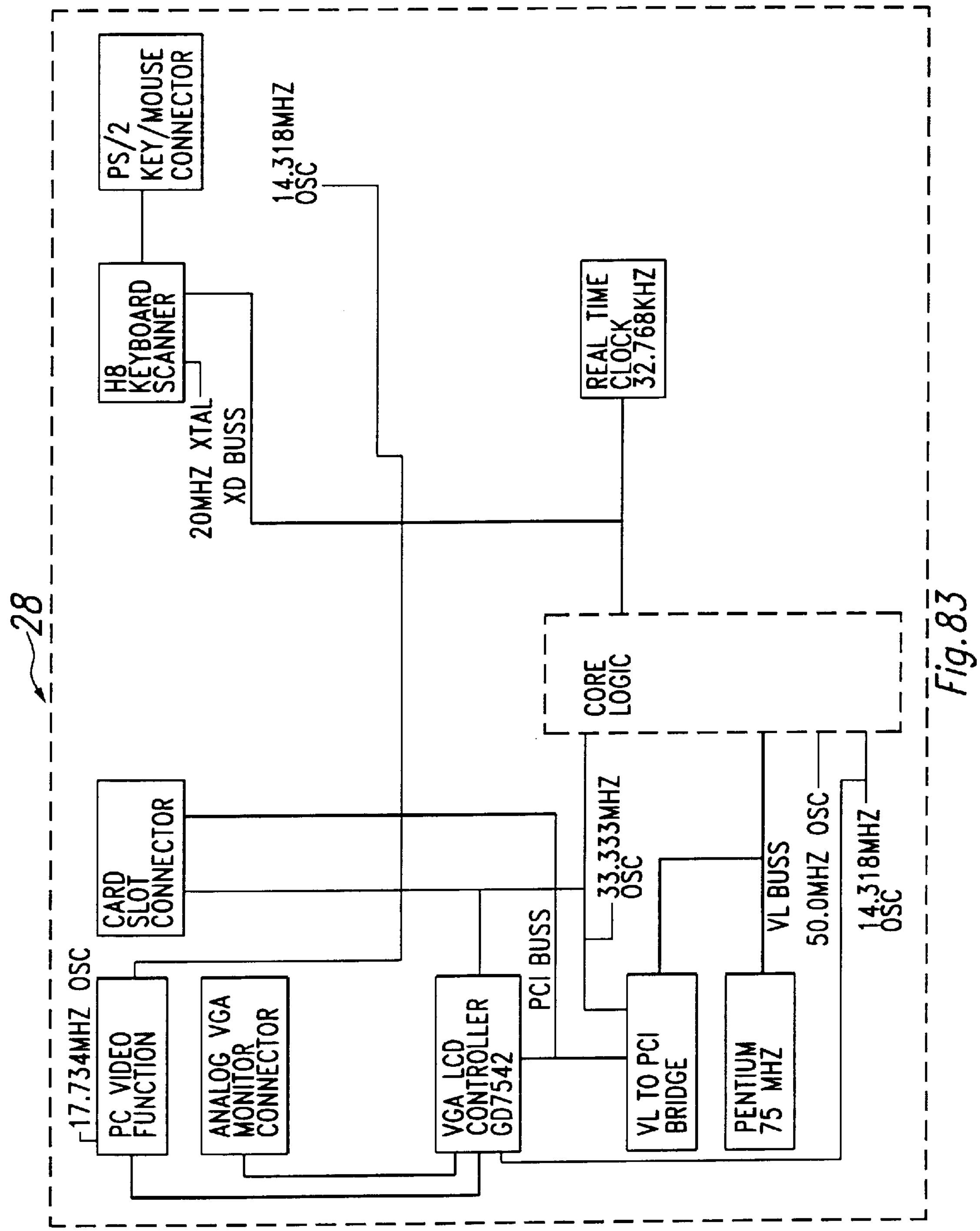

System card 28 illustrated in FIG. 83 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, a controller coupling an analog VGA monitor connector and a PC video function to the PCI bus, a key/mouse connector coupled to a keyboard scanner and an XD bus coupling the keyboard scanner and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 84:
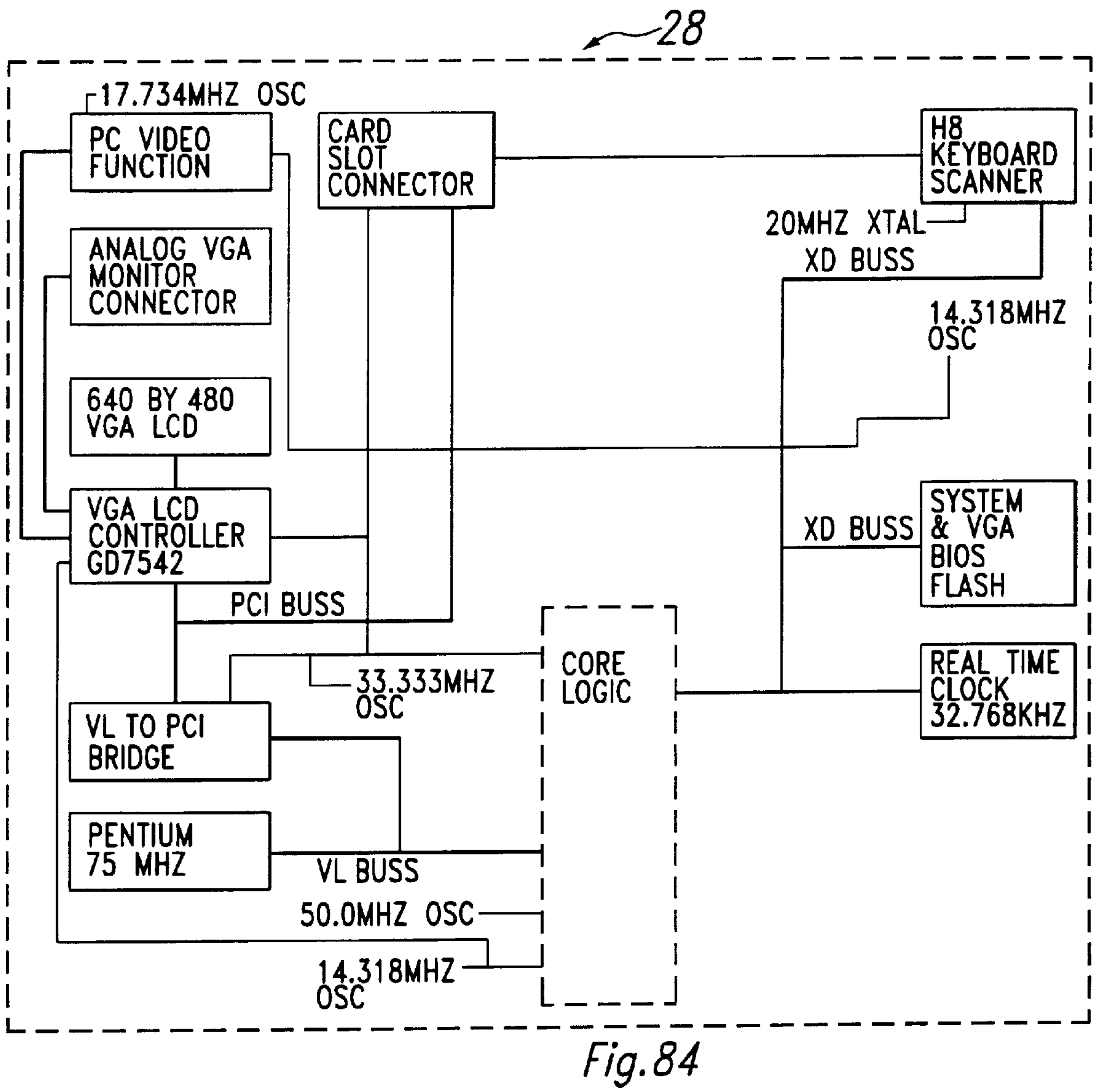

The system card 28 illustrated in FIG. 84 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an LCD monitor/controller coupling a analog VGA monitor connector, a PC video function and a VGA LCD to the PCI bus, a keyboard scanner coupled to the card slot connector and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 85:
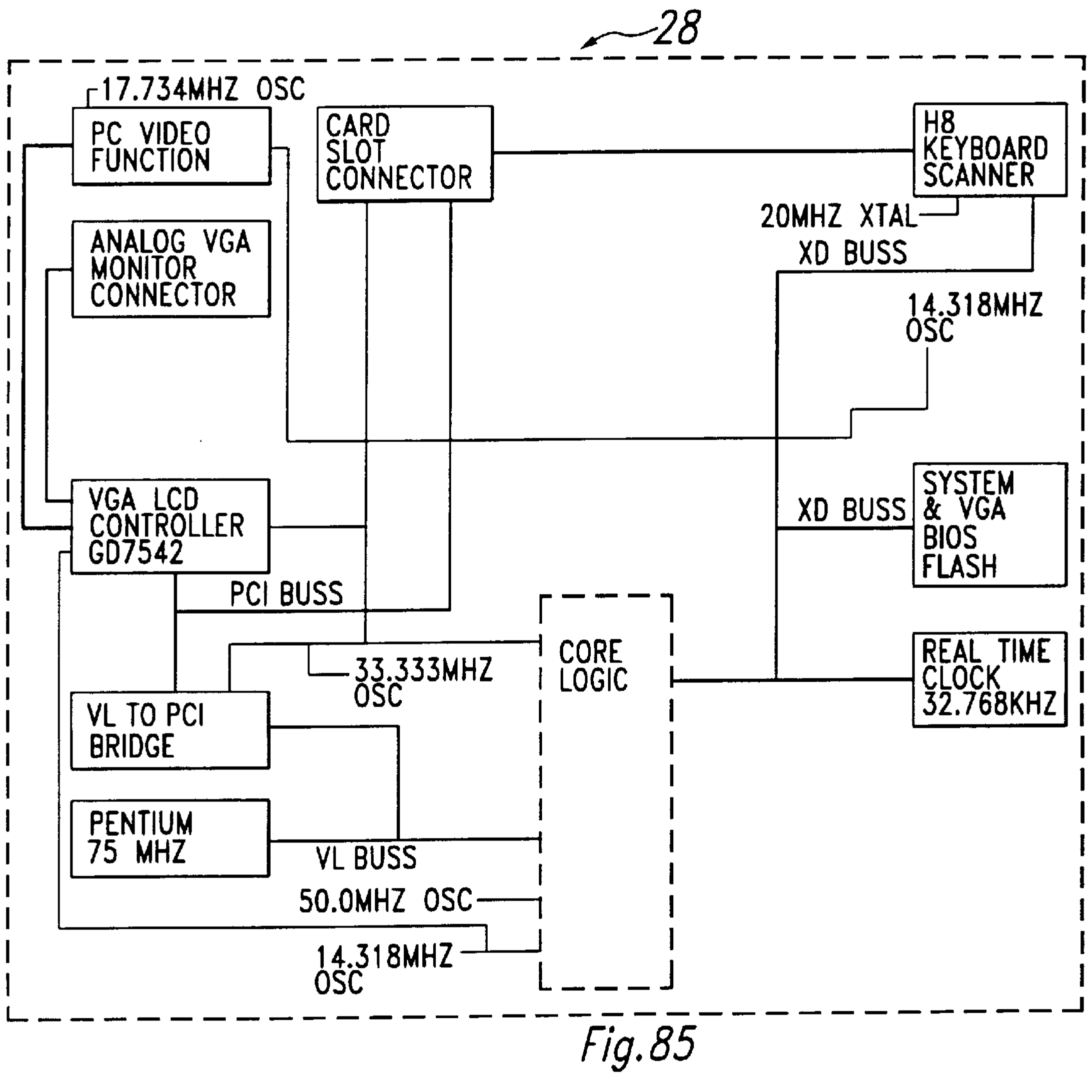

System card 28 illustrated in FIG. 85 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, a controller coupling an analog VGA monitor connector and a PC video function to the PCI bus, a keyboard scanner coupled to the card slot connector and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 86:
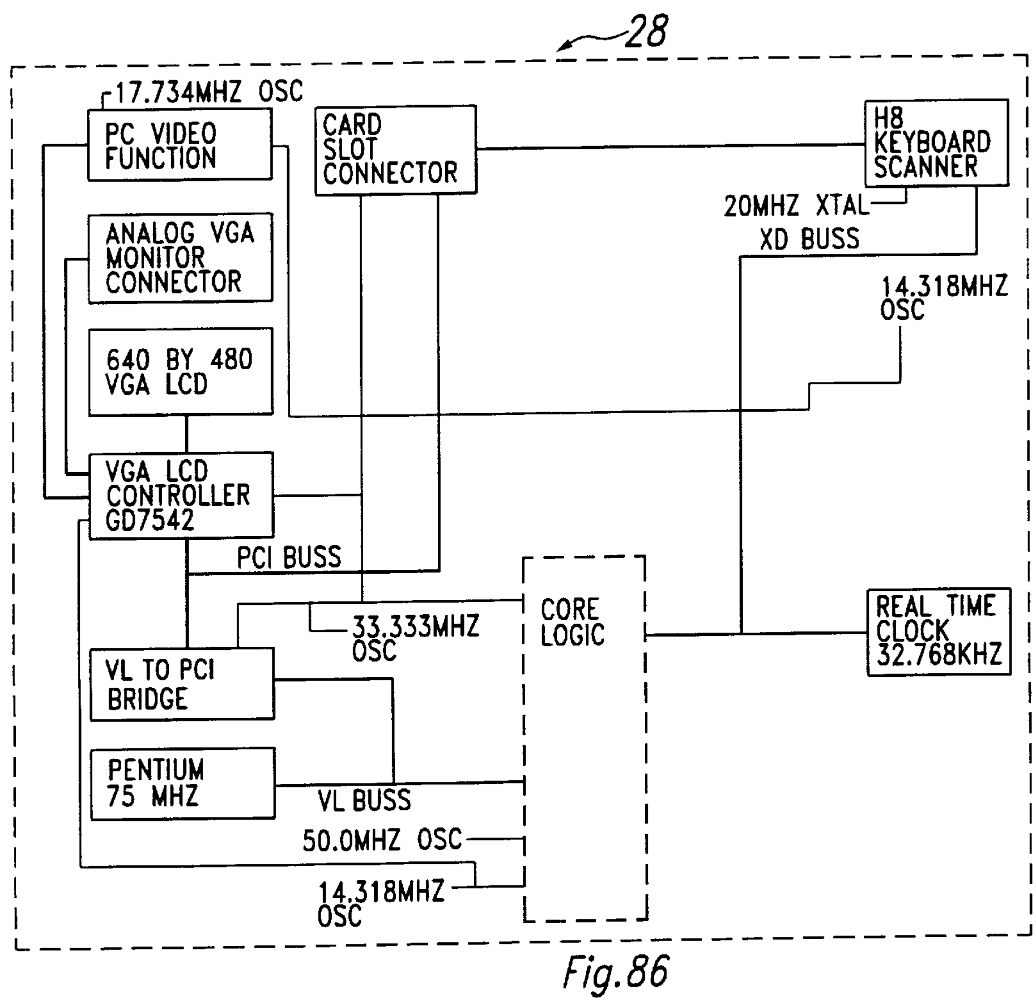

The system card 28 illustrated in FIG. 86 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an LCD monitor/controller coupling a analog VGA monitor connector, a PC video function and a VGA LCD to the PCI bus, a keyboard scanner coupled to the card slot connector and an XD bus coupling the keyboard scanner and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 87:
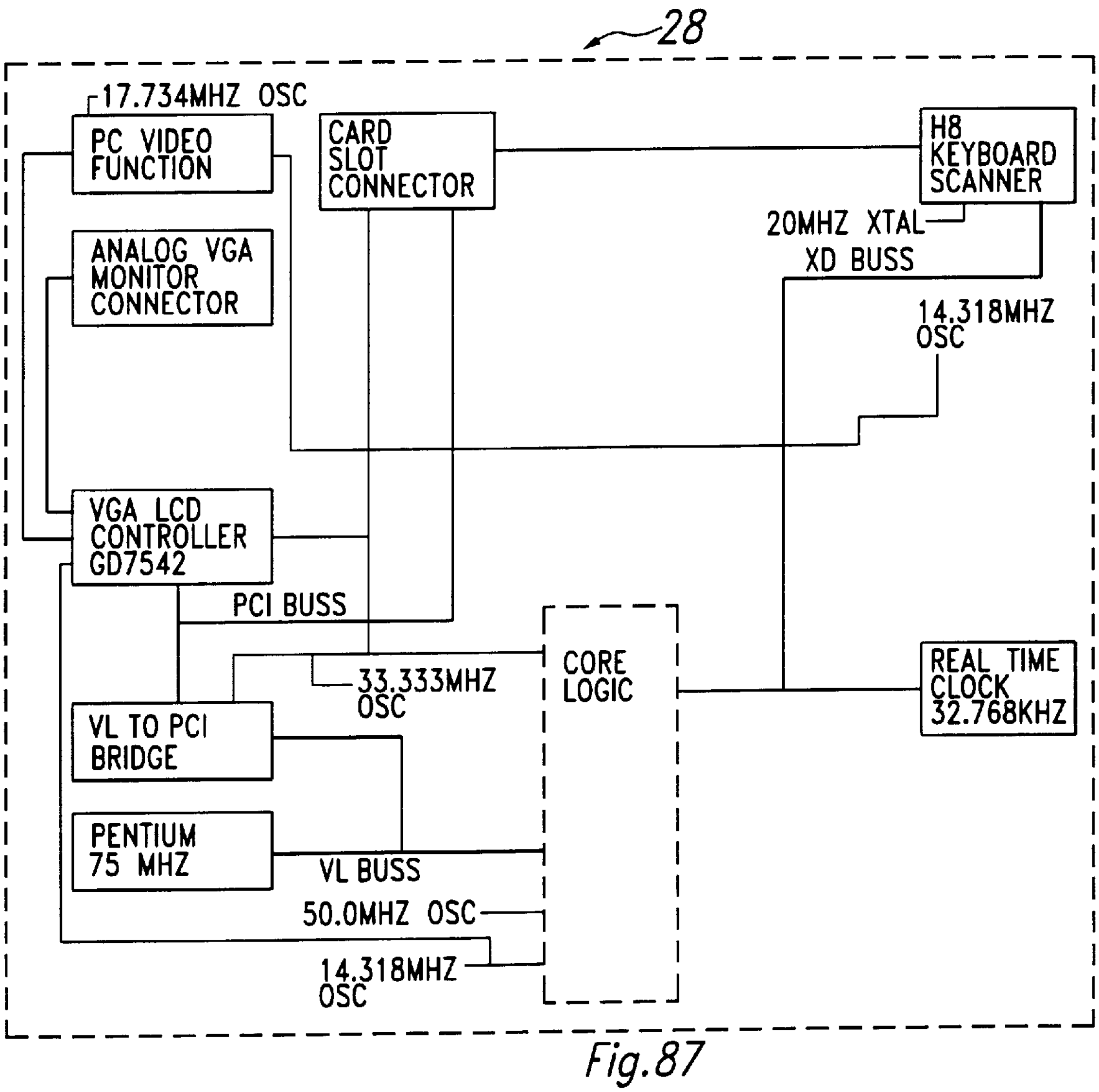

System card 28 illustrated in FIG. 87 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, a controller coupling an analog VGA monitor connector and a PC video function to the PCI bus, a keyboard scanner coupled to the card slot connector and an XD bus coupling the keyboard scanner and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 88:
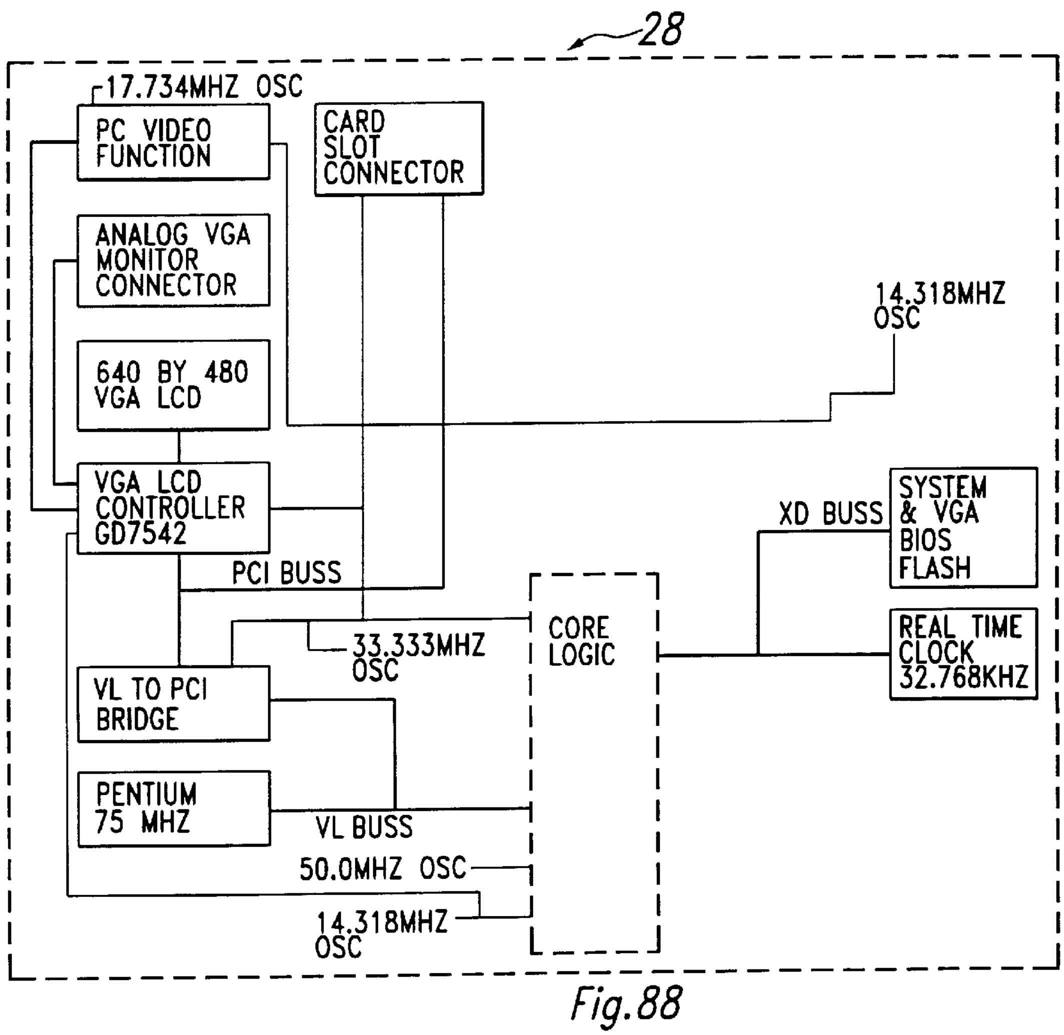

The system card 28 illustrated in FIG. 88 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an LCD monitor/controller coupling a analog VGA monitor connector, a PC video function and a VGA LCD to the PCI bus, and an XD bus coupling the system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 89:
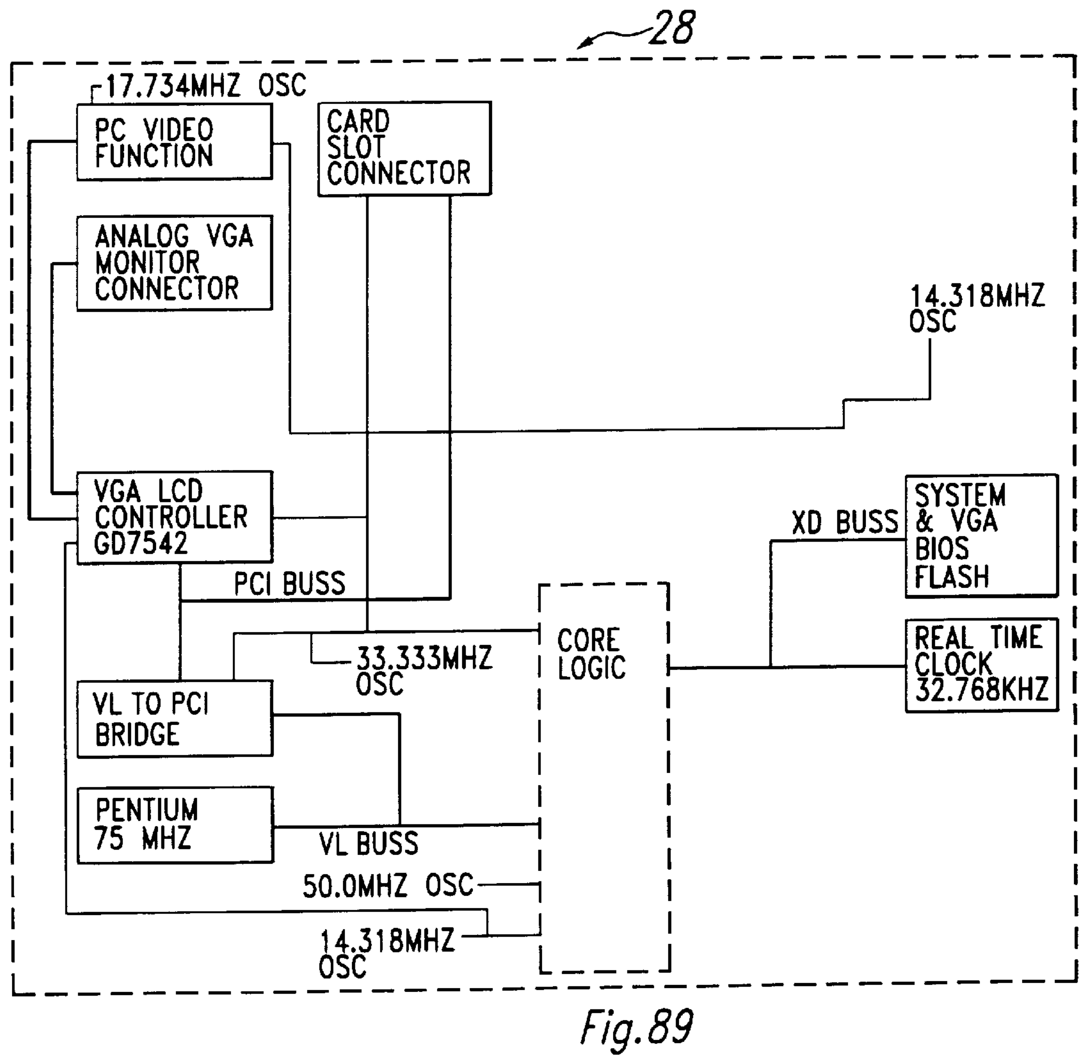

System card 28 illustrated in FIG. 89 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, a controller coupling an analog VGA monitor connector and a PC video function to the PCI bus, and an XD bus coupling the system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 90:
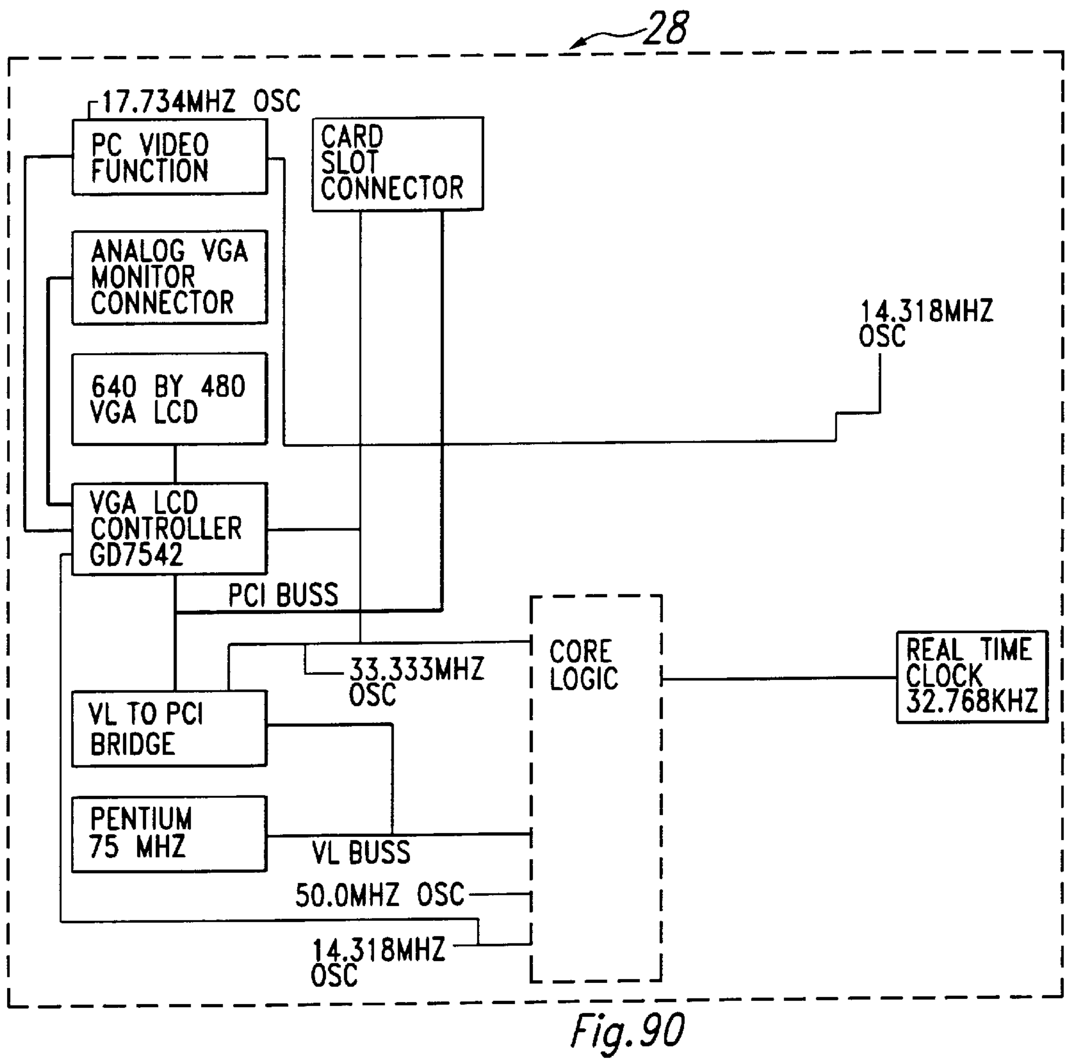

The system card 28 illustrated in FIG. 90 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an LCD monitor/controller coupling a analog VGA monitor connector, a PC video function and a VGA LCD to the PCI bus, and an XD bus coupling the real clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 91:
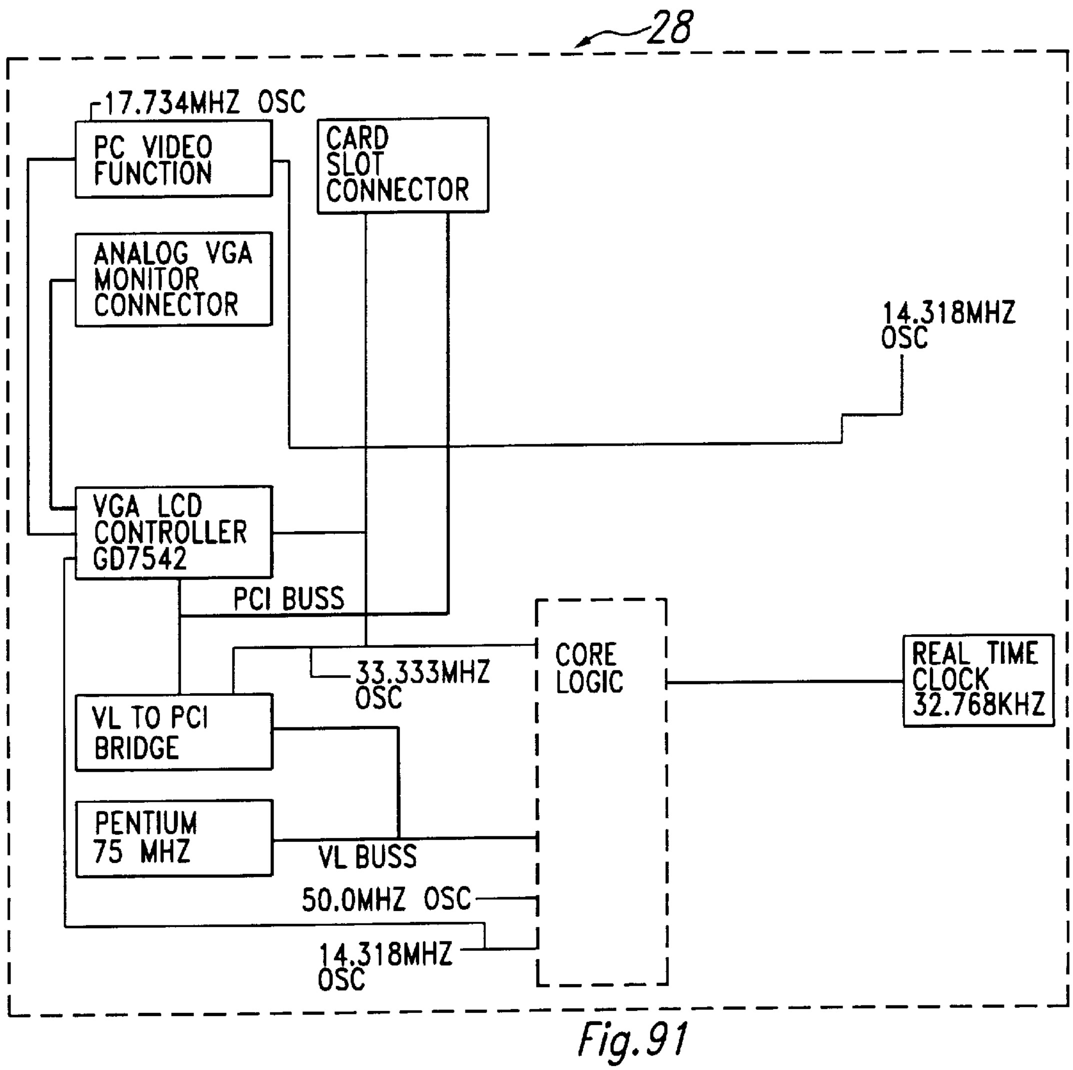

System card 28 illustrated in FIG. 91 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, a controller coupling an analog VGA monitor connector and a PC video function to the PCI bus, and an XD bus coupling the real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 92:
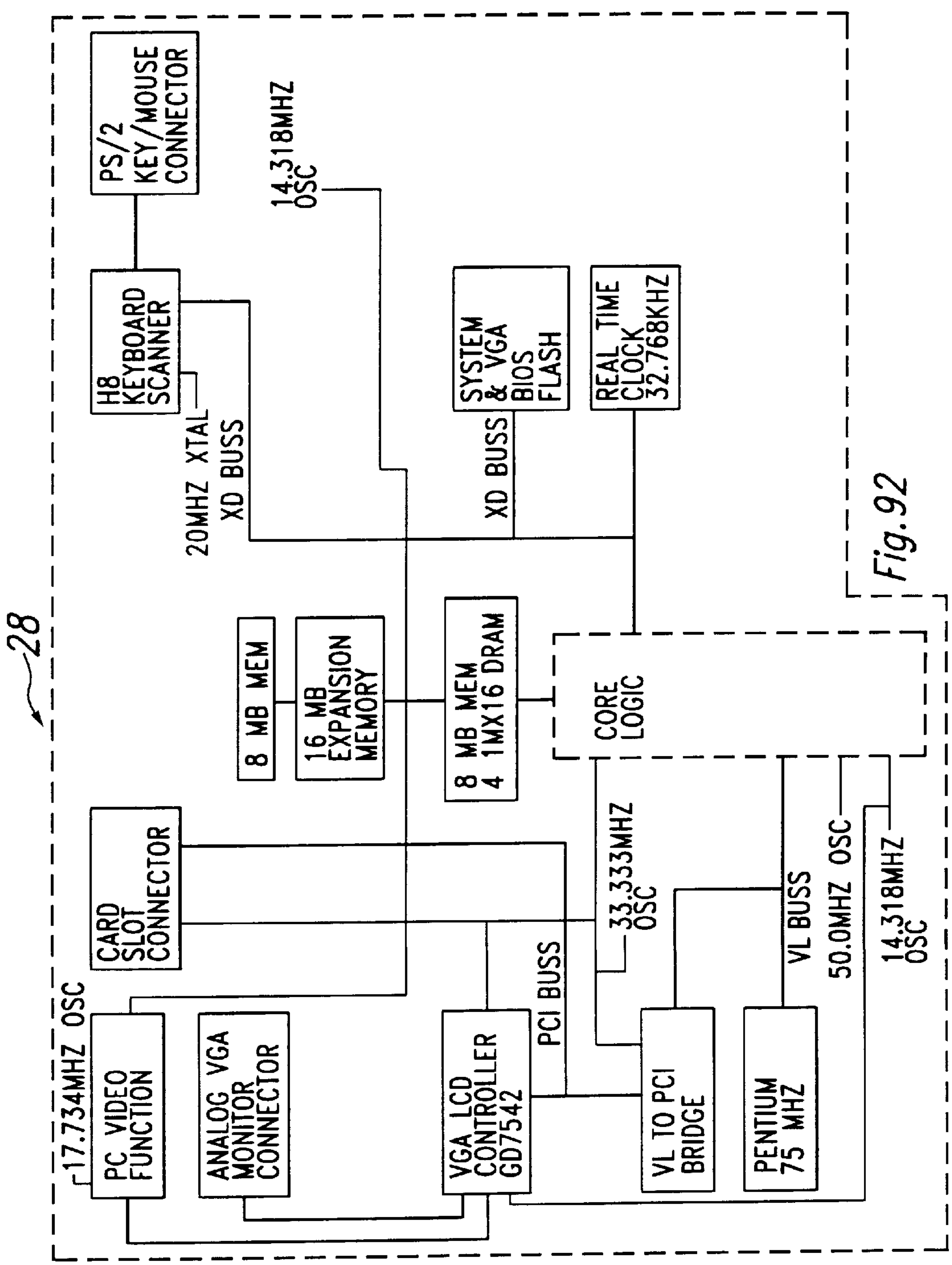

The system card 28 illustrated in FIG. 92 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, a controller coupling an analog VGA monitor connector and a PC video function to the PCI bus, a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 93:
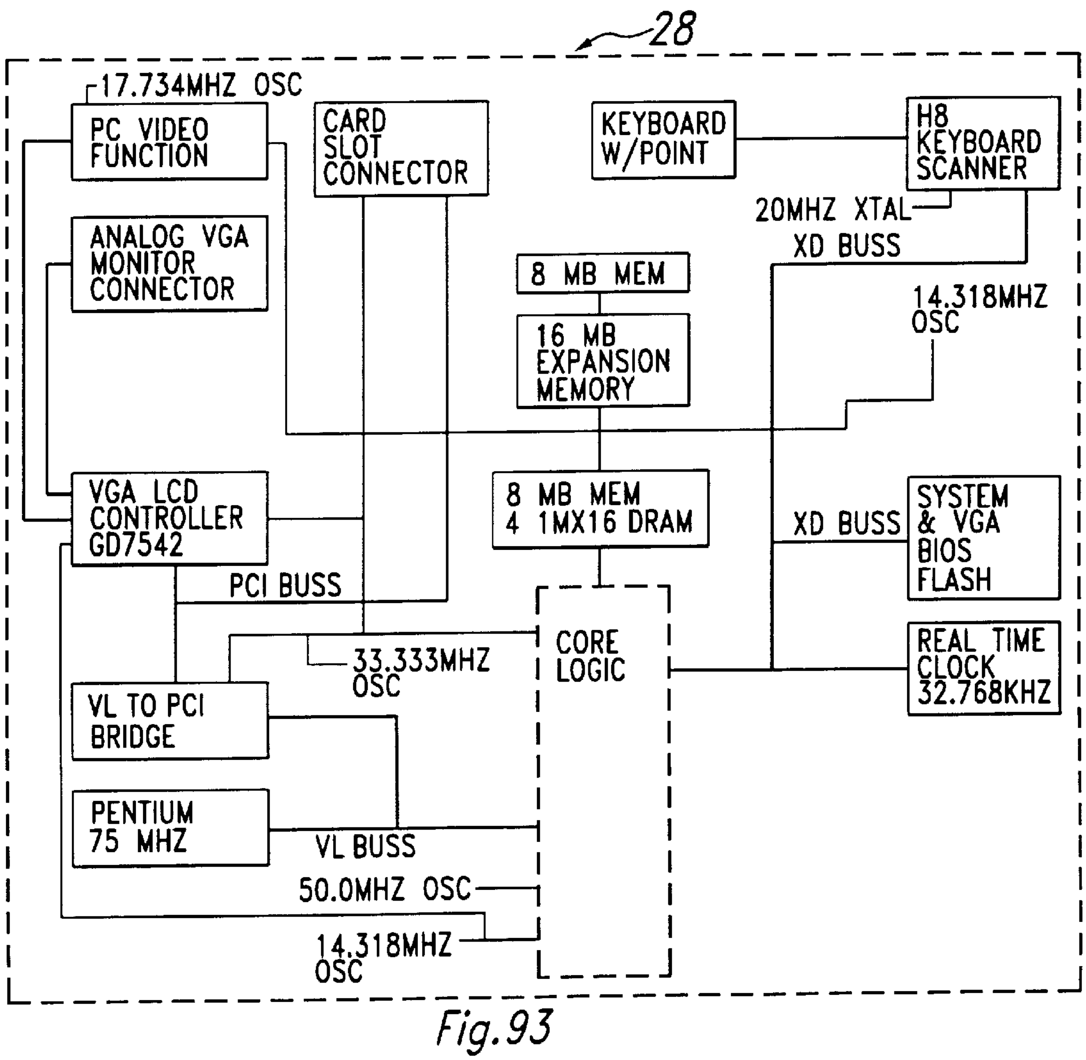

System card 28 illustrated in FIG. 93 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, a controller coupling an analog VGA monitor connector and a PC video function to the PCI bus, a keyboard coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 94:
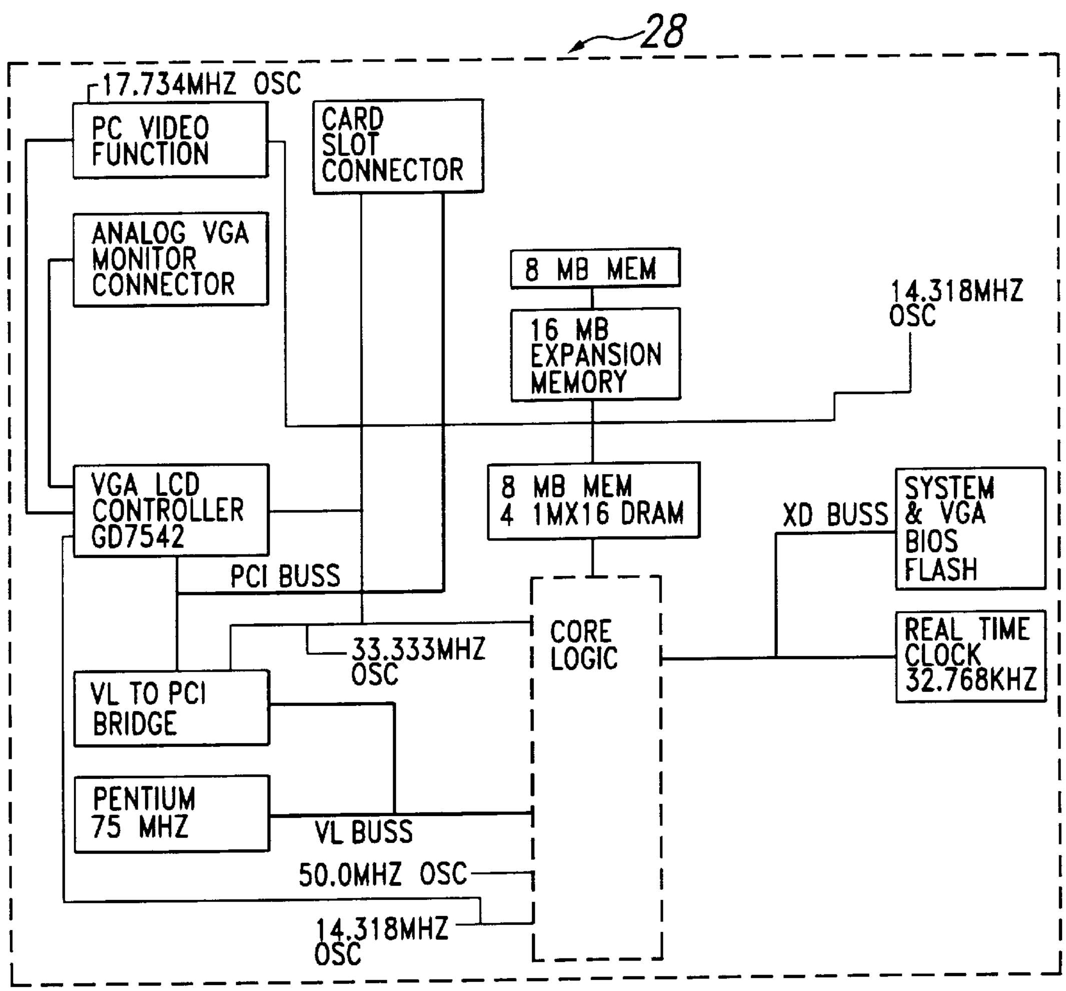

The system card 28 illustrated in FIG. 94 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, a controller coupling an analog VGA monitor connector and a PC video function to the PCI bus, and an XD bus coupling the system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 95:
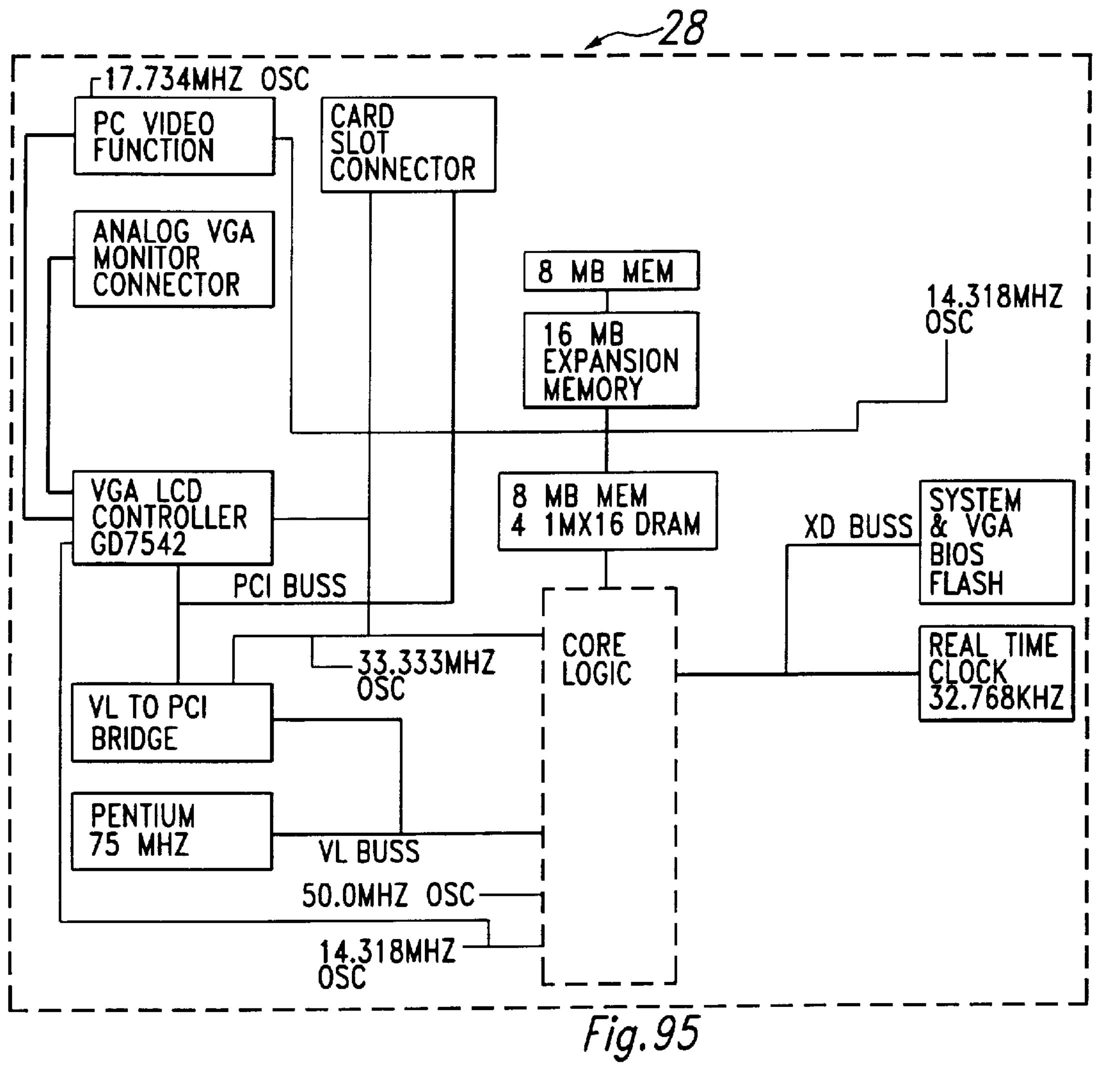

System card 28 illustrated in FIG. 95 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, a controller coupling an analog VGA monitor connector and a PC video function to the PCI bus, and an XD bus coupling the system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 96:
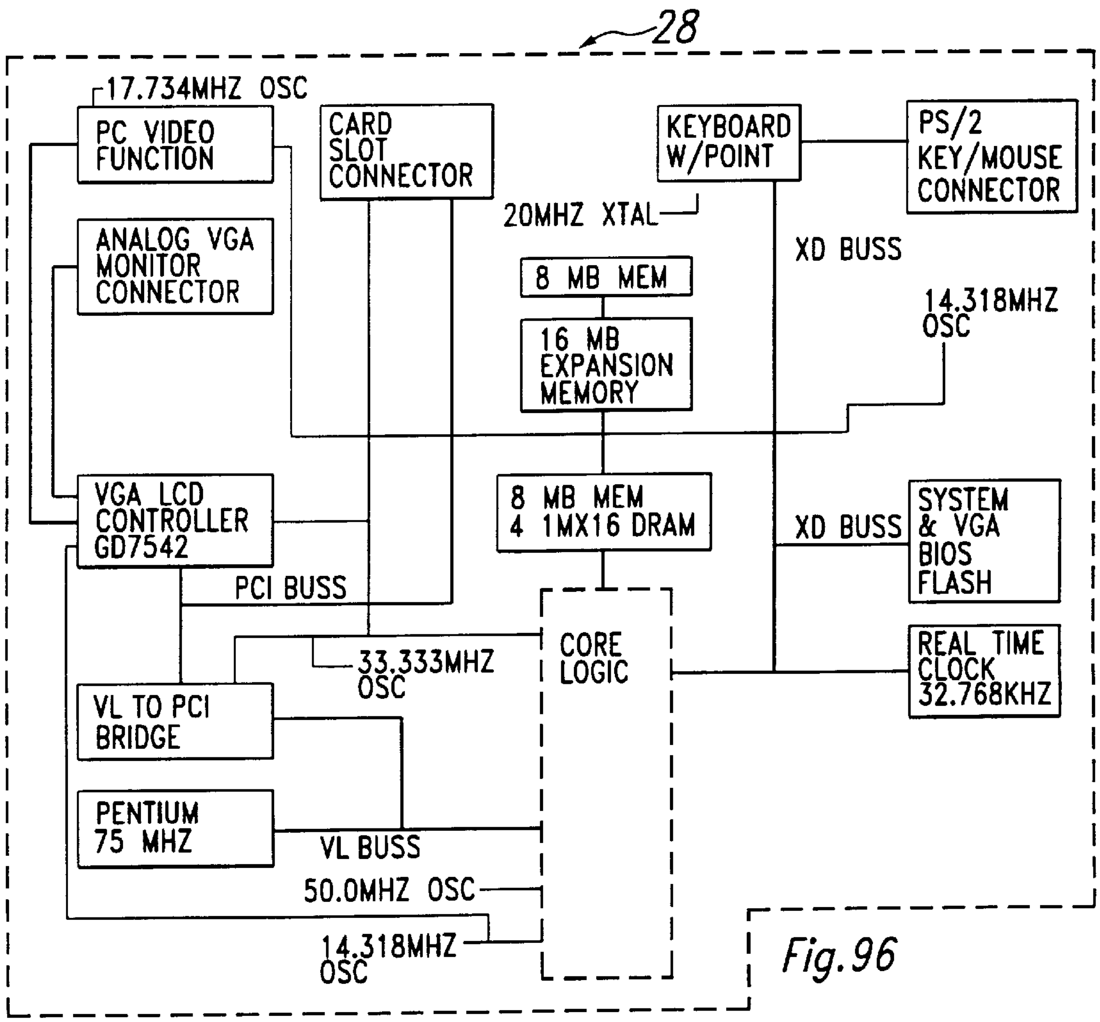

The system card 28 illustrated in FIG. 96 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory to the core logic, a controller coupling an analog VGA monitor connector and a PC video function to the PCI bus, a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 97:
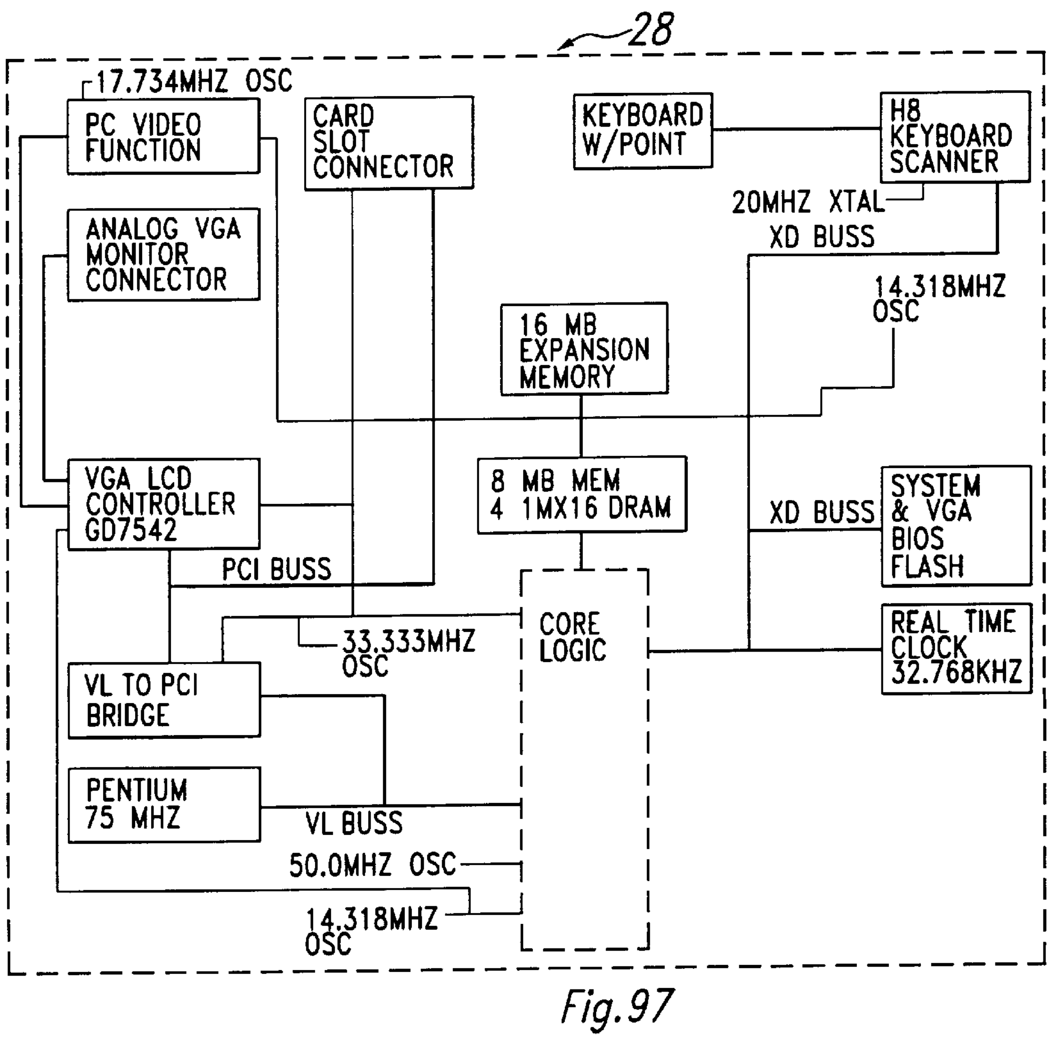

System card 28 illustrated in FIG. 97 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory to the core logic, a controller coupling an analog VGA monitor connector and a PC video function to the PCI bus, a keyboard coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 98:
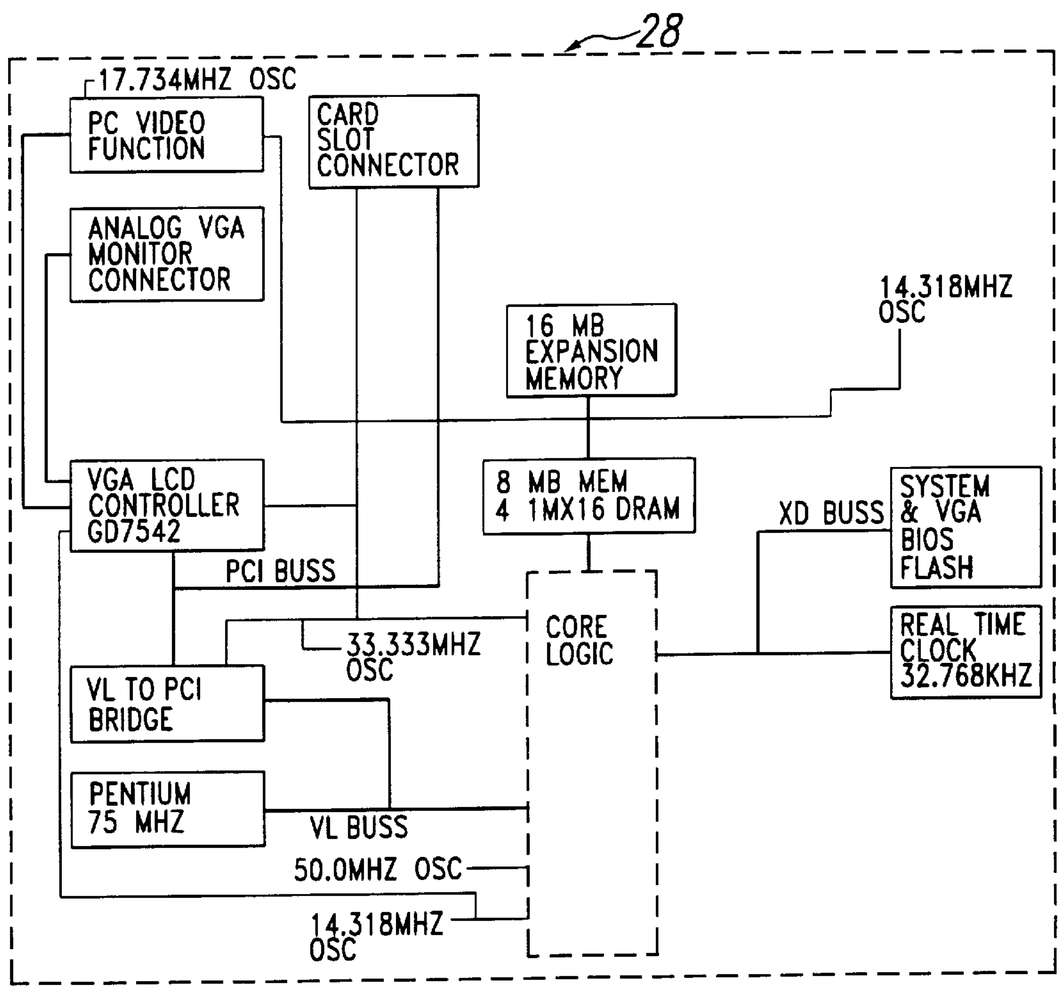

The system card 28 illustrated in FIG. 98 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory to the core logic, a controller coupling an analog VGA monitor connector and a PC video function to the PCI bus, and an XD bus coupling the system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 99:
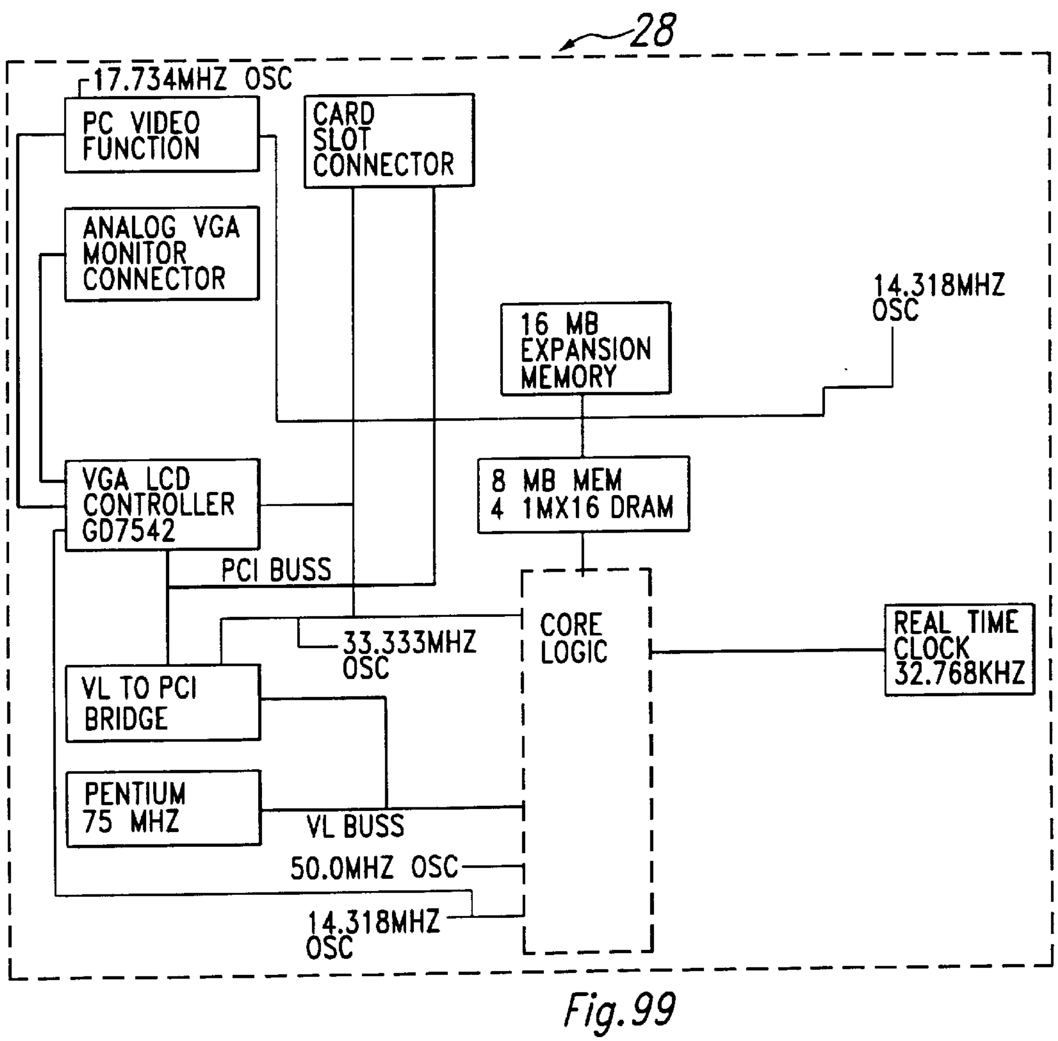

System card 28 illustrated in FIG. 99 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory to the core logic, a controller coupling an analog VGA monitor connector and a PC video function to the PCI bus, and an XD bus coupling the real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 100:
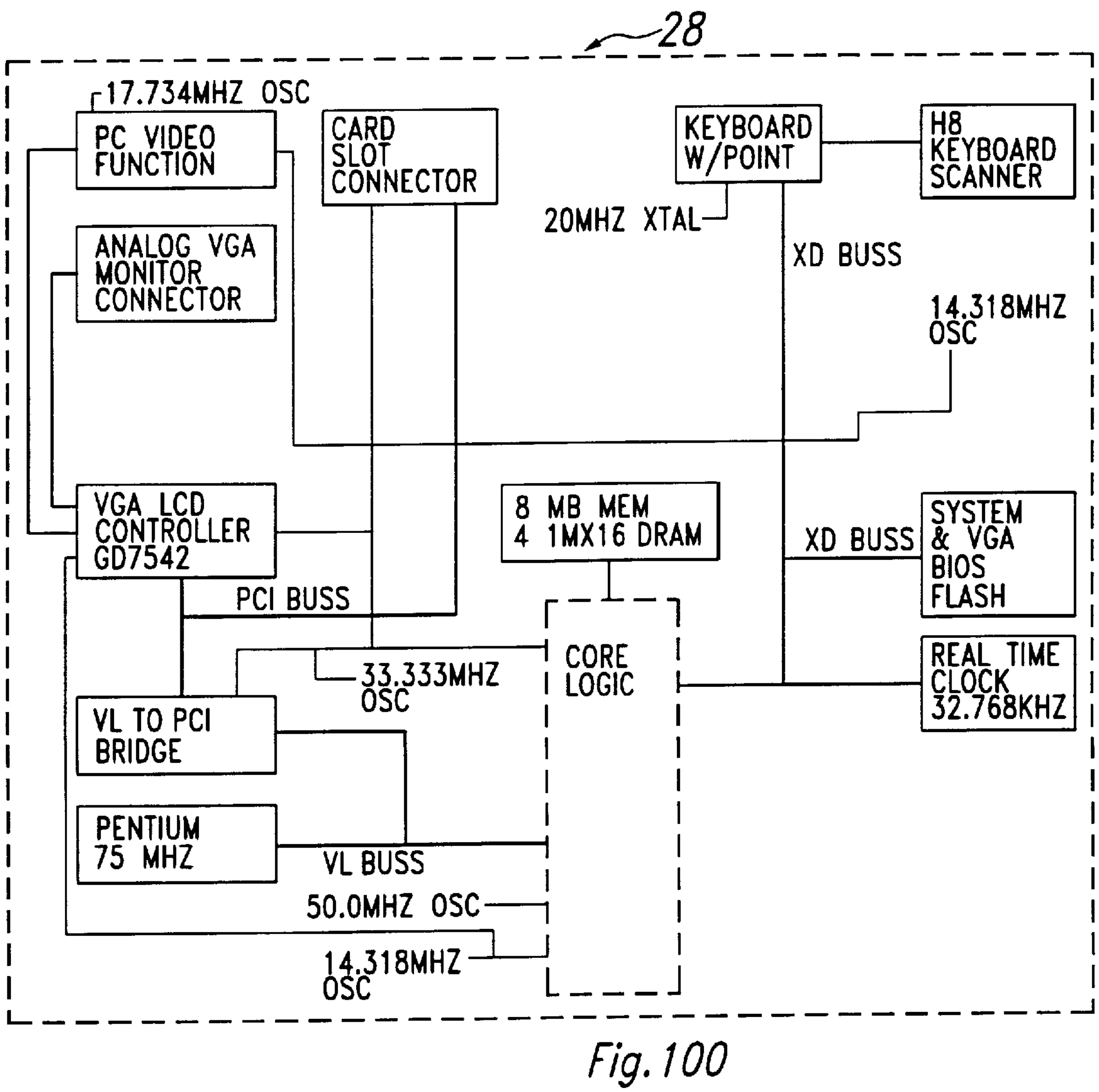

The system card 28 illustrated in FIG. 100 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupled to the core logic, a controller coupling an analog VGA monitor connector and a PC video function to the PCI bus, a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 101:
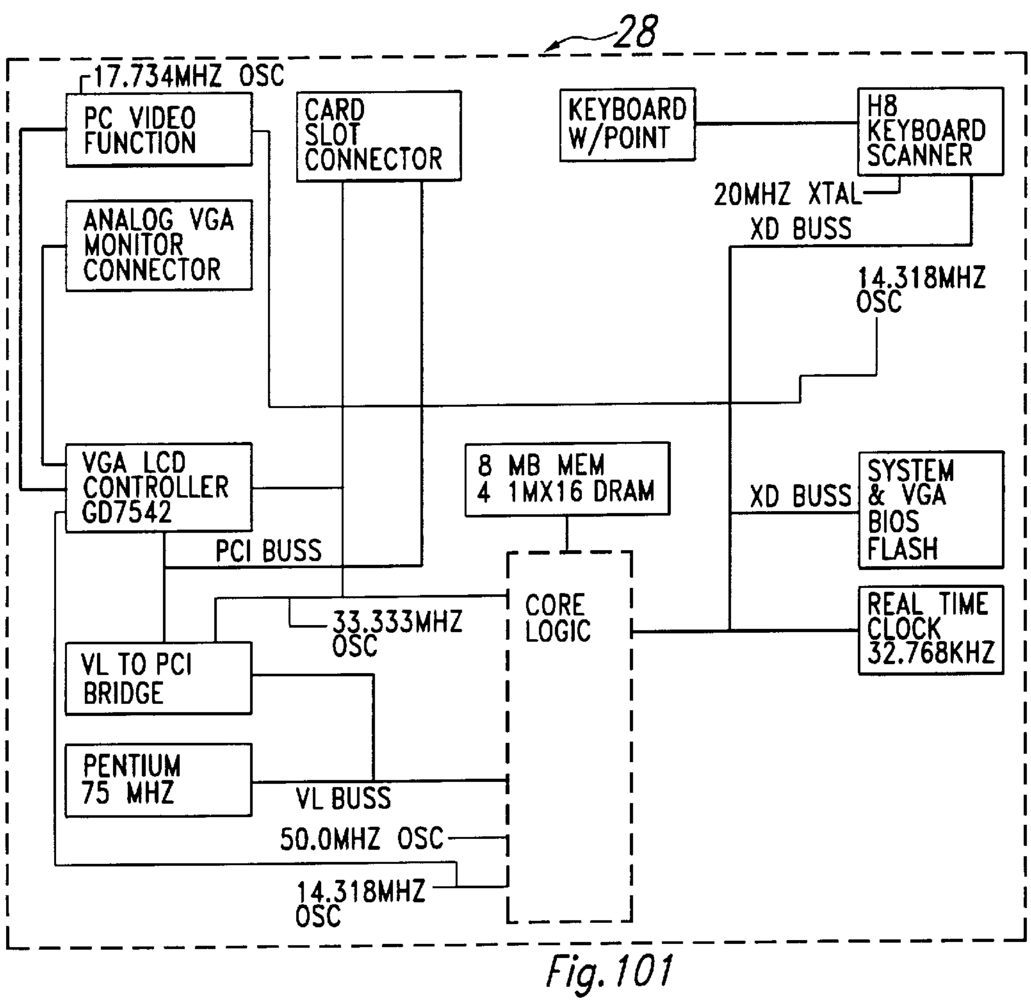

System card 28 illustrated in FIG. 101 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupled to the core logic, a controller coupling an analog VGA monitor connector and a PC video function to the PCI bus, a keyboard coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 102:
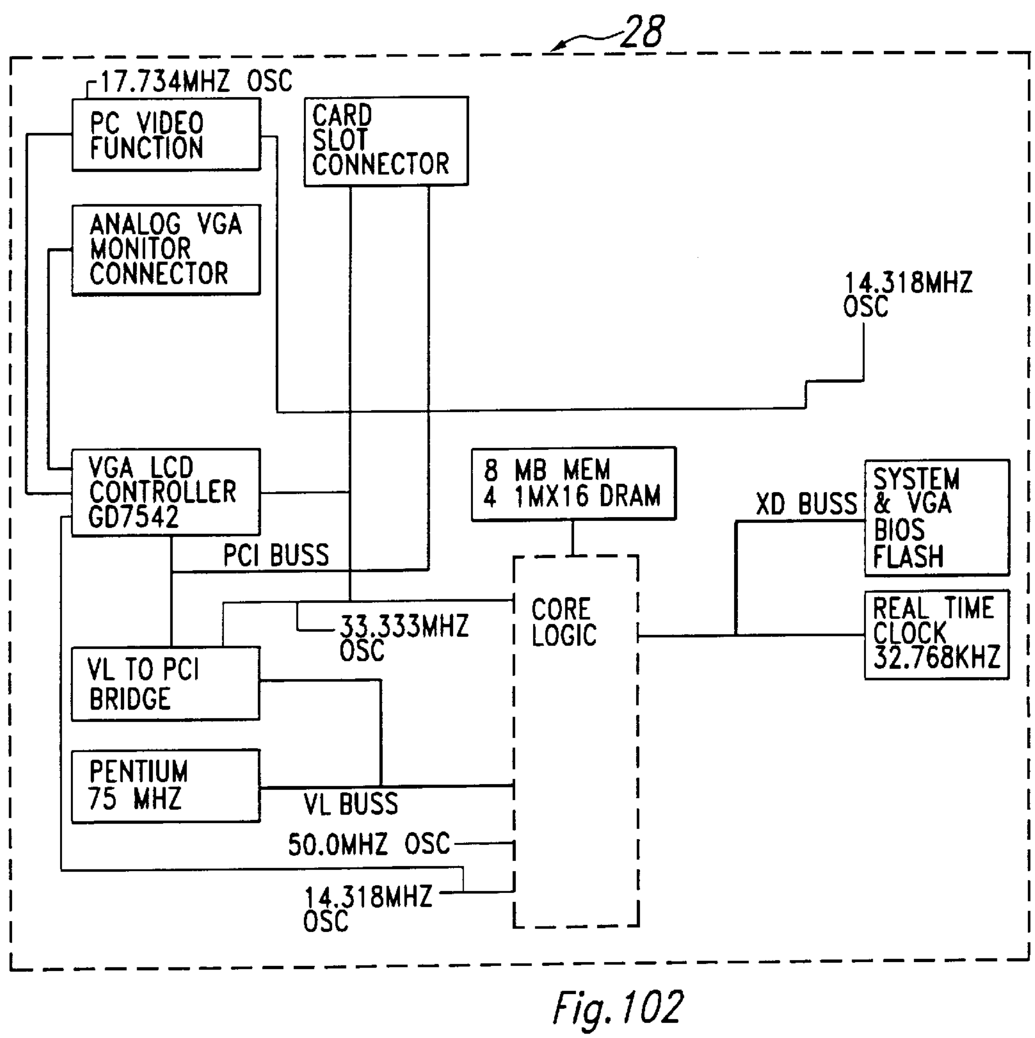

The system card 28 illustrated in FIG. 102 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupled to the core logic, a controller coupling an analog VGA monitor connector and a PC video function to the PCI bus, and an XD bus coupling the system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 103:
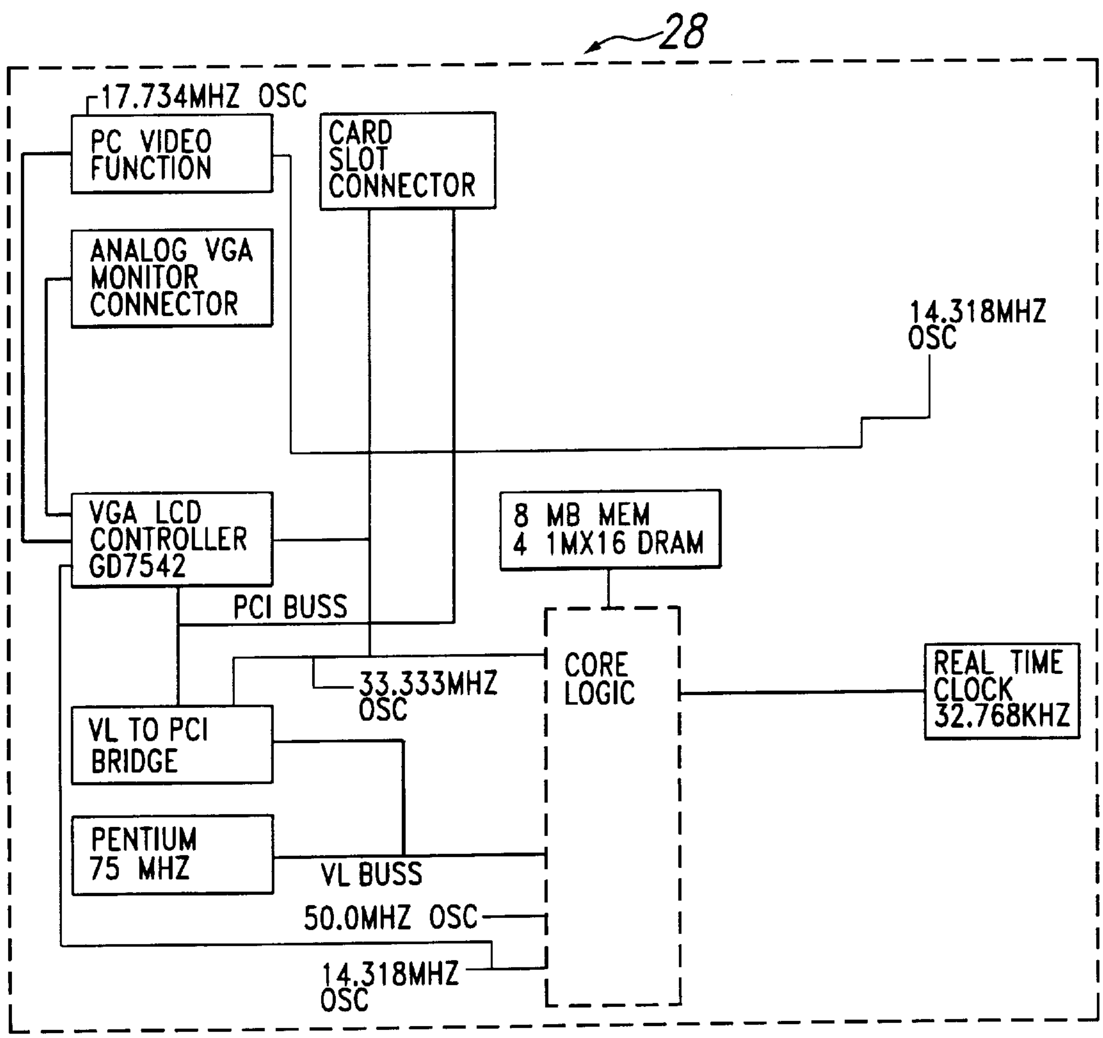

System card 28 illustrated in FIG. 103 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupled to the core logic, a controller coupling an analog VGA monitor connector and a PC video function to the PCI bus, and an XD bus coupling the real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 104:
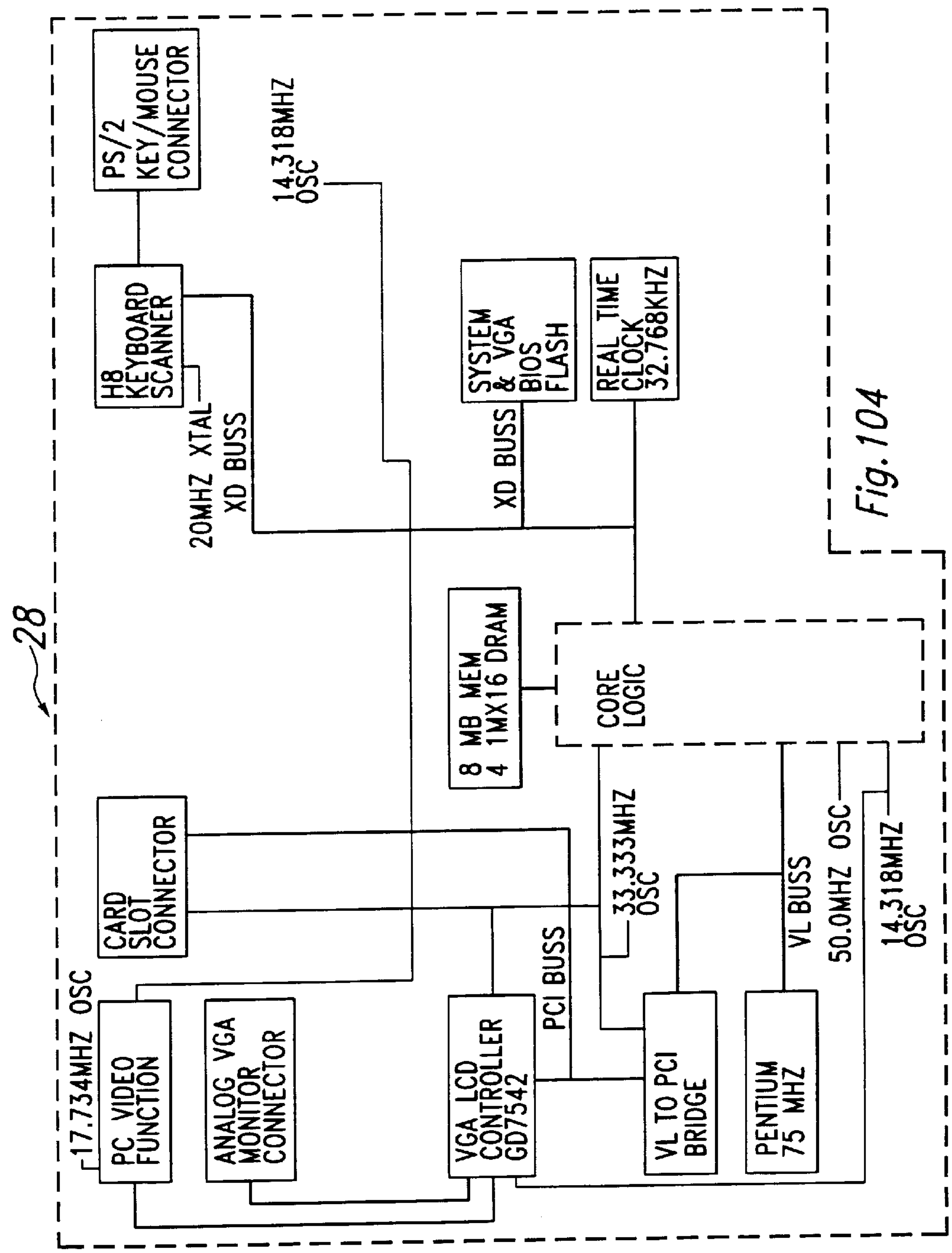

The system card 28 illustrated in FIG. 104 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, a controller coupling an analog VGA monitor connector and a PC video function to the PCI bus, a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 105:
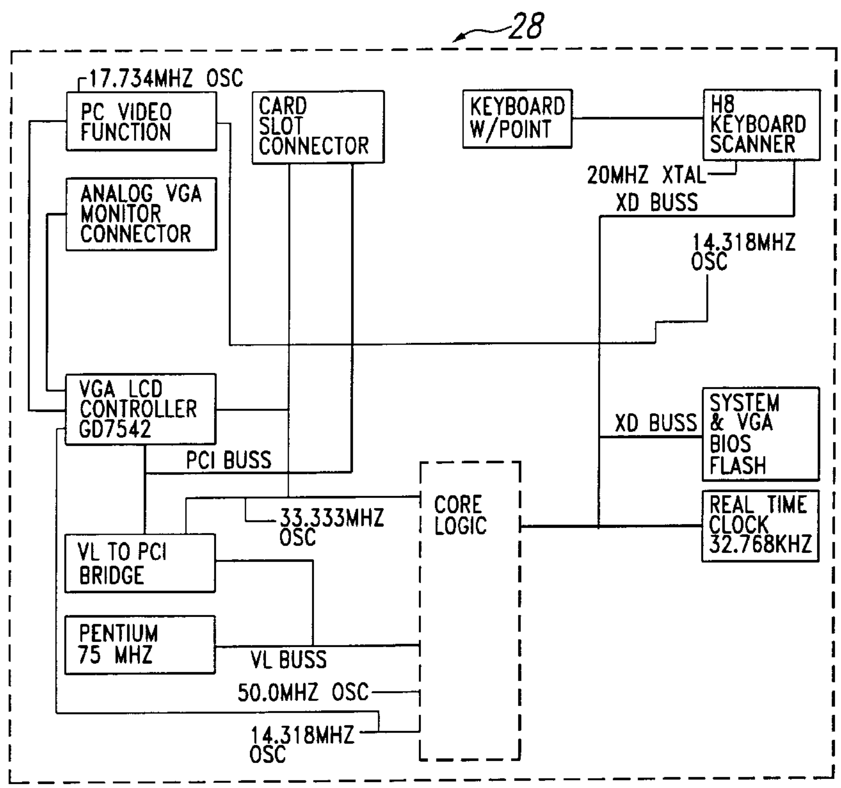

System card 28 illustrated in FIG. 105 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, a controller coupling an analog VGA monitor connector and a PC video function to the PCI bus, a keyboard coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 106:
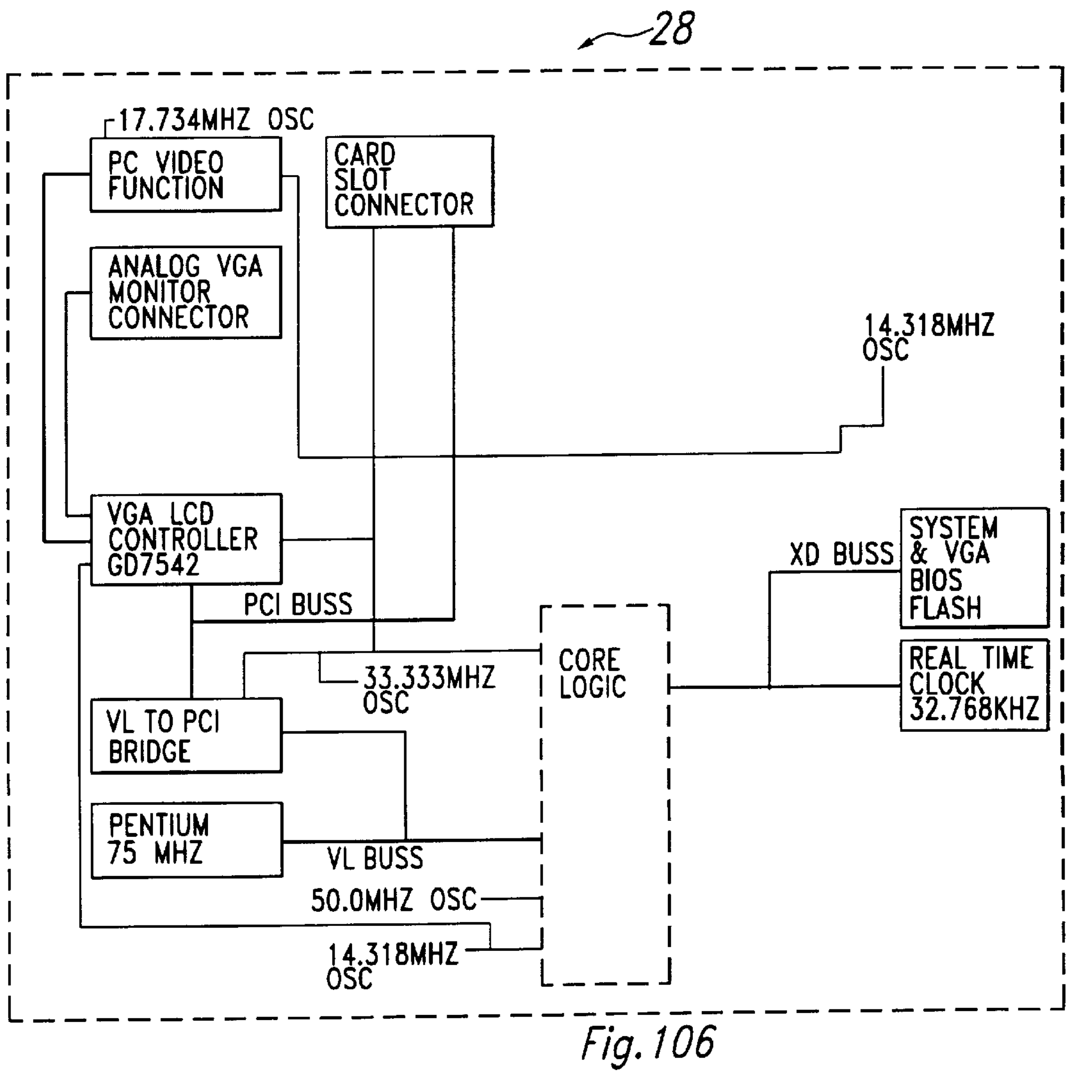

The system card 28 illustrated in FIG. 106 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, a controller coupling an analog VGA monitor connector and a PC video function to the PCI bus, and an XD bus coupling the system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 107:
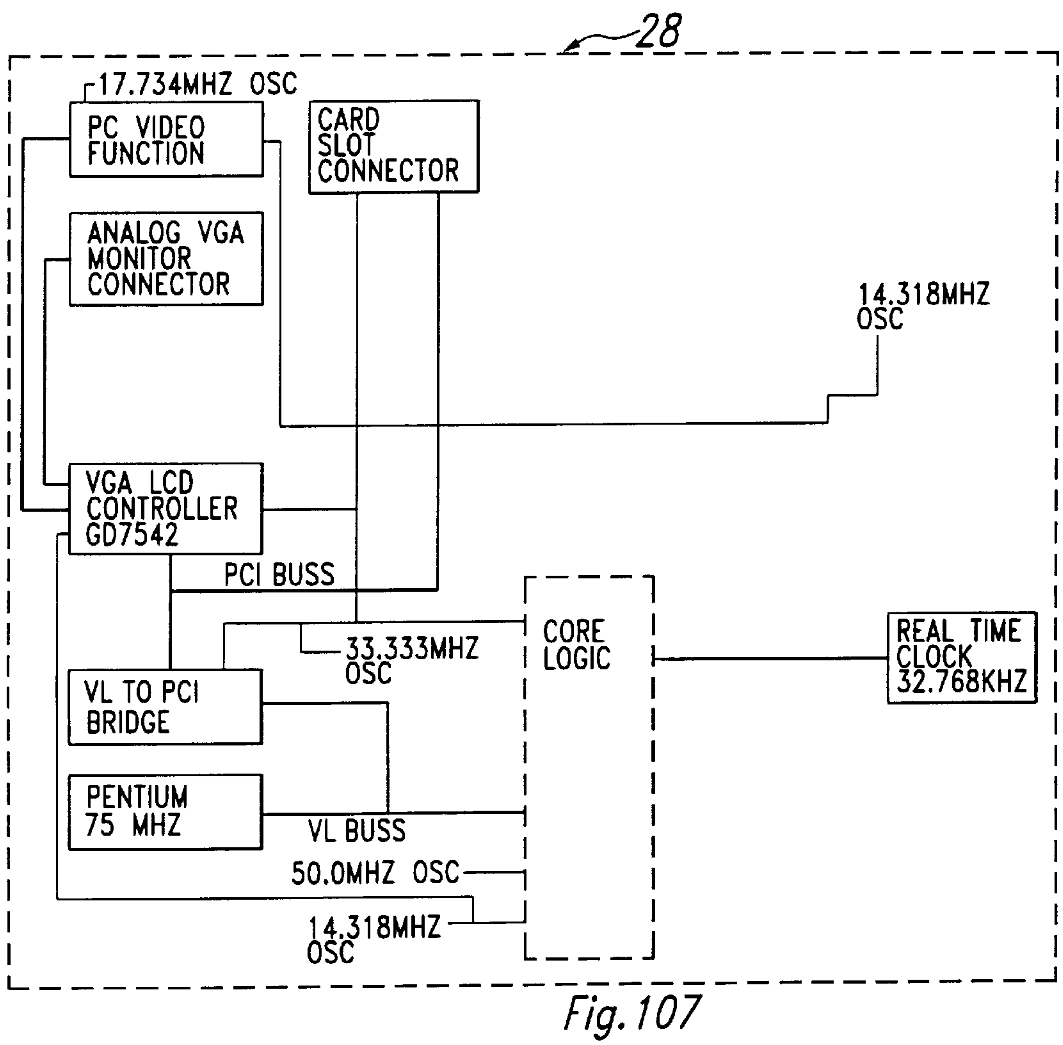

System card 28 illustrated in FIG. 107 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, a controller coupling an analog VGA monitor connector and a PC video function to the PCI bus, and an XD bus coupling the real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 108:
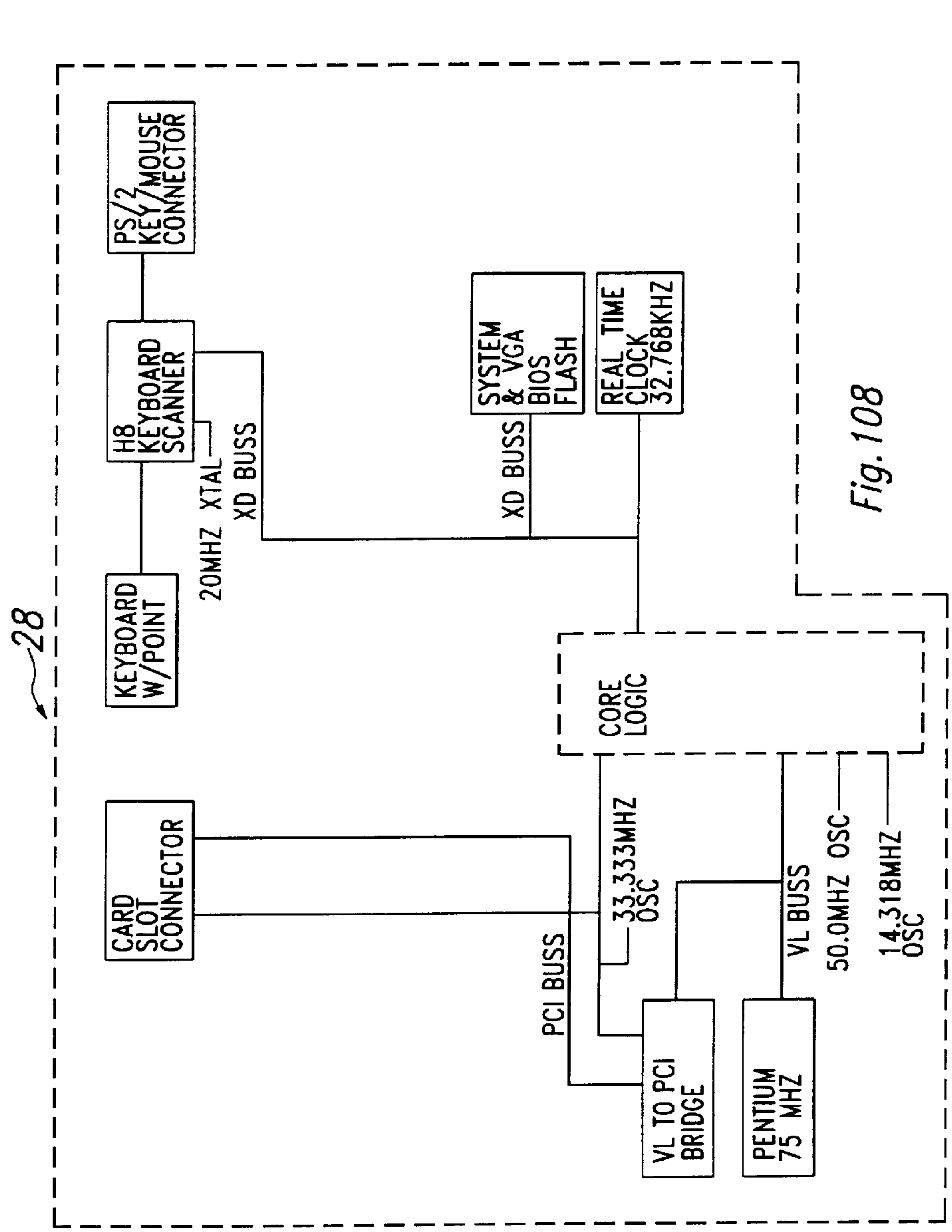

The system card 28 illustrated in FIG. 108 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, a keyboard and a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 109:
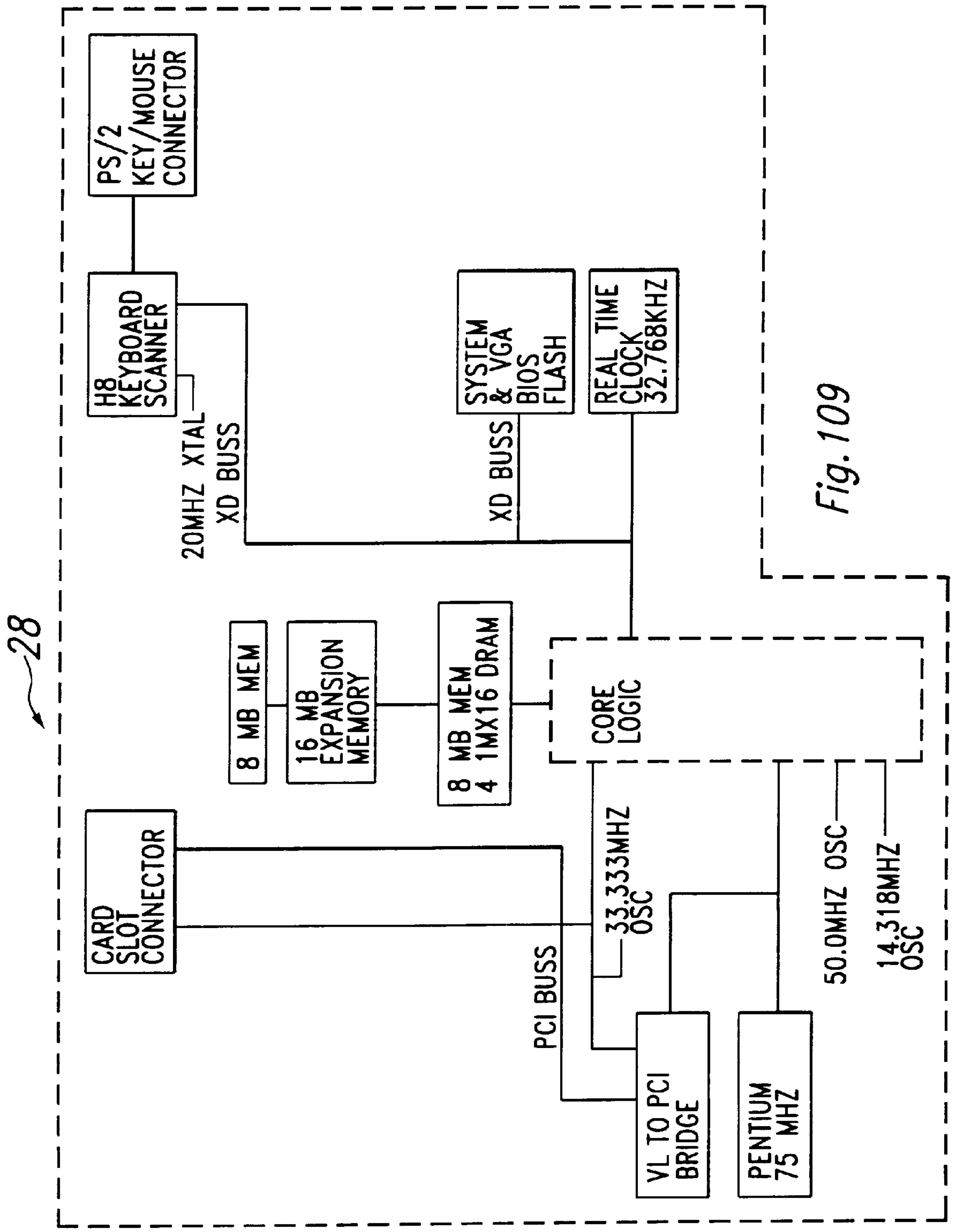

System card 28 illustrated in FIG. 109 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 110:
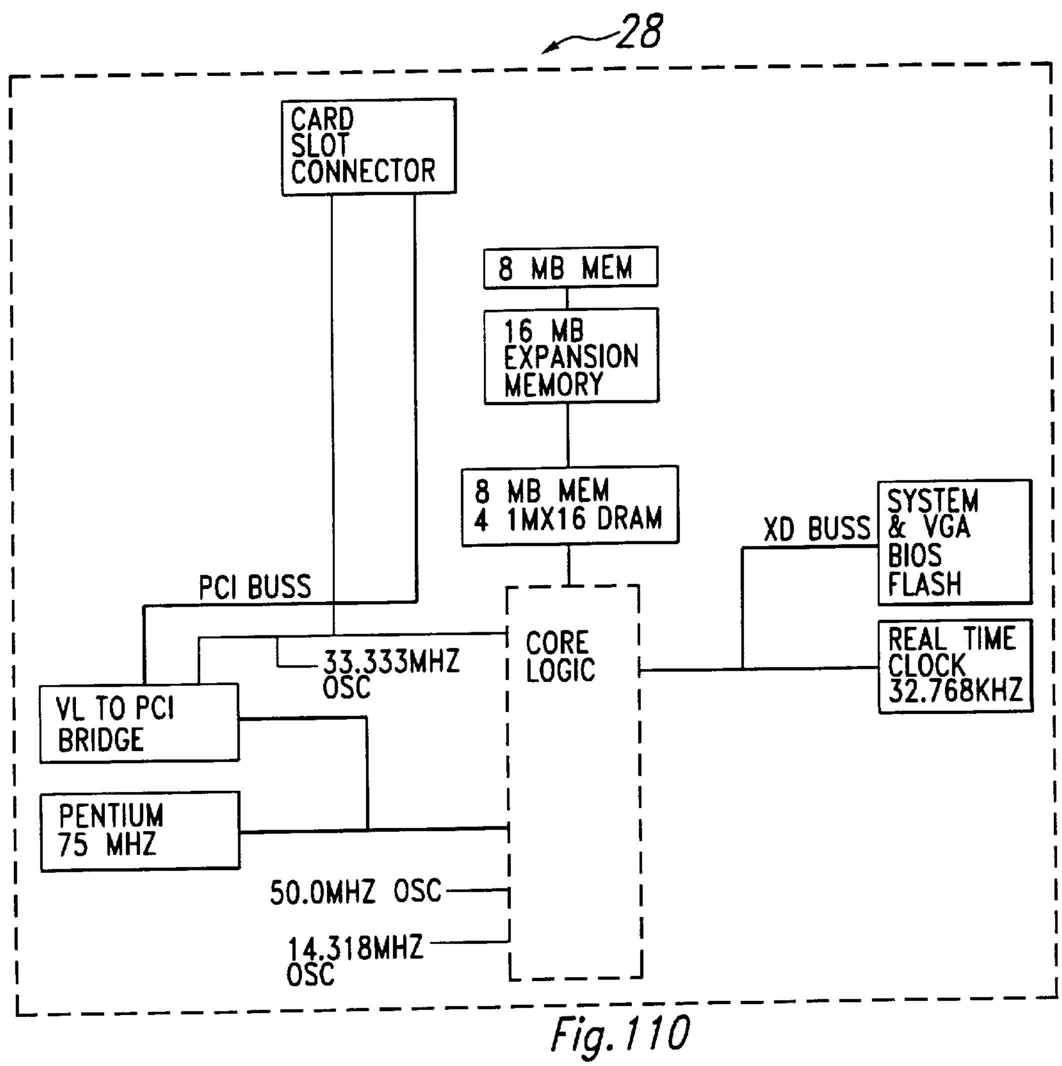

The system card 28 illustrated in FIG. 110 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, and an XD bus coupling the system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 111:
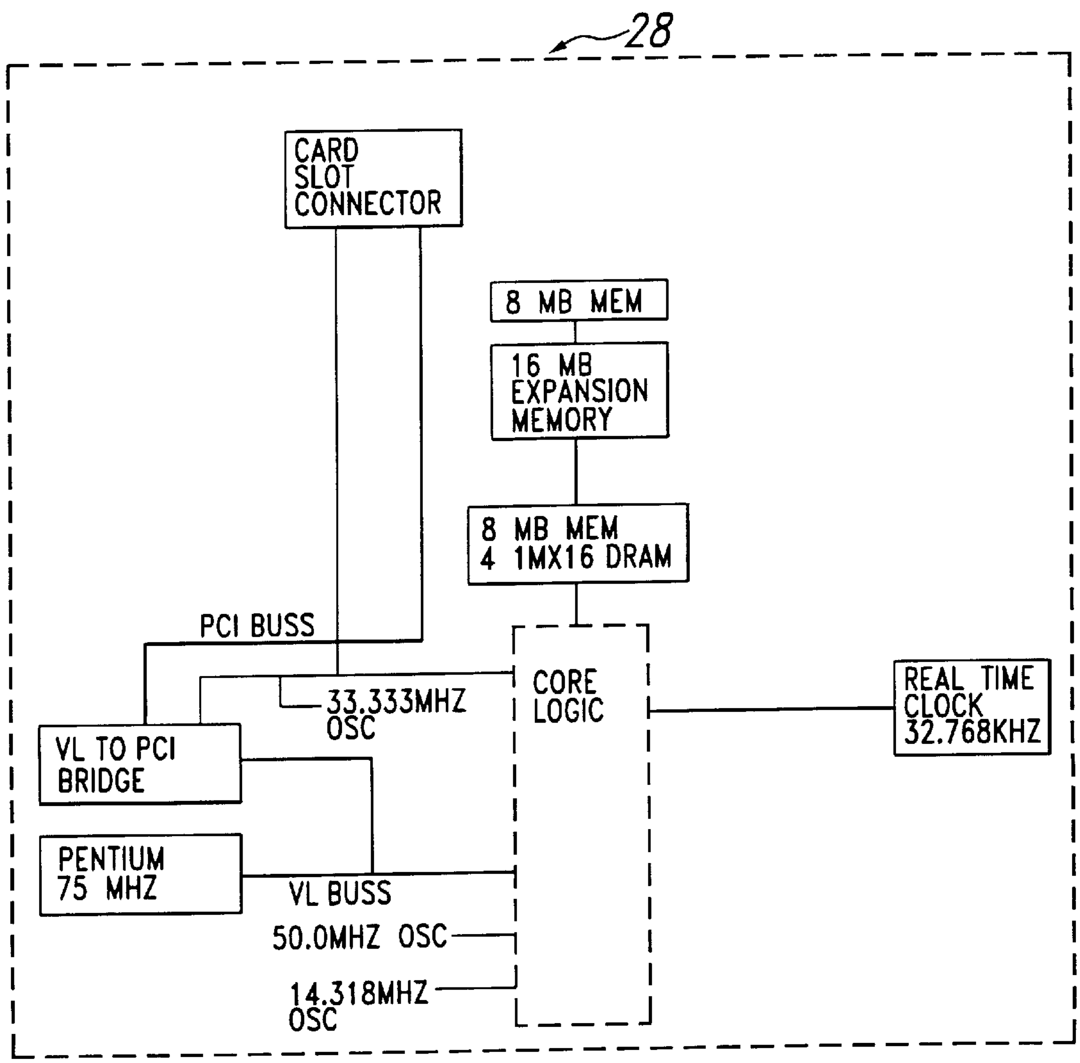

System card 28 illustrated in FIG. 111 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory and additional 8 MB memory to the core logic, and an XD bus coupling the real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 112:
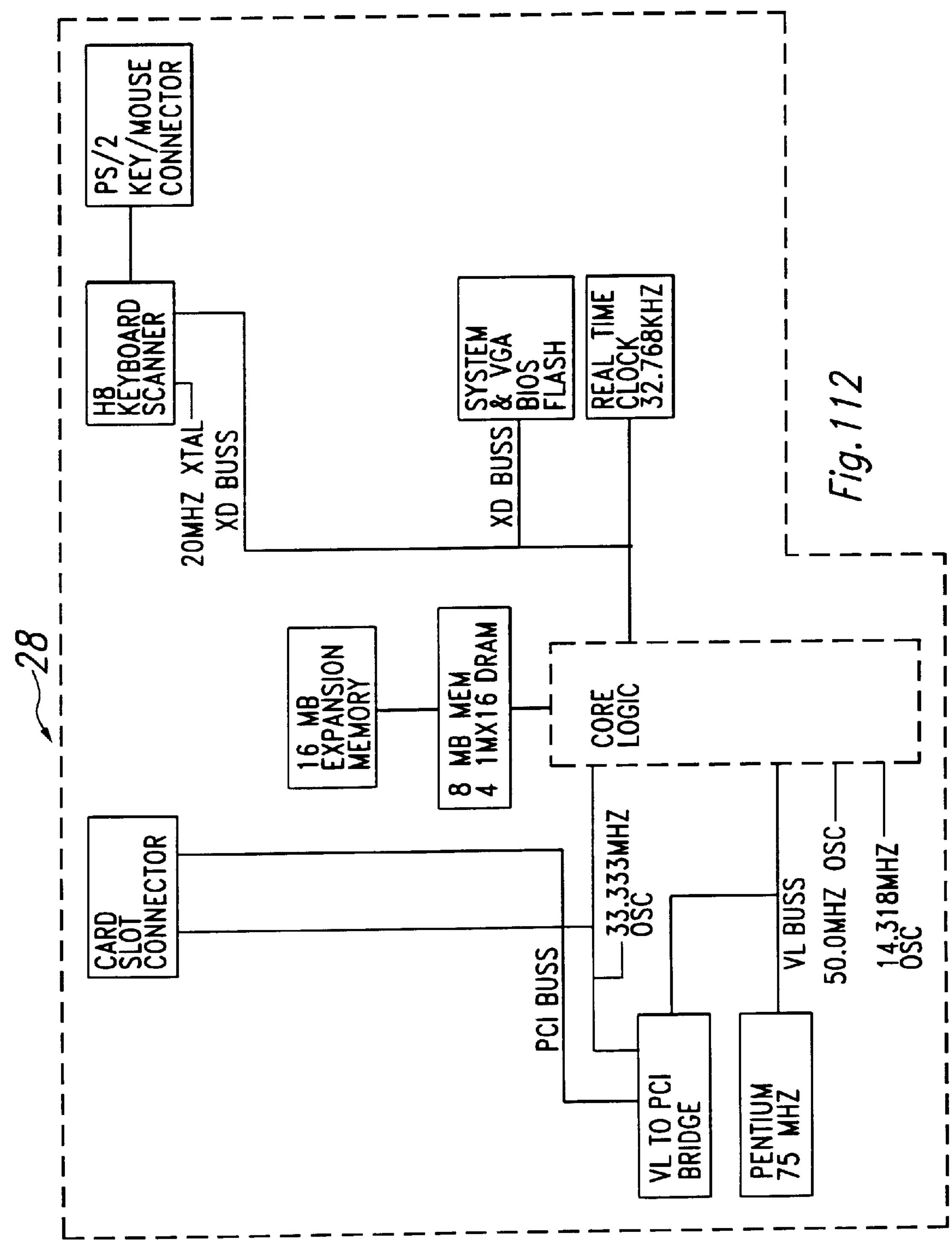

The system card 28 illustrated in FIG. 112 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory to the core logic, a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 113:
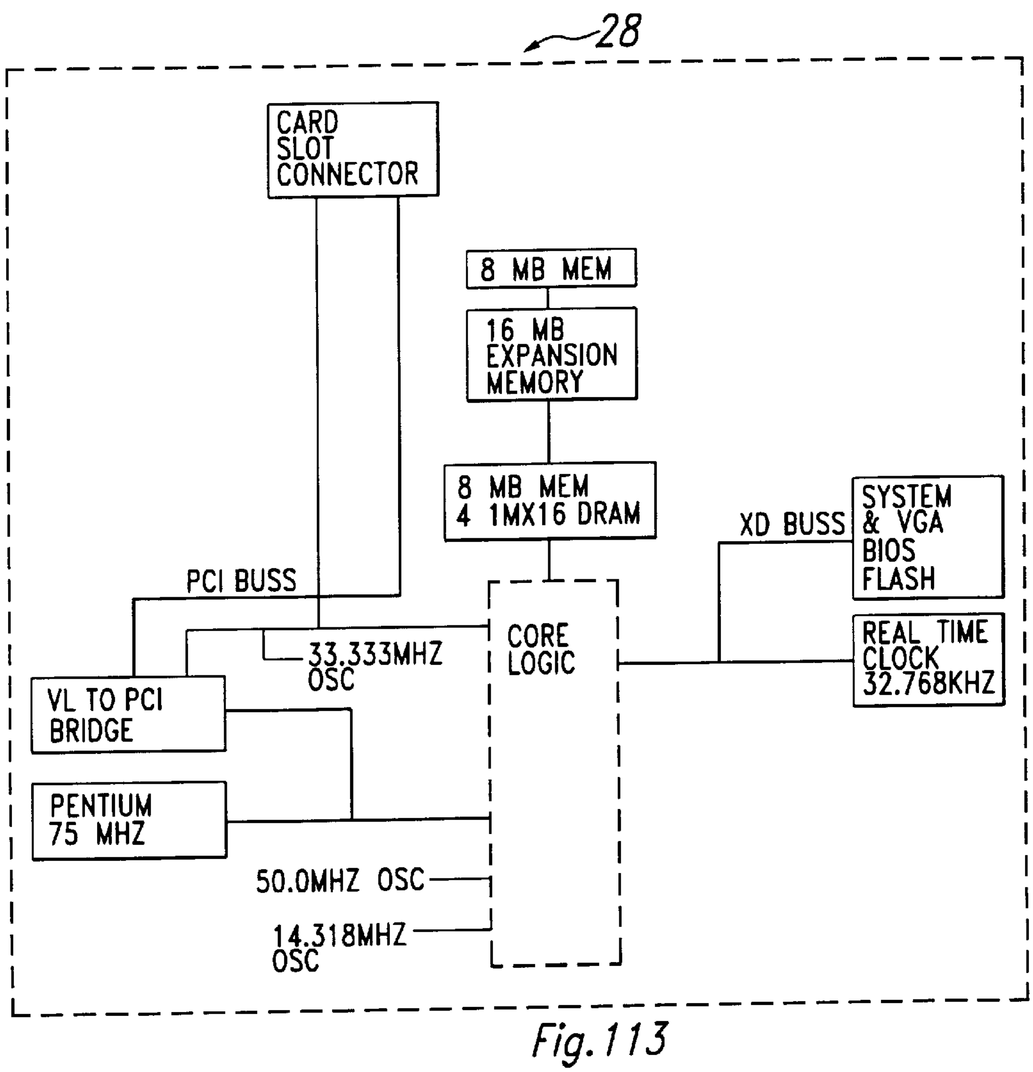

System card 28 illustrated in FIG. 113 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory to the core logic, and an XD bus coupling the system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 114:
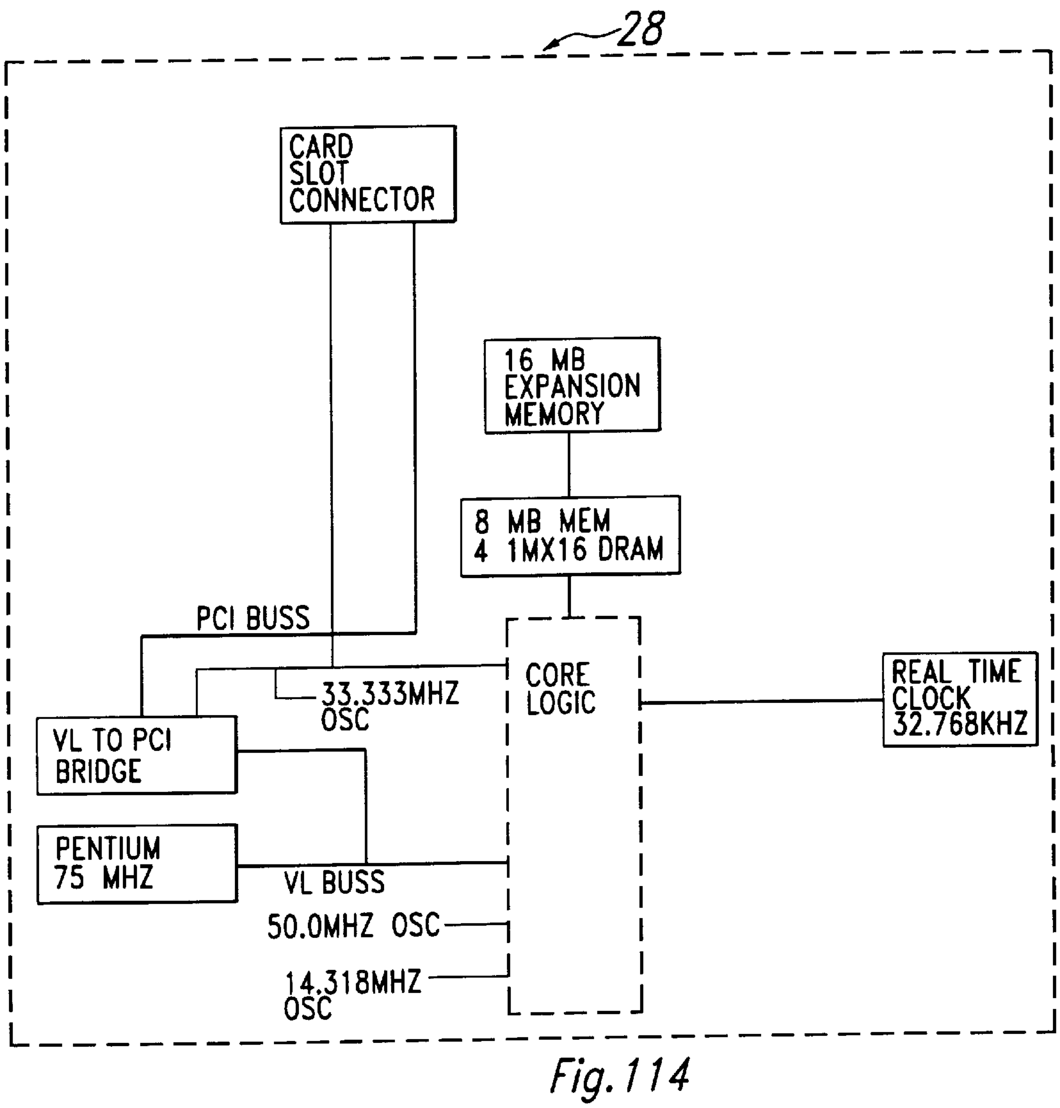

The System card 28 illustrated in FIG. 114 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupling a 16 MB Expansion Memory to the core logic, and an XD bus coupling the real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 115:
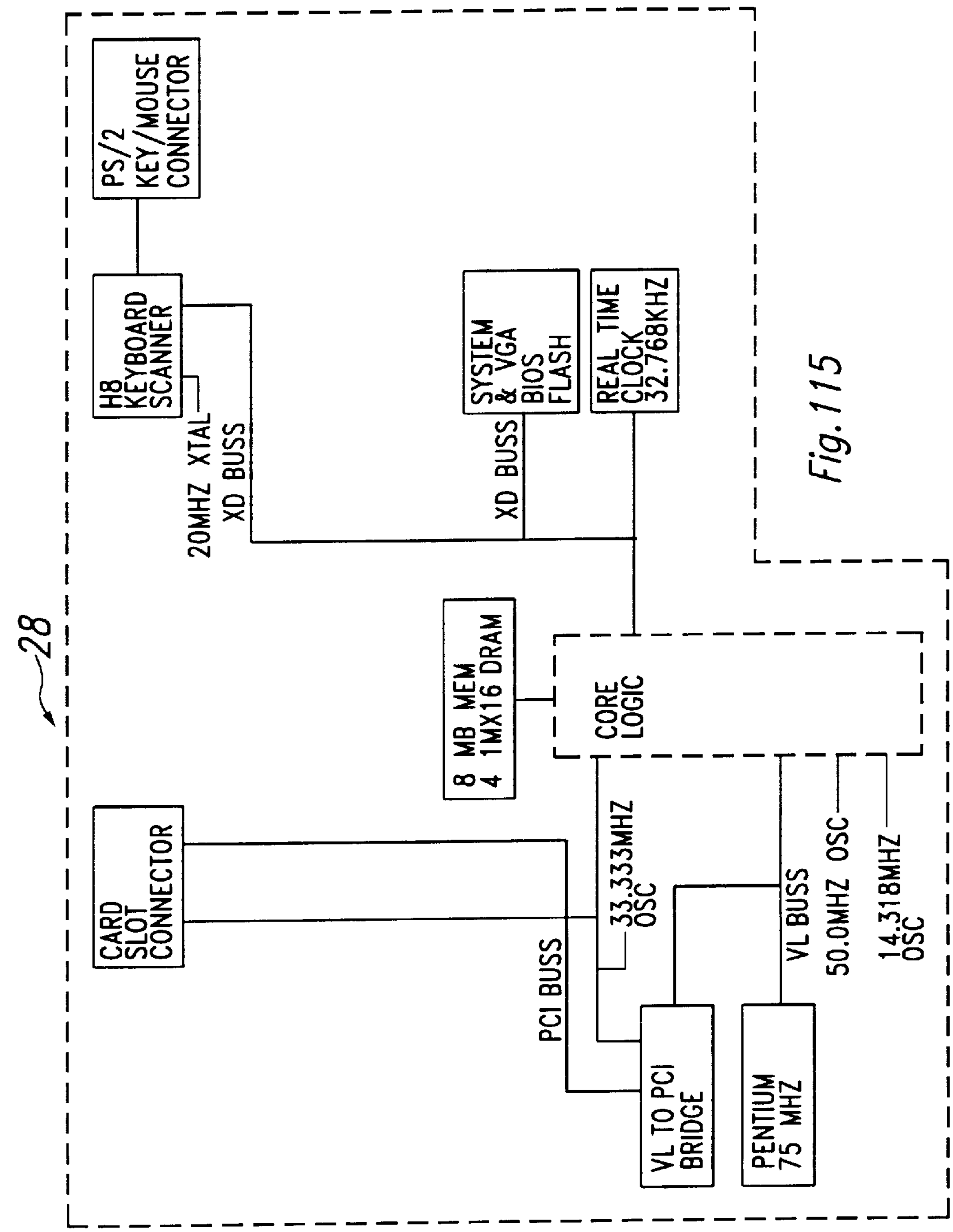

System card 28 illustrated in FIG. 115 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupled to the core logic, a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 116:
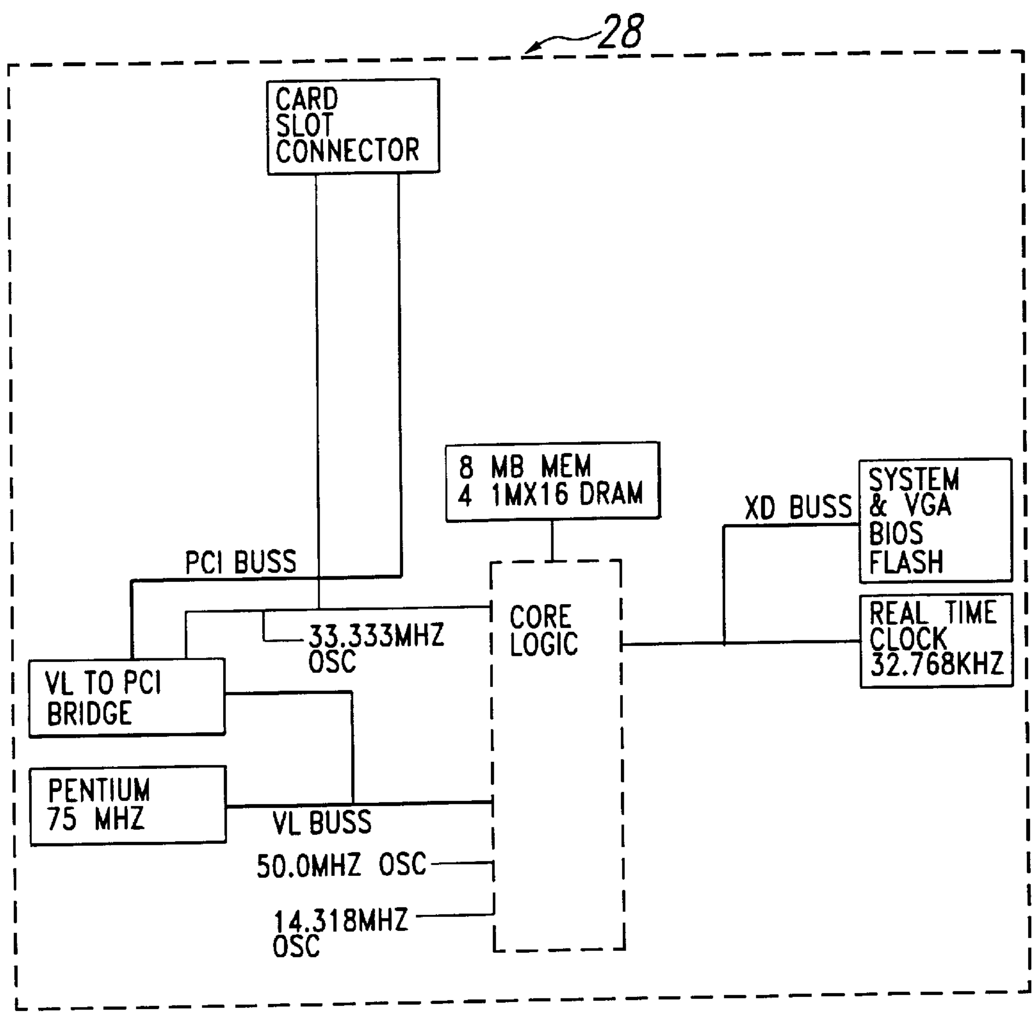

The system card 28 illustrated in FIG. 116 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupled to the core logic, and an XD bus coupling the system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 117:
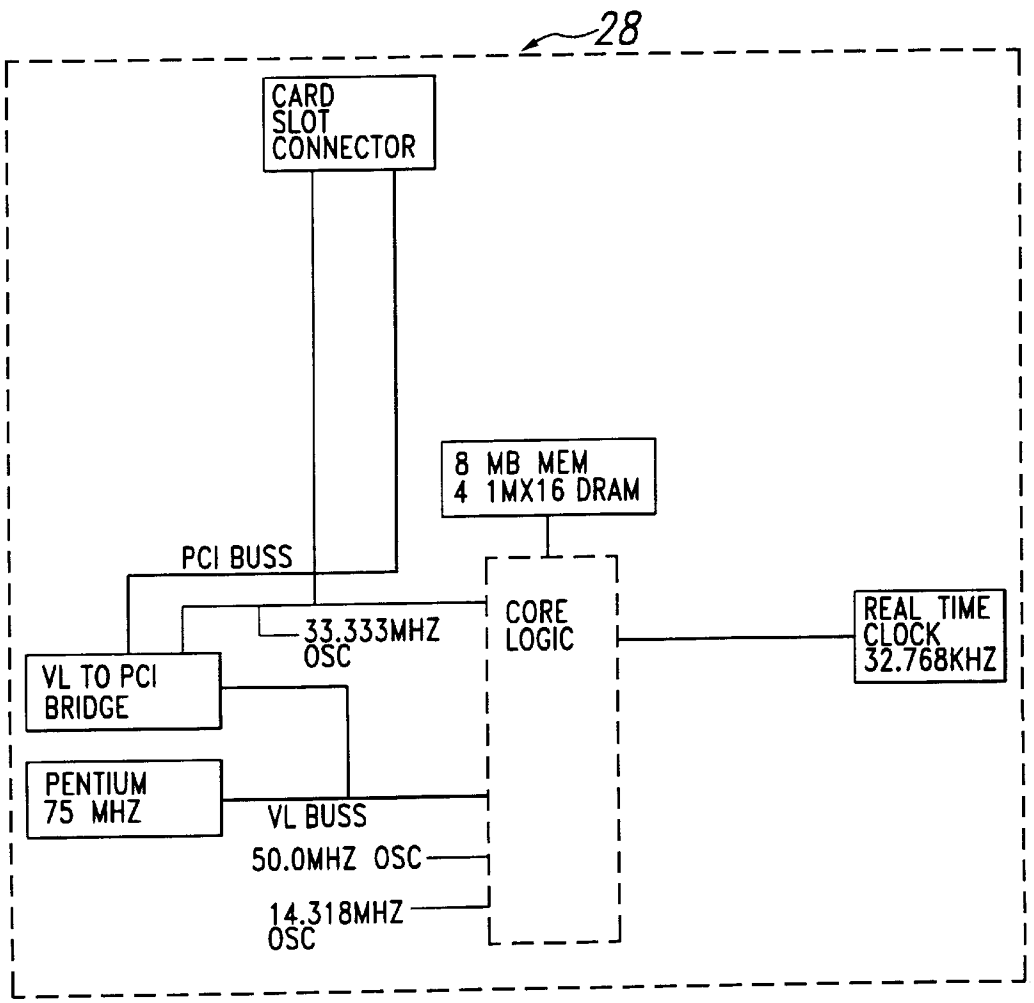

System card 28 illustrated in FIG. 117 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, an 8 MB memory coupled to the core logic, and an XD bus coupling the real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 118:
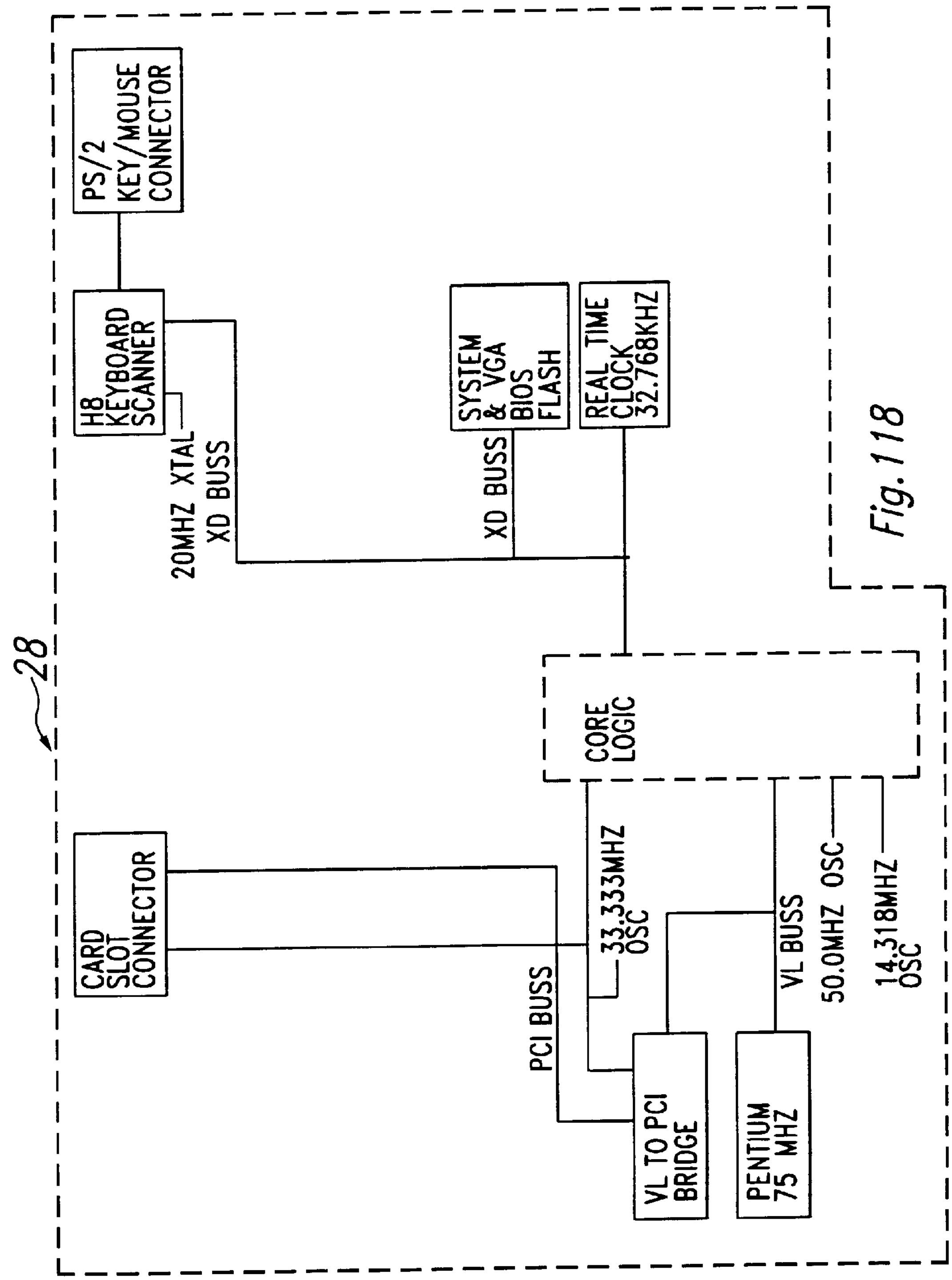

The system card 28 illustrated in FIG. 118 provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, a key/mouse connector coupled to a keyboard scanner and an XD bus coupling the keyboard scanner, system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 119:
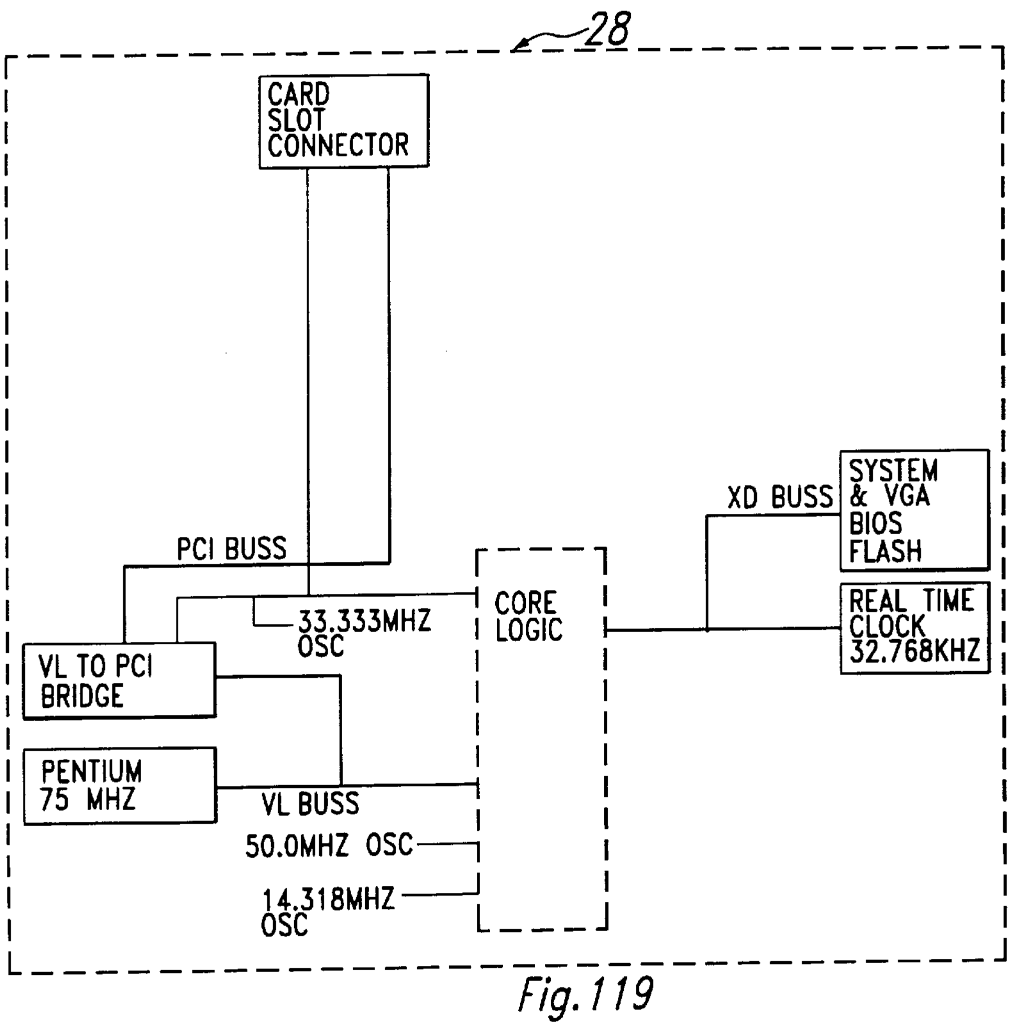

System card 28 illustrated in FIG. 119 also provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, and an XD bus coupling the system & VGA bios flash and real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 120:
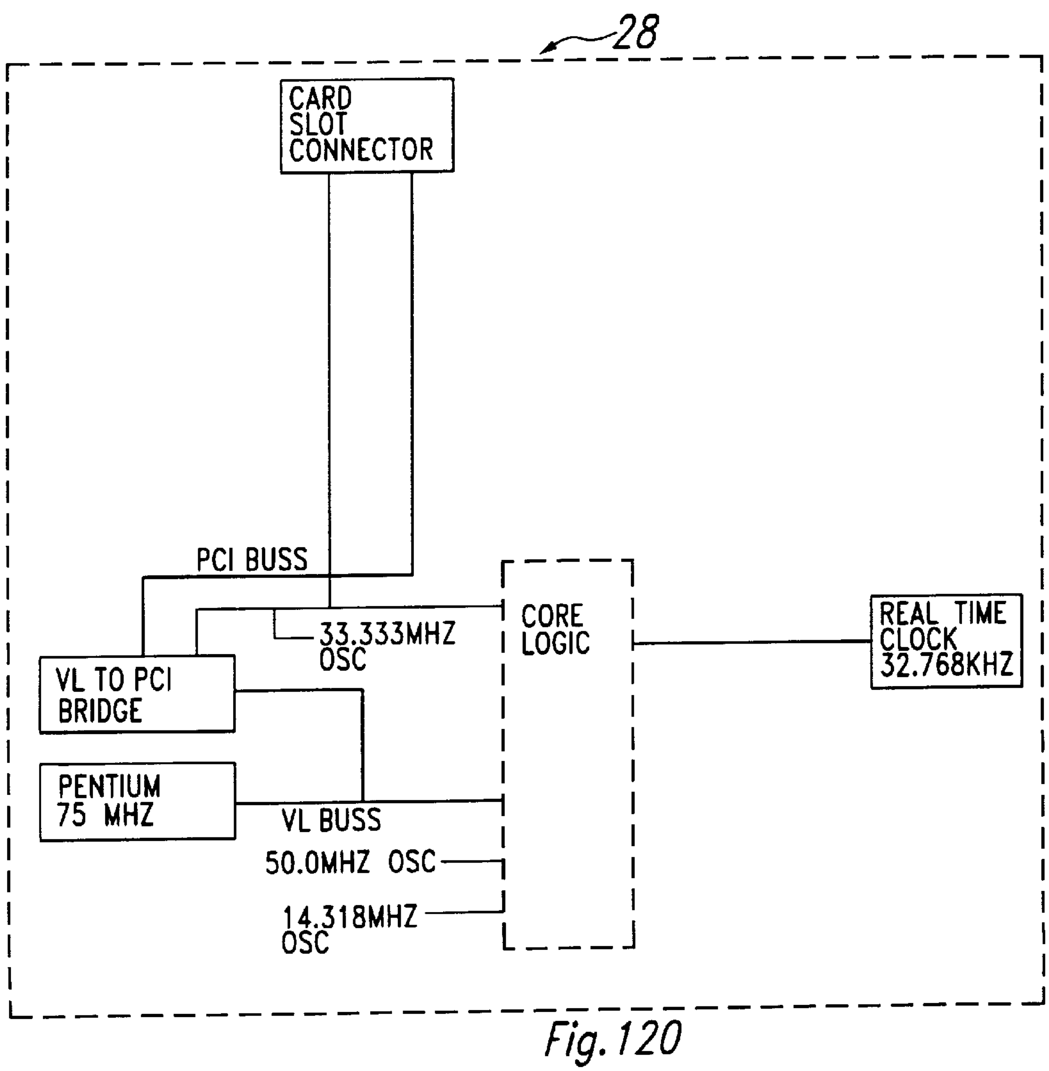

The System card 28 illustrated in FIG. 120 similarly provides some of the functionality of a PC (personal computer). The system card contains its own processing unit (75 Mhz Pentium cpu in this embodiment), a VL bus coupling the cpu to core logic, a VL to PCI bridge coupling a PCI bus to the VL bus, and an XD bus coupling the real time clock to core logic. The card slot connector on system card 28 couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 121:
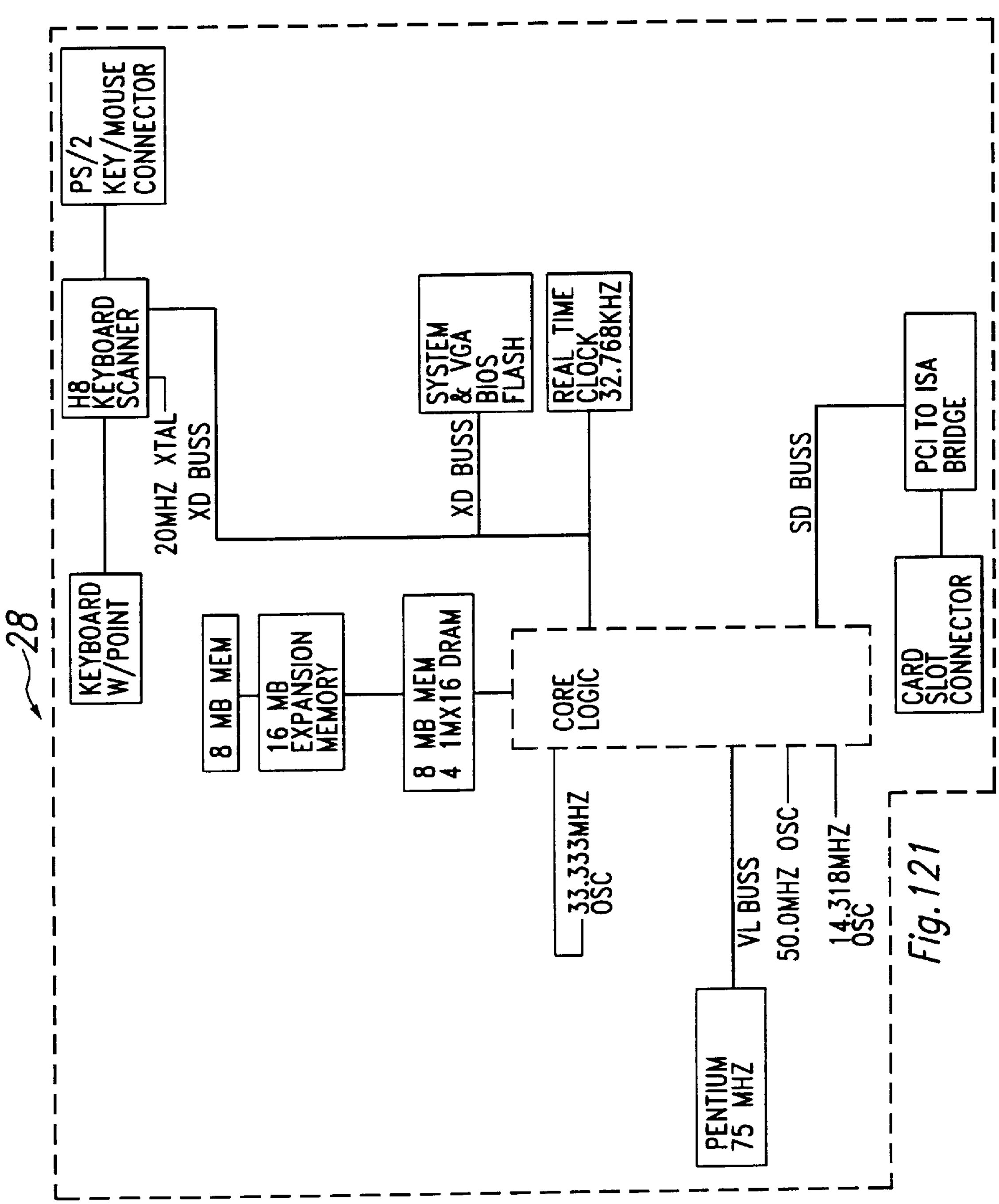

System card 28 illustrated in FIG. 121 provides some of the functionality of a PC (personal computer). The system card contains its own processing unit (75 Mhz Pentium cpu in this embodiment), a VL bus coupling the cpu to core logic, an 8 MB memory coupling a 16 MB Expansion Memory and additional 8 MB memory to the core logic, a keyboard and a key/mouse connector coupled to a keyboard scanner and an XD bus coupling the keyboard scanner, system & VGA bios flash and real time clock to core logic. A PCI to ISA bridge couples the card slot connector to the core logic. The card slot connector couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 122:
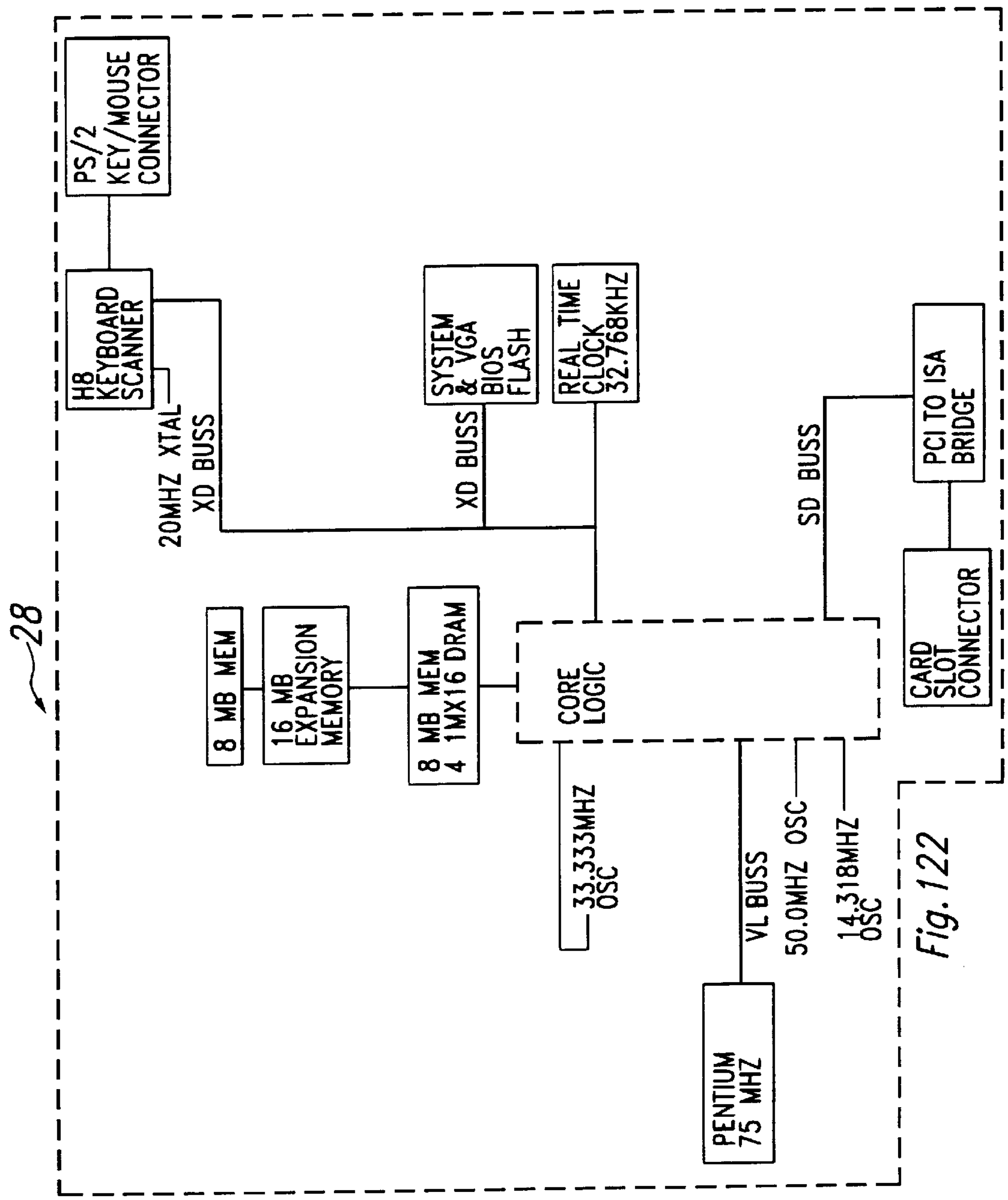

The system card 28 illustrated in FIG. 122 also provides some of the functionality of a PC (personal computer). The system card contains its own processing unit (75 Mhz Pentium cpu in this embodiment), a VL bus coupling the cpu to core logic, an 8 MB memory coupling a 16 MB Expansion Memory and additional 8 MB memory to the core logic, a key/mouse connector coupled to a keyboard scanner and an XD bus coupling the keyboard scanner, system & VGA bios flash and real time clock to core logic. A PCI to ISA bridge couples the card slot connector to the core logic. The card slot connector couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 123:
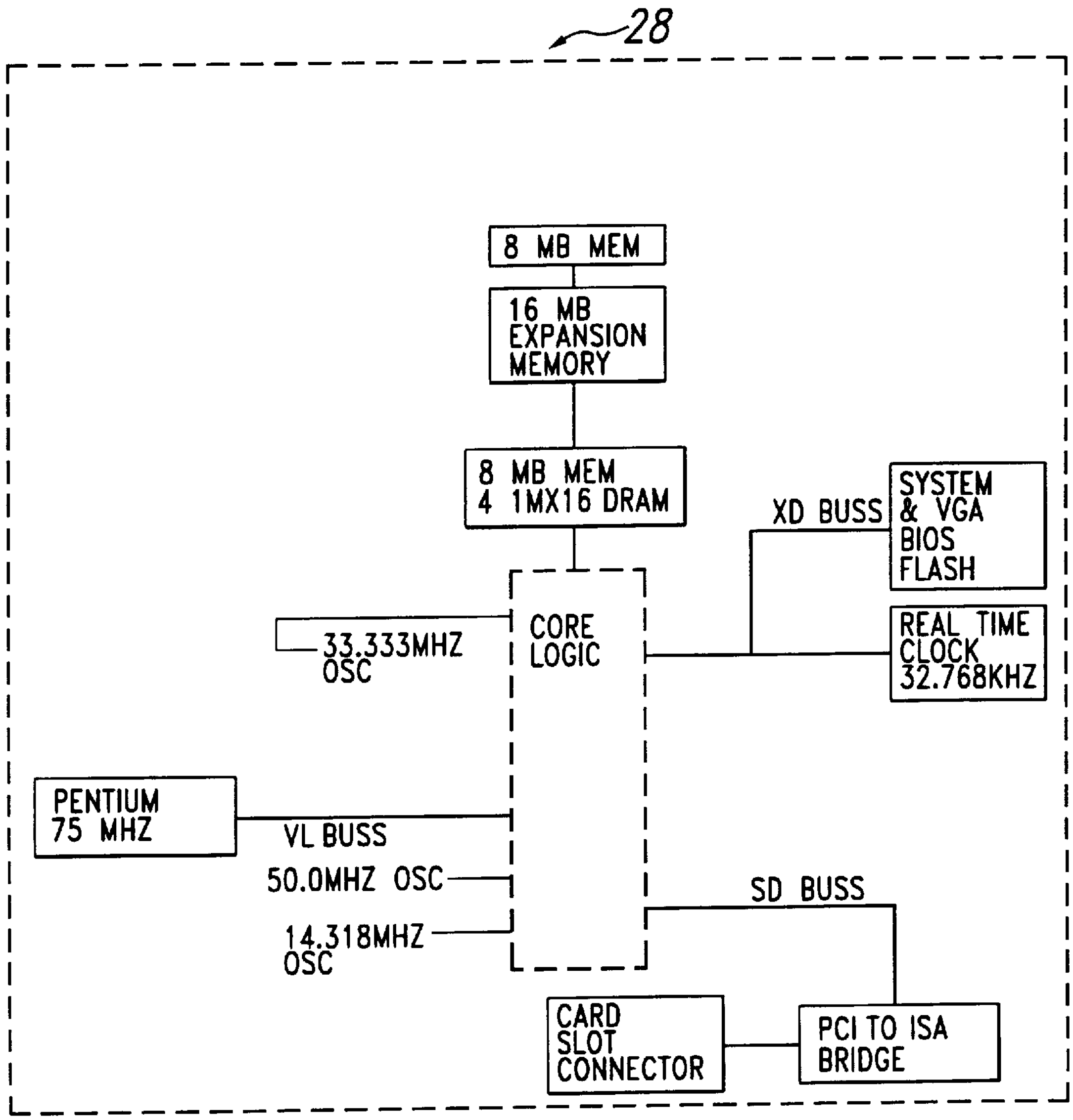

System card 28 illustrated in FIG. 123 similarly provides some of the functionality of a PC (personal computer). The system card contains its own processing unit (75 Mhz Pentium cpu in this embodiment), a VL bus coupling the cpu to core logic, an 8 MB memory coupling a 16 MB Expansion Memory and additional 8 MB memory to the core logic, and an XD bus couples system & VGA bios flash and real time clock to core logic. A PCI to ISA bridge couples the card slot connector to the core logic. The card slot connector couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 124:
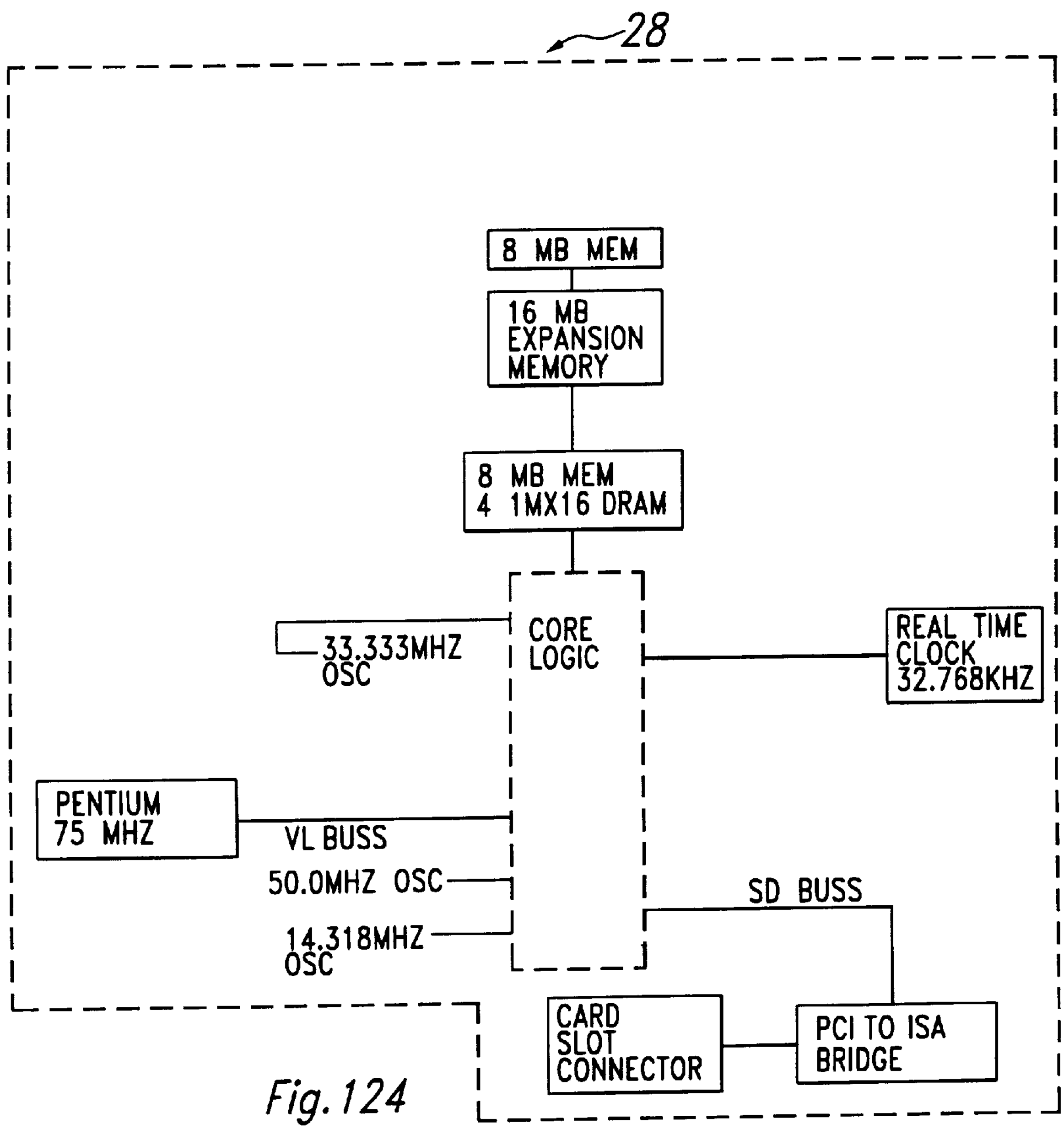

The system card 28 illustrated in FIG. 124 provides some of the functionality of a PC (personal computer). The system card contains its own processing unit (75 Mhz Pentium cpu in this embodiment), a VL bus coupling the cpu to core logic, an 8 MB memory coupling a 16 MB Expansion Memory and additional 8 MB memory to the core logic, a keyboard and a key/mouse connector coupled to a keyboard scanner and an XD bus coupling the real time clock to core logic. A PCI to ISA bridge couples the card slot connector to the core logic. The card slot connector couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 125:
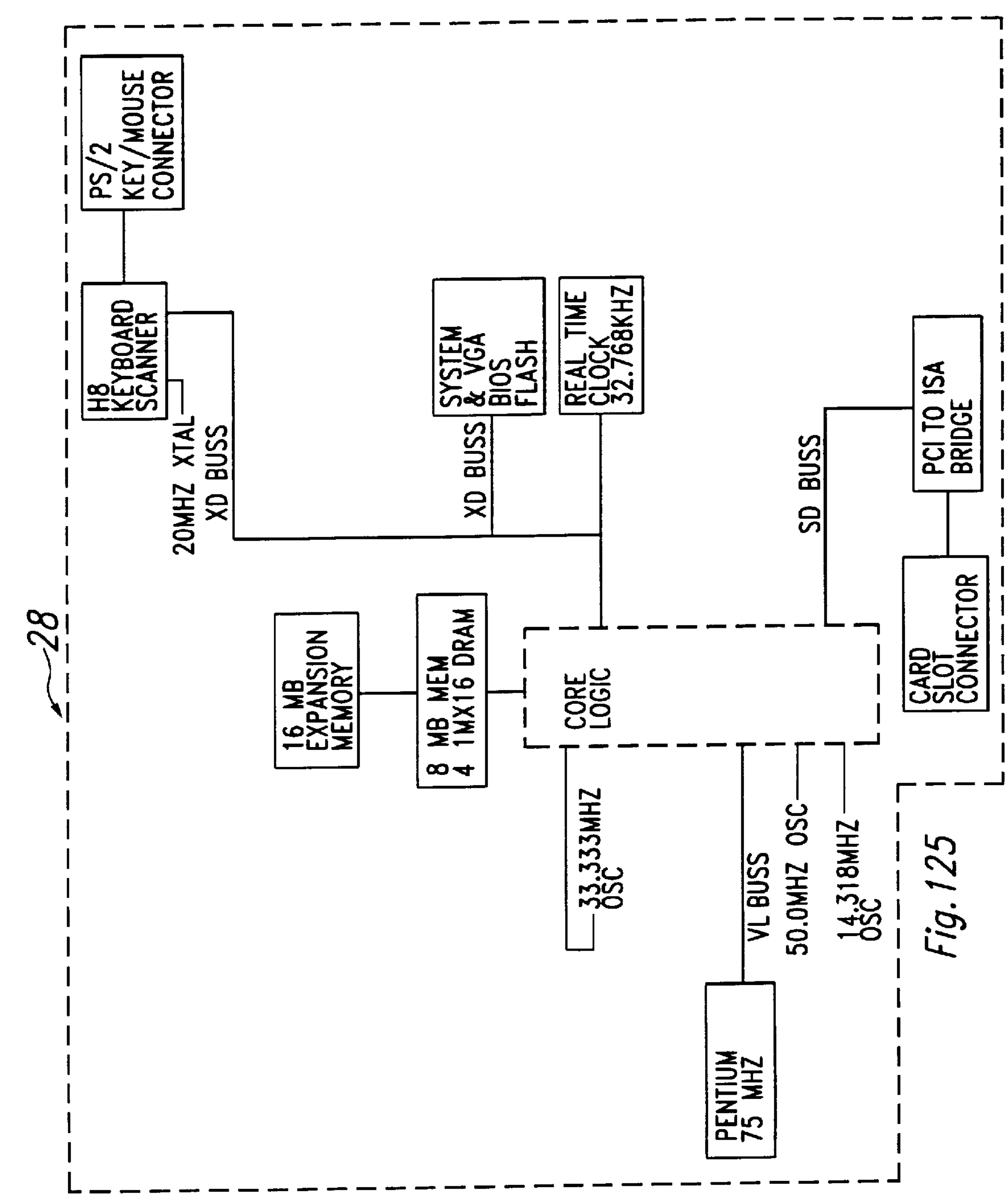

System card 28 illustrated in FIG. 125 also provides some of the functionality of a PC (personal computer). The system card contains its own processing unit (75 Mhz Pentium cpu in this embodiment), a VL bus coupling the cpu to core logic, an 8 MB memory coupling a 16 MB Expansion Memory to the core logic, a key/mouse connector coupled to a keyboard scanner and an XD bus coupling the keyboard scanner, system & VGA bios flash and real time clock to core logic. A PCI to ISA bridge couples the card slot connector to the core logic. The card slot connector couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 126:
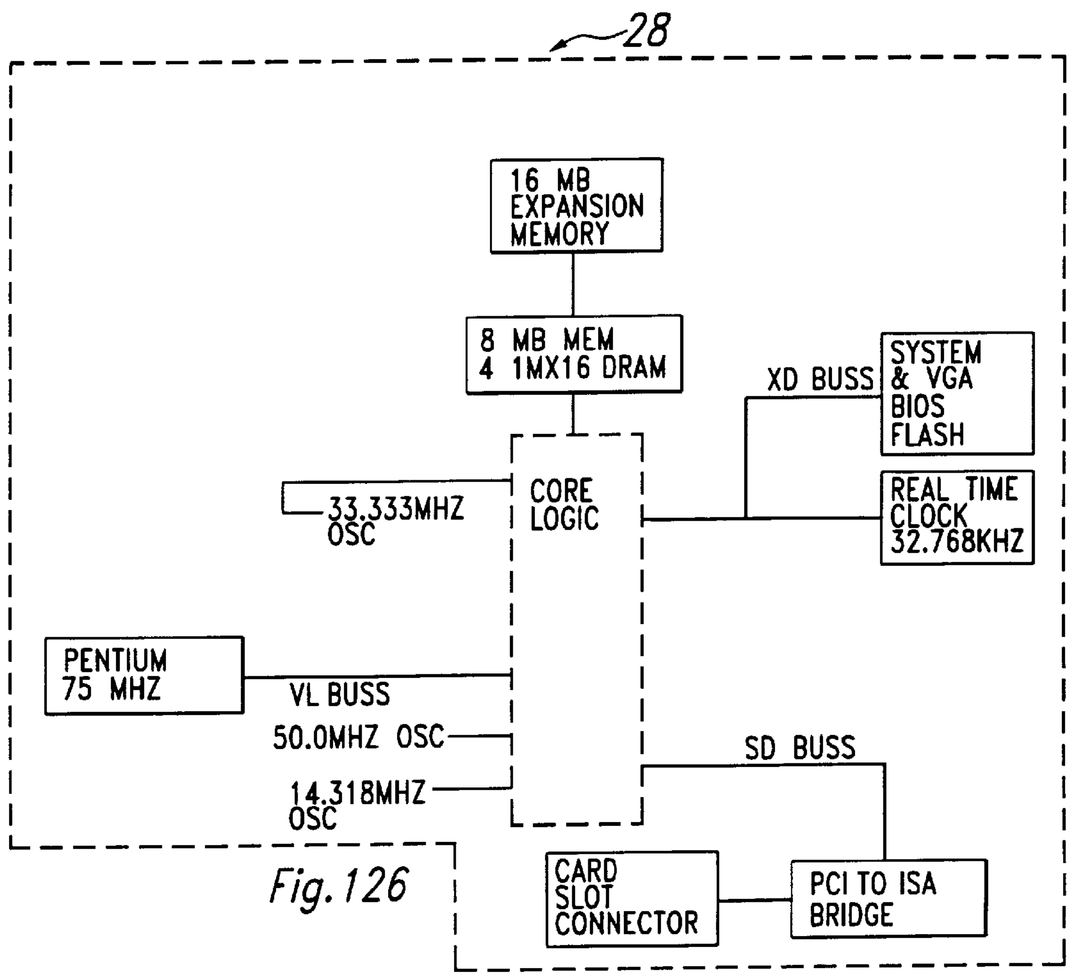

The system card 28 illustrated in FIG. 126 similarly provides some of the functionality of a PC (personal computer). The system card contains its own processing unit (75 Mhz Pentium cpu in this embodiment), a VL bus coupling the cpu to core logic, an 8 MB memory coupling a 16 MB Expansion Memory to the core logic, and an XD bus couples system & VGA bios flash and real time clock to core logic. A PCI to ISA bridge couples the card slot connector to the core logic. The card slot connector couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 127:
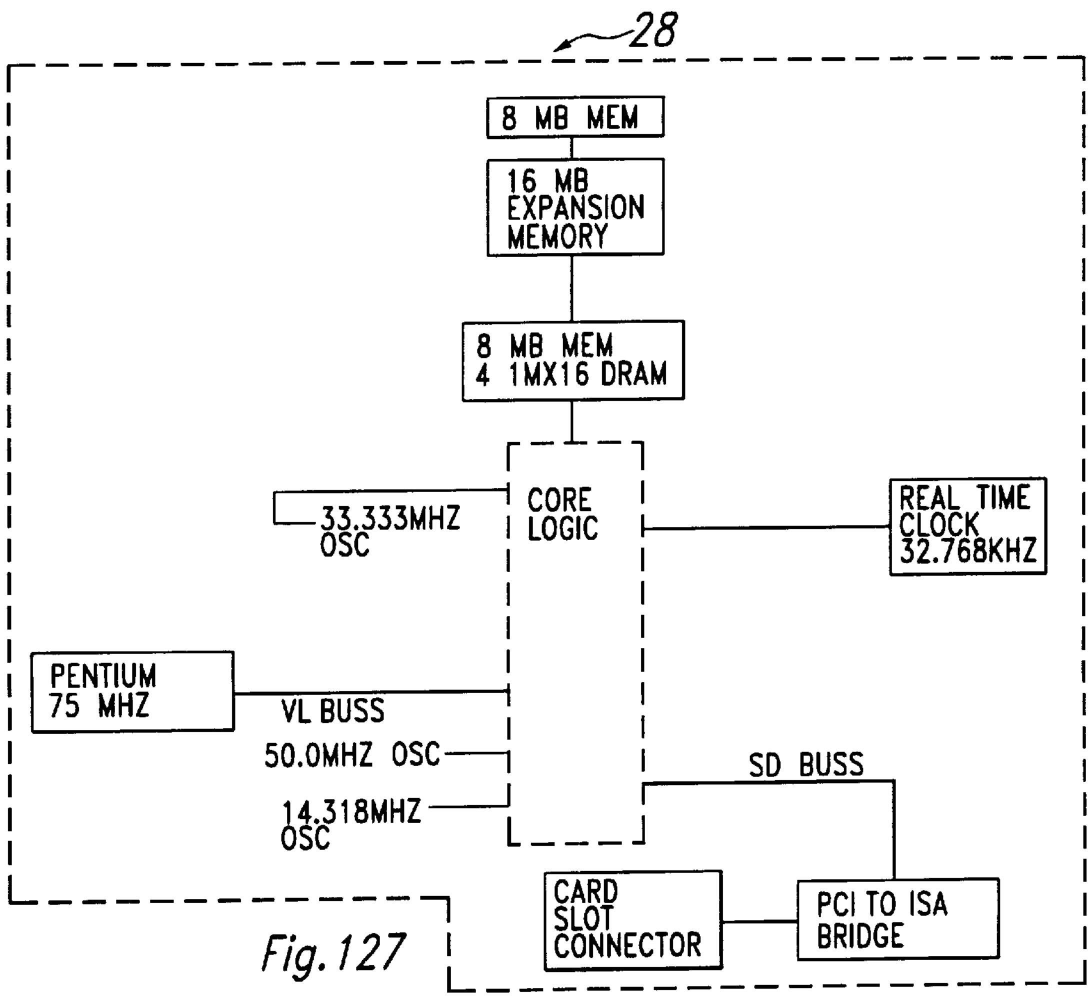

System card 28 illustrated in FIG. 127 provides some of the functionality of a PC (personal computer). The system card contains its own processing unit (75 Mhz Pentium cpu in this embodiment), a VL bus coupling the cpu to core logic, an 8 MB memory coupling a 16 MB Expansion Memory to the core logic and an XD bus coupling the real time clock to core logic. A PCI to ISA bridge couples the card slot connector to the core logic. The card slot connector couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 128:
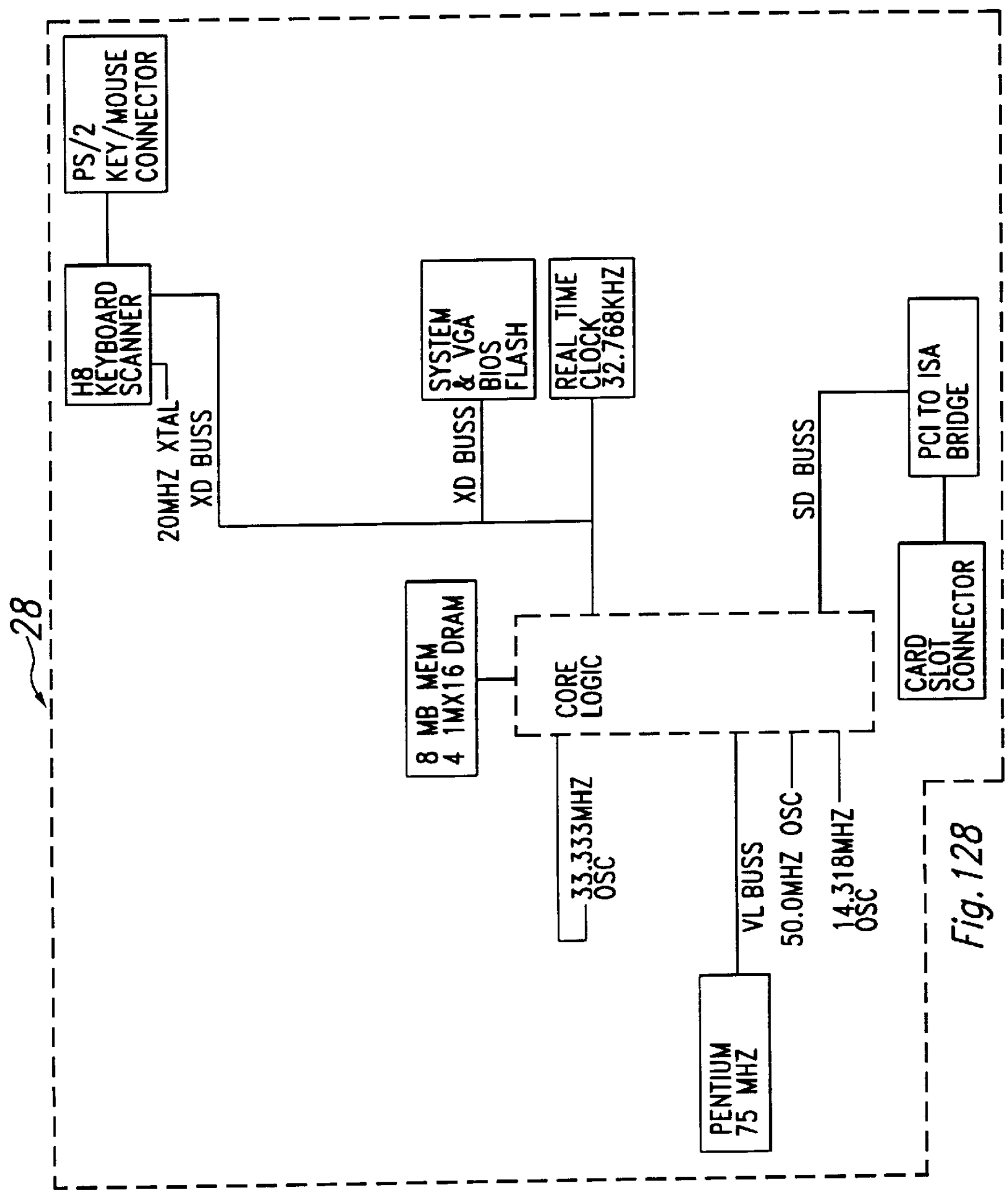

The system card 28 illustrated in FIG. 128 also provides some of the functionality of a PC (personal computer). The system card contains its own processing unit (75 Mhz Pentium cpu in this embodiment), a VL bus coupling the cpu to core logic, an 8 MB memory coupled to the core logic, a key/mouse connector coupled to a keyboard scanner and an XD bus coupling the keyboard scanner, system & VGA bios flash and real time clock to core logic. A PCI to ISA bridge couples the card slot connector to the core logic. The card slot connector couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 129:
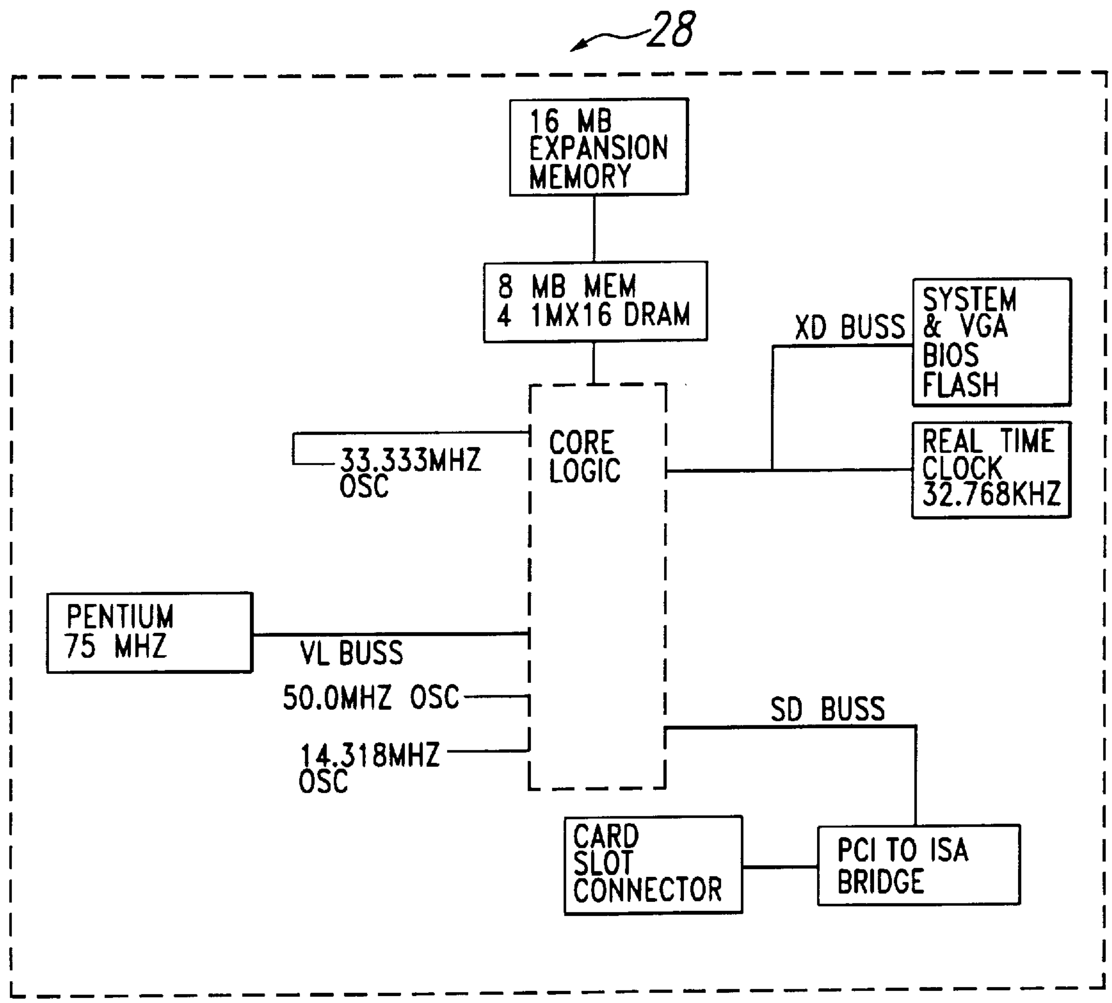
Figure 130:
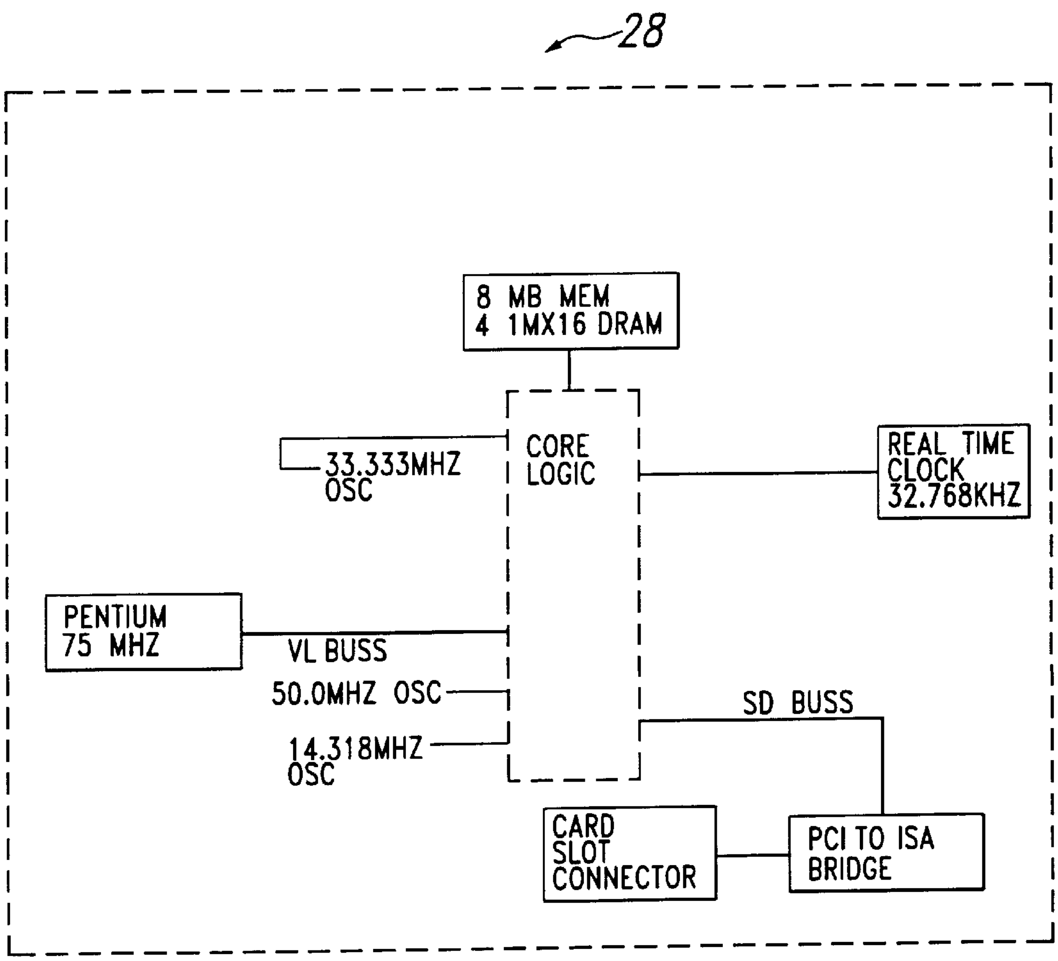

System card 28 illustrated in FIG. 129 similarly provides some of the functionality of a PC (personal computer). The system card contains its own processing unit (75 Mhz Pentium cpu in this embodiment), a VL bus coupling the cpu to core logic, an 8 MB memory coupled to the core logic, and an XD bus couples system & VGA bios flash and real time clock to core logic. A PCI to ISA bridge couples the card slot connector to the core logic. The card slot connector couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

The system card 28 illustrated in FIG. 110 provides some of the functionality of a PC (personal computer). The system card contains its own processing unit (75 Mhz Pentium cpu in this embodiment), a VL bus coupling the cpu to core logic, an 8 MB memory coupled to the core logic and an XD bus coupling the real time clock to core logic. A PCI to ISA bridge couples the card slot connector to the core logic. The card slot connector couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 131:
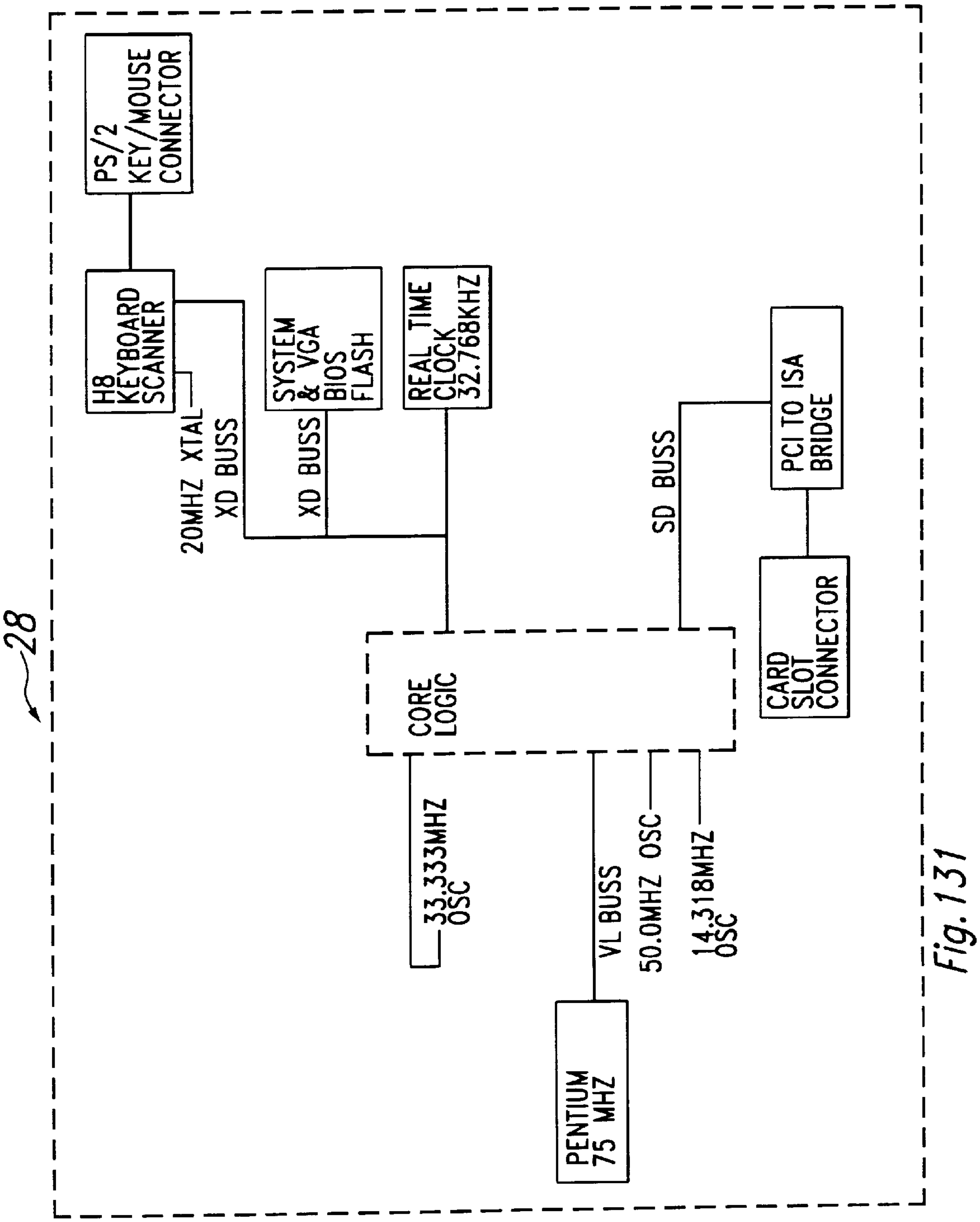

System card 28 illustrated in FIG. 131 also provides some of the functionality of a PC (personal computer). The system card contains its own processing unit (75 Mhz Pentium cpu in this embodiment), a VL bus coupling the cpu to core logic, a key/mouse connector coupled to a keyboard scanner and an XD bus coupling the keyboard scanner, system & VGA bios flash and real time clock to core logic. A PCI to ISA bridge couples the card slot connector to the core logic. The card slot connector couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

Figure 132:
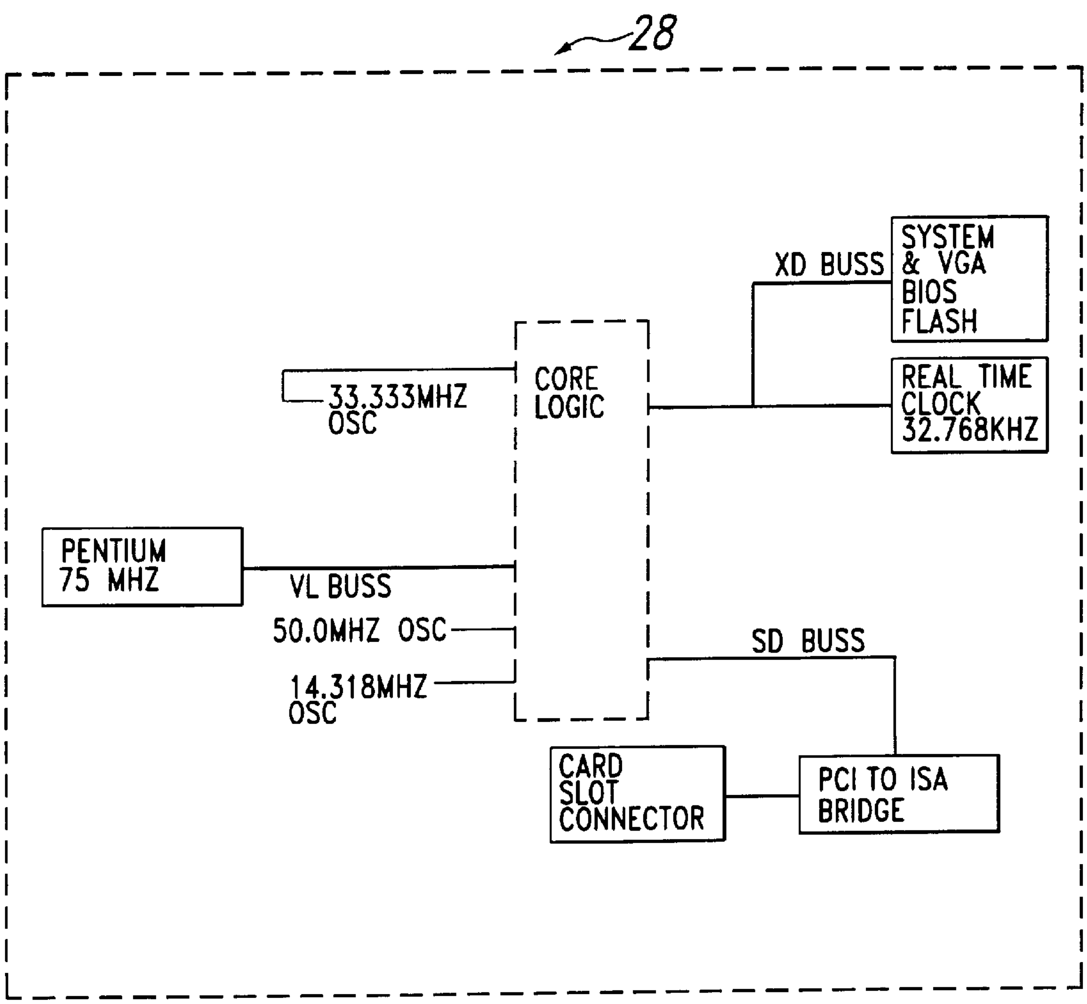

The system card 28 illustrated in FIG. 132 similarly provides some of the functionality of a PC (personal computer). The system card contains its own processing unit (75 Mhz Pentium cpu in this embodiment), a VL bus coupling the cpu to core logic, and an XD bus couples system & VGA bios flash and real time clock to core logic. A PCI to ISA bridge couples the card slot connector to the core logic. The card slot connector couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

System card 28 illustrated in FIG. 133 also provides some of the functionality of a PC (personal computer). The system card contains its own processing unit (75 Mhz Pentium cpu in this embodiment), a VL bus coupling the cpu to core logic, and an XD bus coupling the real time clock to core logic. A PCI to ISA bridge couples the card slot connector to the core logic. The card slot connector couples system card 28 to a corresponding mating connector in/on card slot 26. While system card 28 is preferably an interchangeable circuit card, it may also be a stationary motherboard, a stationary circuit board not quite a full motherboard, device, apparatus or combination thereof.

The system cards illustrated in FIGS. 5–133 vary considerably in cost, complexity and functionality. Modifications to the system cards illustrated in FIGS. 5–133 and alternative embodiments of system cards are possible, encouraged, and expected as technology advances. As an example, the 75 Mhz pentium processor could be replaced by a non-pentium processor, and the substitute processor could also have a higher or lower speed. The pentium core logic could also be an embedded controller, which means that the cpu and the usual north bridge pentium type controller plus cache could be together in a module. In such a system, the system sees only a PCI bus coming out of the module, probably directly from the core logic. An advantage of this module would be an elimination of the VL bus and related hardware in the docking station. Different types of processor could also be used in the docking station with a user unaware of what type of processor is being used. The ability of a user of docking station 12 to change the functionality of the docking station by changing the system card is a major advantage of the present invention. Thus, a user could purchase a docking station with a modest system card to begin with and later exchange the system card with a more comprehensive system card at a later date.

Figure 134:
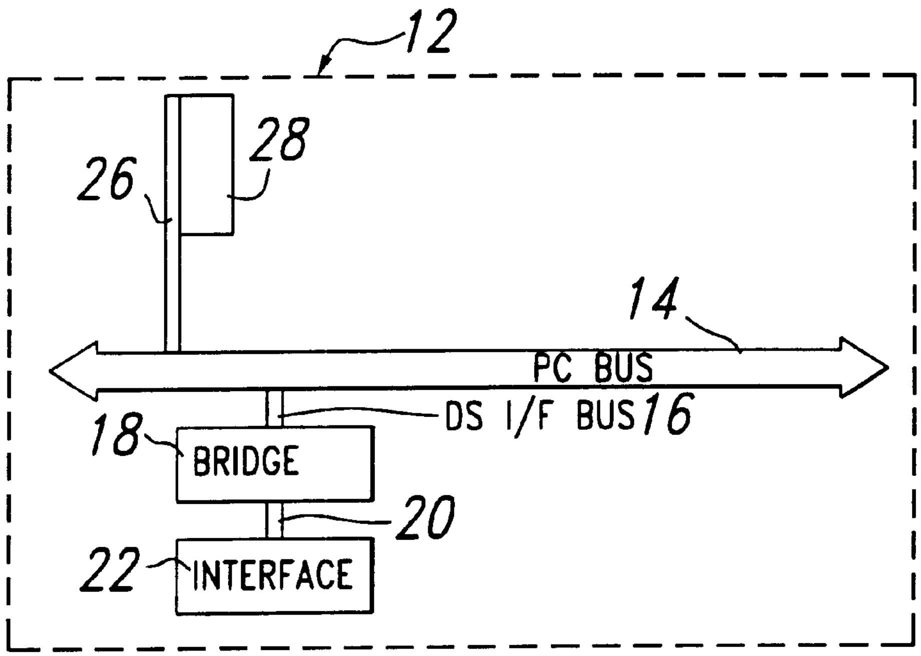
FIG. 134 illustrates an alternative embodiment of docking station 12 in which a MUX is located on the system card 28, not located separately in the docking station.
Figure 135:
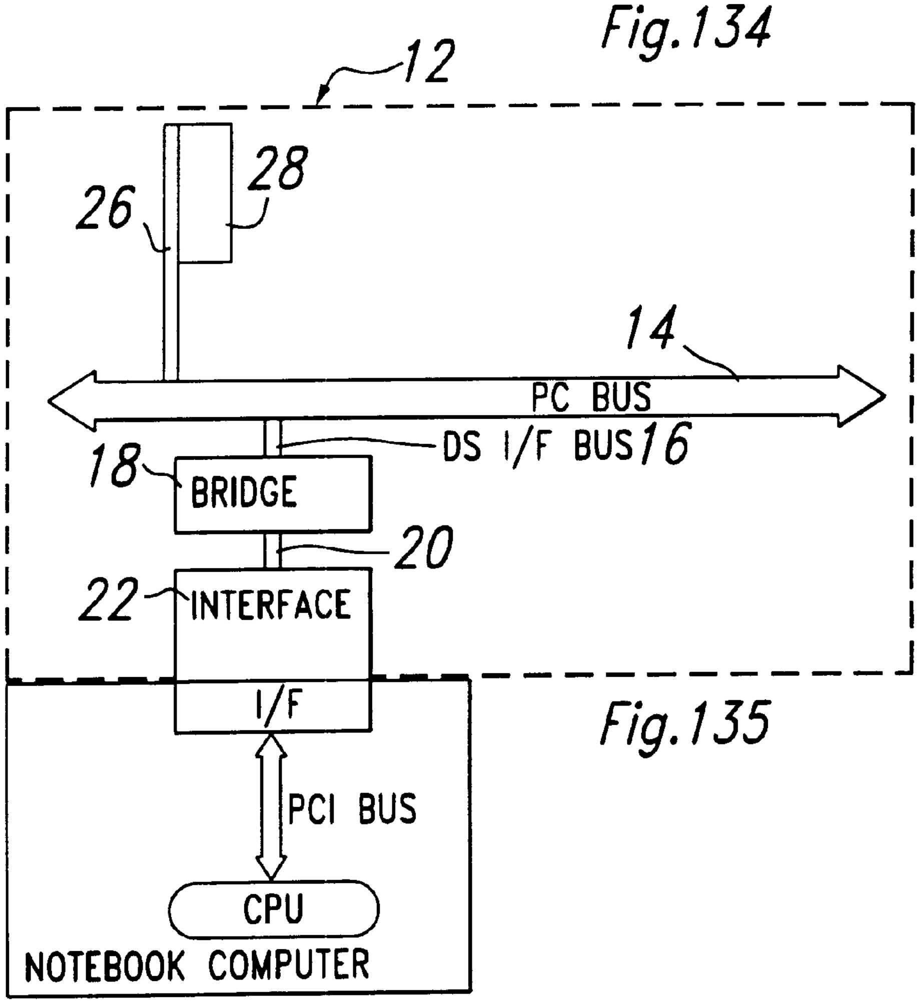
FIG. 135 illustrates a block diagram of a notebook computer hard docked to the docking station 12 illustrated in FIG. 134.
Figure 136:
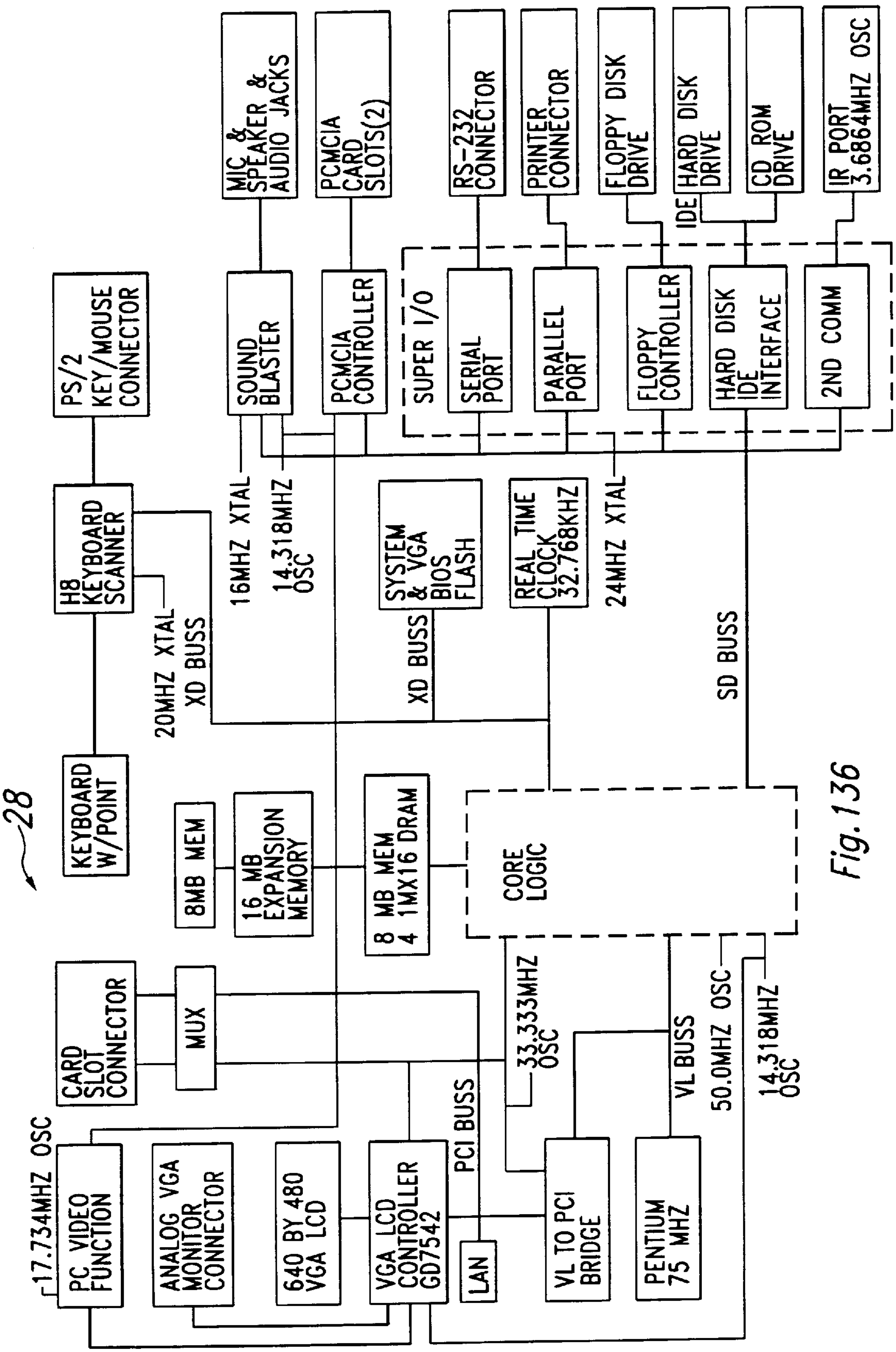
FIGS. 136–263 illustrate system cards 28 (having a mux on each card) that may be used in docking station 12 illustrated in FIG. 134. System cards 28 illustrated in FIGS. 136–263 are the system cards illustrated in FIGS. 5–133, respectively, with the addition of a mux on each card.
Figure 137:
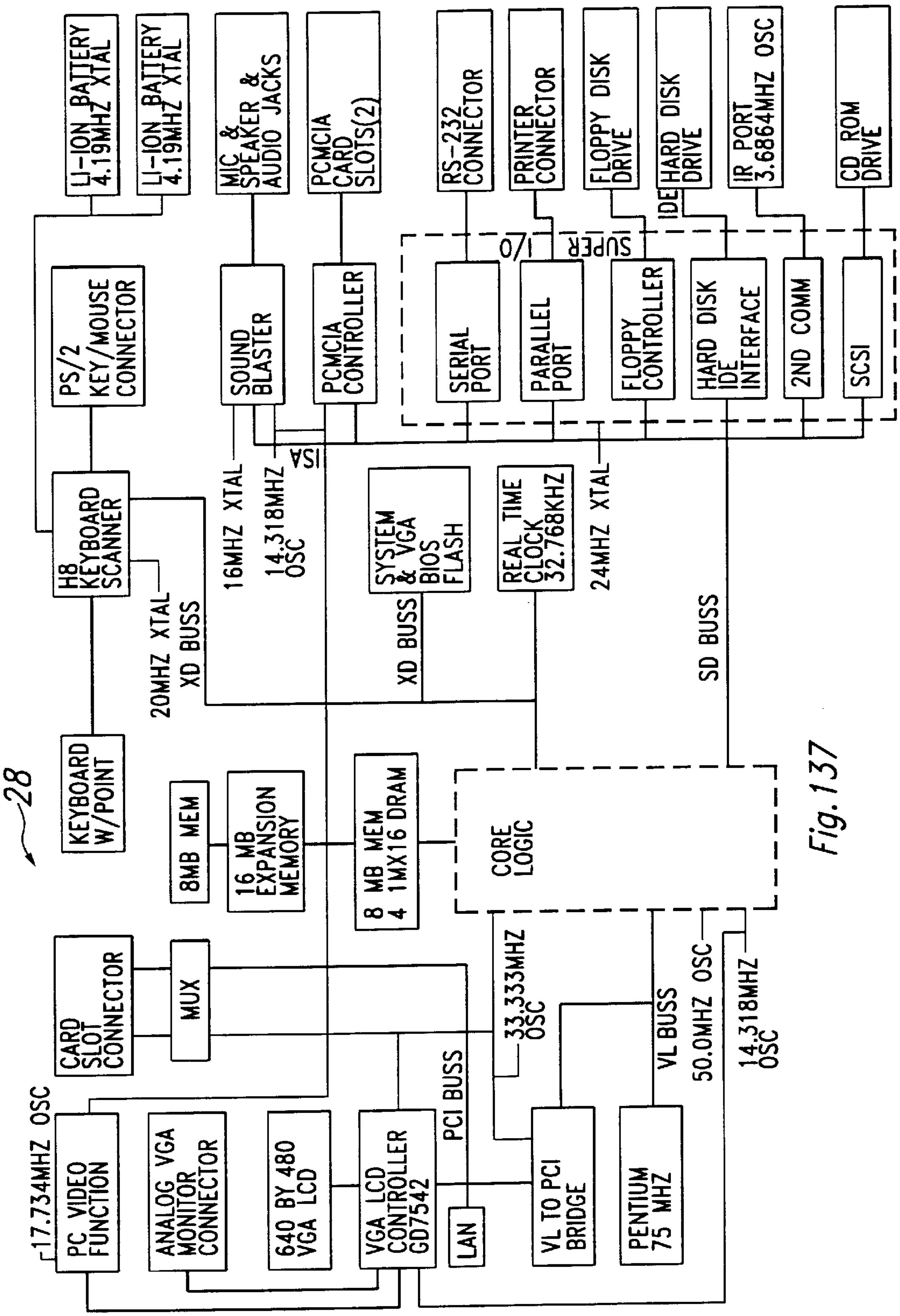
Figure 138:
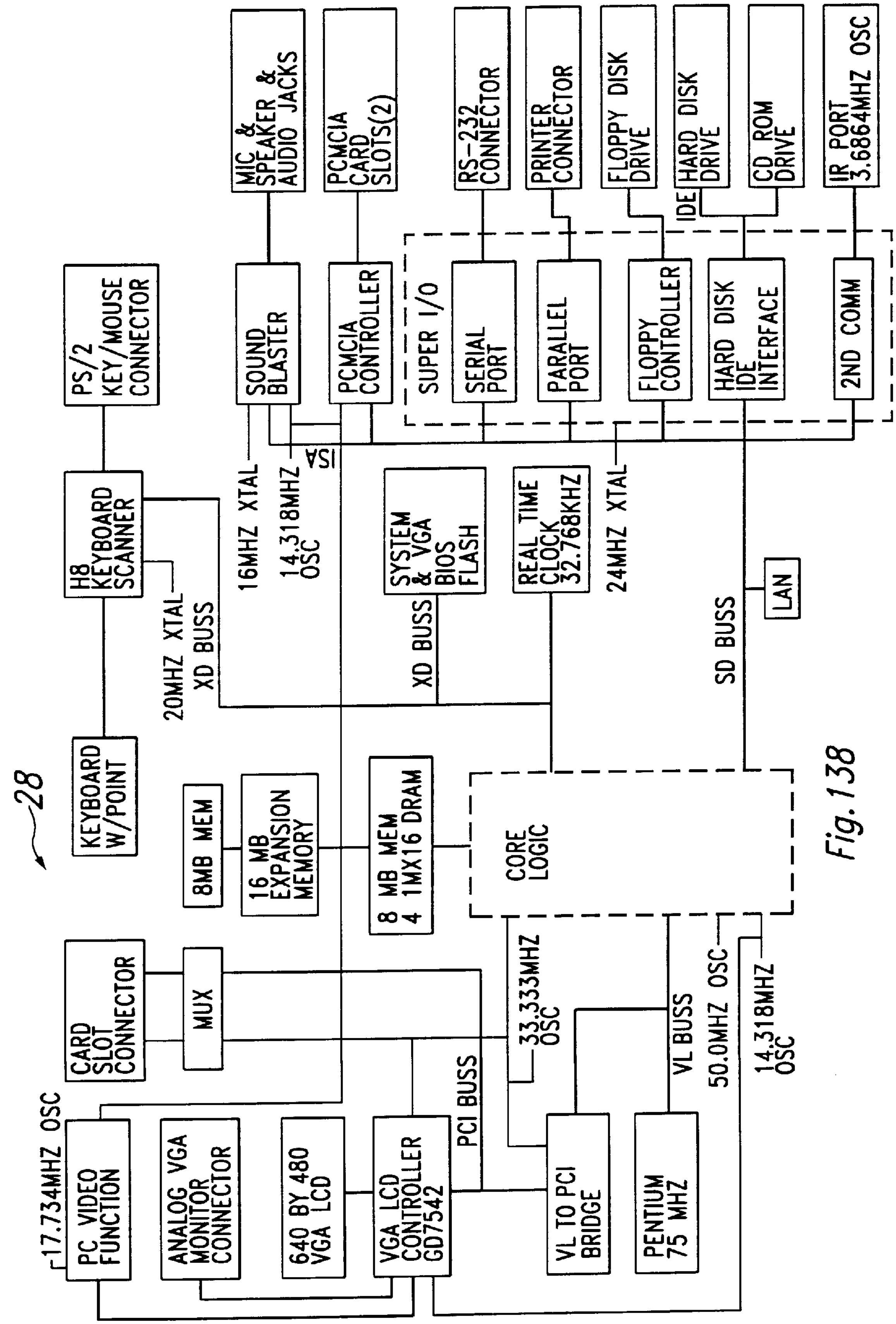
Figure 139:
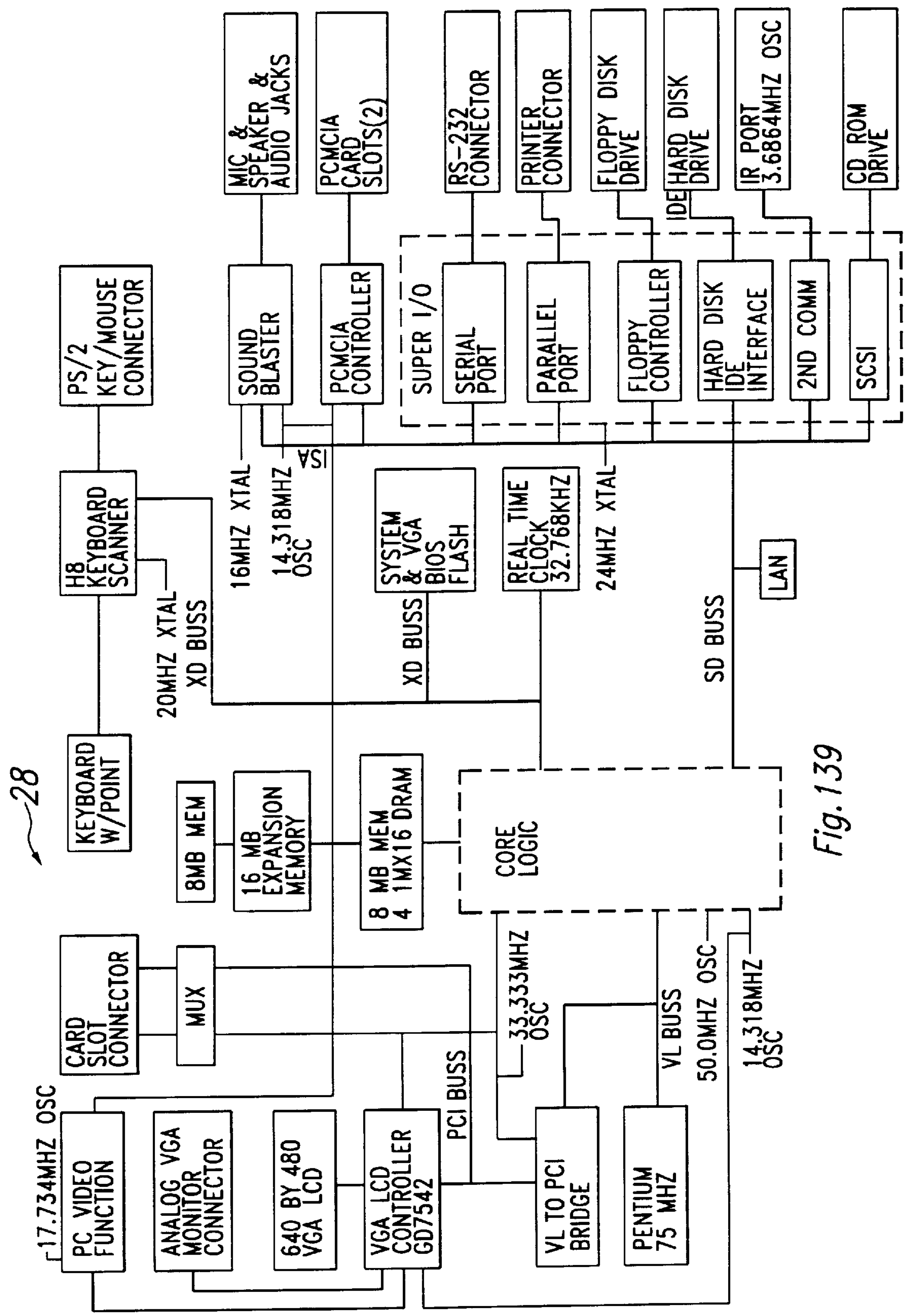
Figure 140:
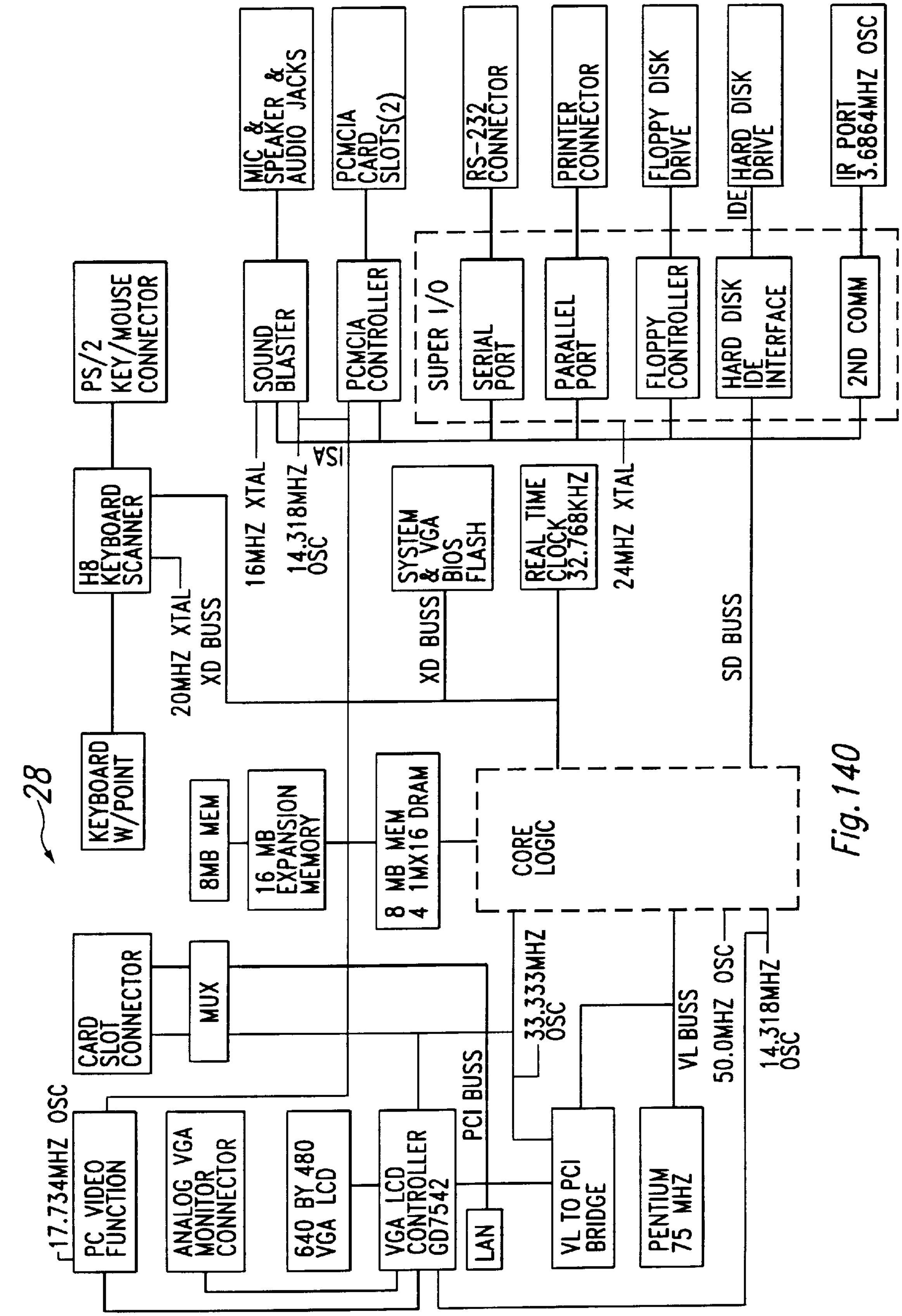
Figure 141:
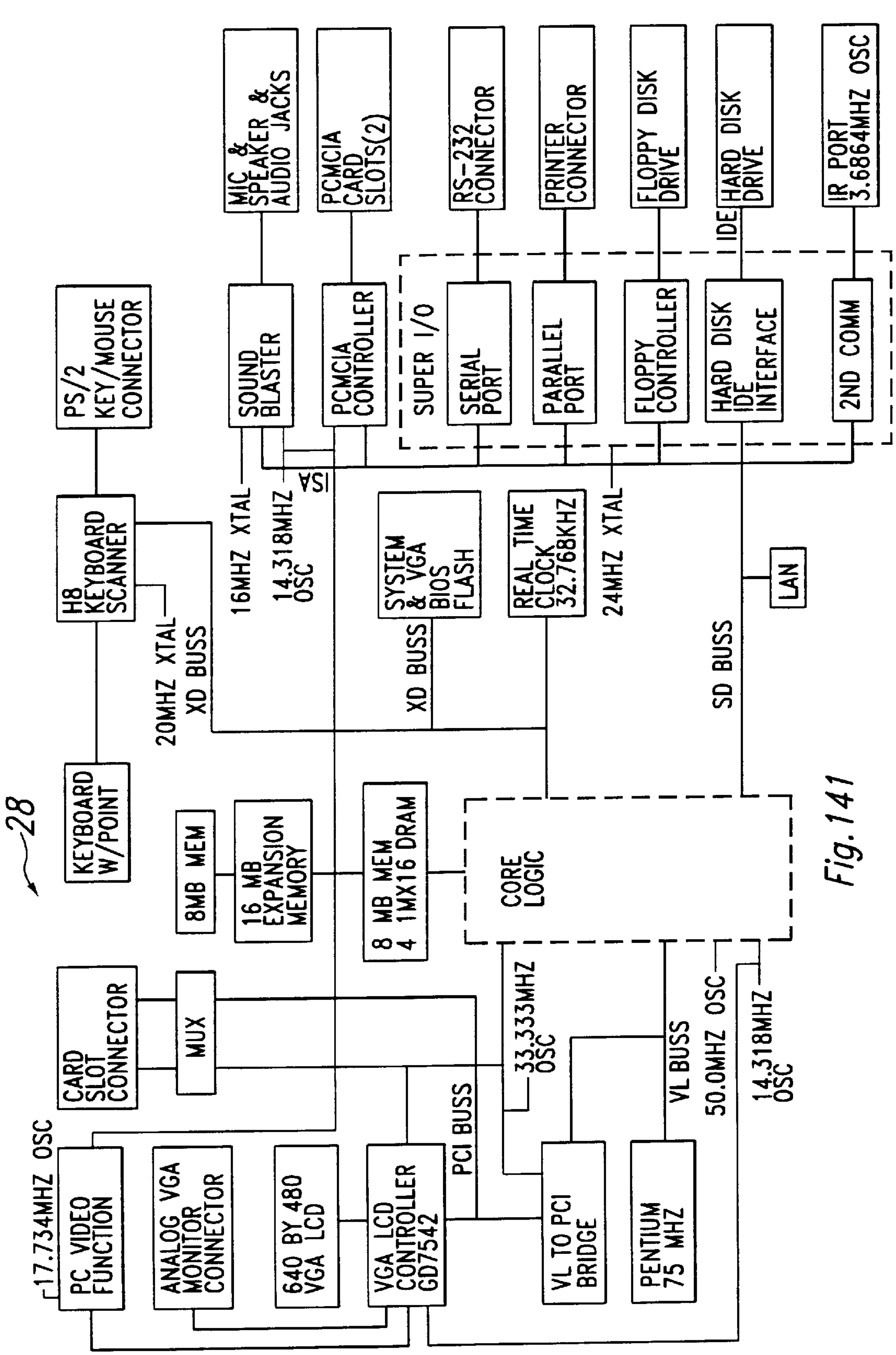
Figure 142:
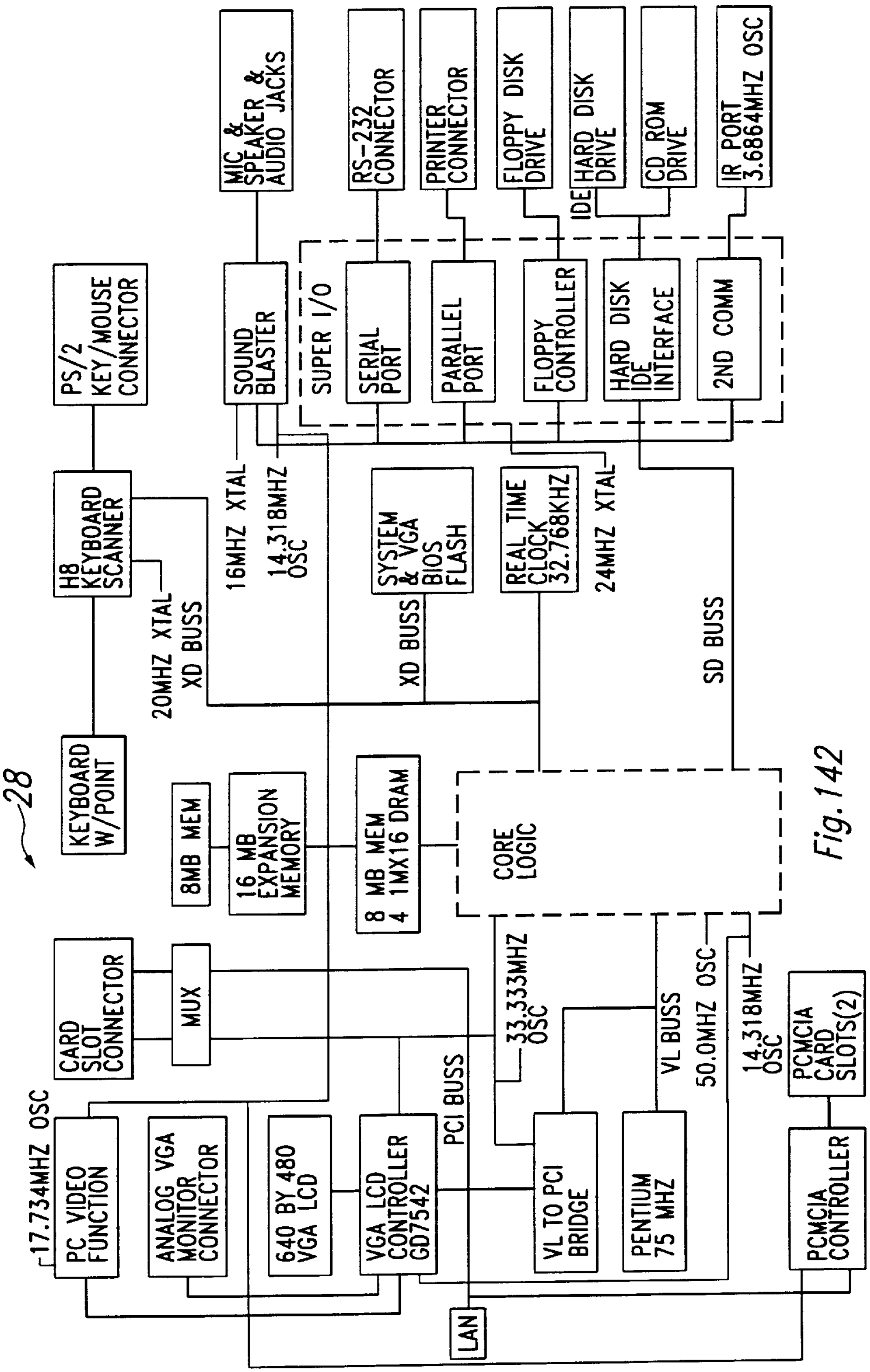
Figure 143:
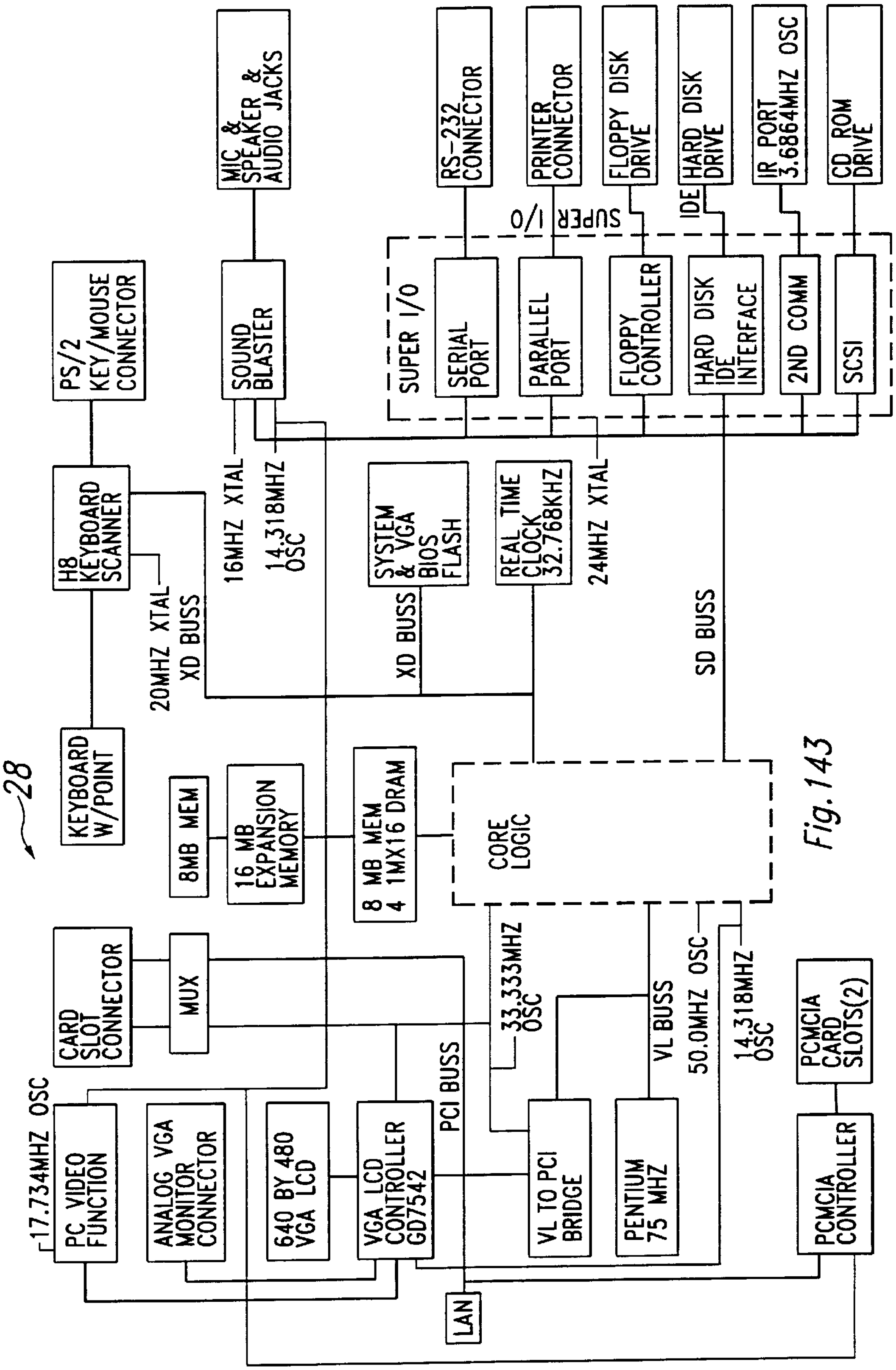
Figure 144:
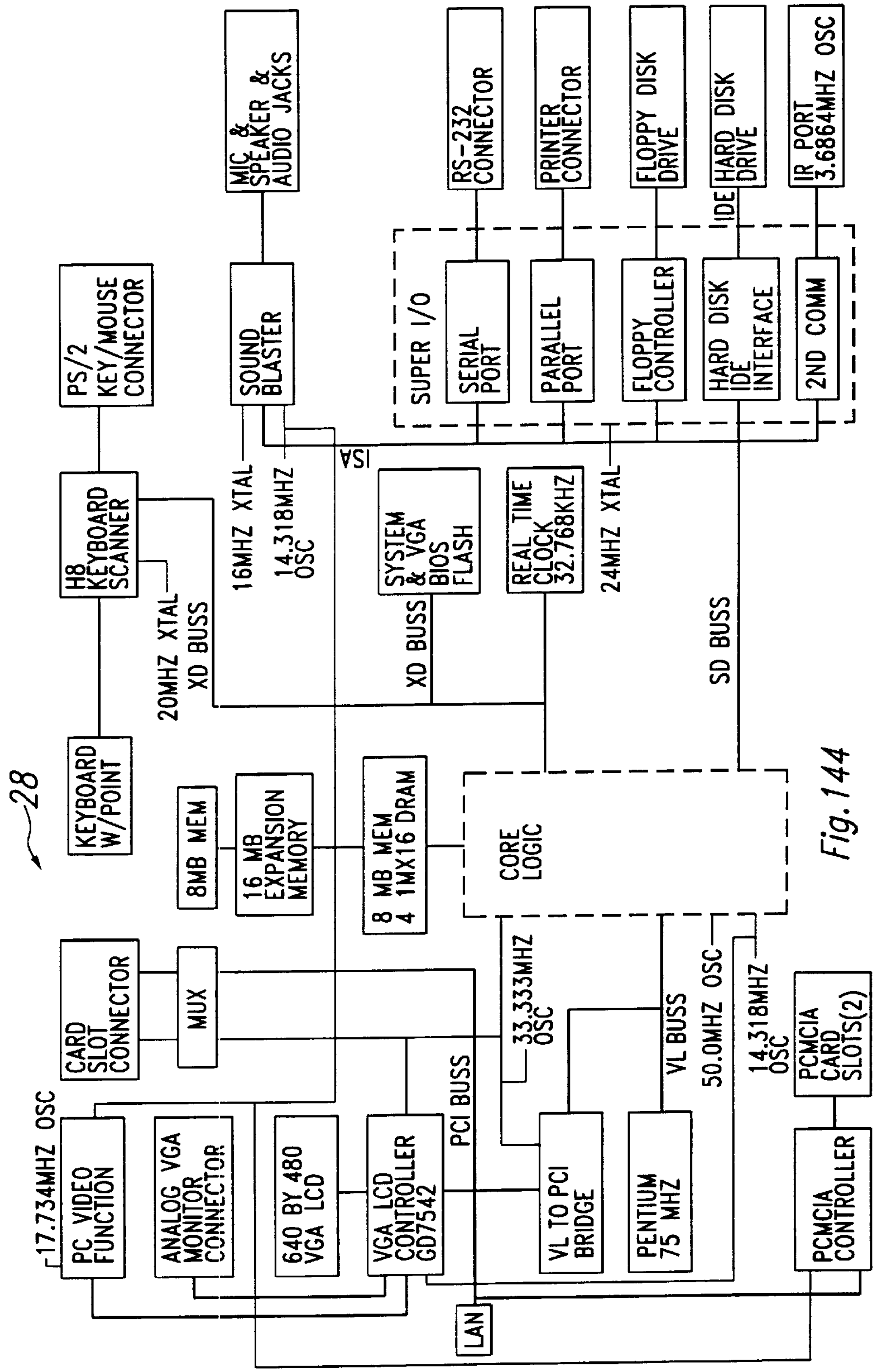
Figure 145:
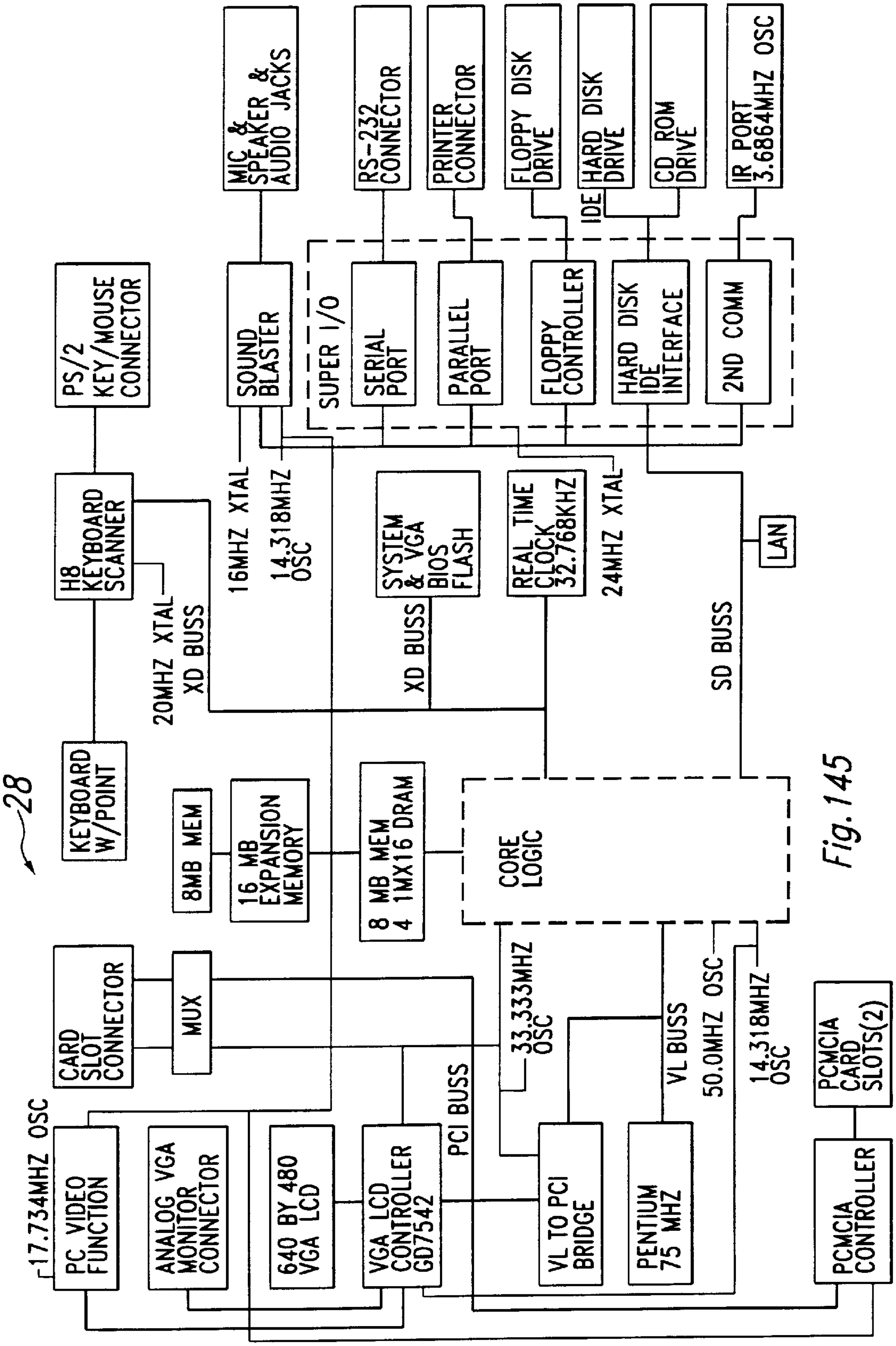
Figure 146:
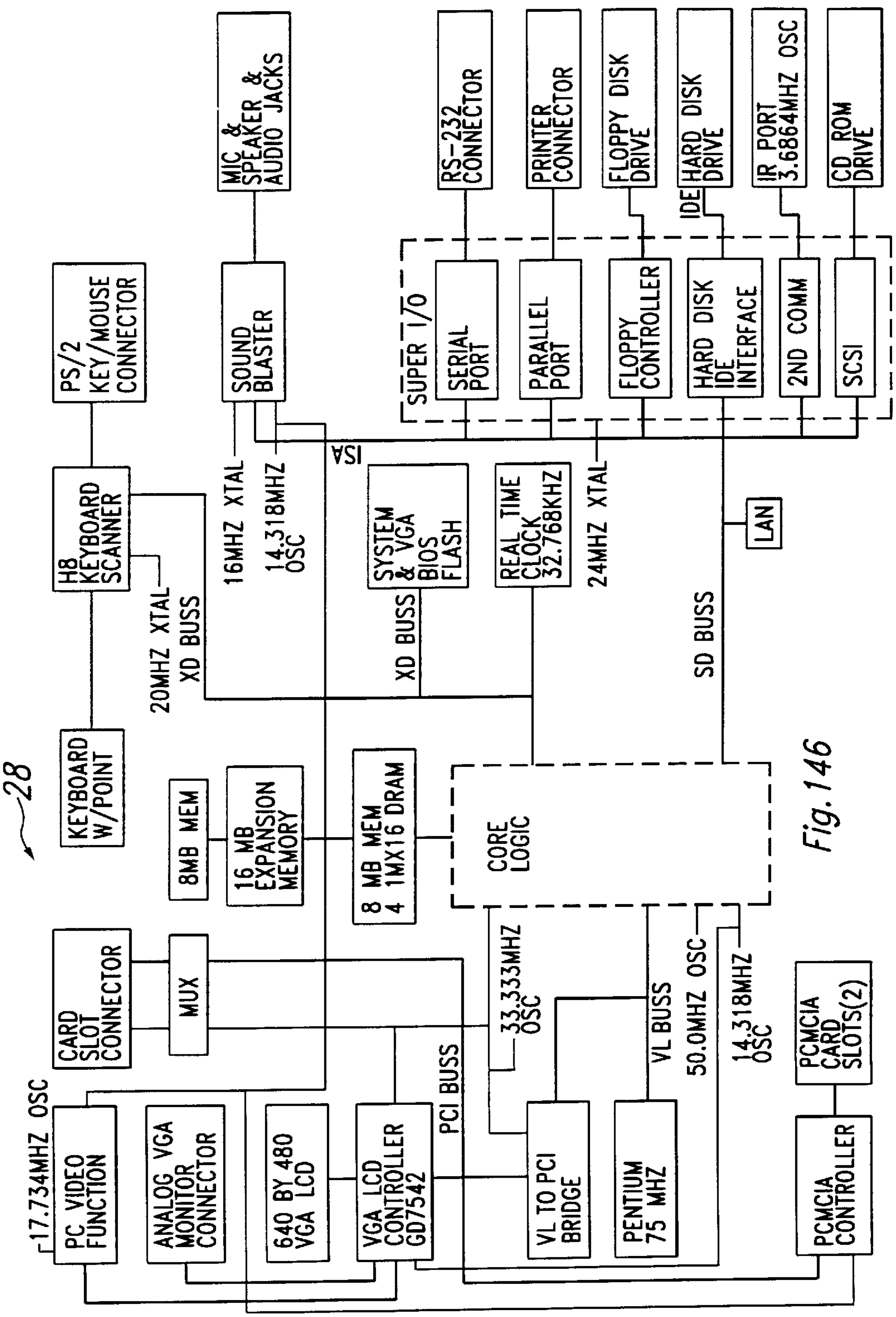
Figure 147:
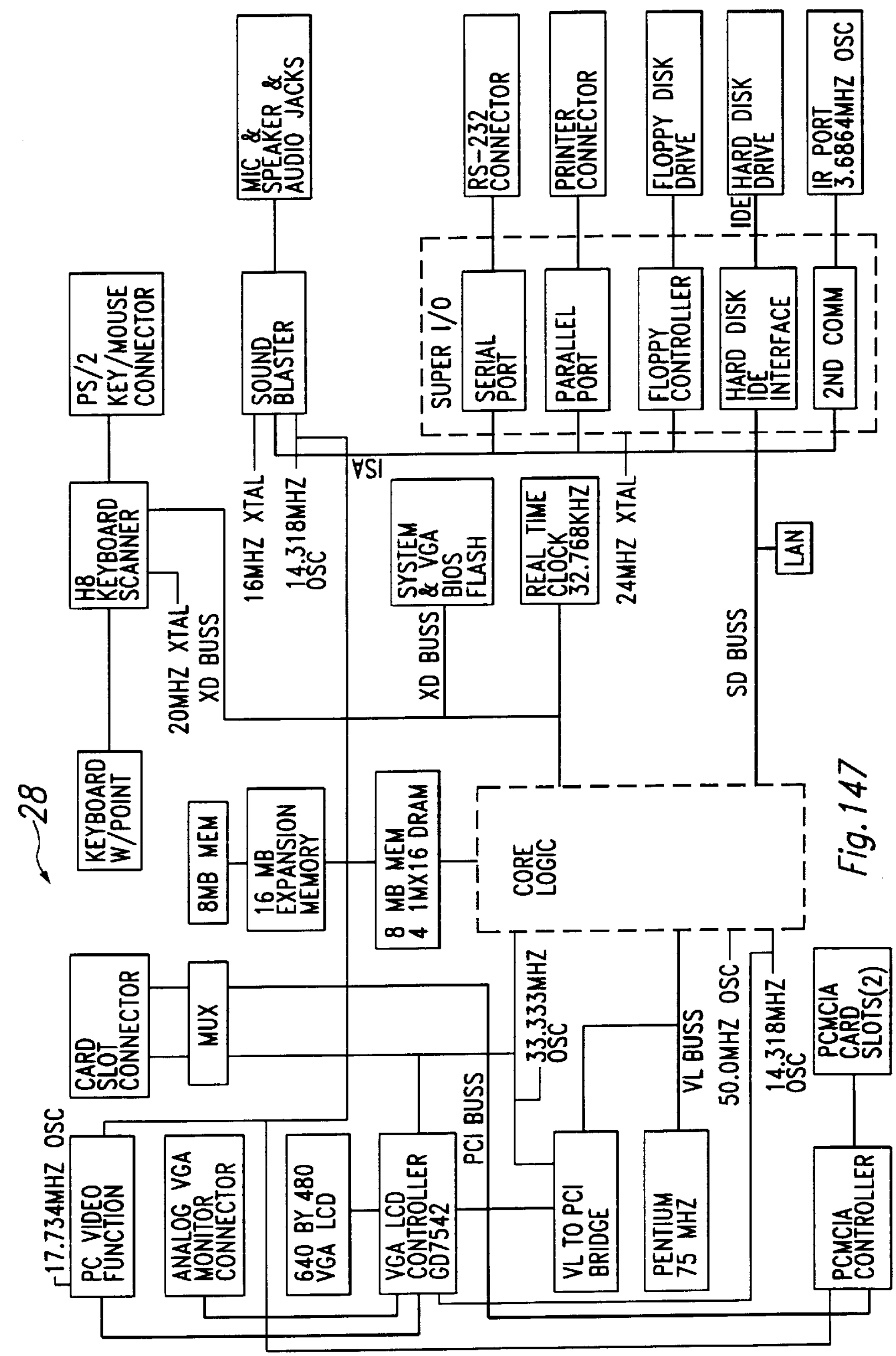
Figure 148:
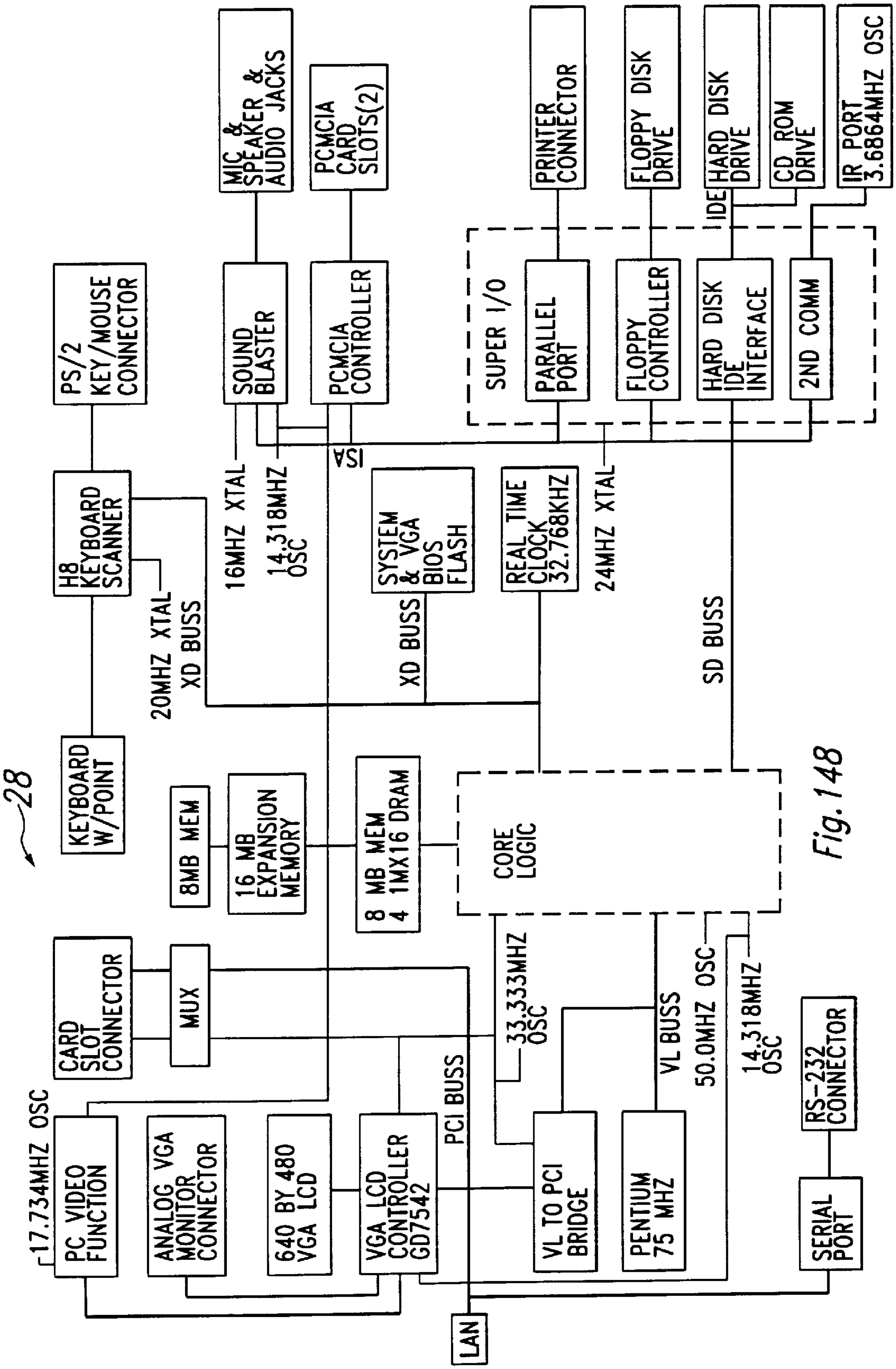
Figure 149:
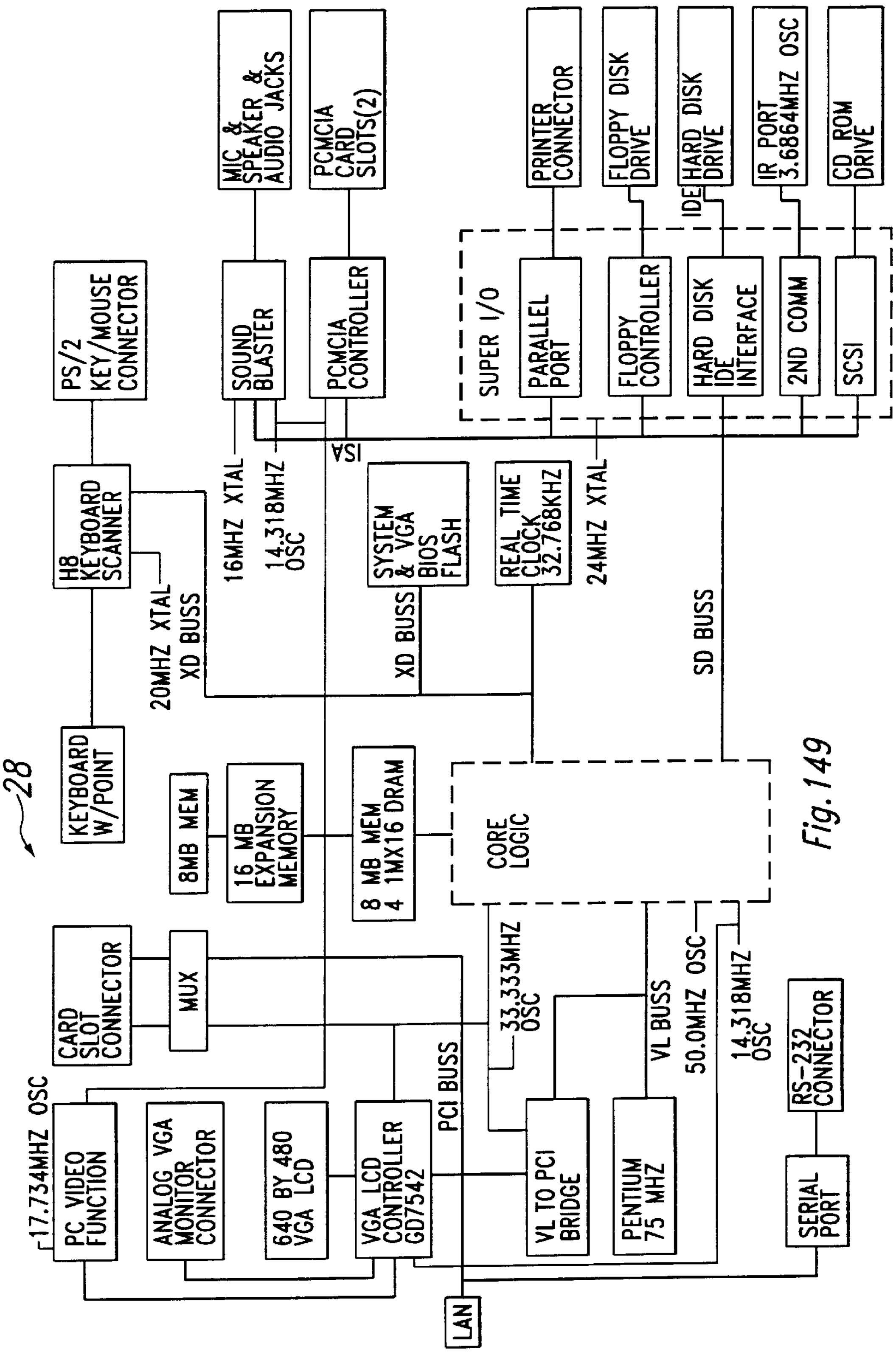
Figure 150:
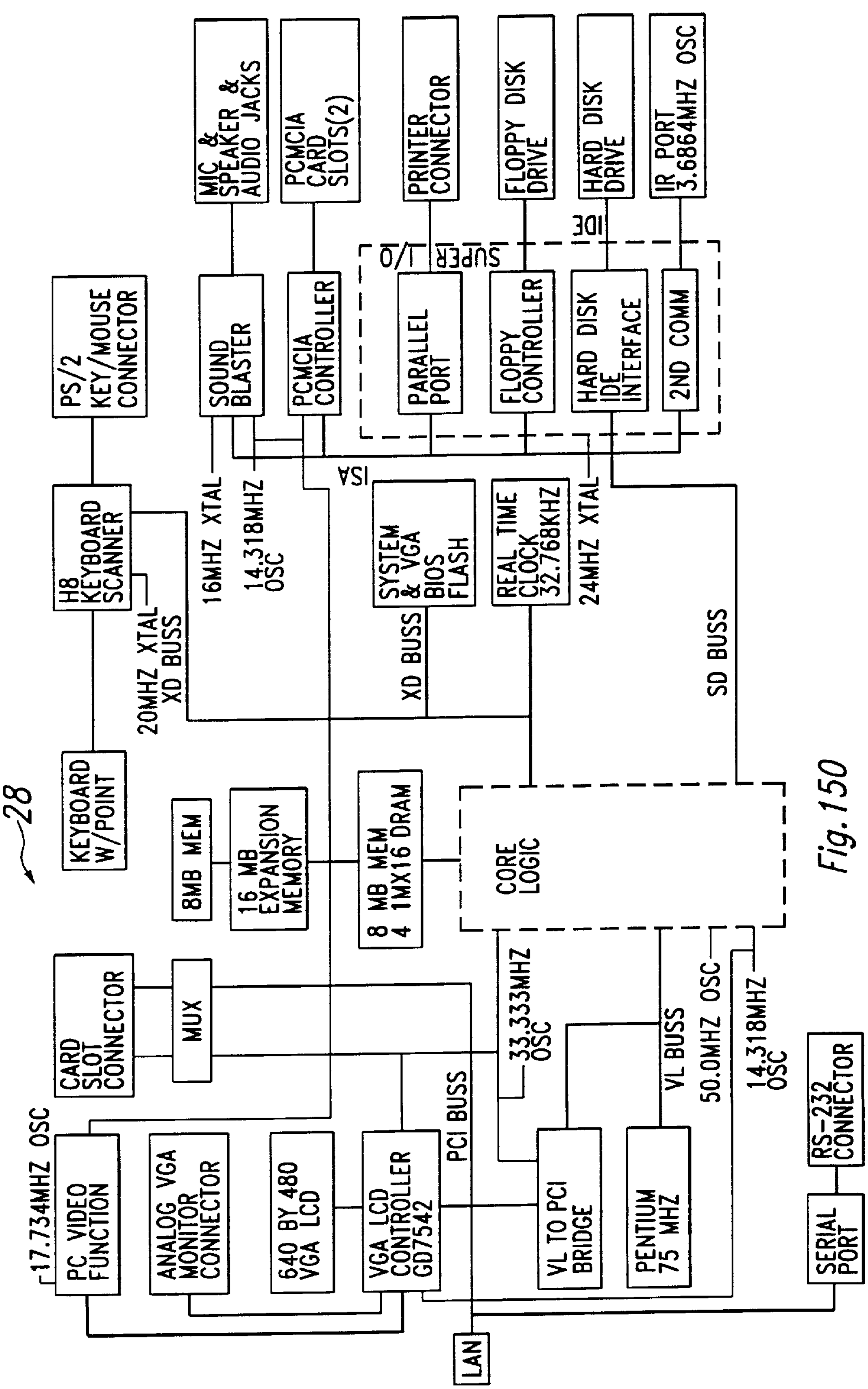
Figure 151:
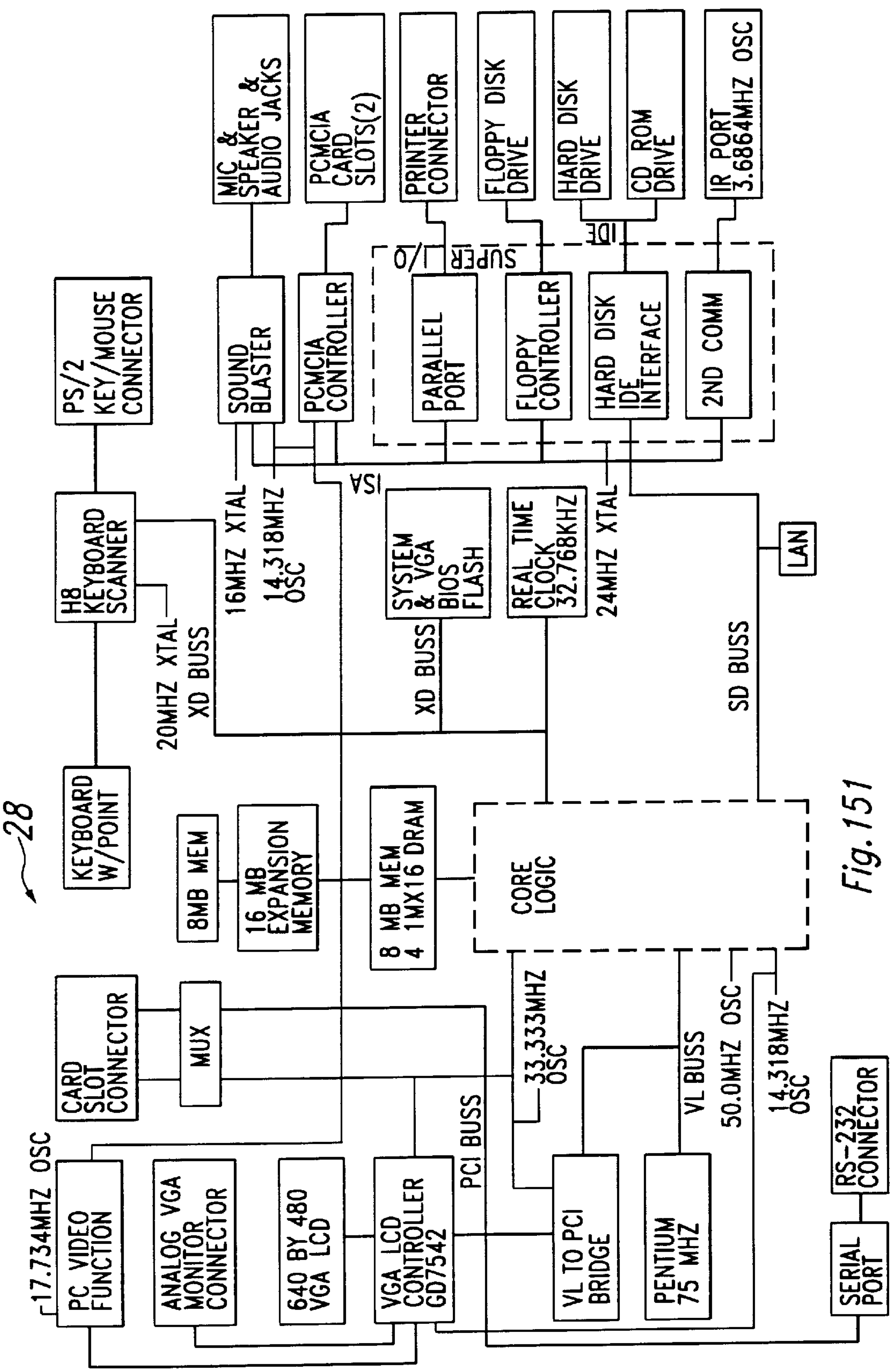
Figure 152:
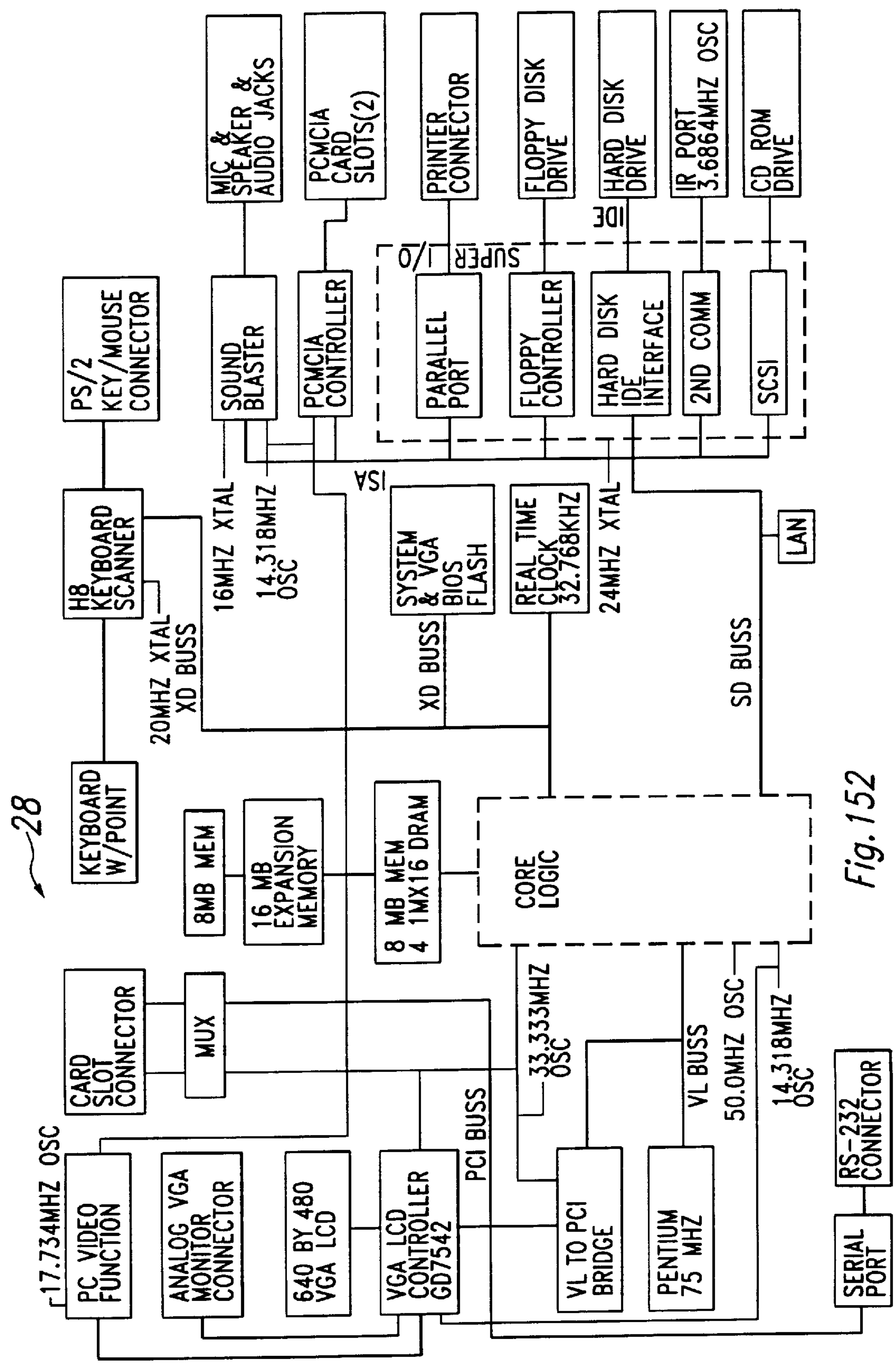
Figure 153:
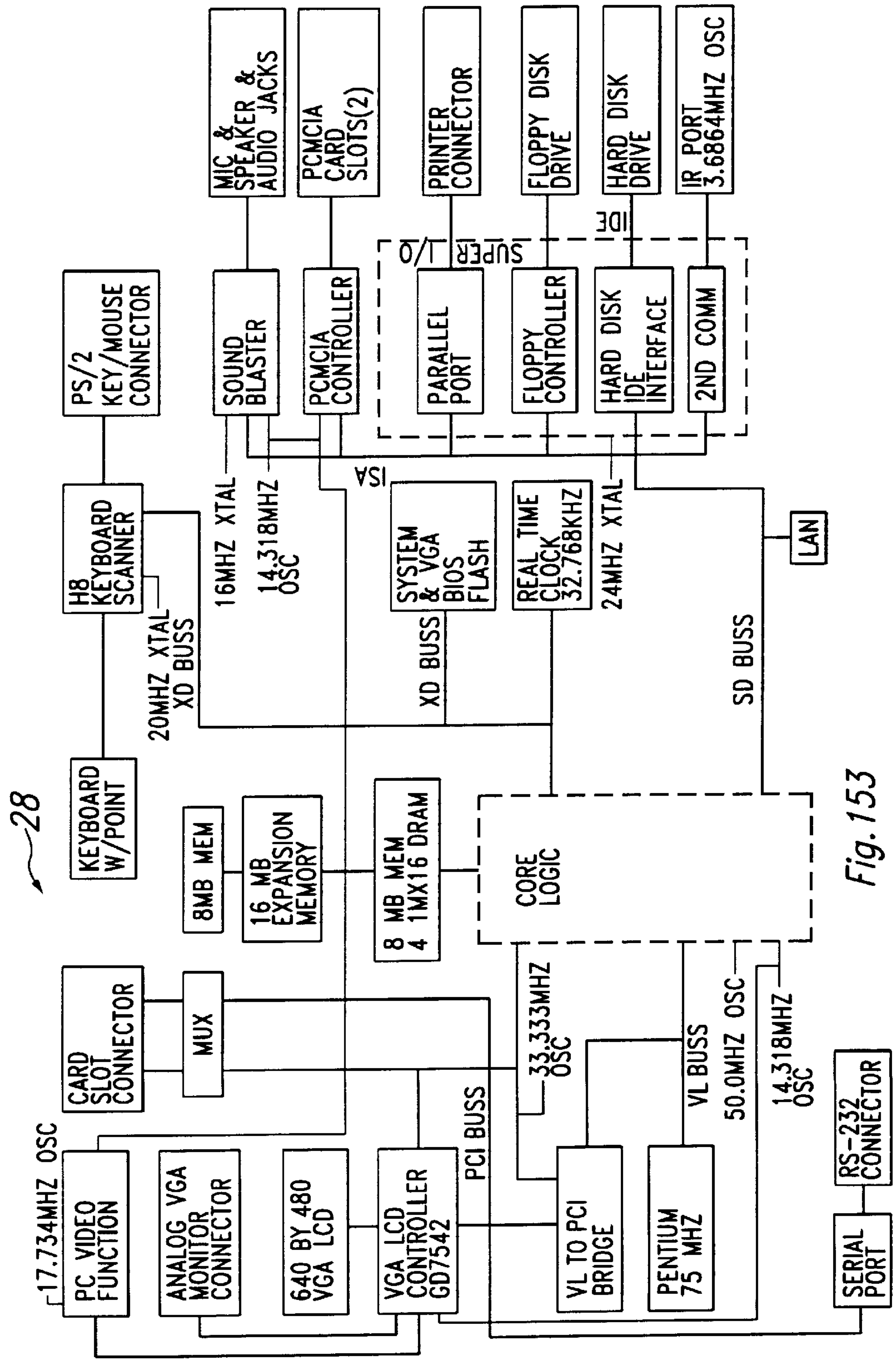
Figure 154:
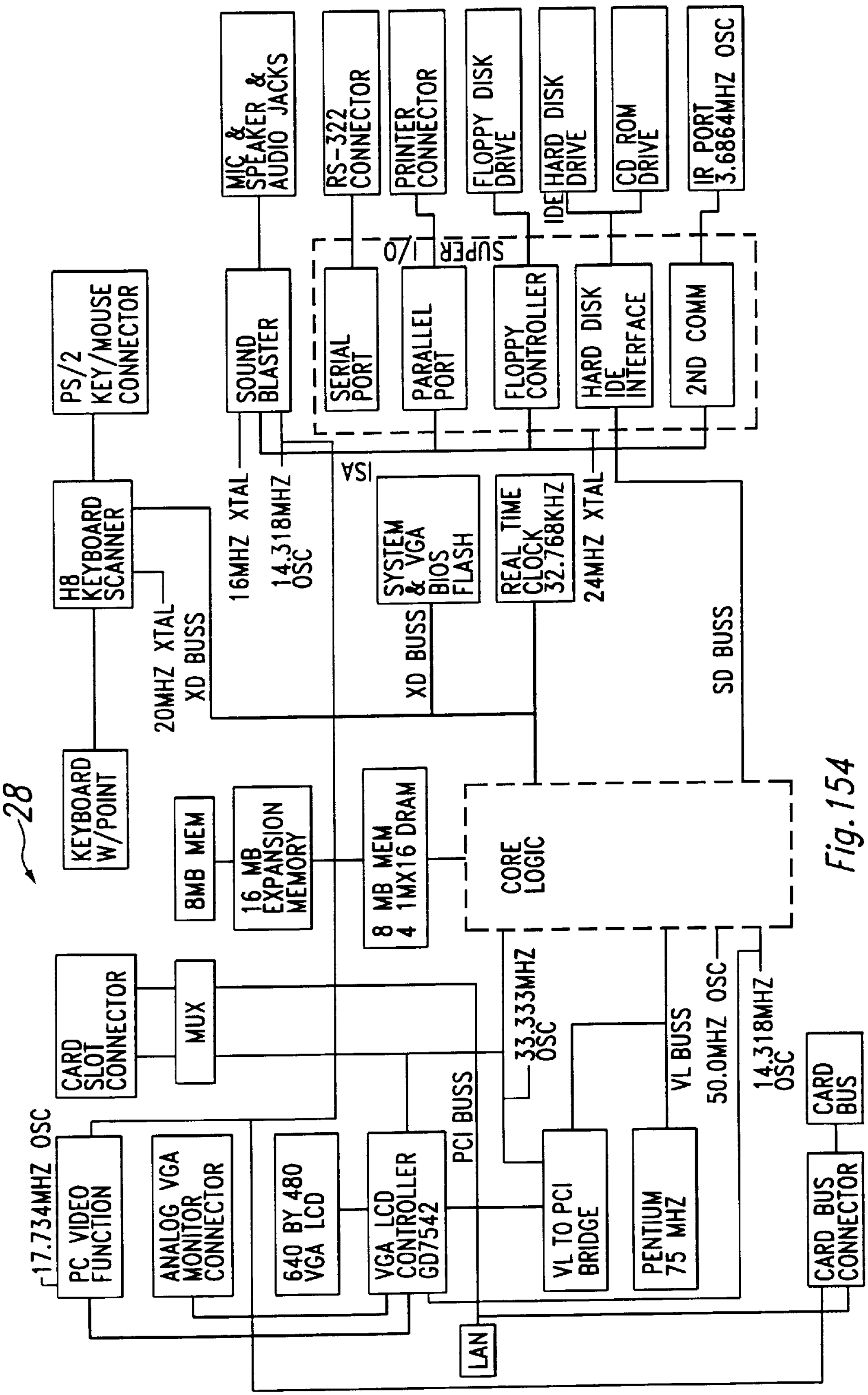
Figure 155:
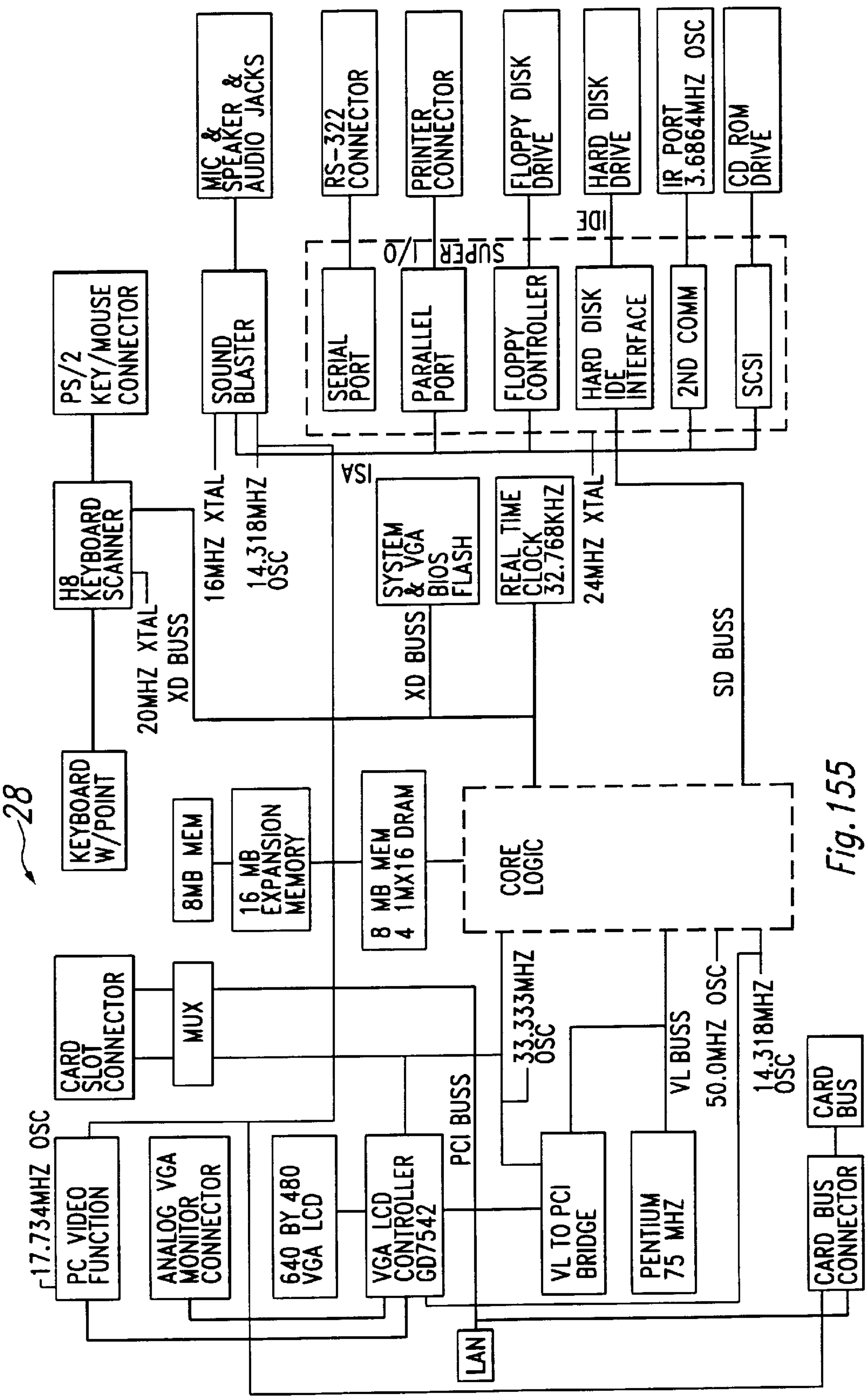
Figure 156:
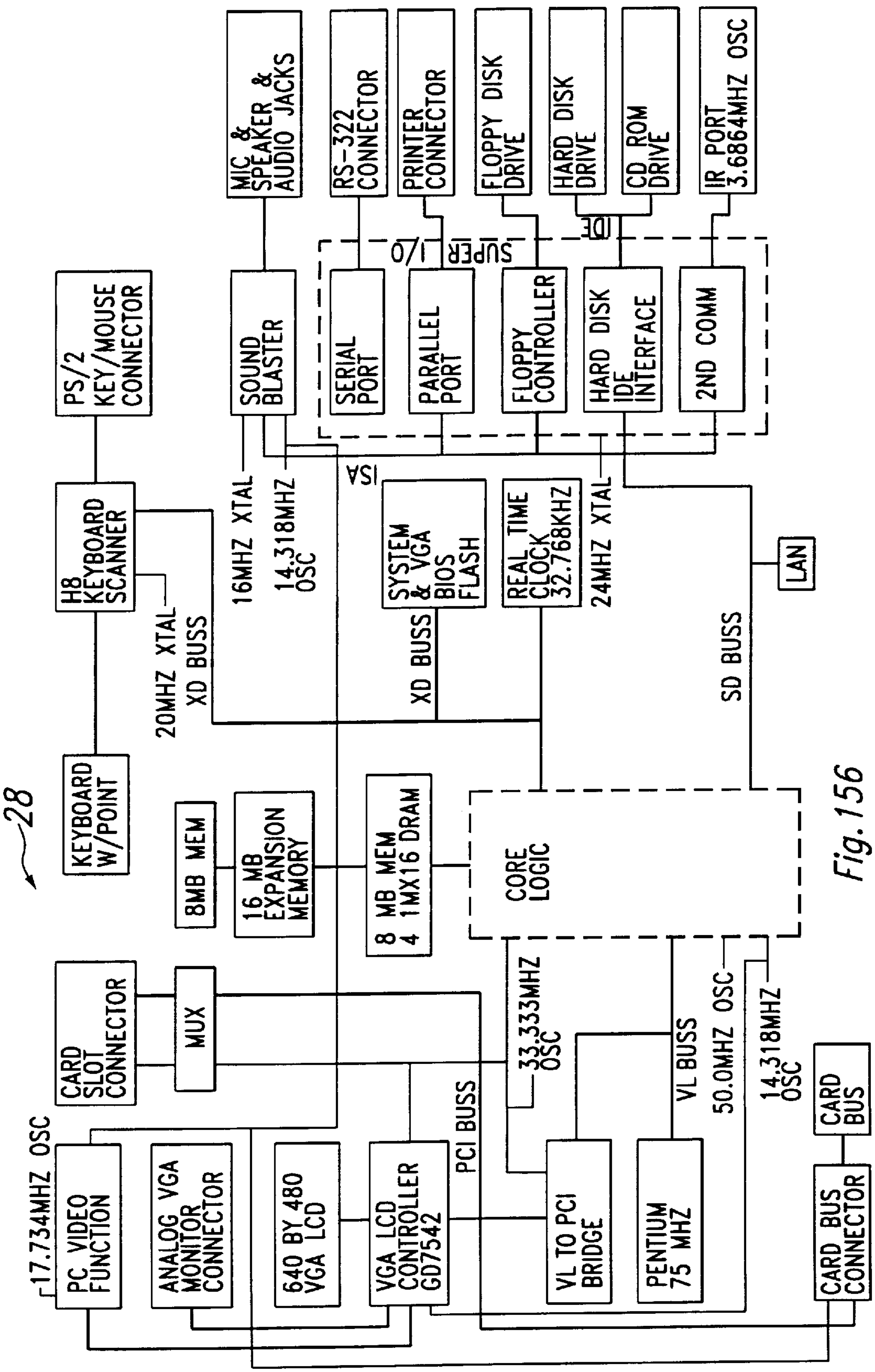
Figure 157:
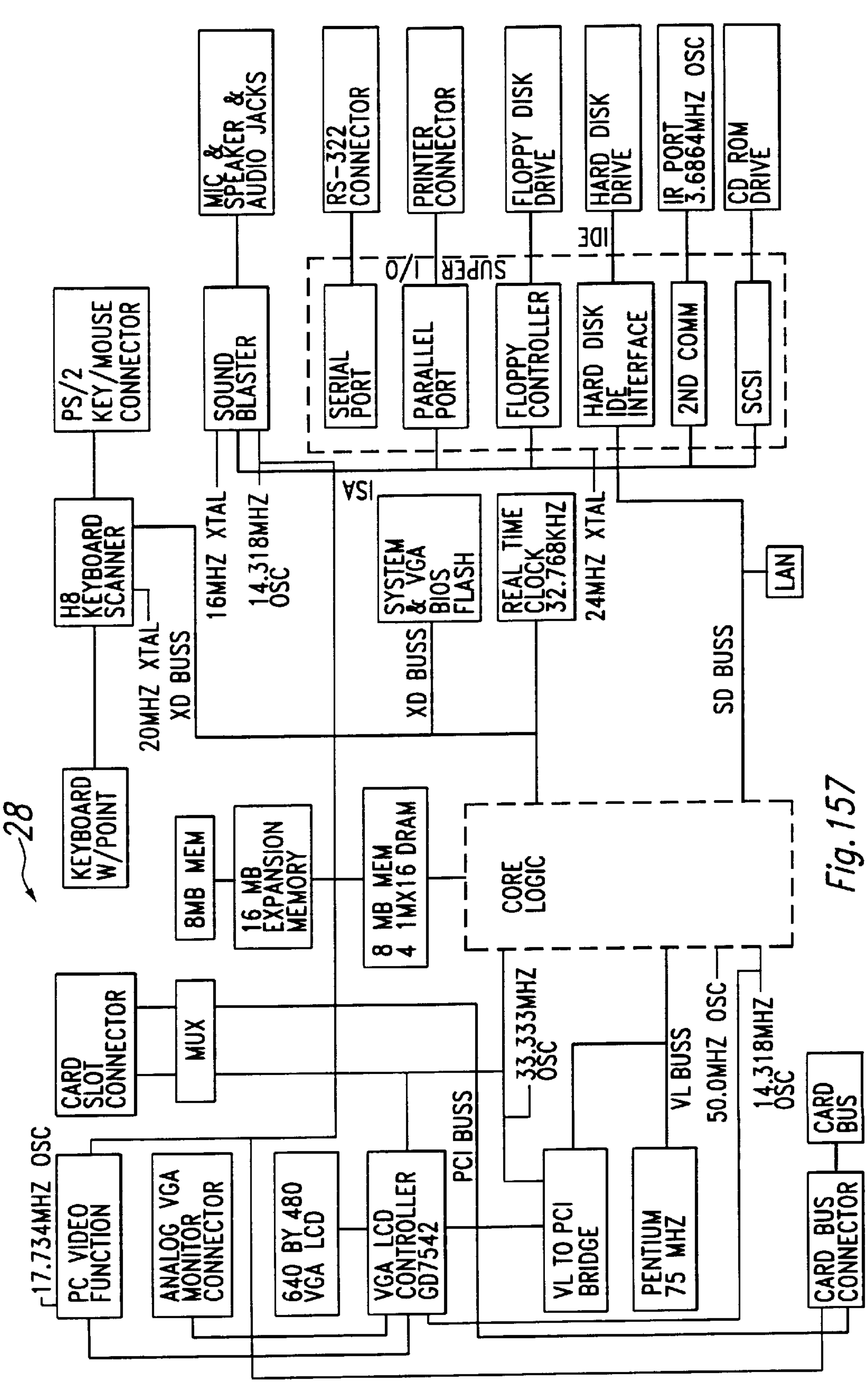
Figure 158:
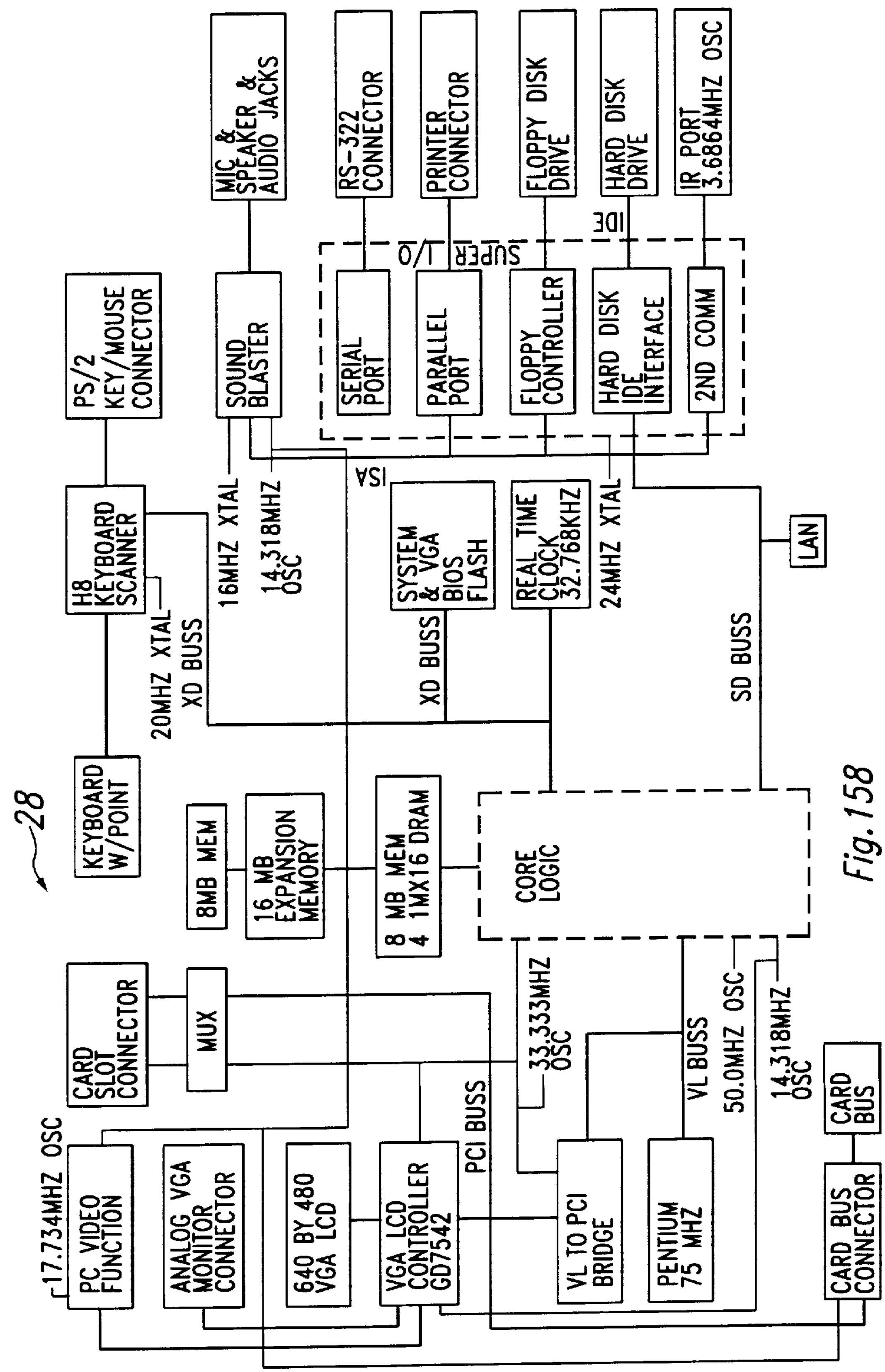
Figure 159:
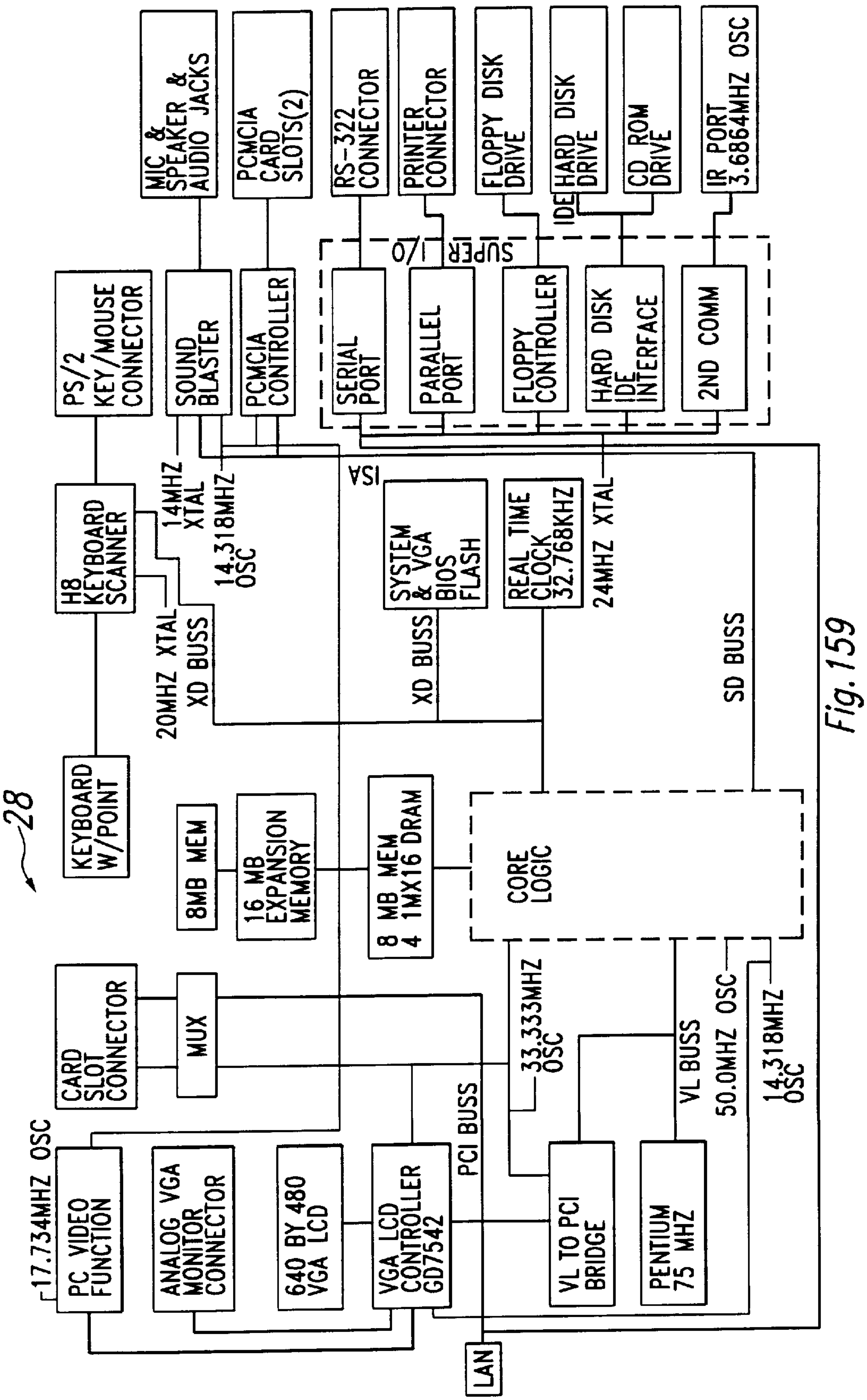
Figure 160:
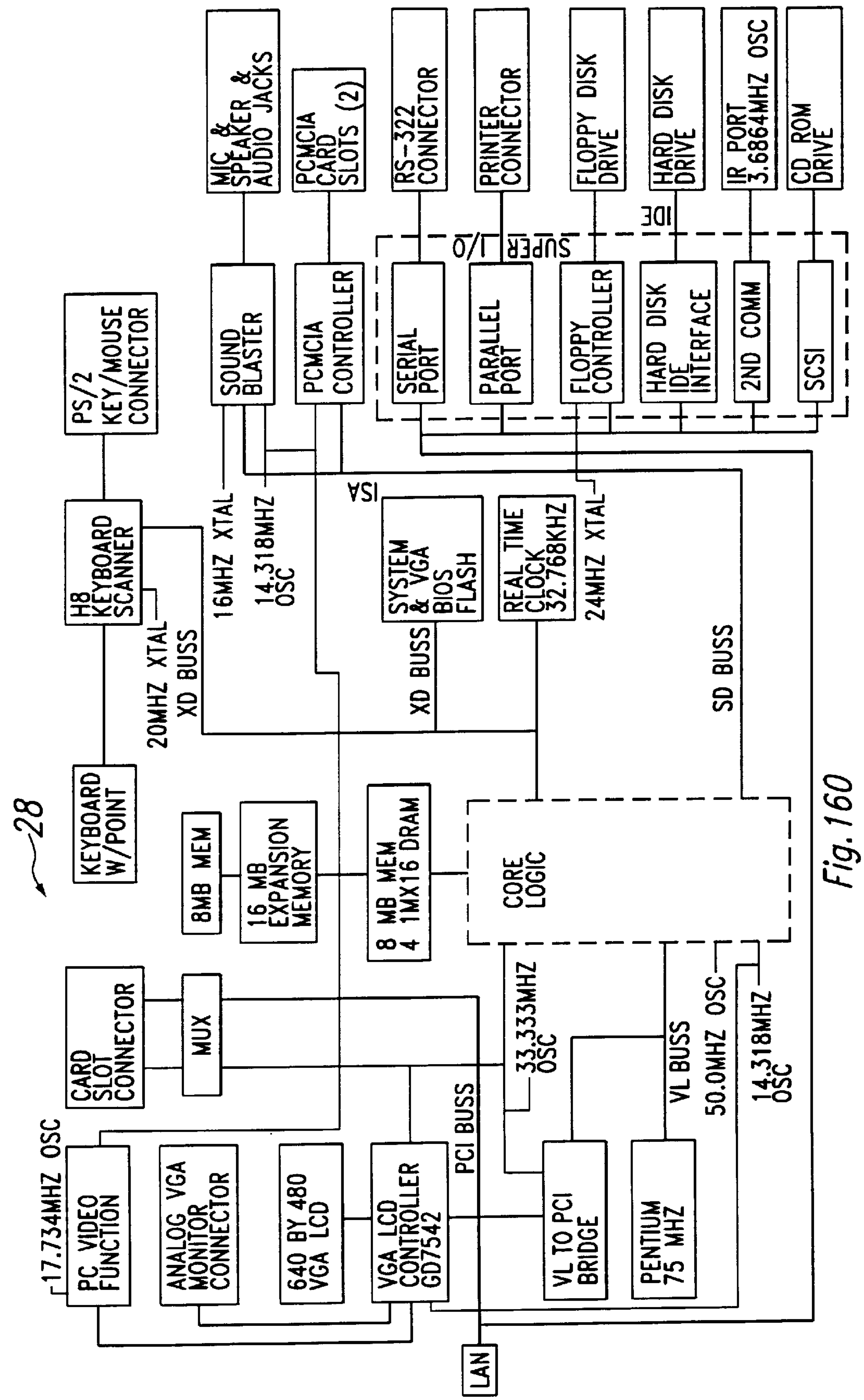
Figure 161:
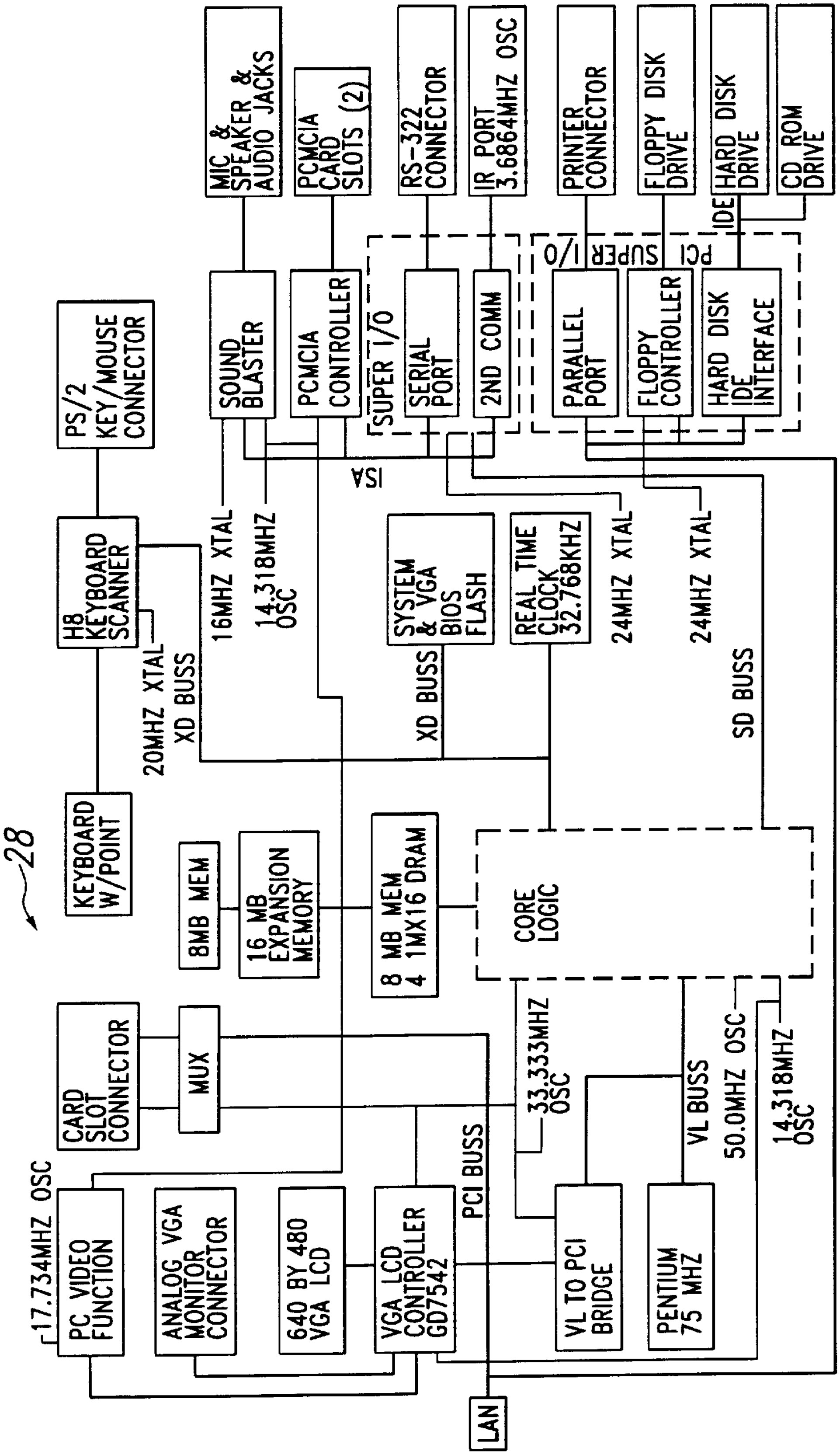
Figure 162:
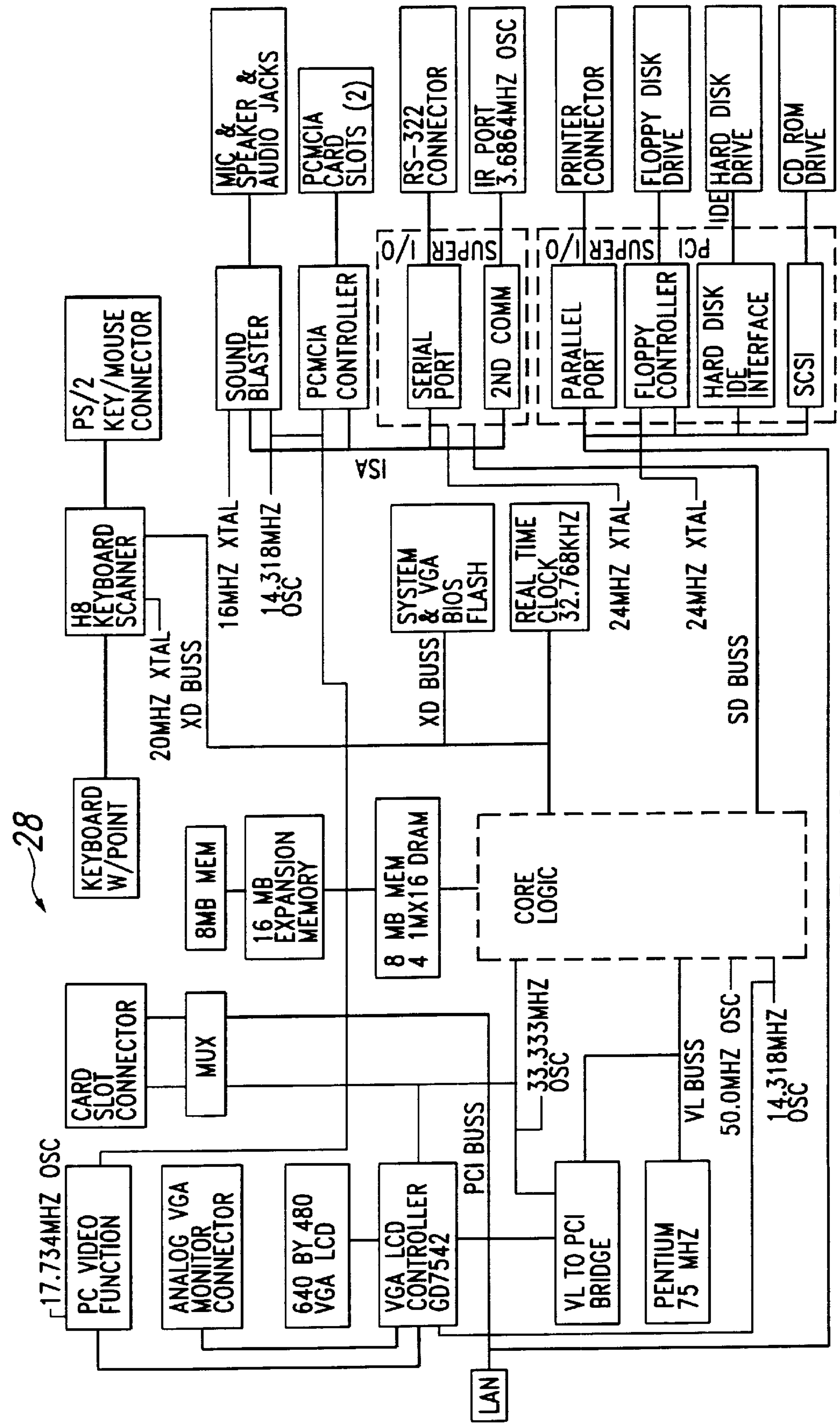
Figure 163:
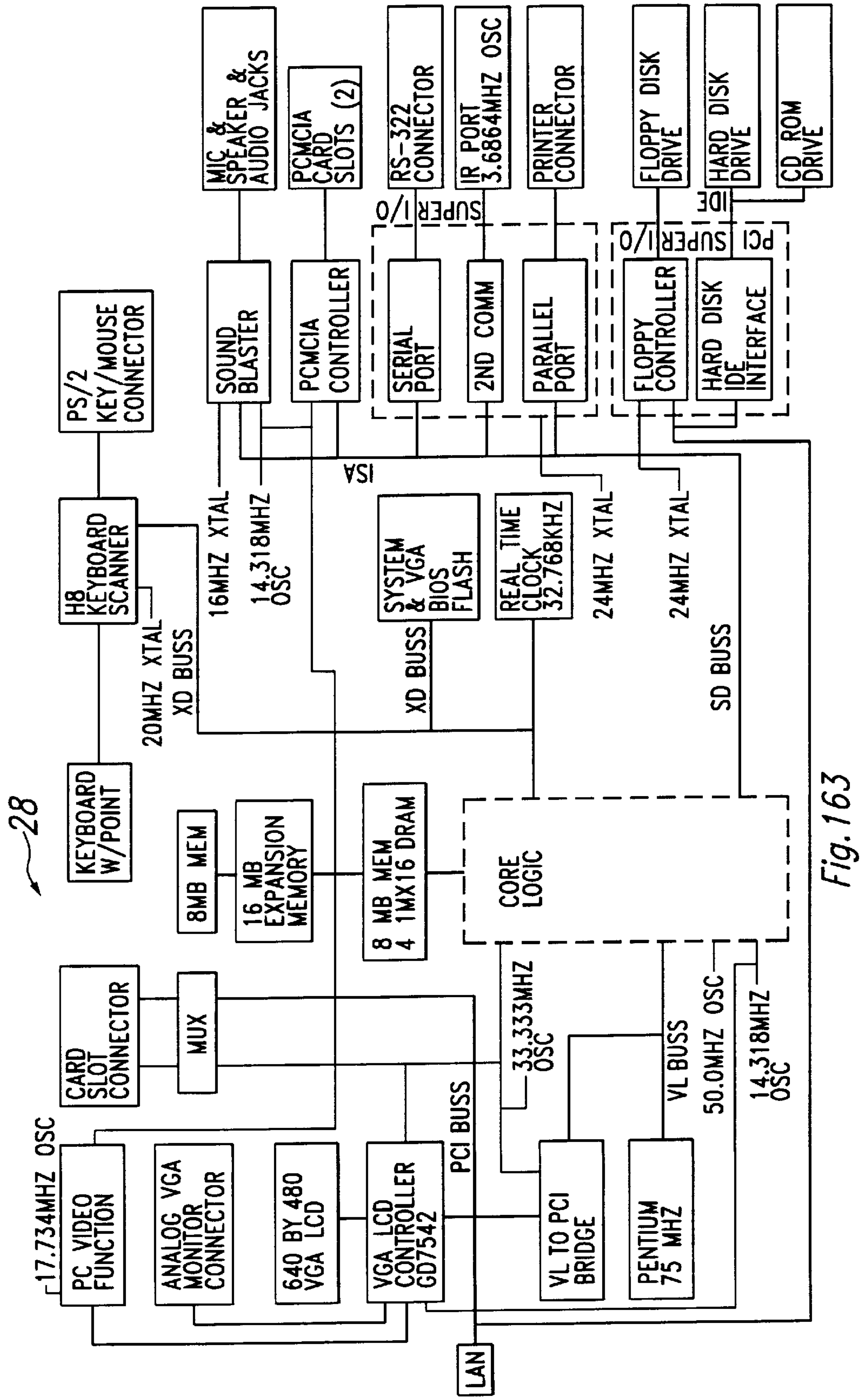
Figure 164:
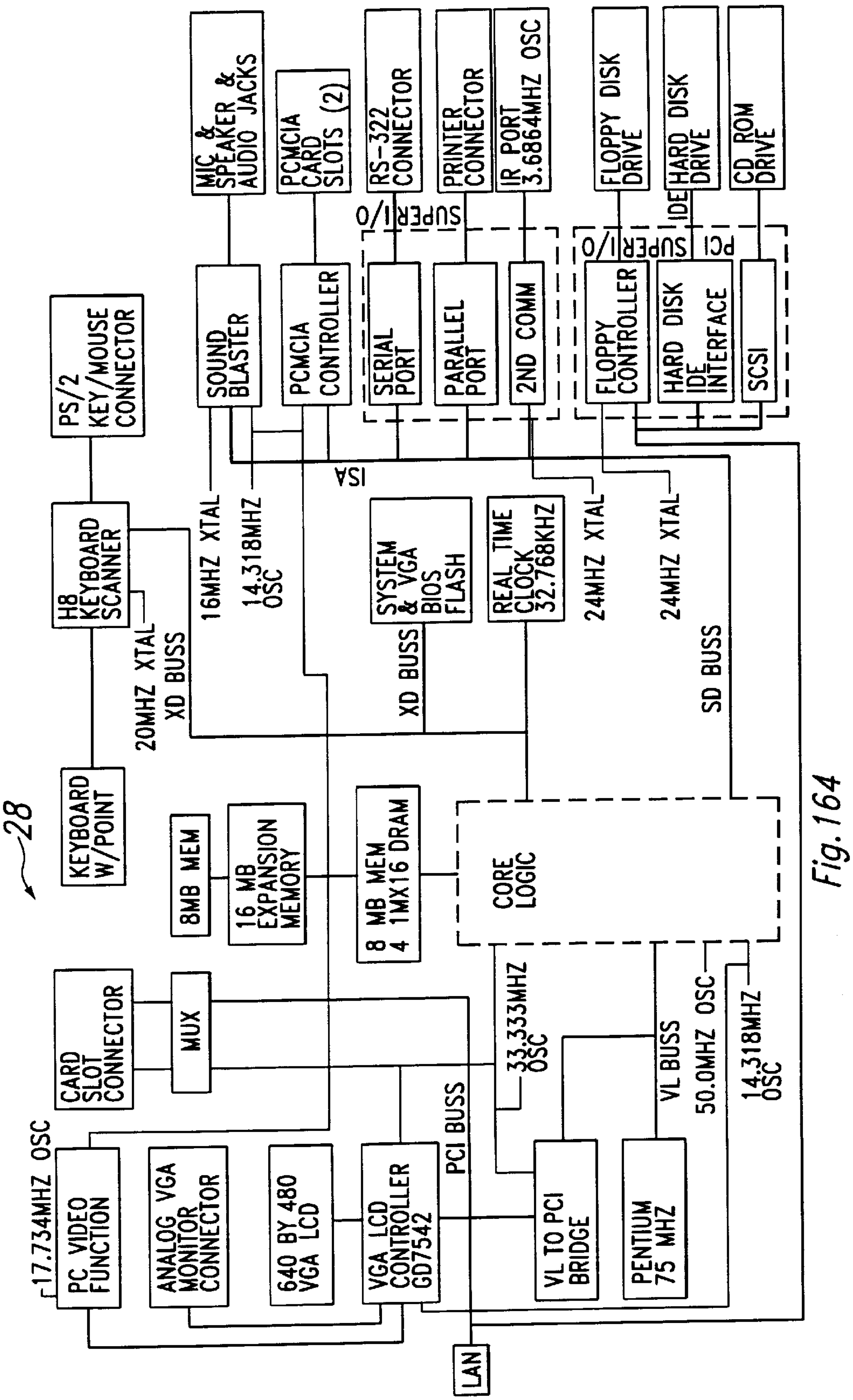
Figure 165:
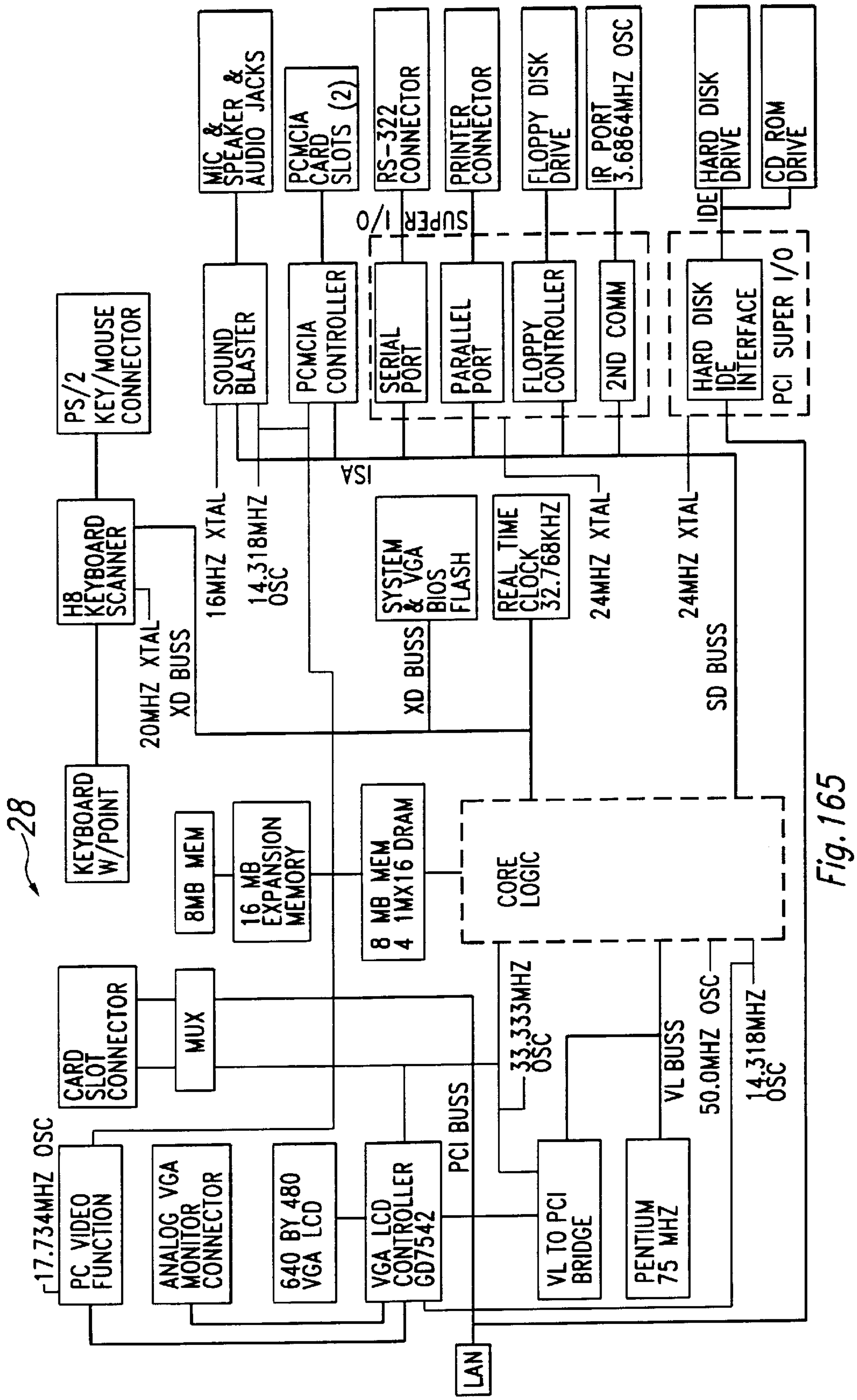
Figure 166:
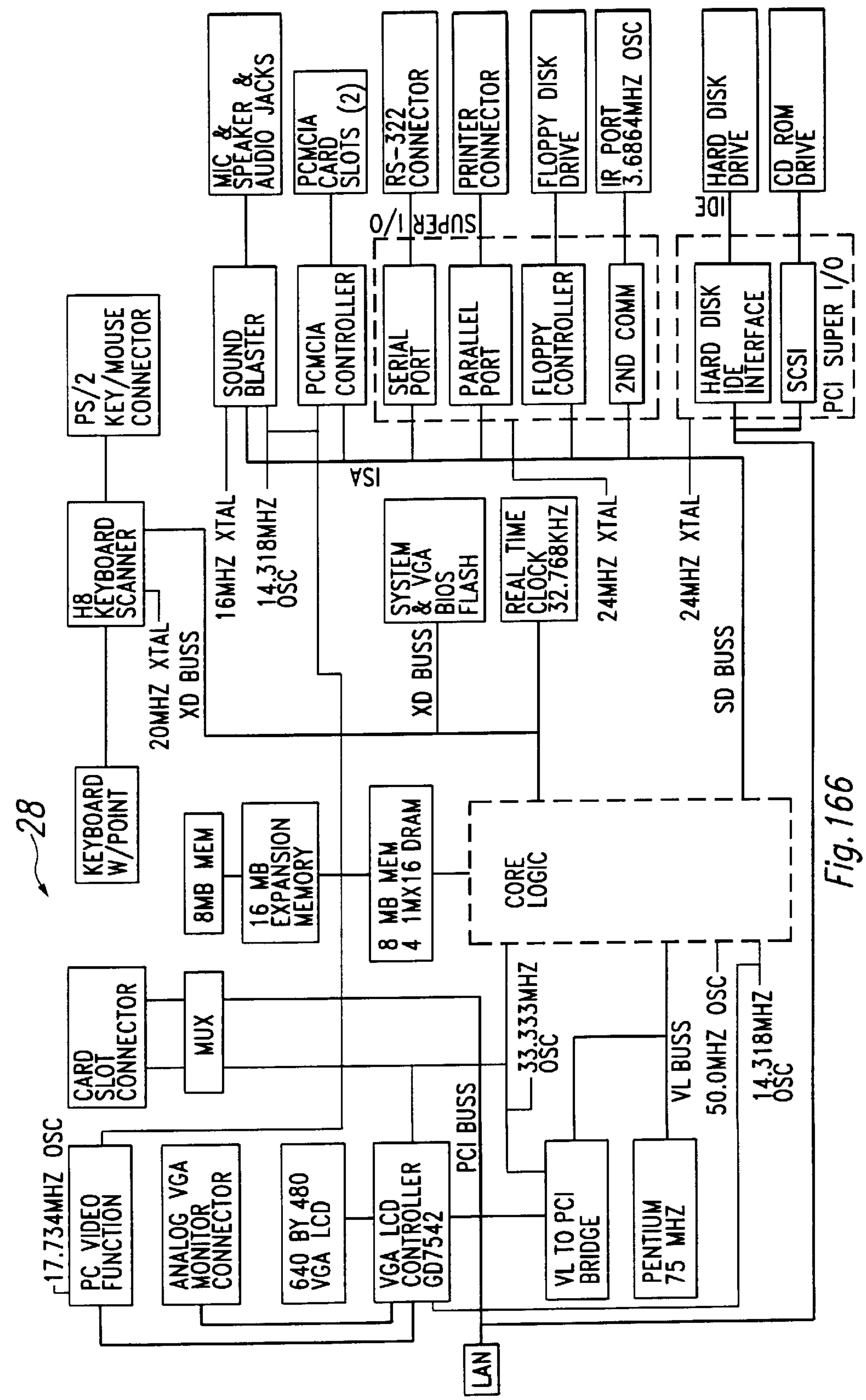
Figure 167:
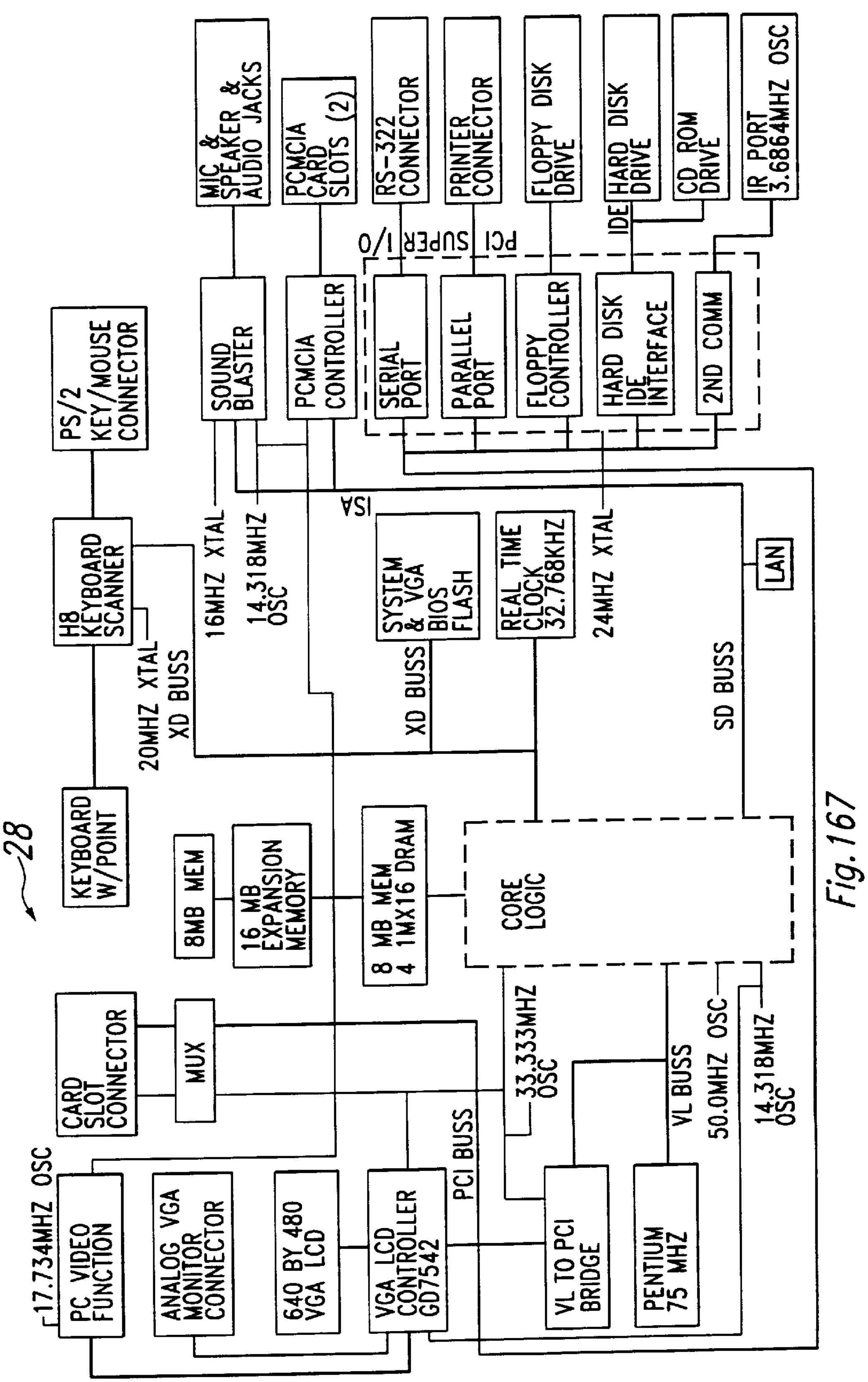
Figure 168:
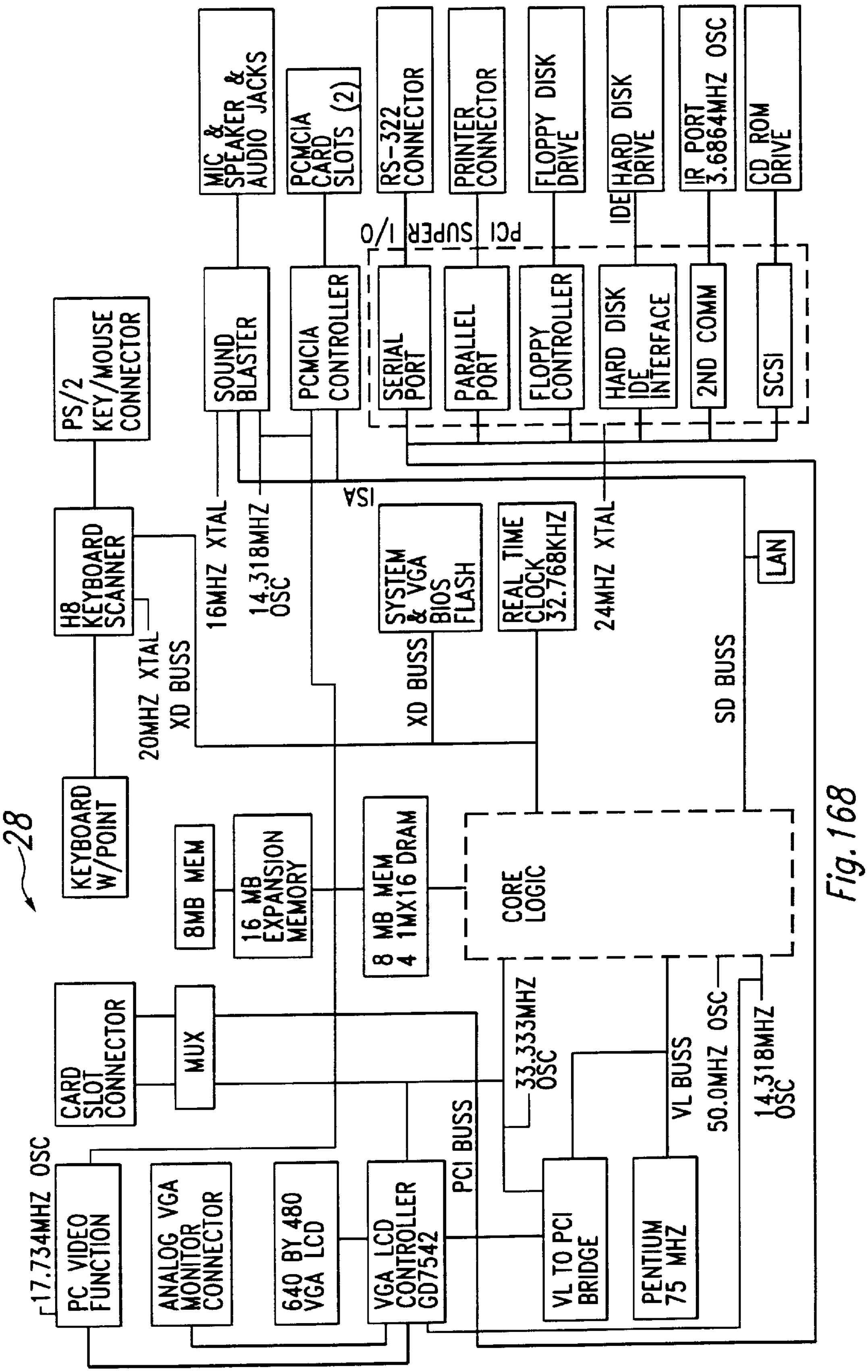
Figure 169:
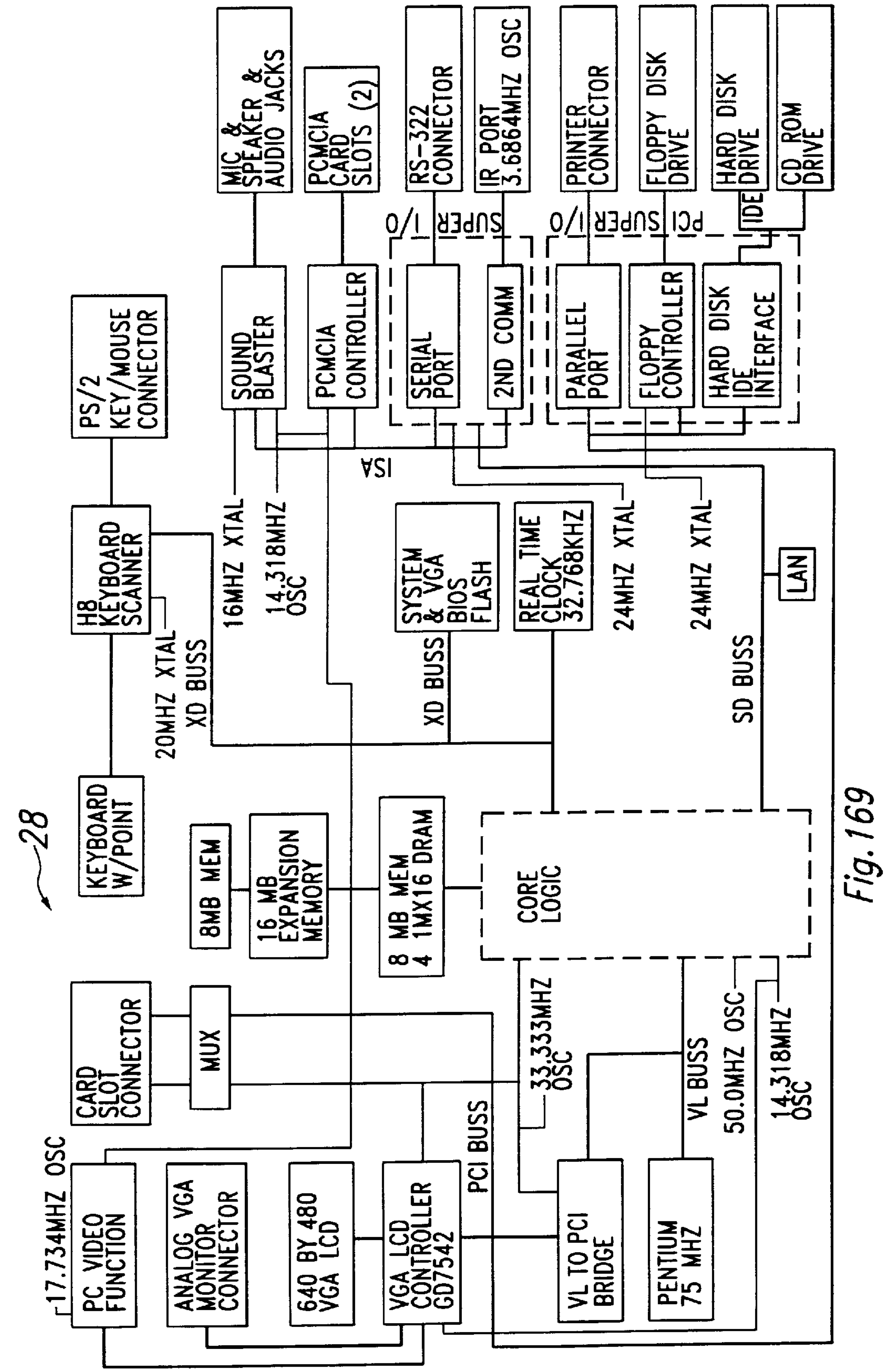
Figure 170:
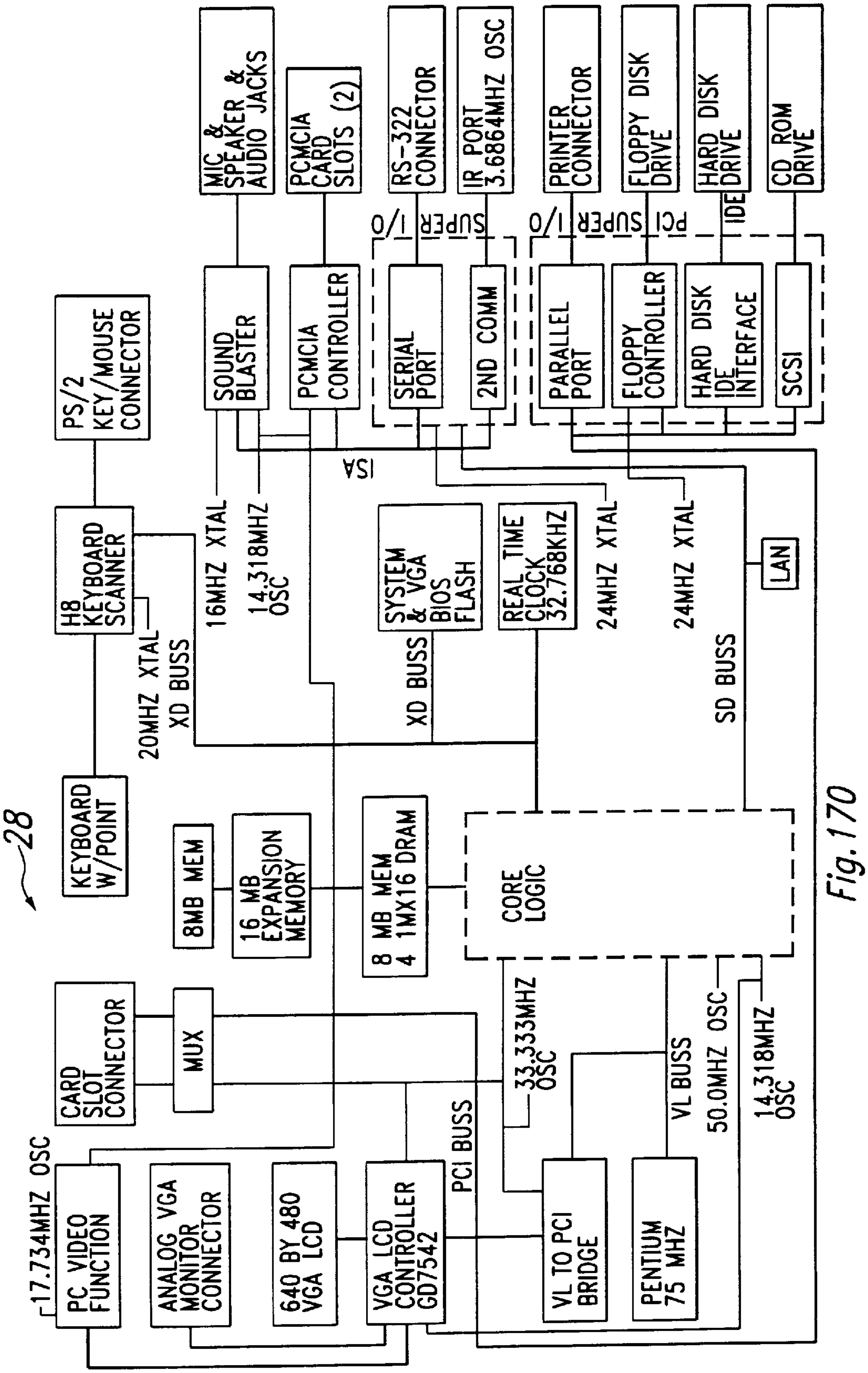
Figure 171:
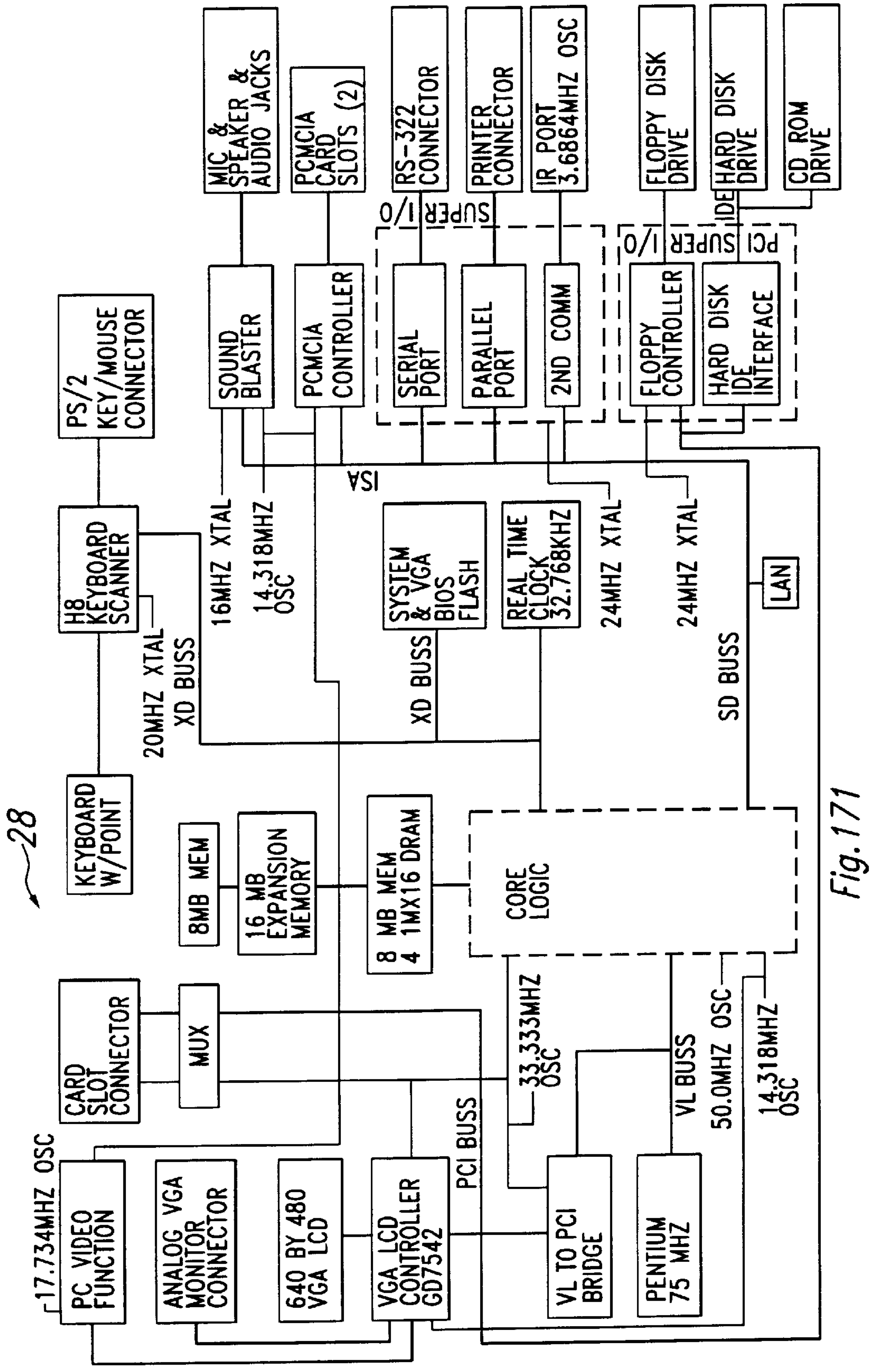
Figure 172:
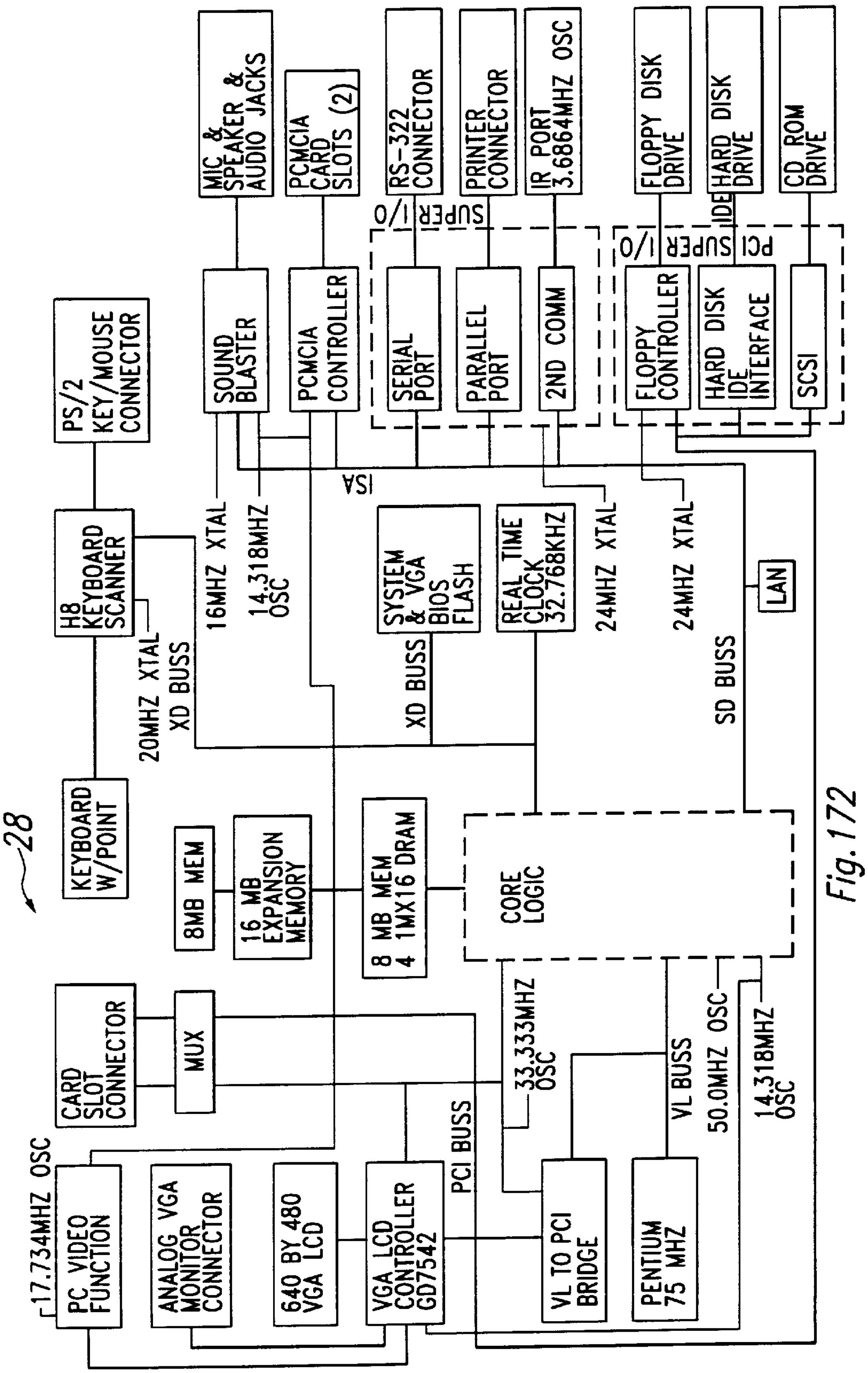
Figure 173:
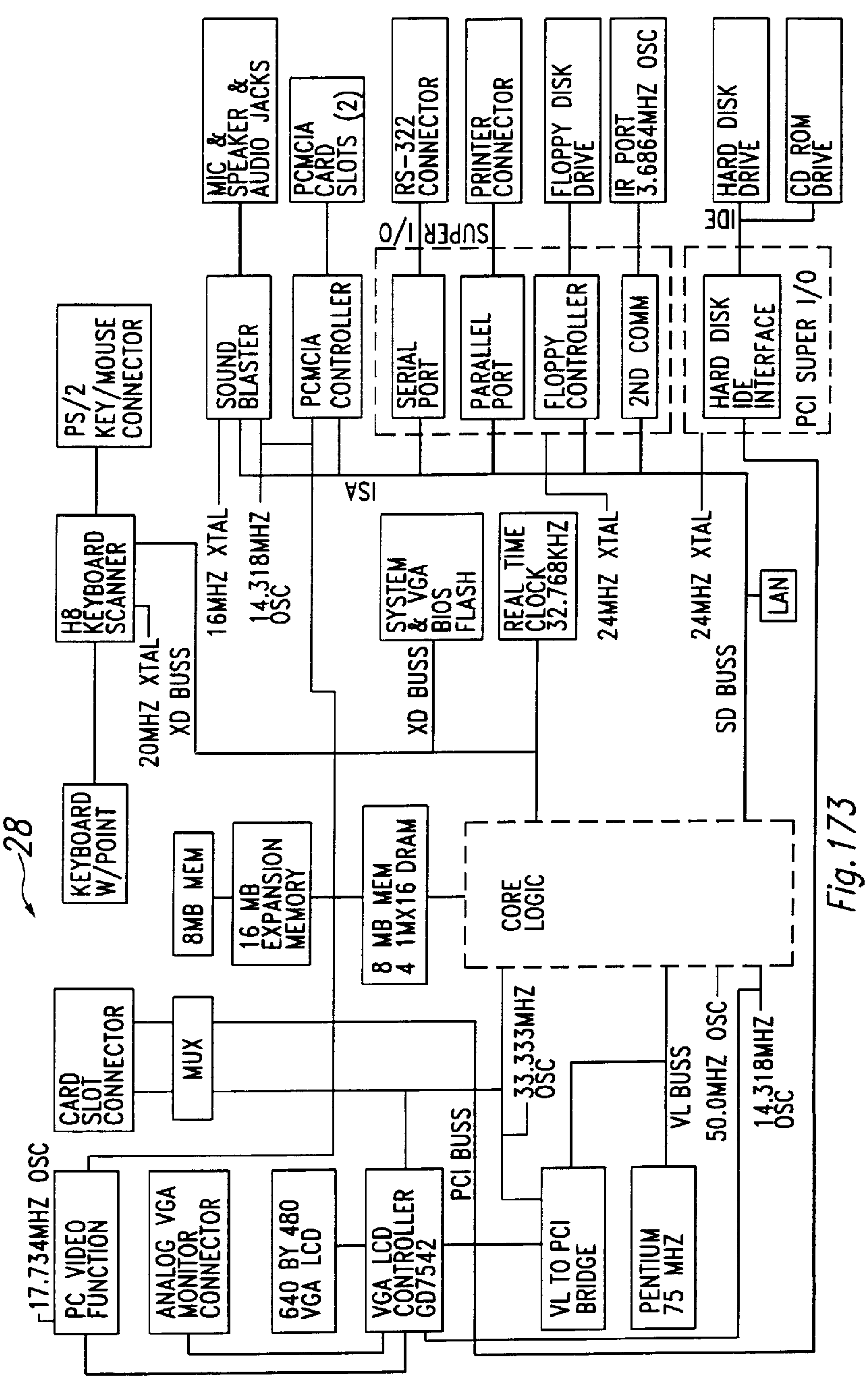
Figure 174:
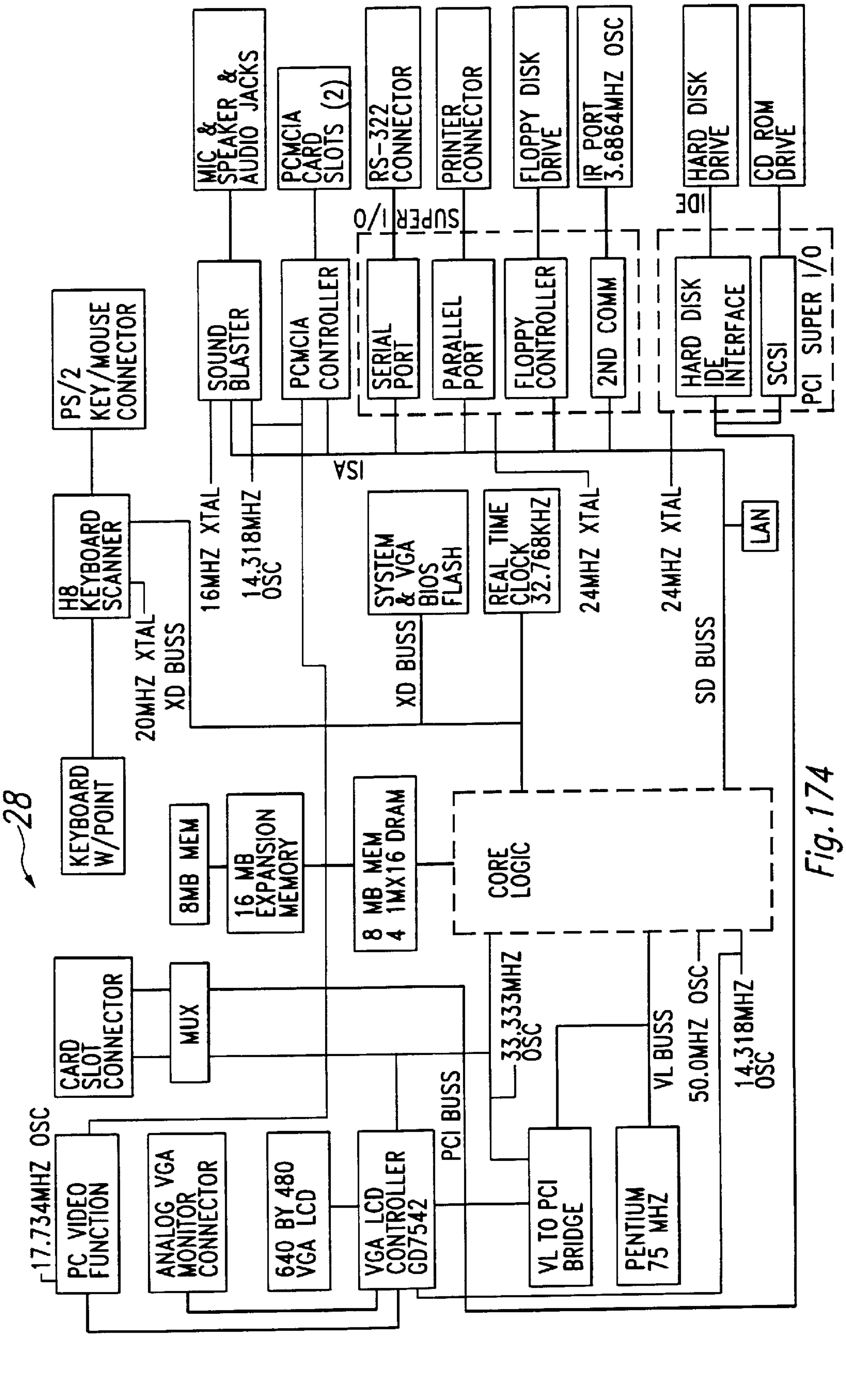
Figure 175:
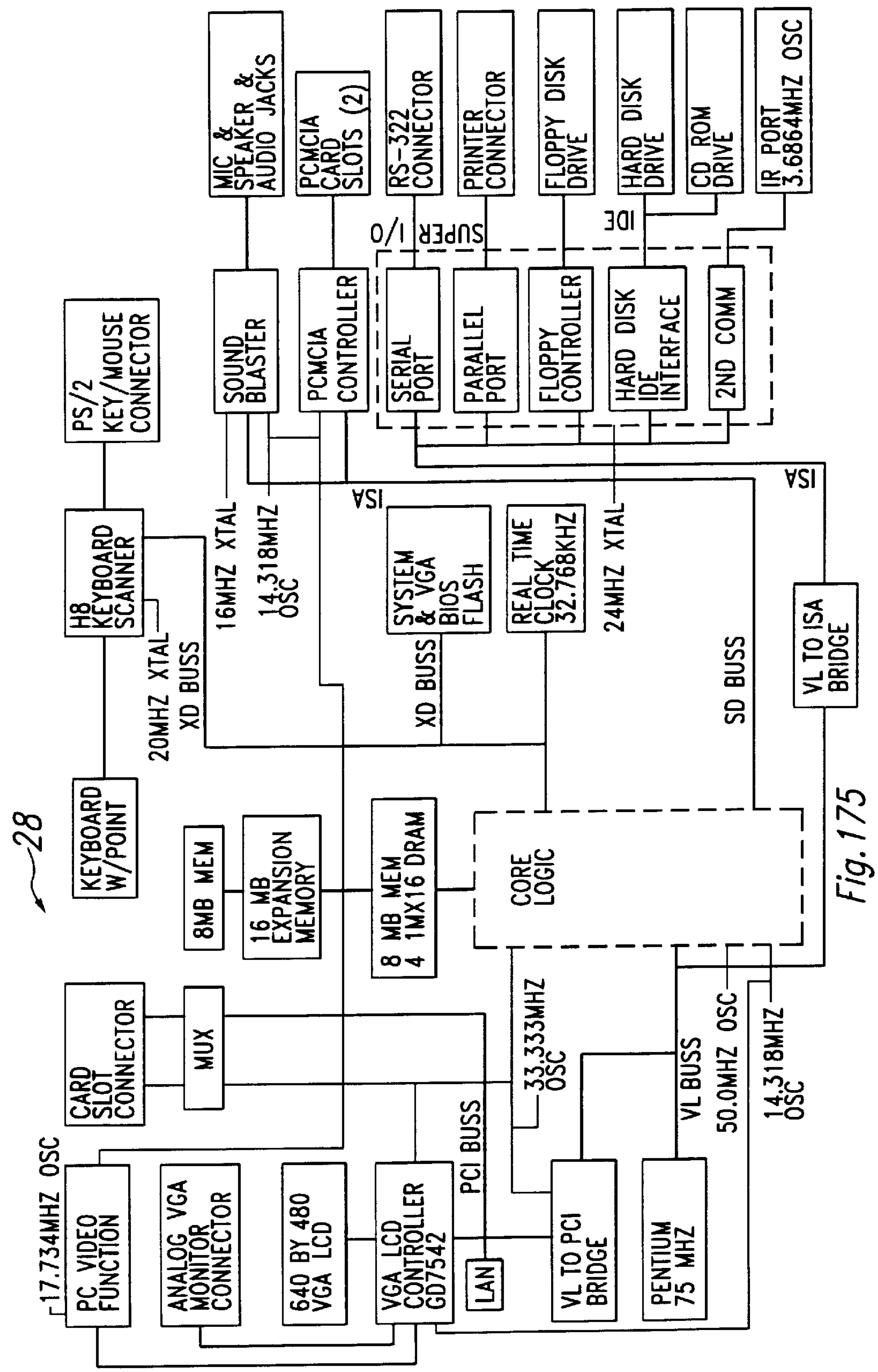
Figure 176:
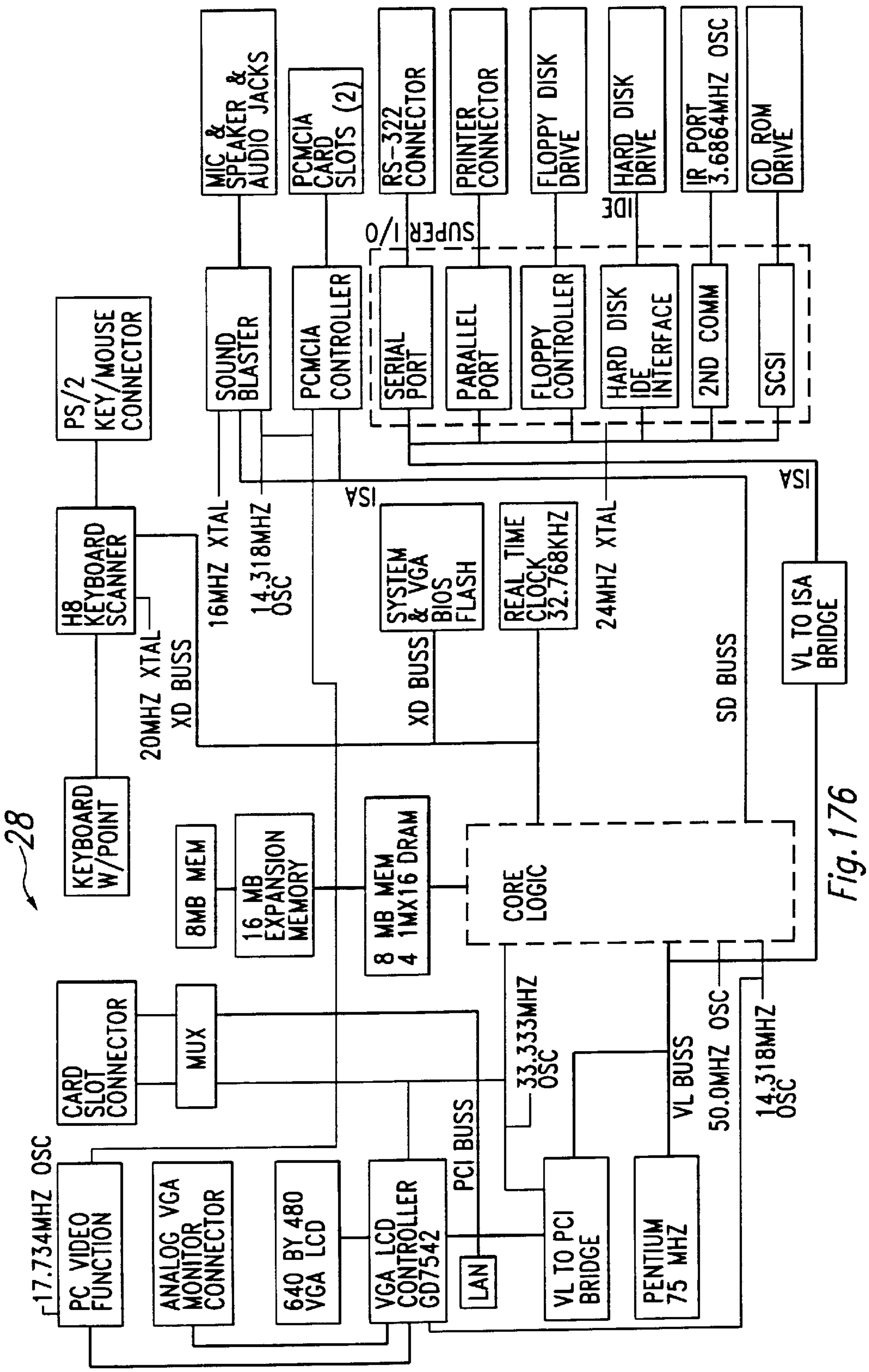
Figure 177:
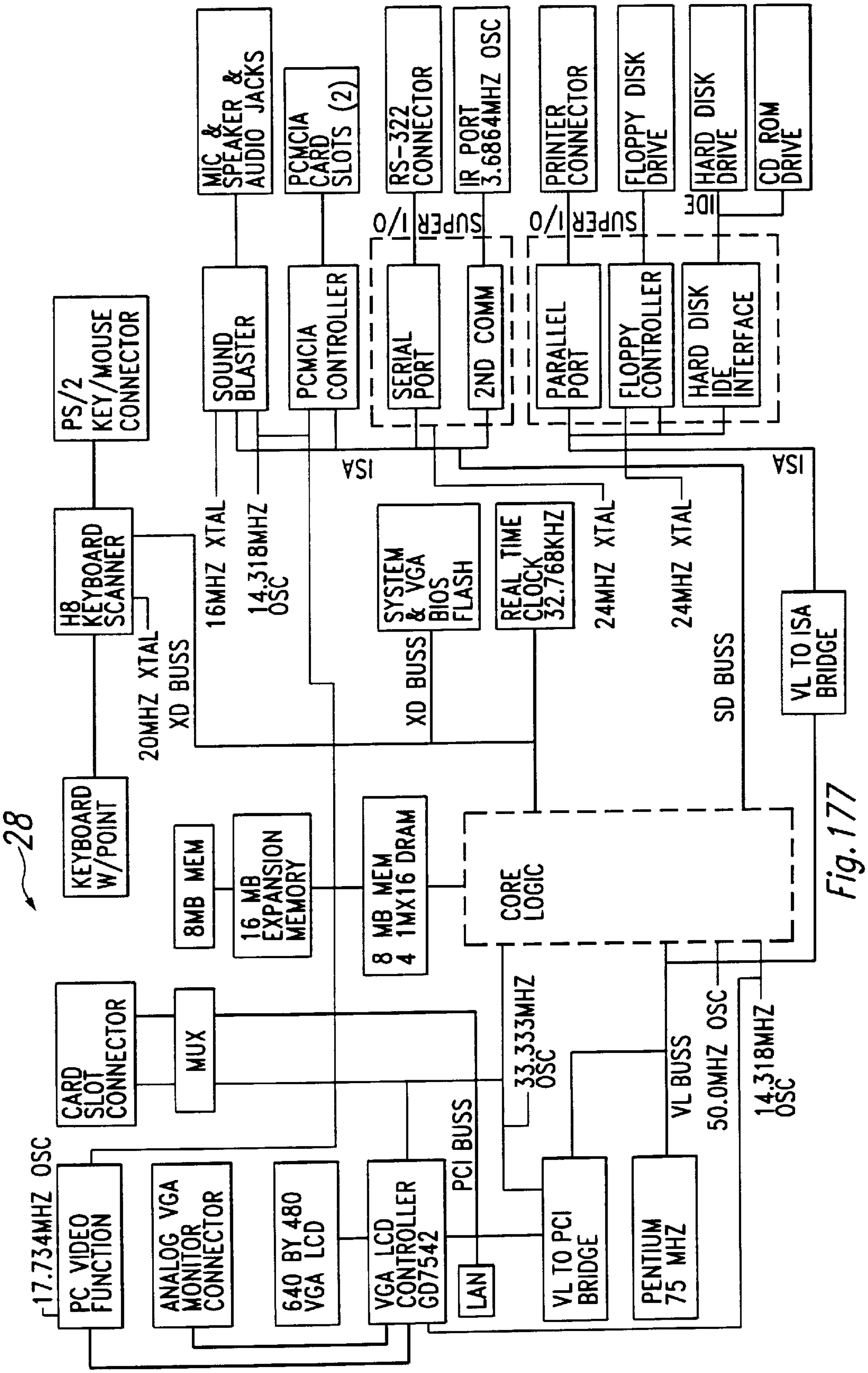
Figure 178:
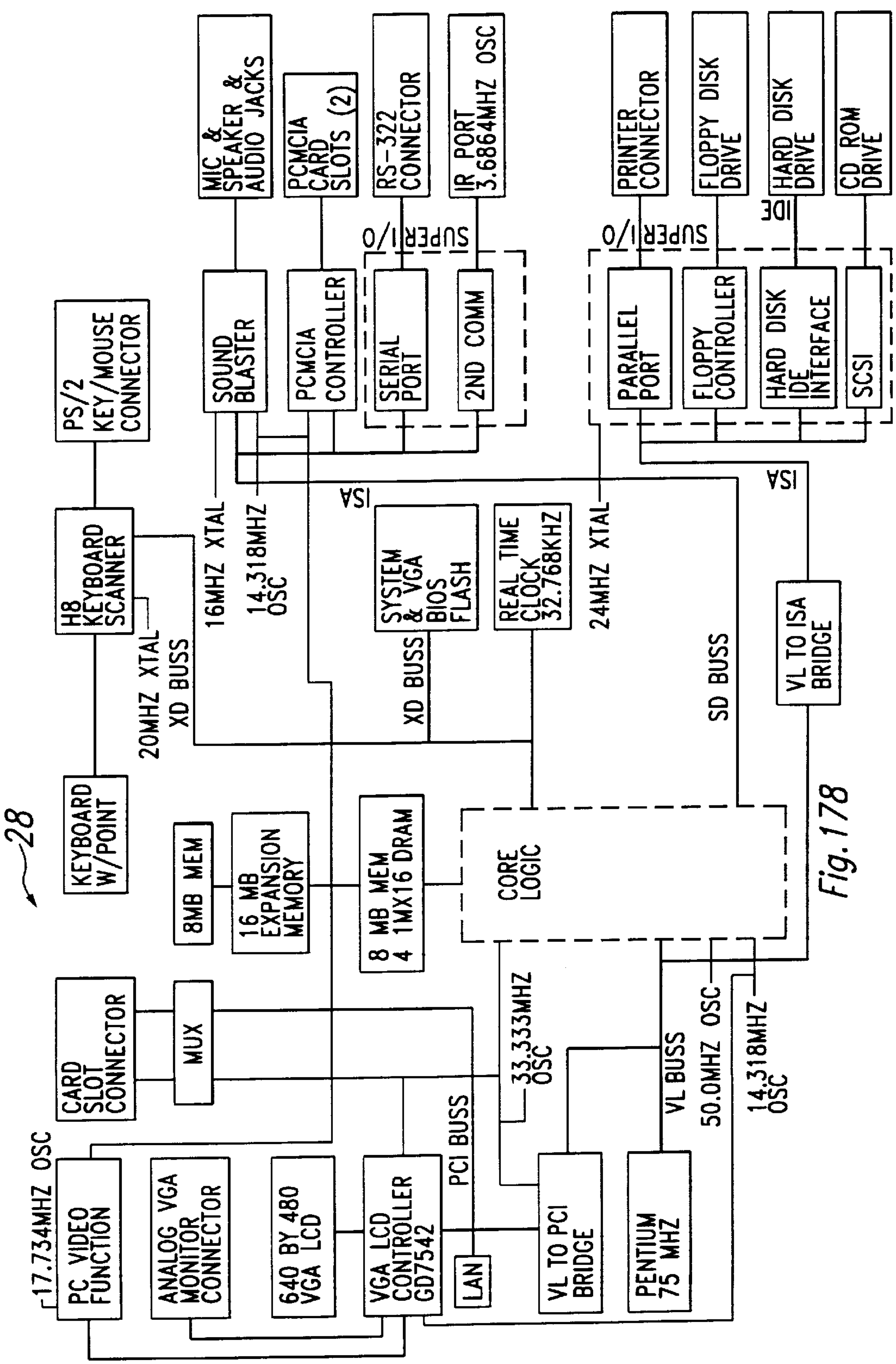
Figure 179:
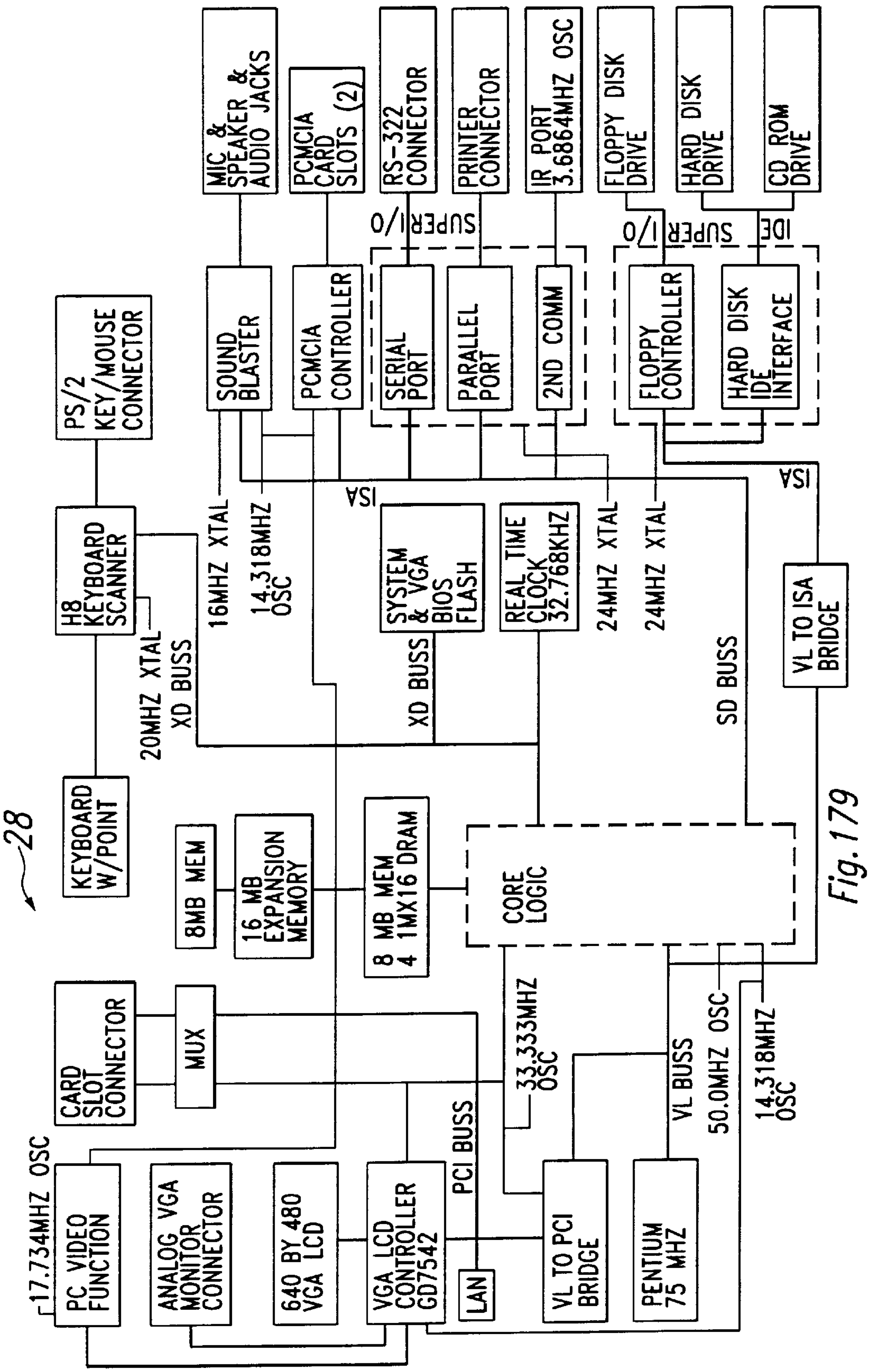
Figure 180:
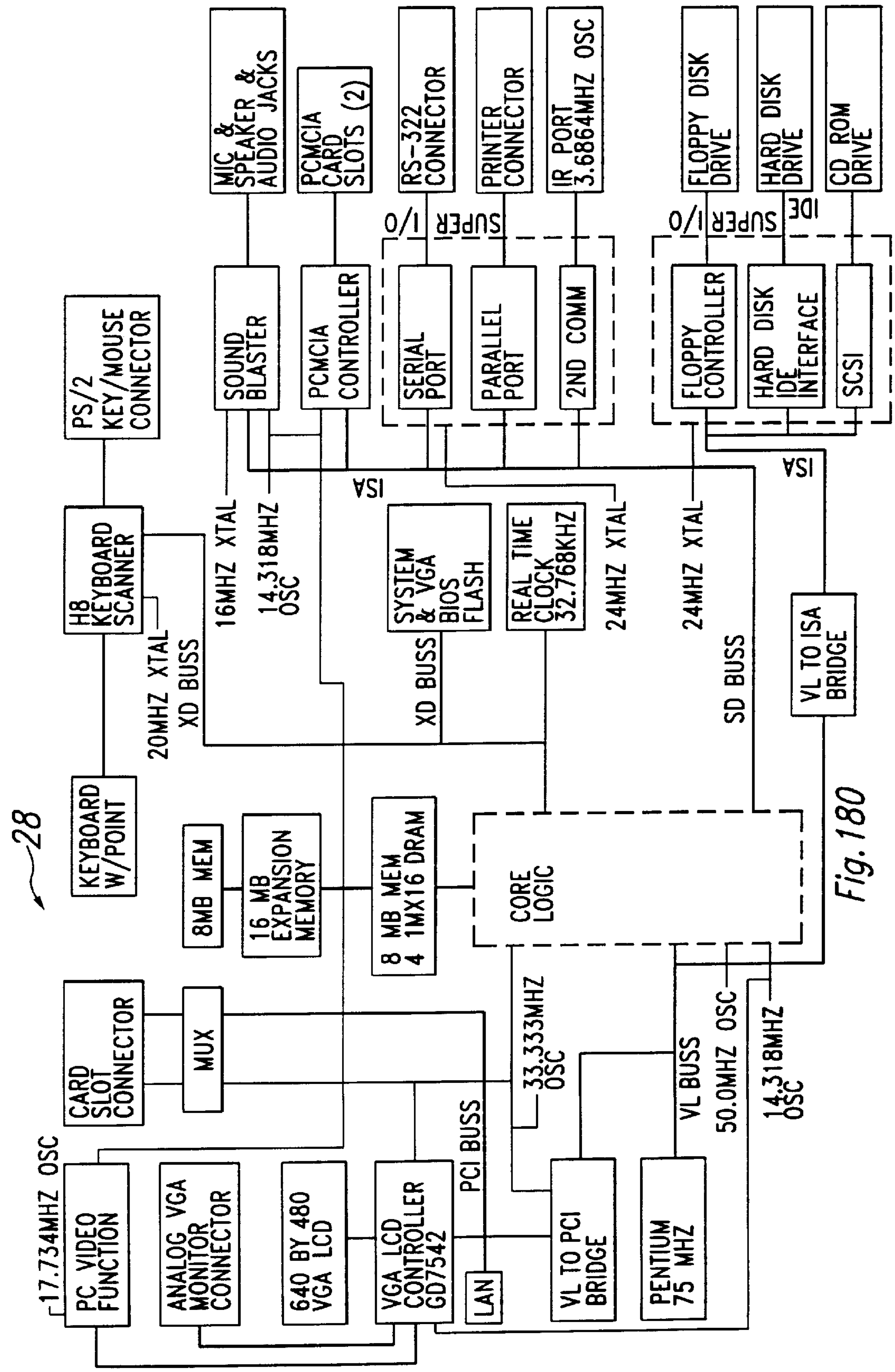
Figure 181:
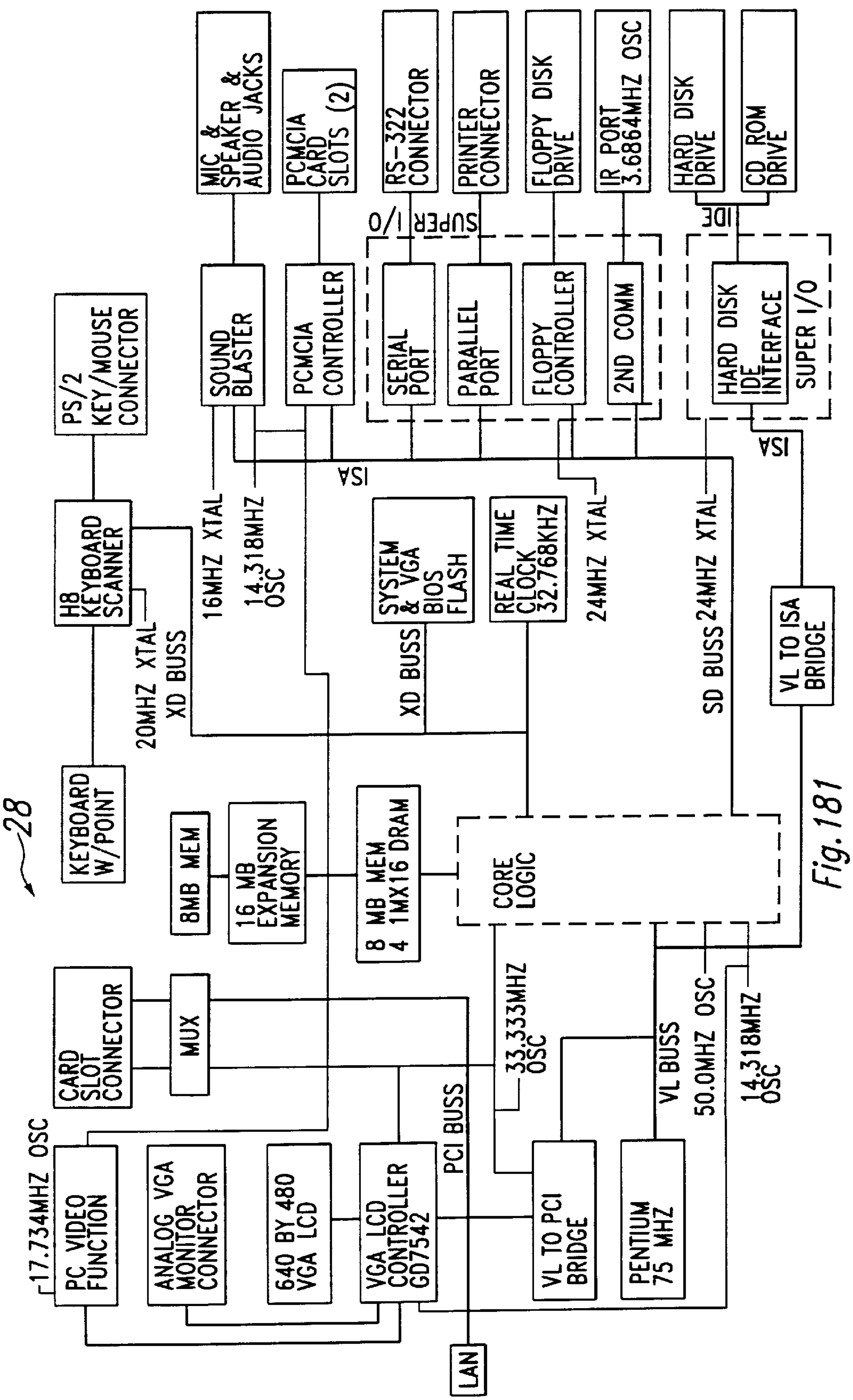
Figure 182:
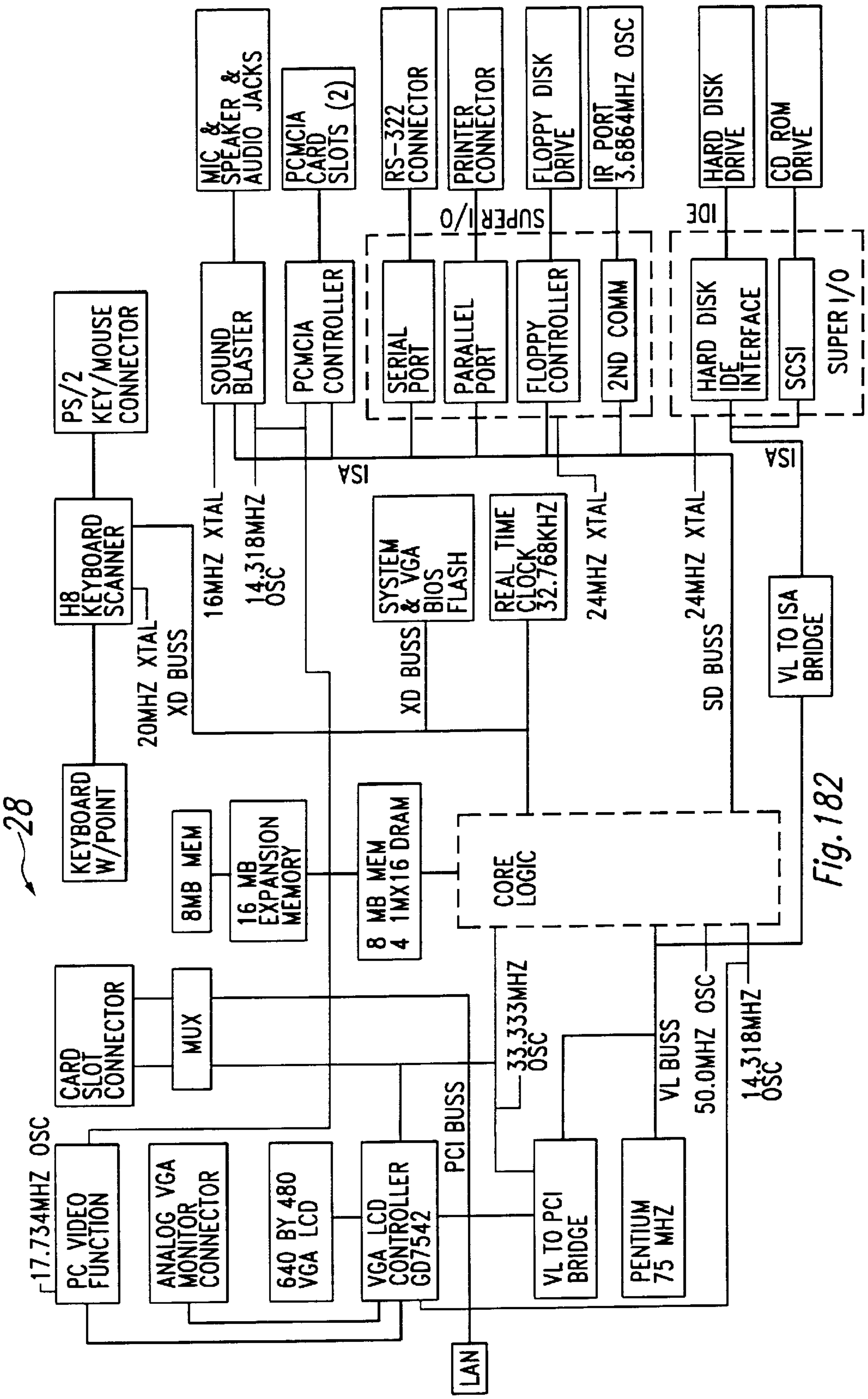
Figure 183:
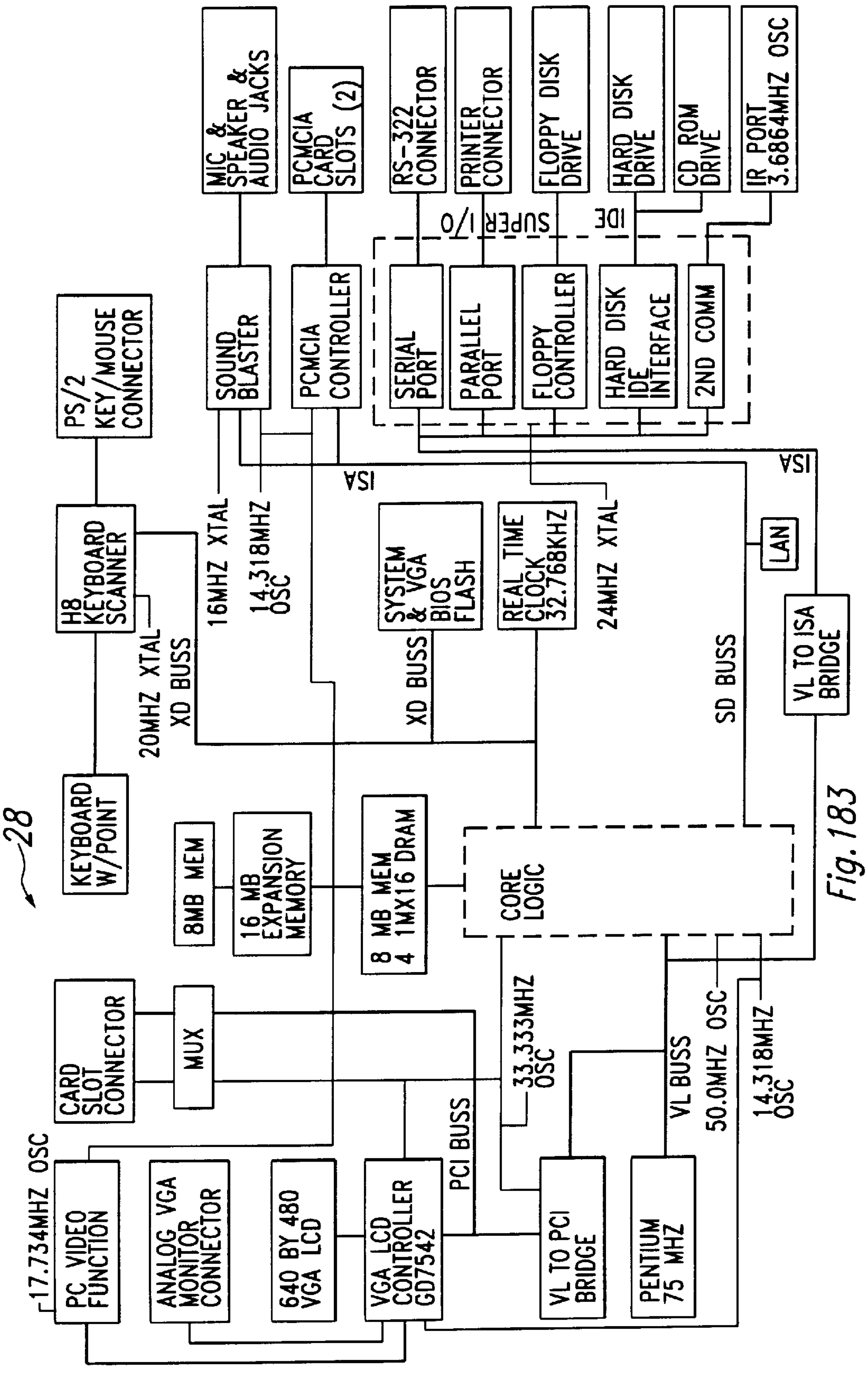
Figure 184:
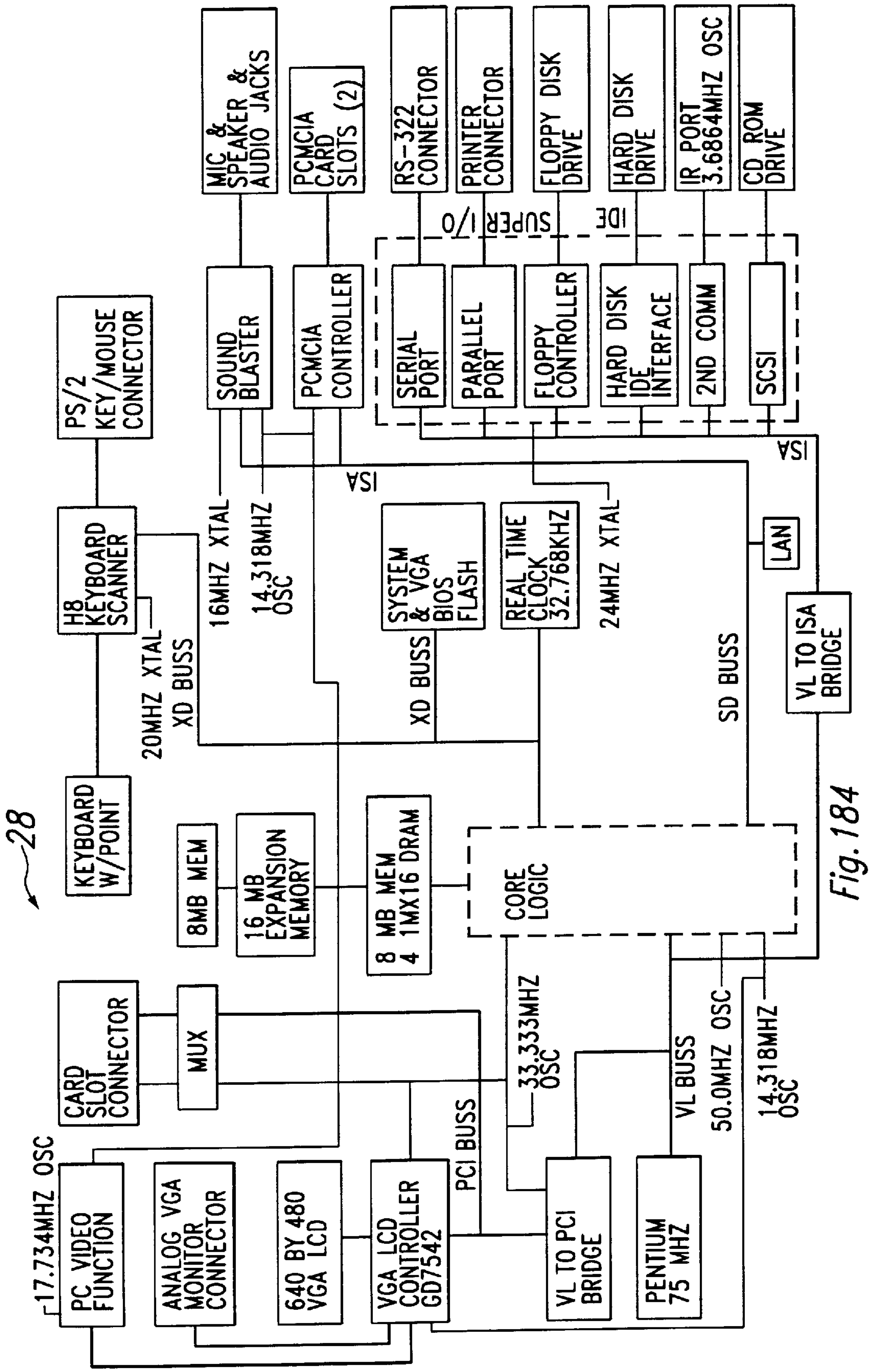
Figure 185:
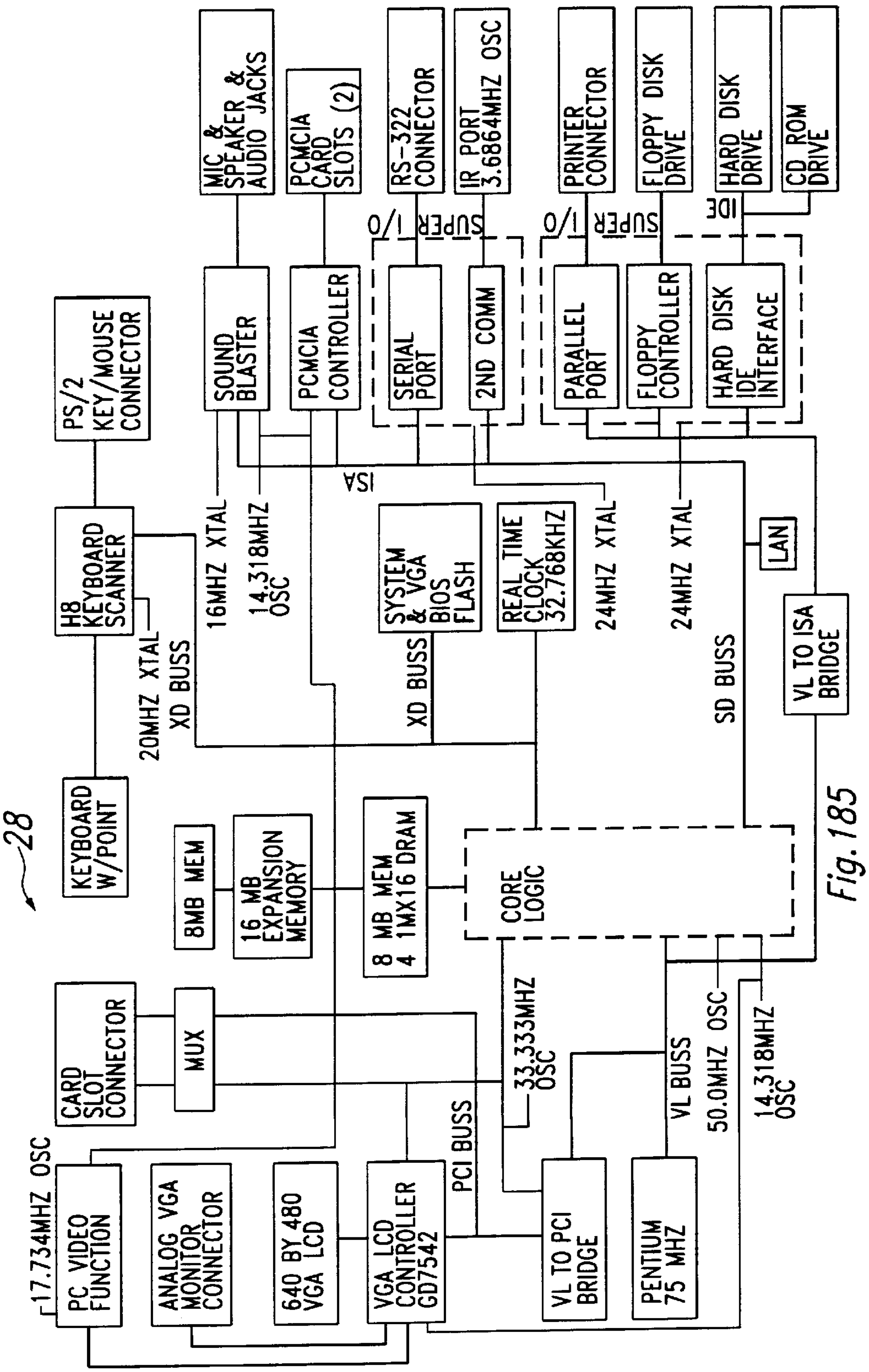
Figure 186:
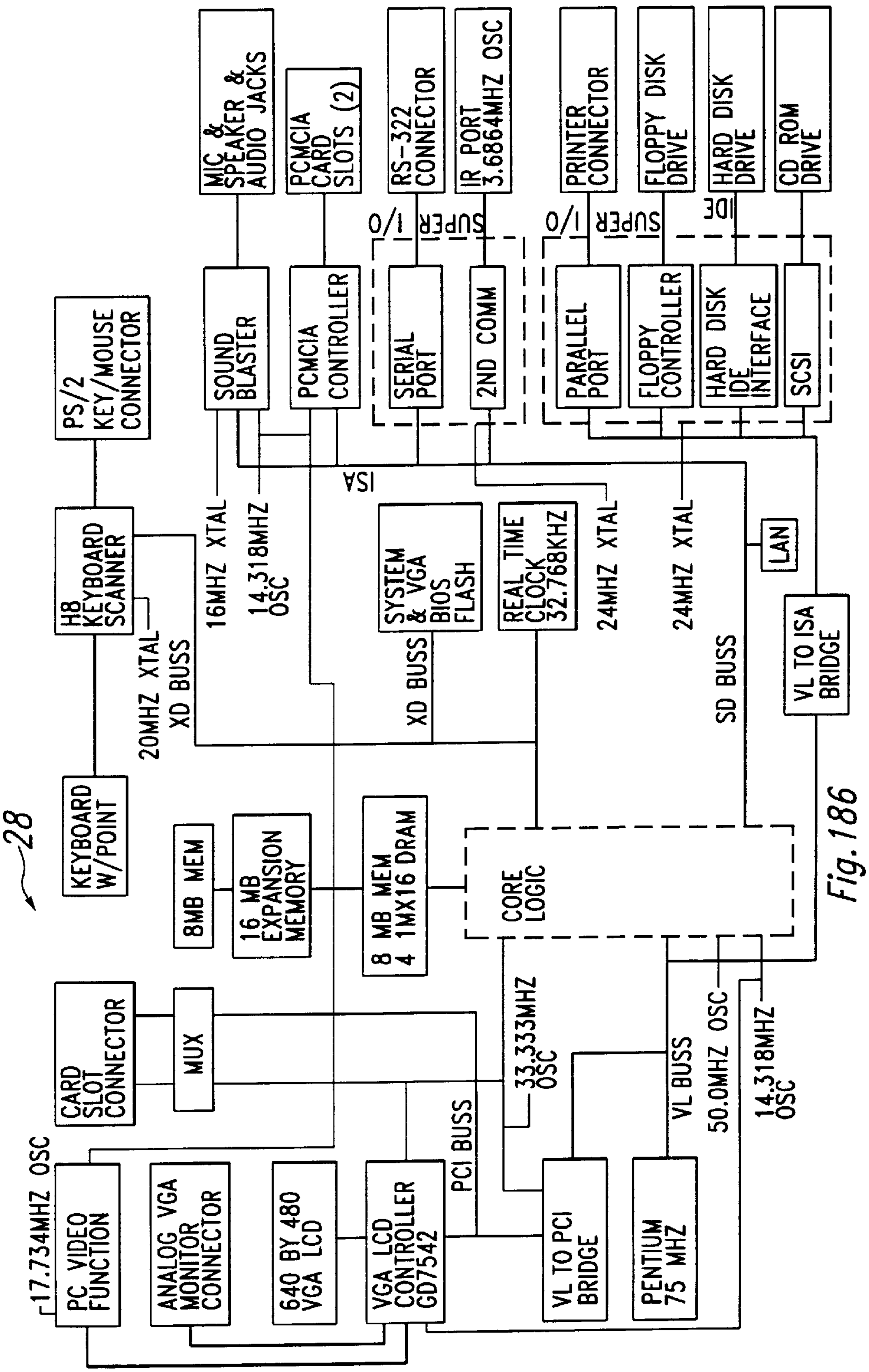
Figure 187:
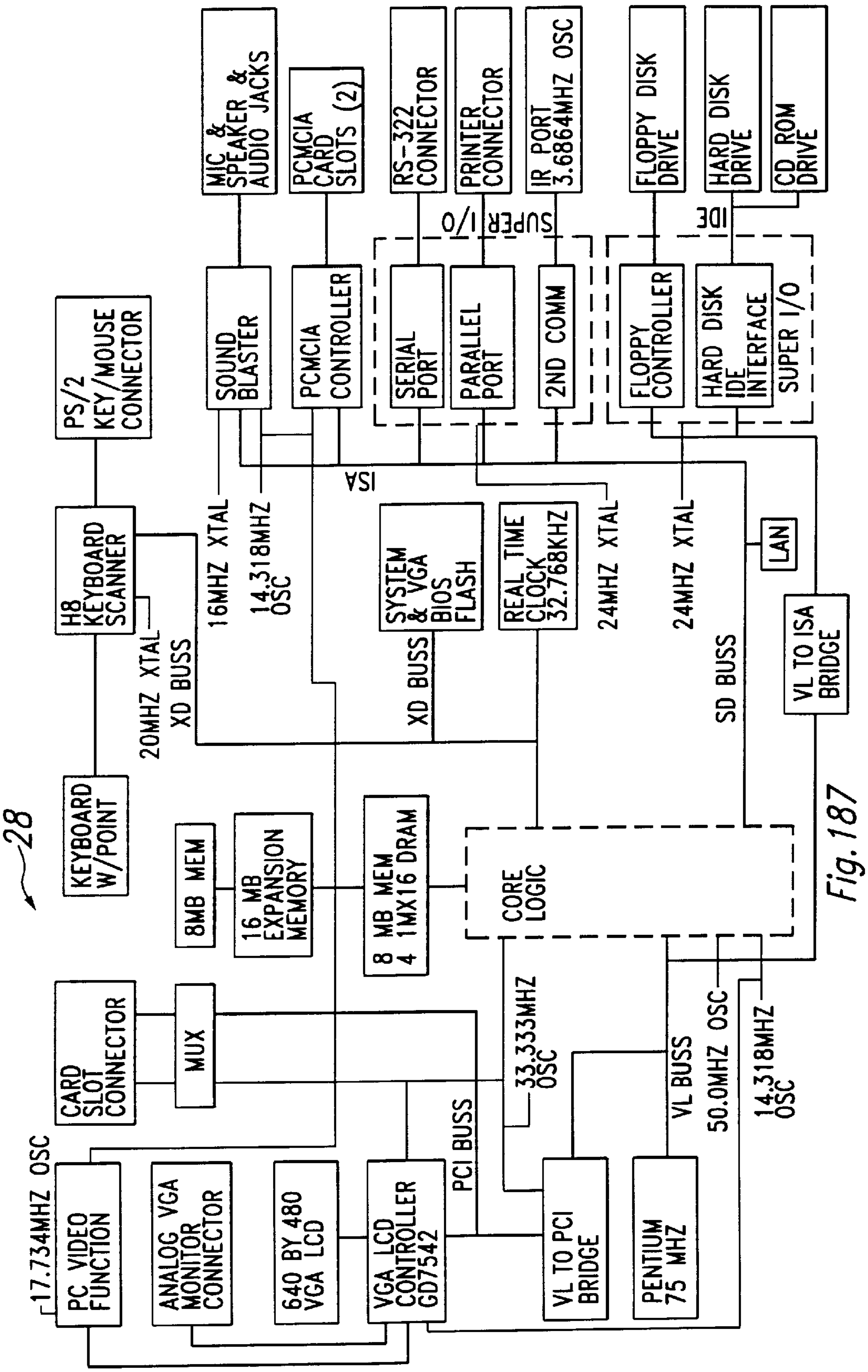
Figure 188:
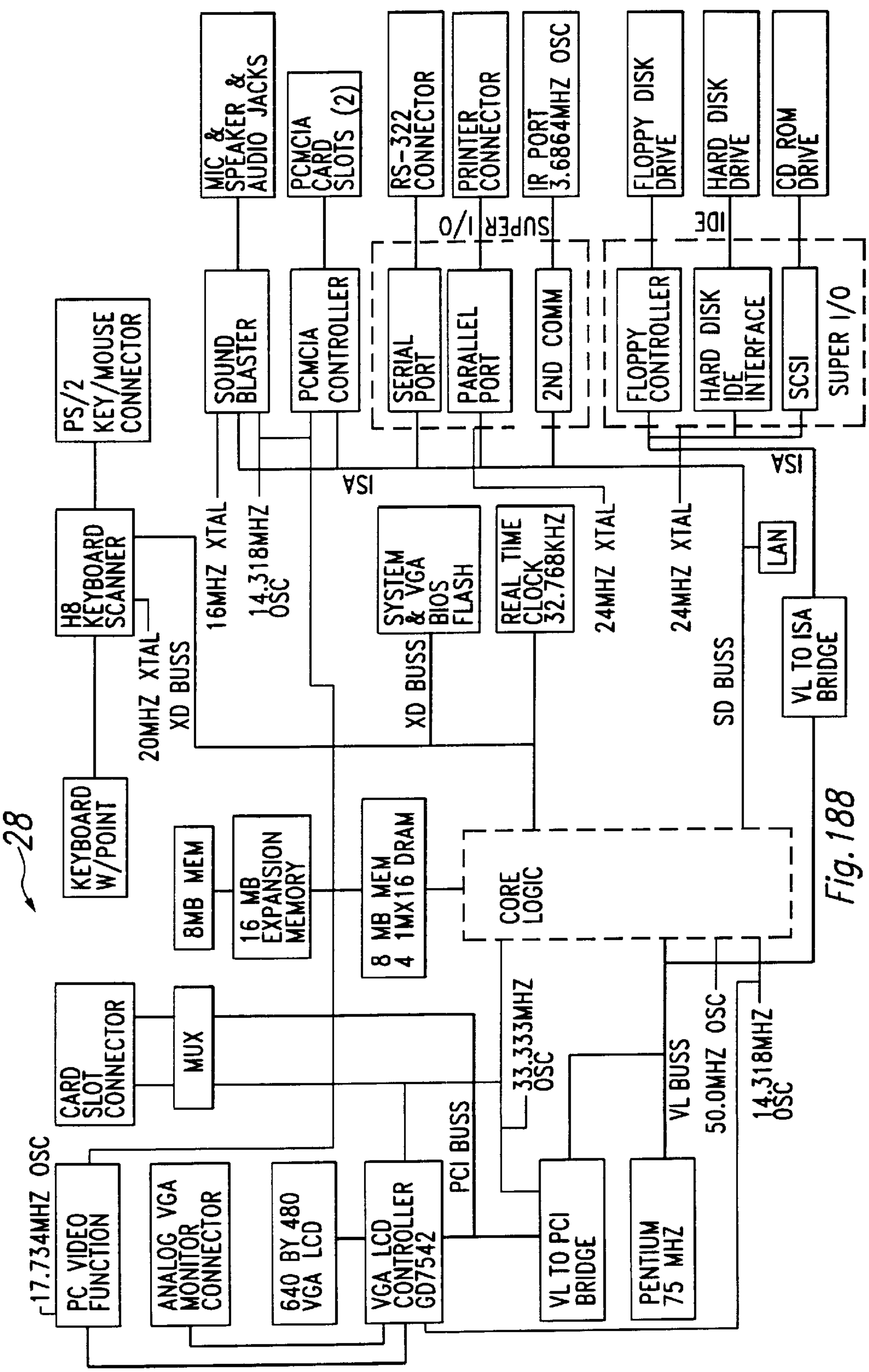
Figure 189:
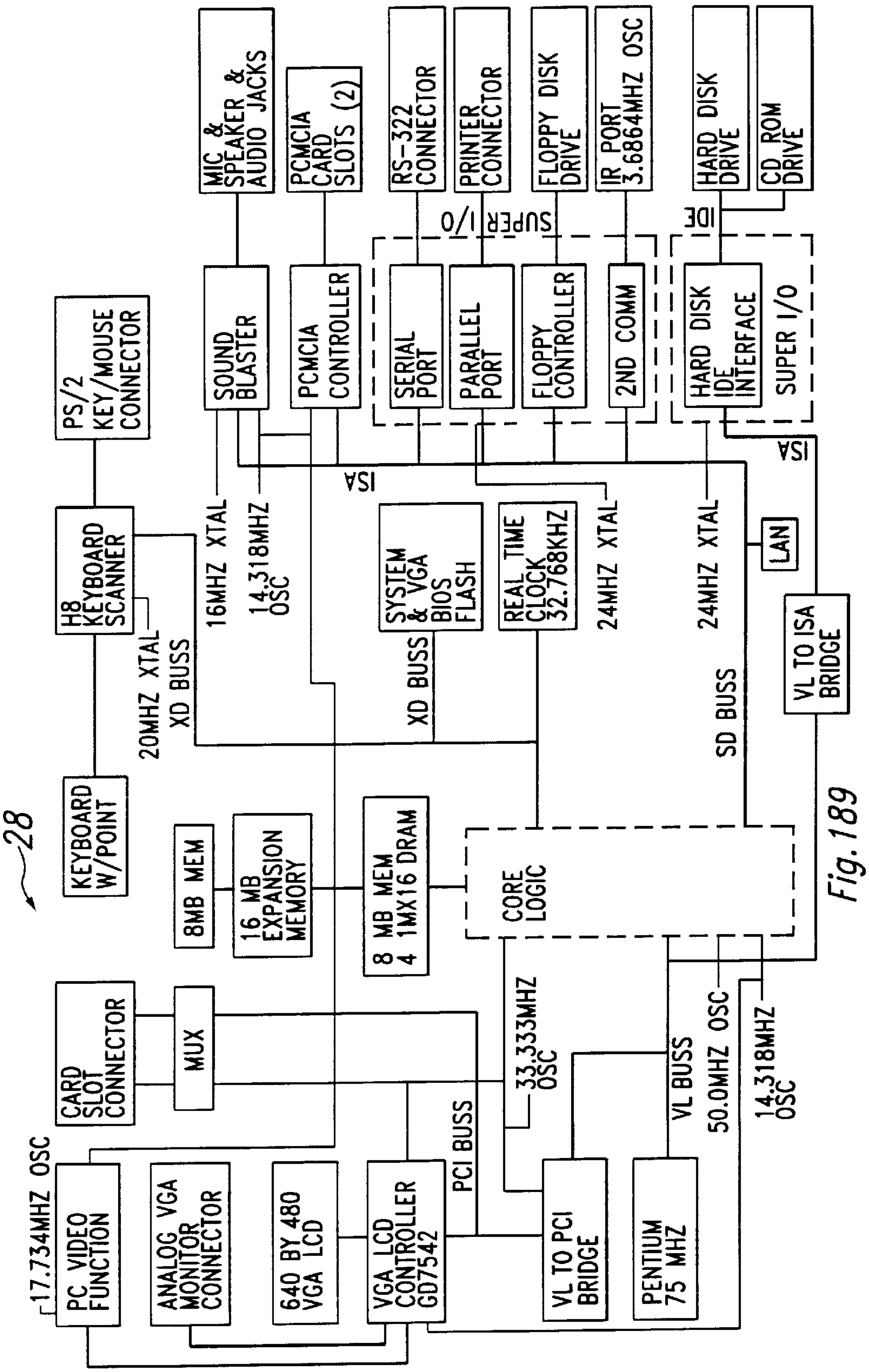
Figure 190:
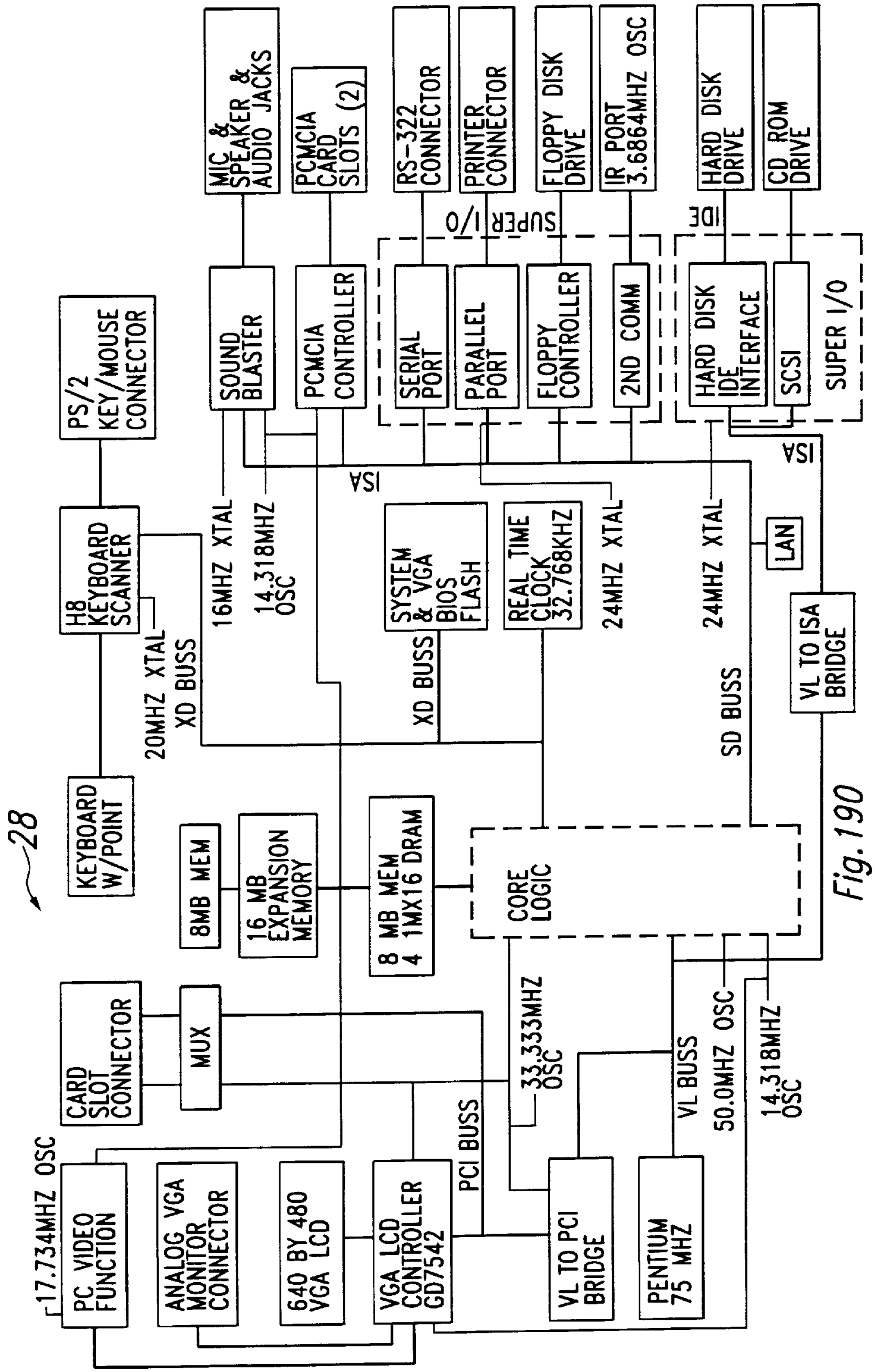
Figure 191:
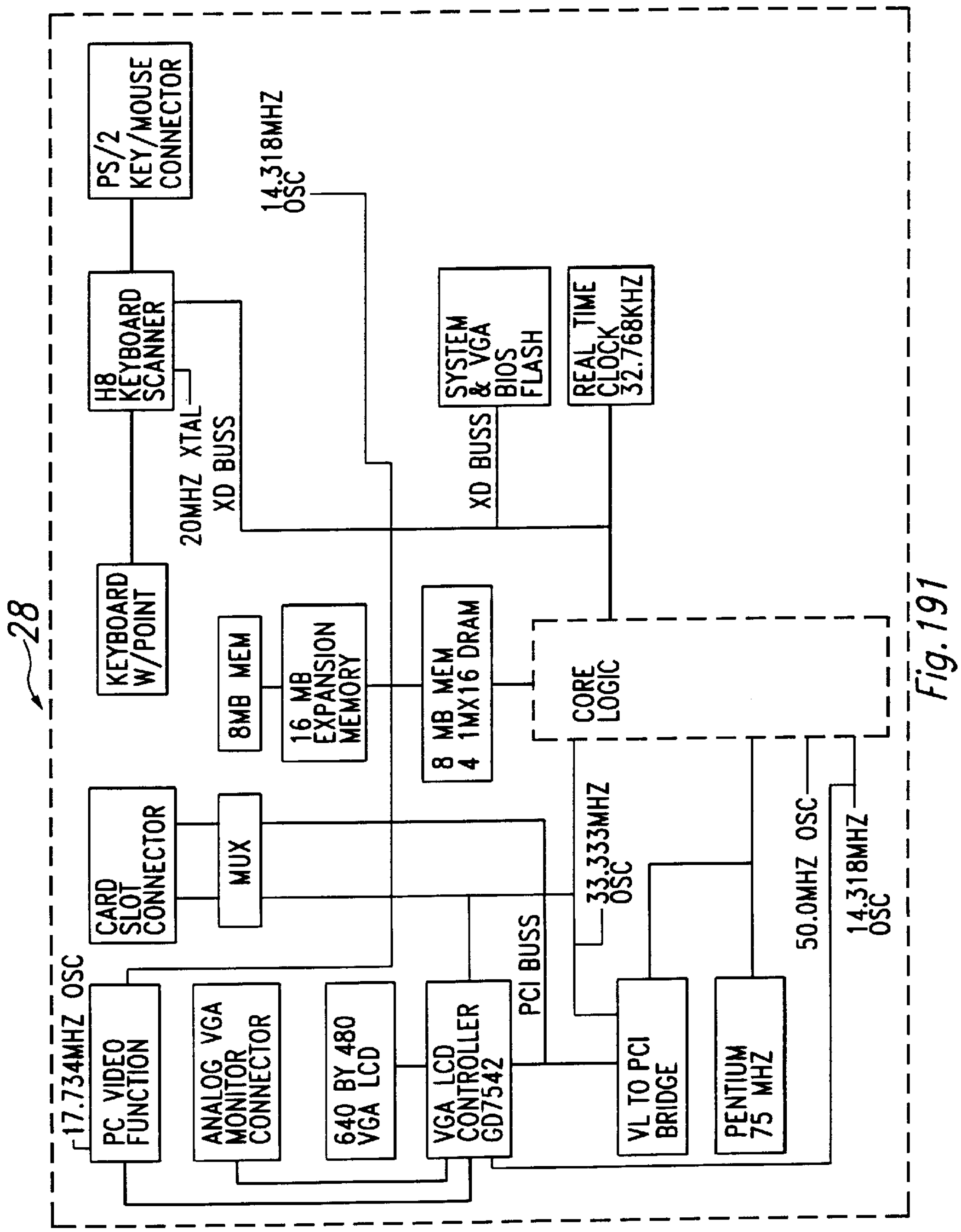
Figure 192:
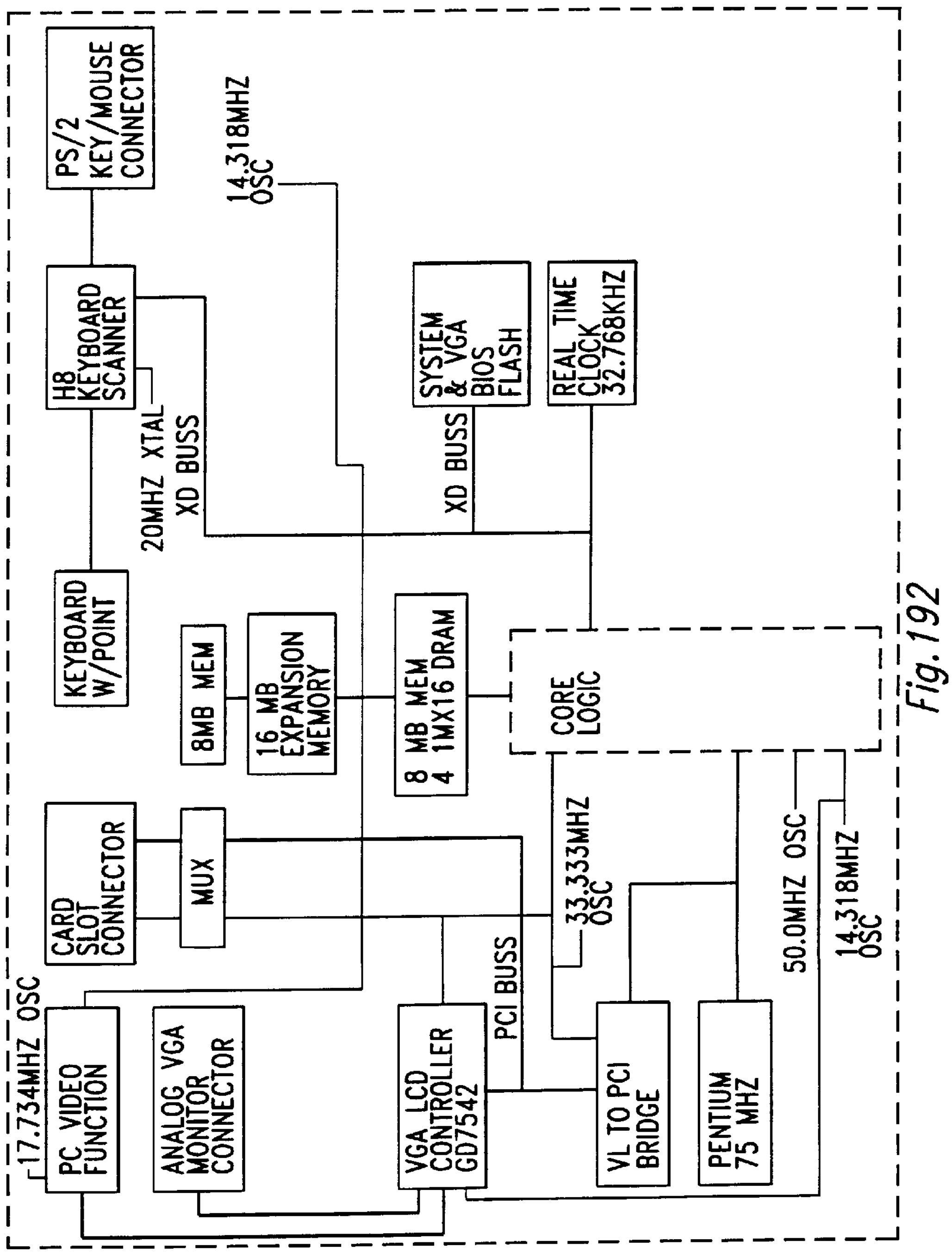
Figure 193:
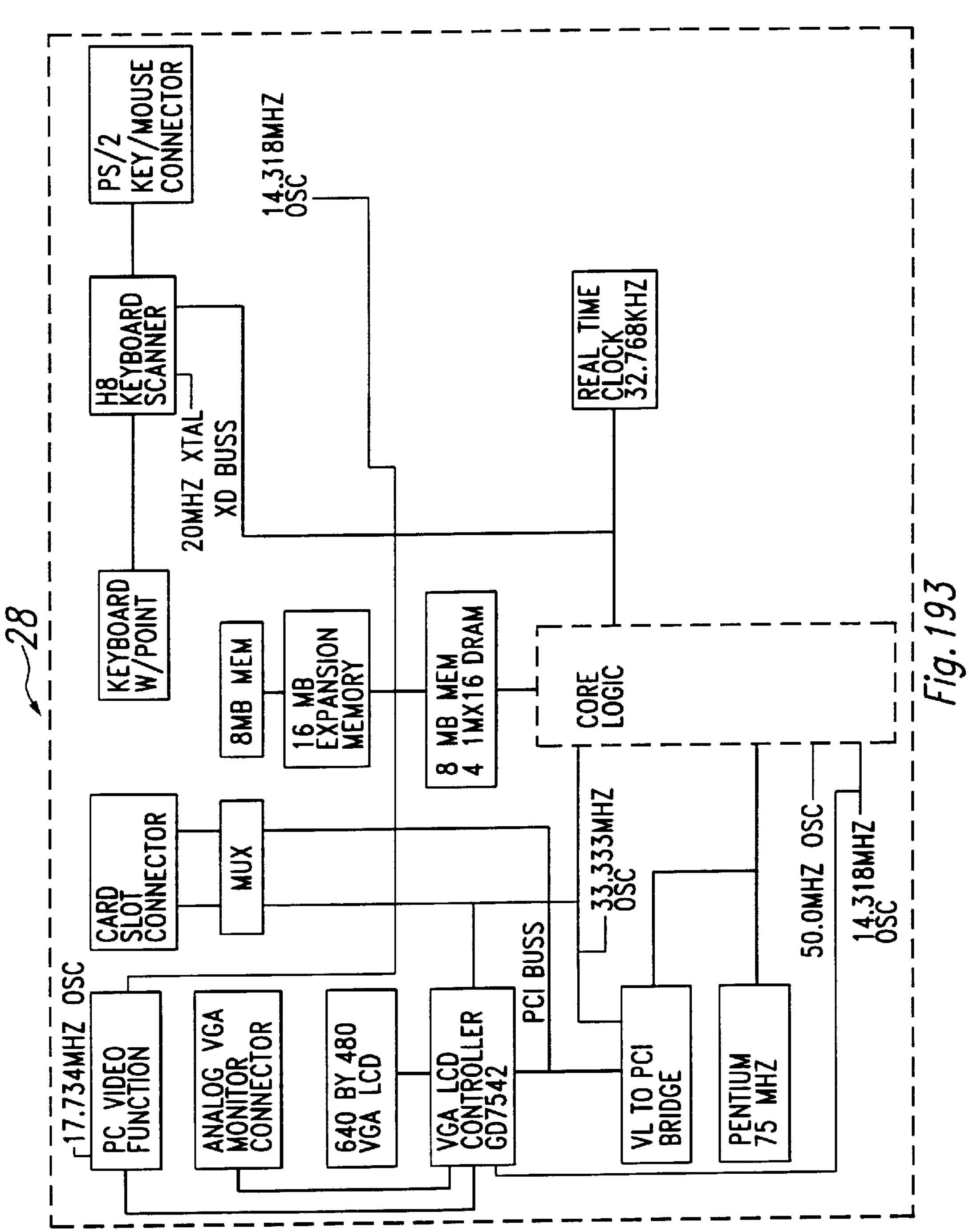
Figure 194:
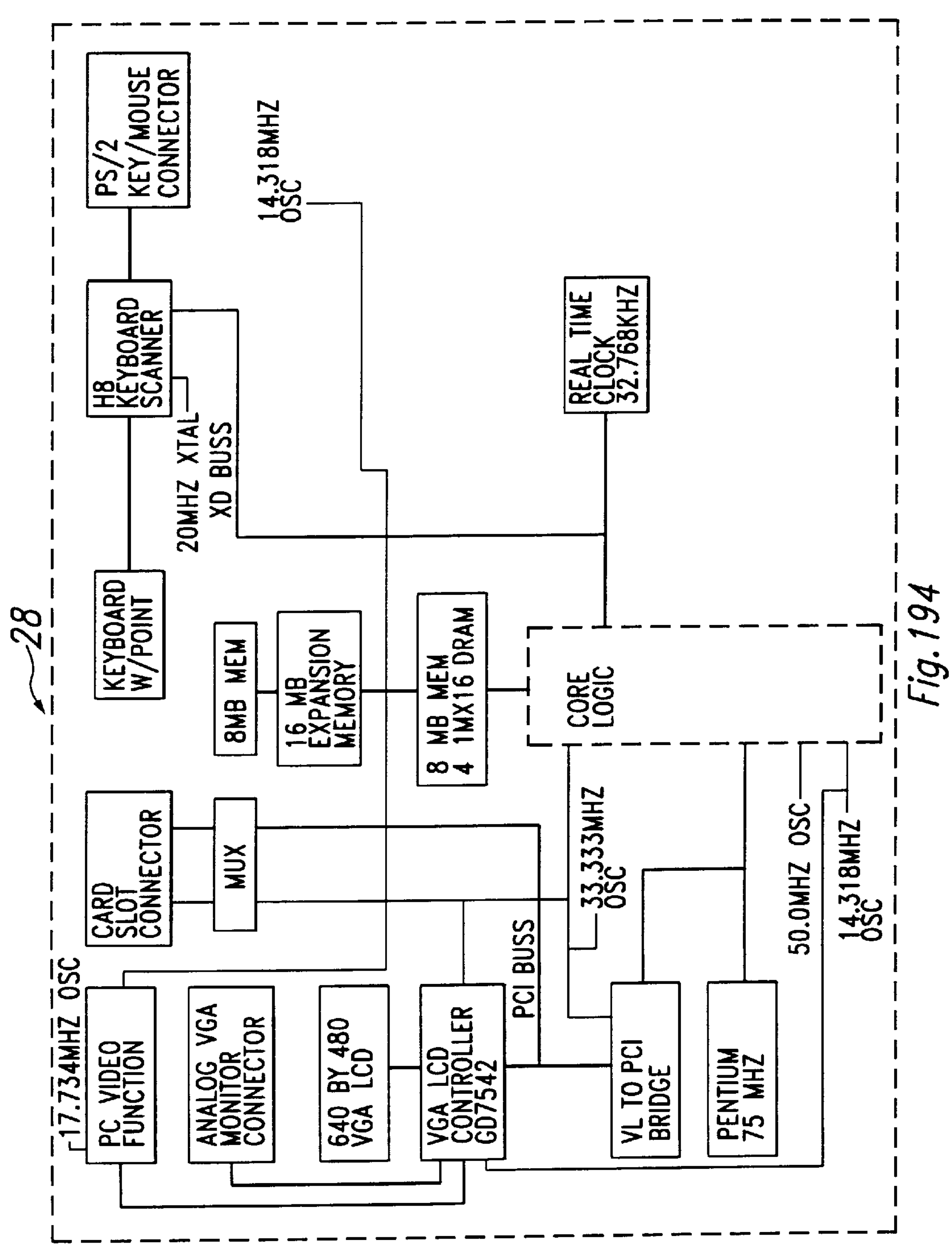
Figure 195:
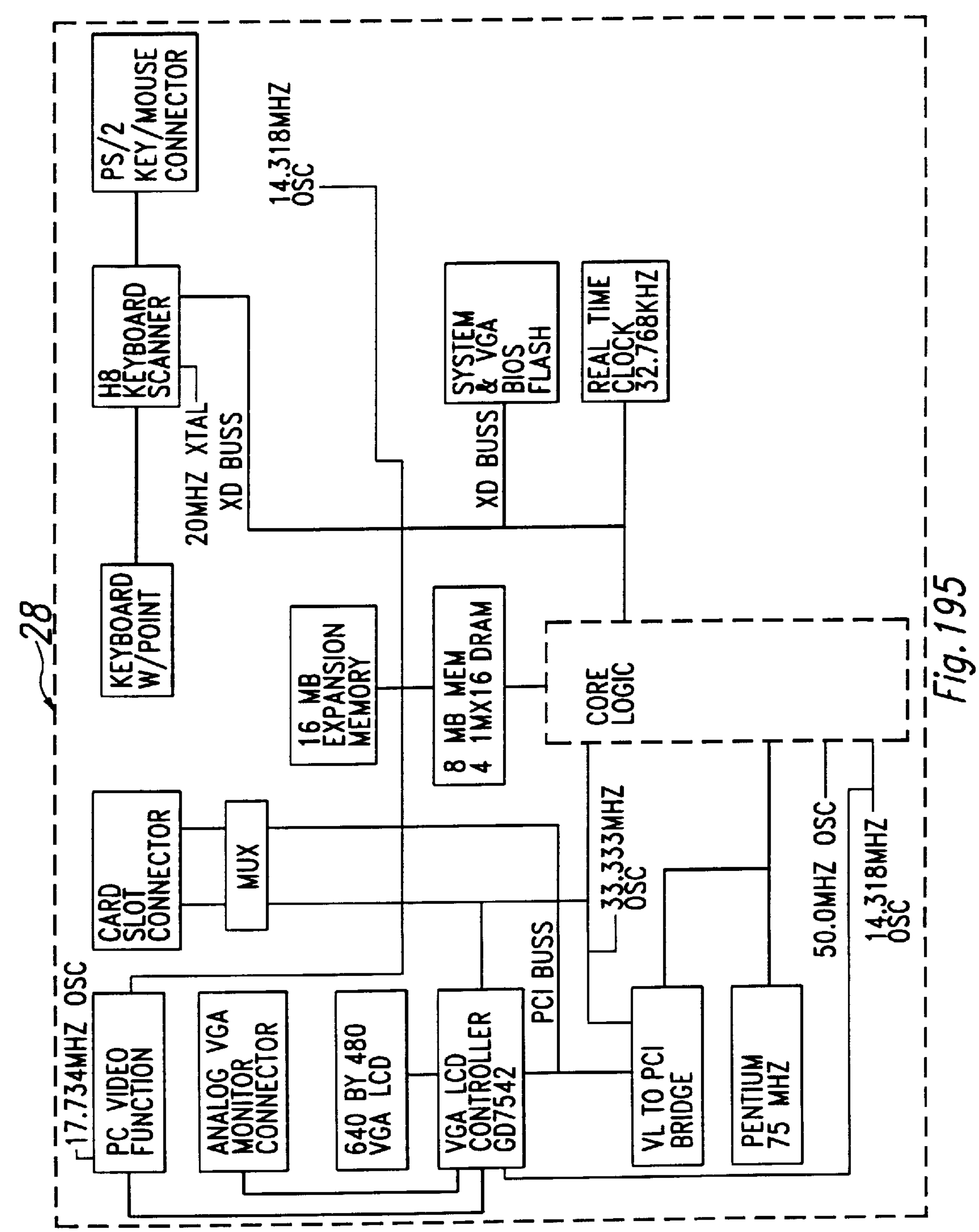
Figure 196:
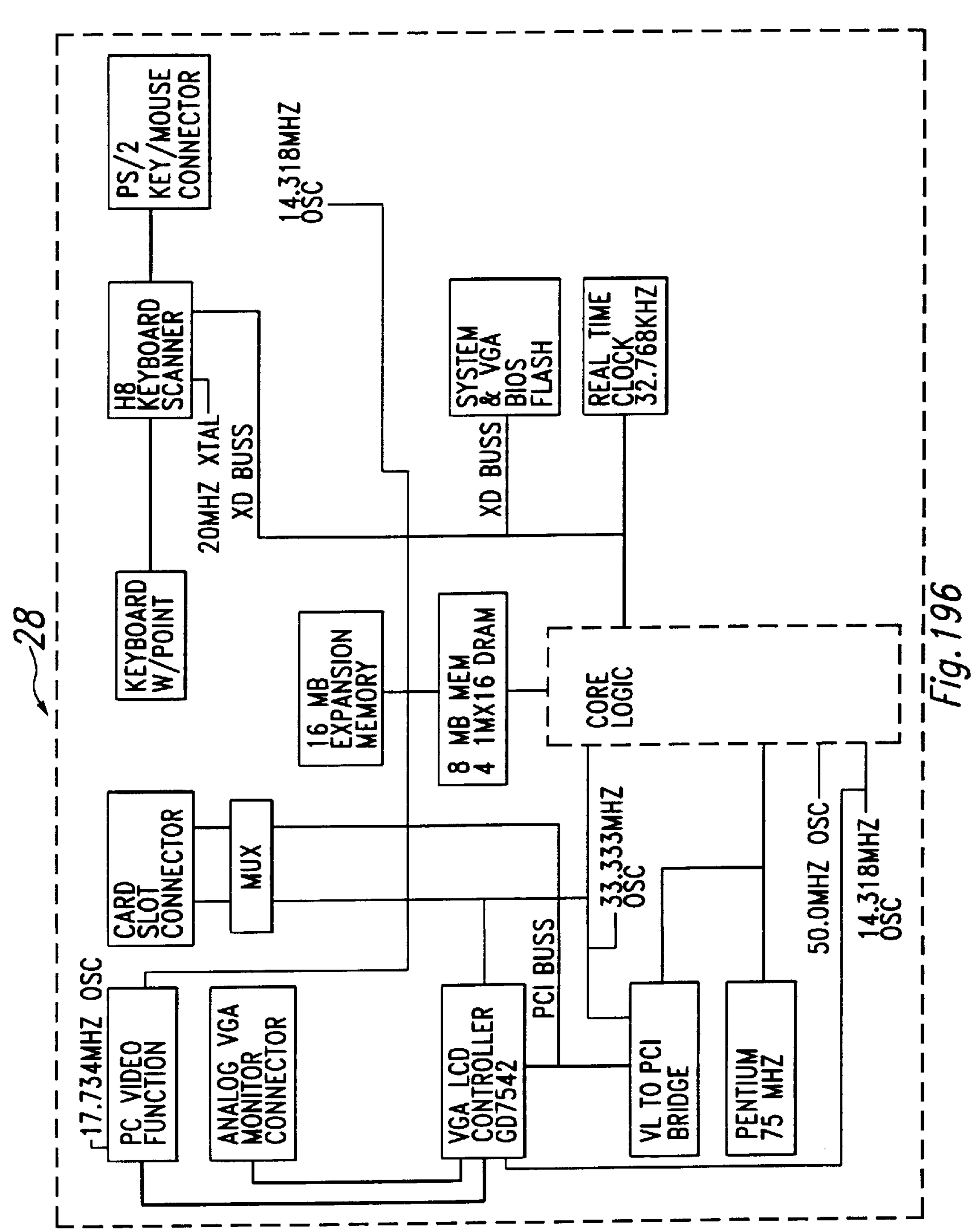
Figure 197:
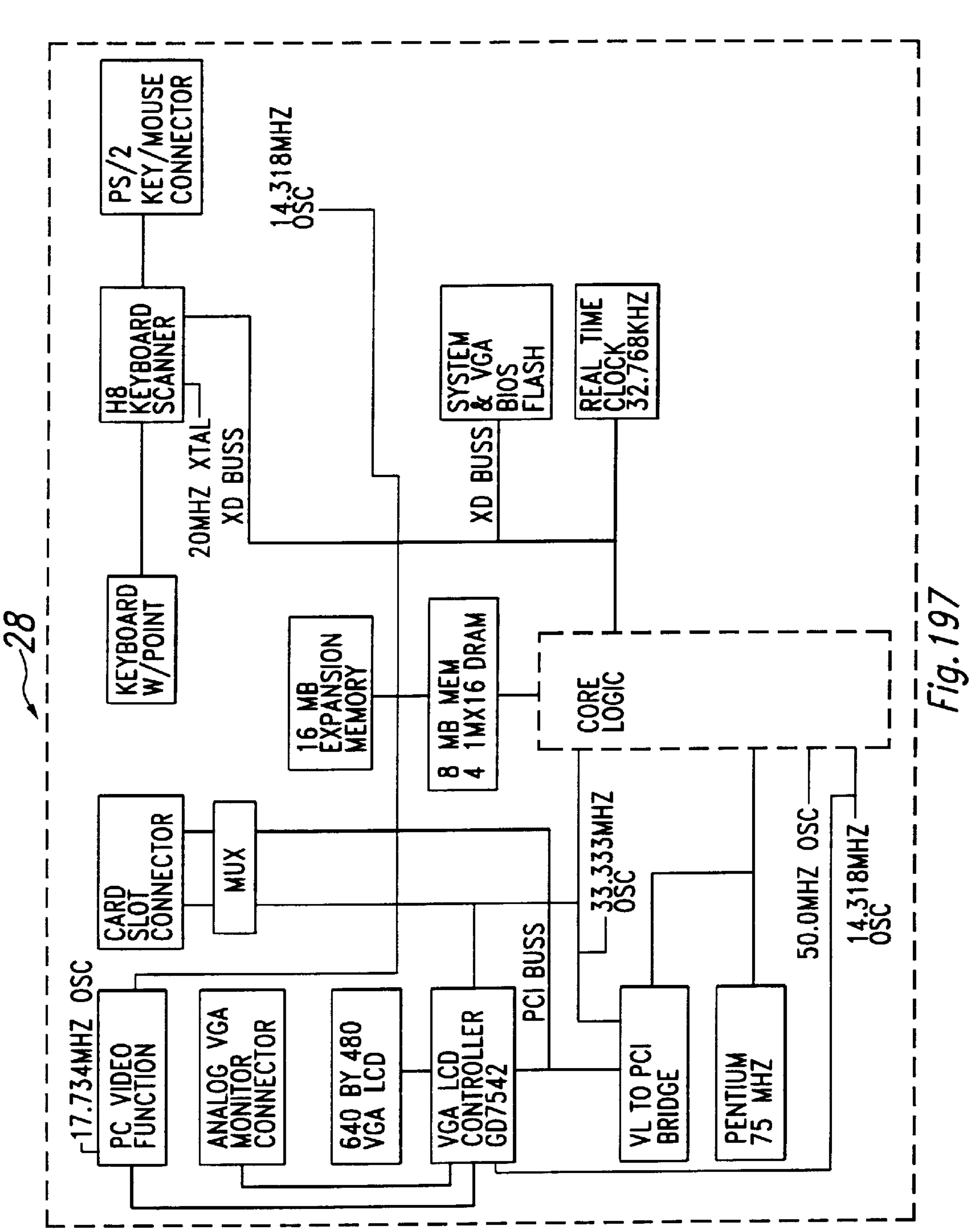
Figure 198:
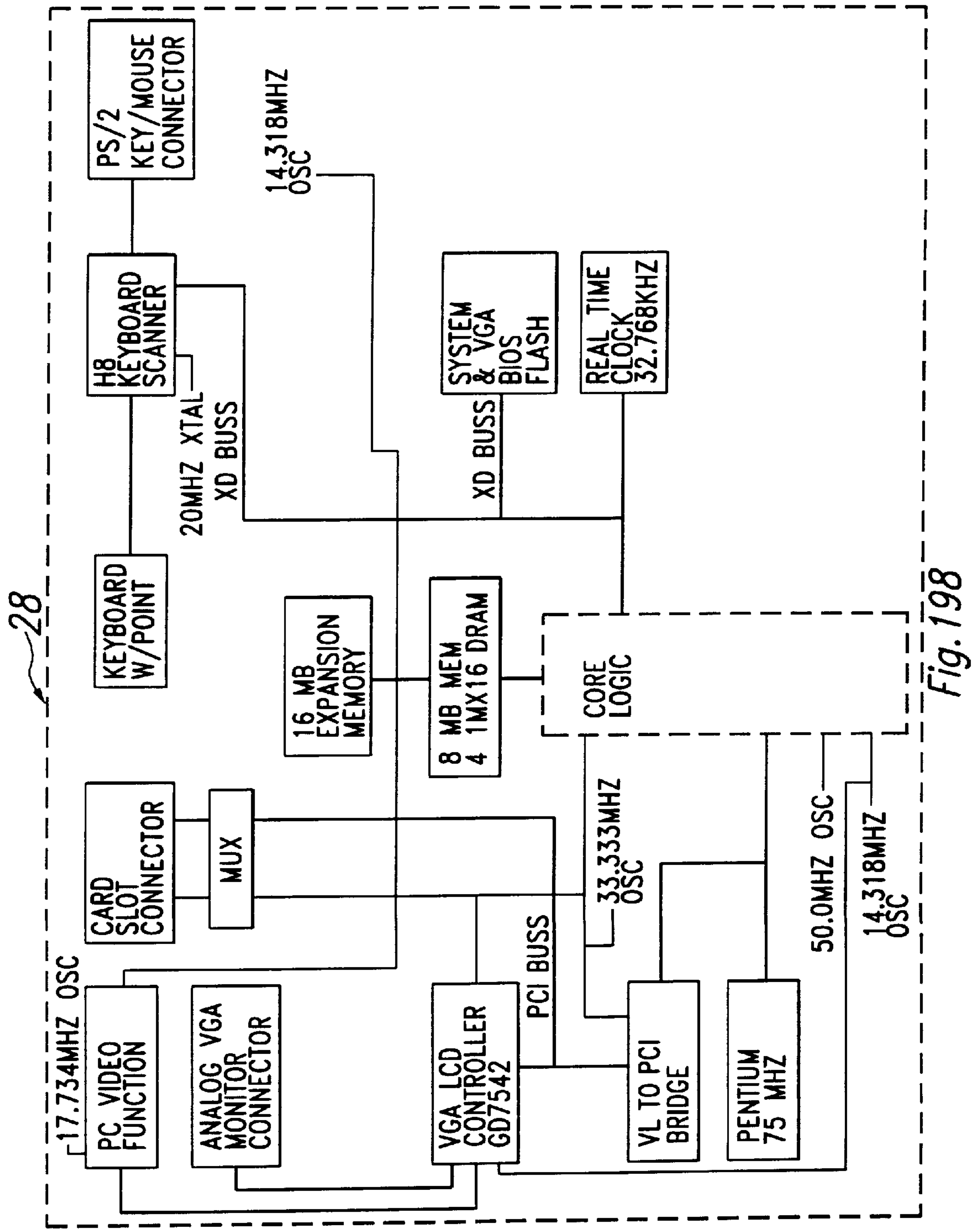
Figure 199:
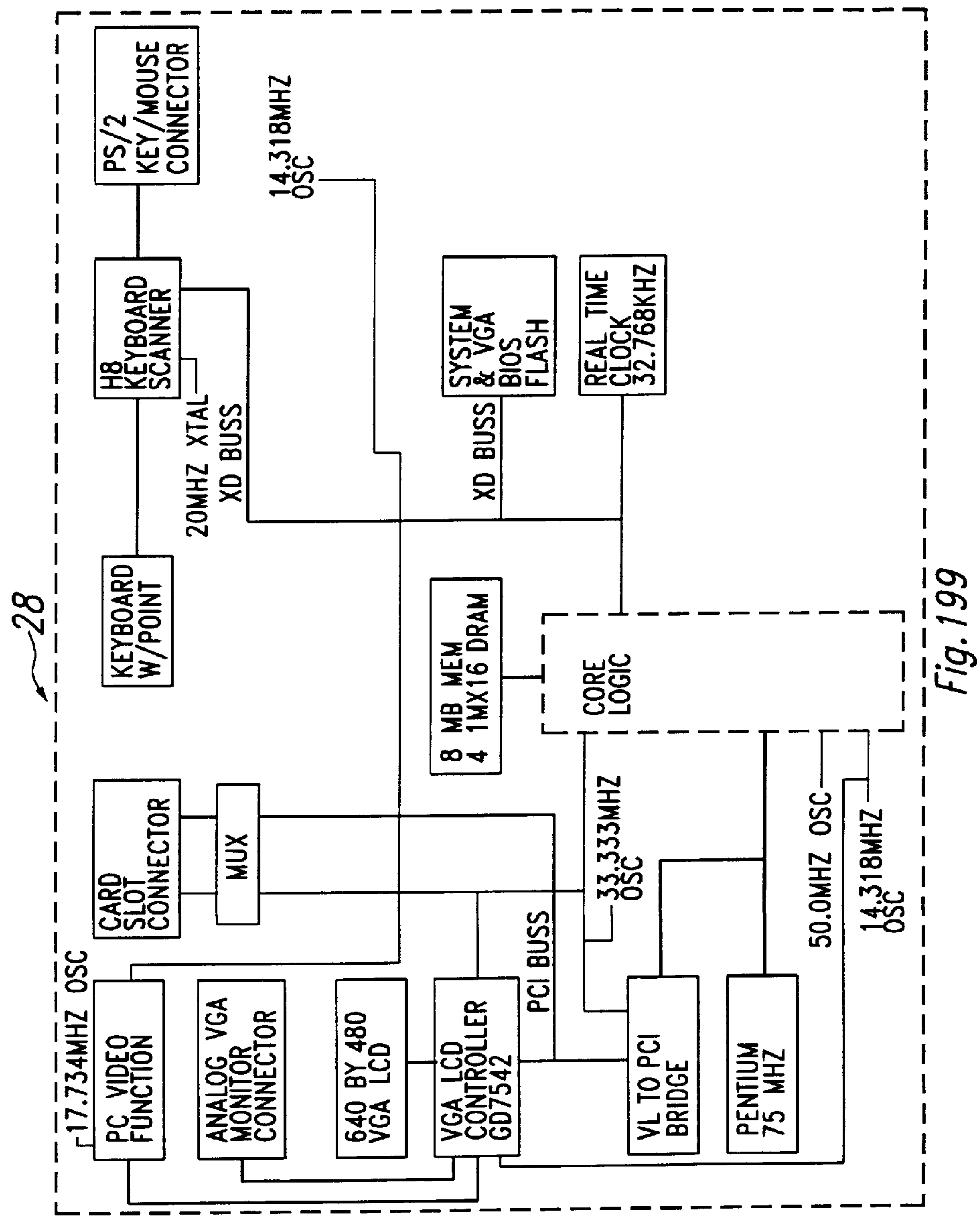
Figure 200:
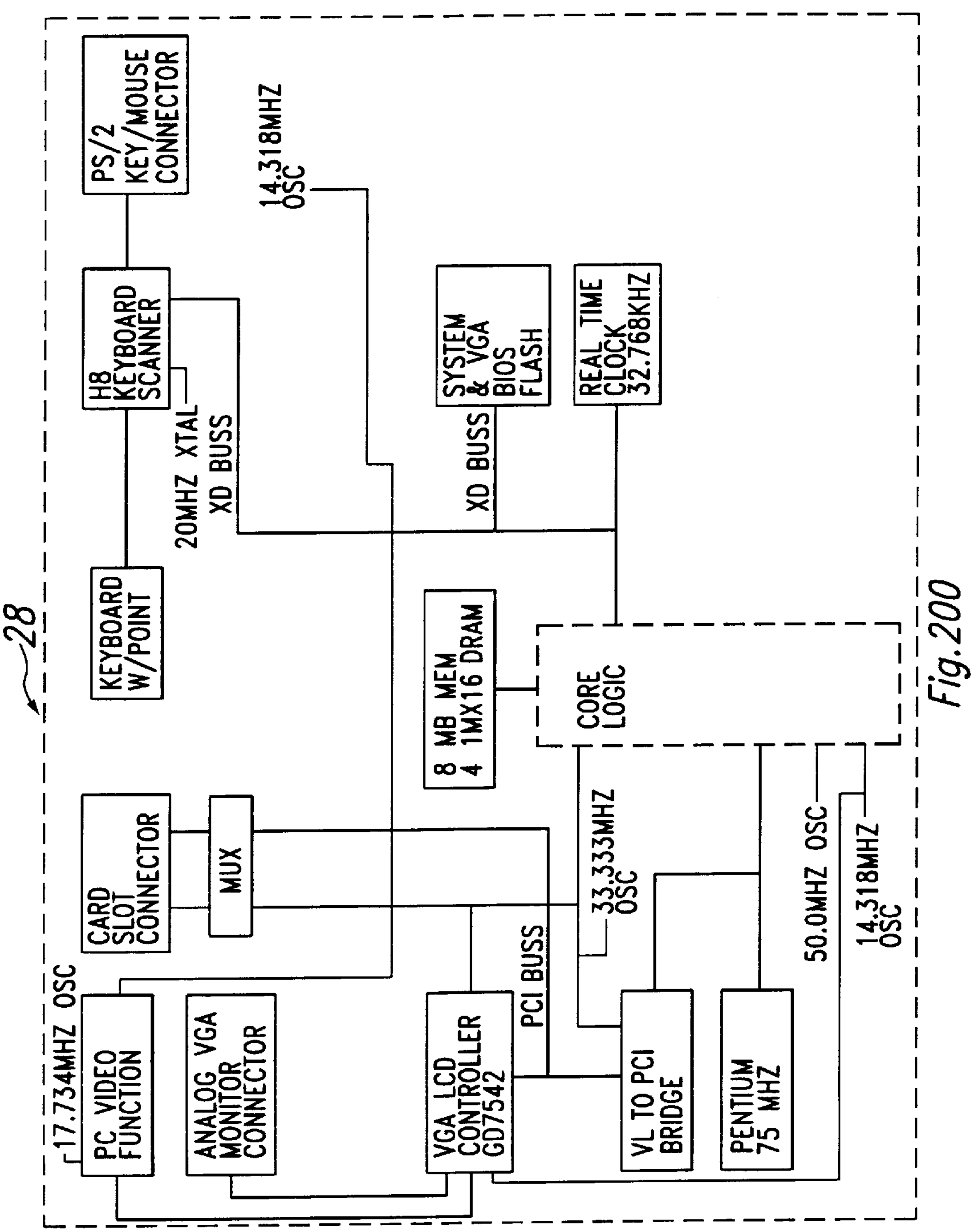
Figure 201:
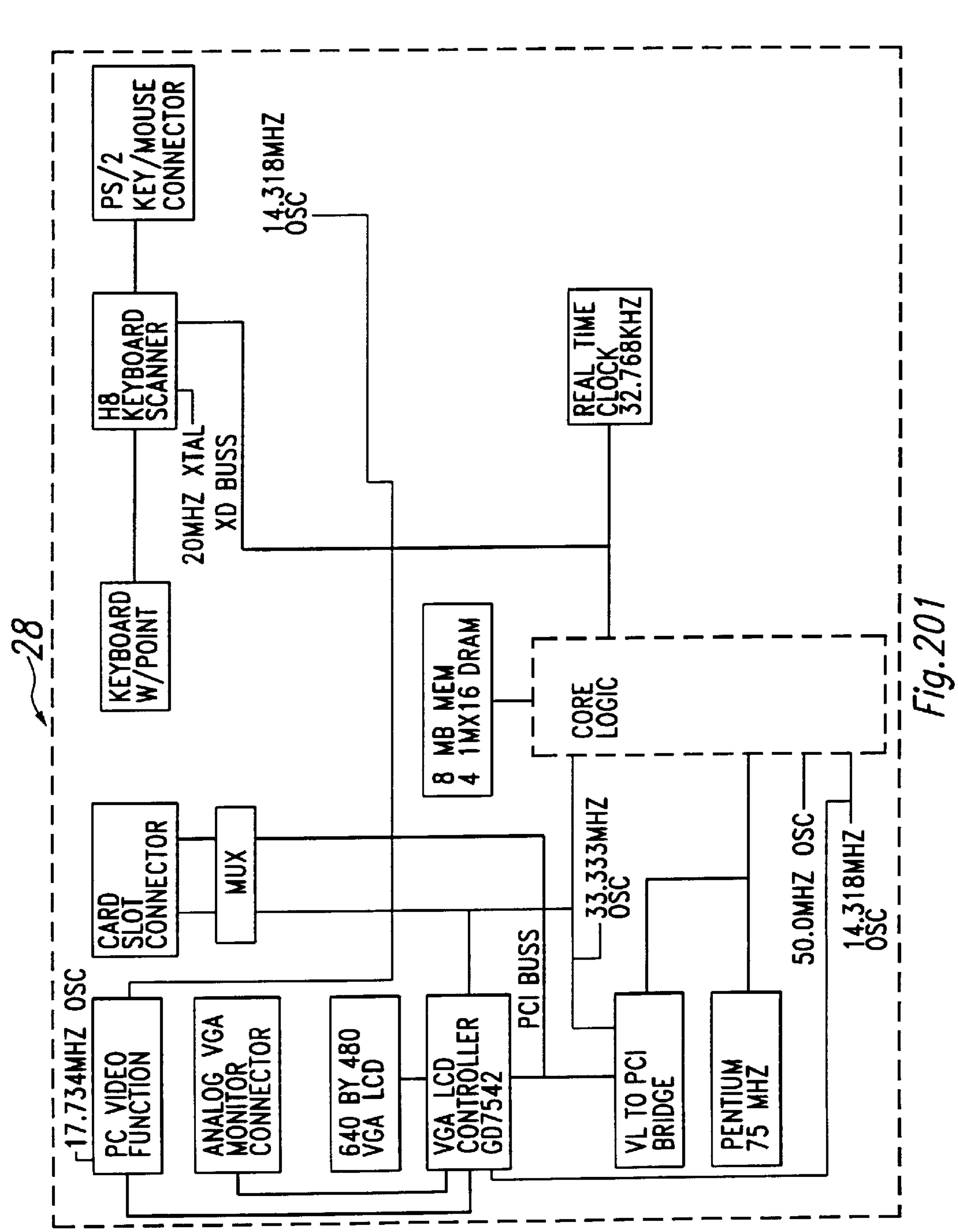
Figure 202:
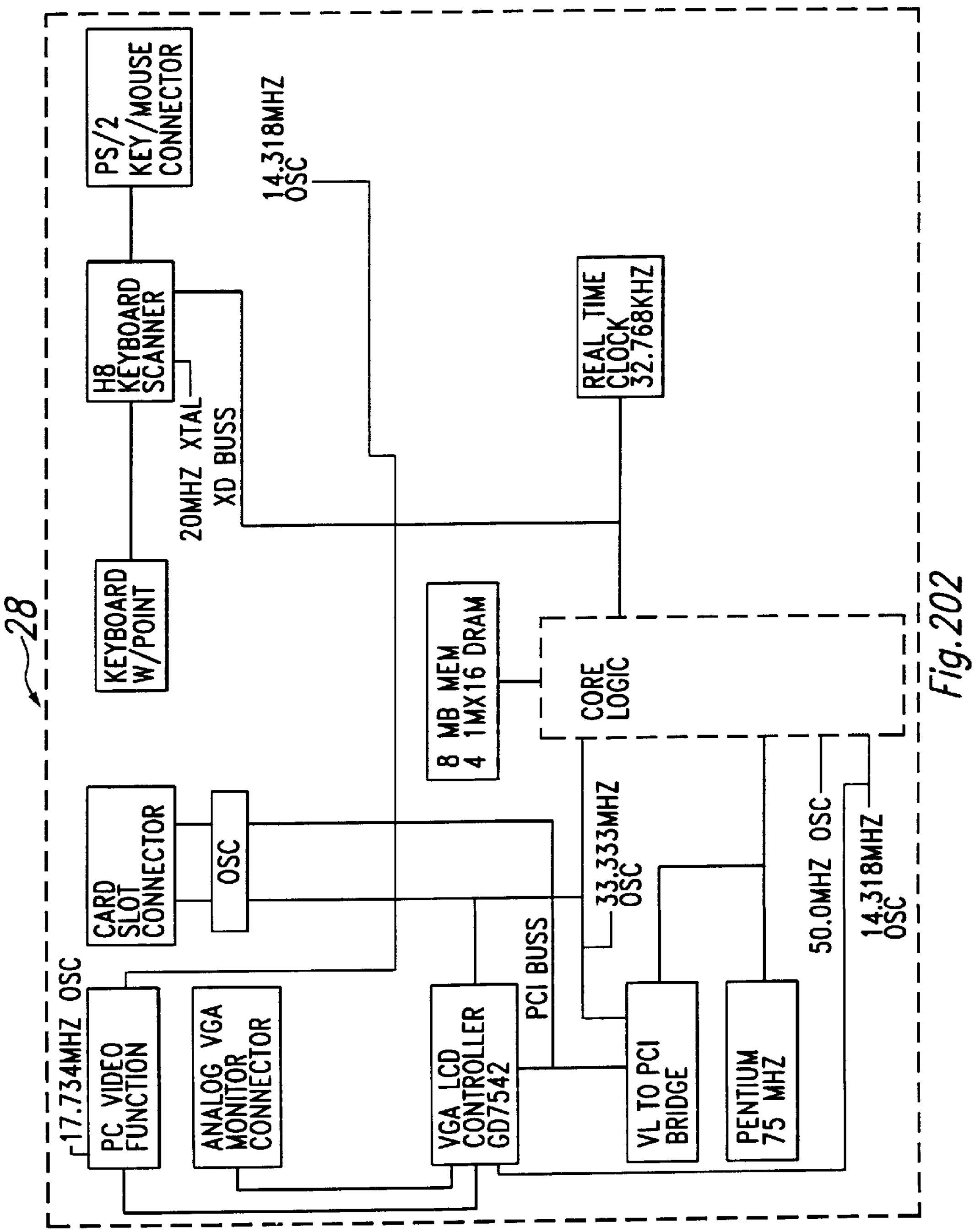
Figure 203:
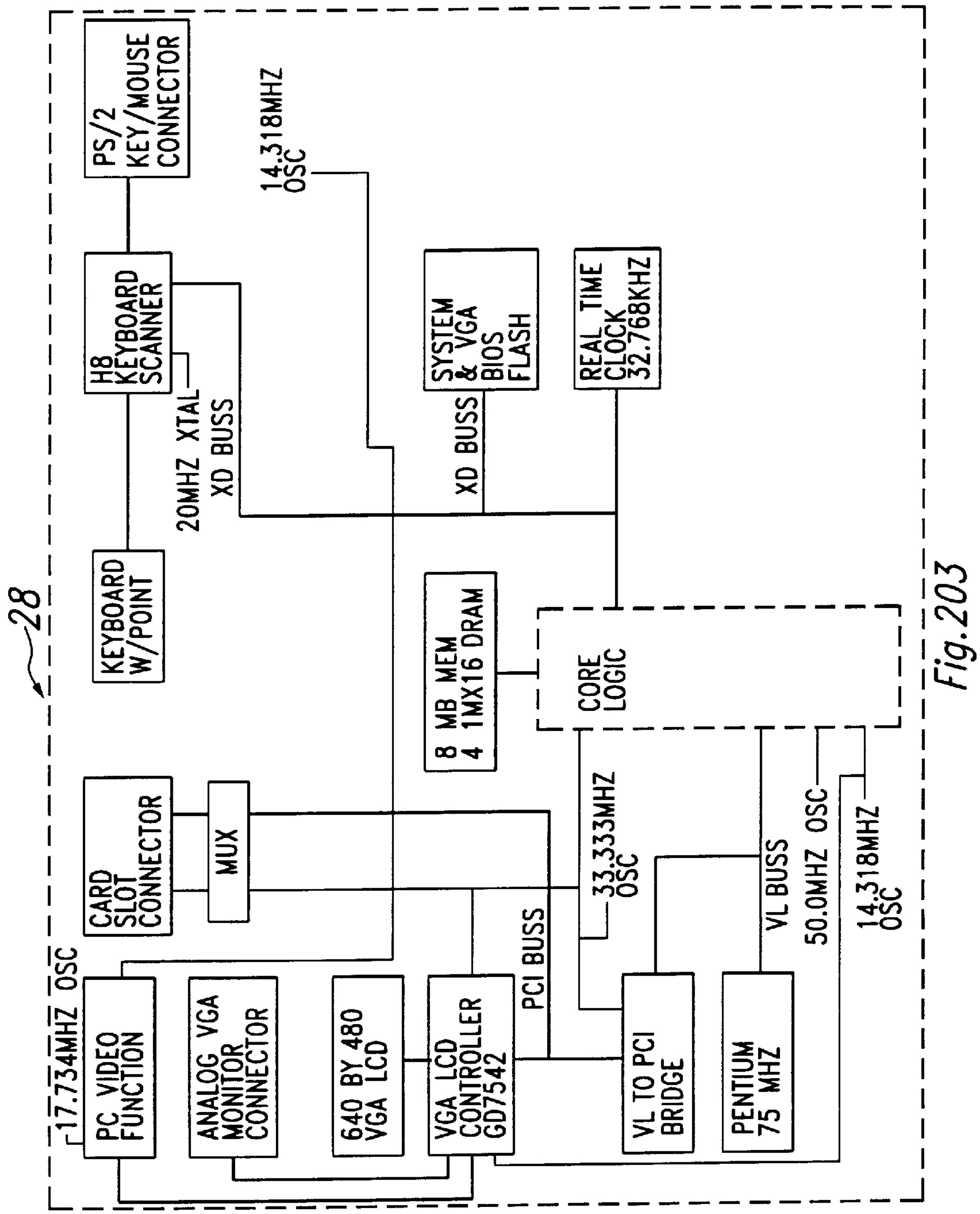
Figure 204:
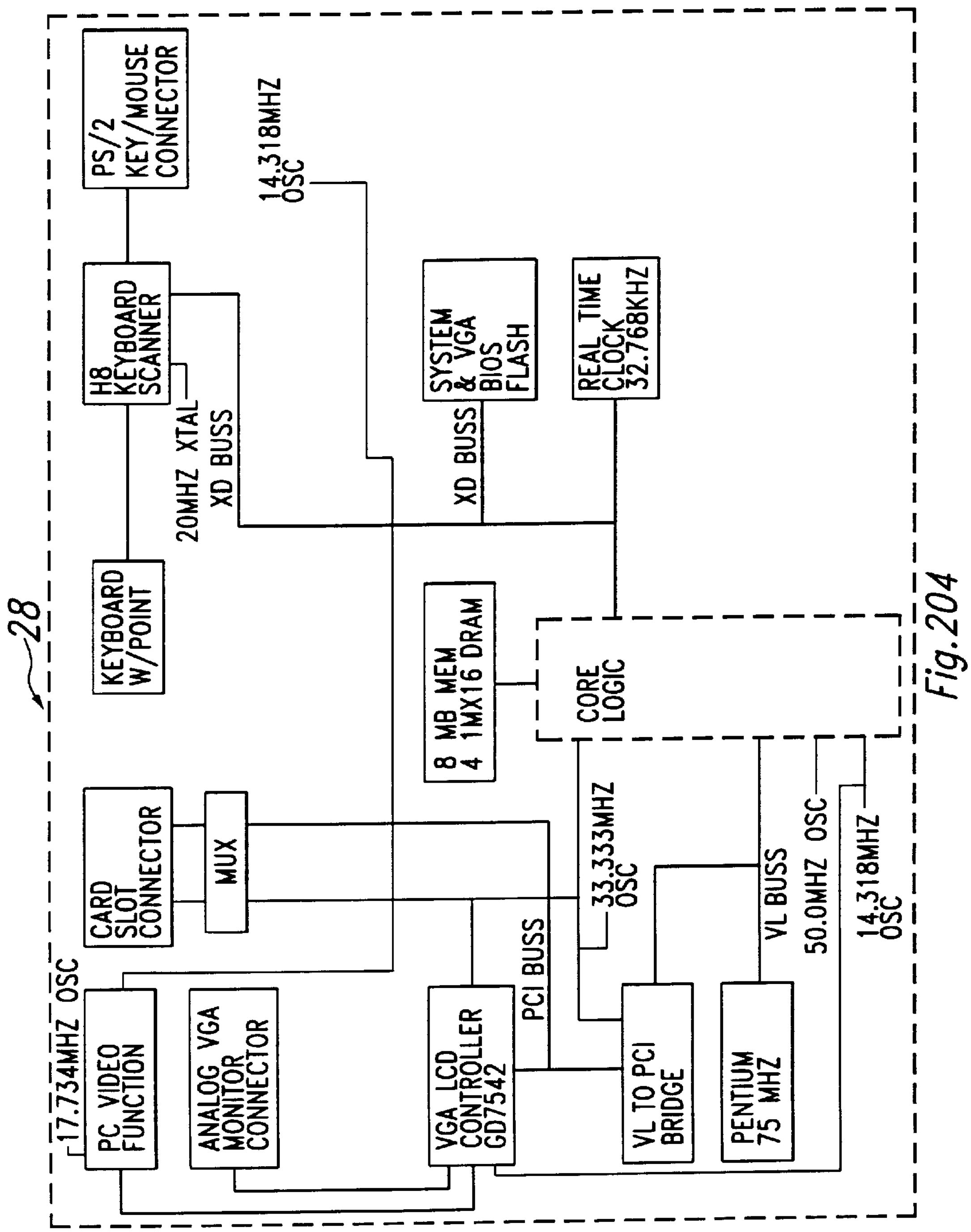
Figure 205:
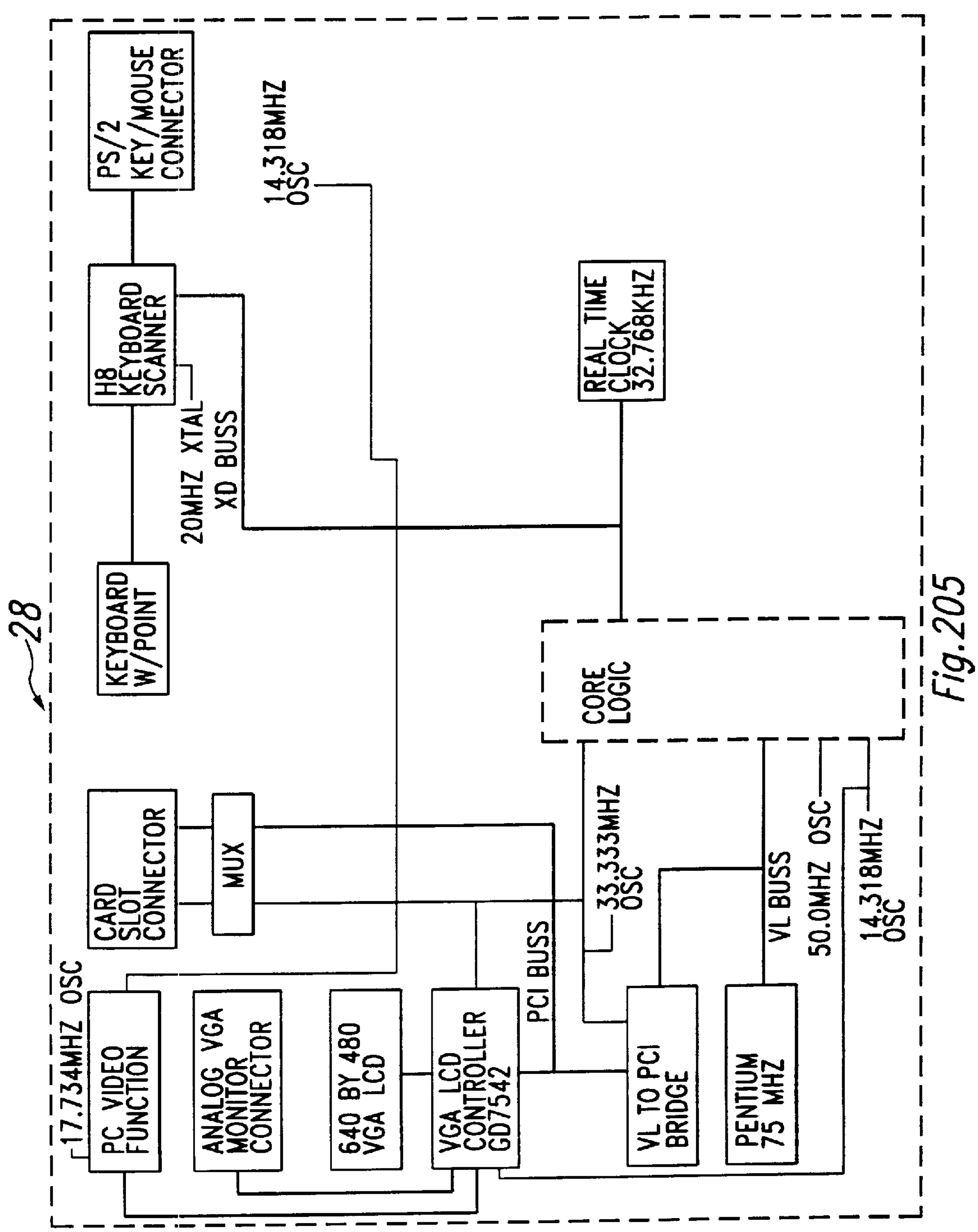
Figure 206:
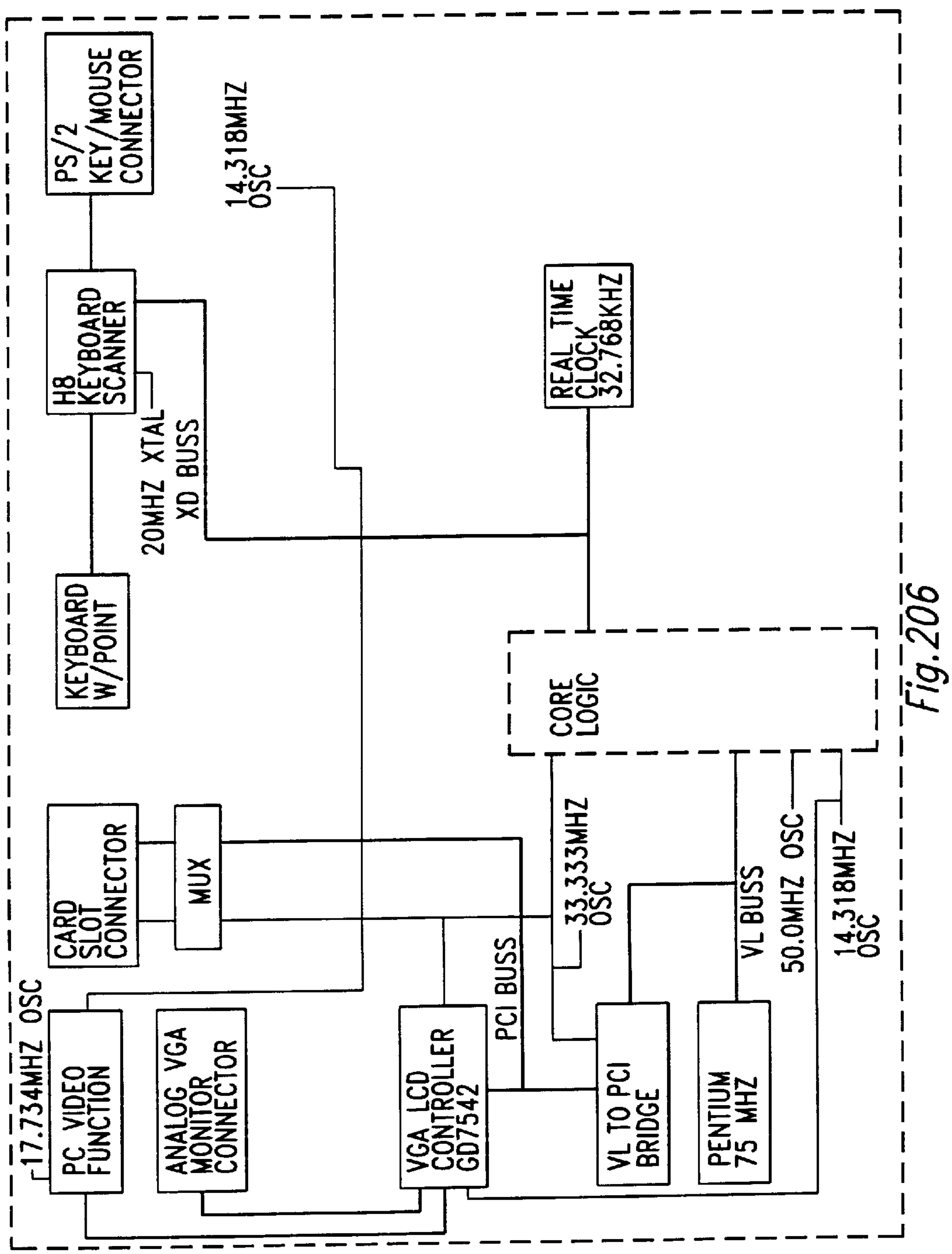
Figure 207:
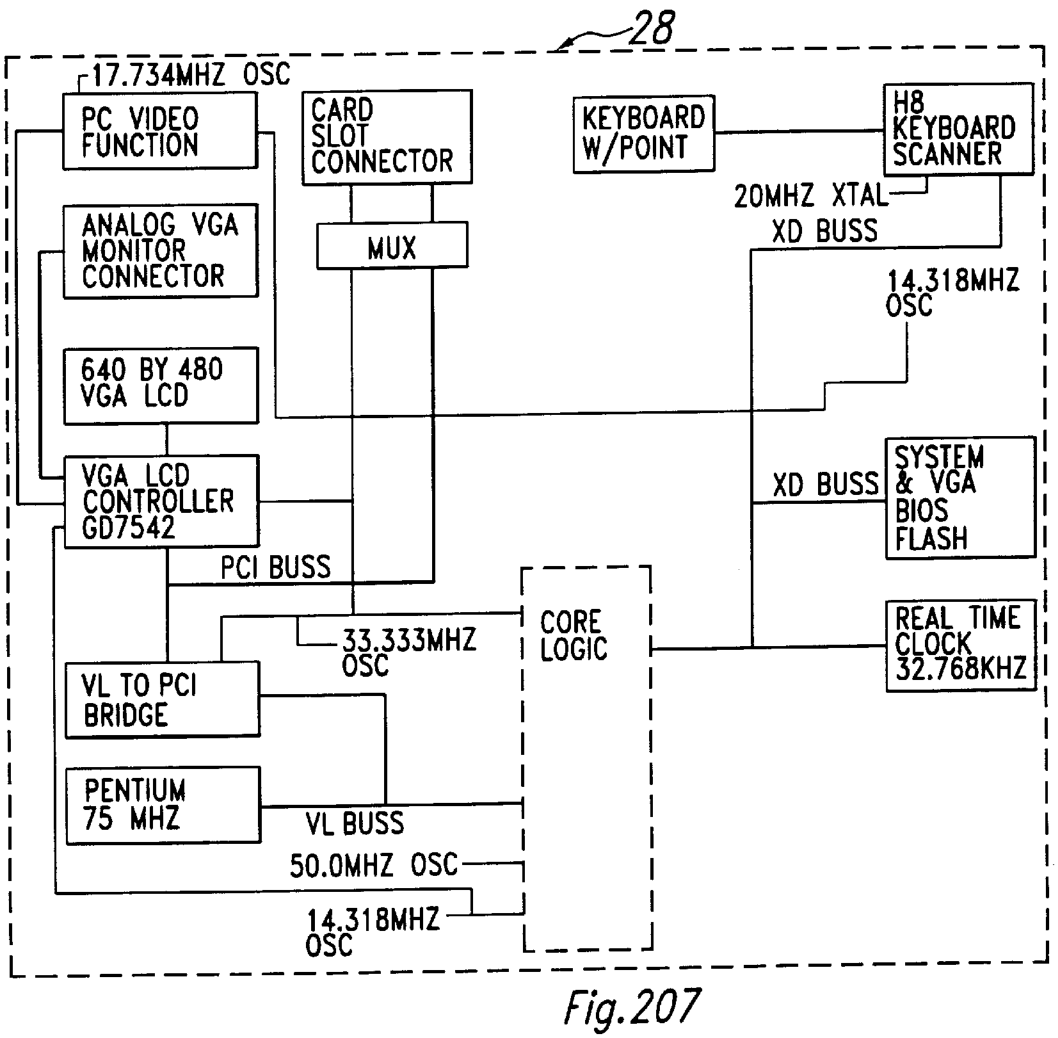
Figure 208:
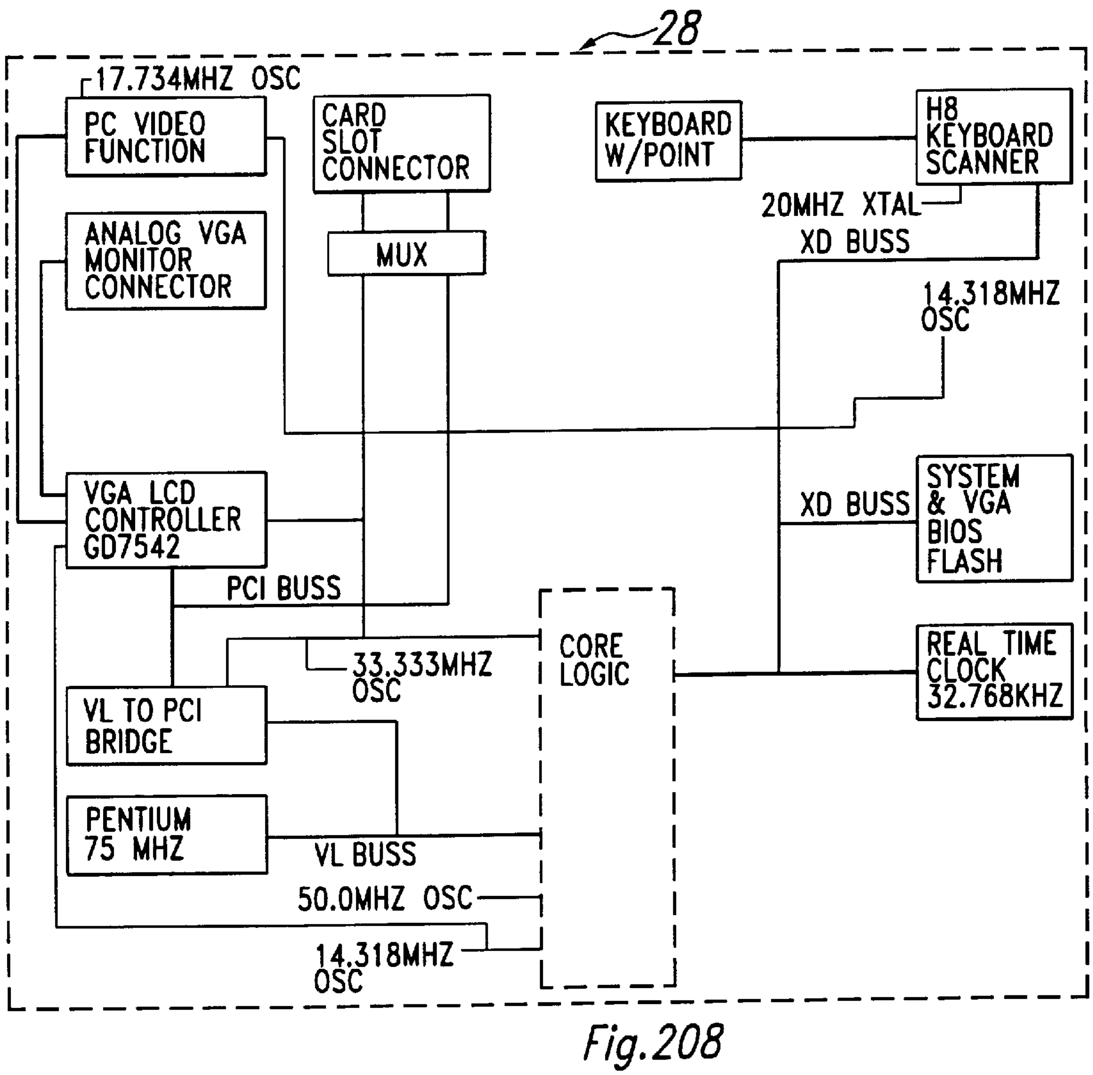
Figure 209:
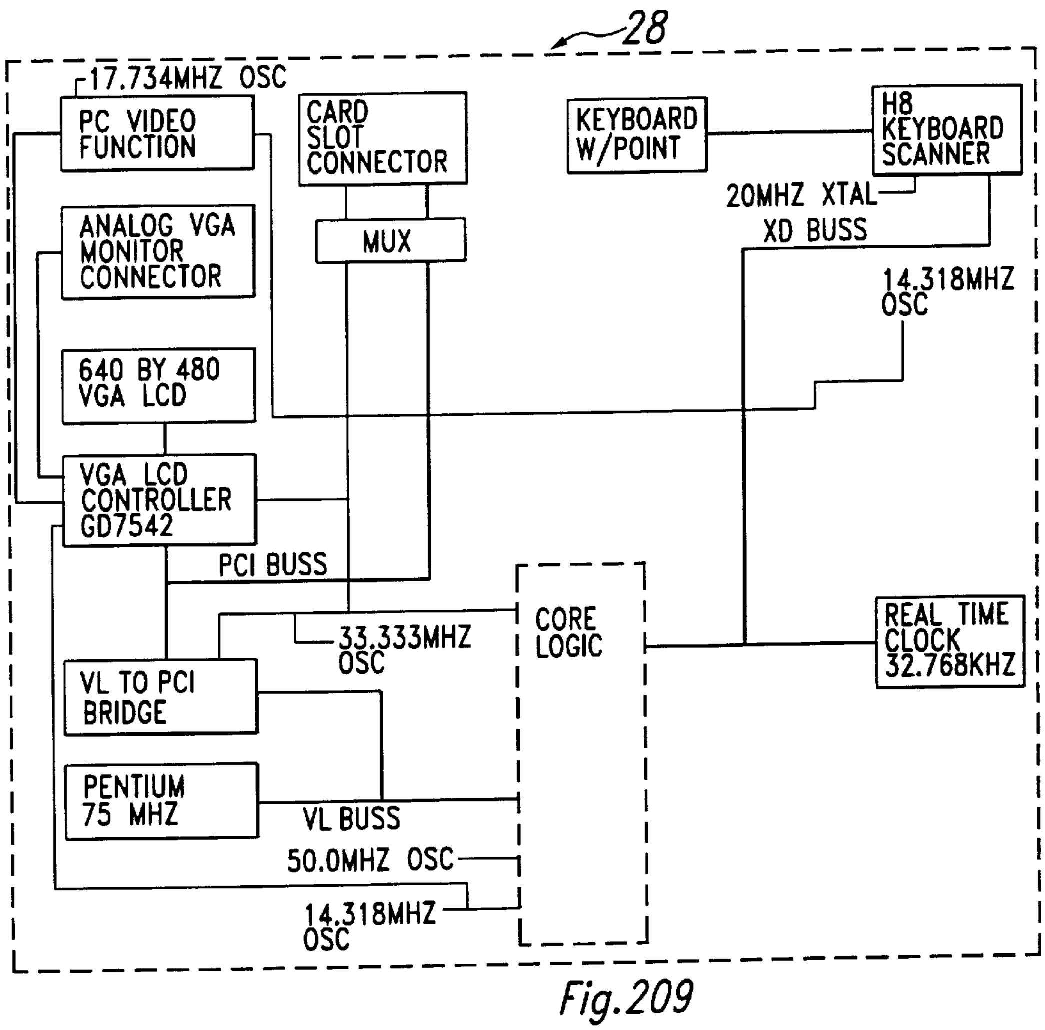
Figure 210:
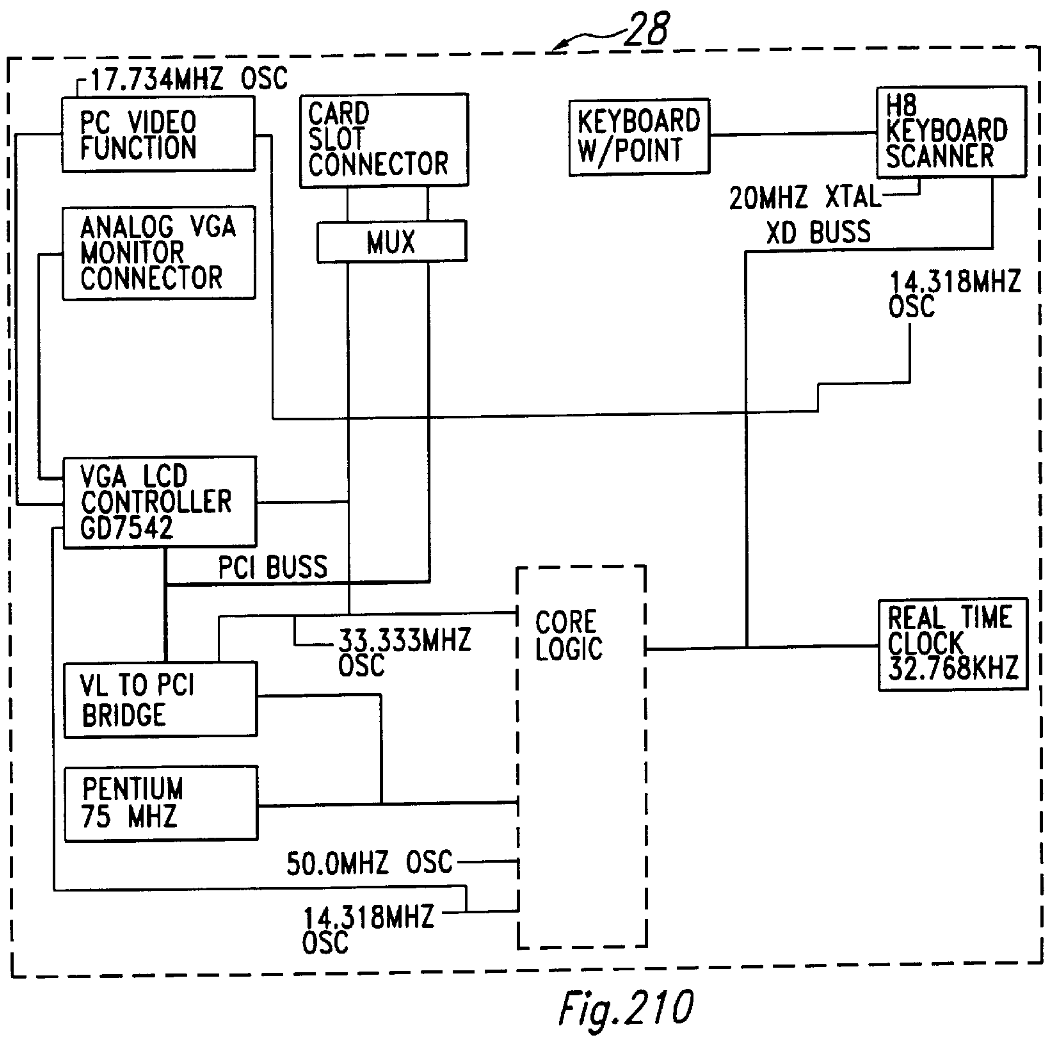
Figure 211:
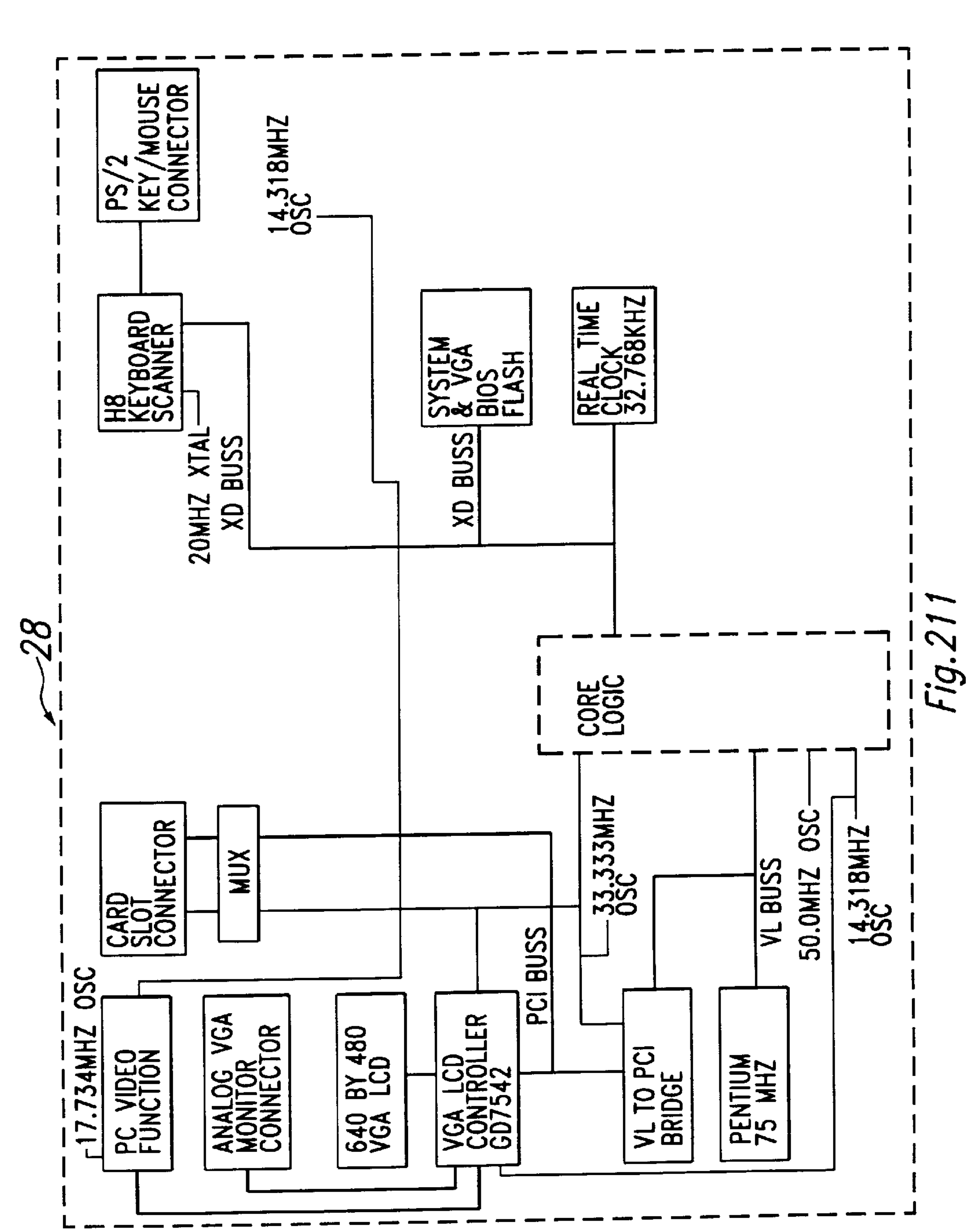
Figure 212:
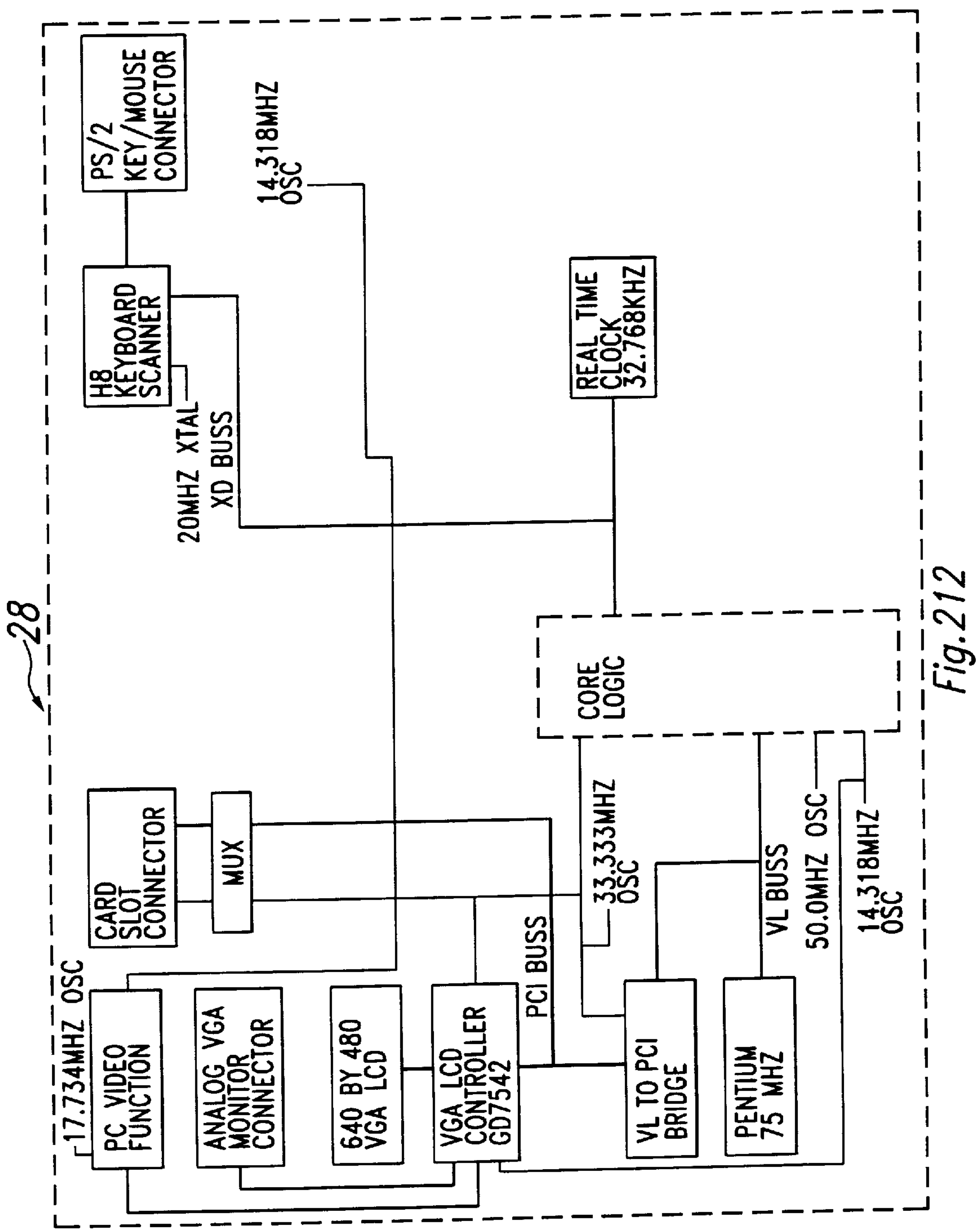
Figure 213:
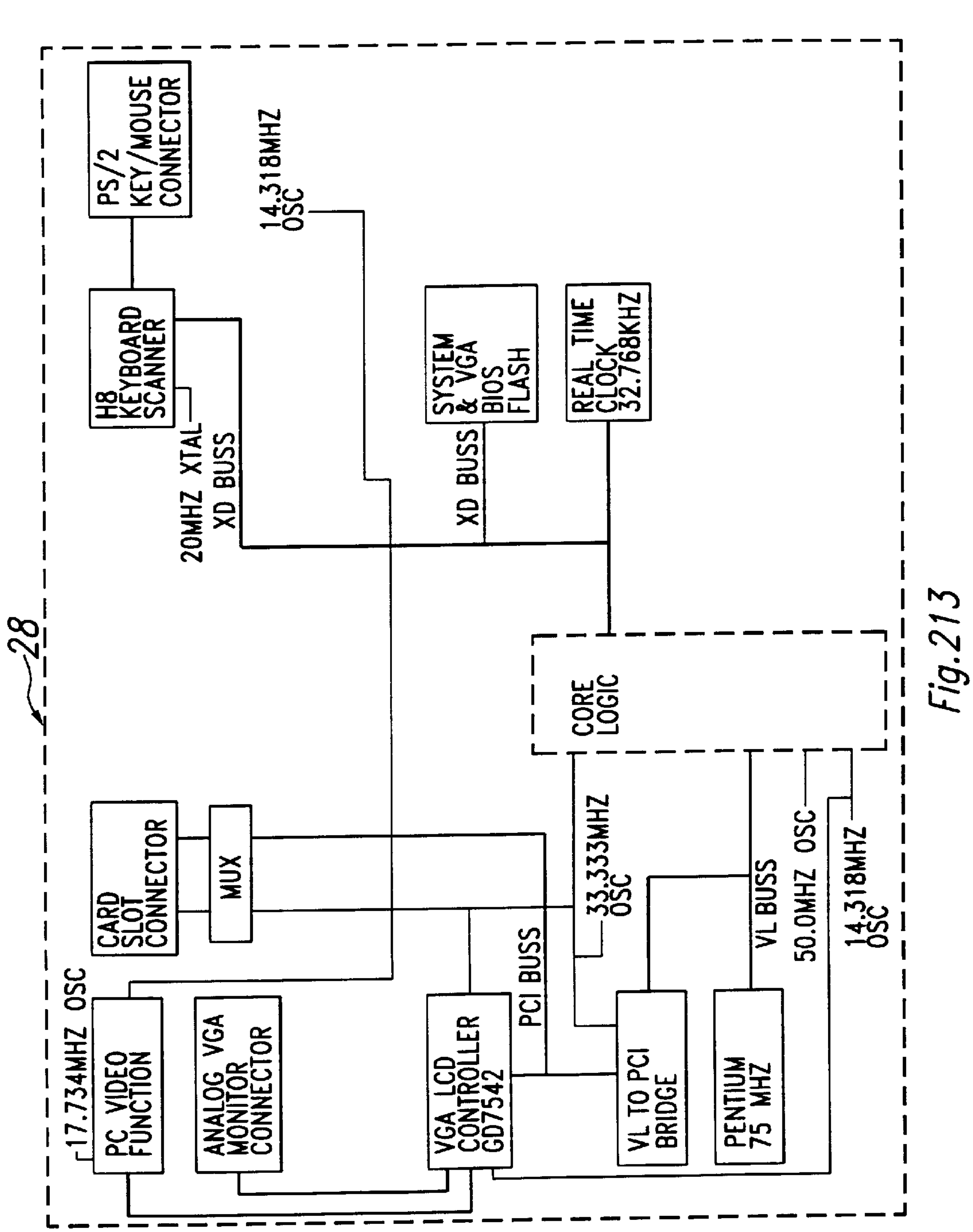
Figure 214:
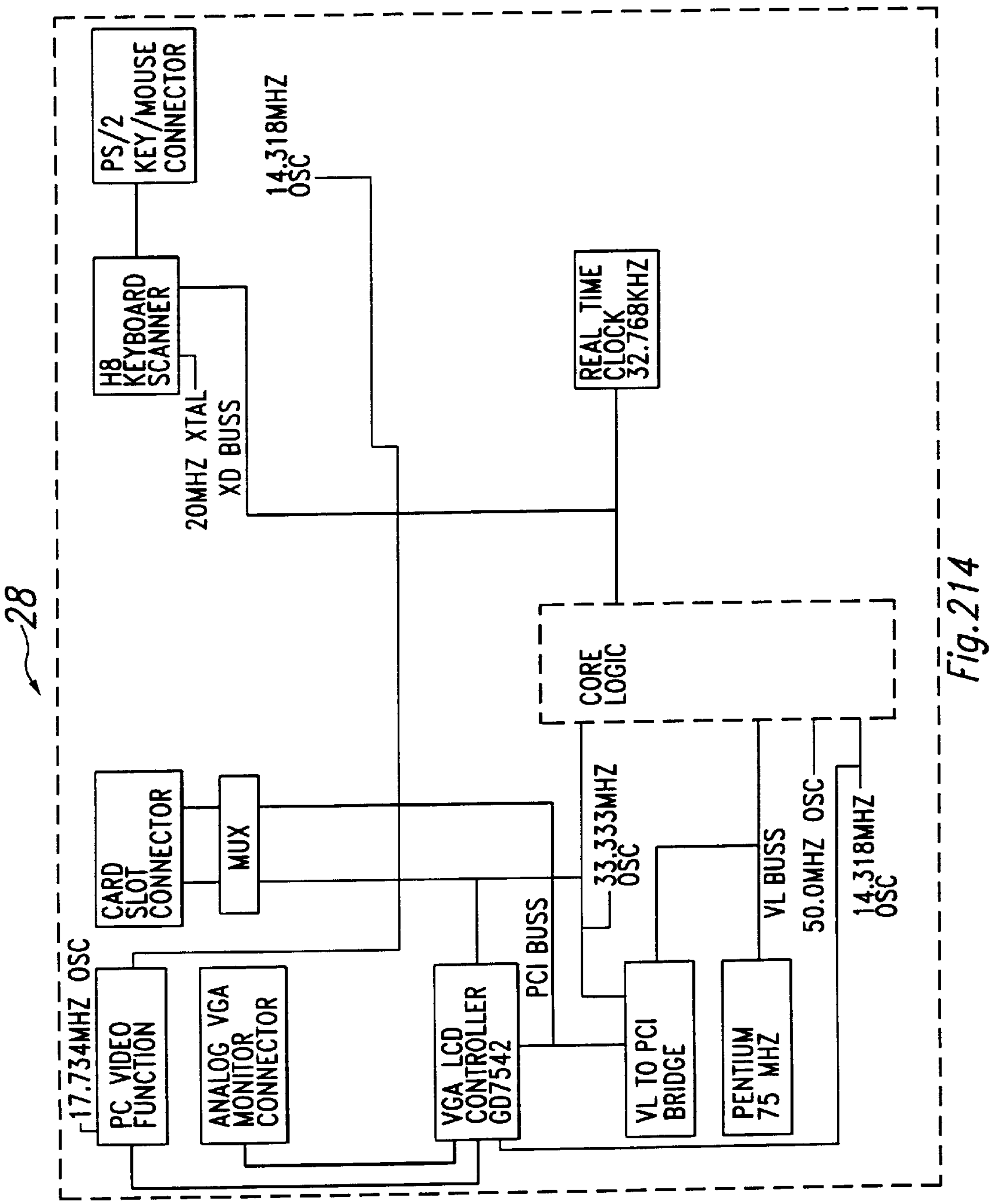
Figure 215:
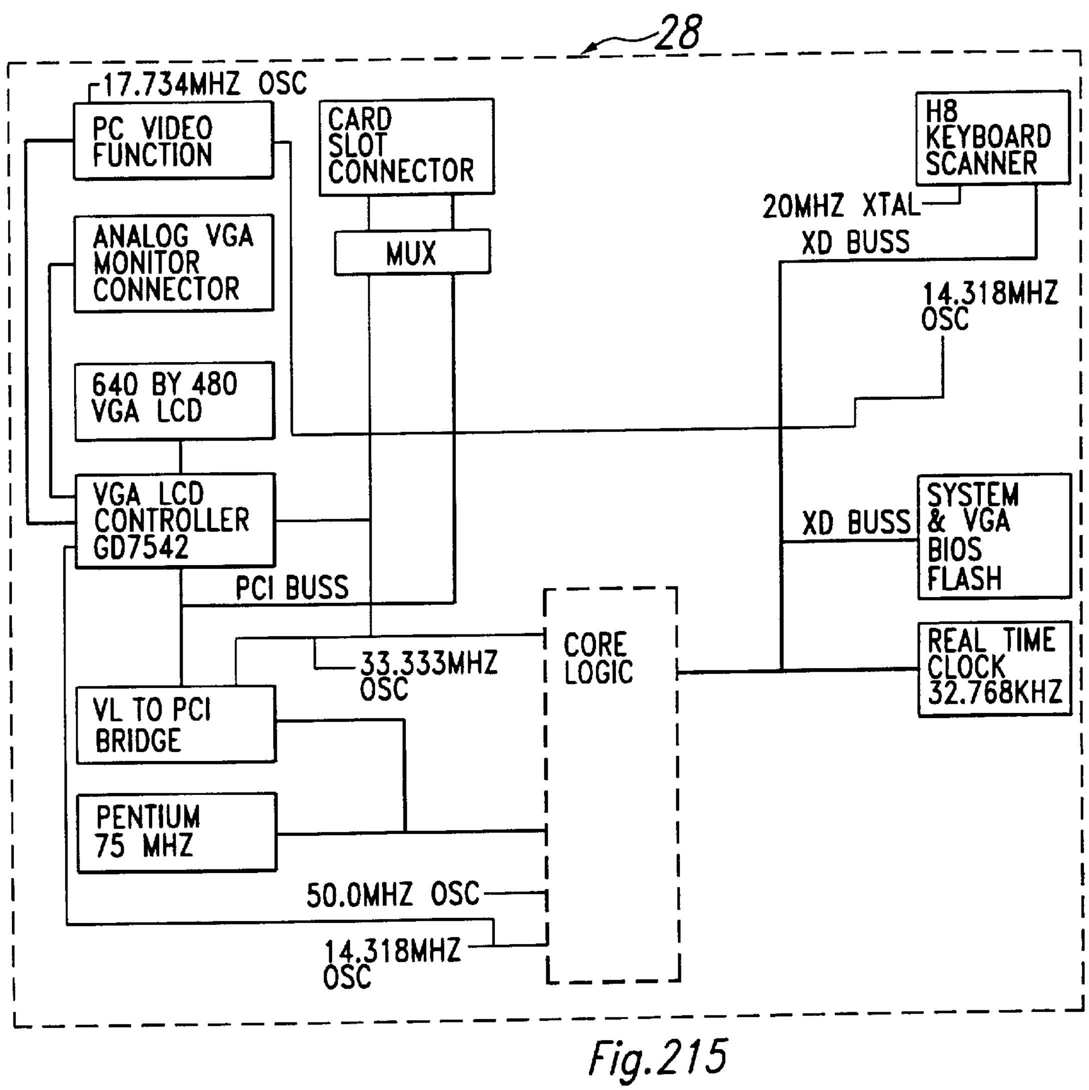
Figure 216:
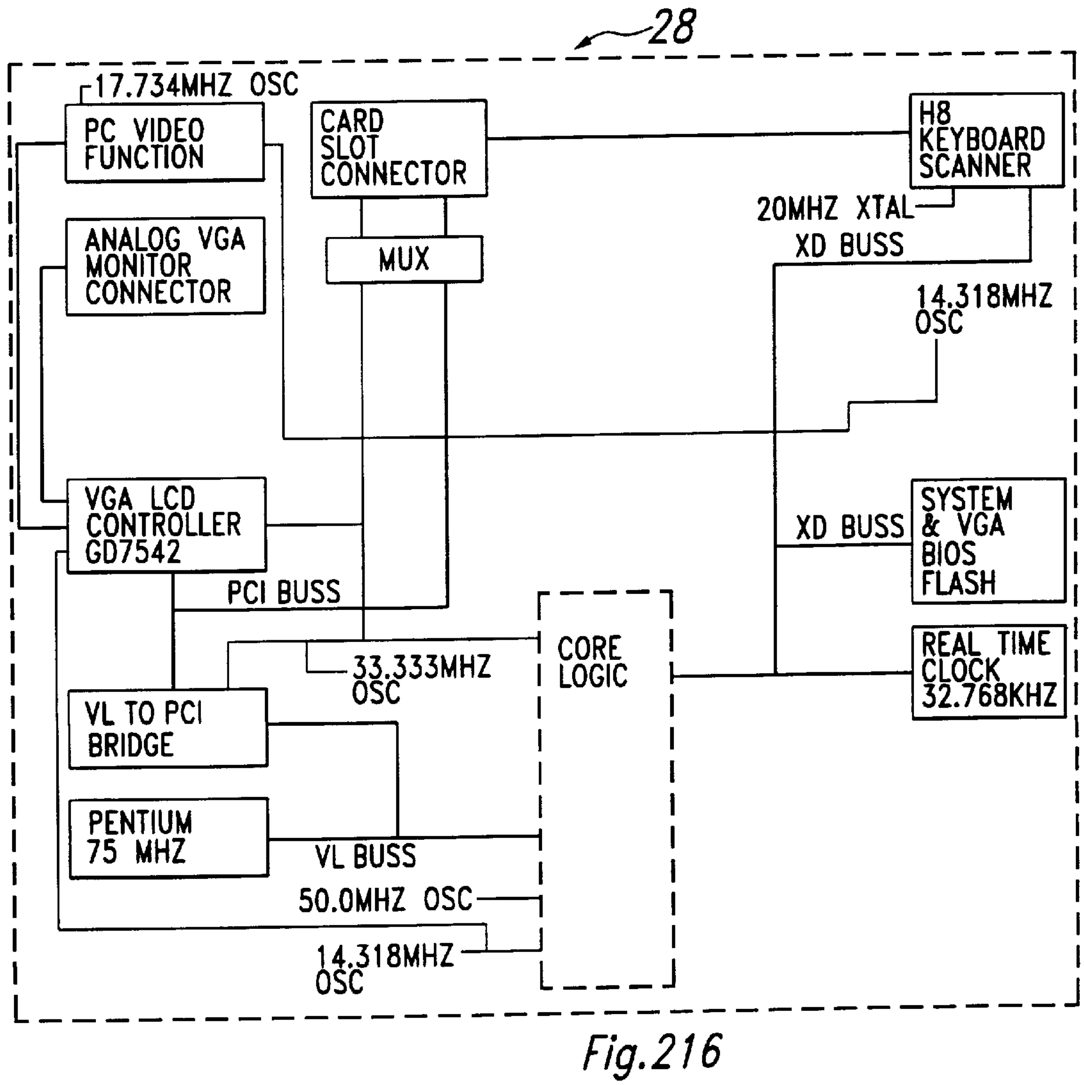
Figure 217:
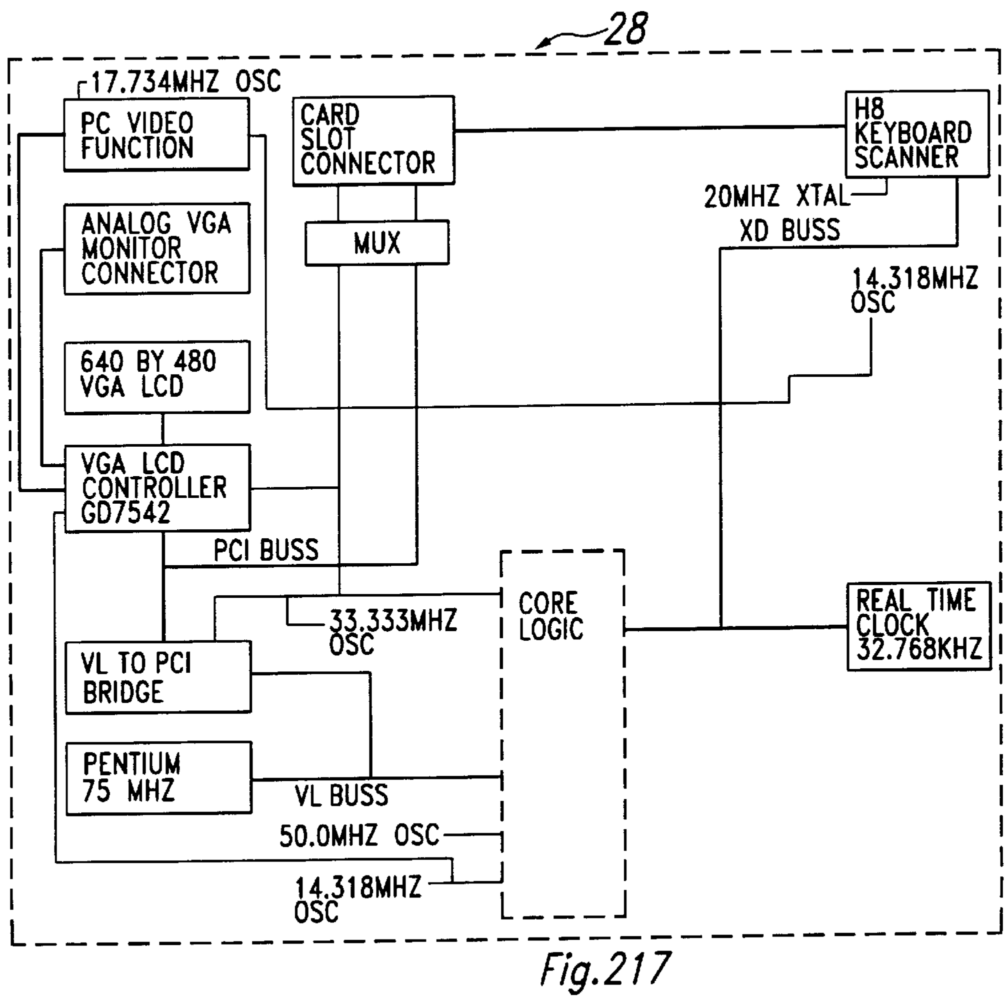
Figure 218:
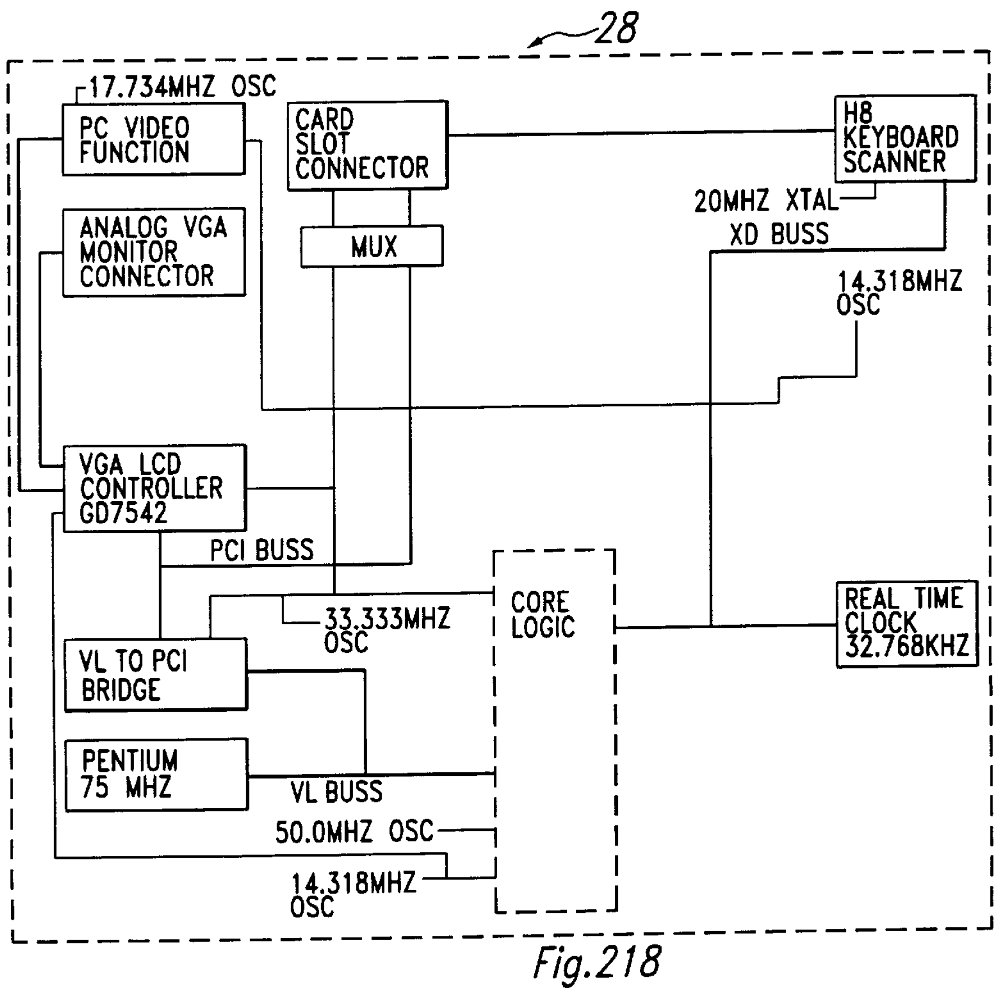
Figure 219:
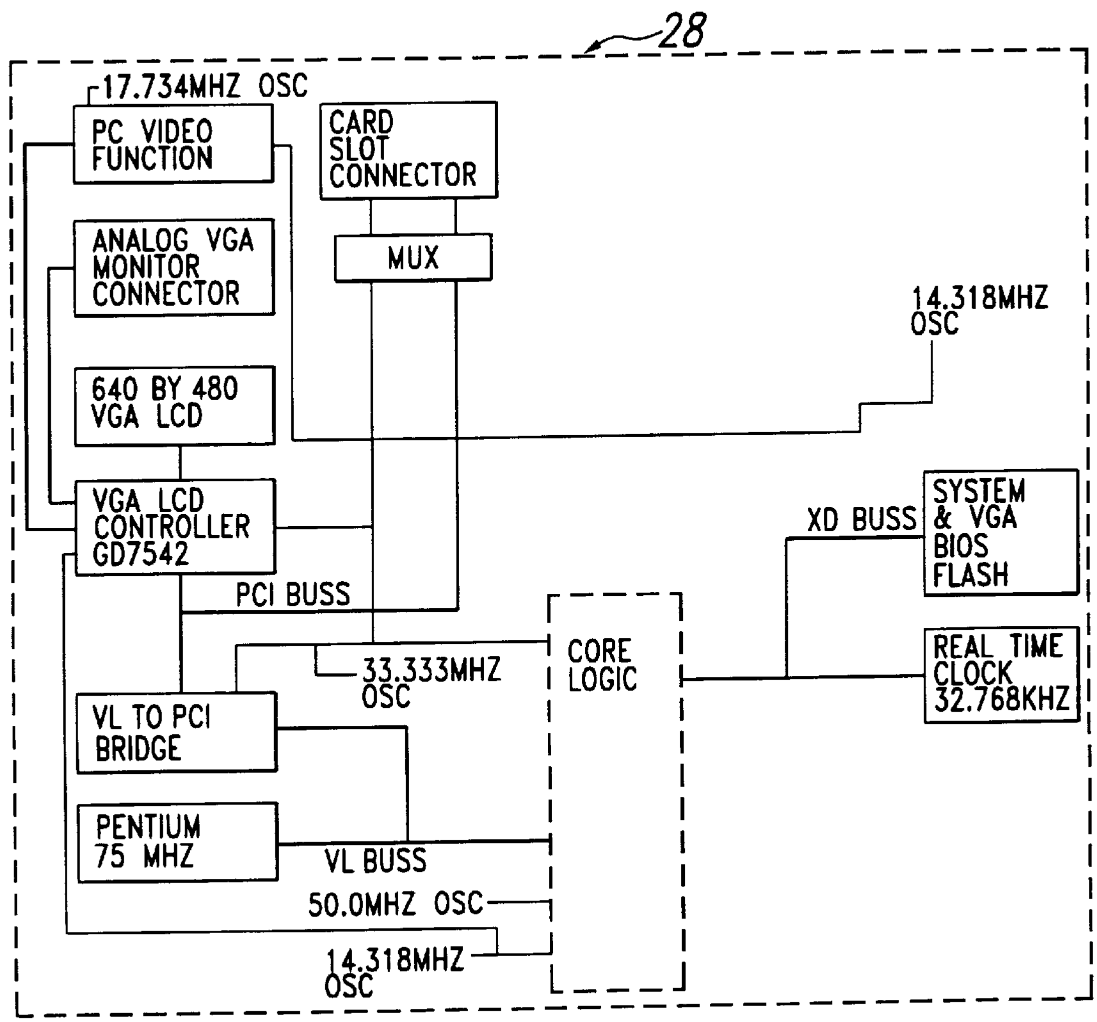
Figure 220:
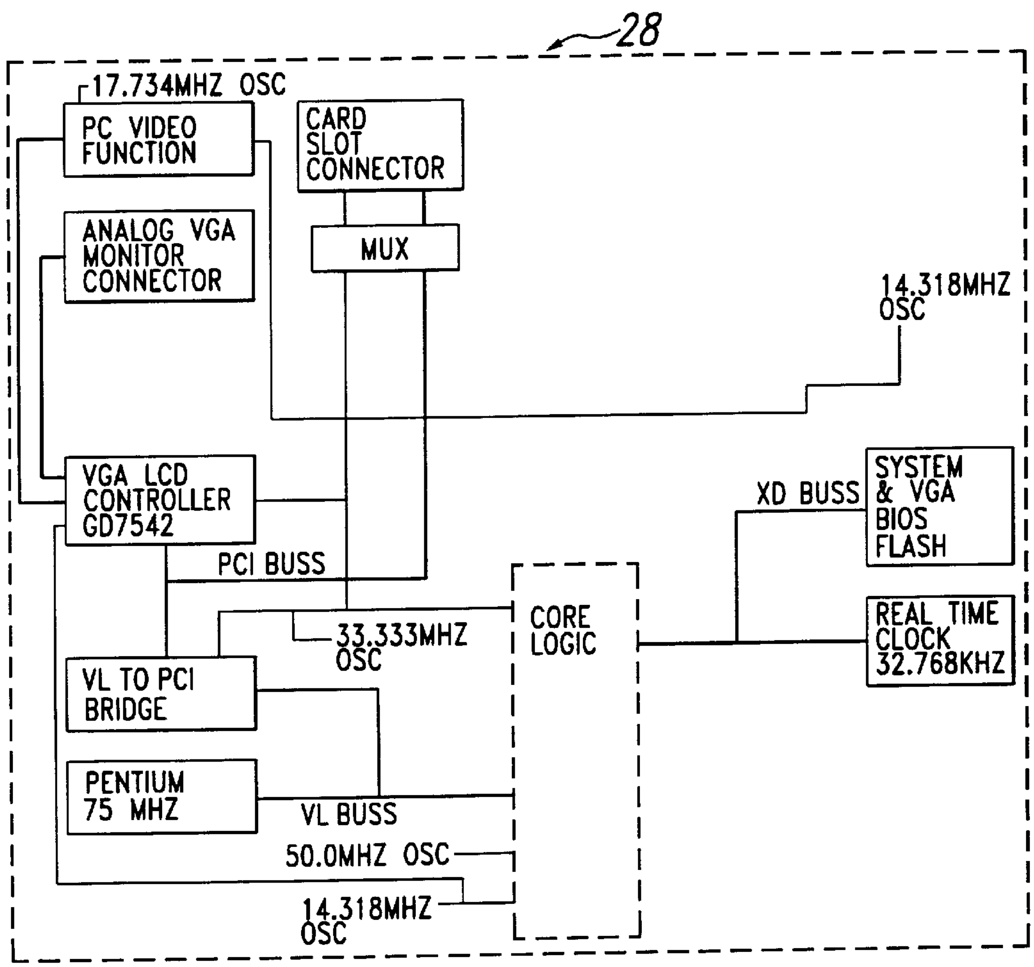
Figure 221:
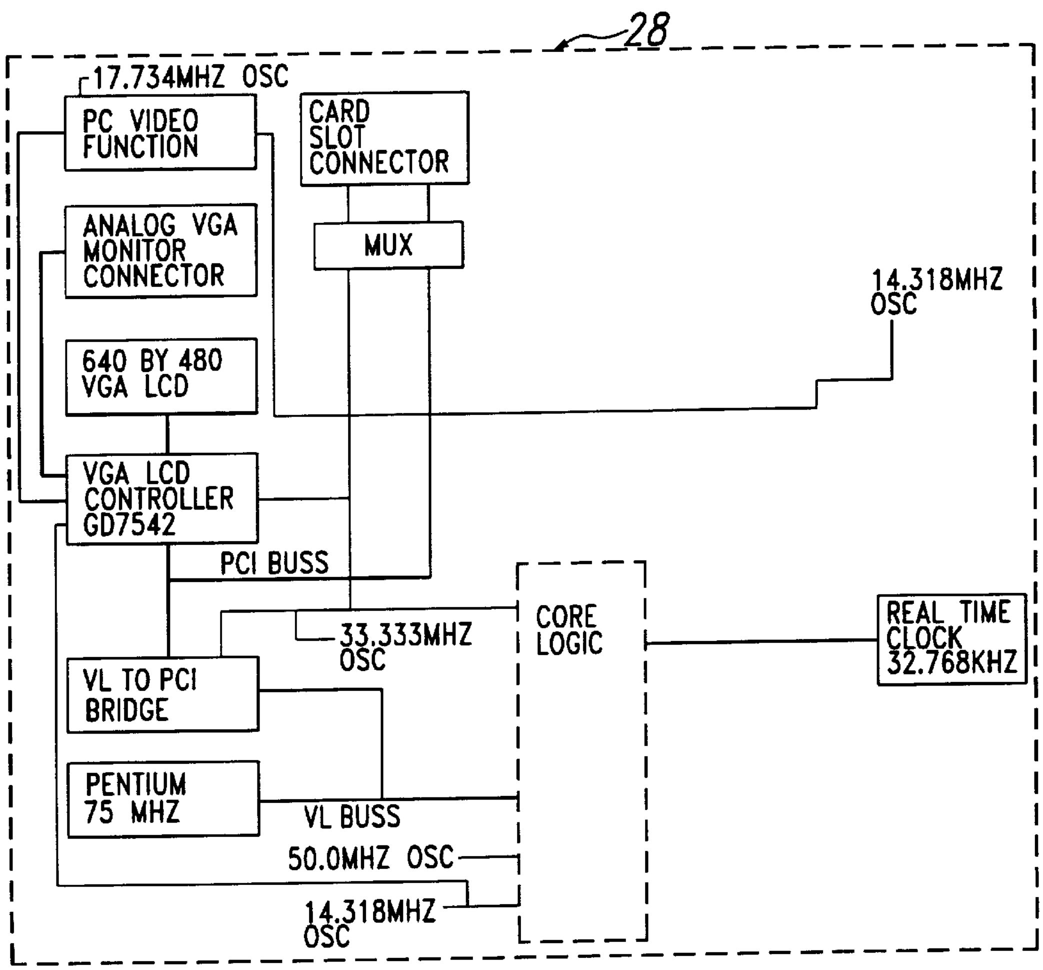
Figure 222:
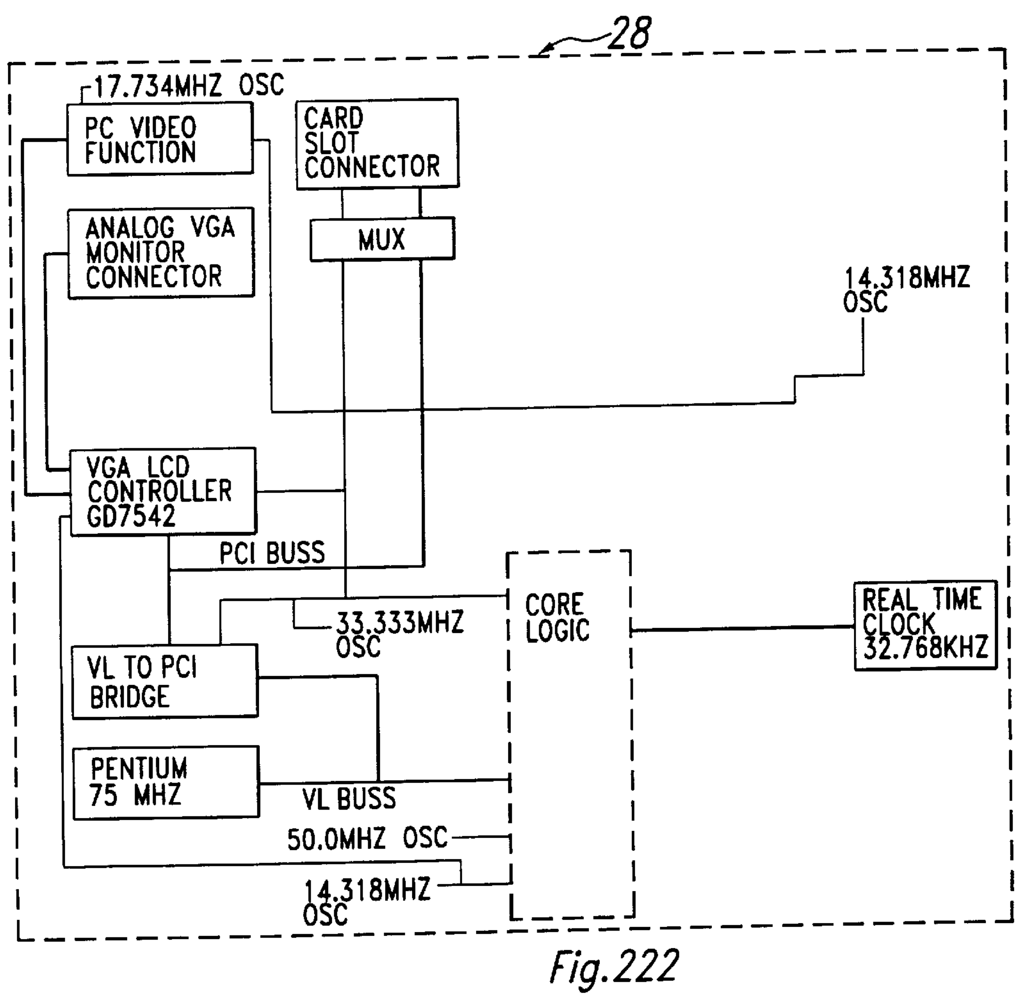
Figure 223:
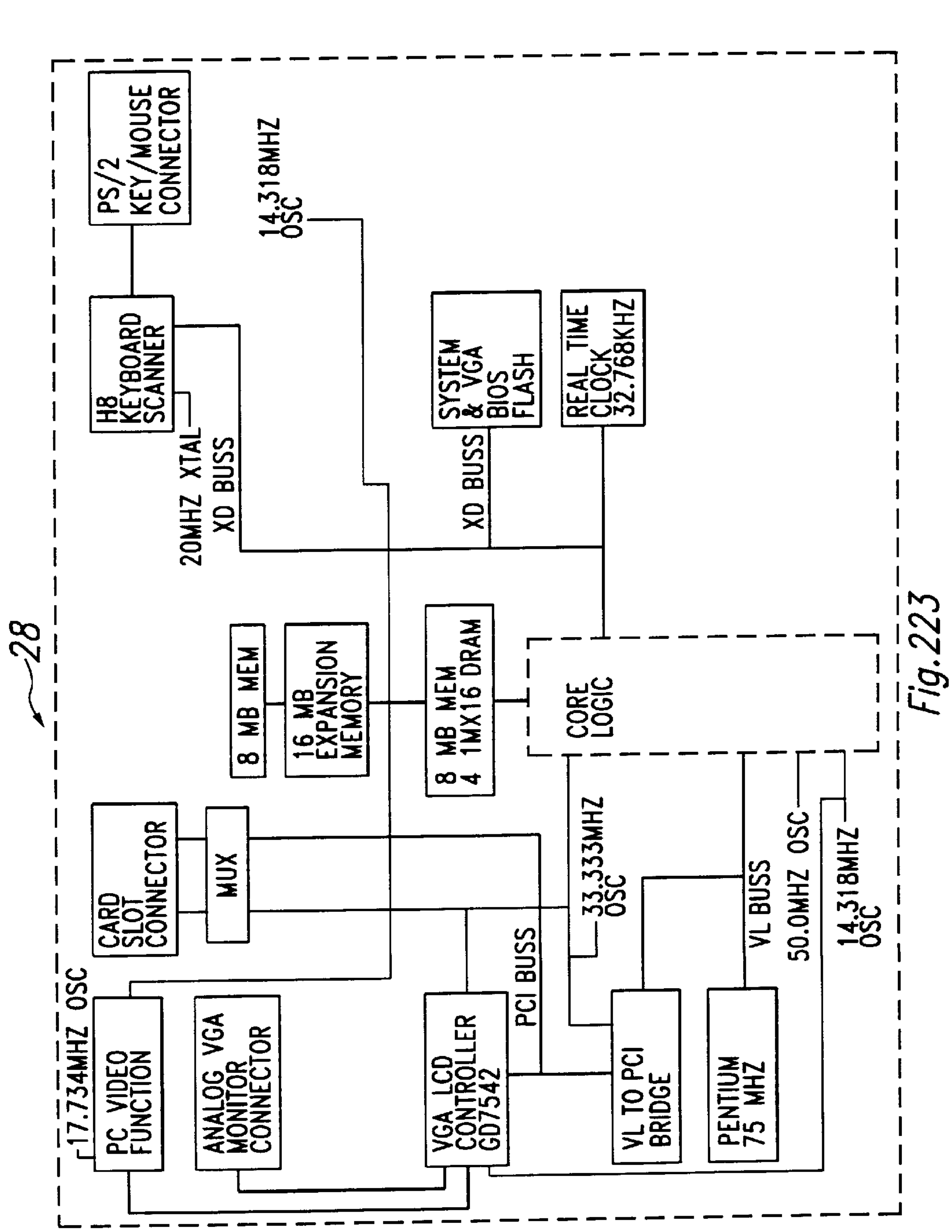
Figure 224:
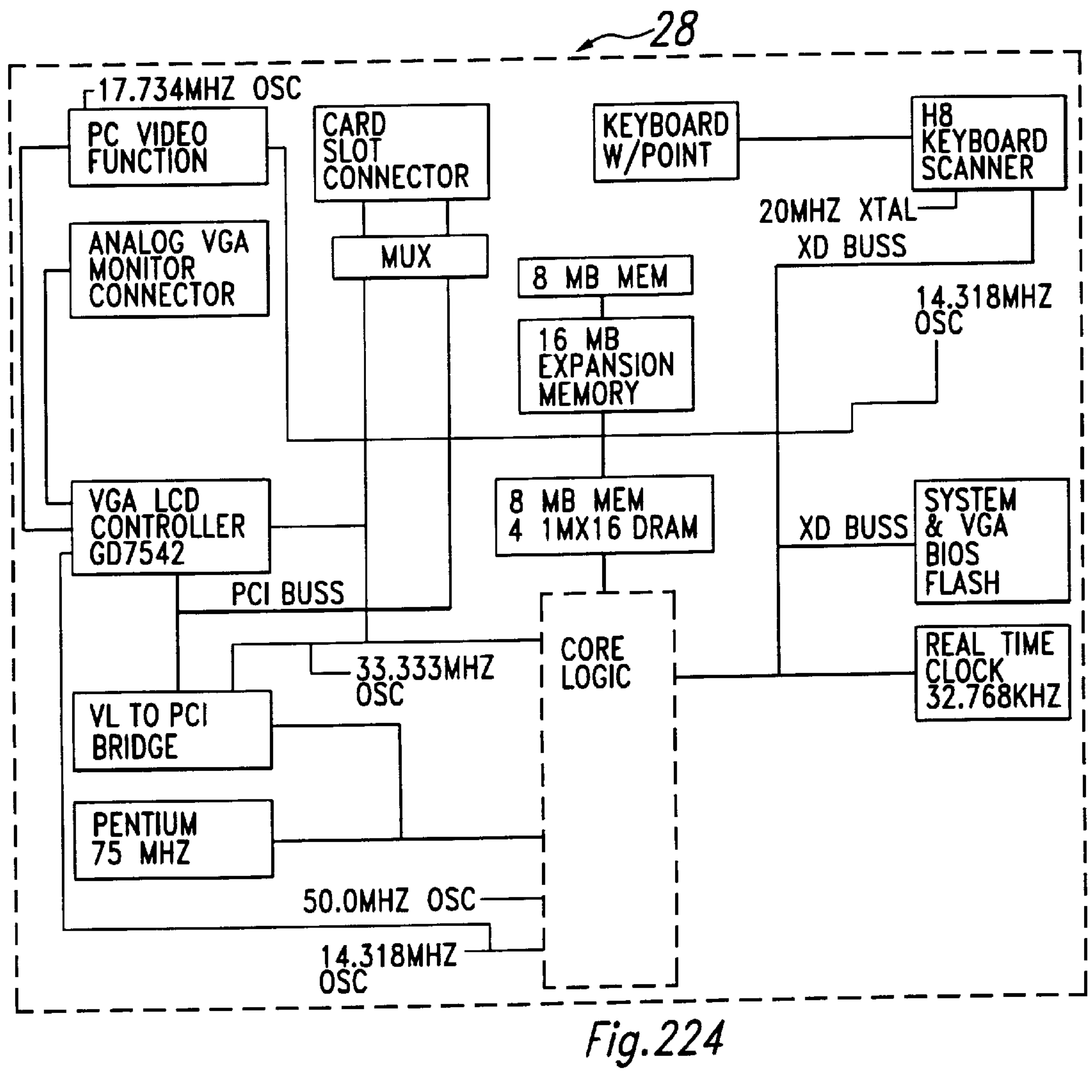
Figure 225:
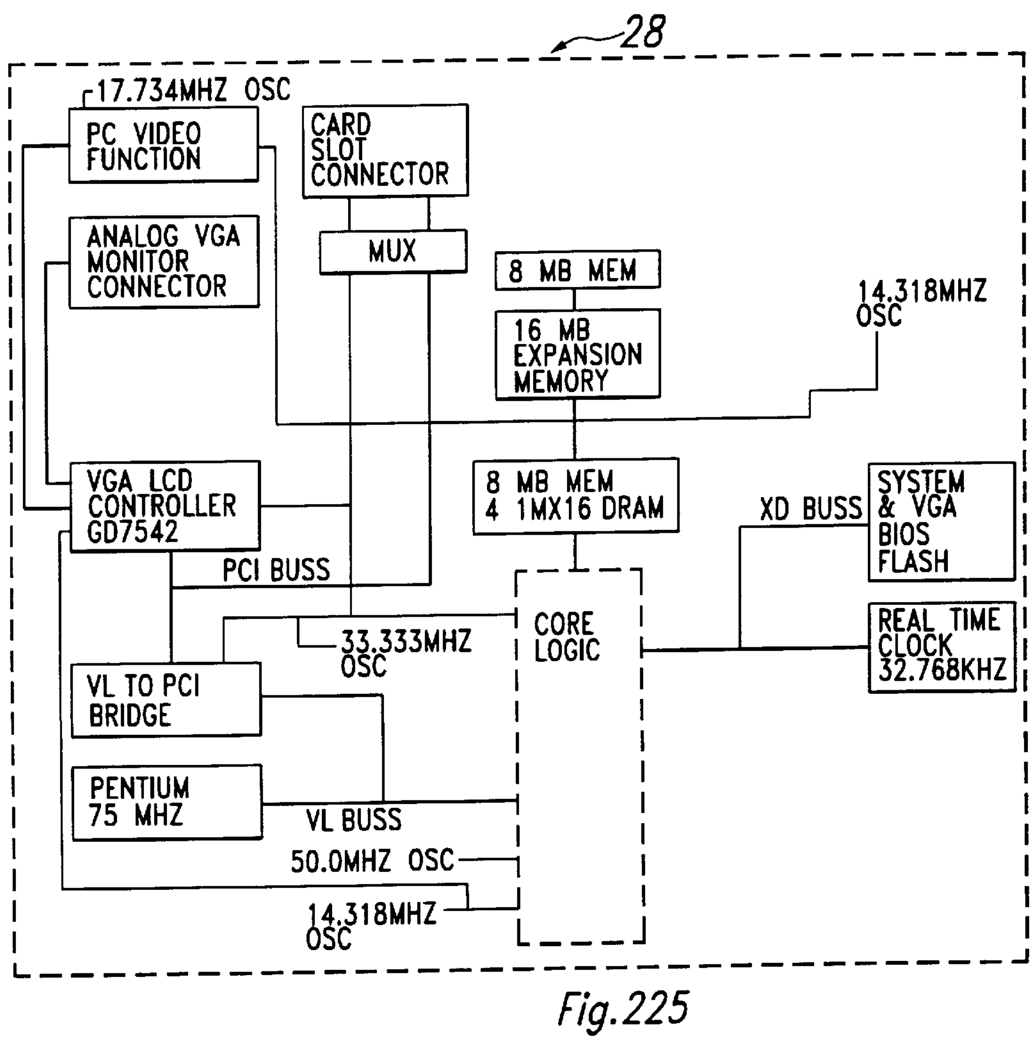
Figure 226:
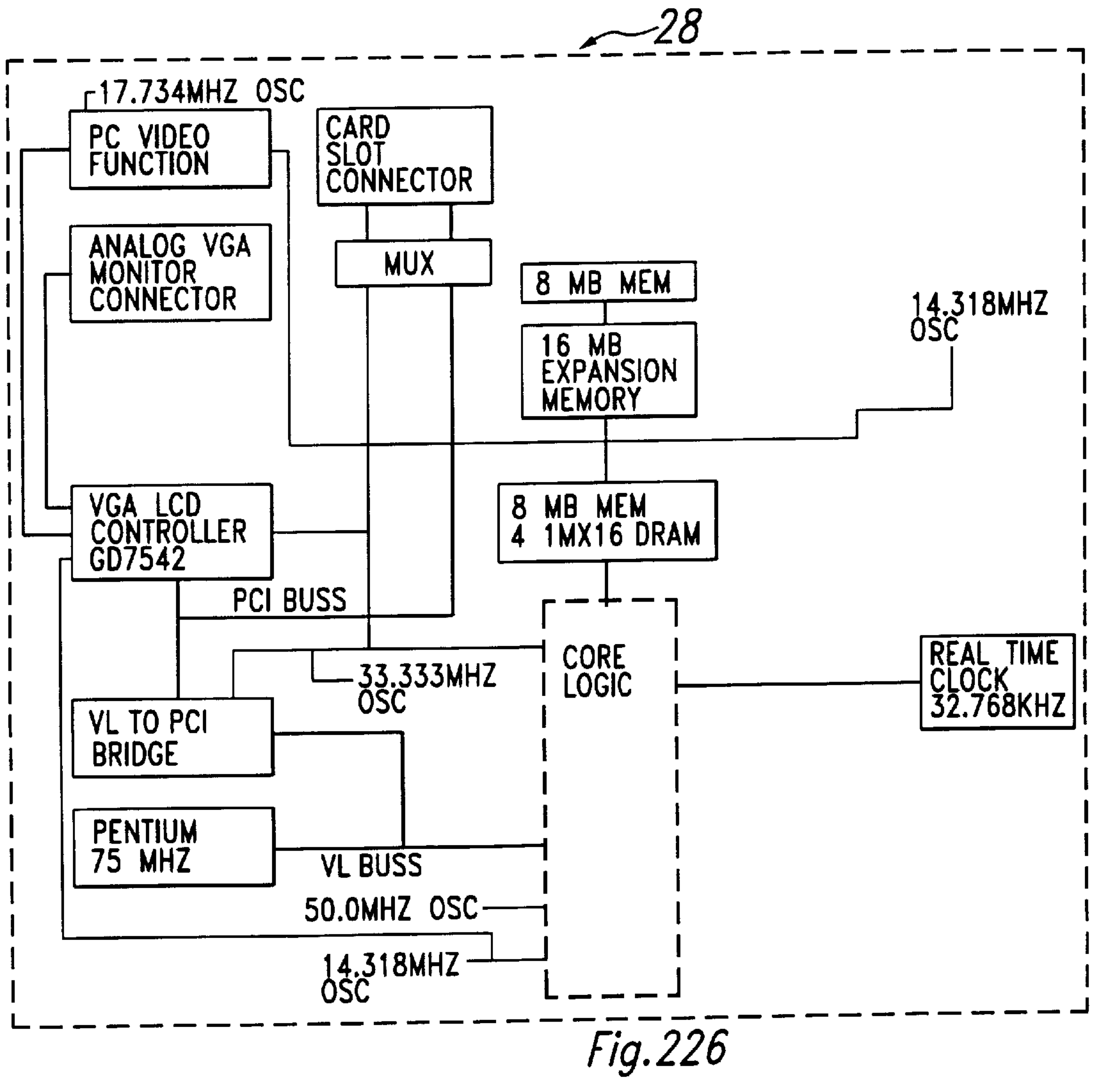
Figure 227:
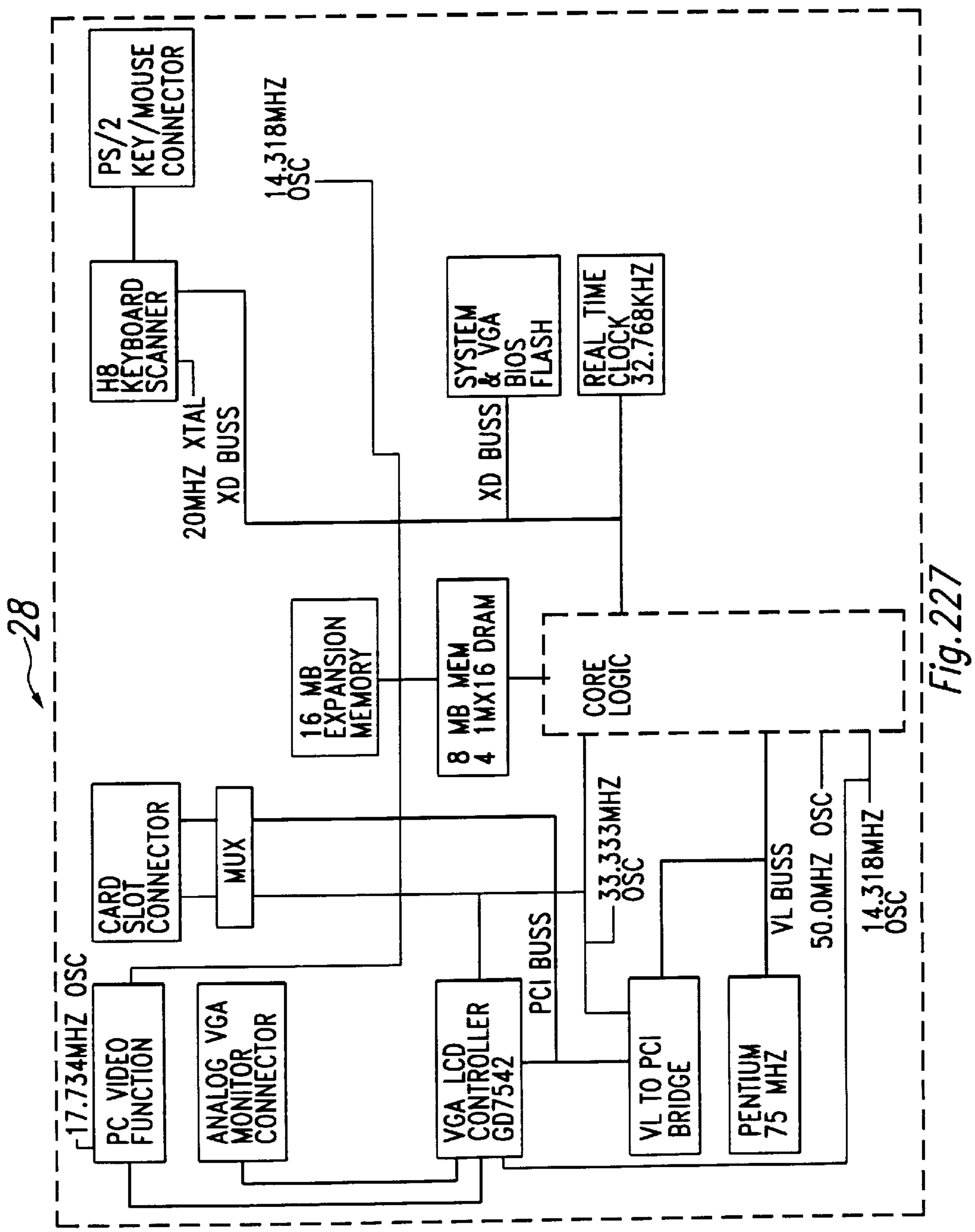
Figure 228:
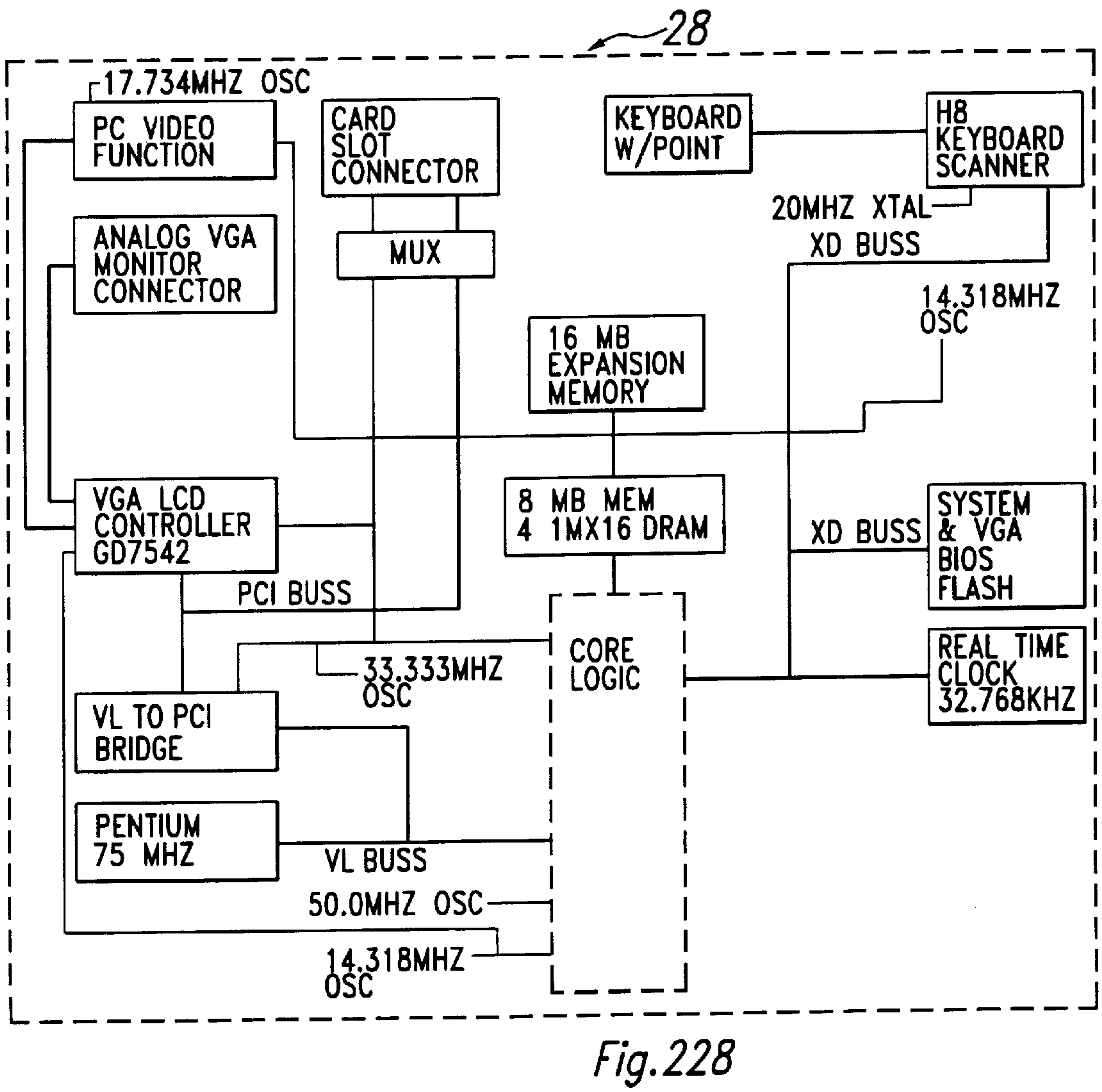
Figure 229:
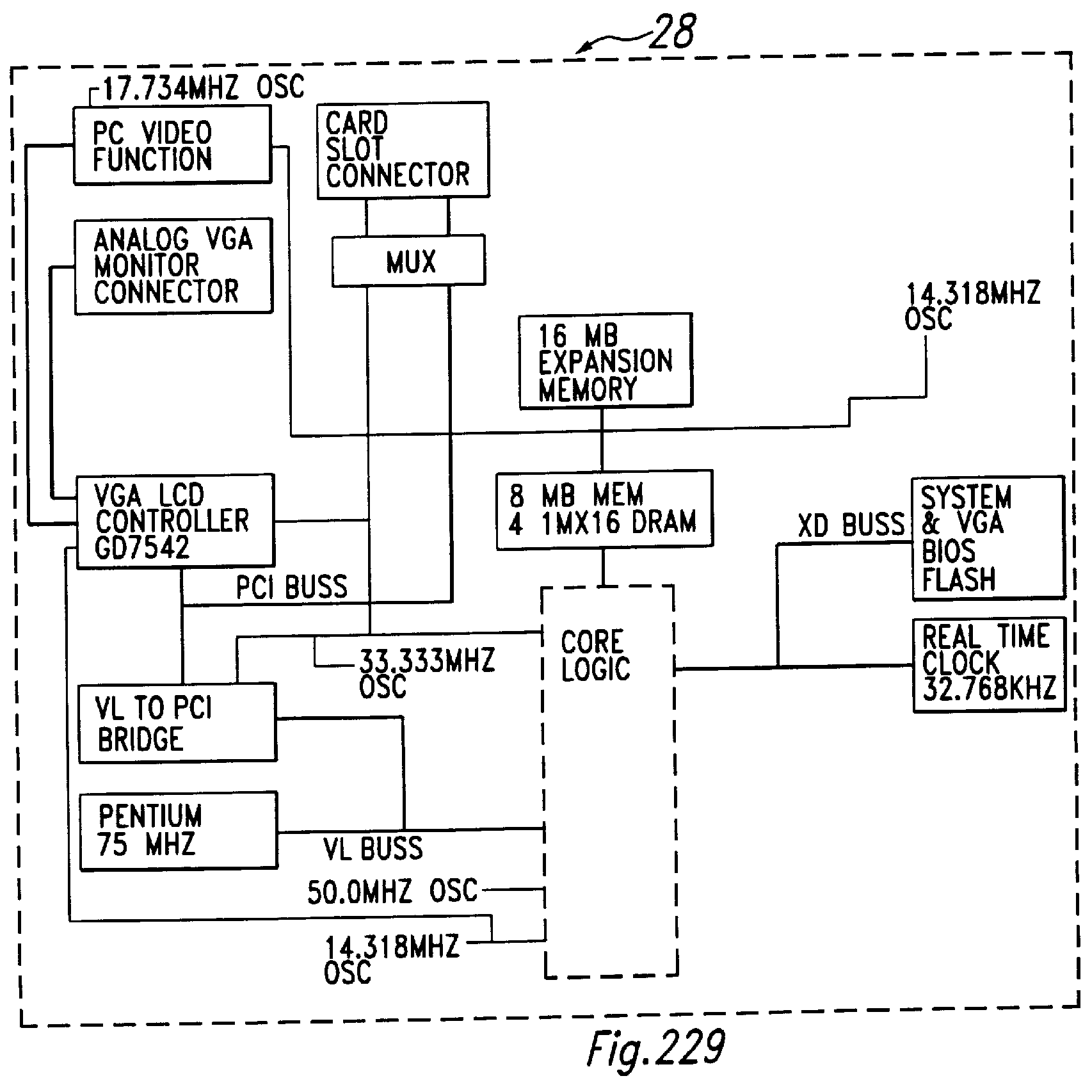
Figure 230:
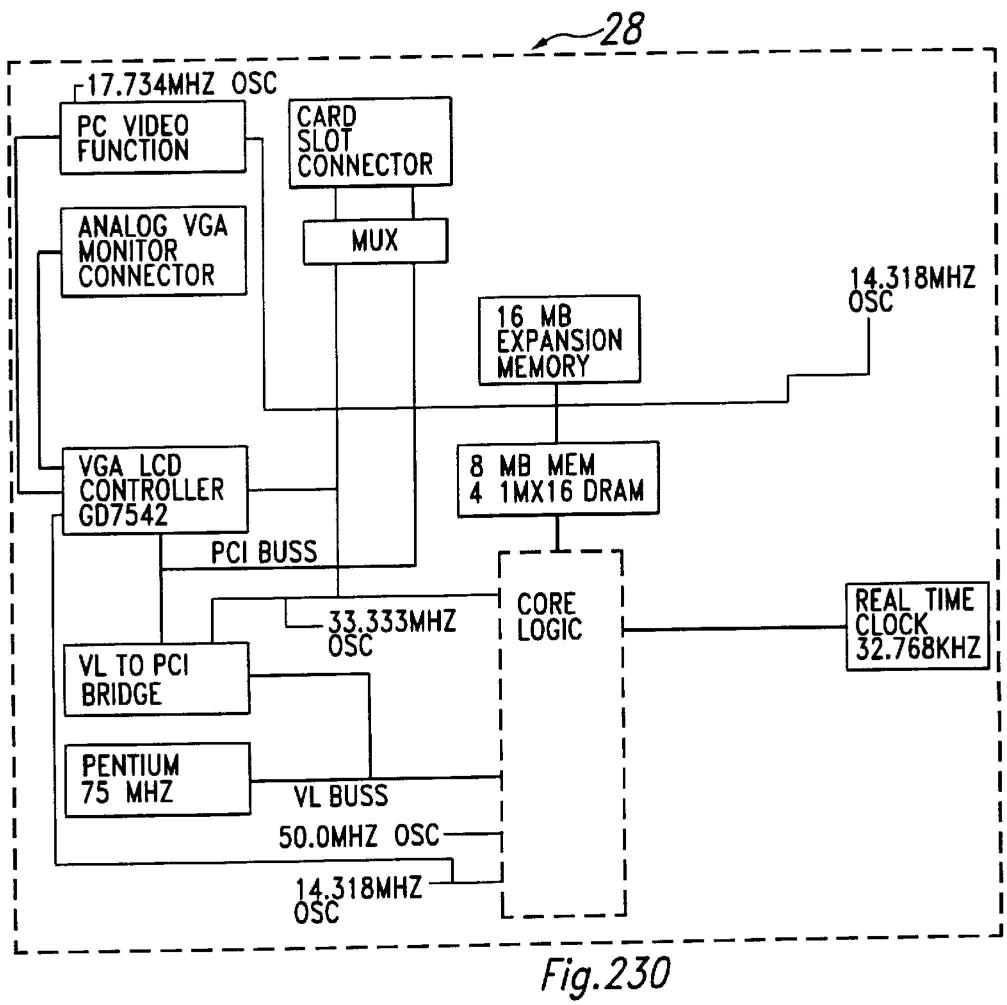
Figure 231:
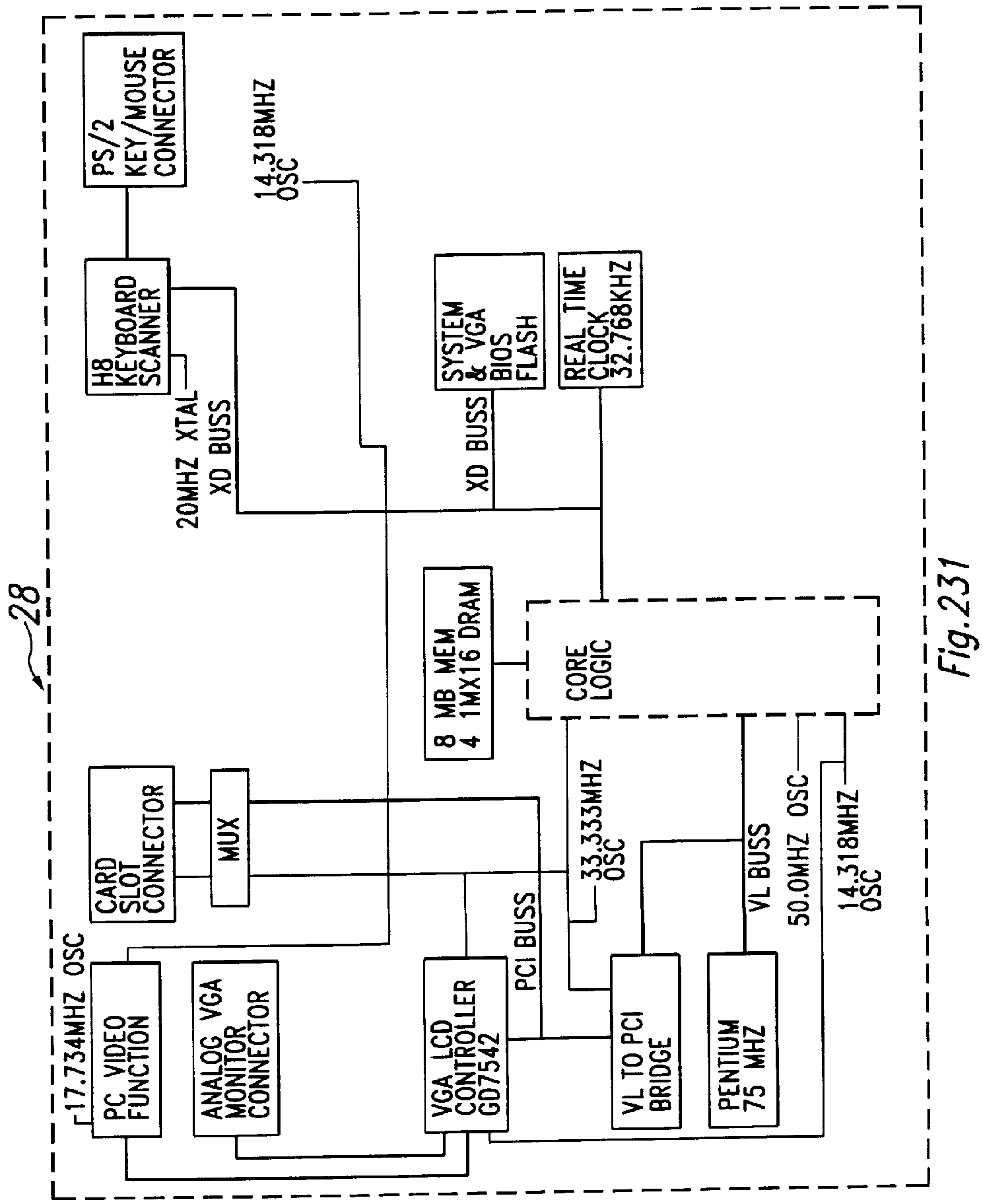
Figure 232:
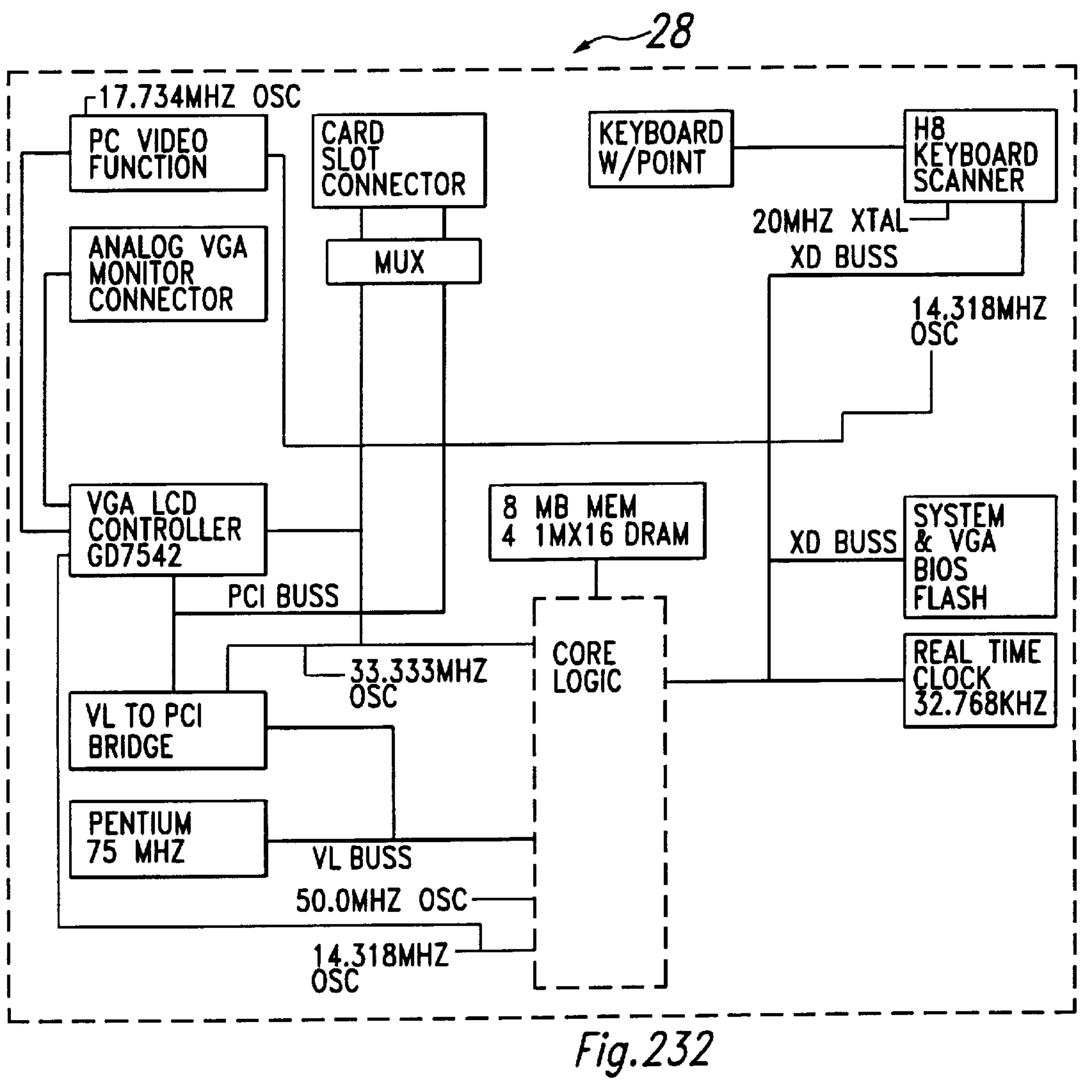
Figure 233:
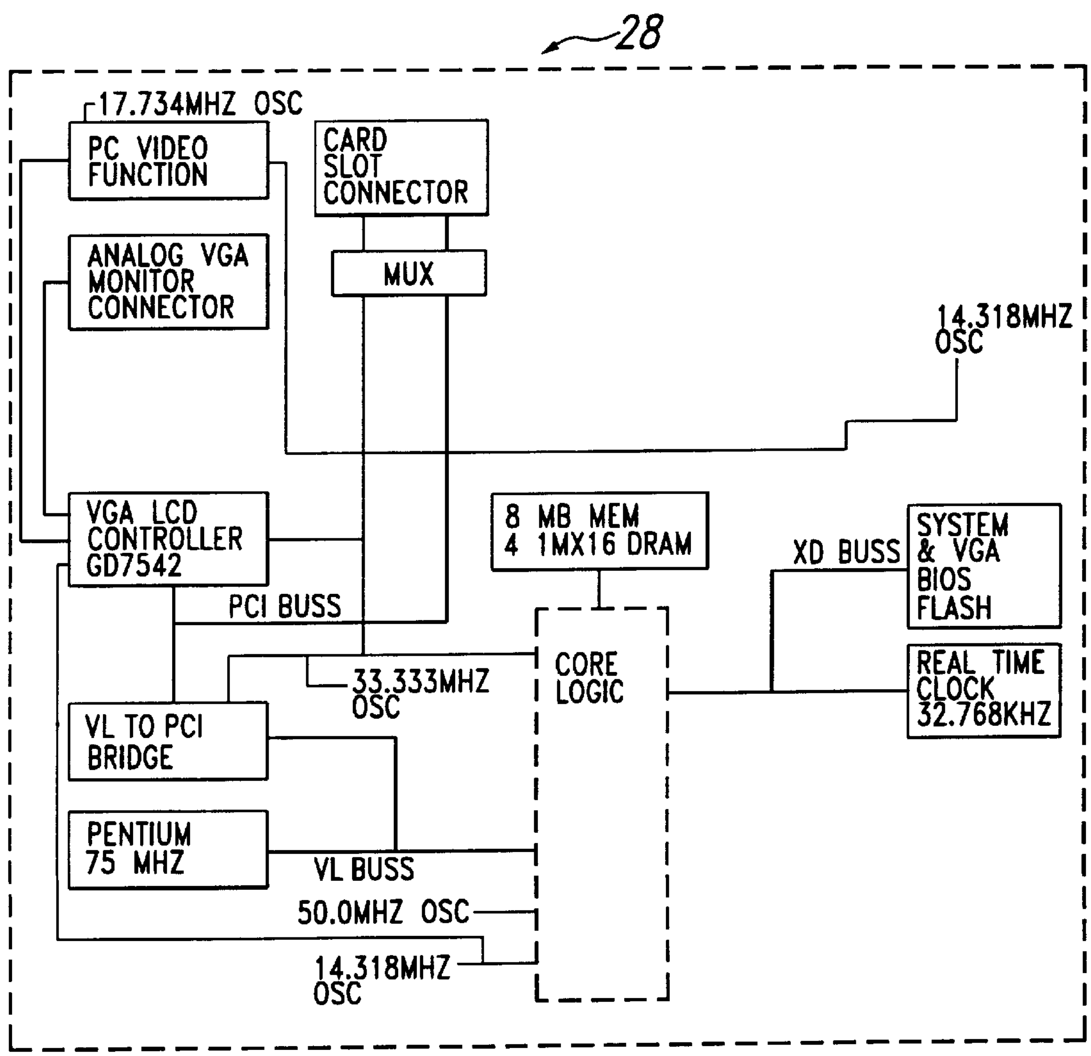
Figure 234:
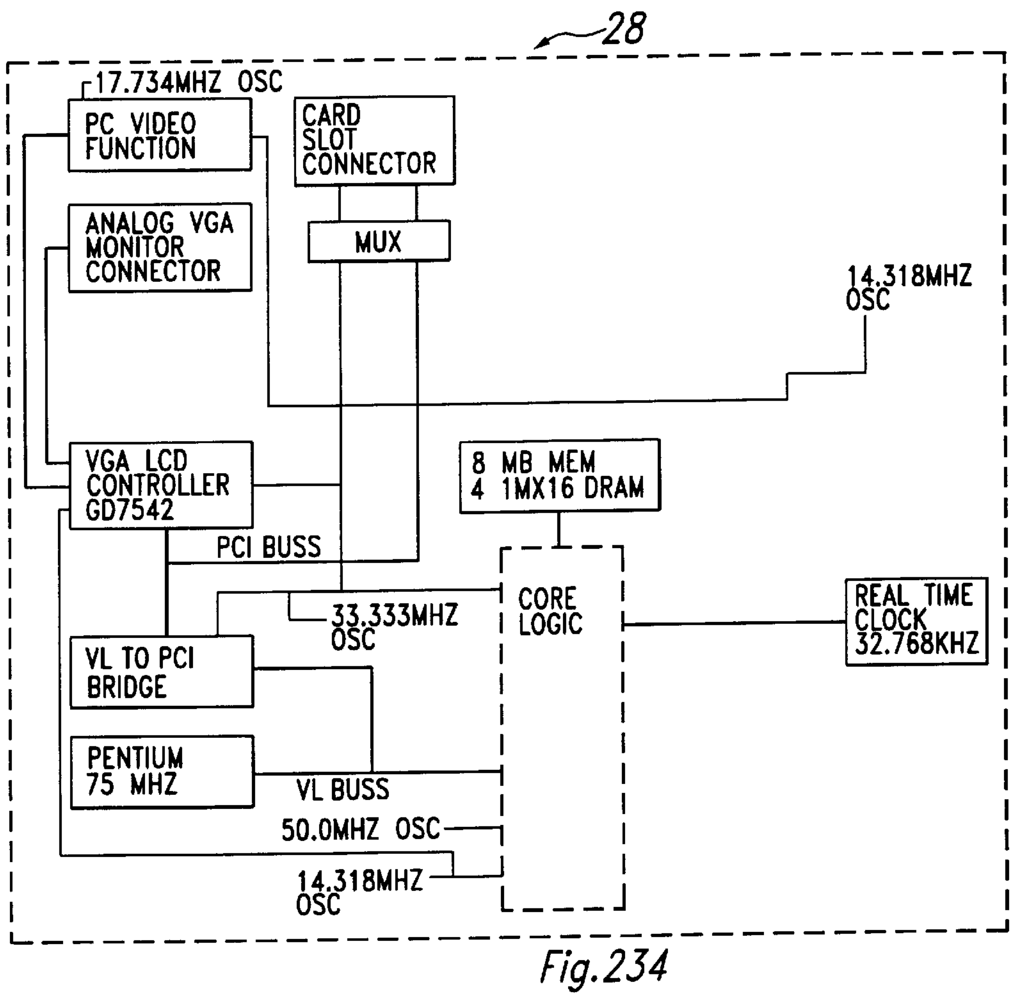
Figure 235:
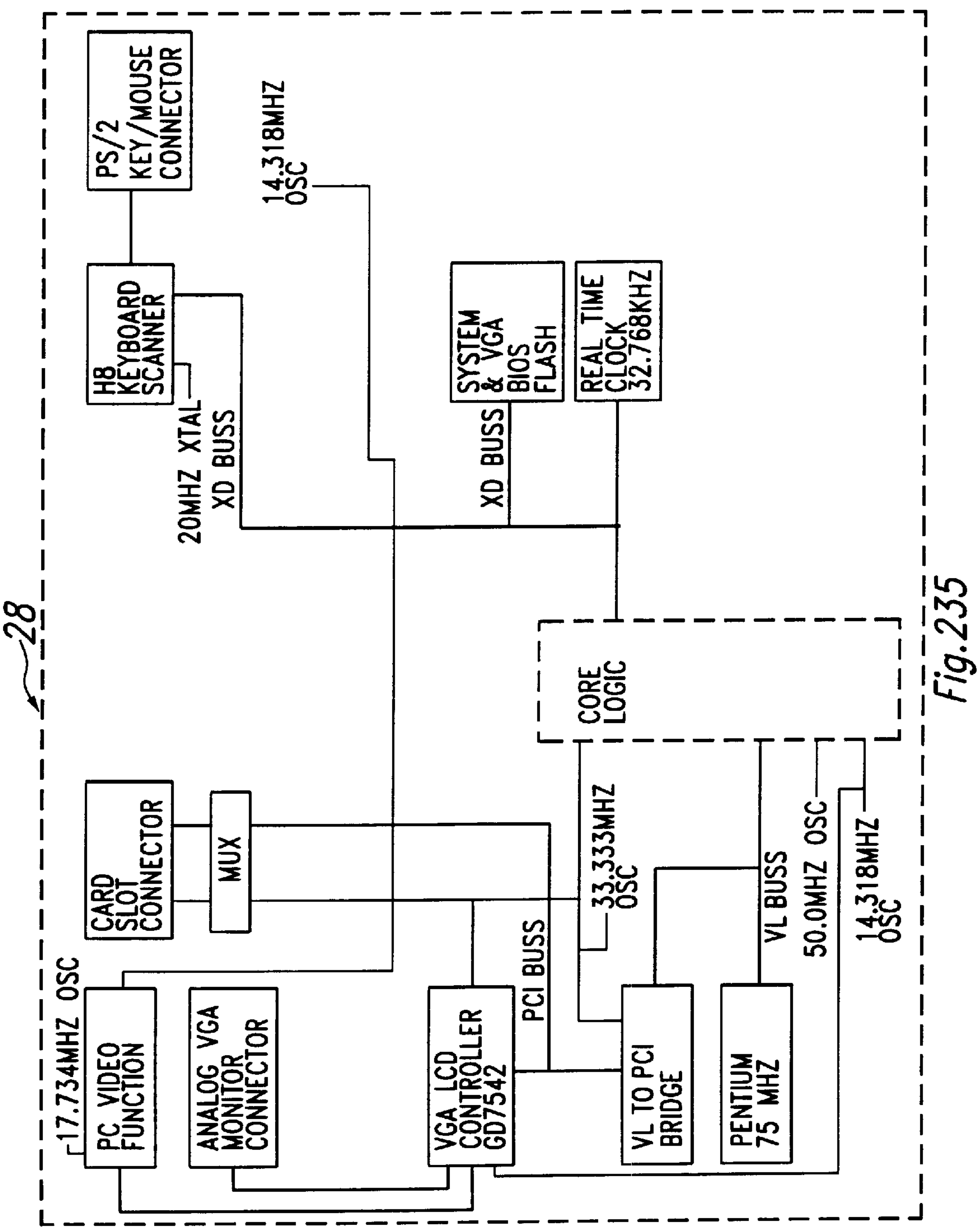
Figure 236:
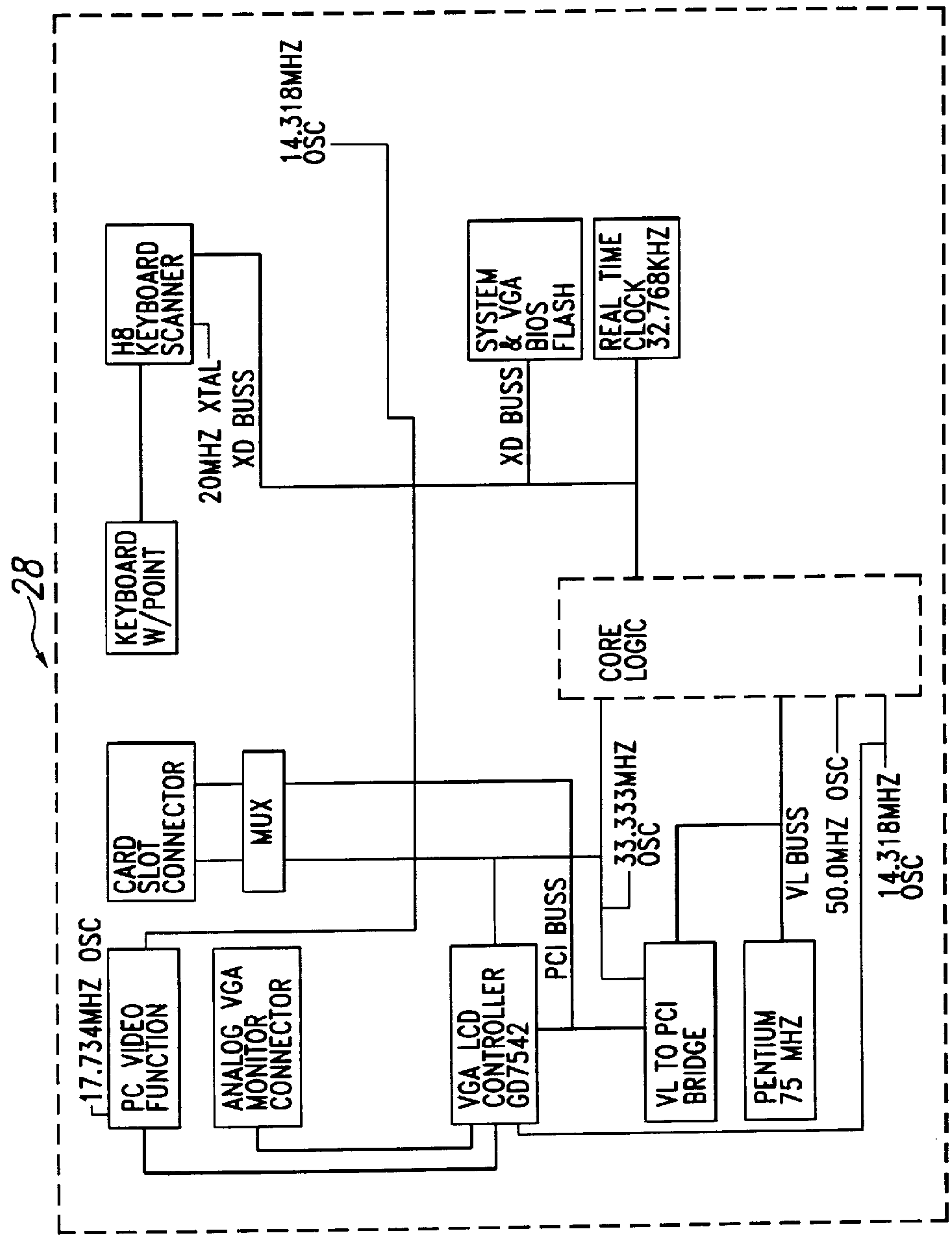
Figure 237:
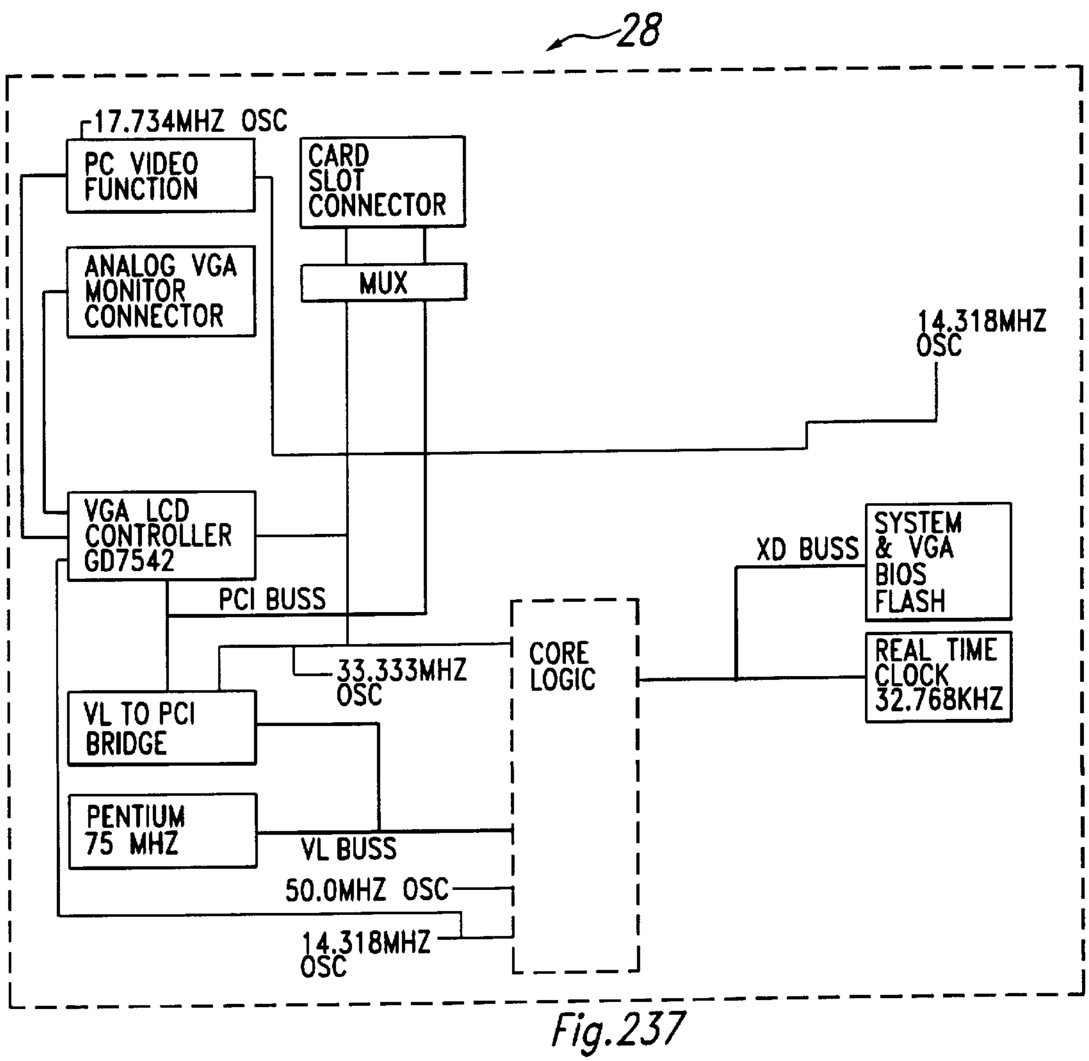
Figure 238:
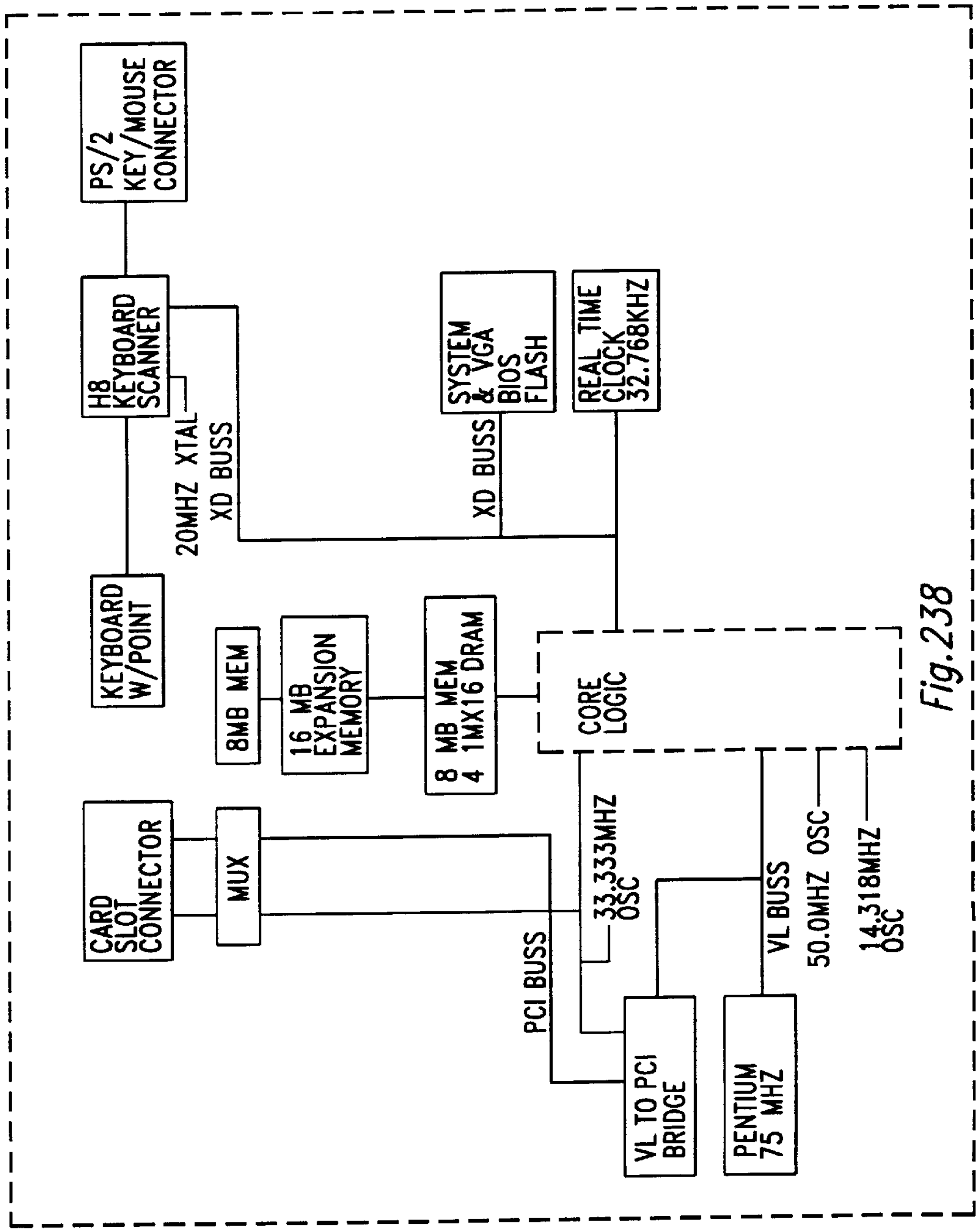
Figure 239:
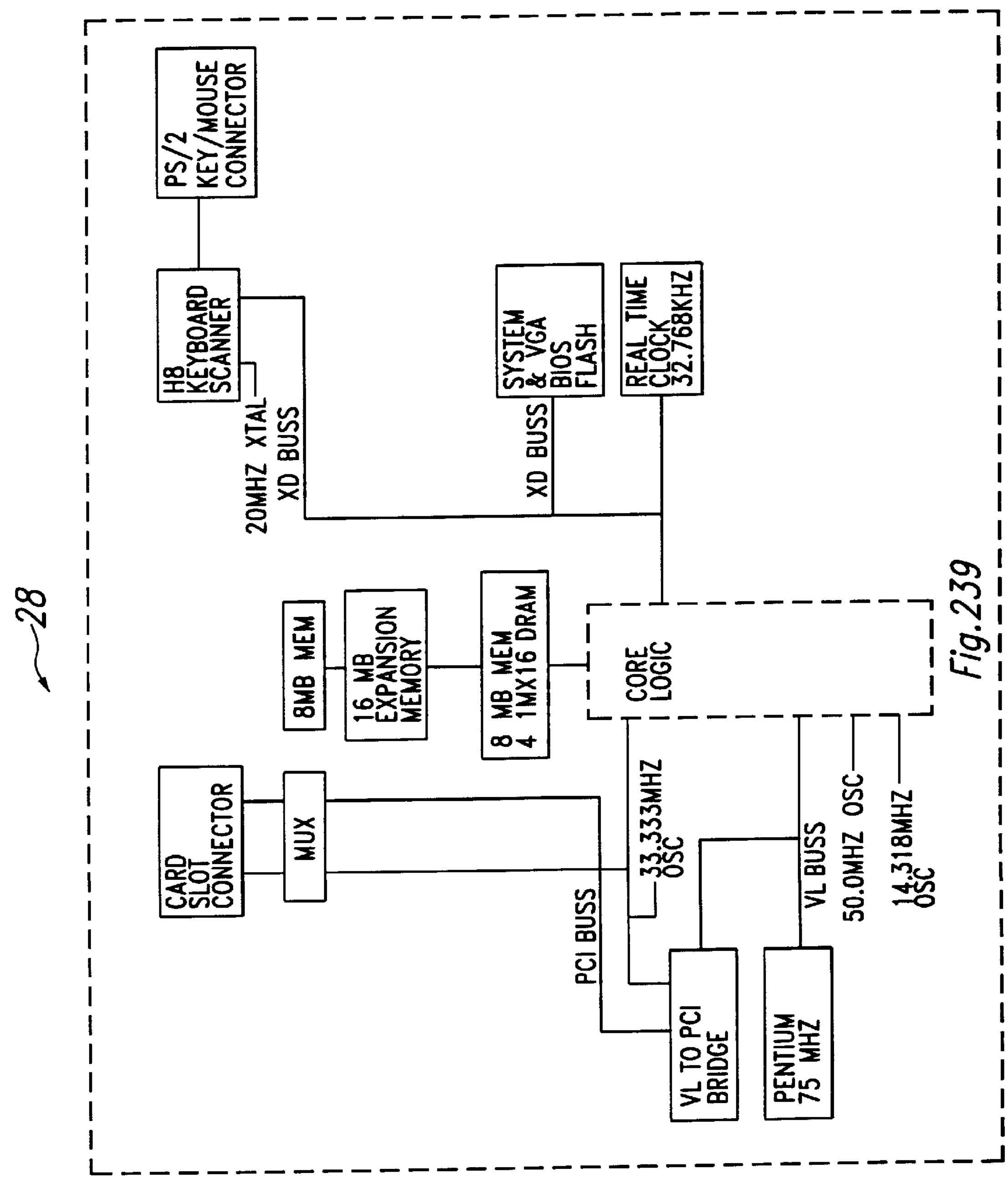
Figure 240:
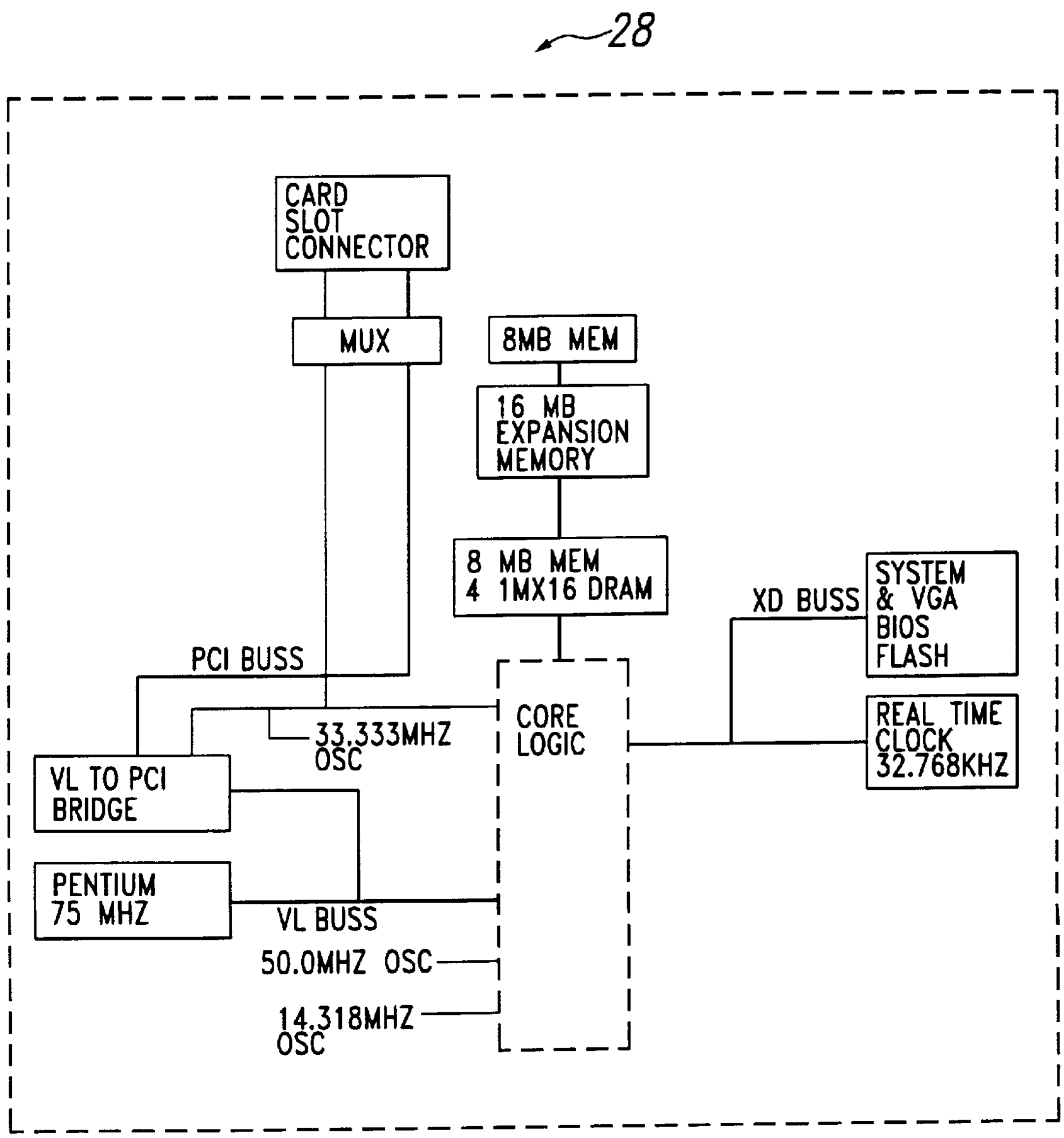
Figure 241:
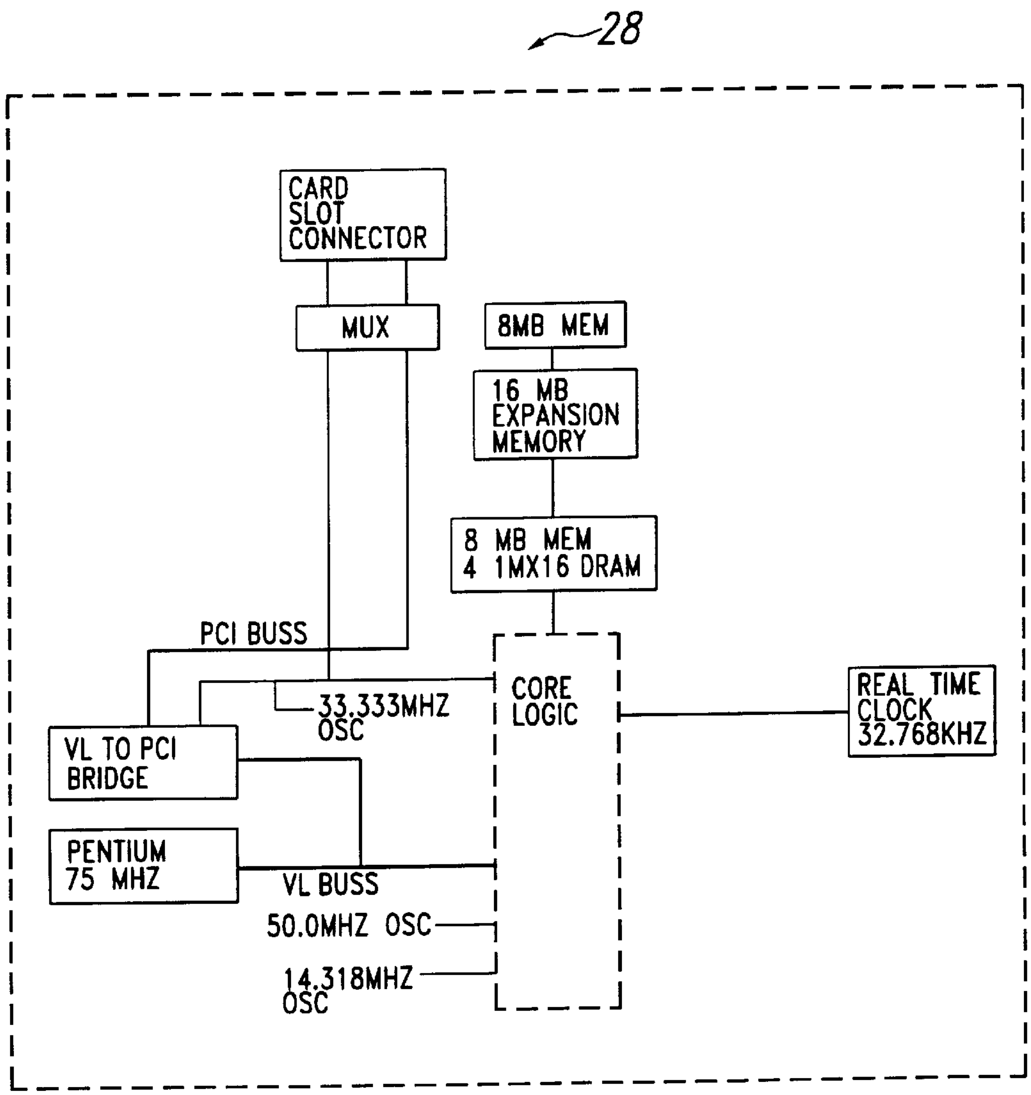
Figure 242:
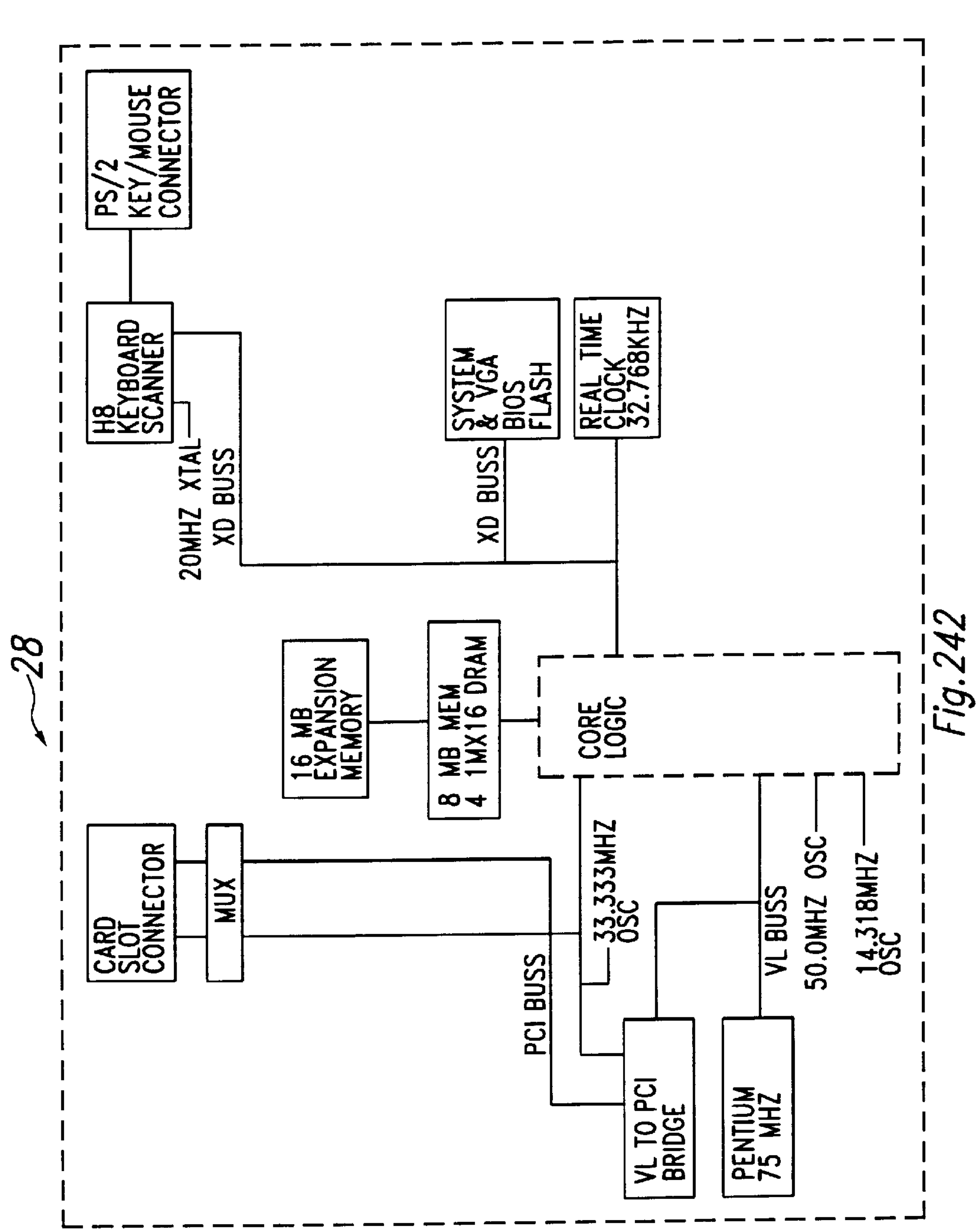
Figure 243:
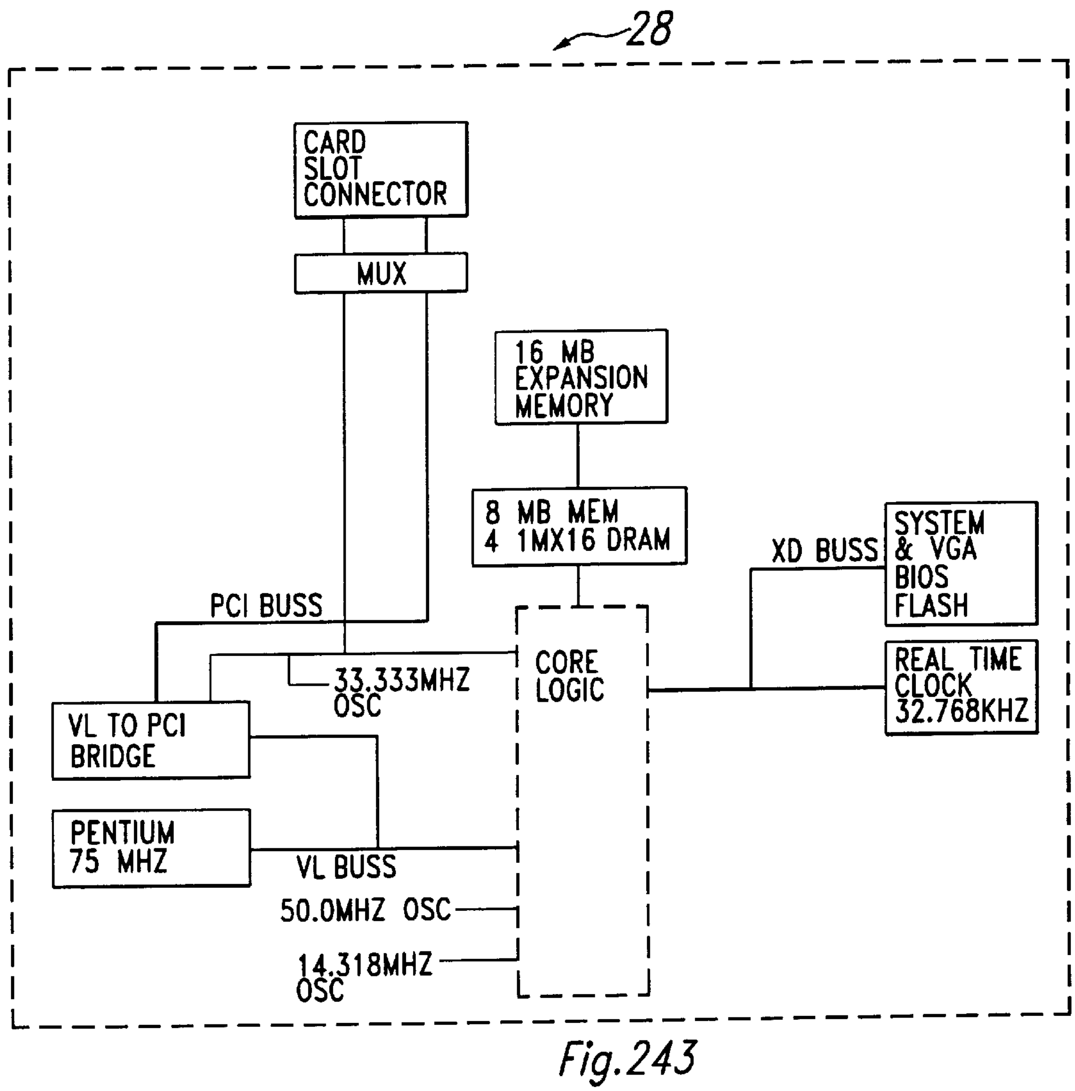
Figure 244:
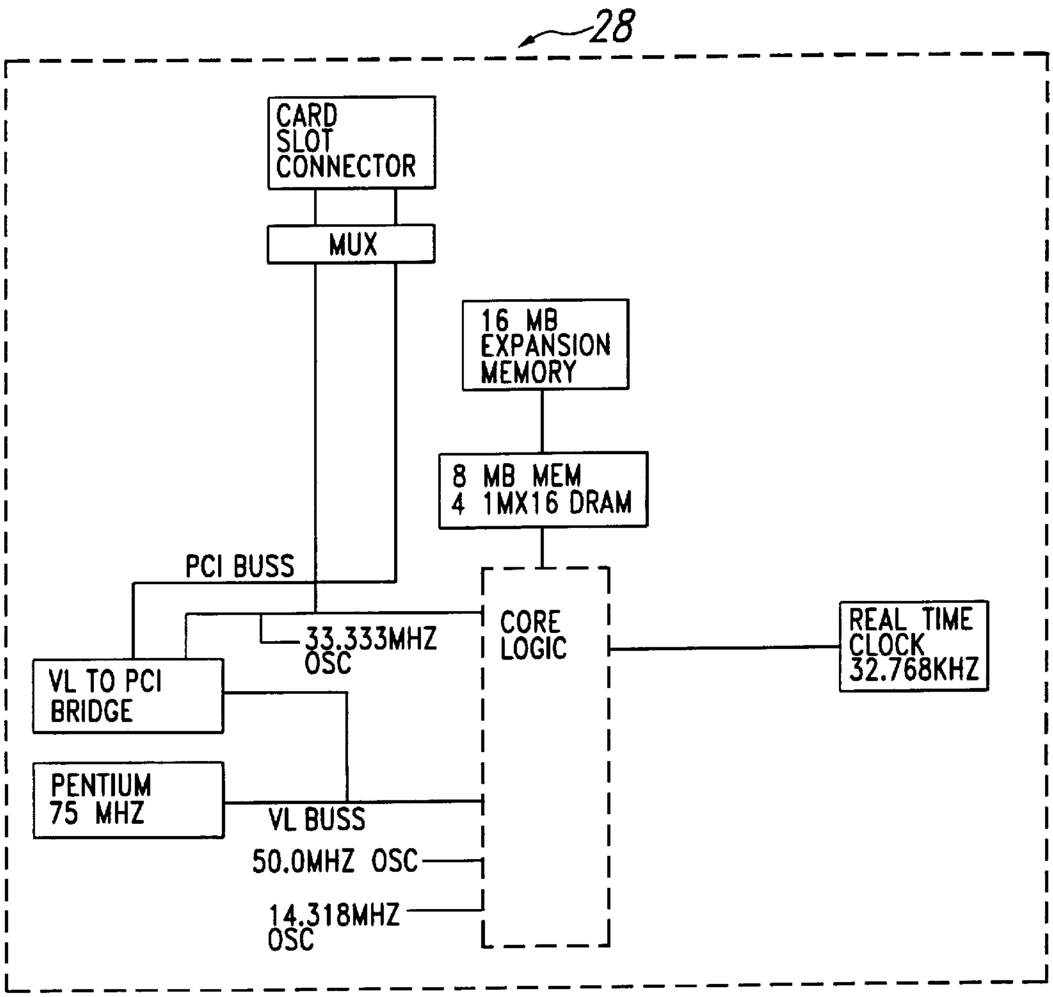
Figure 245:
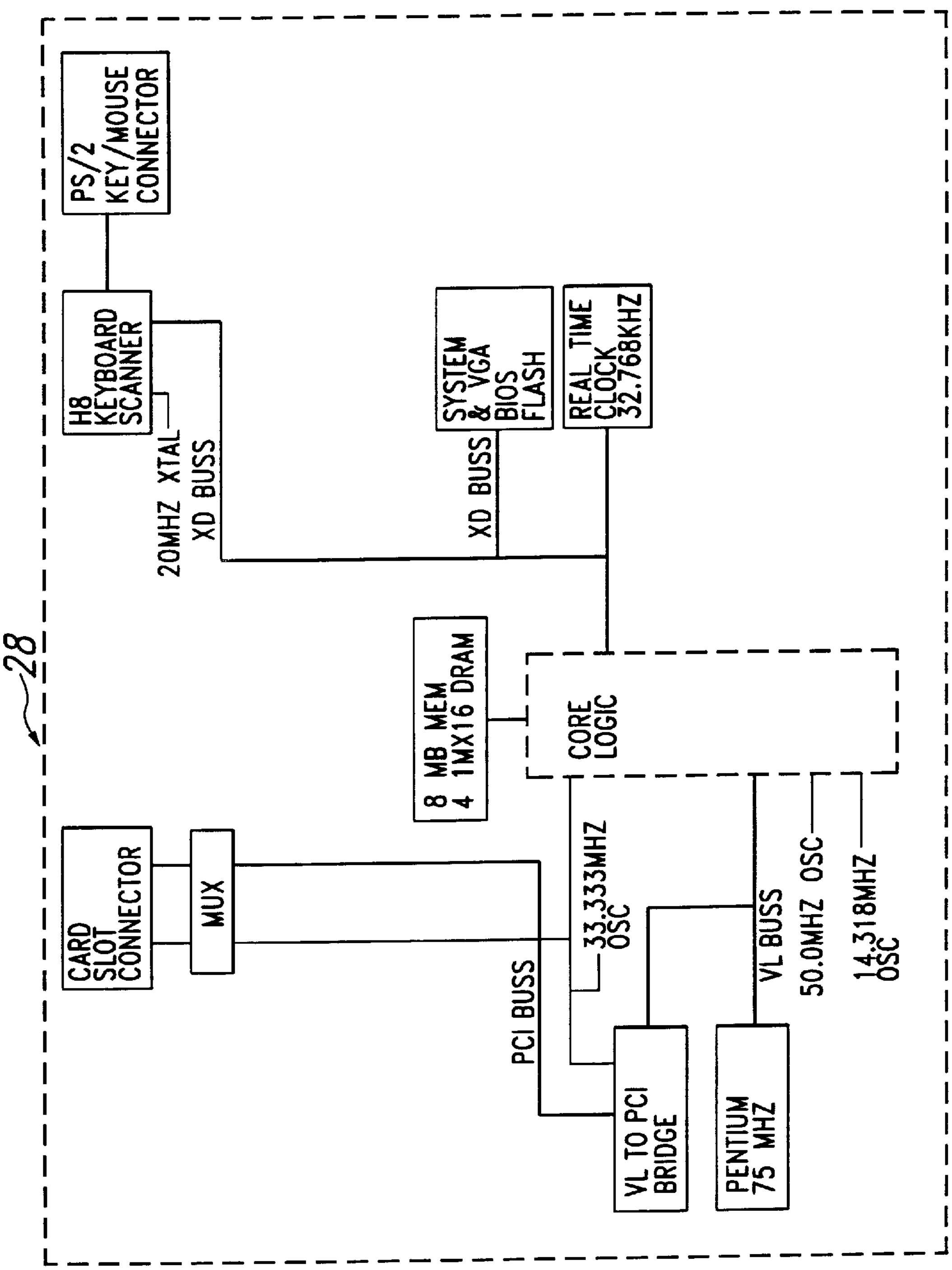
Figure 246:
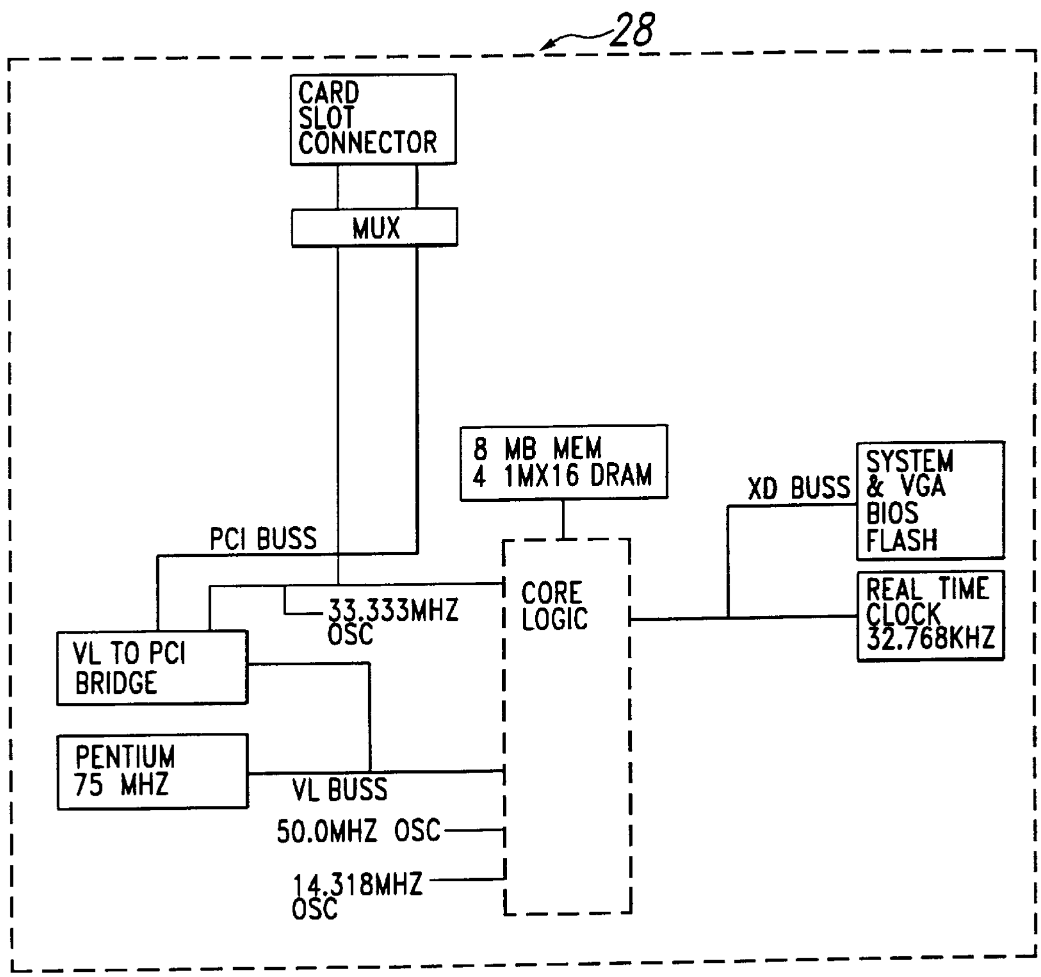
Figure 247:
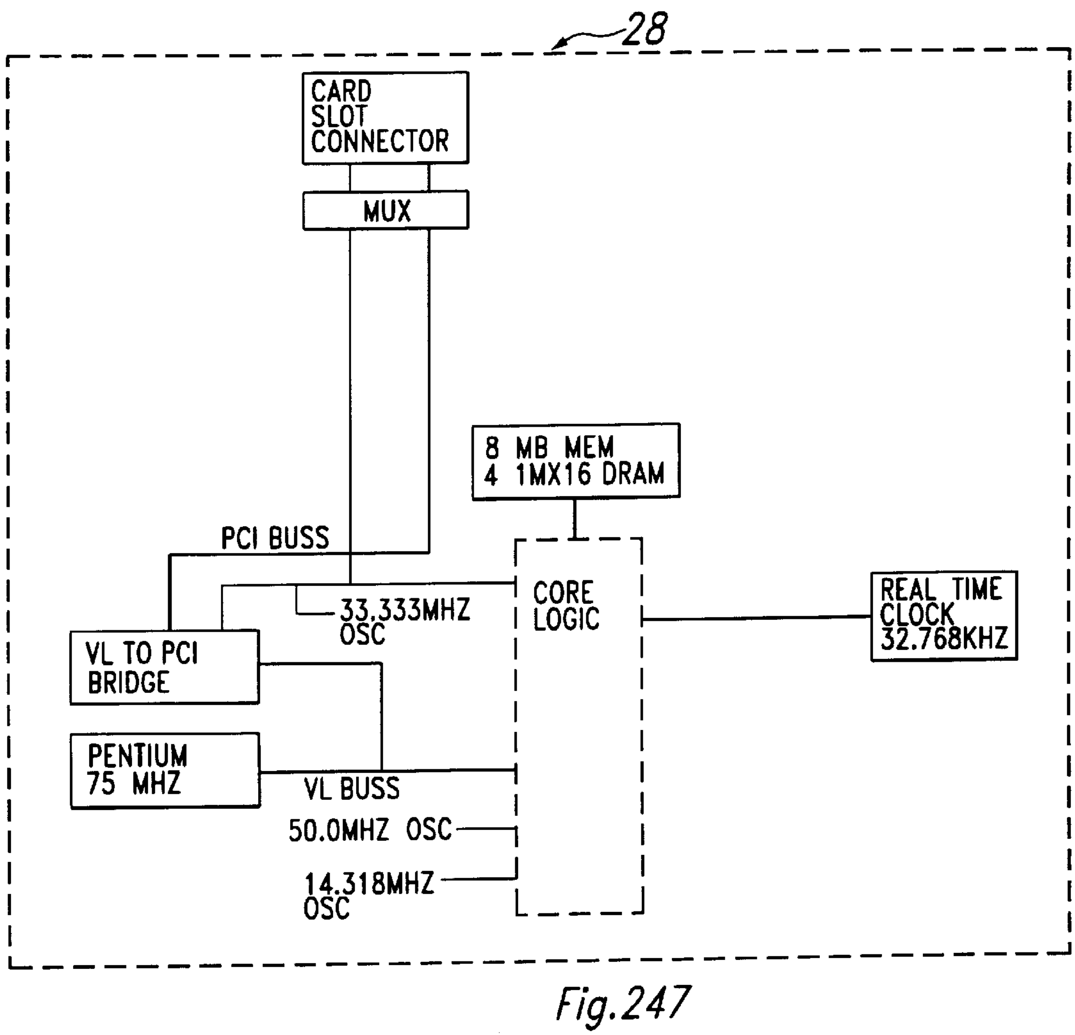
Figure 248:
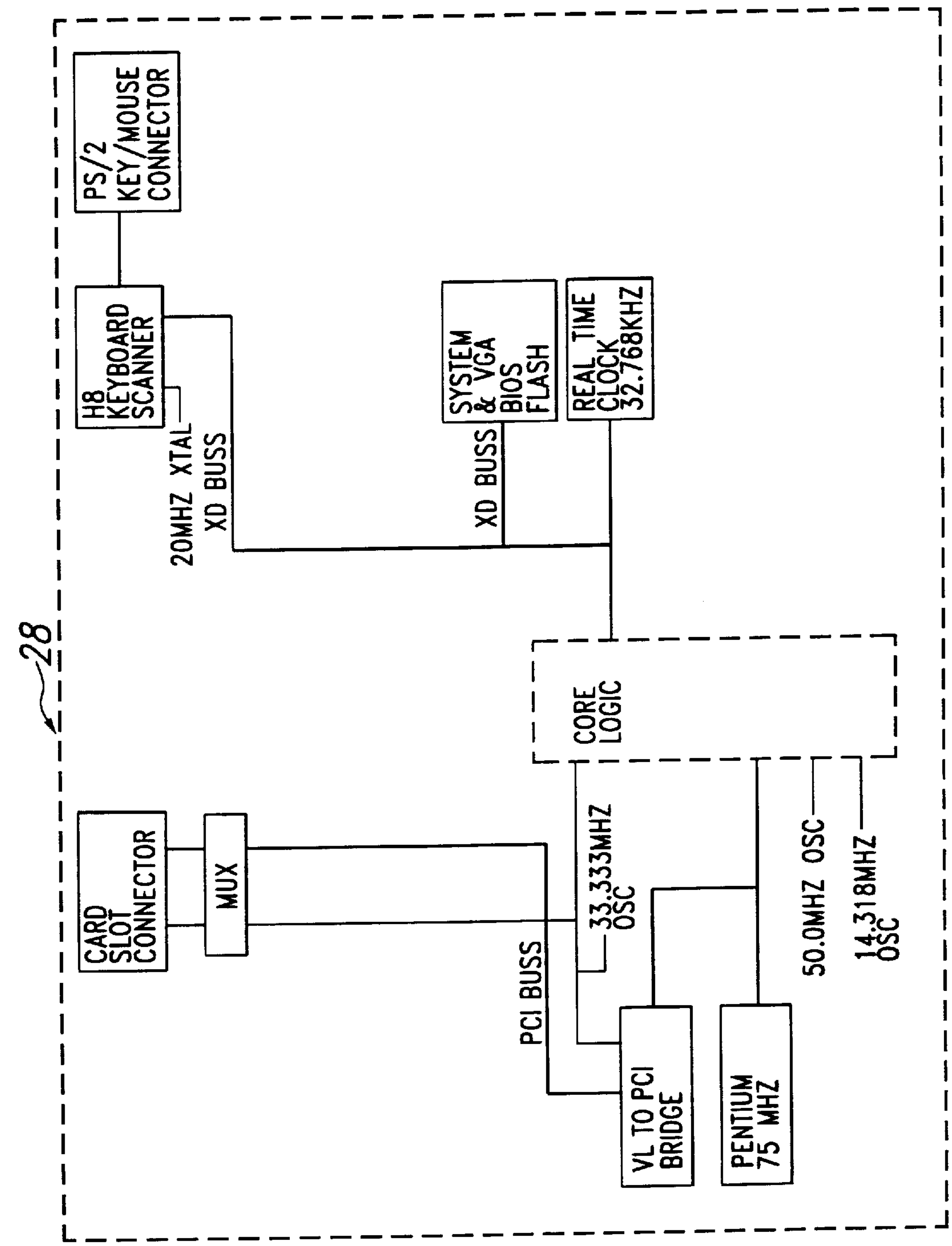
Figure 249:
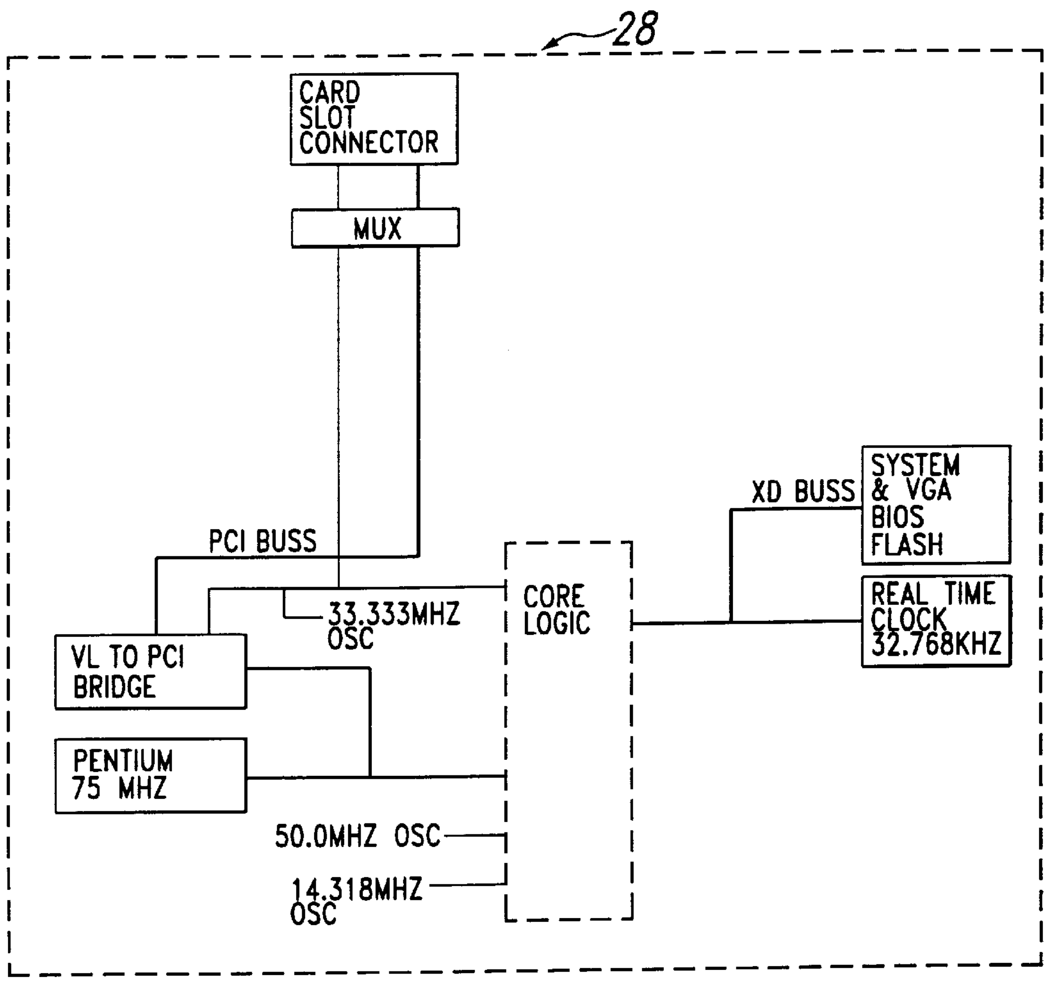
Figure 250:
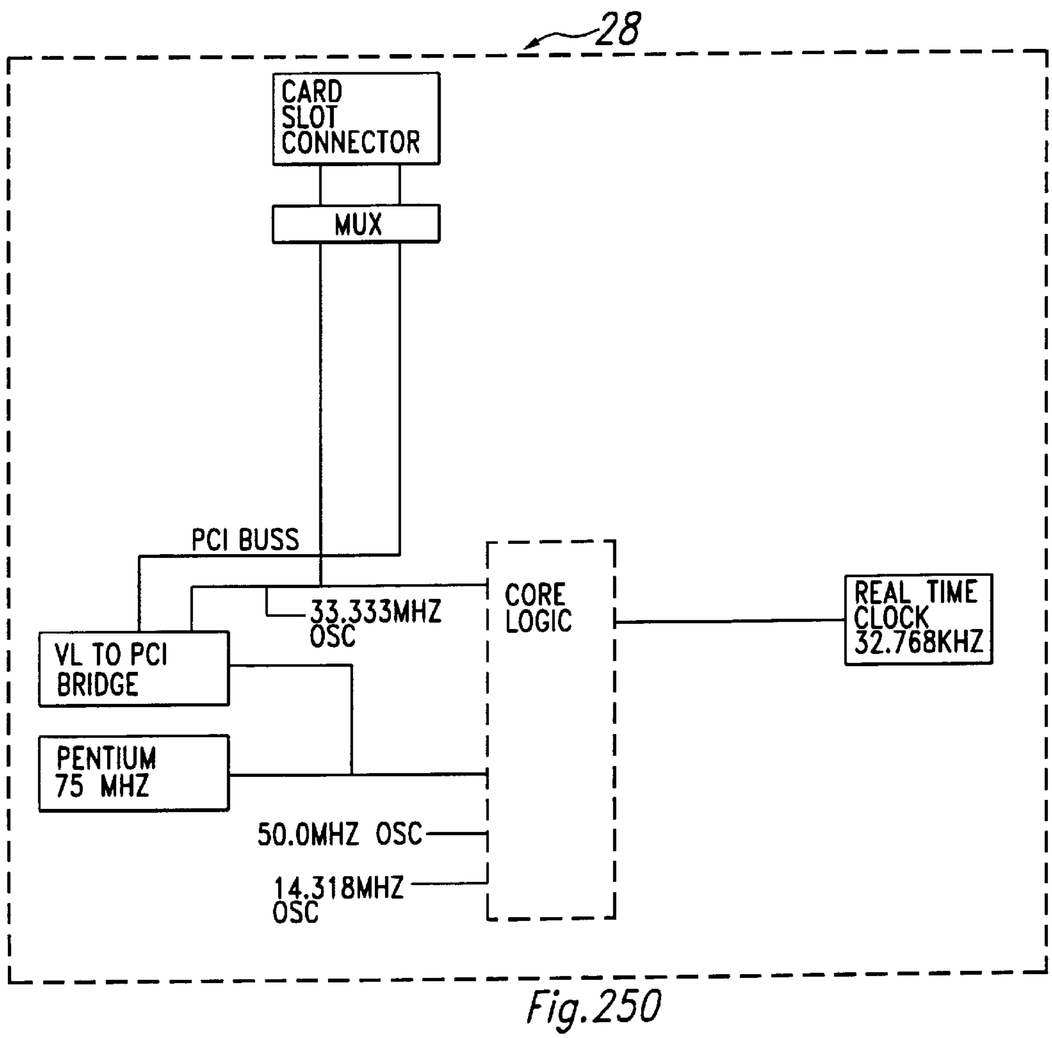
Figure 251:
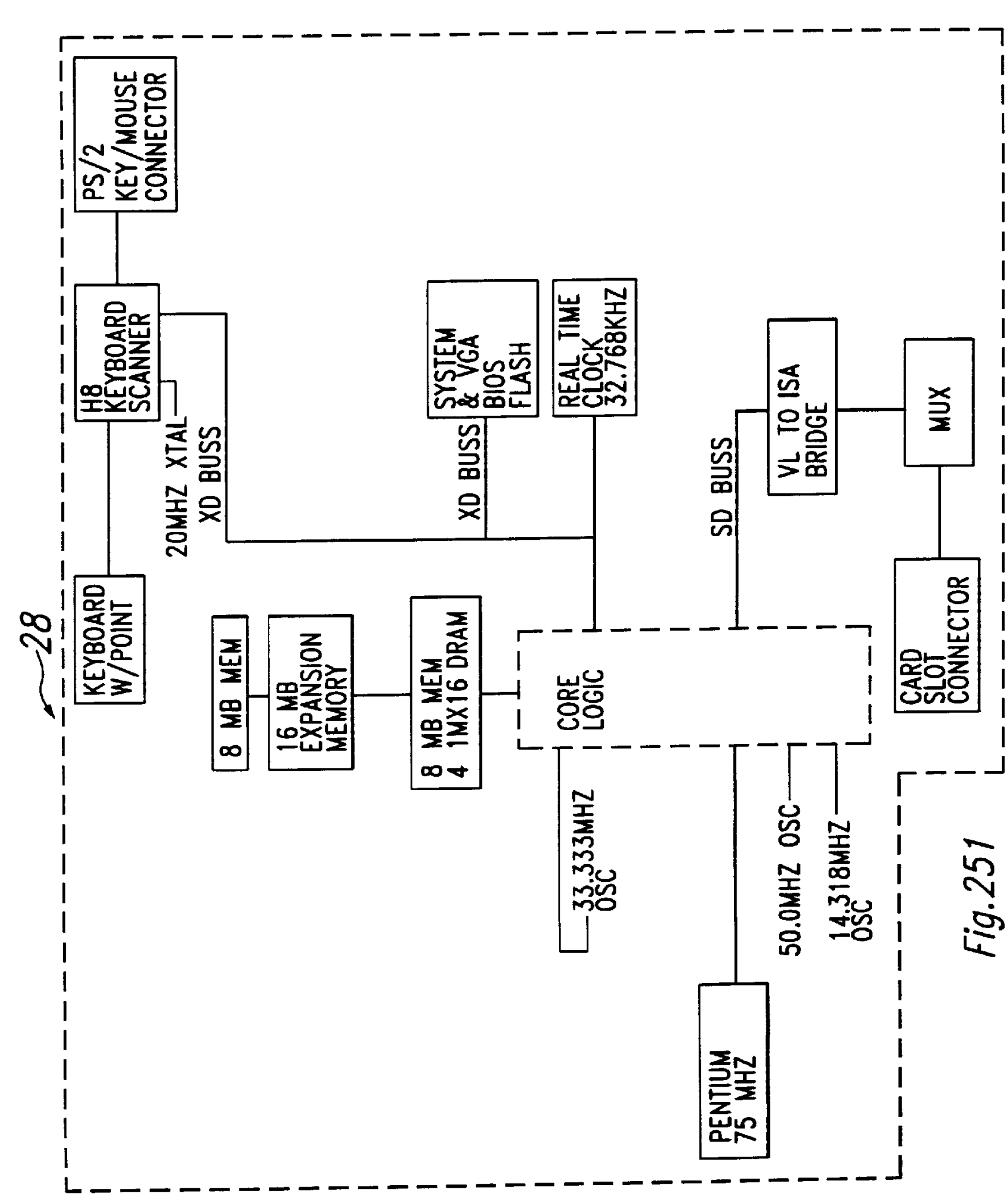
Figure 252:
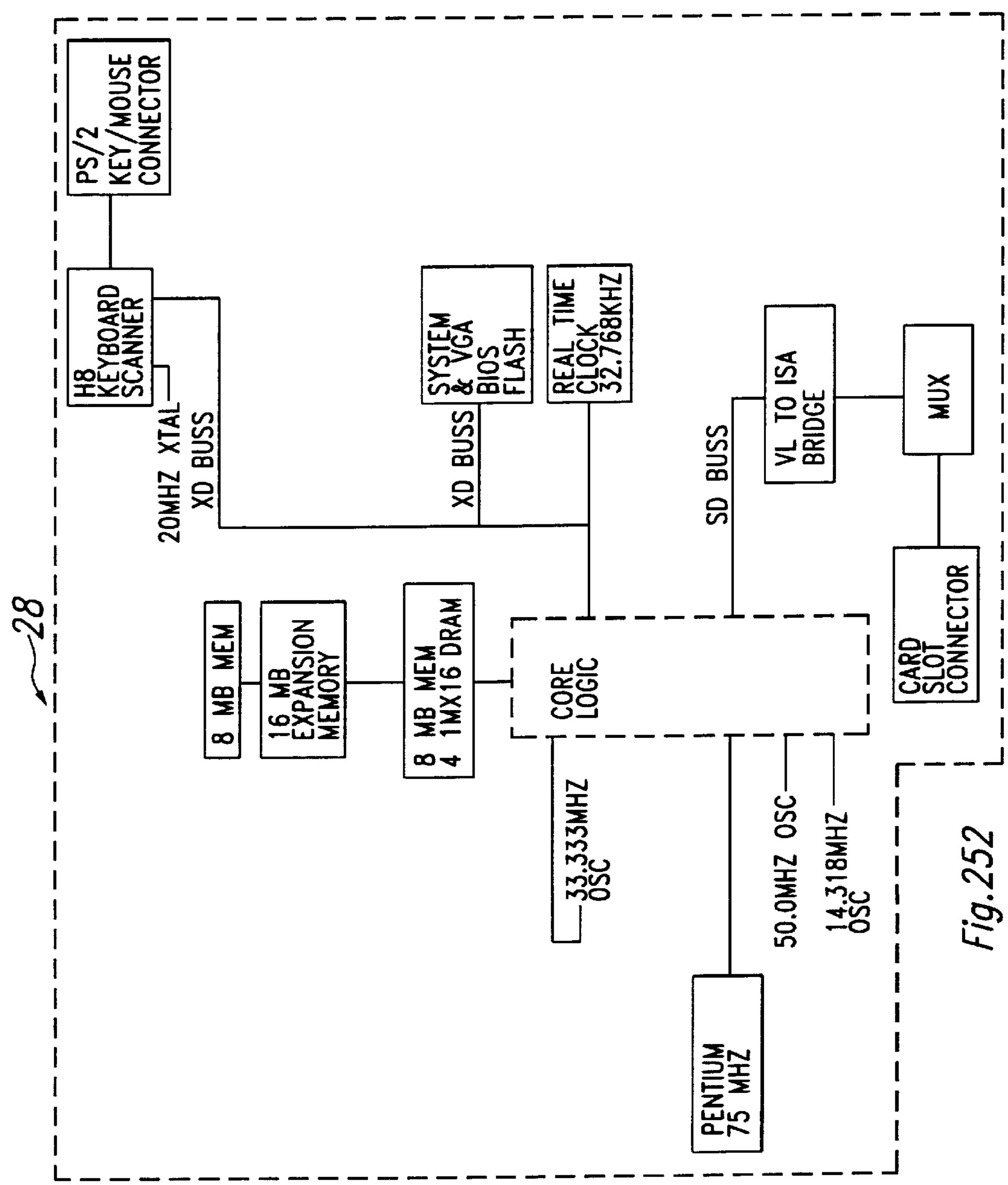
Figure 253:
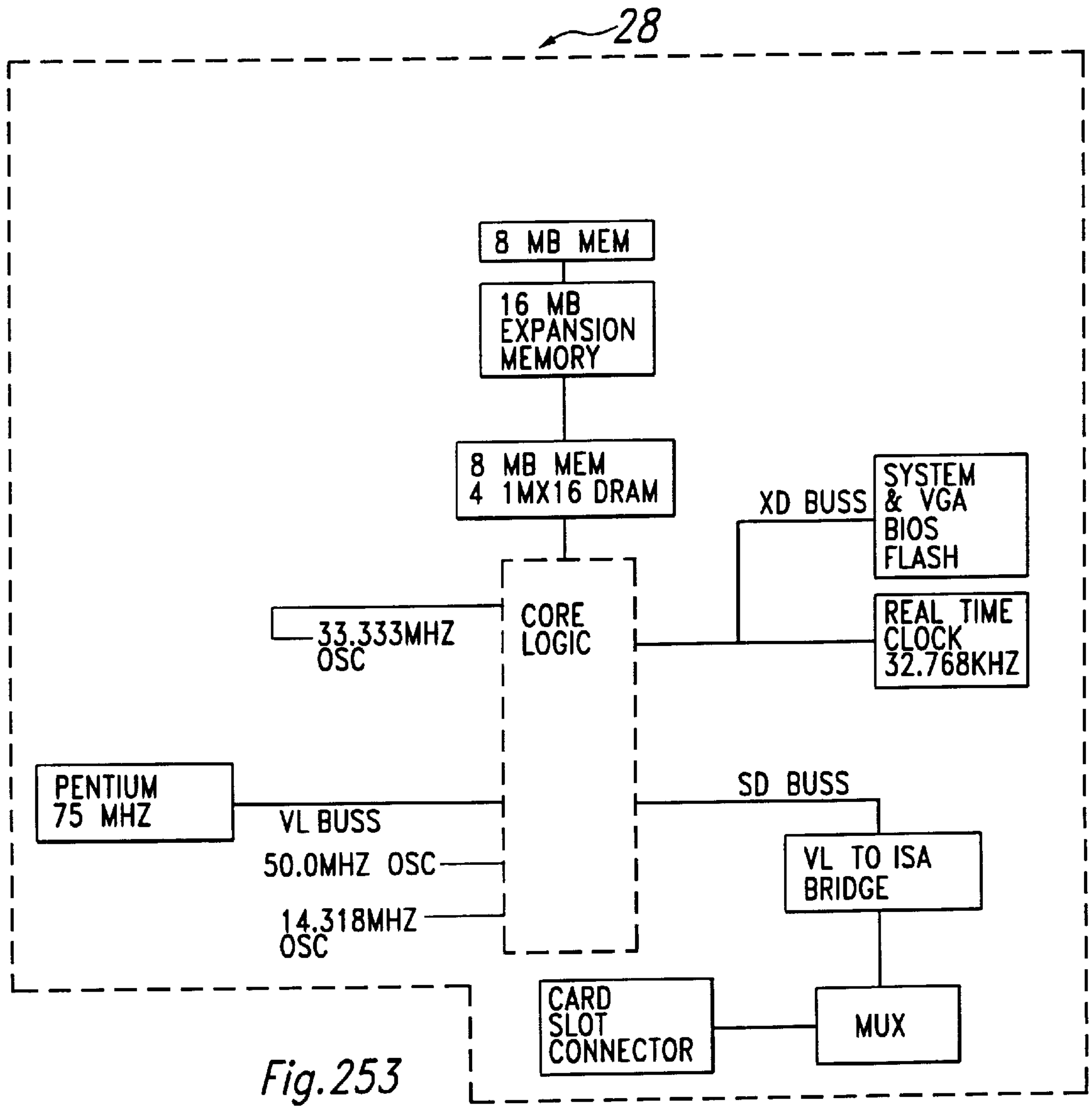
Figure 254:
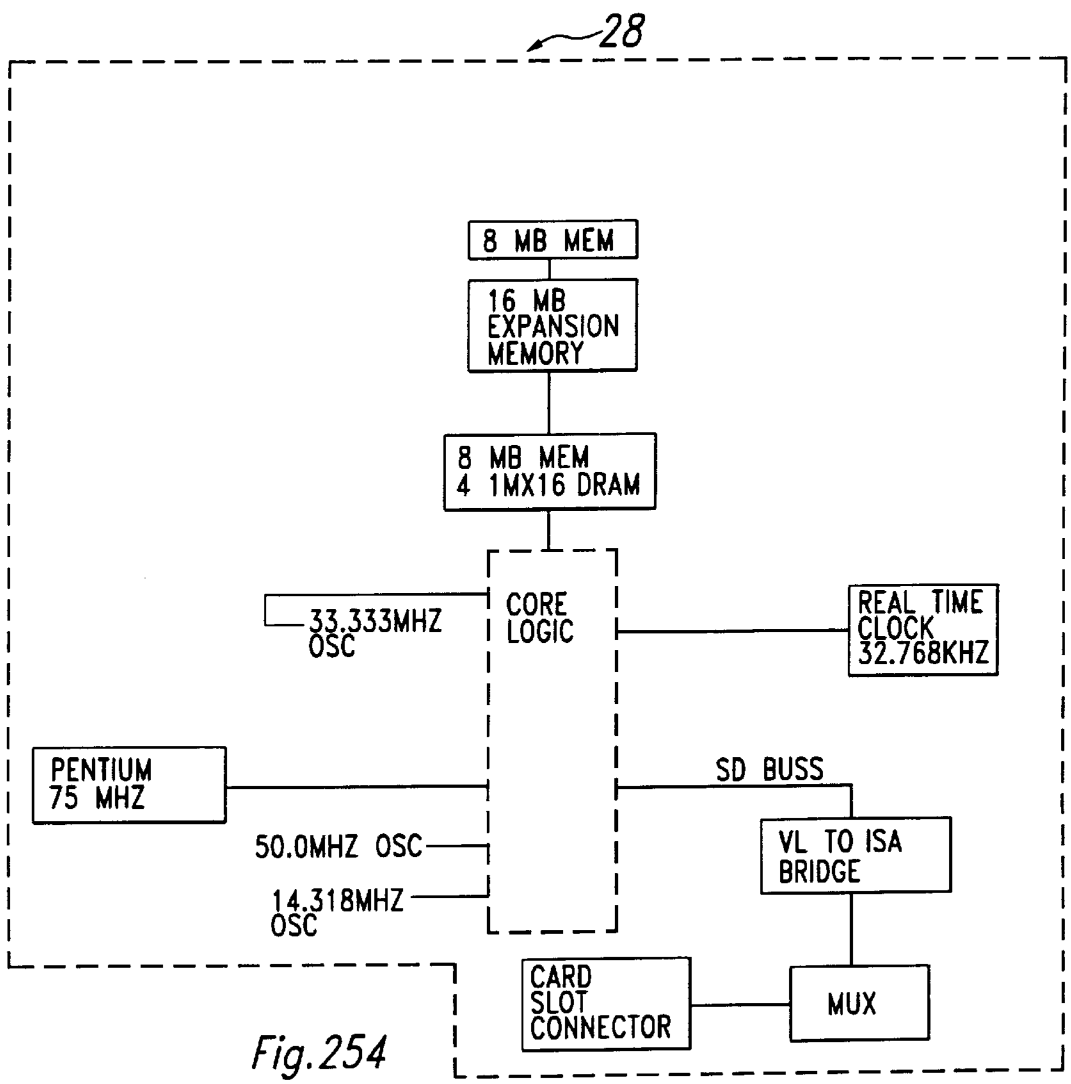
Figure 255:
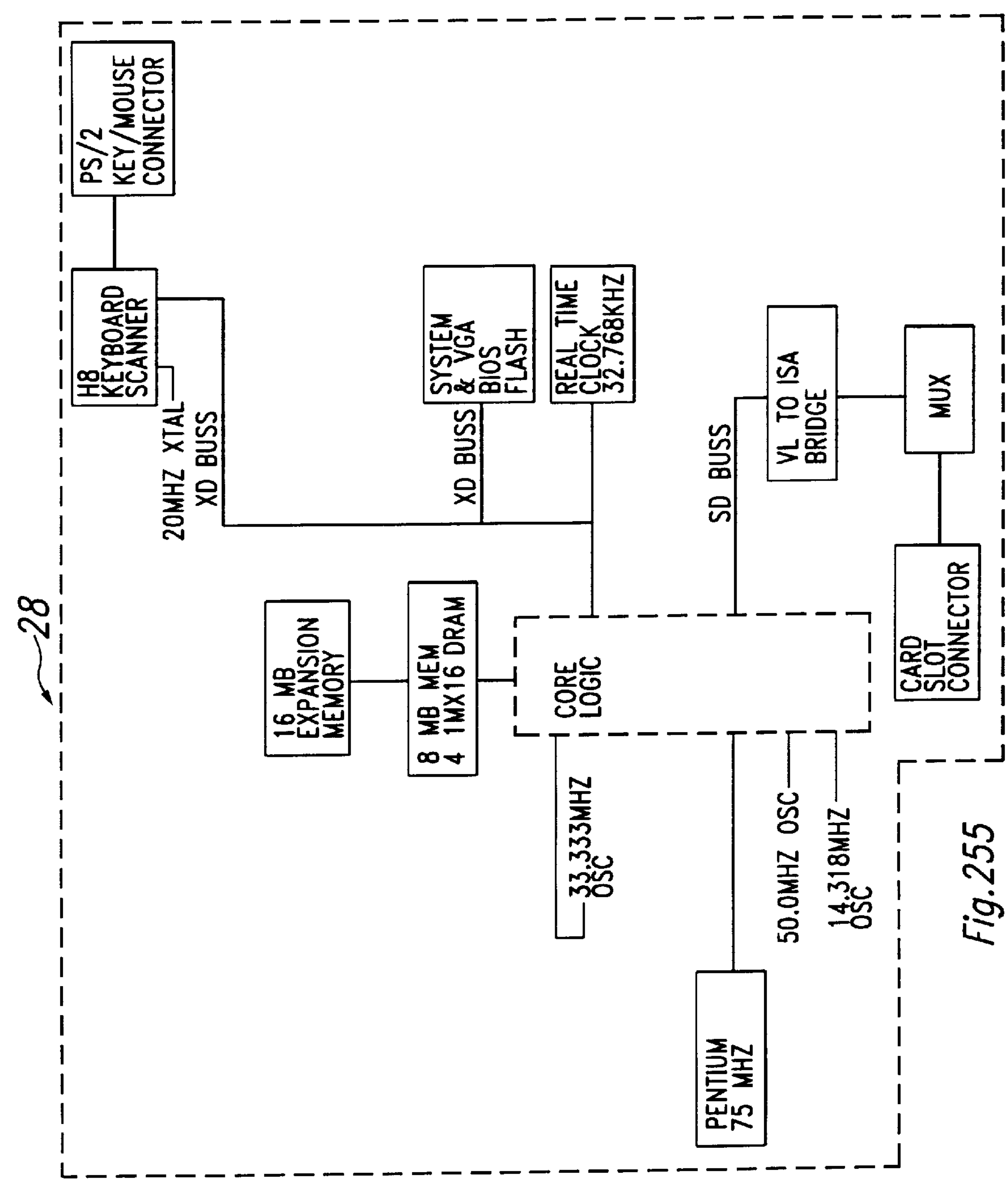
Figure 256:
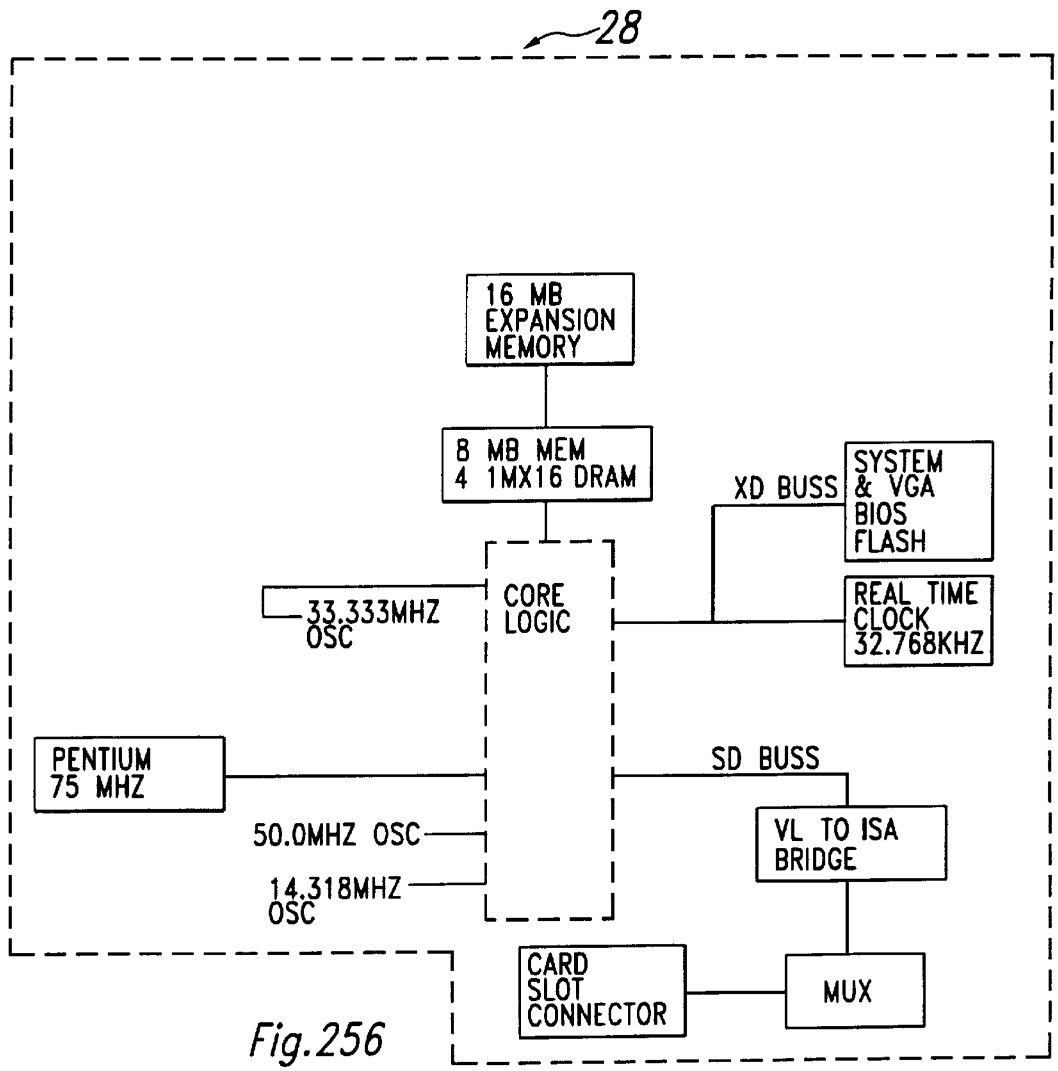
Figure 257:
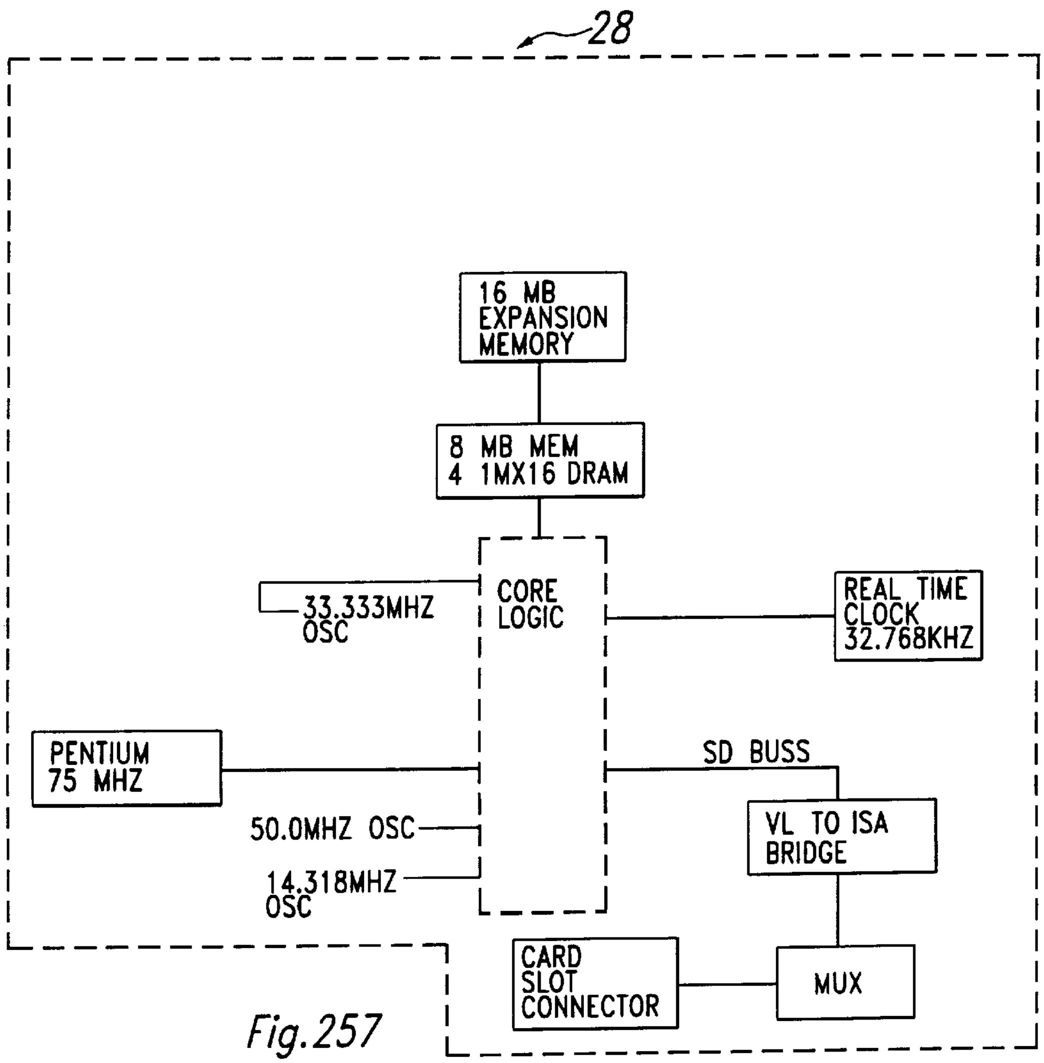
Figure 258:
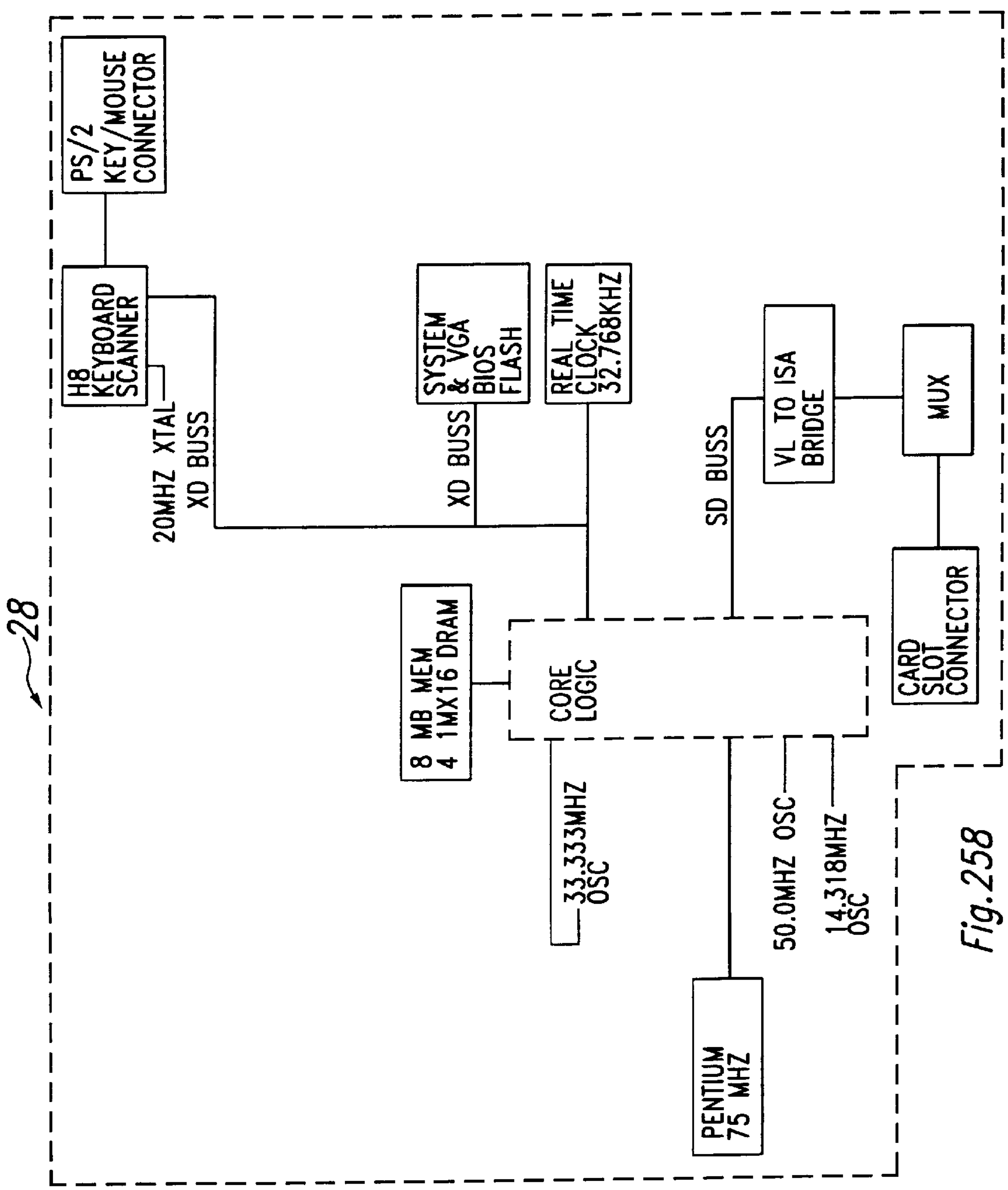
Figure 259:
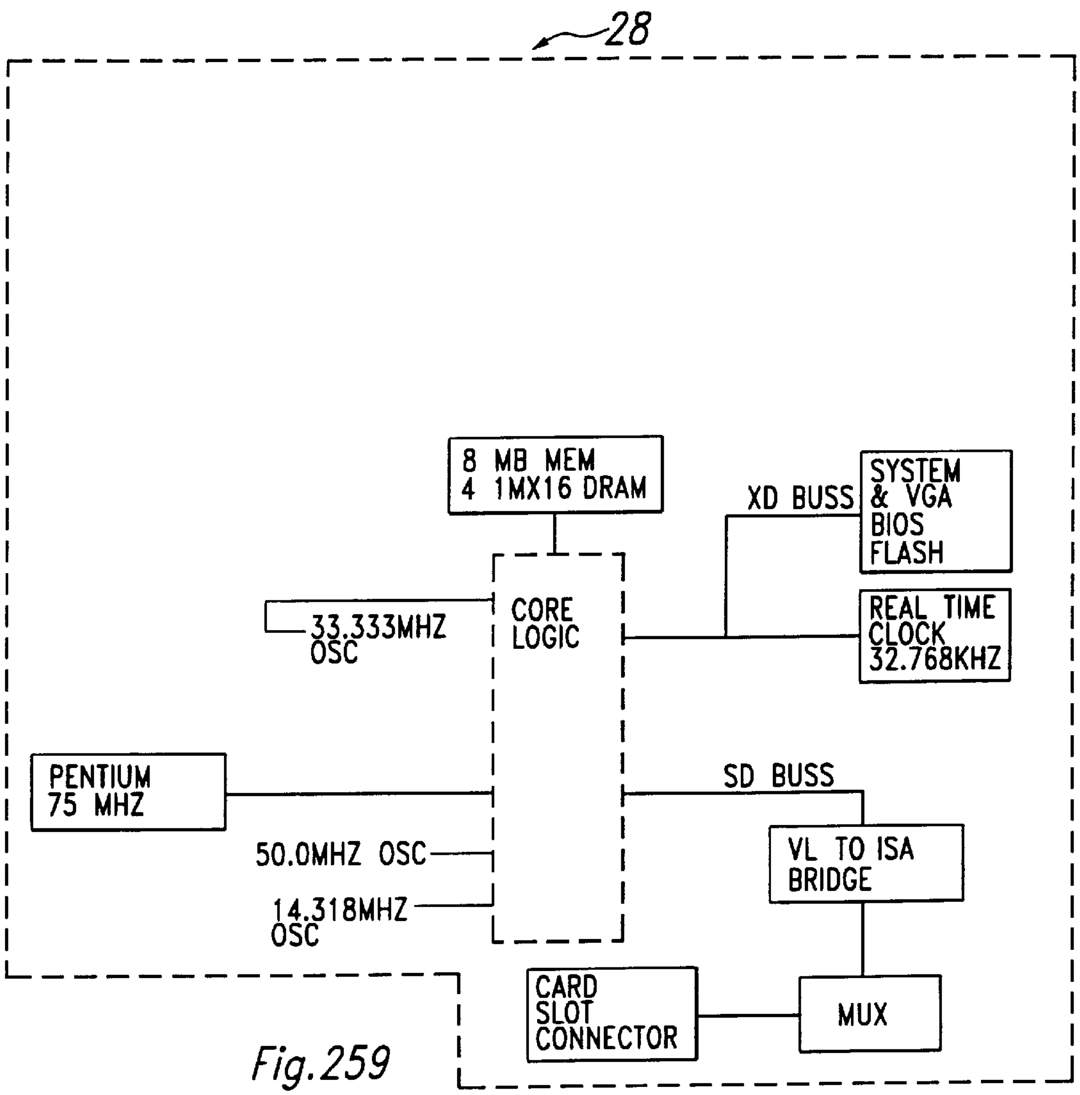
Figure 260:
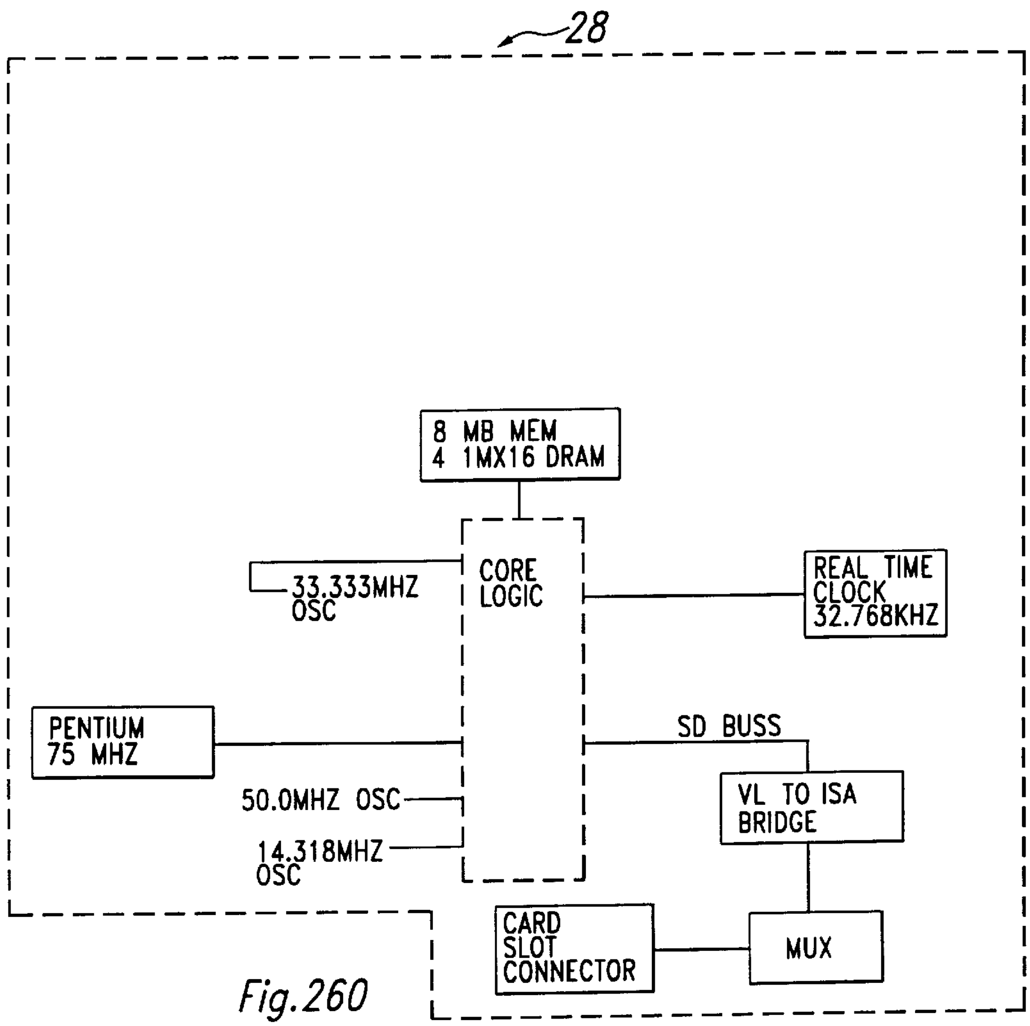
Figure 261:
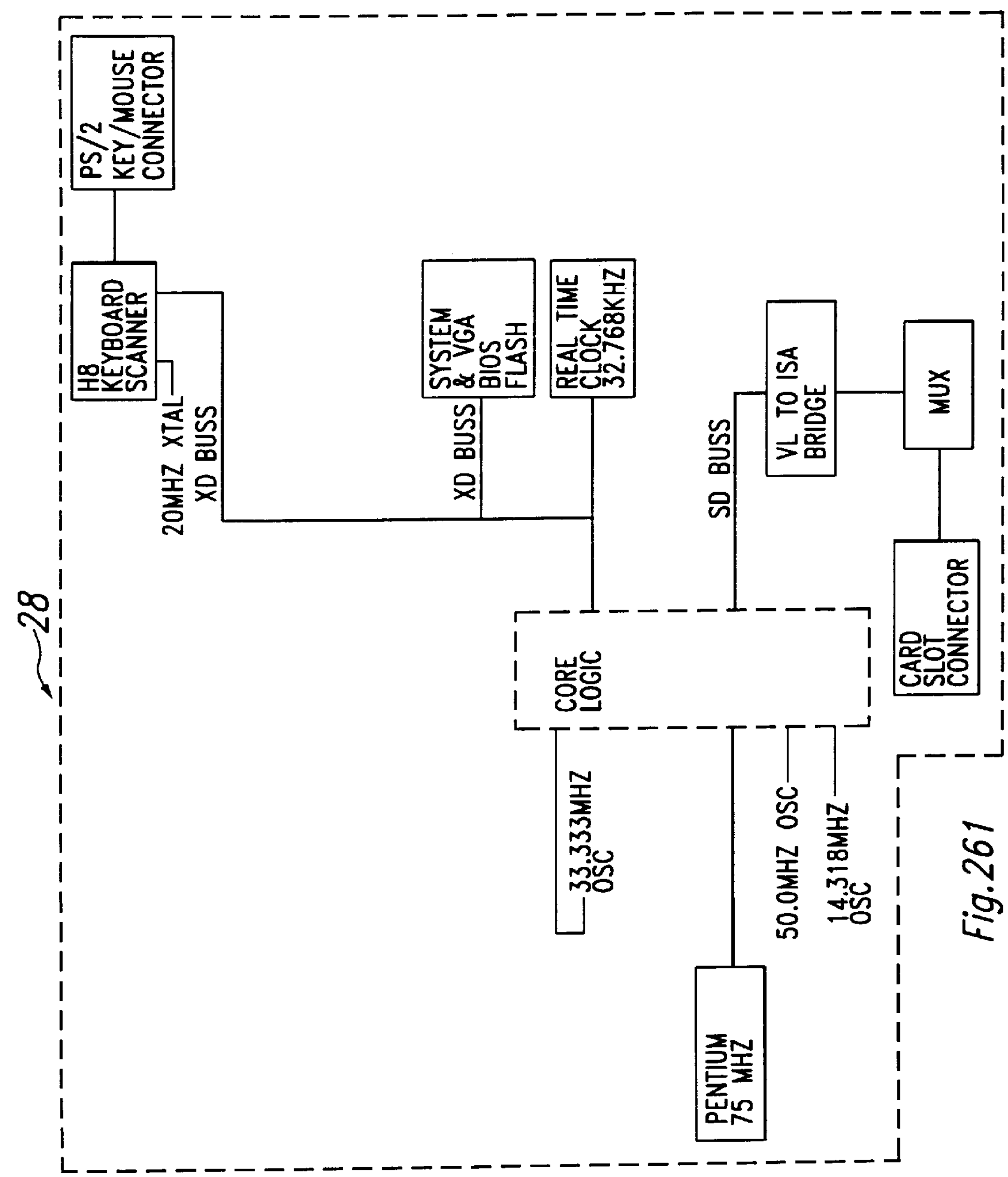
Figure 262:
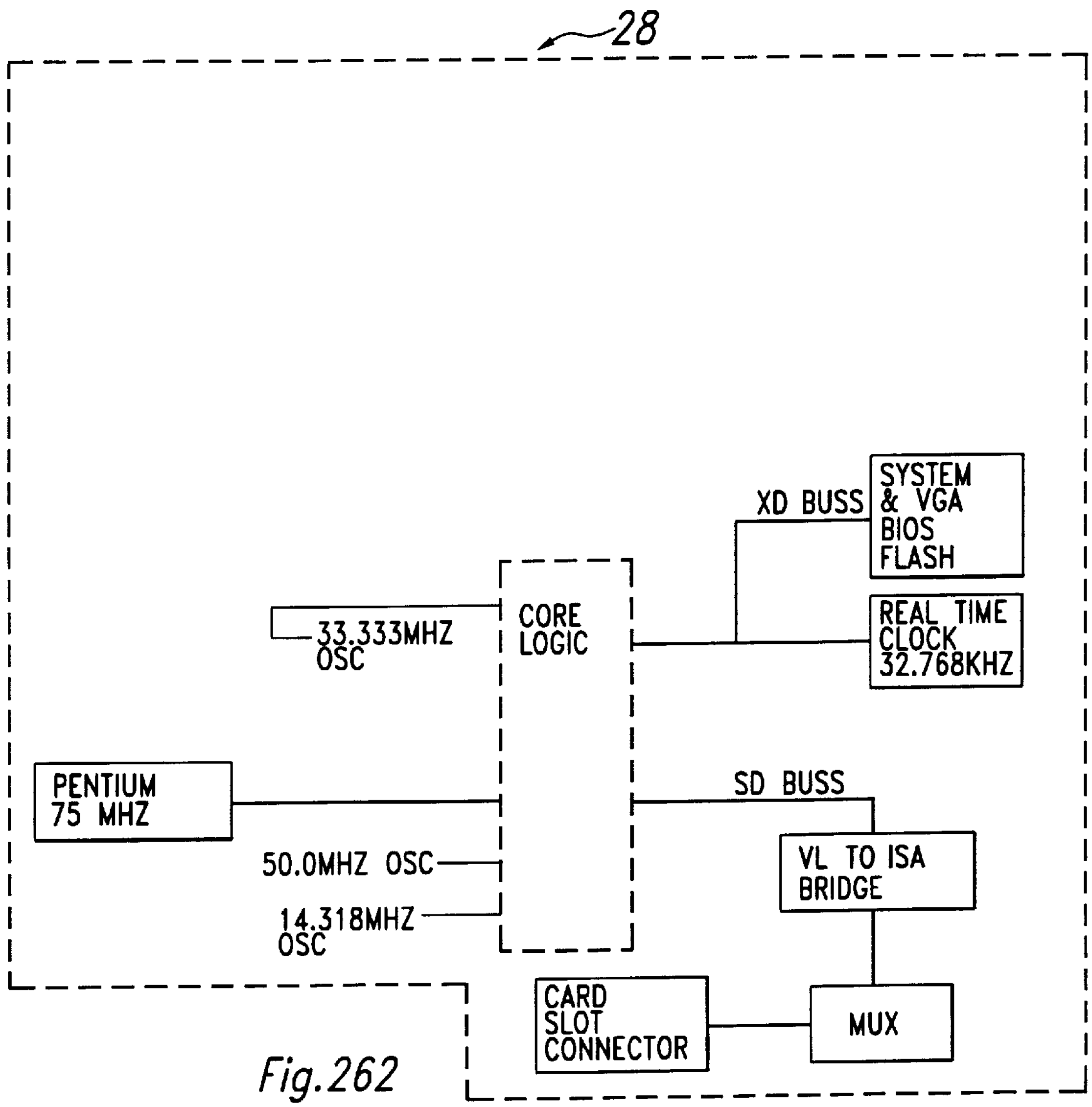
Figure 263:
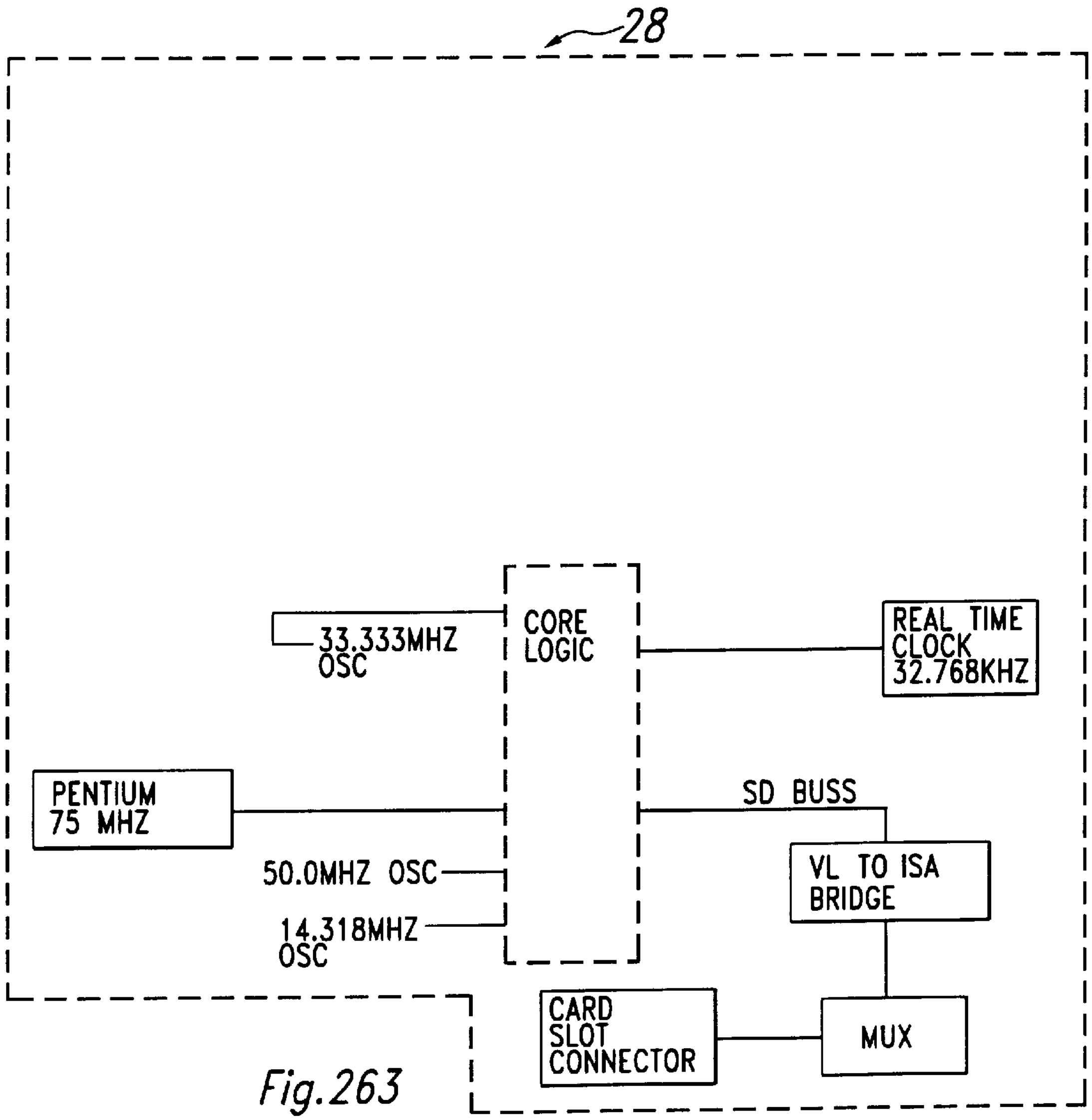

An alternative embodiment of docking station 12 is illustrated in FIG. 134. In this embodiment of the invention, the MUX is located on the system card 28, not located separately in docking station 12. FIG. 135 illustrates a block diagram of a notebook computer hard docked to the docking station 12 illustrated in FIG. 134. FIGS. 136–263 illustrate system cards 28 that may be used in docking station 12 as illustrated in FIG. 134. System cards 28 illustrated in FIGS. 136–263 are the system cards illustrated in FIGS. 5–133, respectively, with the addition of a mux on each card. The docking station and docking system illustrated in FIGS. 134 and 135 operate in substantially the same fashion as the docking station and docking system illustrated in FIGS. 3 and 4.

In another embodiment of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking station 12 illustrated in FIG. 134 (not having a mux separate from system card 28), could utilize the system cards 28 illustrated in FIGS. 5–133 (not having a mux). There were not be a mux in the docking station in this embodiment. Thus, while a mux is preferred, tri-state logic or a software stand PCI interface can also be used.

Figure 264:
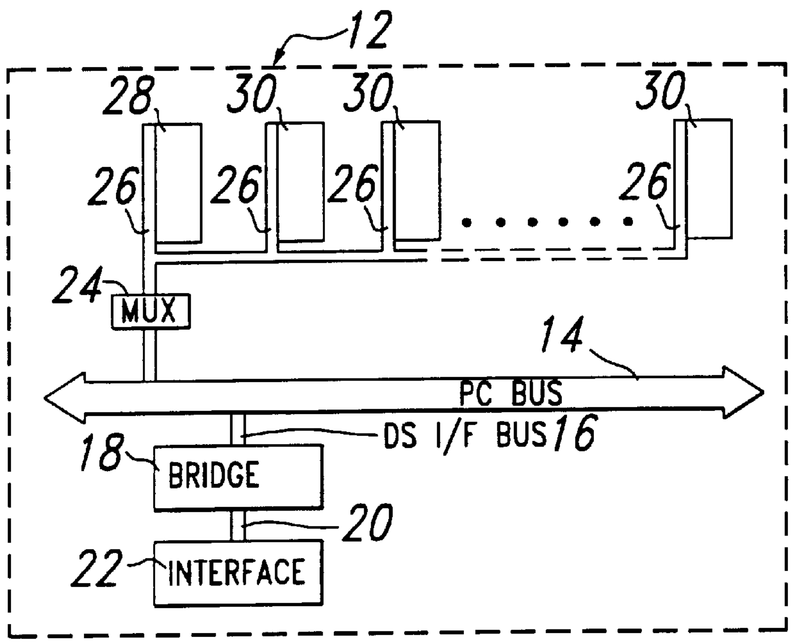
FIG. 264 illustrates an embodiment of the invention in which at least one additional card slot (three actually shown) is added to the docking station of FIG. 3. Each additional card slot 26 is coupled to mux 24. Each additional card slot is coupleable to a card 30. Each card 30 contains at least one resource that is an addition to the resources available on system card 28.
Figure 265:
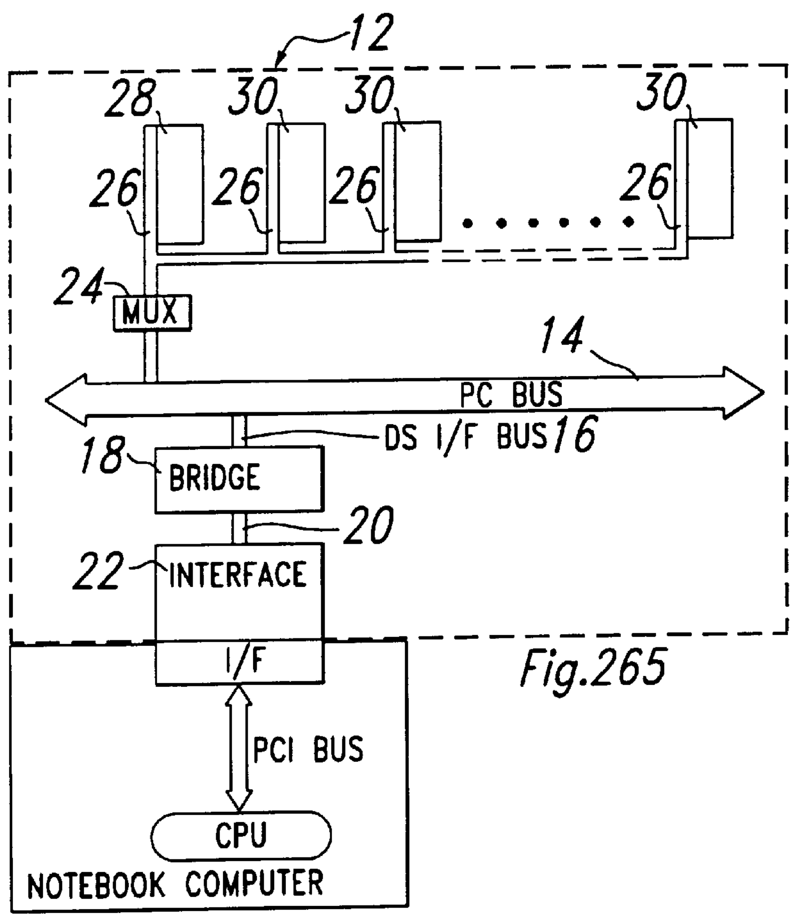
FIG. 265 illustrates a notebook computer hard docked to the docking station of FIG. 254.

In yet another embodiment of the invention, illustrated in FIG. 264, at least one additional card slot (three actually shown) ise added to the docking station of FIG. 3. Each additional card slot 26 is coupled to mux 24. Each additional card slot is coupleable to a card 30. Each card 30 contains at least one resource that is an addition to the resources available on system card 28. Being that cards 30 couple to mux 24, the cpu in the docking station (on system card 28 in this embodiment), controls the resources of cards 30 when the docking station is "undocked". When notebook 10 docks to docking station 12, as illustrated in FIG. 265, it will pull the pin high on the mux which indicates a docked situation. System card 28 on the other side of mux 24 reads the I/O device and signals that it is being docked. The system pulls mux 24 and lets the cpu in notebook 10 have control over the released resources in docking station 12, be they resources on system card 28 and/or card(s) 30. As discussed previously, one way of accomplishing this is to write simple code to the cpu in system card 28 that says "if there is an input (interrupt) from the mux (which you could hook to external interrupt 1 or 2 off of the SMI interrupt on the CPU), the codes see this and says, " read the status—docked or undocked". If docked, the docking station turns over the resources, the CPU quits running on the PCI bus 14 (it doesn't issue any PCI cycles) and throws the mux so that the PCI bus is being driven by the external master and not the CPU in the system card 28. When the mux goes back, then the CPU in system card 28 starts driving the internal PCI bus 14. Thus, in a docked situation with a notebook, notebook may be given partial or full control over the resources of system card 28 and additional cards 30.

Additional cards 30 also provide additional resources and combinations of resources to the docking station. Each card 30 provides another possible configuration. We need to define a new type of PCI device for each configuration. For instance, if a card 30 contained a serial port with a parallel port, the card in a dock situation might simply identify itself as a multifunction PCI device for communications or an SIO (definition previously defined by the PCI committee). The microprocessor in the docking station recognizes a dock request, and releases these resources (in this case the serial port with a parallel port) to whoever is docking and then, if they undock, the microprocessor takes back the resources. In this case, the microprocessor only released the resources of the SIO device. This means that the microprocessor's memory is still under its control, it could be talking on the LAN and collecting data on the LAN and only have released the SIO devices. It could have also identified itself as a multifunction PCI device, such as a "TI thunderlan" and "SIO", in which case the cpu would release the thunderlan and SIO devices to the device that docked to the bridge on the interface. As things are released, the cpu has to identify by type what they are so that the plug-n-play BIOS can say "I know what I am". It is this releasing process that also is part of the bridge and interface, the interface identifies the type of devices that he needs. As an example, if the interface is an RF, a dock request is sent to the bridge, but, for example, "I don't want the monitor because I'm remote"—therefore, don't report that monitor to the plug-n-play device. Leave the monitor configured to the main system. So, that's part of the intelligence at the device level and the hand shake going back and forth is what devices do you want and what devices are available. Depending on the type of dock, and how many people are docking, depends on what device get released.

There may also be other configurations. One confiuration (configuration #1) might be a display, a keyboard, a CPU, memory, whereas another configuration (configuration #2) might have just a hard drive. Yet another configuration (configuration #3) might have a hard drive and a CD ROM. So, by recognizing the configuration type, you can now decide what drivers get invoked in the docking station because you have made the connection. What drivers still work and hardware still works in either the notebook computer (remote master or fixed master) while docked to the docking station. The result is a complete plug-n-play cycle happening. The idea is that you have the bridges—RF bridge, special bridge in the PCI, and the bridge in the notebook knows how to take the PCI information, turn it into a signal that sends a command to the interface module which turns around and puts it back into the PCI configuration which sends the information to the bridge at which time now it starts configuring the bridge. This architecture is bus independent. The bus has to have protocols across the bus to recognize devices.

FIGS. 266–316 illustrate block diagrams of various embodiments of cards 30 that can be used in combination with docking station 12 illustrated in FIG. 264. The card slot connector on each card 30 couples to a mating connector in card slot 26 in docking station 12.

Figure 266:
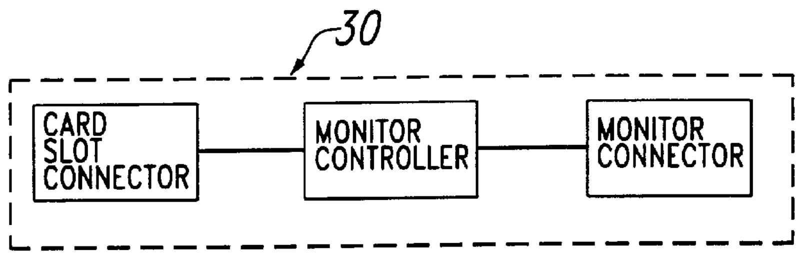
FIGS. 266–316 illustrate block diagrams of various embodiments of cards 30 that can be used in combination with the docking station illustrated in FIG. 264. The card slot connector on each card 30 couples to a respective mating connector in a card slot in the docking station. More specifically.

FIG. 266 illustrates a block diagram of a card 30 having a monitor controller coupling a monitor connector to a card slot connector.

Figure 267:
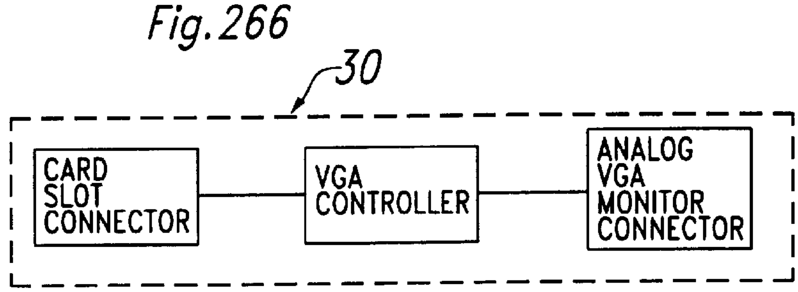

FIG. 267 illustrates a block diagram of a card 30 having a VGA controller coupling an analog VGA monitor connector to a card slot connector.

Figure 268:
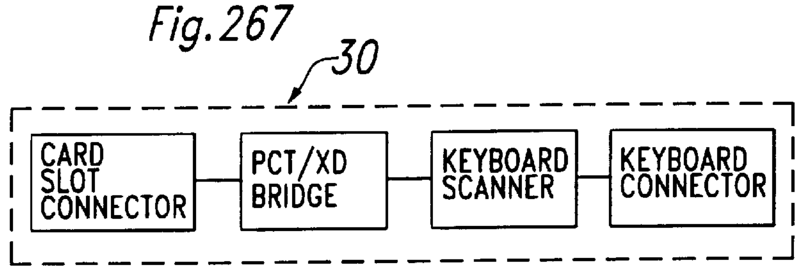

FIG. 268 illustrates a block diagram of a card 30 having a keyboard scanner coupling a keyboard connector to a PCI/XD bridge which is coupled to a card slot connector.

Figure 269:
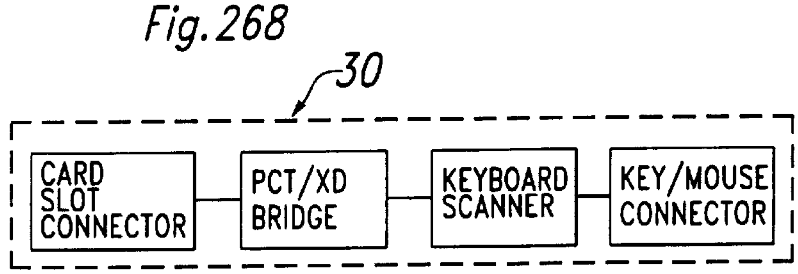

FIG. 269 illustrates a block diagram of a card 30 having a keyboard scanner coupling a key/mouse connector to a PCI/XD bridge which is coupled to a card slot connector.

Figure 270:
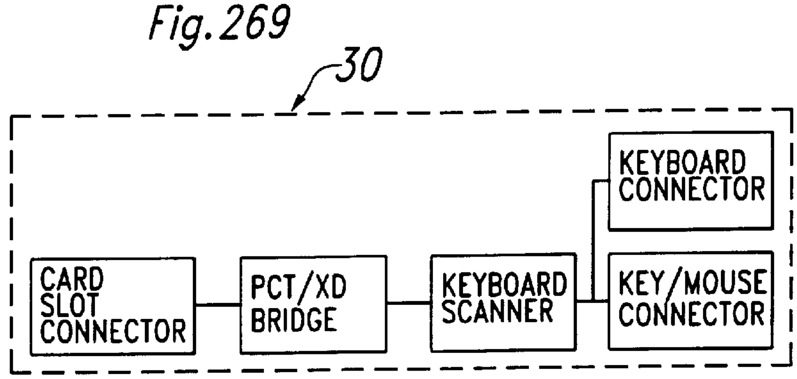

FIG. 270 illustrates a block diagram of a card 30 having a keyboard scanner coupling a keyboard connector and a key/mouse connector to a PCI/XD bridge which is coupled to a card slot connector.

Figure 271:
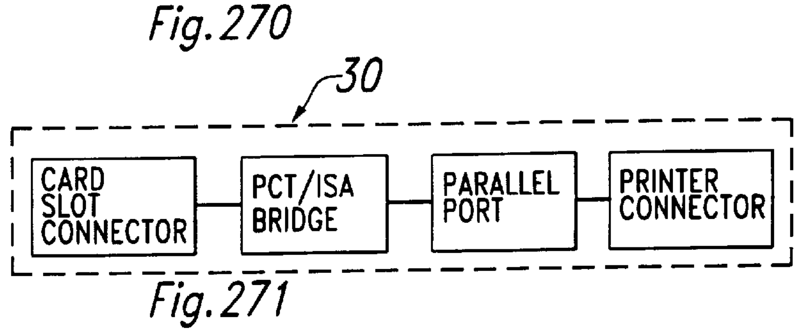

FIG. 271 illustrates a block diagram of a card 30 having a parallel port coupling a printer connector to a PCI/ISA bridge which is coupled to a card slot connector.

Figure 272:
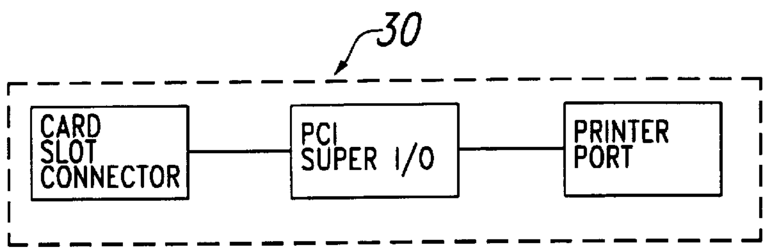

FIG. 272 illustrates a block diagram of a card 30 having a PCI Super I/O coupling a printer port to a card slot connector.

Figure 273:
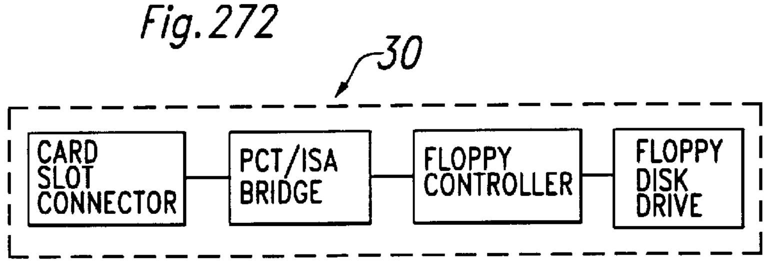

FIG. 273 illustrates a block diagram of a card 30 having a floppy controller coupling a floppy disk drive to a PCI/ISA bridge which is coupled to a card slot connector.

Figure 274:
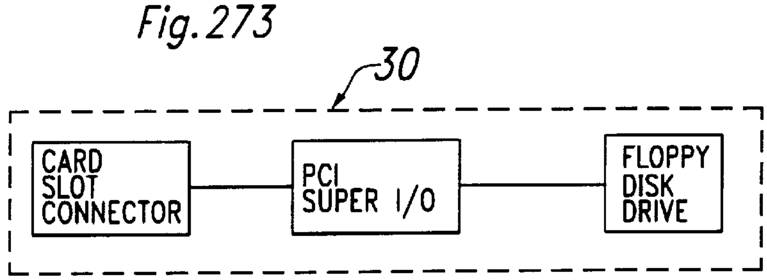

FIG. 274 illustrates a block diagram of a card 30 having a PCI Super I/O coupling a floppy disk drive to a card slot connector.

Figure 275:
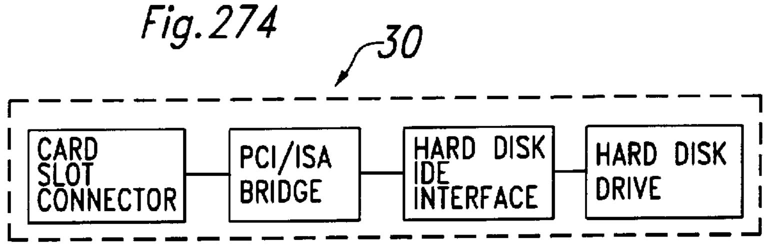

FIG. 275 illustrates a block diagram of a card 30 having a hard disk IDE interface coupling a hard disk drive to a PCI/ISA bridge which is coupled to a card slot connector.

Figure 276:
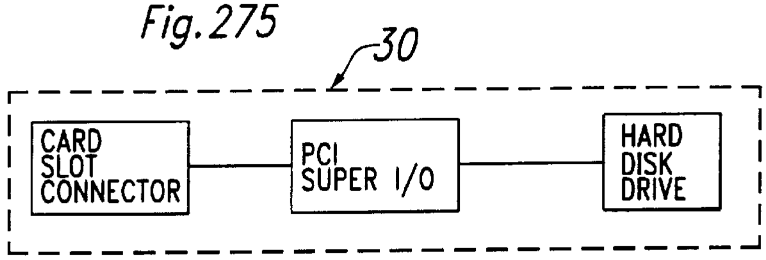

FIG. 276 illustrates a block diagram of a card 30 having a PCI Super I/O coupling a hard disk drive to a card slot connector.

Figure 277:
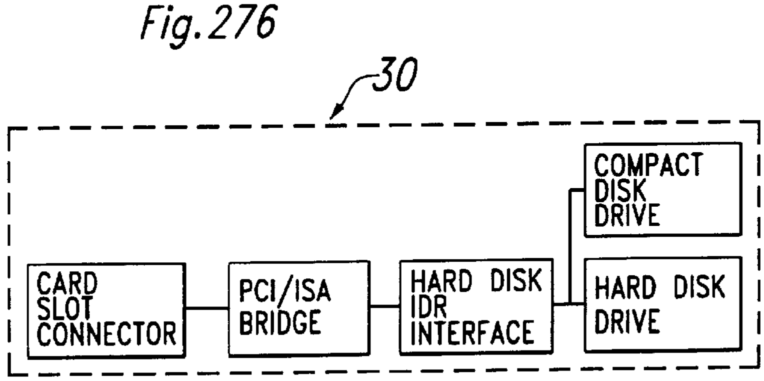

FIG. 277 illustrates a block diagram of a card 30 having a hard disk ide interface coupling a compact disk drive and a hard disk drive to a PCI/ISA bridge which is coupled to a card slot connector.

Figure 278:
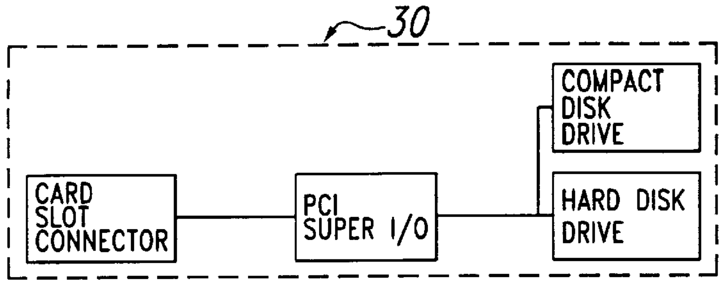

FIG. 278 illustrates a block diagram of a card 30 having a PCI Super I/O coupling a compact disk drive and a hard disk drive to a card slot connector.

Figure 279:
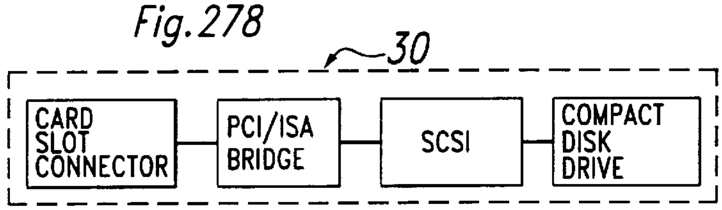

FIG. 279 illustrates a block diagram of a card 30 having an SCSI device coupling a compact disk drive to a PCI/ISA bridge which is coupled to a card slot connector.

Figure 280:
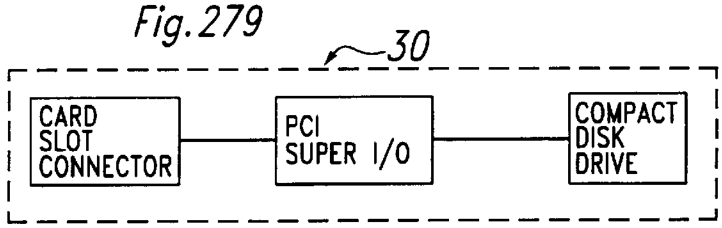

FIG. 280 illustrates a block diagram of a card 30 having a PCI Super I/O coupling a compact disk drive to a card slot connector.

Figure 281:
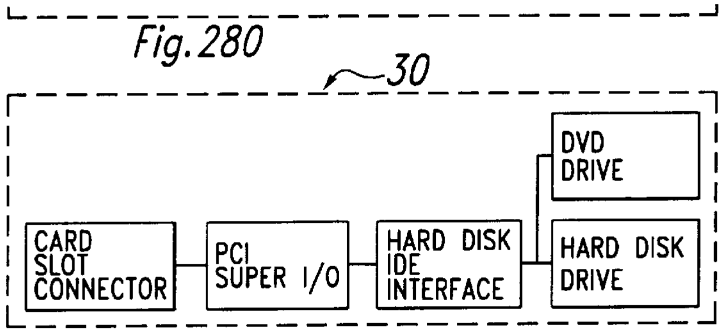

FIG. 281 illustrates a block diagram of a card 30 having a hard disk ide interface coupling a DVD drive (digital video disk/device) and a hard disk drive to a PCI/ISA bridge which is coupled to a card slot connector.

Figure 282:
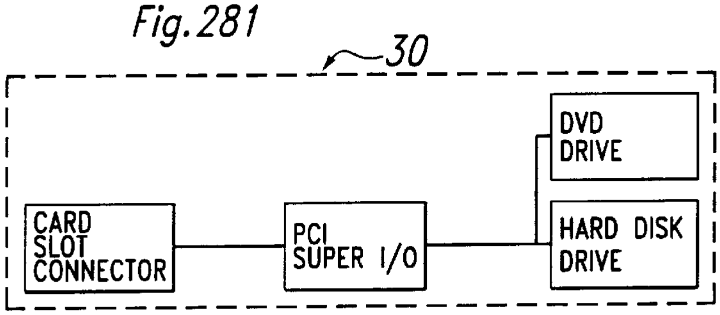

FIG. 282 illustrates a block diagram of a card 30 having a PCI Super I/O coupling a DVD drive and a hard disk drive to a card slot connector.

Figure 283:
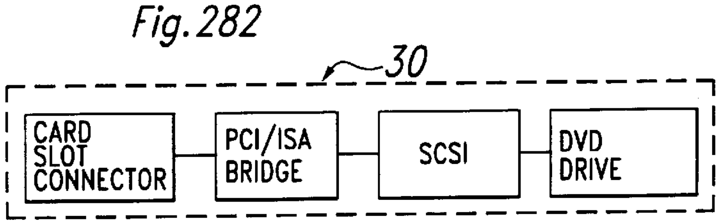

FIG. 283 illustrates a block diagram of a card 30 having an SCSI device coupling a DVD drive to a PCI/ISA bridge which is coupled to a card slot connector.

Figure 284:
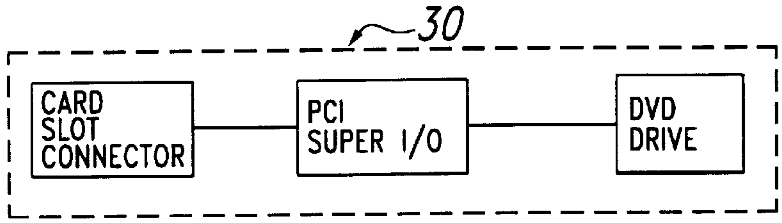

FIG. 284 illustrates a block diagram of a card 30 having a PCI Super I/O coupling a DVD drive to a card slot connector.

Figure 285:
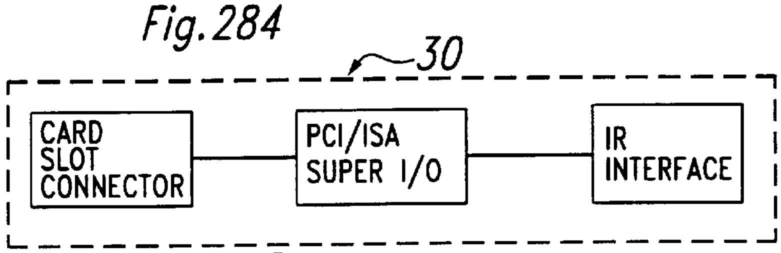

FIG. 285 illustrates a block diagram of a card 30 having a PCI/ISA bridge coupling an IR interface to a card slot connector.

Figure 286:
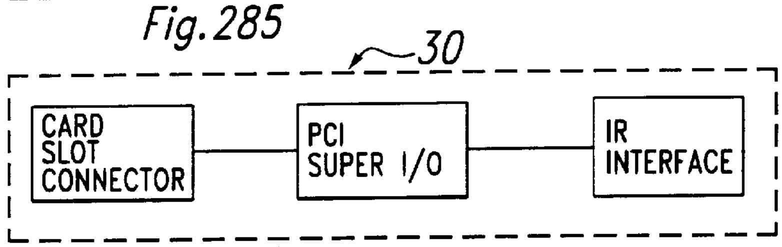

FIG. 286 illustrates a block diagram of a card 30 having a PCI Super I/O coupling an IR interface to a card slot connector.

Figure 287:
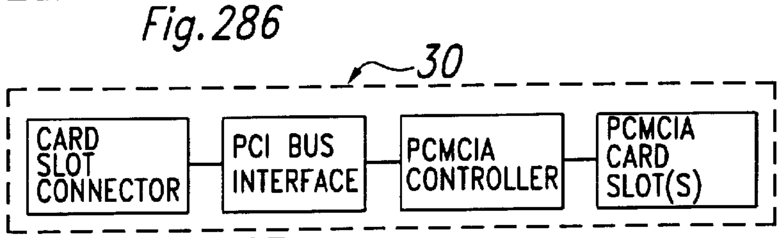

FIG. 287 illustrates a block diagram of a card 30 having a PCMCIA controller coupling PCMCIA card slots to a PCI bus interface which is coupled to a card slot connector.

Figure 288:
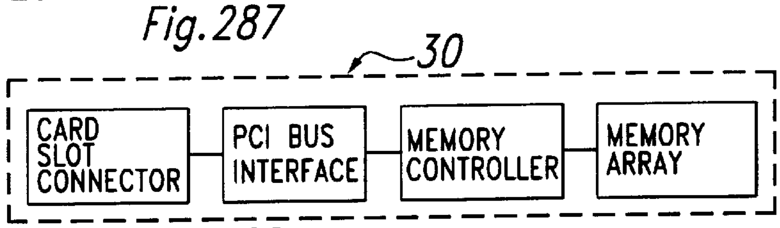

FIG. 288 illustrates a block diagram of a card 30 having a memory controller coupling a memory array to a PCI bus interface which is coupled to a card slot connector.

Figure 289:
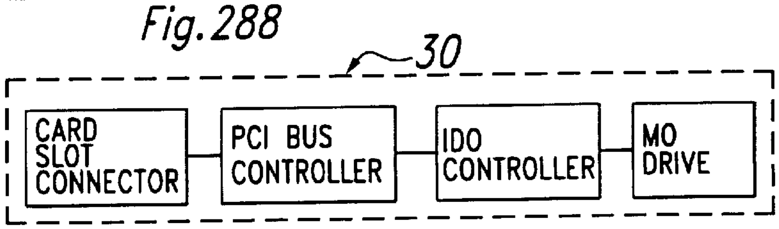

FIG. 289 illustrates a block diagram of a card 30 having an IDO controller coupling an MO drive to a PCI bus controller which is coupled to a card slot connector.

Figure 290:
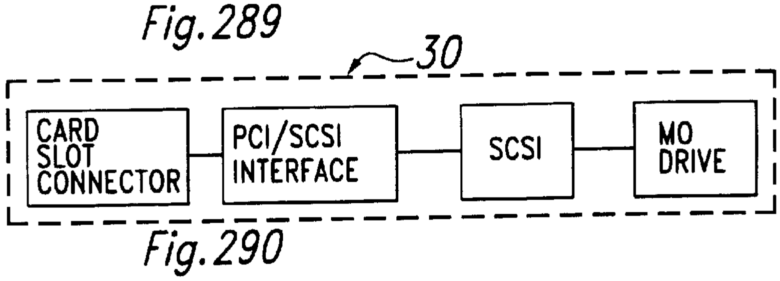

FIG. 290 illustrates a block diagram of a card 30 having an SCSI device coupling an MO drive to a PCI/SCSI interface which is coupled to a card slot connector.

Figure 291:
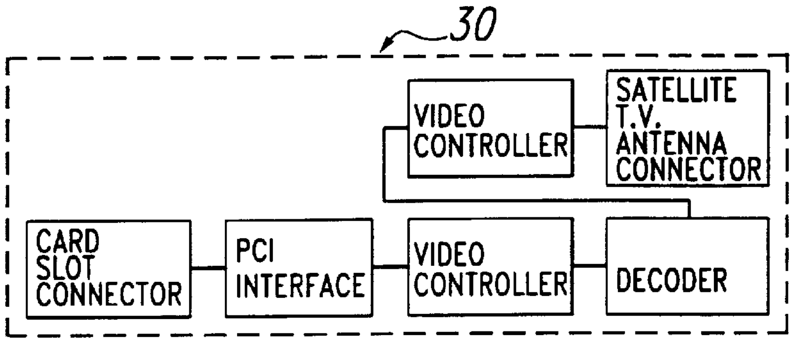

FIG. 291 illustrates a block diagram of a card 30 having a PCI interface coupling a video controller to a card slot connector and an R.F. front end coupling a satellite TV antenna connector to a decoder.

Figure 292:
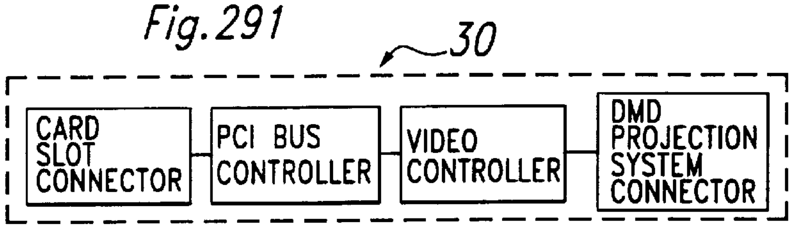

FIG. 292 illustrates a block diagram of a card 30 having a video controller coupling a DMD (digital micromirror device) projection system connector to a PCI bus controller which is coupled to a card slot connector.

Figure 293:
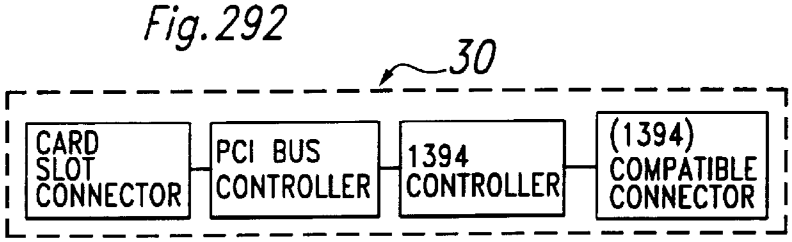

FIG. 293 illustrates a block diagram of a card 30 having a 1394 controller coupling a 1394 compatible connector to a PCI bus interface which is coupled to a card slot connector.

Figure 294:
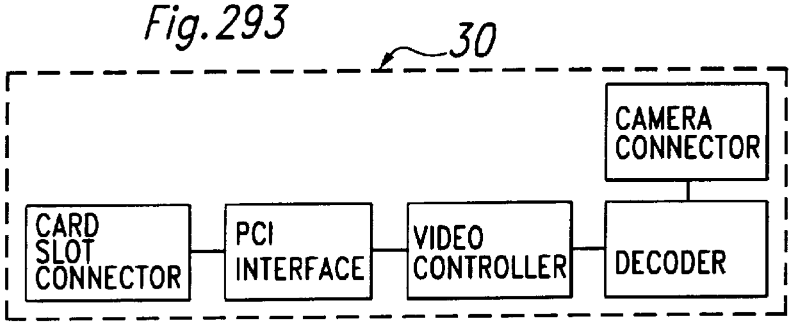

FIG. 294 illustrates a block diagram of a card 30 having a PCI bus interface coupling a video controller to a card slot connector and a decoder coupling a camera connector to the video controller.

Figure 295:
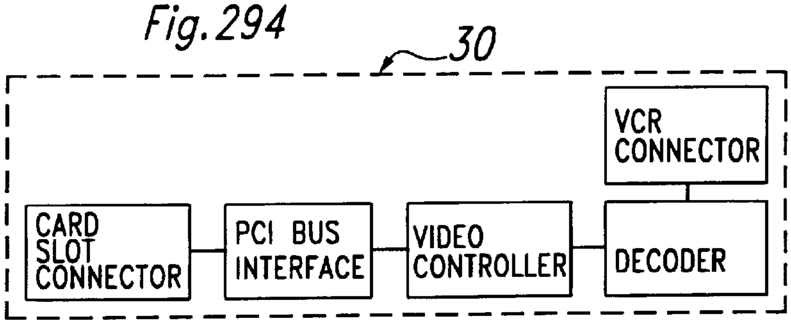

FIG. 295 illustrates a block diagram of a card 30 having a PCI bus interface coupling a video controller to a card slot connector and a decoder coupling a VCR connector to the video controller.

Figure 296:
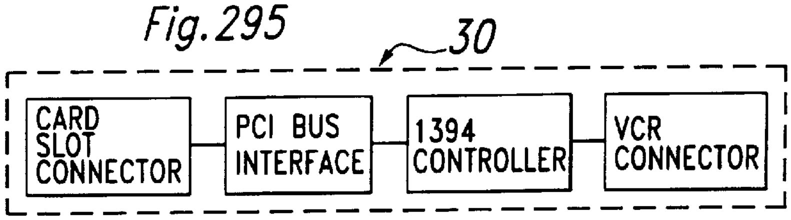

FIG. 296 illustrates a block diagram of a card 30 having a 1394 controller coupling a VCR connector to a PCI bus interface which is coupled to a card slot connector.

Figure 297:
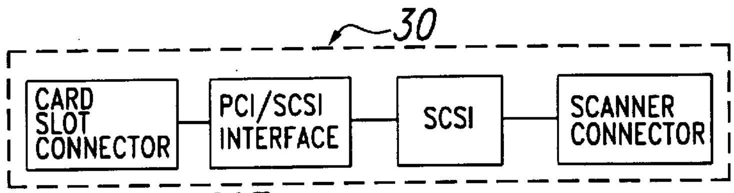

FIG. 297 illustrates a block diagram of a card 30 having an SCSI device coupling a scanner connector to a PCI/SCSI controller which is coupled to a card slot connector.

Figure 298:
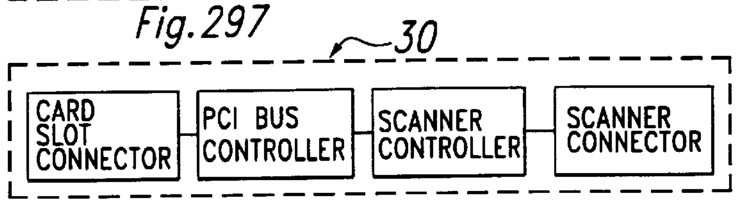

FIG. 298 illustrates a block diagram of a card 30 having a scanner controller coupling a scanner connector to a PCI bus controller which is coupled to a card slot connector.

Figure 299:
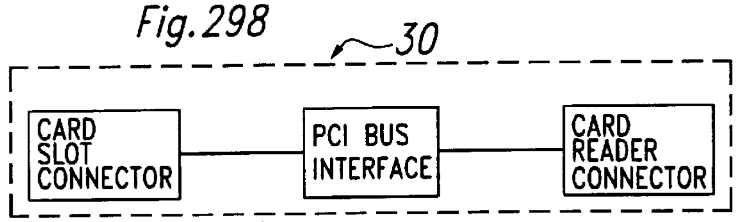

FIG. 299 illustrates a block diagram of a card 30 having a PCI bus interface coupling a card reader connector to a card slot connector.

Figure 300:
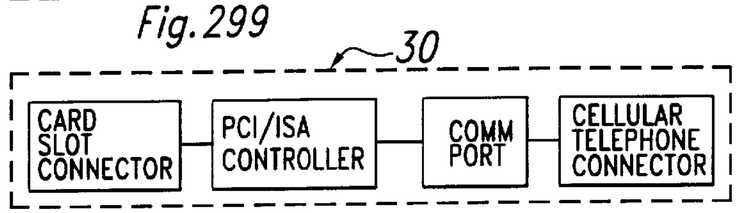

FIG. 300 illustrates a block diagram of a card 30 having a communications port coupling a cellular telephone connector to a PCI/ISA controller which is coupled to a card slot connector.

Figure 301:
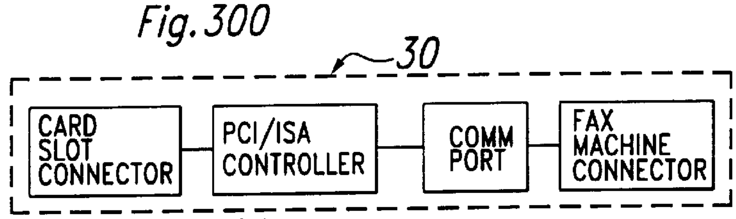

FIG. 301 illustrates a block diagram of a card 30 having a communications port coupling a fax machine connector to a PCI/ISA controller which is coupled to a card slot connector.

Figure 302:
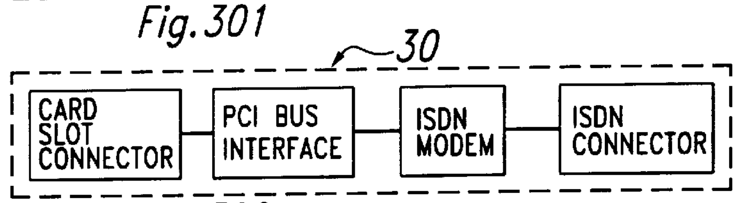

FIG. 302 illustrates a block diagram of a card 30 having an ISDN modem coupling an ISDN connector to a PCI bus interface which is coupled to a card slot connector.

Figure 303:
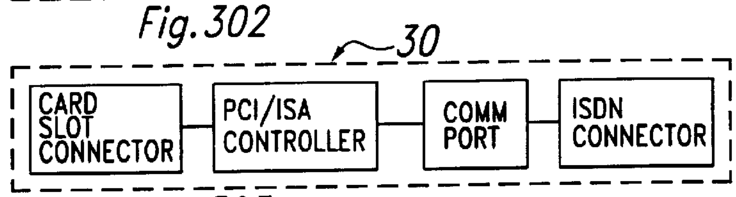

FIG. 303 illustrates a block diagram of a card 30 having a communications port coupling an ISDN connector to a PCI/ISA controller which is coupled to a card slot connector.

Figure 304:
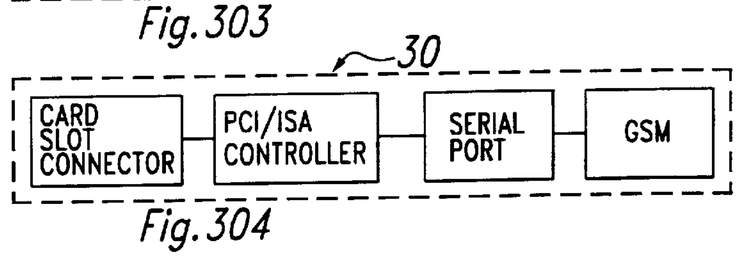

FIG. 304 illustrates a block diagram of a card 30 having a serial port coupling a GSM to a PCI/ISM controller which is coupled to a card slot connector.

Figure 305:
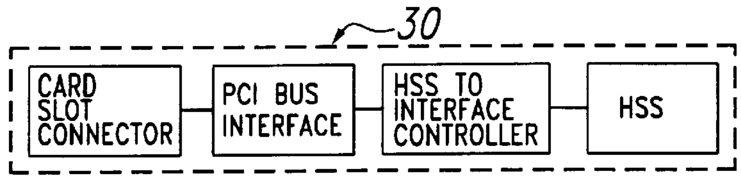

FIG. 305 illustrates a block diagram of a card 30 having a home security system (HSS) to interface controller coupling a home security system (HSS) to a PCI bus interface which is coupled to a card slot connector.

Figure 306:
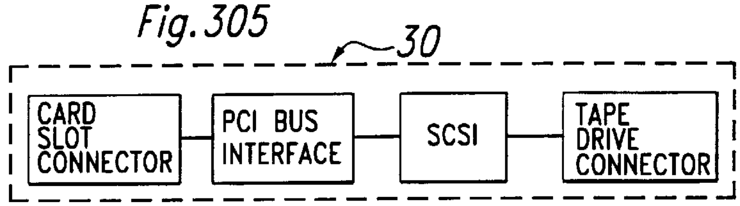

FIG. 306 illustrates a block diagram of a card 30 having an SCSI device coupling a tape drive connector to a PCI bus interface which is coupled to a card slot connector.

Figure 307:
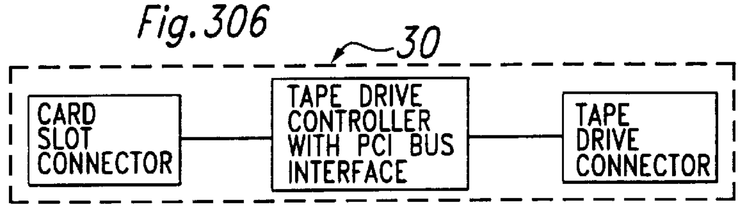

FIG. 307 illustrates a block diagram of a card 30 having a tape drive controller with PCI bus interface coupling a tape drive connector to a card slot connector.

Figure 308:
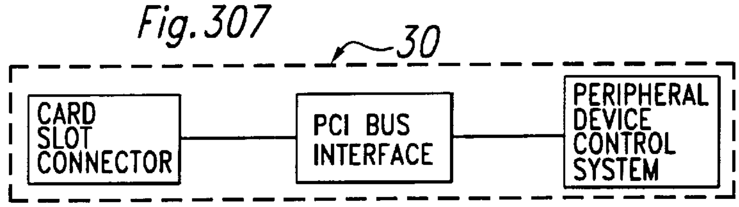

FIG. 308 illustrates a block diagram of a card 30 having a PCI interface coupling a peripheral device control system to a card slot connector.

Figure 309:
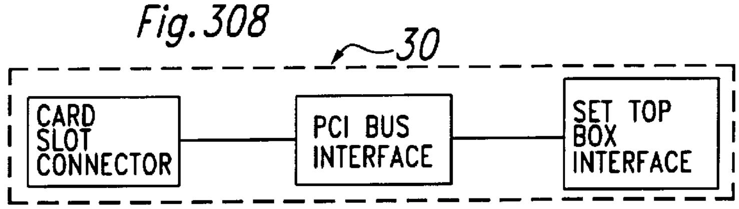

FIG. 309 illustrates a block diagram of a card 30 having a PCI bus interface coupling a set top box interface to a card slot connector.

Figure 310:
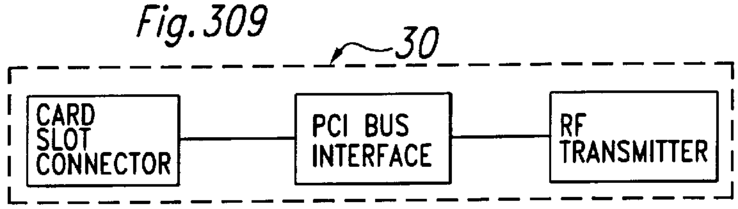

FIG. 310 illustrates a block diagram of a card 30 having a PCI bus interface coupling an R.F. transmitter to a card slot connector.

Figure 311:
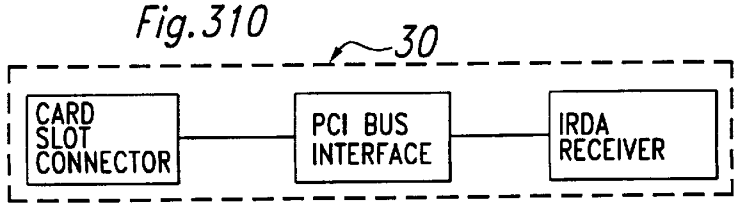

FIG. 311 illustrates a block diagram of a card 30 having a PCI bus interface coupling an IRDA receiver to a card slot connector.

Figure 312:
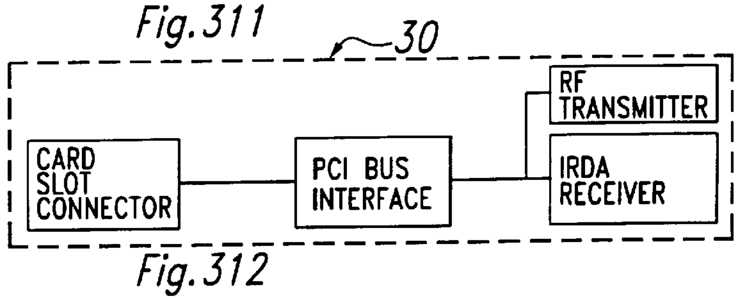

FIG. 312 illustrates a block diagram of a card 30 having a PCI bus interface coupling an R.F. transmitter and an IRDA receiver to a card slot connector.

Figure 313:
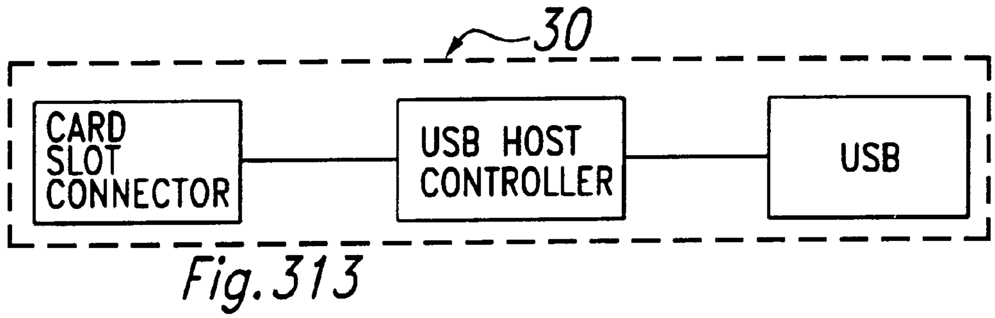

FIG. 313 illustrates a block diagram of a card 30 having a USB (universal serial bus) controller coupling a USB to a card slot connector.

Figure 314:
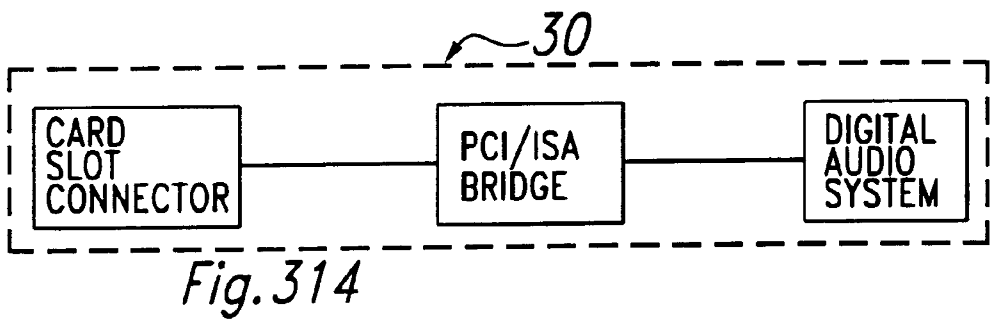

FIG. 314 illustrates a block diagram of a card 30 having a PCI/ISA bridge coupling a digital audio system to a card slot connector.

Figure 315:
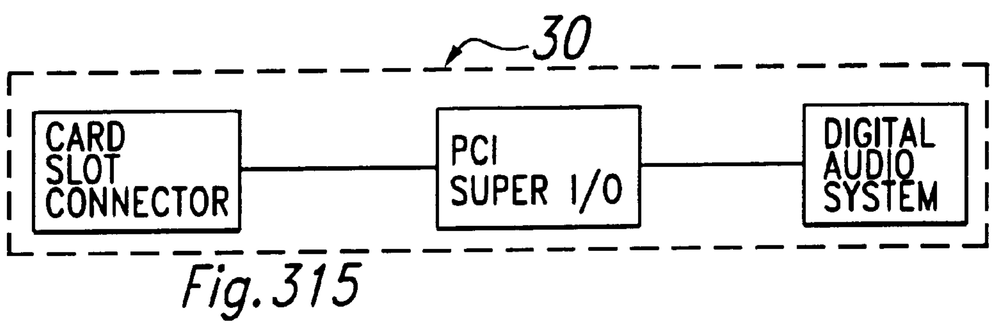

FIG. 315 illustrates a block diagram of a card 30 having a PCI Super I/O coupling a digital audio system to a card slot connector.

Figure 316:
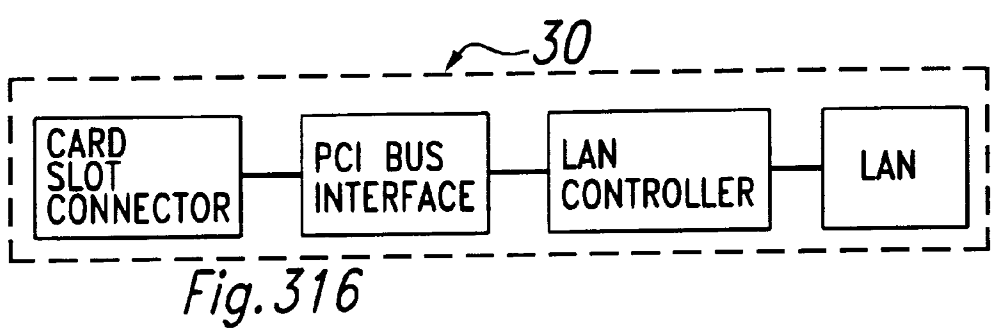

FIG. 316 illustrates a block diagram of a card 30 having a LAN (local area network) controller coupling a LAN to a PCI bus interface which is coupled to a card slot connector. When utilizing a LAN, a mux is not required to couple the LAN to the PCI bus if the LAN is strictly a LAN and is tied to the PCI bus. What is required is information such as, "when the notebook 10 made the dock request on the PCI bus 14, is the cpu in system card 28 going to relinquish control of the PCI device (LAN) and let the docking device (notebook 10) control it or, is the cpu in system card 28 going to keep it because he is already on the PCI bus". In the latter case, the docking device would not get a plug-n-play identifier back that said the LAN is there for you. So, even though the LAN was on the PCI bus, when the docking device goes out to the PCI bus and requests enumeration for it, the docking device will not get the enumeration back because the docking station intelligence will not release that resource to the docked device. Therefore, the bridge and the interface to the docking station will give back a negative reply on the device. So, even though the docking device (notebook computer 10) now drives the PCI bus 14 in the docking station 12, it does not talk to the requested device, because it never generated that device's identifier and/or added it to the list. One scheme of operation has the LAN device directly attached to the docked notebook, in which case each is a standard plug-n-play device. Another scheme of operation is to have the intelligence within the docking station always control of the LAN. What happens is that the intelligence of the docking station will identify itself as a new PCI device to the docked notebook, such as "I am your e-mail handler", for instance. The notebook will talk to that device as the e-mail handler, and the e-mail handler may have the LAN running internal to itself and he is gathering the information. When the e-mail handler gets enough mail, it may tell the notebook—"I have e-mail for you, come get it". So, the communications is not coming directly from the LAN but instead from the memory system or storage system that is controlled by the intelligence of the processor in the dock.

The LAN can also be connected right off the PCI bus and show, for example, a TI thunderlan. The LAN can also be on the XD bus, but it is not as efficient. The location and positioning of a LAN is variable—the secret is who has control over it, and control is decided by the software that is running the notebook, the software that is running the intelligent docking system and the hardware of the MUXs and bridges that are involved. The MUXs and bridges are told by the software, either resident in the interface or type of interface, as to what it can allocate. The basic architecture is provides a methodology for selecting a device for the application that you want, and that device gets allocated to the intelligence of the system based on plug-n-play rules. The system designer and/or user decide what those plug-n-play rules are from one instance to another and the only rule is "you don't share the devices on the PCI". In other words, if the LAN is under the control of system card 28, it stays under the control of system card 28 unless it gets assigned to a docked notebook. This does not mean that both devices cannot simultaneously share the LAN. When a LAN recognizes one address to the notebook and a different address to the intelligence in the docking station, it knows which one it is talking to. The LAN routes the data needed to the appropriate host in response to the request. It would require a special MUX and a special bridge out there to understand which one of those addresses that is being talked to. But generally, you would not share devices per se because it becomes more complicated in your protocol. It is not to say that you can't do it, but the ease of implementation simply says "pick the LAN to belong to the docking station or notebook at that particular instance in time on that particular dock or undock.

While various embodiments of card 30 have been illustrated, other modifications and alternative cards are possible and anticipated as the art progresses. For example, the functionality of two of more of any of the cards could be combined into a single card. This concept of interchangeable cards 30 in the docking station allows a user to change and/or expand the functionality of his docking station by adding and/or interchanging cards 30. Add to this the ability to change the functionality of the system card 28, and the result is a powerful docking station and system that can have its functionality expanded, changed or reduced by changing a system card 28 and/or adding or interchanging cards 30. Also, while the concept is directed mostly at interchangeable system cards and cards, the system cards 28 and cards 30 could just as easily be a circuit board, part of a circuit board, back plane or apparatus capable of coupling with a circuit card (such as system card 28 and card 30), circuit board, device, apparatus or combination thereof.

Figure 317:
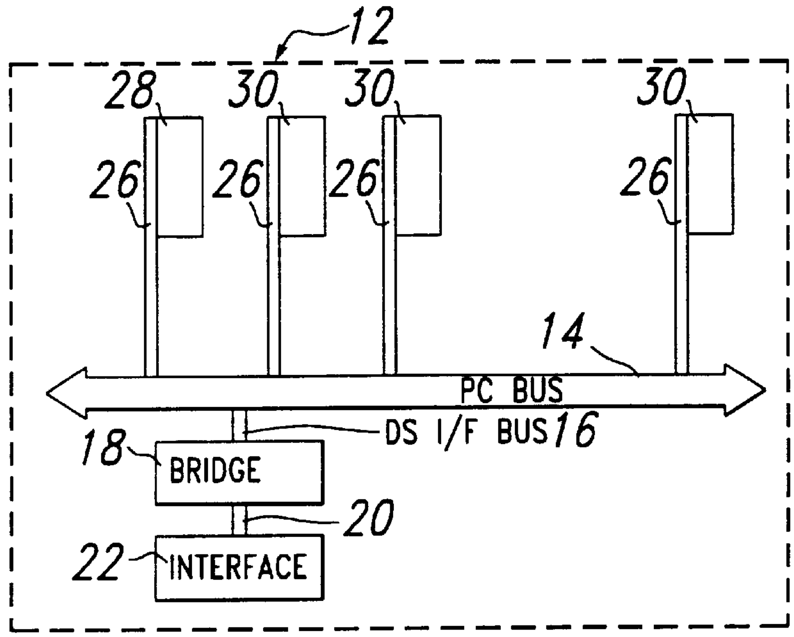
FIG. 317 illustrates an alternative embodiment of docking station 12 illustrated in FIG. 264. In this embodiment of the invention, as with docking station 12 in FIG. 134, the MUX is located on the system card 28, not located separately in docking station 12.
Figure 318:
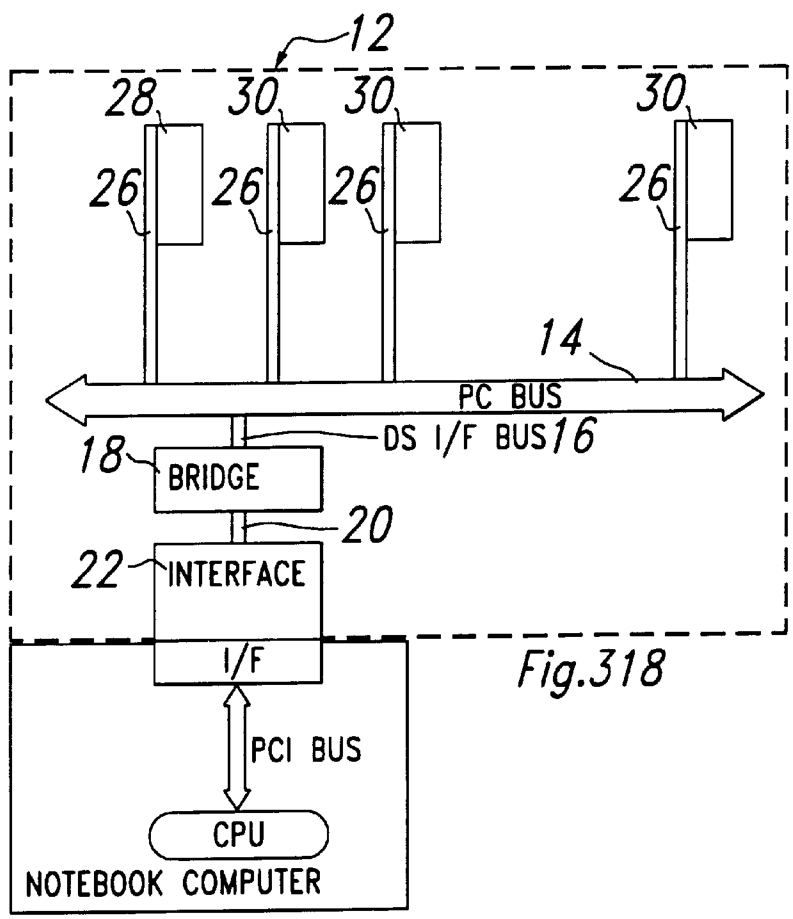
FIG. 318 illustrates a notebook computer hard docked to the docking station of FIG. 317.

FIG. 317 illustrates an alternative embodiment of docking station 12 illustrated in FIG. 264. In this embodiment of the invention, as with docking station 12 in FIG. 134, the MUX is located on the system card 28, not located separately in docking station 12. FIGS. 136–263 illustrate system cards 28 that may be used in docking station 12 as illustrated in FIG. 264. System cards 28 illustrated in FIGS. 136–263 are the system cards illustrated in FIGS. 5–133, respectively, with the addition of a mux on each card. The docking station and docking system illustrated in FIGS. 317 and 318 operate in substantially the same fashion as the docking station and docking system illustrated in FIGS. 264 and 265, respectively.

In another embodiment of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking station 12 illustrated in FIG. 317 (not having a mux separate from system card 28), could utilize the system cards 28 illustrated in FIGS. 5—133 (not having a mux). There would not be a mux in the docking station of this embodiment but there would be an equivalent functionality. Thus, while a mux is preferred, tri-state logic or a software stand PCI interface can also be used.

INFRARED (IR) DOCKING

Figure 319:
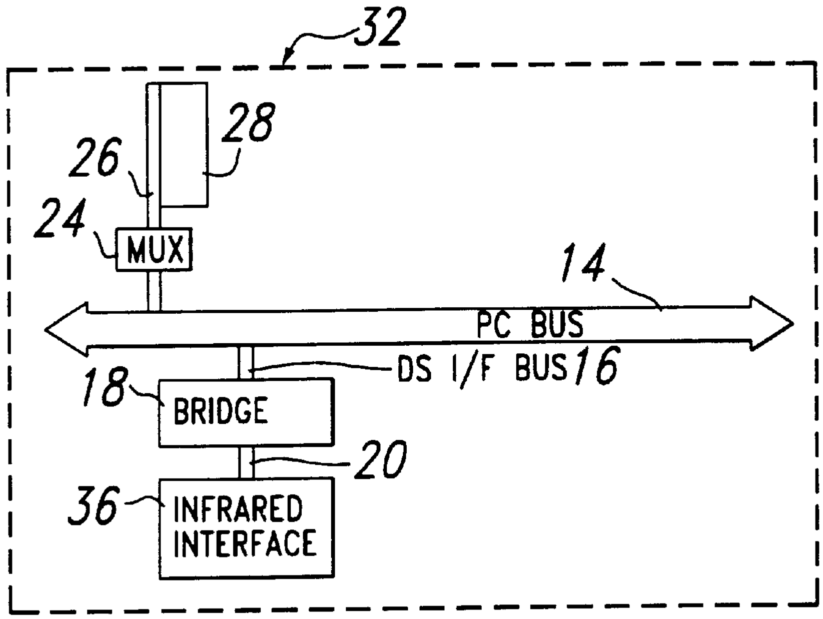
FIG. 319 illustrates a block diagram of a multi-configurable docking station to which a notebook computer may dock via infrared communications, according to another embodiment of the invention.

FIG. 319 illustrates a block diagram of a multi-configurable docking station to which a notebook computer may dock via infrared communications, according to another embodiment of the invention. Infrared docking is one form of proximity docking which falls under the soft docking category. In infrared docking, the notebook computer and docking station dock when a communication link is established between the notebook computer and the docking station when they come within range of each other and docking is initiated. In the embodiment of the invention illustrated in FIG. 319, multi-configurable docking station 32 comprises a high speed PCI bus 14, a docking station interface bus 16 that couples a bridge 18 to PCI bus 14 and data/signal lines or bus 20 that couples an infrared interface 34 to bridge 18. Mux 24 couples PCI bus 14 to card slot 26. A connector on card slot 26 couples to a mating connector on system card 28. PCI bus 14 is preferably a high speed PCI bus (at least 32 bit wide), but may be any bus that provides performance characteristics similar to a high speed PCI bus. As with PCI bus 14, interface bus 16 is also preferably a high speed PCI bus (at least 32 bit wide), but may be any bus that provides performance characteristics similar to a high speed PCI bus. Data/signal lines or bus 20 couple interface module 22 to bridge 18. As previously discussed in connection with docking station 12, mux 24 is a switch with data lines. Mux devices are well known in the art, are commercially available, and have been described in more detail as needed. Card slot 26 is preferably a dedicated card slot for coupling with system card 28, but could just as easily be a circuit board, part of a circuit board, back plane or apparatus capable of coupling with a circuit card (such as system card 28), circuit board, device, apparatus or combination thereof.

Figure 320:
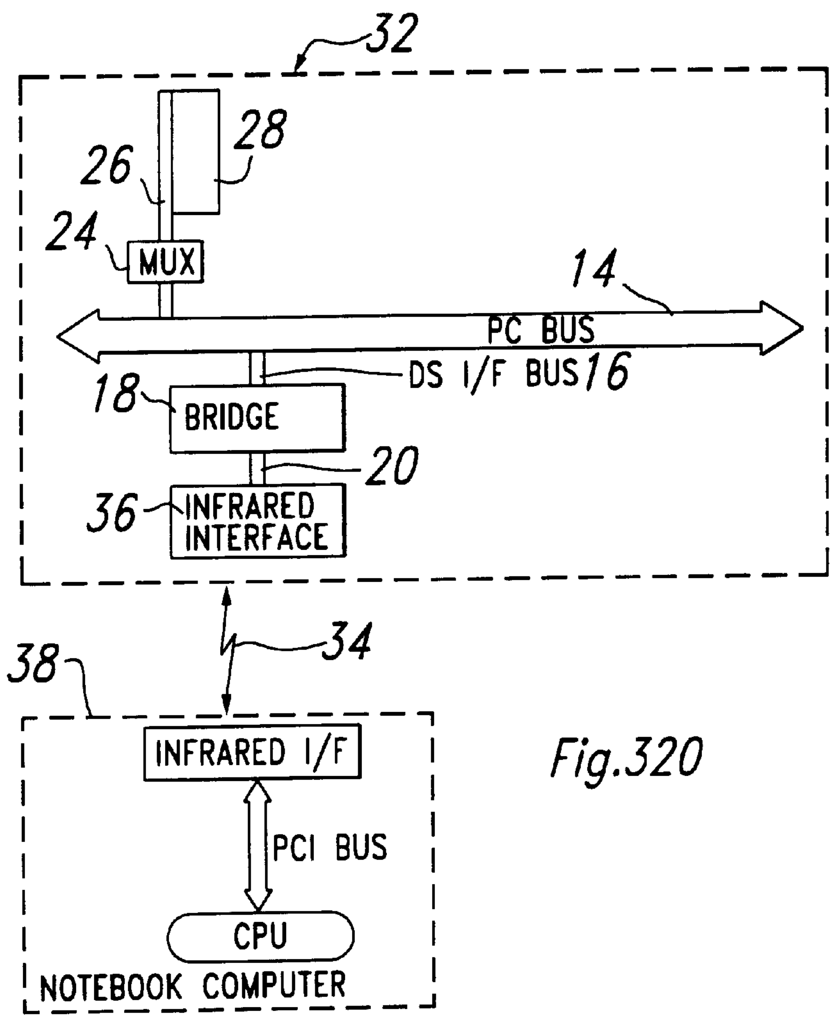
FIG. 320 illustrates a block diagram of a notebook computer infrared docked to a docking station, according to an embodiment of the invention.

In docking applications where a notebook computer is to be soft docked to docking station 32 via infrared communications 34, infrared interface 36 and a corresponding infrared interface in the notebook computer facilitate an optical connection between the notebook 38 and docking station 32 when they come within IR range of each other so that a communication link can be established and docking initiated, as illustrated in FIG. 320.

Figure 321:
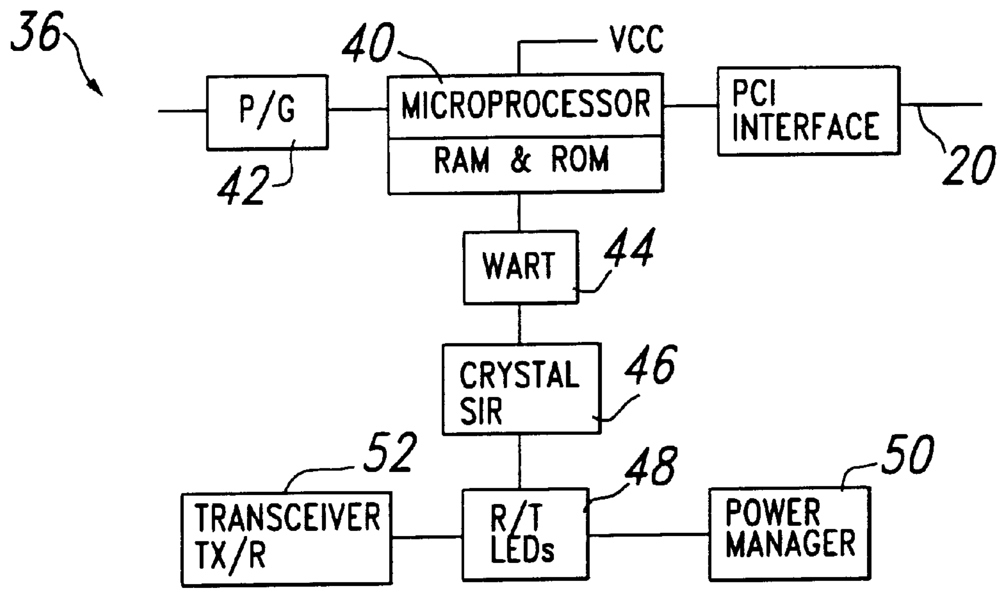
FIG. 321 illustrates a block diagram of one embodiment of an infrared interface that may be used in the docking station and notebook computers of FIG. 320.
Figure 322:
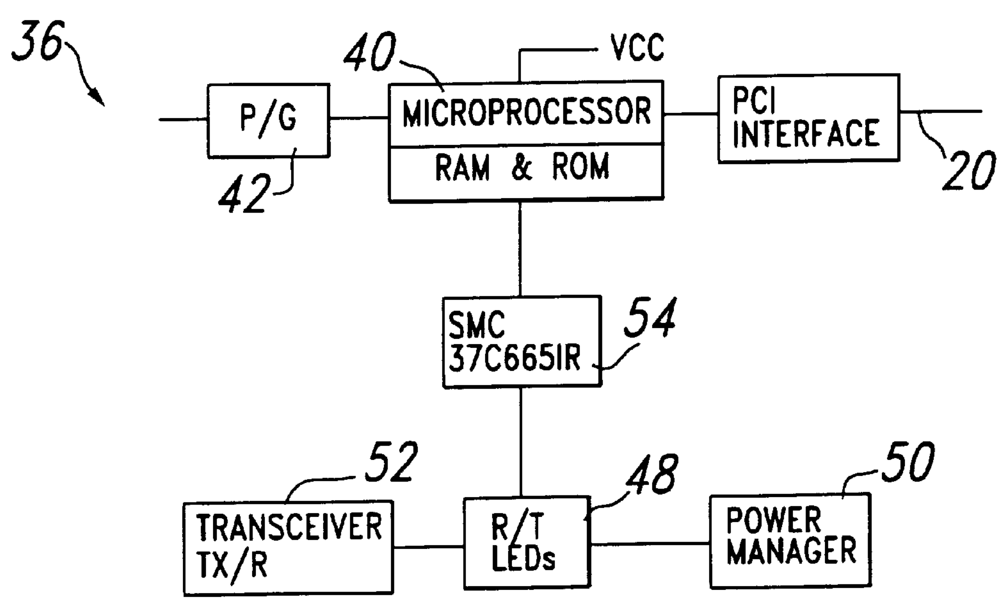
FIG. 322 illustrates a block diagram of another embodiment of an infrared interface that may be used in the docking station and notebook computers of FIG. 320.

FIG. 321 illustrates a block diagram of an one embodiment of infrared interface 36. The infrared interface includes a microprocessor 40, such as a Zialog Z8 or Hitachi H8 microprocessor, with embedded ROM and RAM or external ROM and RAM, or a digital signal processor (DSP) with ROM and RAM or a DSP on the disk bus as an auxiliary processor that transfers data back and forth to the DSP. Assuming that a Z8 microprocessor is used, power grid logic 42 is connected to the microprocessor and is used to start the Z8. The Z8 has a communications port that is commed and is connected to a universal asynchronous receiver (uART) 44. While uART 44 is a serial uART in the present embodiment, it could just as easily be a parallel uART. UART 44 is connected to a crystal SIR 46. One example of an acceptable crystal SIR is an 1830 crystal SIR chip. Crystal SIR 46 is connected to receive and transmit light via light emitting diodes (LEDs) 48. The LEDs 48 also require a power manager (op amp) 50 and transceiver TX/R (op amp) beta analog circuits 52 and plugs coupled to the LEDs. Alternatively, uART 44 and crystal SIR 46 can be replaced with an SMC 37C6651R chip 54, as illustrated in FIG. 322.

Figure 323:
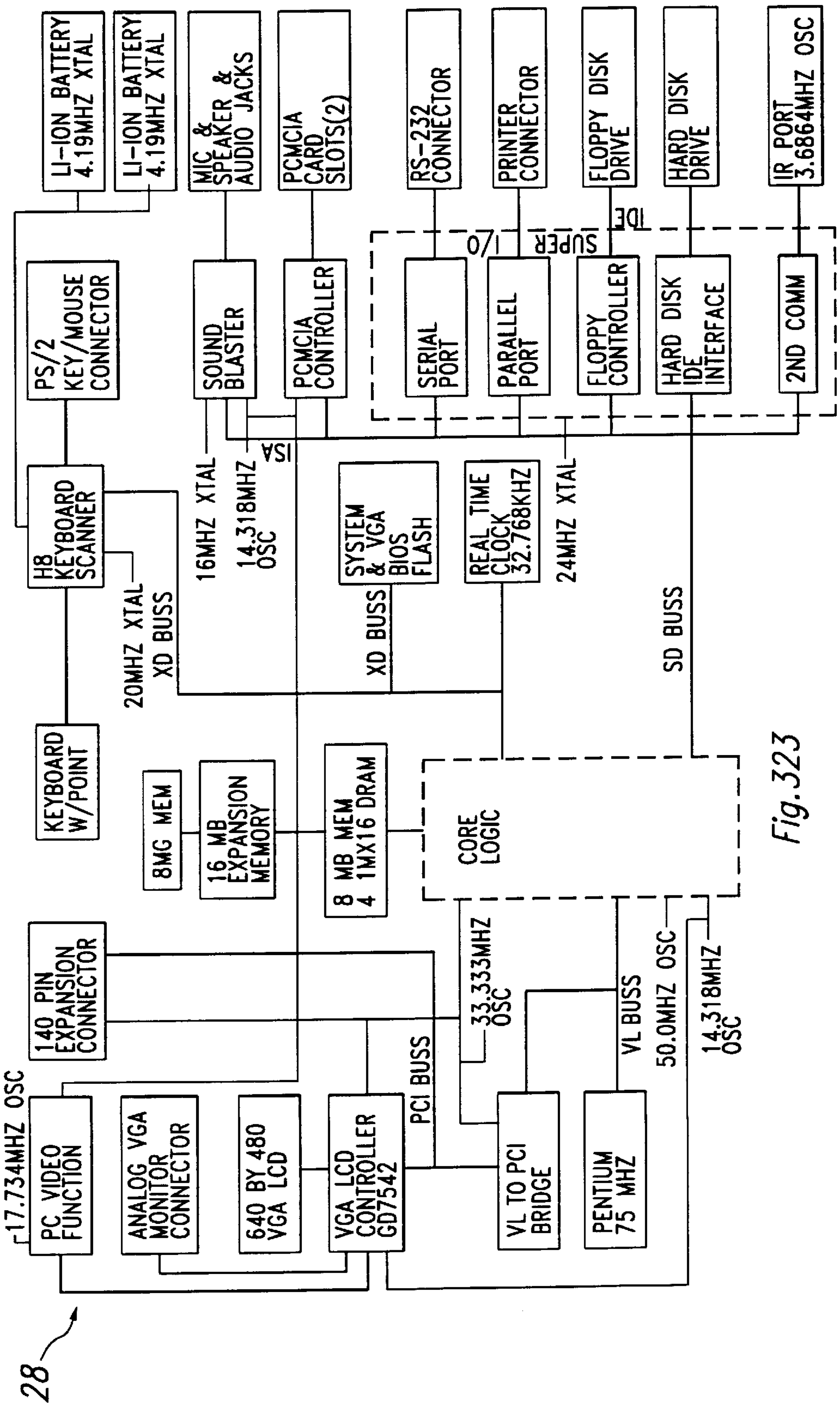
FIG. 323 illustrates a block diagram of a notebook computer that may be used in combination with docking station 32 and that incorporates the infrared interface of FIGS. 321 and 322.
Figure 324:
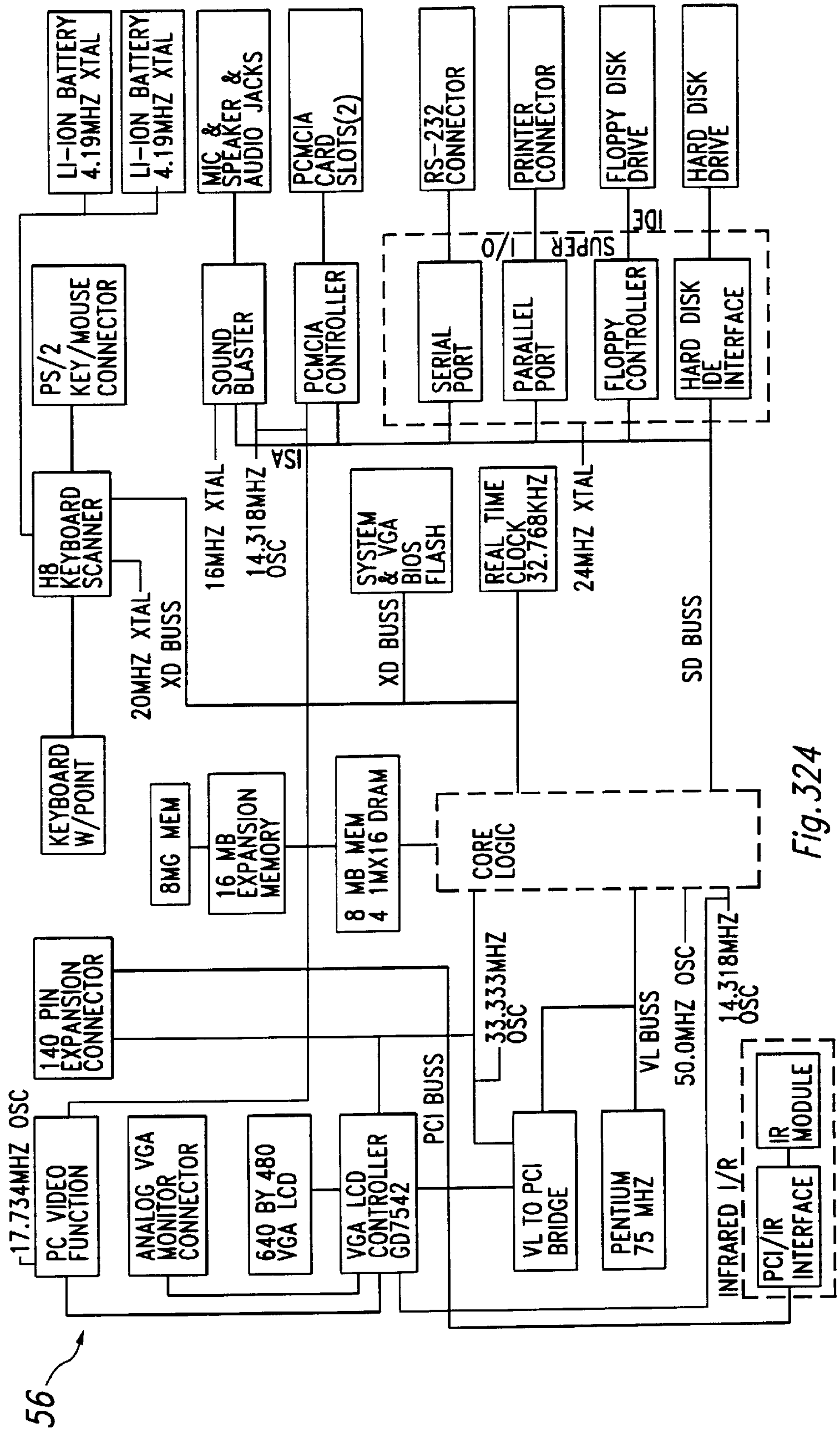
FIG. 324 illustrates a block diagram of a notebook computer that may be used in combination with docking station 32 and that incorporates couples the infrared interface of FIGS. 321 and 322 to its internal PCI bus.

The infrared interface illustrated in FIG. 321, or a modification or alteration thereof, can be serve as the infrared interface in notebook computer 38, as illustrated in FIG. 323. In one embodiment of the invention, notebook computer 38 is the same as notebook computer 10. A description of the composition and functionality of notebook computer 10 is found in connection with the description of FIG. 2. Another embodiment of a notebook computer 56 is illustrated in FIG. 324. Unlike the IR module (port) that is hooked up to the second communications port on the ISA bus in notebook computer 38 and which is limited to 115K baud, the IR module in notebook computer 56 is coupled to the PCI bus via an IR/PCI interface. Such modification presently allows the module to run at higher speeds (4 Mbps in the present example—but other speeds possible). Other than the modification to the IR module, notebook computer 56 is the same as notebook computers 10 and 38.

The system cards 28 illustrated in FIGS. 5–133, or a modification or alteration thereof, could also be used in docking station 32. The functionality of the system cards, the software to be loaded onto the docking system and the operation of the docking system is substantially the same as previously described in connection with docking station 12.

Figure 325:
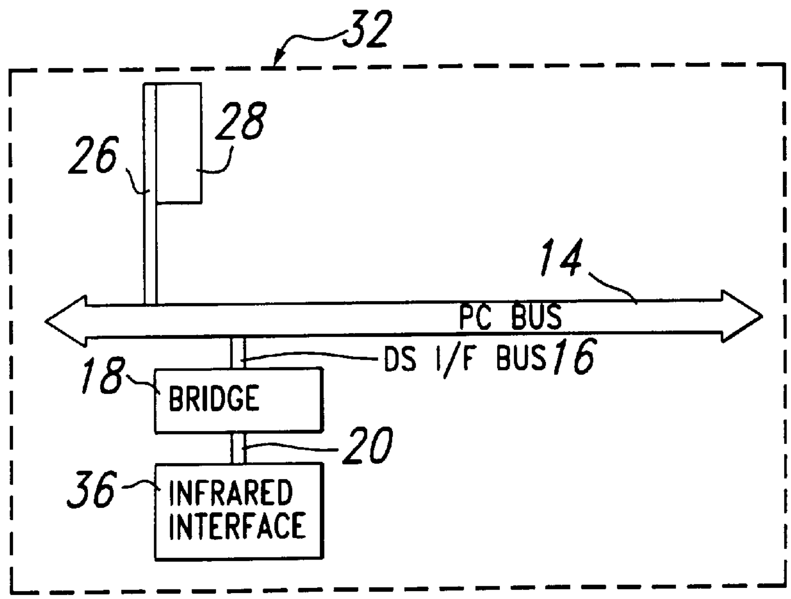
FIG. 325 illustrates an alternative embodiment of docking station 32 in which a MUX is located on the system card 28, not located separately in the docking station.
Figure 326:
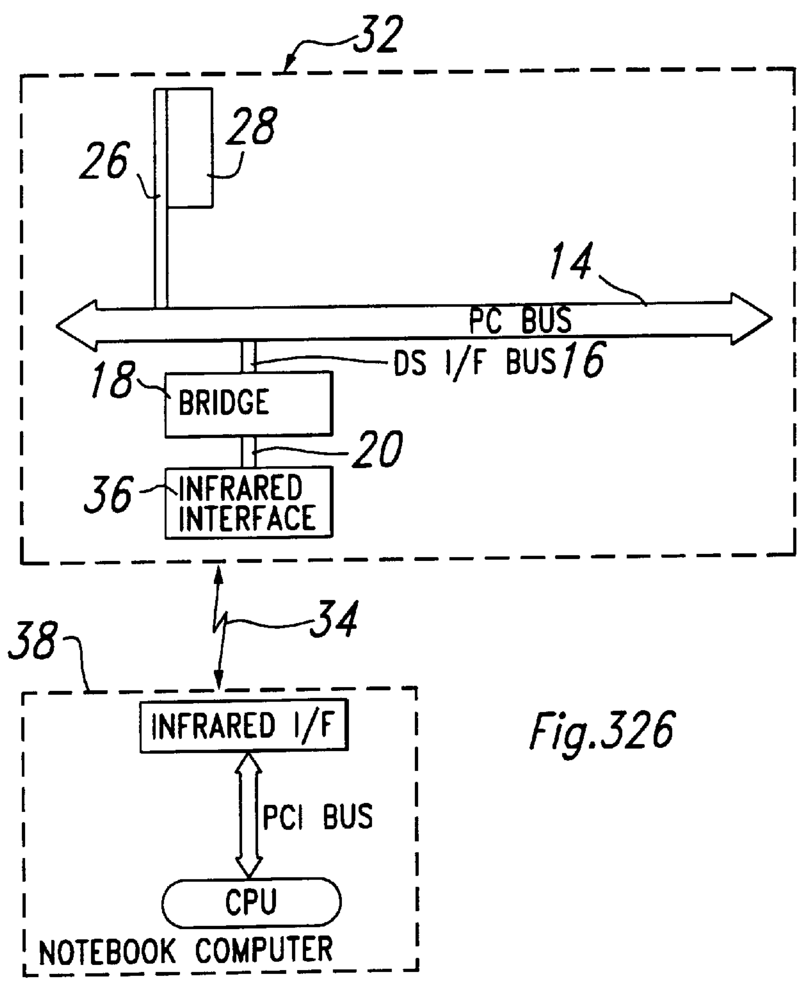
FIG. 326 illustrates a block diagram of the notebook computer illustrated in FIG. 325 infrared docked to a docking station, according to yet another embodiment of the invention.

Docking station 32, illustrated in FIG. 325, is an alternative embodiment of docking station 32 illustrated in FIG. 319. In this embodiment of the invention, the MUX is located on the system card 28, not located separately in docking station 32. FIGS. 136–263 illustrate system cards 28 that may be used in docking station 32. System cards 28 illustrated in FIGS. 136–263 are the system cards illustrated in FIGS. 5–133, respectively, with the addition of a mux on each card. The docking station and docking system illustrated in FIGS. 325 and 326 operate in substantially the same fashion as the docking station and docking system illustrated in FIGS. 319 and 320. Notebook computer 56 could be substituted for notebook computer 38.

In another embodiment of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking station 32 illustrated in FIG. 325 (not having a mux separate from system card 28), could utilize the system cards 28 illustrated in FIGS. 5–133 (not having a mux). There were not be a mux in the docking station in this embodiment. Thus, while a mux is preferred, tri-state logic or a software stand PCI interface can also be used.

Figure 327:
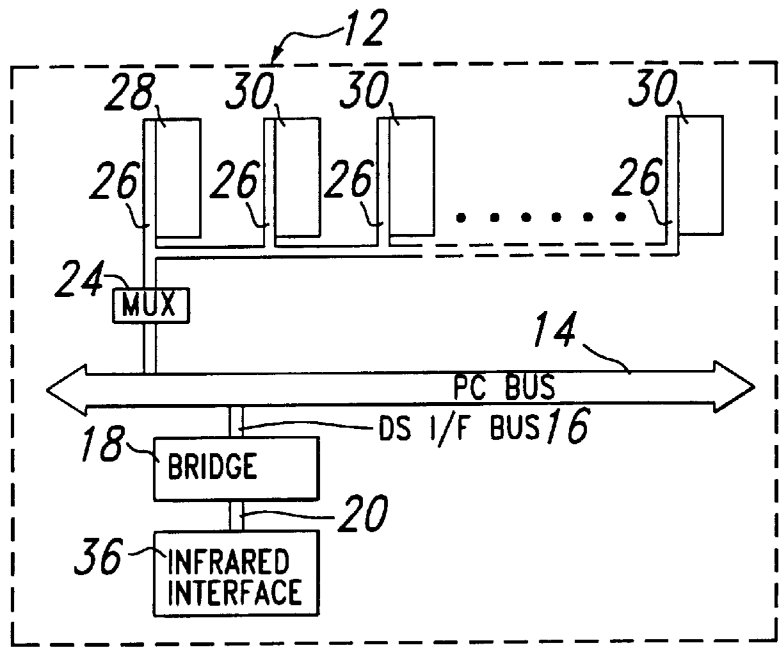
FIG. 327 illustrates an embodiment of the invention in which at least one additional card slot (three actually shown) is added to the docking station of FIG. 319. Each additional card slot 26 is coupled to mux 24. Each additional card slot is coupleable to a card 30. Each card 30 contains at least one resource that is an addition to the resources available on system card 28.
Figure 328:
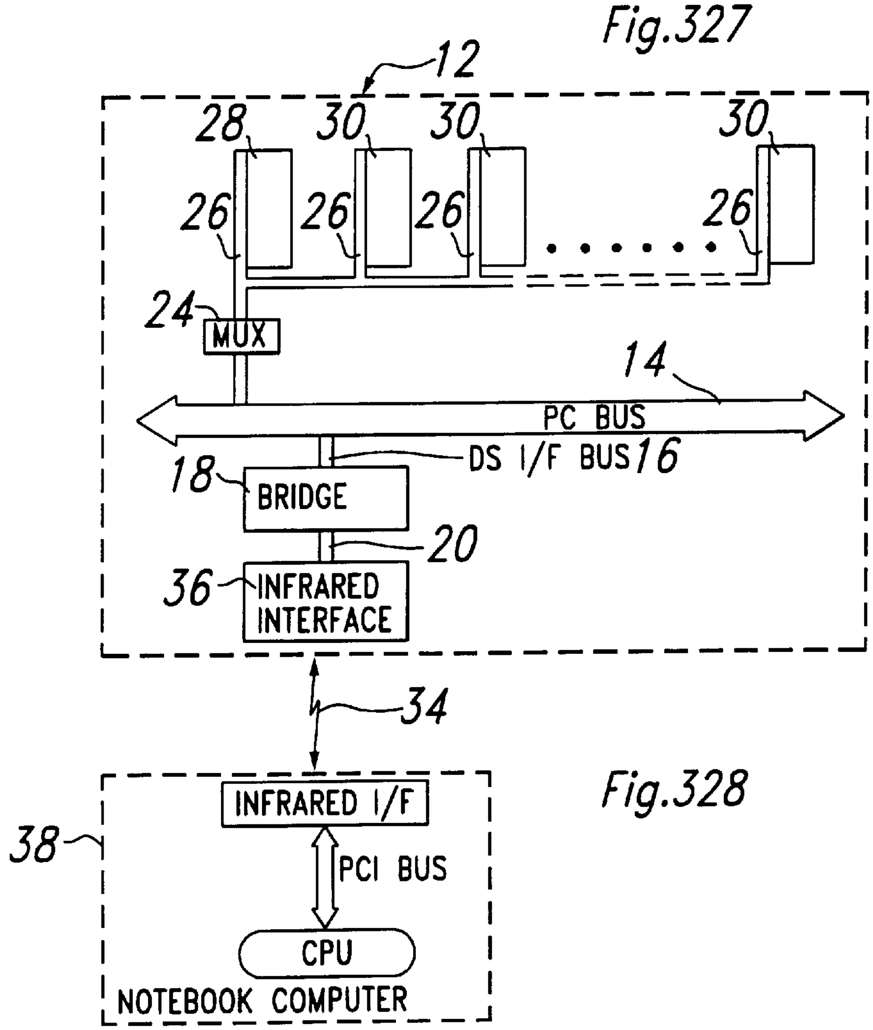
FIG. 328 illustrates a notebook computer infrared docked to the docking station of FIG. 327.

In yet another embodiment of the invention, illustrated in FIG. 327, at least one additional card slot (three actually shown) are added to the docking station of FIG. 319. Each card slot 26 is coupled to mux 24. Each additional card slot is coupleable to a card 30. Each card 30 is treated as a system resource. When notebook 38 docks to docking station 32, as illustrated in FIG. 328, it will pull the pin high on the mux which indicates a docked situation. System card 28 on the other side of mux 24 reads the I/0 device and signals that it is being docked. The system pulls mux 24 and lets the cpu in notebook 10 have control over the released resources in docking station 32. As discussed previously, one way of accomplishing this is to write simple code to the cpu in system card 28 that says "if there is an input (interrupt) from the mux (which you could hook to external interrupt 1 or 2 off of the SMI interrupt on the CPU), the codes see this and says, "read the status—docked or undocked". If docked, the docking station turns over the resources, the CPU quits running on the PCI bus 14 (it doesn't issue any PCI cycles) and throws the mux so that the PCI bus is being driven by the external master and not the CPU in the system card 28. When the mux goes back, then the CPU in system card 28 starts driving the internal PCI bus 14. Thus, in a docked situation with a notebook, notebook may be given partial or full control over the resources of system card 28 and additional cards 30.

The system cards 28 illustrated in FIGS. 5–133, or a modification or alteration thereof, could also be used in docking station 32 as illustrated in FIG. 327. The functionality of the system cards, the software to be loaded onto the docking system and the operation of the docking system is substantially the same as previously described in connection with docking station 32. FIGS. 266–316 illustrate block diagrams of various embodiments of cards 30 that can be used in combination with docking station 32 illustrated in FIG. 327. The card slot connector on each card 30 couples to a mating connector in card slot 26 in docking station 32.

Figure 329:
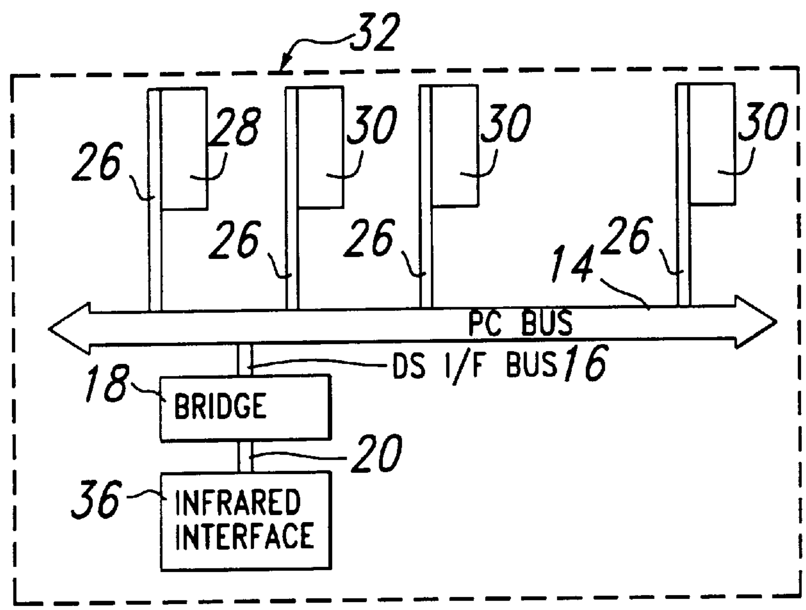
FIG. 329 illustrates an embodiment of the invention in which at least one additional card slot (three actually shown) is added to the docking station of FIG. 325. Each additional card slot 26 is coupled to mux 24. Each additional card slot is coupleable to a card 30. Each card 30 contains at least one resource that is an addition to the resources available on system card 28.
Figure 330:
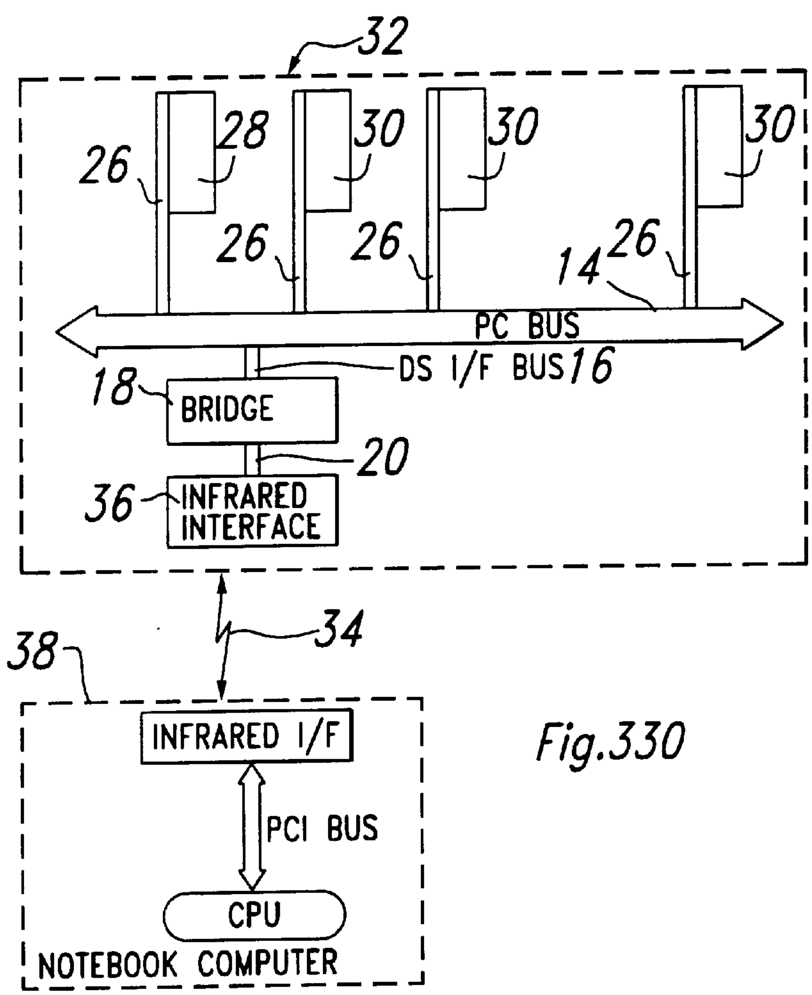
FIG. 330 illustrates a notebook computer infrared docked to the docking station of FIG. 329.

In yet another embodiment of the invention, illustrated in FIG. 329, at least one additional card slot (three actually shown) are added to the docking station of FIG. 325. Each card slot 26 is coupled to mux 24. Each additional card slot is coupleable to a card 30. Each card 30 is treated as a system resource. When notebook 38 docks to docking station 32, illustrated in FIG. 330, it will pull the pin high on the mux which indicates a docked situation. System card 28 on the other side of mux 24 reads the I/0 device and signals that it is being docked. The system pulls mux 24 and lets the cpu in notebook 10 have control over the released resources in docking station 12. As discussed previously, one way of accomplishing this is to write simple code to the cpu in system card 28 that says "if there is an input (interrupt) from the mux (which you could hook to external interrupt 1 or 2 off of the SMI interrupt on the CPU), the codes see this and says, "read the status—docked or undocked". If docked, the docking station turns over the resources, the CPU quits running on the PCI bus 14 (it doesn't issue any PCI cycles) and throws the mux so that the PCI bus is being driven by the external master and not the CPU in the system card 28. When the mux goes back, then the CPU in system card 28 starts driving the internal PCI bus 14. Thus, in a docked situation with a notebook, notebook may be given partial or full control over the resources of system card 28 and additional cards 30.

As with previously described embodiments of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking station 32 illustrated in FIG. 329 (not having a mux separate from system card 28), could utilize the system cards 28 illustrated in FIGS. 5–133 (not having a mux). There would not be a mux in the docking station in this embodiment. Thus, while a mux is preferred, tri-state logic or a software stand PCI interface can also be used.

The infrared interface illustrated in FIG. 321, or a modification or alteration thereof, can be serve as the infrared interface in notebook computer 38, as illustrated in FIG. 323. In one embodiment of the invention, notebook computer 38 is the same as notebook computer 10. A description of the composition and functionality of notebook computer 10 is found in connection with the description of FIG. 2. Another embodiment of a notebook computer 56 is illustrated in FIG. 324. Unlike the IR module (port) that is hooked up to the second communications port on the ISA bus in notebook computer 38 and which is limited to 115K baud, the IR module in notebook computer 56 is coupled to the PCI bus via an IR/PCI interface. Such modification presently allows the module to run at 4 Mbps. Other than the modification to the IR module, notebook computer 56 is the same as notebook computers 10 and 38.

The system cards 28 illustrated in FIGS. 5–133, or a modification or alteration thereof, could also be used in docking station 32 as illustrated in FIG. 329. The functionality of the system cards, the software to be loaded onto the docking system and the operation of the docking system is substantially the same as previously described in connection with docking station 32. FIGS. 266–316 illustrate block diagrams of various embodiments of cards 30 that can be used in combination with docking station 32 illustrated in FIG. 329. The card slot connector on each card 30 couples to a mating connector in card slot 26 in docking station 32.

If infrared docking is selected, it should be expected that data transfer will be slower than data transfer in a hard dock situation since a hard docking situation utilizes a parallel connection which facilitates high speed data transfer.

What is so powerful about this concept is, if the notebook is not connected with a hard dock, but we have instead a notebook that is a remote master. If notebook is being carried by a user, and he goes to the office, and if the docking station in his office has a corresponding IR interface, as the user walks into his office, the IR interface in the notebook is trying to communicate via IR communications with the IR interface in the docking station. A delta D of time (or distance in this case) really a delta Dt, says that at some point in time, delta Dt will approach zero and when delta Dt approaches zero, the IR modules in the dock and notebook RM recognize each other. What happens? When they recognize each other, the IR module sends out a dock request to the bridge. What does the bridge do? The bridge goes out to the mux and says "we have a configuration cycle". At the same time, the IR modem that is in notebook (remote master) says to the notebook via IR docking component "we have a dock request". The notebook says "go into configuration cycle, send a communication out". Sitting in the notebook RM is the same things, PIC bus, video card and all that. Notebook RM sends out to the PCI bus, the RF intercepts the command, sends a signal to the IR module that says "what is your configuration?" The bridge reports back the configuration and comes back to the notebook. Thus, the entire dock has been plug-n-play configured from a remote device. The IR module can be smart enough and say "I'm not going to report the video on the docking station as available." Why? Because we don't have a direct connect because of the IR link, thus want to leave the video live in the dock. Thus, you don't loose your video over a slow device because the video remains local to the dock system. Now, if an operating system, like Windows 95, supports dual displays, both displays (notebook and docking station) could be active at the same time with different data on each.

If notebook remote master disconnects, the procedure is reversed. The dock disconnects the PCI configuration cycle for the notebook that is in the remote master (goes away), it reconfigures, gets all of its devices, and the dock board goes back to being a regular desk top system.

RADIO FREQUENCY (RF) DOCKING

Figure 331:
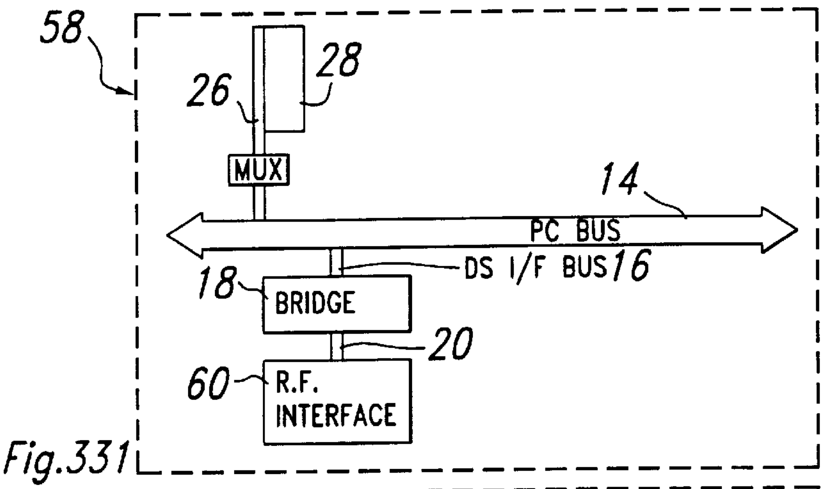
FIG. 331 illustrates a block diagram of a multi-configurable docking station to which a notebook computer may dock via radio frequency "RF" communications, according to yet another embodiment of the invention.

FIG. 331 illustrates a block diagram of a multi-configurable docking station to which a notebook computer 62 may dock via radio frequency (RF) communications, according to another embodiment of the invention. Radio frequency docking is another form of proximity docking which falls under the soft docking category. In RF docking, the notebook computer and docking station dock when a communication link is established between the notebook computer and the docking station, when they come within range of each other, and docking is initiated. In the embodiment of the invention illustrated in FIG. 331, multi-configurable docking station 58 comprises a high speed PCI bus 14, a docking station interface bus 16 that couples a bridge 18 to PCI bus 14 and data/signal lines or bus 20 that couples a radio frequency interface 60 to bridge 18. Mux 24 couples PCI bus 14 to card slot 26. A connector on card slot 26 couples to a mating connector on system card 28. PCI bus 14 is preferably a high speed PCI bus (at least 32 bit wide), but may be any bus that provides performance characteristics similar to a high speed PCI bus. As with PCI bus 14, interface bus 16 is also preferably a high speed PCI bus (at least 32 bit wide), but may be any bus that provides performance characteristics similar to a high speed PCI bus. Data/signal lines or bus 20 couple RF interface module 60 to bridge 18. As previously discussed in connection with docking stations 12 and 32, mux 24 is a switch with data lines. Mux devices are well known in the art, are commercially available, and have been described in more detail as needed. Card slot 26 is preferably a dedicated card slot for coupling with system card 28, but could just as easily be a circuit board, part of a circuit board, back plane or apparatus capable of coupling with a circuit card (such as system card 28), circuit board, device, apparatus or combination thereof.

Figure 332:
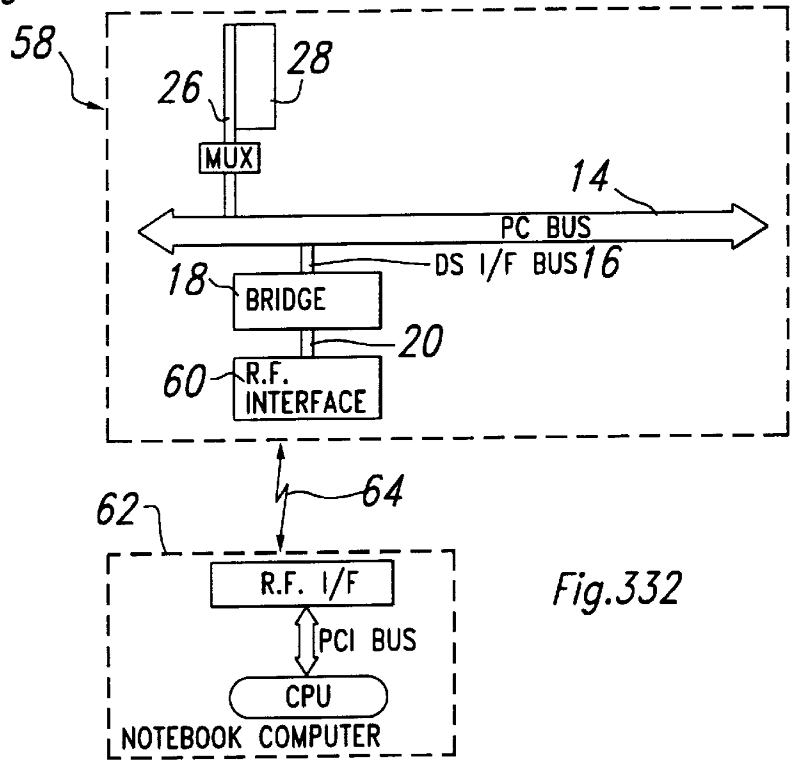
FIG. 332 illustrates a block diagram of a notebook computer radio frequency "RF" docked to a notebook computer according to an embodiment of the invention.

In docking applications where a notebook computer is to be soft docked to docking station 58 via radio frequency communications 64, RF interface 60 and a corresponding infrared interface in the notebook computer facilitate a radio frequency connection between the notebook 62 and docking station 58 when they come within RF range of each other so that a communication link can be established and docking initiated, as illustrated in FIG. 332. One embodiment of the RF interface might a system manufactured by Xircom. The RF interface in notebook computer 62 would comprise a Xircom LAN (2.4 Ghz) transceiver PCMCIA card connected to a PCMCIA card slot on the notebook and a corresponding Xircom base LAN (2.4 Ghz) transceiver coupled to bus 20 of the docking station 58. This is but one example of an RF module with an interface adapter to a LAN that might be utilized. Another example might include an ethernet to direct wire connection. Even a radio transmitter found in a current portable telephone could be used as RF interface 60, so long as it has a robust communications protocol going across. The protocol to be used is already defined. The IRDA specification of an SDLC specification, synchronous or asynchronous protocol, can also be used. The same RF interface could also be the RF interface 60 in docking station 58.

Figure 333:
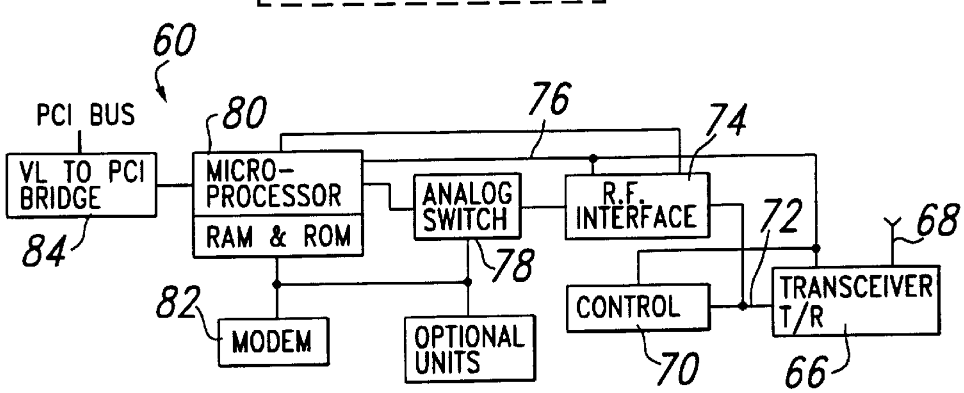
FIG. 333 illustrates a block diagram of one embodiment of a radio frequency "RF" interface that may be used in the docking station and notebook computers of FIG. 331 and 332.

Another embodiment of an RF interface is illustrated in FIG. 333. The RF interface of FIG. 333 includes a transceiver 66 which transmits and receives radio frequency signals by means of an antenna 68. Radio frequency signals (typically data signals) transmitted by the antenna 68 are received by an antenna in a corresponding RF interface. If the RF interface presently under discussion is in notebook computer 62, then the corresponding RF interface is in docking station 58. The transceiver 66 is controlled by an RF transceiver system control unit 70 which is connected to the transceiver by means of bus 72. Control signals between the transceiver 66 and the control unit 70 should be on an eight bit parallel party line bus and that the analog signals should be a differential signal with a nominal −20 dbV level using a 24 wire interconnecting cable.

An RF interface 74 renders the remainder of the RF interface compatible with bus 76. For example, RF interface 74 would consist of an eight bit parallel I/O, port party line drivers and receivers, operational amplifiers providing differential driving and receiving analog conversion between the −20 dbV signal on the cellular bus and the defined levels required by an analog switch and condition system 78. Cellular interfaces of this type are known, commercially available items, as exemplified by cellular interfaces sold by Motorola Corporation of Schaumberg, Illinois or Oki of Japan.

The analog switch and conditioning system 78 is implemented using currently known switching technology. The system may incorporate CMOS analog switches operative in response to microprocessor generated control signals to switch the state of signal processing operational amplifiers. Basically, this analog switch and condition system operates to selectively connect various components of the notebook computer or docking station to the RF interface 60. Microprocessor 80 provides control functions for the RF interface 74 and analog switch and conditioning system 78. Microprocessor 80 may be a conventional 16/32 bit microprocessor, such as manufactured by Intel Corporation. The microprocessor includes random access (RAM) and read only (ROM) memory storage systems which contain the control and data error programs necessary to adapt computer data for RF transmission.

A serial data stream is provided to the microprocessor 80 from the PCI bus in computer 62 or from bus 20 in docking station 58. Data received by the microprocessor from the notebook computer 62 or docking station 58 is provided with unique error correction signal information.

Modem 82 may be one of a number of conventional modems used for telephone wire line transmission which has test mode capabilities for deactivating certain modem functions. A particular commercially available modem suitable of use as the modem 82 is the AMI 3530 modem manufactured by Gould Advanced Semiconductors of 3800 Hemstead Road, Santa Clara, Calif. Modems of this type, when employed for data transmission over conventional telephone lines, will disconnect immediately in response to a carrier loss. When such modems sense a channel blanked status occasioned by a carrier loss, they provide a "break bit" output and disconnect non-scrambled modulated signal may be interpreted by the telephone operating equipment as a valid switch command.

The data stream from the microprocessor 80, including error correction data from the microprocessor, is transmitted by the modem 82 through the analog switch 78 and RF interface 74 to the transceiver 66. This data is then transmitted as a radio frequency signal by the antenna 60 to an antenna in a corresponding RF interface. For reception, this procedure is reversed. During reception, microprocessor 80 removes the error correction and control signals from the data stream and provides the data through the VL to PCI bridge to the PCI bus in computer 62 or bus 20 in docking station 58.

Figure 334:
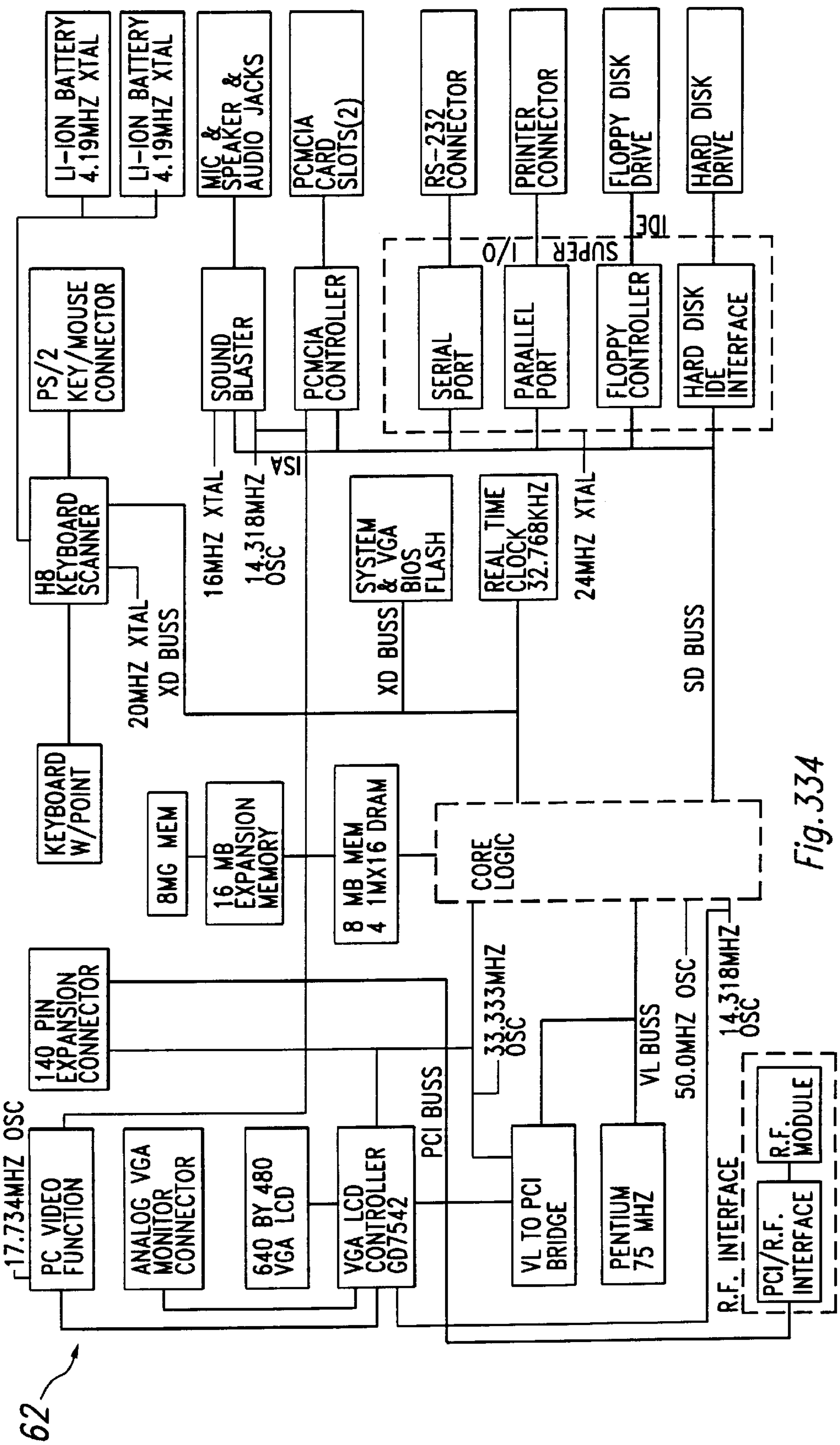
FIG. 334 illustrates a block diagram of a notebook computer incorporated a radio frequency "RF" interface.

An embodiment of a notebook computer 62 incorporating an RF interface is illustrated in FIG. 334. Other than the addition of the PCI/RF interface and the RF module, notebook 62 is substantially the same as notebook computer 10, previously discussed, and should be expected to operate and function in a substantially similar manner.

The system cards 28 illustrated in FIGS. 5–133, or a modification or alteration thereof, could also be used in docking station 58. The functionality of the system cards, the software to be loaded onto the docking system and the operation of the docking system is substantially the same as previously described in connection with docking station 12.

Figure 335:
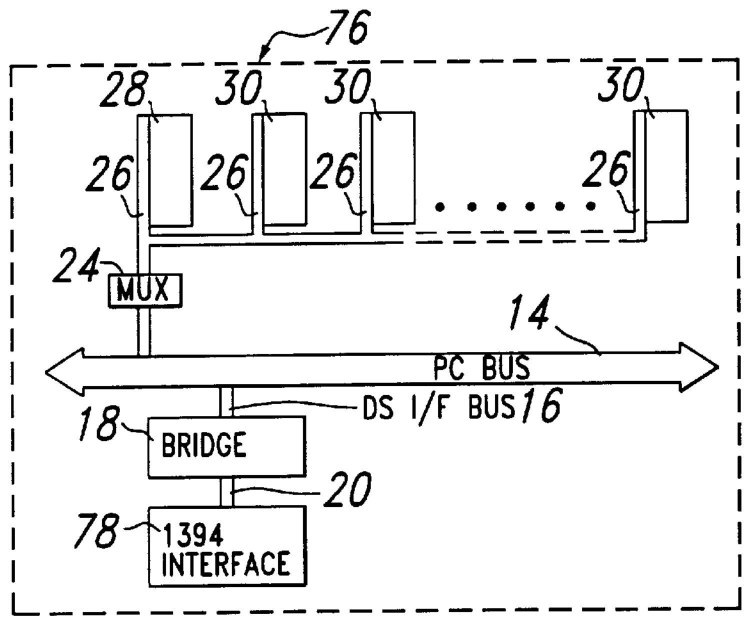
FIG. 335 illustrates an alternative embodiment of docking station 58 in which a MUX is located on the system card 28, not located separately in the docking station.
Figure 336:
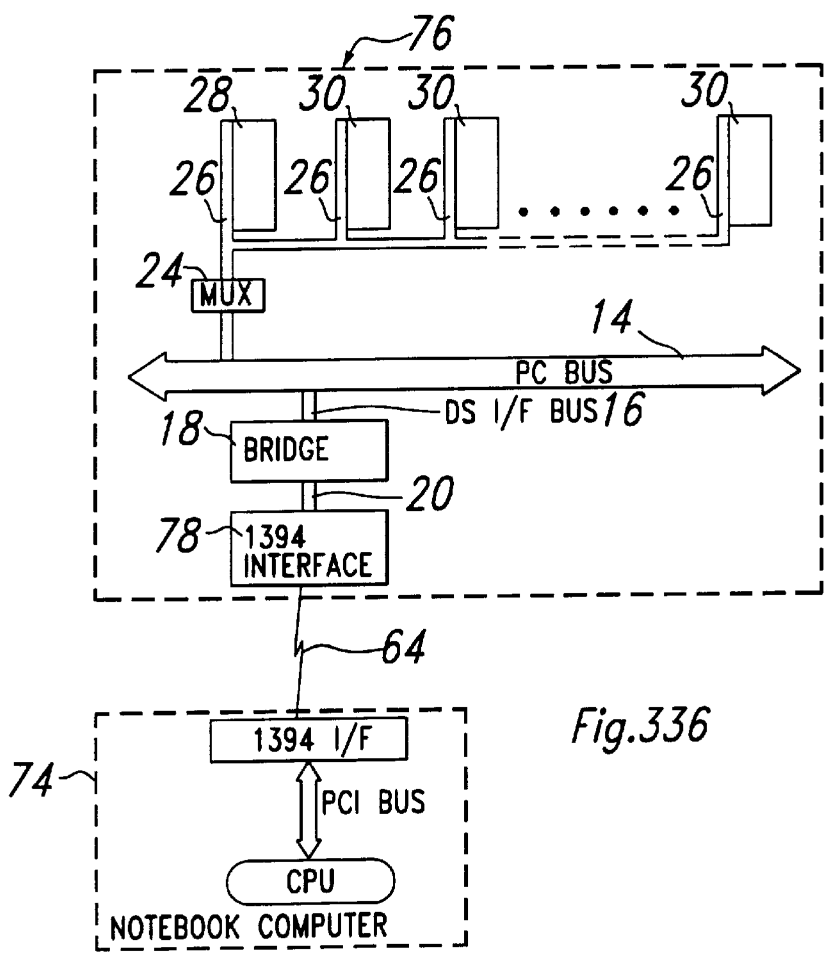
FIG. 336 illustrates a block diagram of the notebook computer infrared docked to the docking station of FIG. 335.

Docking station 58, illustrated in FIG. 335, is an alternative embodiment of docking station 58 illustrated in FIG. 331. In this embodiment of the invention, the MUX is located on the system card 28, not located separately in docking station 58. FIGS. 136–263 illustrate system cards 28 that may be used in docking station 58. System cards 28 illustrated in FIGS. 136–263 are the system cards illustrated in FIGS. 5–133, respectively, with the addition of a mux on each card. The docking station and docking system illustrated in FIGS. 335 and 336 operate in substantially the same fashion as the docking station and docking system illustrated in FIGS. 331 and 332.

In another embodiment of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking station 58 illustrated in FIGS. 335 and 336 (not having a mux separate from system card 28), could utilize the system cards 28 illustrated in FIGS. 5–133 (not having a mux). There were not be a mux in the docking station in this embodiment. Thus, while a mux is preferred, tri-state logic or a software stand PCI interface can also be used.

Figure 337:
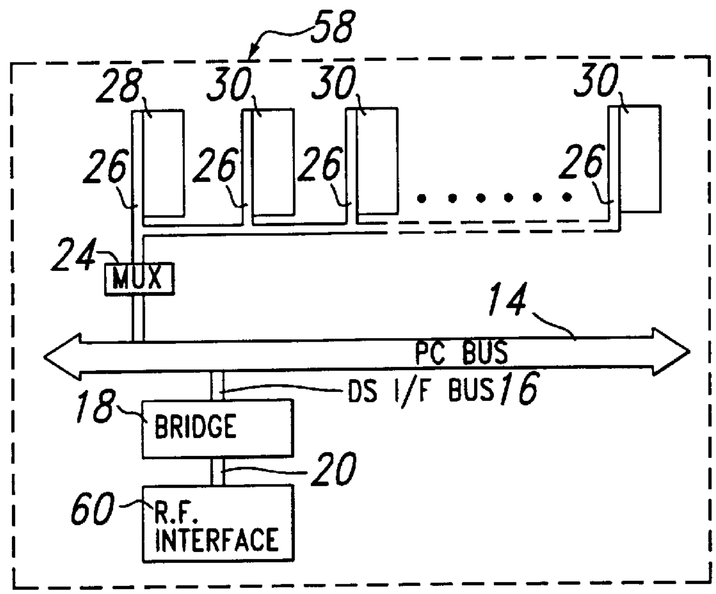
FIG. 337 illustrates an embodiment of the invention in which at least one additional card slot (three actually shown) is added to the docking station of FIG. 331. Each additional card slot 26 is coupled to mux 24. Each additional card slot is coupleable to a card 30. Each card 30 contains at least one resource that is an addition to the resources available on system card 28.
Figure 338:
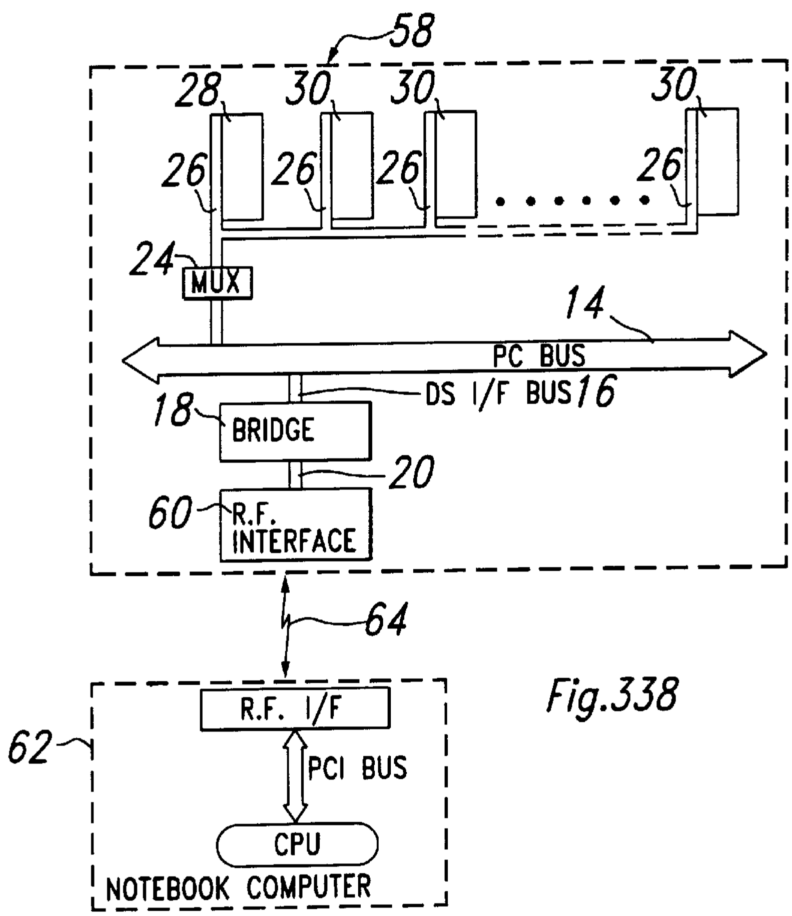
FIG. 338 illustrates a notebook computer infrared docked to the docking station of FIG. 337.

In yet another embodiment of the invention, illustrated in FIG. 337, at least one additional card slot (three actually shown) are added to the docking station of FIG. 331. Each card slot 26 is coupled to mux 24. Each additional card slot is coupleable to a card 30. Each card 30 is treated as a system resource. When notebook 62 docks to docking station 58, as illustrated in FIG. 338, it will pull the pin high on the mux which indicates a docked situation. System card 28 on the other side of mux 24 reads the I/O device and signals that it is being docked. The system pulls mux 24 and lets the cpu in notebook 10 have control over the released resources in docking station 58. As discussed previously, one way of accomplishing this is to write simple code to the cpu in system card 28 that says "if there is an input (interrupt) from the mux (which you could hook to external interrupt 1 or 2 off of the SMI interrupt on the CPU), the codes see this and says, "read the status—docked or undocked". If docked, the docking station turns over the resources, the CPU quits running on the PCI bus 14 (it doesn't issue any PCI cycles) and throws the mux so that the PCI bus is being driven by the external master and not the CPU in the system card 28. When the mux goes back, then the CPU in system card 28 starts driving the internal PCI bus 14. Thus, in a docked situation with a notebook, notebook may be given partial or full control over the resources of system card 28 and additional cards 30.

The system cards 28 illustrated in FIGS. 5–133, or a modification or alteration thereof, could also be used in docking station 58 as illustrated in FIG. 337. The functionality of the system cards, the software to be loaded onto the docking system and the operation of the docking system is substantially the same as previously described in connection with docking station 58. FIGS. 266–316 illustrate block diagrams of various embodiments of cards 30 that can be used in combination with docking station 58 illustrated in FIG. 337. The card slot connector on each card 30 couples to a mating connector in card slot 26 in docking station 58.

Figure 339:
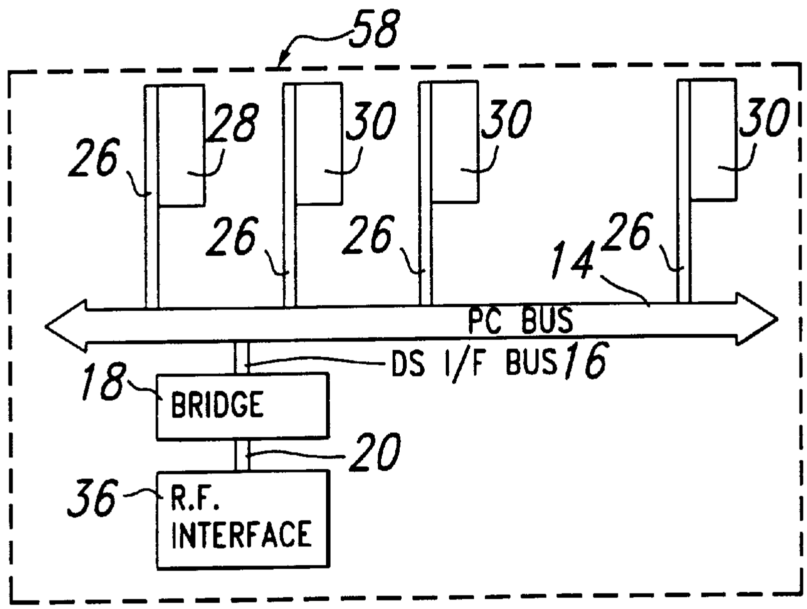
FIG. 339 illustrates an embodiment of the invention in which at least one additional card slot (three actually shown) is added to the docking station of FIG. 335. Each additional card slot is coupleable to a card 30. Each card 30 contains at least one resource that is an addition to the resources available on system card 28.
Figure 340:
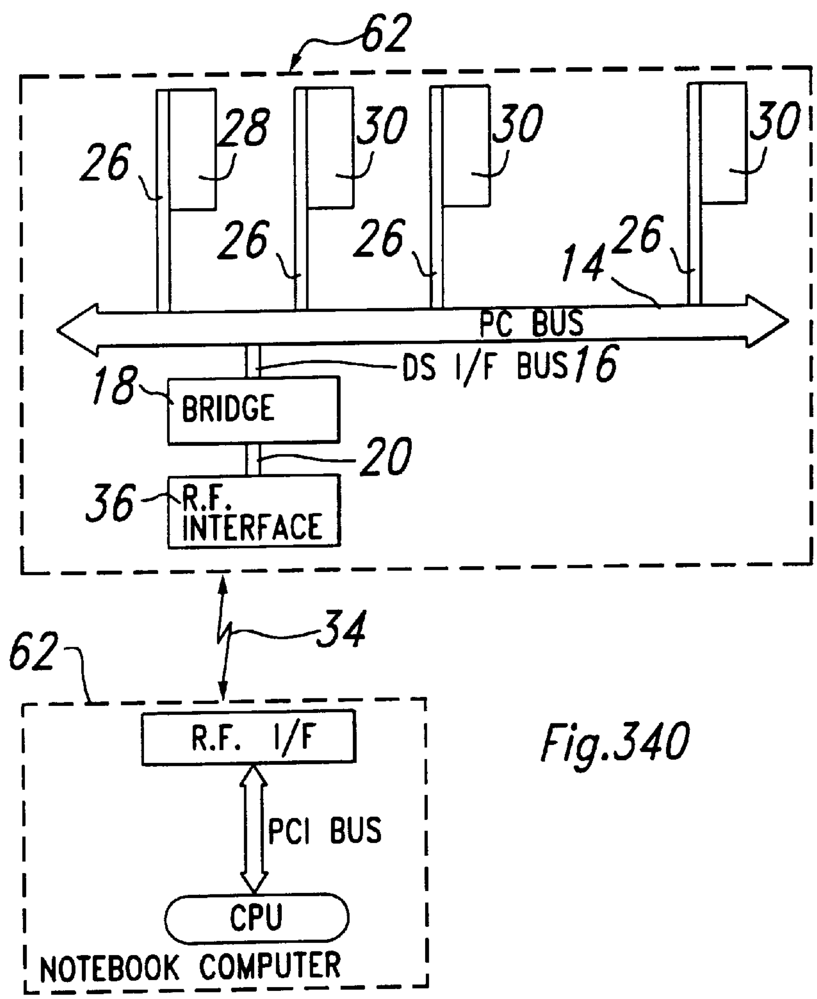
FIG. 340 illustrates a notebook computer infrared docked to the docking station of FIG. 339.

In yet another embodiment of the invention, illustrated in FIG. 339, at least one additional card slot (three actually shown) are added to the docking station of FIG. 335. Each card slot 26 is coupled to mux 24. Each additional card slot is coupleable to a card 30. Each card 30 is treated as a system resource. When notebook 38 docks to docking station 58, illustrated in FIG. 336, it will pull the pin high on the mux which indicates a docked situation. System card 28 on the other side of mux 24 reads the I/O device and signals that it is being docked. The system pulls mux 24 and lets the cpu in notebook 10 have control over the released resources in docking station 58. As discussed previously, one way of accomplishing this is to write simple code to the cpu in system card 28 that says "if there is an input (interrupt) from the mux (which you could hook to external interrupt 1 or 2 off of the SMI interrupt on the CPU), the codes see this and says, "read the status—docked or undocked". If docked, the docking station turns over the resources, the CPU quits running on the PCI bus 14 (it doesn't issue any PCI cycles) and throws the mux so that the PCI bus is being driven by the external master and not the CPU in the system card 28. When the mux goes back, then the CPU in system card 28 starts driving the internal PCI bus 14. Thus, in a docked situation with a notebook, notebook may be given partial or full control over the resources of system card 28 and additional cards 30.

As with previously described embodiments of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking station 58 illustrated in FIG. 339 (not having a mux separate from system card 28), could utilize the system cards 28 illustrated in FIGS. 5–133 (not having a mux). There were not be a mux in the docking station in this embodiment. Thus, while a mux is preferred, tri-state logic or a software stand PCI interface can also be used.

What is so powerful about this concept is, if the notebook is not connected with a hard dock, but we have instead a notebook 11RM11 remote M. Notebook 11RM11 is being carried by a user and he goes to the office. Assuming that the user has a notebook computer and docking station, with compatible RF interfaces, as he walks into his office, the RF module in the notebook is trying to RF communicate with the RF module in the docking station. A delta D of time (or distance in this case) really a delta Dt, says that at some point in time, delta Dt will approach zero and when delta Dt approaches zero, the RF modules in the dock and notebook RM recognize each other. What happens? When they recognize each other, the RF module sends out a dock request to the bridge. What does the bridge do? The bridge goes out to the mux and says "we have a configuration cycle". At the same time, the RF modem that is in notebook (remote master) says to the notebook via RF docking component "we have a dock request". The notebook says "go into configuration cycle, send a communication out". Sitting in the notebook (remote master) is the same things, PIC bus, video card and all that. The notebook sends out to the PCI bus, the RF intercepts the command, sends a signal to the RF module that says "what is your configuration?" The bridge reports back the configuration and comes back to the notebook. Thus, the entire docking station has been plug-n-play configured from a remote device. The RF module can be smart enough and say "I'm not going to report the video on the docking station as available." Why? Because there is not a direct connect because of the RF link, thus a user probably wants to leave the video live in the dock. Thus, you don't loose your video over a slow device because the video remains local to the dock system. Now, if an operating system, like Windows 95, supports dual displays, both displays (notebook and docking station) could be active at the same time with different data on each.

If the notebook disconnects while the remote master, the procedure is reversed. The docking station disconnects the PCI configuration cycle for the notebook that is in the remote master (goes away). The docking station reconfigures, gets all of its devices, and the docking station goes back to being a regular desk top system.

1394 HIGH PERFORMANCE SERIAL BUS DOCKING

Figure 341:
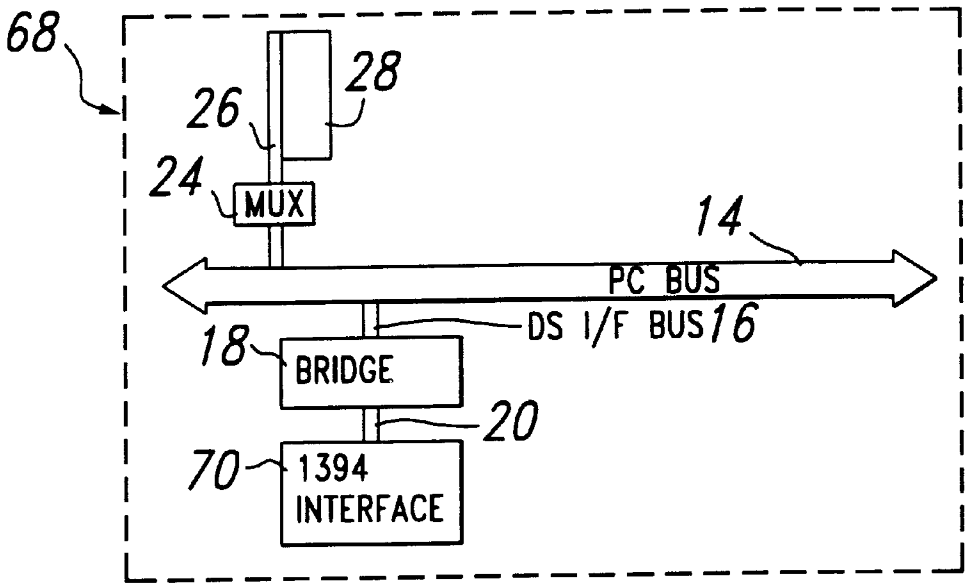
FIG. 341 illustrates a block diagram of a multi-configurable docking station to which a notebook computer may dock via a 1394 interface via radio frequency communications, according to still yet another embodiment of the invention.

FIG. 341 illustrates a block diagram of a multi-configurable docking station to which a notebook computer 66 may dock via a high performance serial bus, according to yet another embodiment of the invention. One embodiment of 1394 high performance serial bus docking utilizes RF communications and is another form of proximity docking which falls under the soft docking category. In this embodiment of 1394 docking, the notebook computer and docking station dock when a communication link is established between the notebook computer and the docking station, when they come within range of each other, and docking is initiated. In the embodiment of the invention illustrated in FIG. 341, multi-configurable docking station 68 comprises a high speed PCI bus 14, a docking station interface bus 16 that couples a bridge 18 to PCI bus 14 and data/signal lines or bus 20 that couples a 1394 interface 70 to bridge 18. Mux 24 couples PCI bus 14 to card slot 26. A connector on card slot 26 couples to a mating connector on system card 28. PCI bus 14 is preferably a high speed PCI bus (at least 32 bit wide), but may be any bus that provides performance characteristics similar to a high speed PCI bus. As with PCI bus 14, interface bus 16 is also preferably a high speed PCI bus (at least 32 bit wide), but may be any bus that provides performance characteristics similar to a high speed PCI bus. Data/signal lines or bus 20 couple 1394 interface 70 to bridge 18. As previously discussed in connection with embodiments of other docking stations, mux 24 is a switch with data lines. Mux devices are well known in the art, are commercially available, and have been described in more detail as needed. Card slot 26 is preferably a dedicated card slot for coupling with system card 28, but could just as easily be a circuit board, part of a circuit board, back plane or apparatus capable of coupling with a circuit card (such as system card 28), circuit board, device, apparatus or combination thereof.

As example of a 1394 interface might include a TI PCI/1394 links chip sitting in the 1394 interface in the docking station and another TI PCI/1394 links chip sitting in the docked notebook. The result is a PCI that talks to the PCI bridge. Everything works in terms of its device to device and bridge. The bridge and muxes determine whether a device belongs to the docking station or to a docked notebook, at any particular time. As an example, suppose that there is no master and there are multiple cards 30 in the docking station. Some of the cards 30 may not need to be coupled to a mux. The reason is that this card slot, which can be an AT bus, or PCI bus, may always be a slave (but does not mean that he cannot be an AT or PCI bus master cycle) but he knows he always belongs to the PCI bus. So, if the notebook disconnects, what happens? The mux flips, the CPU in system card 28 again becomes the master over resources released by the cpu in the notebook. In this process, the CPU in system card 28 says, "I'm the master again, I'm taking over the keyboard, the display, but wait, I need to run a PCI configuration cycle to get everybody that is on my bus reconfigured. So, the CPU comes back out to the bus, does a PCI configuration, and goes down the line. He looks at cards 30, and when he gets through, the result is a docking station that is really a desktop computer. The CPU has taken complete control of the dock and reconfigured the system. The docking station now has full plug-n-play capability. When the notebook again docks, the CPU in the notebook sends a message to the mux, which says "you no longer have control, you are not the master of alil of the resources in the docking station, you are now a slave or PCI device. Resouces in system card 28 and/or cards 30 are reconfigured to be under the control of a notebook that is either remote or fixed QED.

Figure 342:
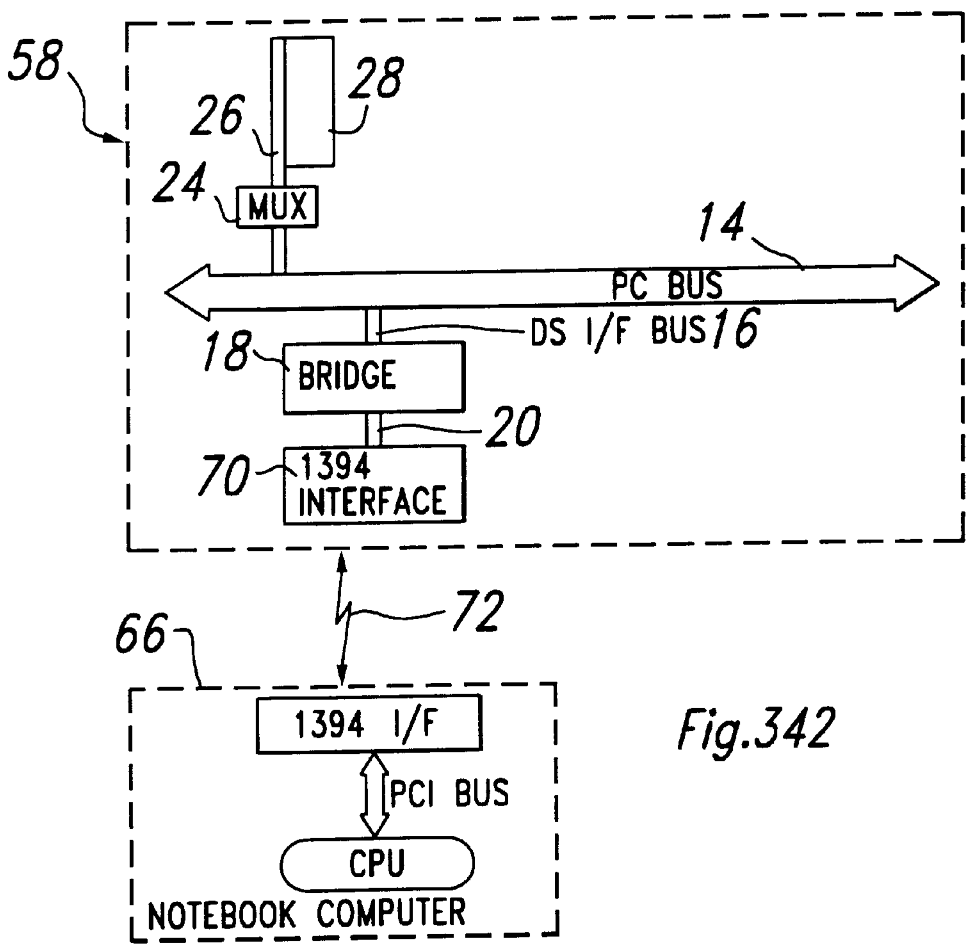
FIG. 342 illustrates a block diagram of a notebook computer 1394 interface/radio frequency docked to a notebook computer according to an embodiment of the invention.

In docking applications where a notebook computer is to be soft docked to docking station 68 via 1394 high performance serial bus/RF communications 72, 1394 interface 70 and a corresponding 1394 interface in the notebook computer 66 facilitate a 1394/RF connection between the notebook 66 and docking station 68 when they come within RF range of each other so that a communication link can be established and docking initiated, as illustrated in FIG. 342. One embodiment of the invention, a 1394 interface might include a PCI to 1394 interface (one example being the Texas Instruments 1394 module/PCI links chip) and an RF module. The RF module might be a radio transceiver found in current portable telephones, so long as it has a robust communications protocol going across. Another embodiment might utilize the RF interface illustrated in FIG. 333 to be the RF module. The protocol to be used is already defined. The IRDA specification of an SDLC specification, synchronous or asynchronous protocol, can also be used. The same RF interface could also be the RF interface 60 in docking station 58.

Figure 343:
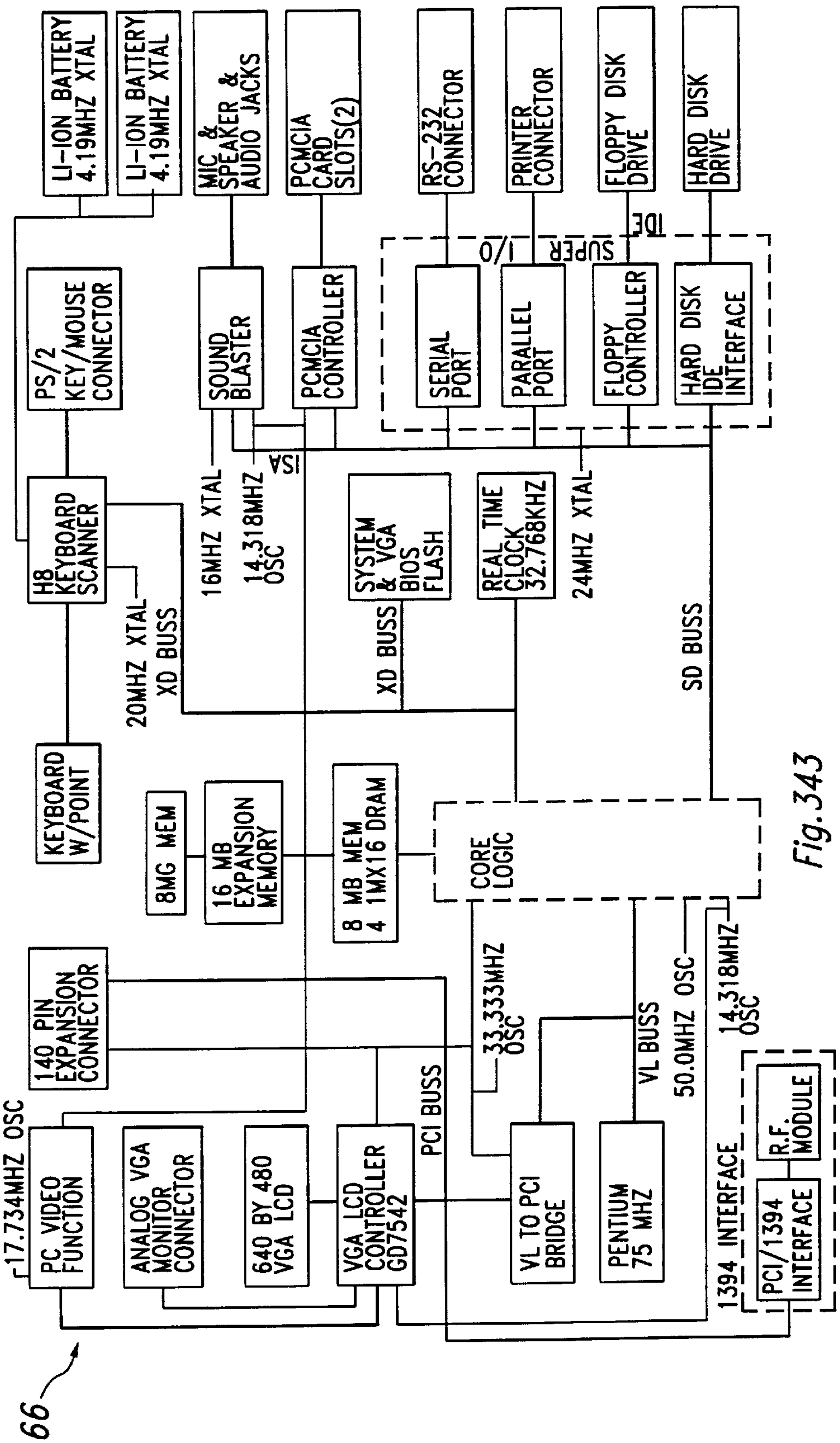
FIG. 343 illustrates a block diagram of a notebook computer incorporating a 1394 interface that utilizes RF communications.

An embodiment of a notebook computer 66 incorporating a 1394 interface is illustrated in FIG. 343. Other than the addition of the PCI/1394 interface and the RF module, notebook 66 is substantially the same as notebook computer 10, previously discussed, and should be expected to operate and function in a substantially similar manner.

The system cards 28 illustrated in FIGS. 5–133, or a modification or alteration thereof, could also be used in docking station 68. The functionality of the system cards, the software to be loaded onto the docking system and the operation of the docking system is substantially the same as previously described in connection with docking station 12.

Figure 344:
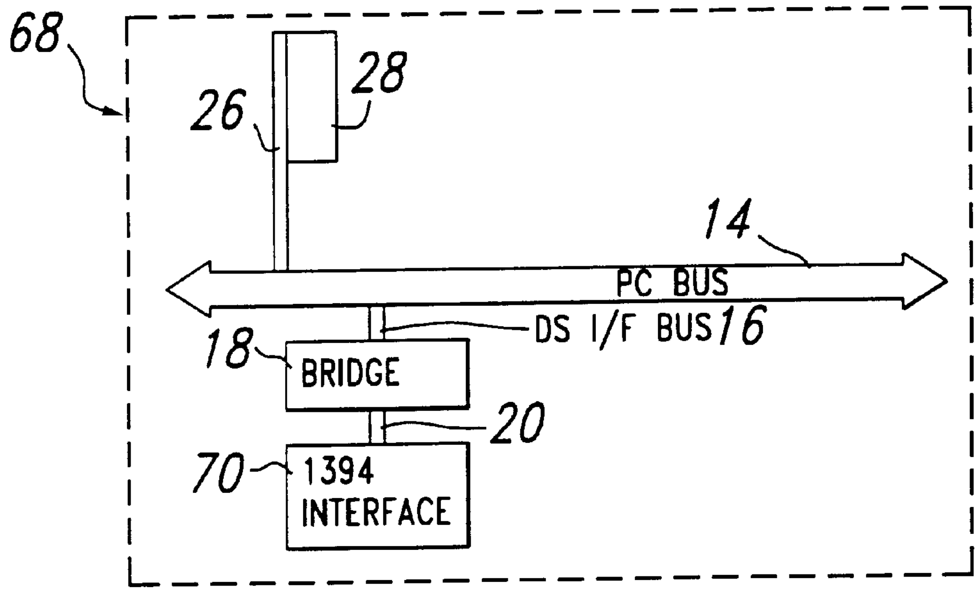
FIG. 344 illustrates an alternative embodiment of a docking station 68 in which a MUX is located on the system card 28, not located separately in the docking station.

Docking station 68, illustrated in FIG. 344, is an alternative embodiment of docking station 68 illustrated in FIG.

Figure 345:
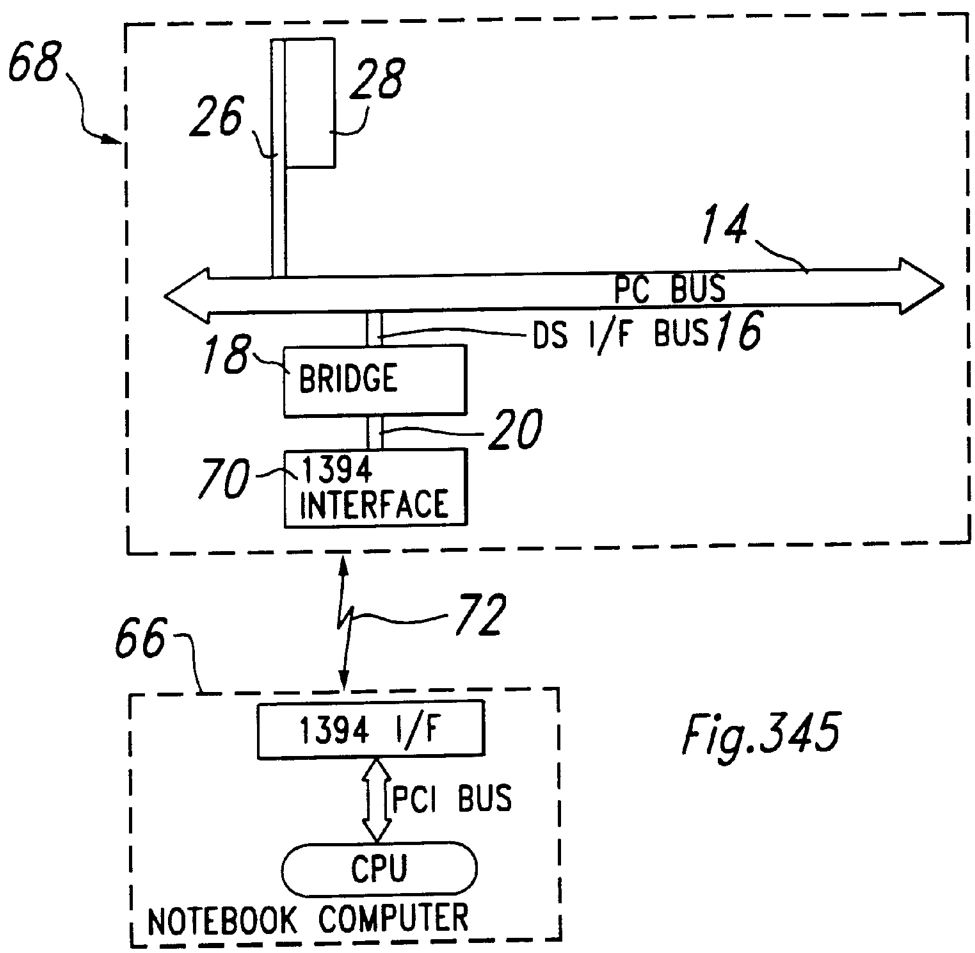
FIG. 345 illustrates a block diagram of the notebook computer infrared docked to the docking station of FIG. 344.

341. In this embodiment of the invention, the MUX is located on the system card 28, not located separately in docking station 68. FIGS. 136–263 illustrate system cards 28 that may be used in docking station 58. System cards 28 illustrated in FIGS. 136–263 are the system cards illustrated in FIGS. 5–133, respectively, with the addition of a mux on each card. The docking station and docking system illustrated in FIGS. 344 and 345 operate in substantially the same fashion as the docking station and docking system illustrated in FIG. 341 and 342.

In another embodiment of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking station 68 illustrated in FIGS. 344 and 345 (not having a mux separate from system card 28), could utilize the system cards 28 illustrated in FIGS. 5–133 (not having a mux). There would not be a mux in the docking station in this embodiment. Thus, while a mux is preferred, tri-state logic or a software stand PCI interface can also be used.

Figure 346:
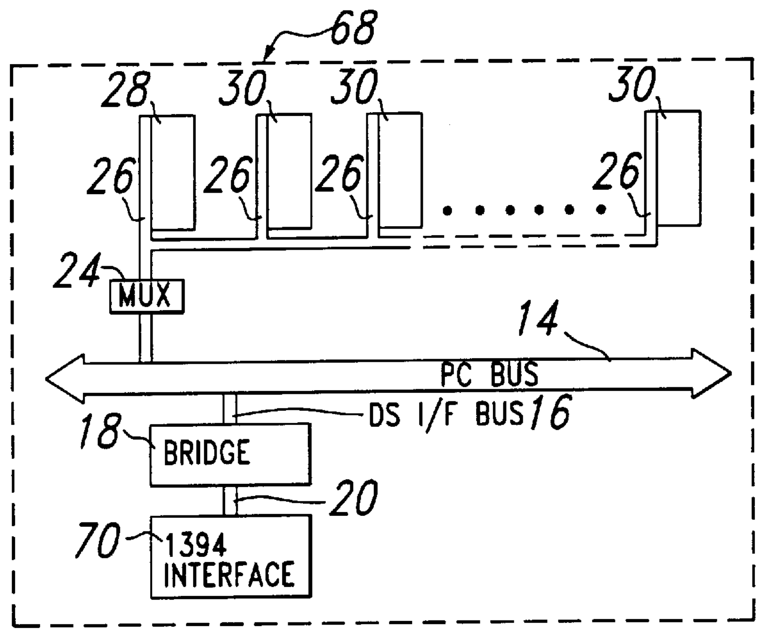
FIG. 346 illustrates an embodiment of the invention in which at least one additional card slot (three actually shown) is added to the docking station of FIG. 341. Each additional card slot 26 is coupled to mux 24. Each additional card slot is coupleable to a card 30. Each card 30 contains at least one resource that is an addition to the resources available on system card 28.
Figure 347:
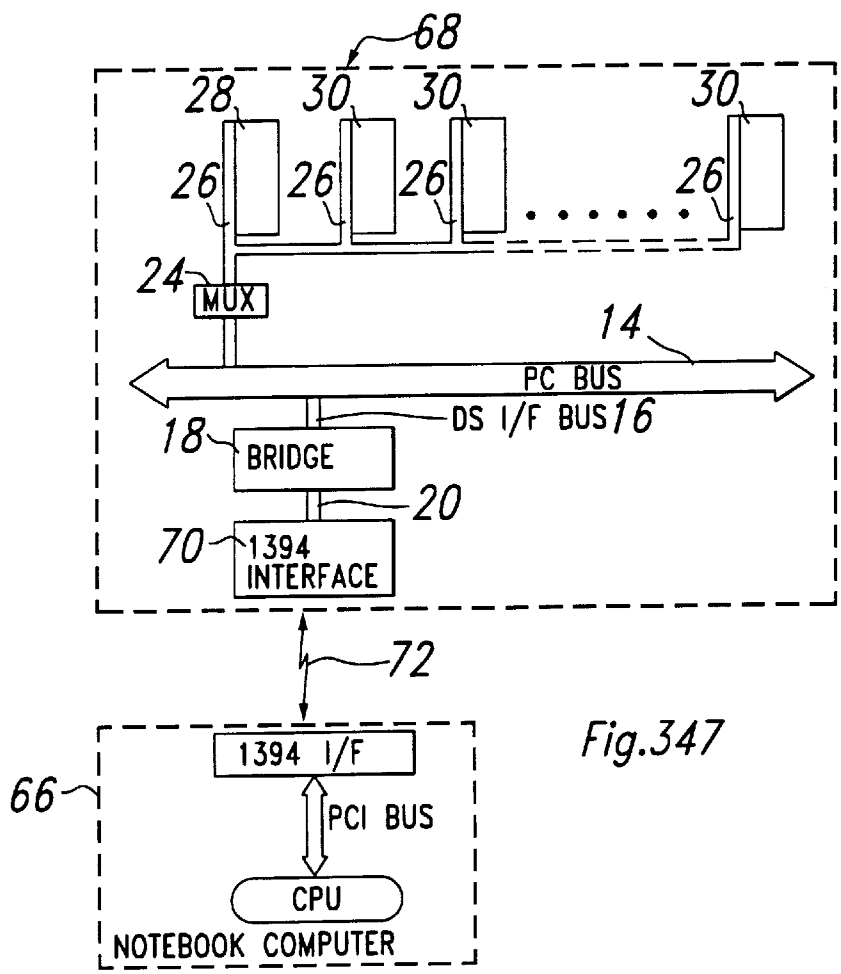
FIG. 347 illustrates a notebook computer 1394/radio frequency docked to the docking station of FIG. 346.

In yet another embodiment of the invention, illustrated in FIG. 346, at least one additional card slot (three actually shown) are added to the docking station of FIG. 341. Each card slot 26 is coupled to mux 24. Each additional card slot is coupleable to a card 30. Each card 30 is treated as a system resource. When notebook 66 docks to docking station 68, as illustrated in FIG. 347, it will pull the pin high on the mux which indicates a docked situation. System card 28 on the other side of mux 24 reads the I/O device and signals that it is being docked. The system pulls mux 24 and lets the cpu in notebook 66 have control over the released resources in docking station 68. As discussed previously, one way of accomplishing this is to write simple code to the cpu in system card 28 that says "if there is an input (interrupt) from the mux (which you could hook to external interrupt 1 or 2 off of the SMI interrupt on the CPU), the codes see this and says, "read the status—docked or undocked". If docked, the docking station turns over the resources, the CPU quits running on the PCI bus 14 (it doesn't issue any PCI cycles) and throws the mux so that the PCI bus is being driven by the external master and not the CPU in the system card 28. When the mux goes back, then the CPU in system card 28 starts driving the internal PCI bus 14. Thus, in a docked situation with a notebook, notebook may be given partial or full control over the resources of system card 28 and additional cards 30.

The system cards 28 illustrated in FIGS. 5–133, or a modification or alteration thereof, could also be used in docking station 68 illustrated in FIG. 346. The functionality of the system cards, the software to be loaded onto the docking system and the operation of the docking system is substantially the same as previously described in connection with docking station 68. FIGS. 266–316 illustrate block diagrams of various embodiments of cards 30 that can be used in combination with docking station 68 illustrated in FIG. 346. The card slot connector on each card 30 couples to a mating connector in card slot 26 in docking station 68.

Figure 348:
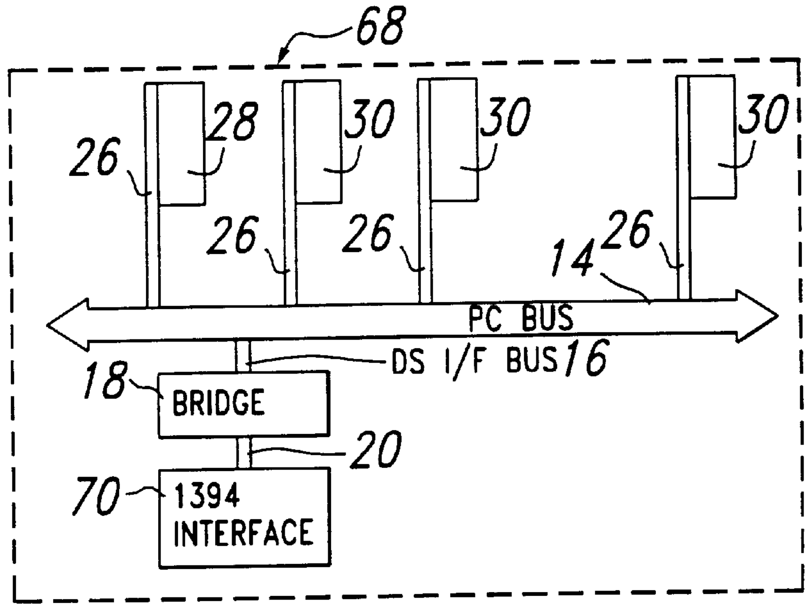
FIG. 348 illustrates an embodiment of the invention in which at least one additional card slot (three actually shown) is added to the docking station of FIG. 344. Each additional card slot is coupleable to a card 30. Each card 30 contains at least one resource that is an addition to the resources available on system card 28.
Figure 349:
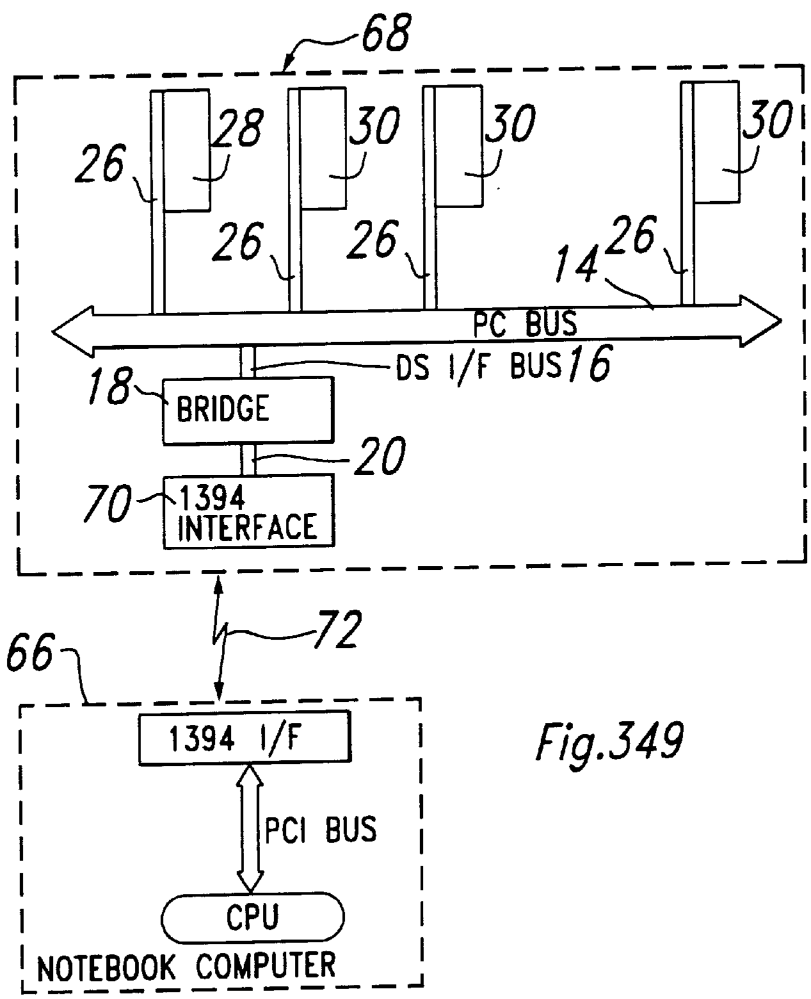
FIG. 349 illustrates a notebook computer 1394/radio frequency docked to the docking station of FIG. 348.

In yet another embodiment of the invention, illustrated in FIG. 348, at least one additional card slot (three actually shown) are added to the docking station of FIG. 344. Each card slot 26 is coupled to mux 24. Each additional card slot is coupleable to a card 30. Each card 30 is treated as a system resource. When notebook 66 docks to docking station 68, illustrated in FIG. 349, it will pull the pin high on the mux which indicates a docked situation. System card 28 on the other side of mux 24 reads the I/O device and signals that it is being docked. The system pulls mux 24 and lets the cpu in notebook 66 have control over the released resources in docking station 68. As discussed previously, one way of accomplishing this is to write simple code to the cpu in system card 28 that says "if there is an input (interrupt) from the mux (which you could hook to external interrupt 1 or 2 off of the SMI interrupt on the CPU), the codes see this and says, "read the status—docked or undocked". If docked, the docking station turns over the resources, the CPU quits running on the PCI bus 14 (it doesn't issue any PCI cycles) and throws the mux so that the PCI bus is being driven by the external master and not the CPU in the system card 28. When the mux goes back, then the CPU in system card 28 starts driving the internal PCI bus 14. Thus, in a docked situation with a notebook, notebook may be given partial or full control over the resources of system card 28 and additional cards 30.

As with previously described embodiments of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking station 68 illustrated in FIG. 348 (not having a mux separate from system card 28), could utilize the system cards 28 illustrated in FIGS. 5–133 (not having a mux). There were not be a mux in the docking station in this embodiment. Thus, while a mux is preferred, tri-state logic or a software stand PCI interface can also be used.

Assuming that the user has a notebook computer and docking station, with compatible 1394/RF interfaces, as he walks into his office, the 1394/RF interface in the notebook is trying to RF communicate with the 1394/RF interface in the docking station. A delta D of time (or distance in this case) really a delta Dt, says that at some point in time, delta Dt will approach zero and when delta Dt approaches zero, the 1394/RF modules in the dock and notebook recognize each other. When they recognize each other, the 1394/RF module sends out a dock request to the bridge. The bridge goes out to the mux and says "we have a configuration cycle". At the same time, the 1394/RF interface in notebook signals that "we have a dock request". The notebook says "go into configuration cycle, send a communication out". Sitting in the notebook (remote master) is the same things, PIC bus, video card and all that. The notebook sends out to the PCI bus, the 1394/RF interface intercepts the command, sends a signal to the 1394/RF interface in the docking station "what is your configuration?" The bridge reports back the configuration and comes back to the notebook. Thus, the entire docking station has been plug-n-play configured from a remote device. If the notebook disconnects while the remote master, the procedure is reversed. The docking station disconnects the PCI configuration cycle for the notebook that is in the remote master (goes away). The docking station reconfigures, gets all of its devices, and the docking station goes back to being a regular desk top system.

Figure 350:
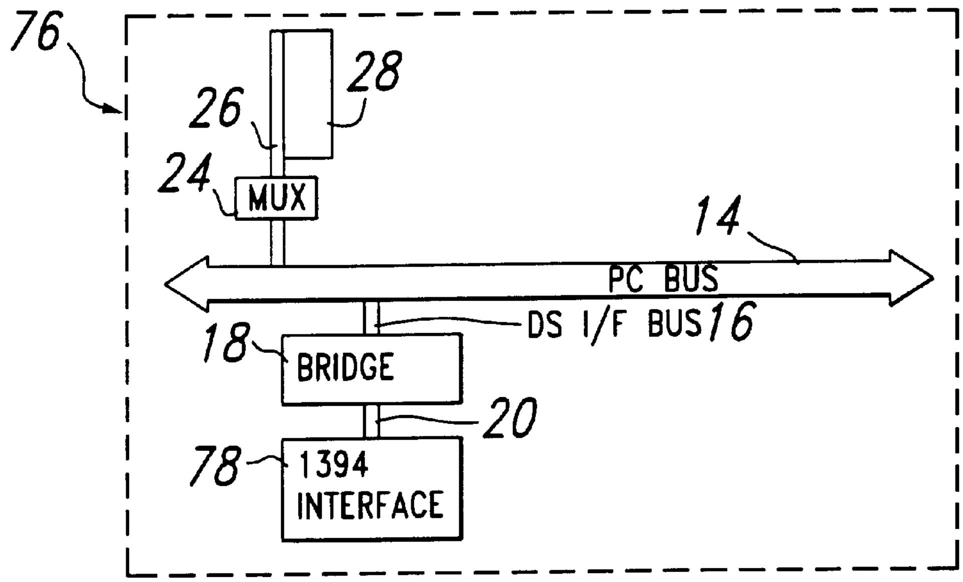
FIG. 350 illustrates a notebook computer 1394/radio frequency docked to the docking station of FIG. 349.

FIG. 350 illustrates a block diagram of a multi-configurable docking station to which a notebook computer 74 may dock via a high performance serial bus, according to still yet another embodiment of the invention. An embodiment of 1394 high performance serial bus docking utilizing a cable connection is a form of local docking. In this embodiment of 1394 docking, the notebook computer and docking station dock when a communication link is established between the notebook computer and the docking station, via a cable, and docking is initiated. In the embodiment of the invention illustrated in FIG. 350, multi-configurable docking station 76 comprises a high speed PCI bus 14, a docking station interface bus 16 that couples a bridge 18 to PCI bus 14 and data/signal lines or bus 20 that couples a 1394 interface 78 to bridge 18. Mux 24 couples PCI bus 14 to card slot 26. A connector on card slot 26 couples to a mating connector on system card 28. PCI bus 14 is preferably a high speed PCI bus (at least 32 bit wide), but may be any bus that provides performance characteristics similar to a high speed PCI bus. As with PCI bus 14, interface bus 16 is also preferably a high speed PCI bus (at least 32 bit wide), but may be any bus that provides performance characteristics similar to a high speed PCI bus. Data/signal lines or bus 20 couple 1394 interface 78 to bridge 18. As previously discussed in connection with embodiments of other docking stations, mux 24 is a switch with data lines. Mux devices are well known in the art, are commercially available, and have been described in more detail as needed. Card slot 26 is preferably a dedicated card slot for coupling with system card 28, but could just as easily be a circuit board, part of a circuit board, back plane or apparatus capable of coupling with a circuit card (such as system card 28), circuit board, device, apparatus or combination thereof.

Figure 351:
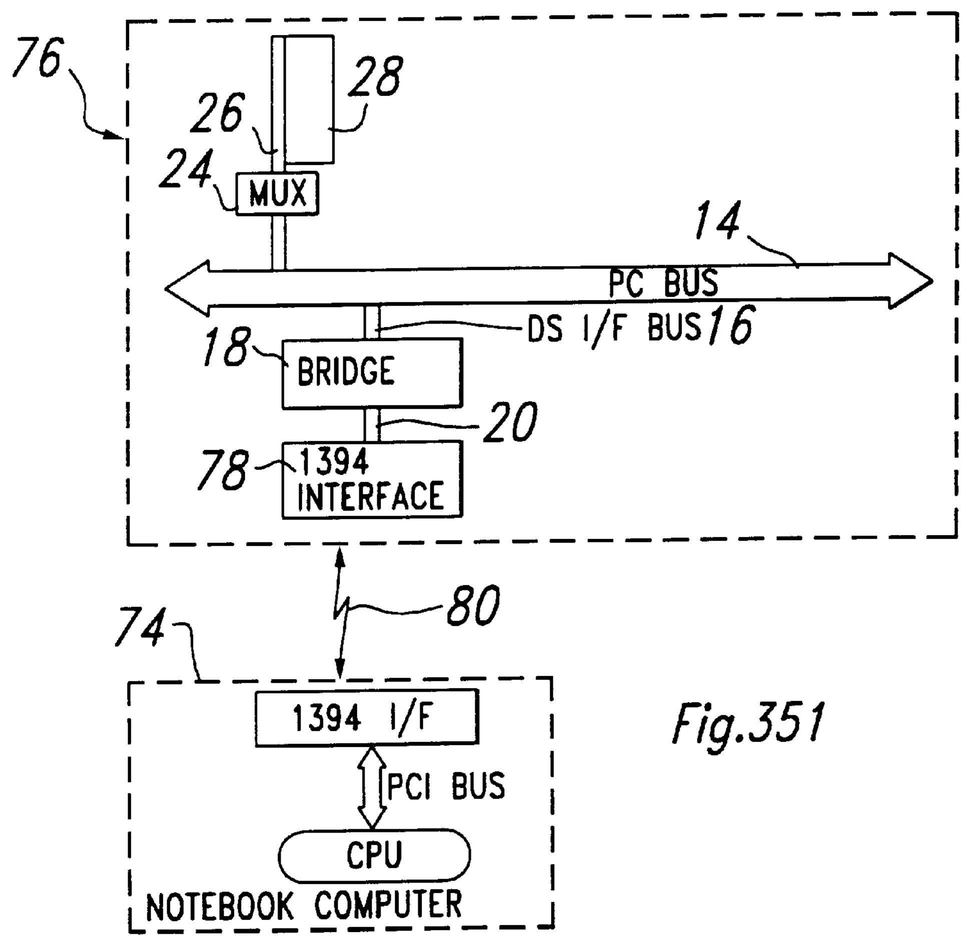
FIG. 351 illustrates a block diagram of a notebook computer 1394 cable docked to a notebook computer according to an embodiment of the invention.
Figure 352:
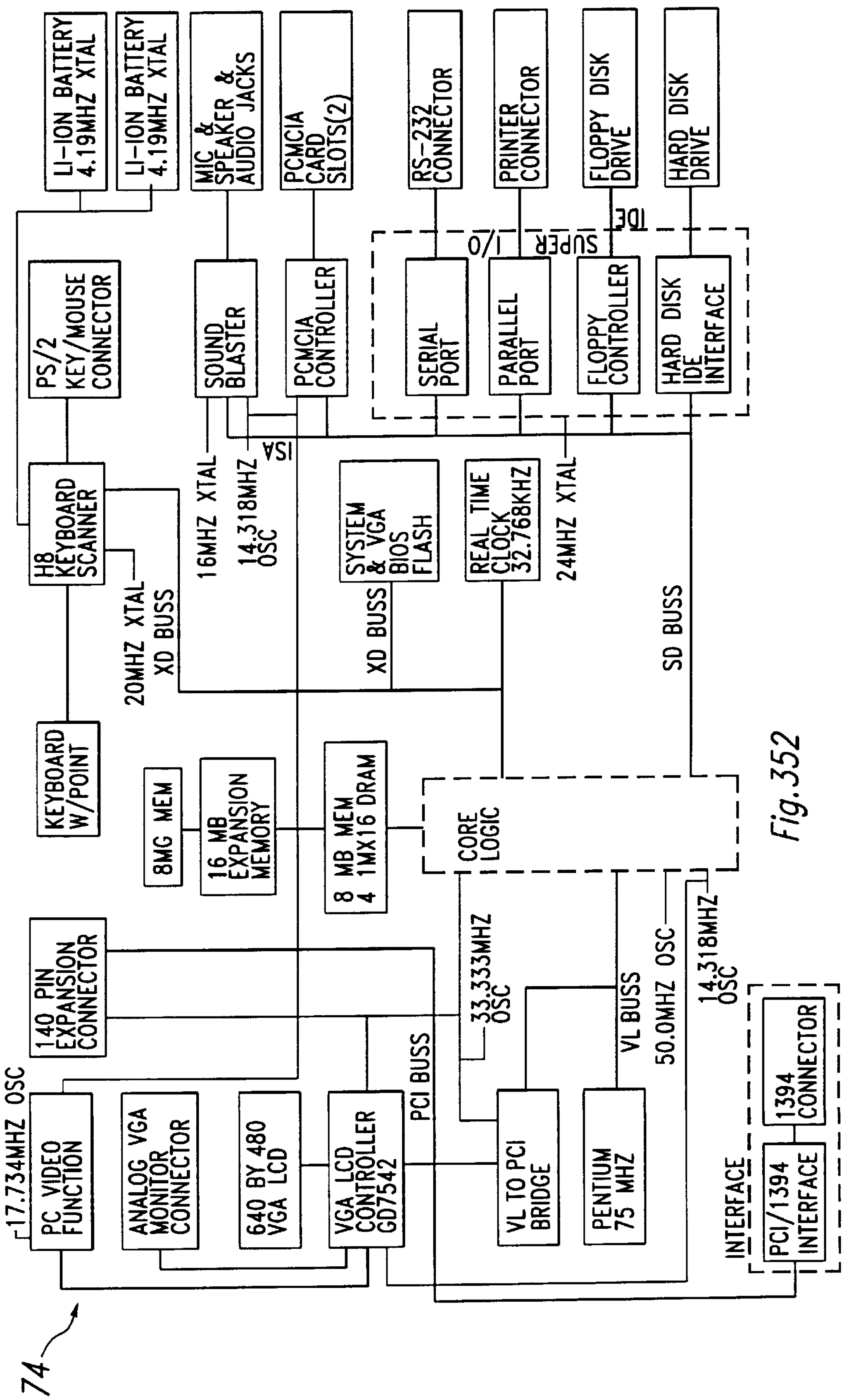
FIG. 352 illustrates a block diagram of a notebook computer incorporating a 1394 interface that is cable connected.

In docking applications where a notebook computer is to be soft docked to docking station 68 via 1394 high performance serial bus cable 80, 1394 interface 78, a corresponding 1394 interface in the notebook computer 74, and a cable coupling the two interfaces together, facilitate a 1394 connection between the notebook 74 and docking station 76, as illustrated in FIG. 351. In one embodiment of the invention, a 1394 interface might include a PCI to 1394 interface and a 1394 connector. An embodiment of a notebook computer 74 incorporating a 1394 interface is illustrated in FIG. 352. Other than the addition of the PCI/1394 interface and the 1394 connector, notebook 74 is substantially the same as notebook computer 10, previously discussed, and should be expected to operate and function in a substantially similar manner.

The system cards 28 illustrated in FIGS. 5–133, or a modification or alteration thereof, could also be used in docking station 76. The functionality of the system cards, the software to be loaded onto the docking system and the operation of the docking system is substantially the same as previously described in connection with docking station 12.

Figure 353:
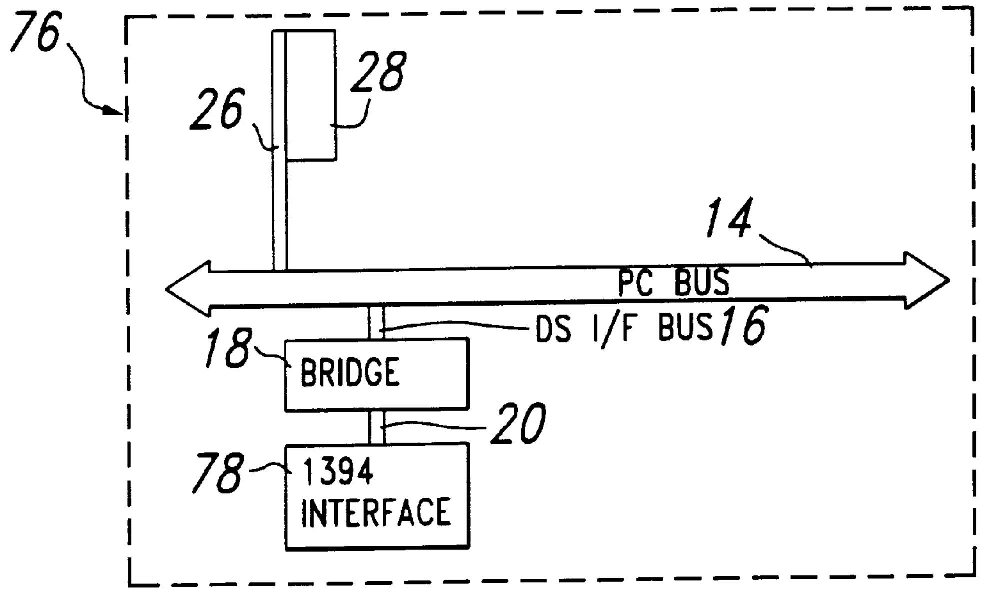
FIG. 353 illustrates an alternative embodiment of a docking station 76 in which a MUX is located on the system card 28, not located separately in the docking station.
Figure 354:
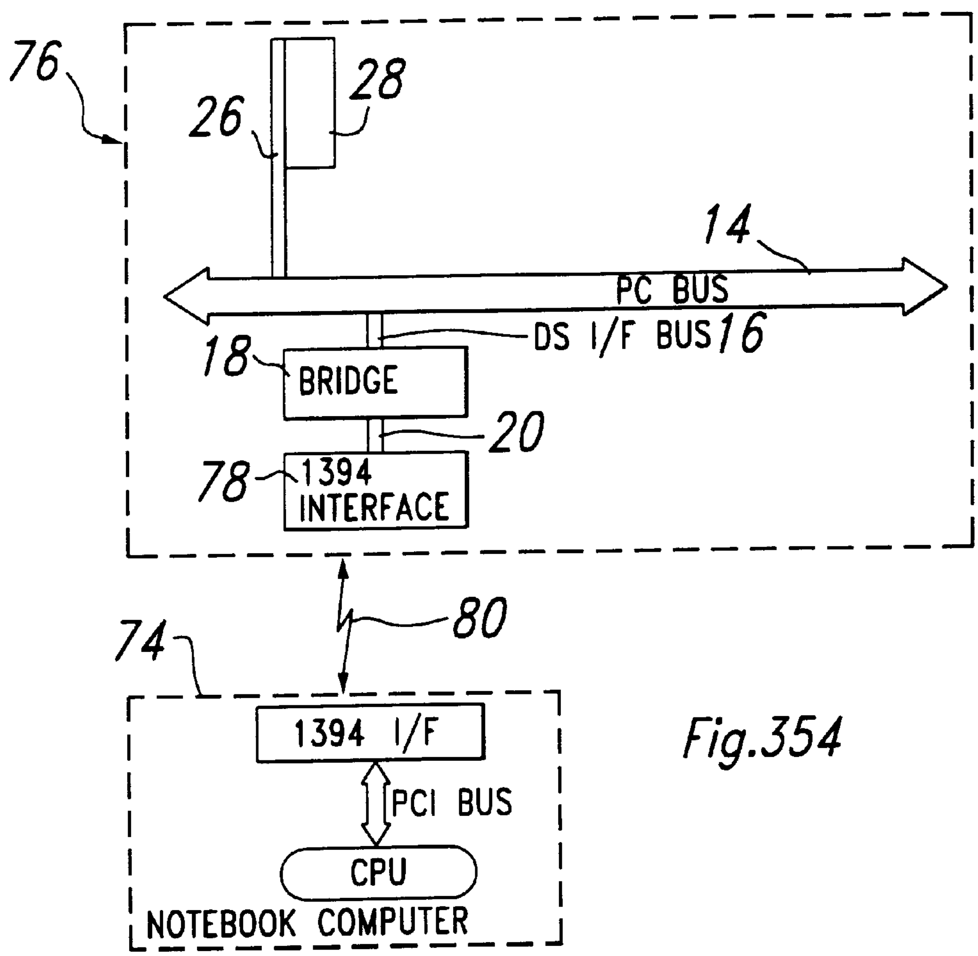
FIG. 354 illustrates a block diagram of the notebook computer 1394/cable docked to the docking station of FIG. 353.

Docking station 76, illustrated in FIG. 353, is an alternative embodiment of docking station 76 illustrated in FIG. 350. In this embodiment of the invention, the MUX is located on the system card 28, not located separately in docking station 76. FIGS. 136–263 illustrate system cards 28 that may be used in docking station 76. System cards 28 illustrated in FIGS. 136–263 are the system cards illustrated in FIGS. 5–133, respectively, with the addition of a mux on each card. The docking station and docking system illustrated in FIGS. 353 and 354 operate in substantially the same fashion as the docking station and docking system illustrated in FIGS. 350 and 351.

In another embodiment of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking station 76 illustrated in FIGS. 353 and 354 (not having a mux separate from system card 28), could utilize the system cards 28 illustrated in FIGS. 5–133 (not having a mux). There would not be a mux in the docking station in this embodiment. Thus, while a mux is preferred, tri-state logic or a software stand PCI interface can also be used.

Figure 355:
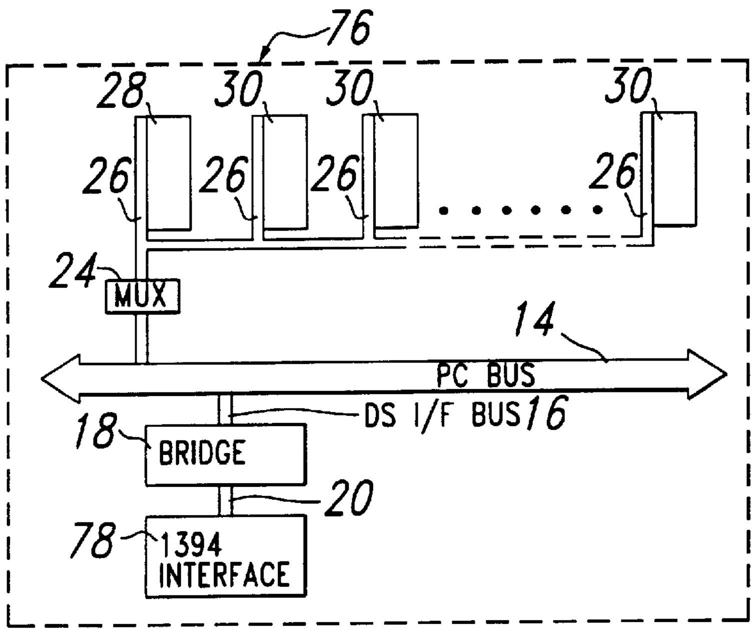
FIG. 355 illustrates an embodiment of the invention in which at least one additional card slot (three actually shown) is added to the docking station of FIG. 350. Each additional card slot 26 is coupled to mux 24. Each additional card slot is coupleable to a card 30. Each card 30 contains at least one resource that is an addition to the resources available on system card 28.
Figure 356:
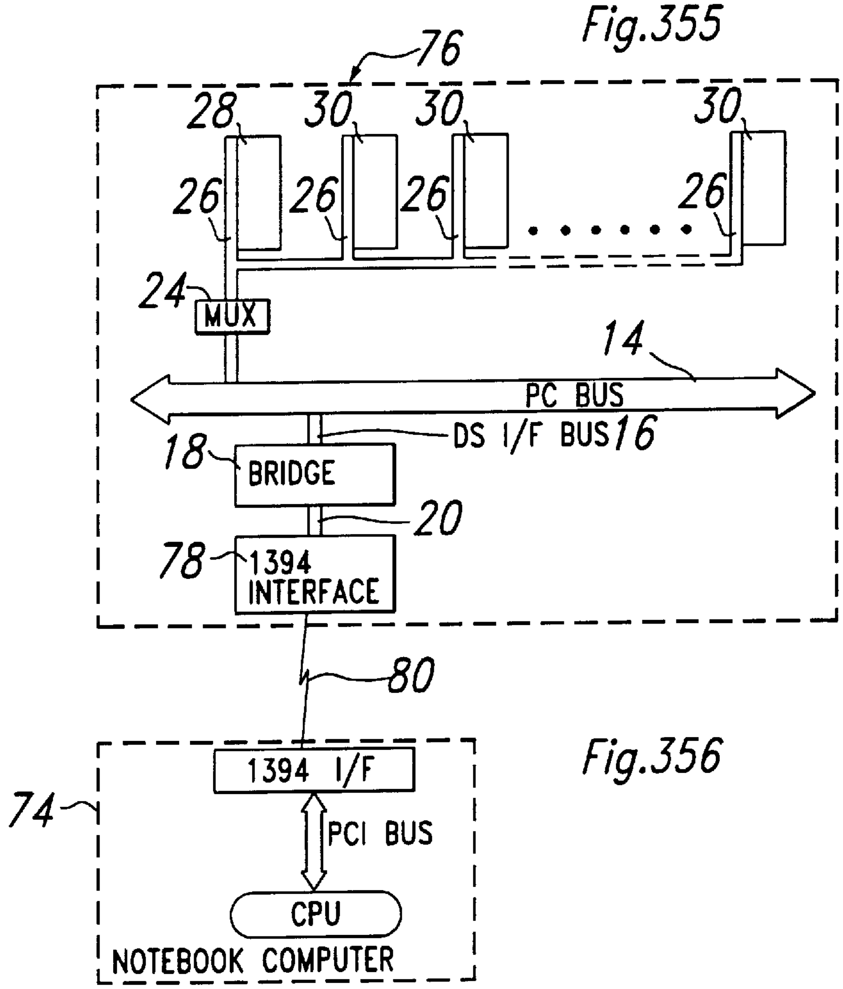
FIG. 356 illustrates a notebook computer 1394/cable docked to the docking station of FIG. 355.

In yet another embodiment of the invention, illustrated in FIG. 355, at least one additional card slot (three actually shown) are added to the docking station of FIG. 350. Each card slot 26 is coupled to mux 24. Each additional card slot is coupleable to a card 30. Each card 30 is treated as a system resource. When notebook 74 docks to docking station 76, as illustrated in FIG. 356, it will pull the pin high on the mux which indicates a docked situation. System card 28 on the other side of mux 24 reads the I/O device and signals that it is being docked. The system pulls mux 24 and lets the cpu in notebook 74 have control over the released resources in docking station 76. As discussed previously, one way of accomplishing this is to write simple code to the cpu in system card 28 that says "if there is an input (interrupt) from the mux (which you could hook to external interrupt 1 or 2 off of the SMI interrupt on the CPU), the codes see this and says, "read the status—docked or undocked". If docked, the docking station turns over the resources, the CPU quits running on the PCI bus 14 (it doesn't issue any PCI cycles) and throws the mux so that the PCI bus is being driven by the external master and not the CPU in the system card 28. When the mux goes back, then the CPU in system card 28 starts driving the internal PCI bus 14. Thus, in a docked situation with a notebook, notebook may be given partial or full control over the resources of system card 28 and additional cards 30.

The system cards 28 illustrated in FIGS. 5–133, or a modification or alteration thereof, could also be used in docking station 76 illustrated in FIG. 355. The functionality of the system cards, the software to be loaded onto the docking system and the operation of the docking system is substantially the same as previously described in connection with docking station 76. FIGS. 266–316 illustrate block diagrams of various embodiments of cards 30 that can be used in combination with docking station 76 illustrated in FIG. 355. The card slot connector on each card 30 couples to a mating connector in card slot 26 in docking station 76.

Figure 357:
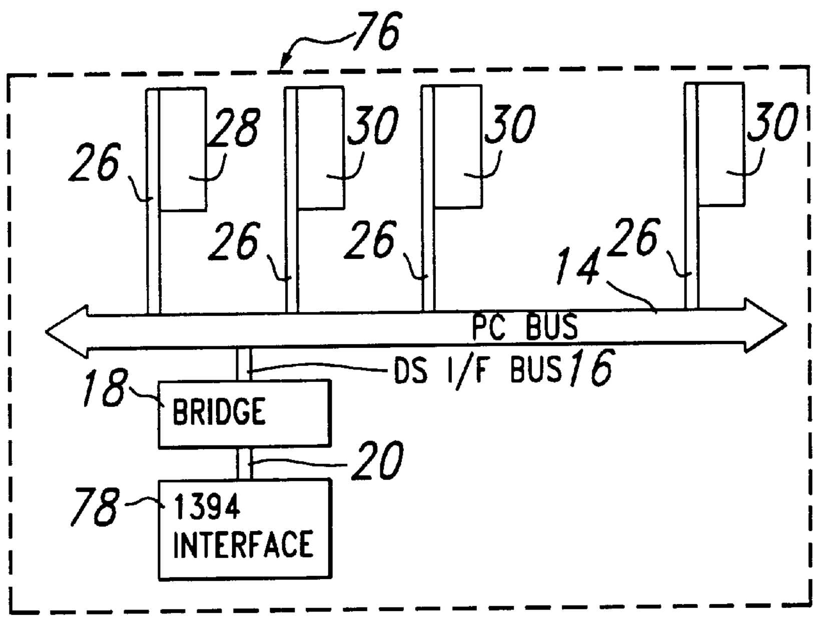
FIG. 357 illustrates an embodiment of the invention in which at least one additional card slot (three actually shown) is added to the docking station of FIG. 353. Each additional card slot is coupleable to a card 30. Each card 30 contains at least one resource that is an addition to the resources available on system card 28.
Figure 358:
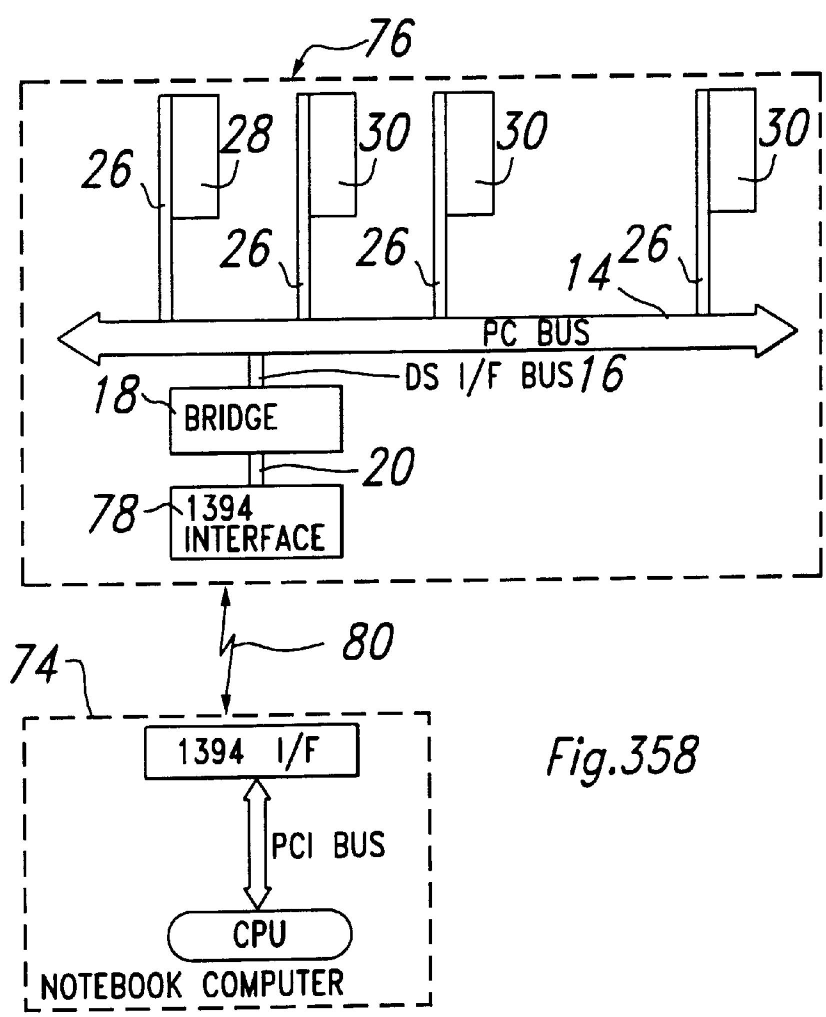
FIG. 358 illustrates a notebook computer 1394/cable docked to the docking station of FIG. 357.

In yet another embodiment of the invention, illustrated in FIG. 357, at least one additional card slot (three actually shown) are added to the docking station of FIG. 353. Each card slot 26 is coupled to mux 24. Each additional card slot is coupleable to a card 30. Each card 30 is treated as a system resource. When notebook 74 docks to docking station 76, illustrated in FIG. 358, it will pull the pin high on the mux which indicates a docked situation. System card 28 on the other side of mux 24 reads the I/O device and signals that it is being docked. The system pulls mux 24 and lets the cpu in notebook 74 have control over the released resources in docking station 76. As discussed previously, one way of accomplishing this is to write simple code to the cpu in system card 28 that says "if there is an input (interrupt) from the mux (which you could hook to external interrupt 1 or 2 off of the SMI interrupt on the CPU), the codes see this and says, "read the status—docked or undocked". If docked, the docking station turns over the resources, the CPU quits running on the PCI bus 14 (it doesn't issue any PCI cycles) and throws the mux so that the PCI bus is being driven by the external master and not the CPU in the system card 28. When the mux goes back, then the CPU in system card 28 starts driving the internal PCI bus 14. Thus, in a docked situation with a notebook, notebook may be given partial or full control over the resources of system card 28 and additional cards 30.

As with previously described embodiments of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking station 76 illustrated in FIG. 357 (not having a mux separate from system card 28), could utilize the system cards 28 illustrated in FIGS. 5–133 (not having a mux). There were not be a mux in the docking station in this embodiment. Thus, while a mux is preferred, tri-state logic or a software stand PCI interface can also be used.

Assuming that the user has a notebook computer and docking station, with compatible 1394 interfaces, he would have to cable connect 1394 connectors on the notebook computer and docking station to each other in order to dock. When 1394 cable connected, the bridge goes out to the mux and says "we have a configuration cycle". At the same time, the 1394/RF interface in notebook signals that "we have a dock request". The notebook says "go into configuration cycle, send a communication out". Sitting in the notebook (remote master) is the same things, PIC bus, video card and all that. The notebook sends out to the PCI bus, which utilizes the 1394 interface, which then signals the 1394 interface in the docking station "what is your configuration?" The bridge reports back the configuration and comes back to the notebook. Thus, the entire docking station has been plug-n-play configured from a remote device. If the notebook disconnects while the remote master, the procedure is reversed. The docking station disconnects the PCI configuration cycle for the notebook that is in the remote master (goes away). The docking station reconfigures, gets all of its devices, and the docking station goes back to being a regular desk top system.

CARD BUS DOCKING

Figure 359:
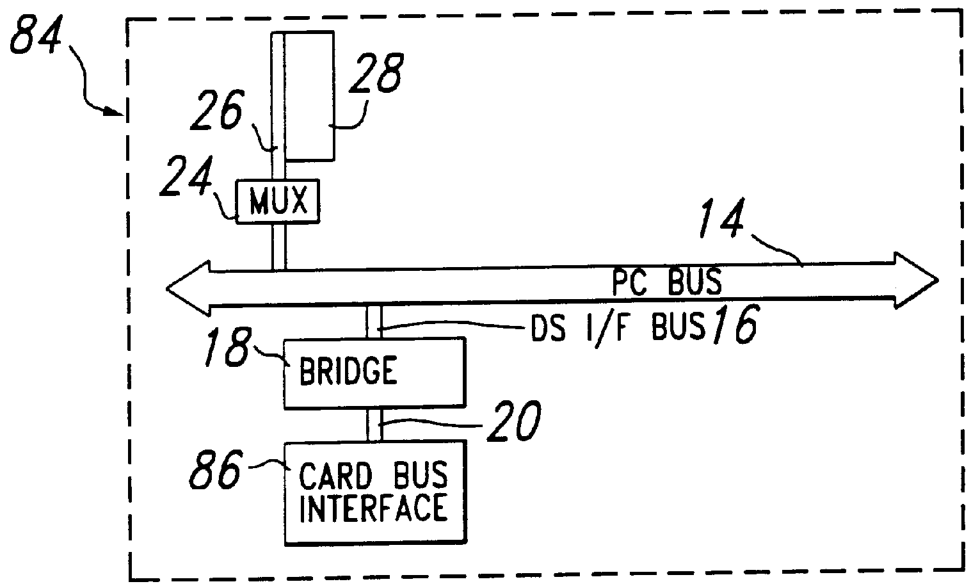
FIG. 359 illustrates a block diagram of a multi-configurable docking station to which a notebook computer may dock via a card bus interface, according to yet still another embodiment of the invention.

FIG. 359 illustrates a block diagram of a multi-configurable docking station to which a notebook computer 82 may dock via card bus, according to another embodiment of the invention. Card bus docking falls under the remote docking category. In card bus docking, the notebook computer and docking station dock when a communication link is established between the notebook computer and the docking station, and docking is initiated. In the embodiment of the invention illustrated in FIG. 359, multi-configurable docking station 84 comprises a high speed PCI bus 14, a docking station interface bus 16 that couples a bridge 18 to PCI bus 14 and data/signal lines or bus 20 that couples a card bus interface 86 to bridge 18. Mux 24 couples PCI bus 14 to card slot 26. A connector on card slot 26 couples to a mating connector on system card 28. PCI bus 14 is preferably a high speed PCI bus (at least 32 bit wide), but may be any bus that provides performance characteristics similar to a high speed PCI bus. As with PCI bus 14, interface bus 16 is also preferably a high speed PCI bus (at least 32 bit wide), but may be any bus that provides performance characteristics similar to a high speed PCI bus. Data/signal lines or bus 20 couple card bus interface module 86 to bridge 18. As previously discussed in connection with docking stations 12 and 32, mux 24 is a switch with data lines. Mux devices are well known in the art, are commercially available, and have been described in more detail as needed. Card slot 26 is preferably a dedicated card slot for coupling with system card 28, but could just as easily be a circuit board, part of a circuit board, back plane or apparatus capable of coupling with a circuit card (such as system card 28), circuit board, device, apparatus or combination thereof.

Figure 360:
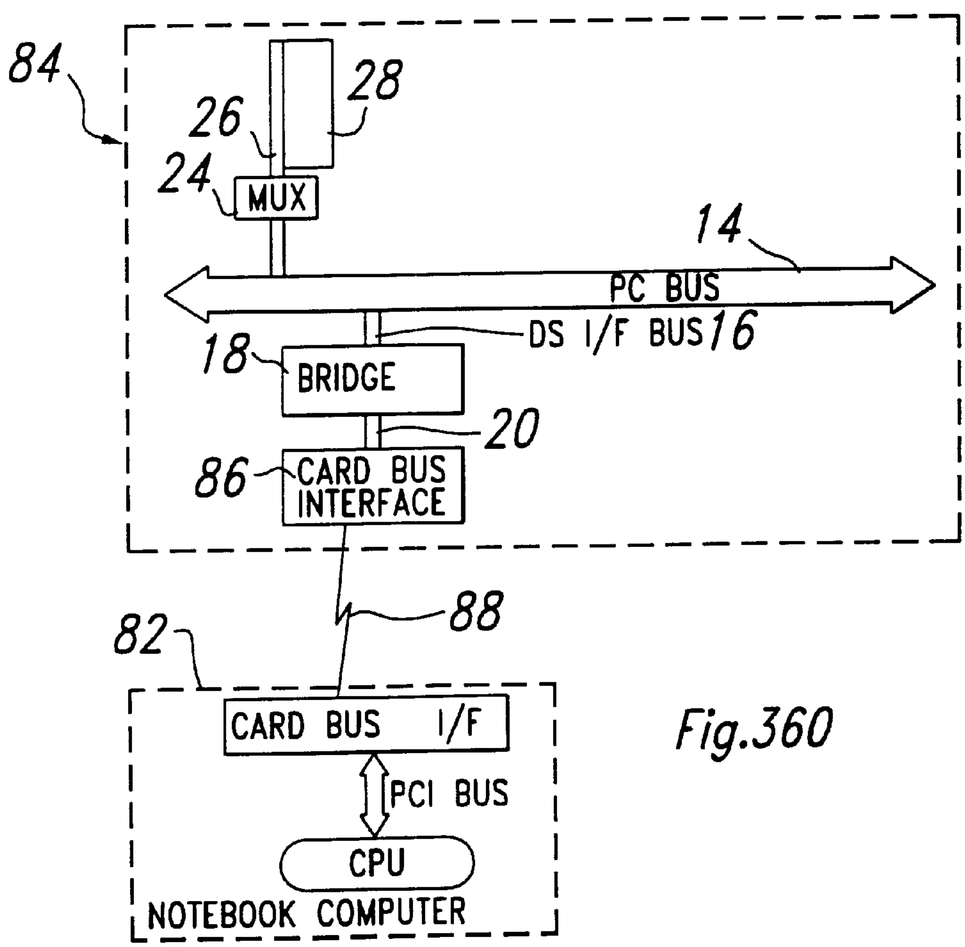
FIG. 360 illustrates a block diagram of a notebook computer card bus docked to a notebook computer according to an embodiment of the invention.
Figure 361:
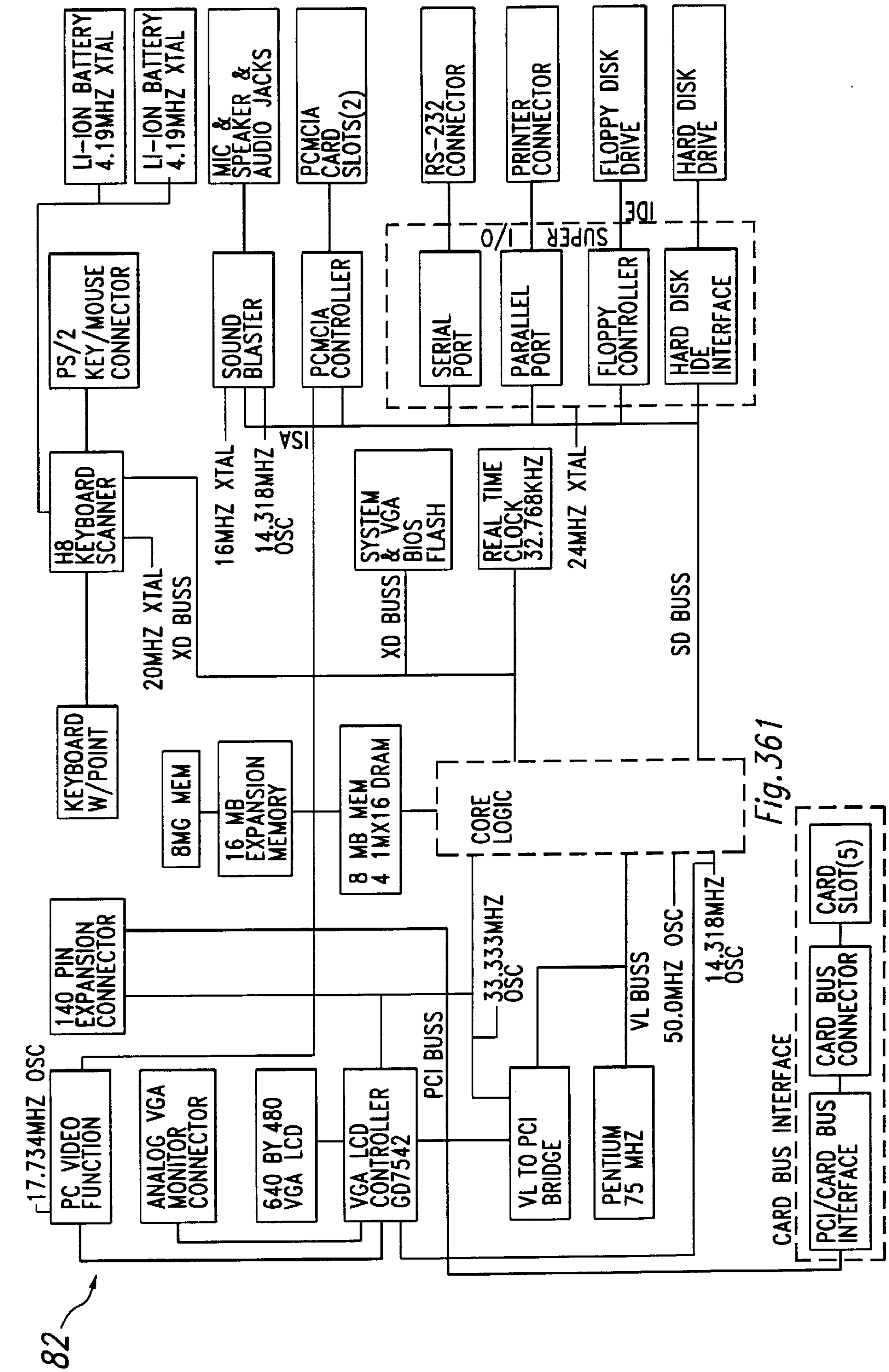
FIG. 361 illustrates a block diagram of a notebook computer incorporating a card bus interface.

In docking applications where a notebook computer is to be remote docked to docking station 84 via card bus, card bus interface 86, a corresponding card bus interface in the notebook computer and a phone line or digital network 88 coupling the two card bus interfaces, facilitate a connection between the notebook 82 and docking station 84 so that a communication link can be established and docking initiated, as illustrated in FIG. 360. An embodiment of a notebook computer 82 incorporating a card bus interface is illustrated in FIG. 361. Other than the addition of the PCI/Card bus interface, card bus controller and card slot(s), notebook 82 is substantially the same as notebook computer 10, previously discussed, and should be expected to operate and function in a substantially similar manner.

The system cards 28 illustrated in FIGS. 5–133, or a modification or alteration thereof, could also be used in docking station 84. The functionality of the system cards, the software to be loaded onto the docking system and the operation of the docking system is substantially the same as previously described in connection with docking station 12.

Figure 362:
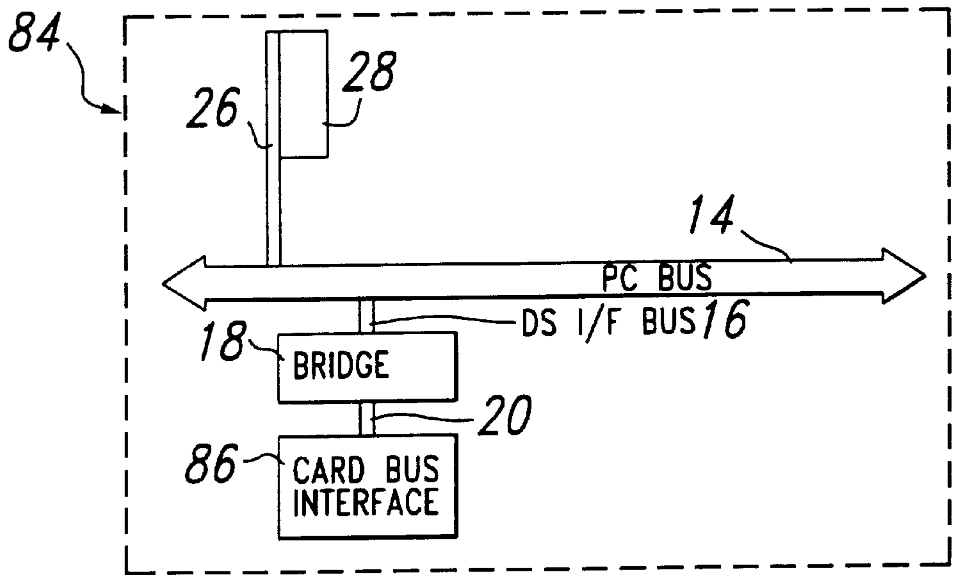
FIG. 362 illustrates an alternative embodiment of a docking station 84 in which a MUX is located on the system card 28, not located separately in the docking station.
Figure 363:
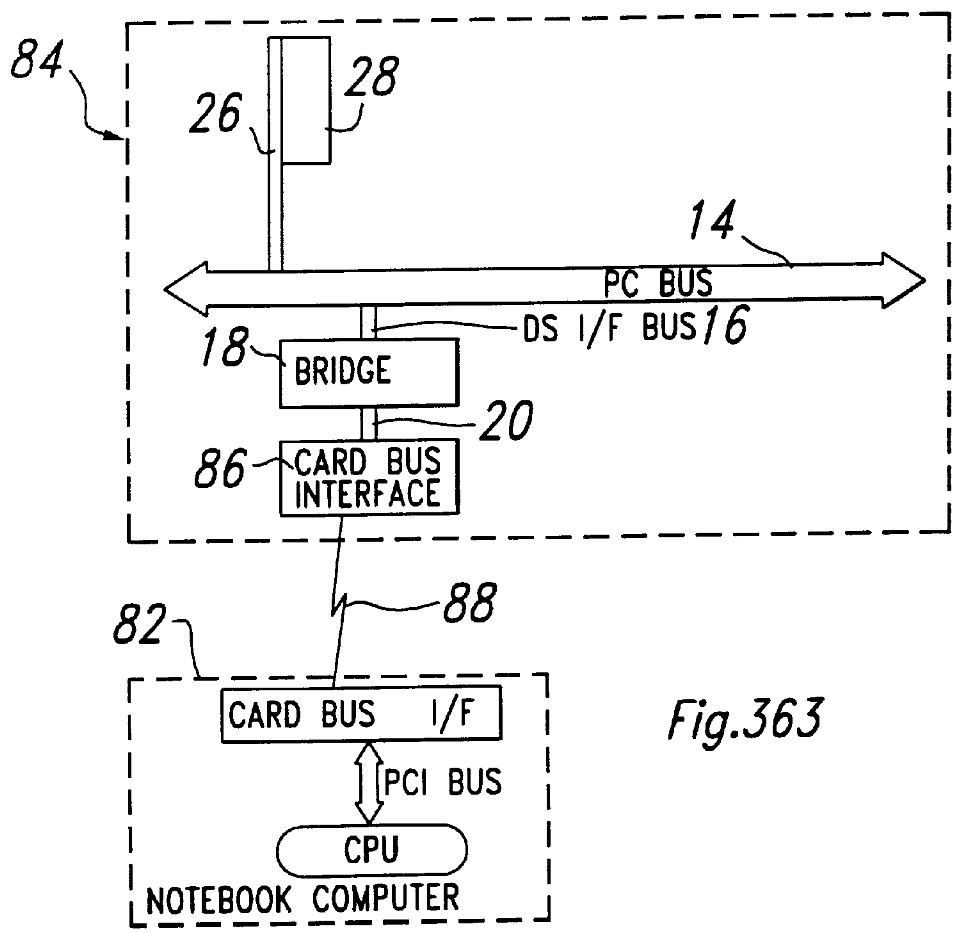
FIG. 363 illustrates a block diagram of the notebook computer card bus docked to the docking station of FIG. 362.

Docking station 84, illustrated in FIG. 362, is an alternative embodiment of docking station 84 illustrated in FIG. 359. In this embodiment of the invention, the MUX is located on the system card 28, not located separately in docking station 84. FIGS. 136–263 illustrate system cards 28 that may be used in docking station 84. System cards 28 illustrated in FIGS. 136–263 are the system cards illustrated in FIGS. 5–133, respectively, with the addition of a mux on each card. The docking station and docking system illustrated in FIGS. 362 and 363 operate in substantially the same fashion as the docking station and docking system illustrated in FIGS. 359 and 360.

In another embodiment of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking station 84 illustrated in FIGS. 362 and 363 (not having a mux separate from system card 28), could utilize the system cards 28 illustrated in FIGS. 5–133 (not having a mux). There were not be a mux in the docking station in this embodiment. Thus, while a mux is preferred, tri-state logic or a software stand PCI interface can also be used.

Figure 364:
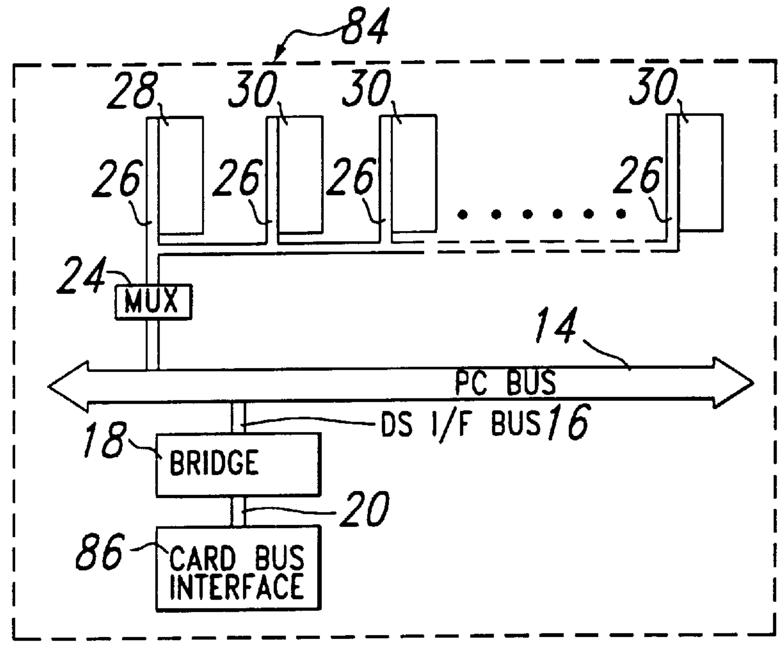
FIG. 364 illustrates an embodiment of the invention in which at least one additional card slot (three actually shown) is added to the docking station of FIG. 359. Each additional card slot 26 is coupled to mux 24. Each additional card slot is coupleable to a card 30. Each card 30 contains at least one resource that is an addition to the resources available on system card 28.
Figure 365:
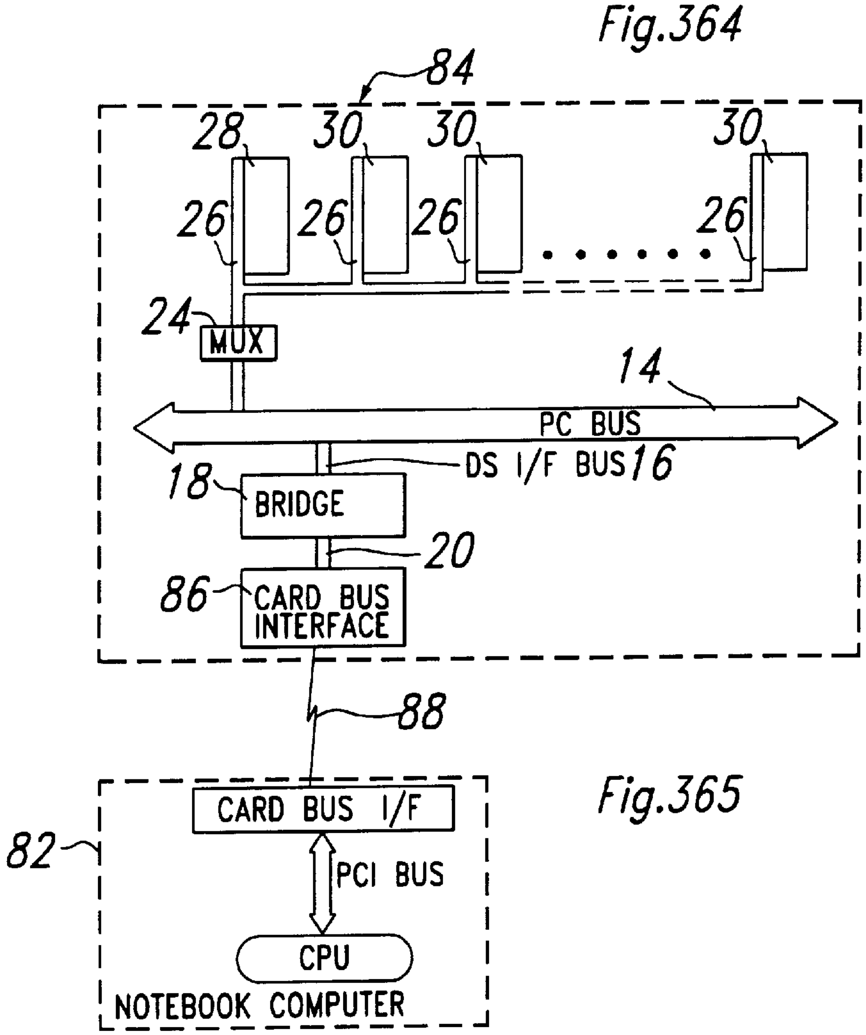
FIG. 365 illustrates a notebook computer card bus docked to the docking station of FIG. 364.

In yet another embodiment of the invention, illustrated in FIG. 364, at least one additional card slot (three actually shown) are added to the docking station of FIG. 359. Each card slot 26 is coupled to mux 24. Each additional card slot is coupleable to a card 30. Each card 30 is treated as a system resource. When notebook 82 docks to docking station 84, as illustrated in FIG. 365, it will pull the pin high on the mux which indicates a docked situation. System card 28 on the other side of mux 24 reads the I/O device and signals that it is being docked. The system pulls mux 24 and lets the cpu in notebook 10 have control over the released resources in docking station 84. As discussed previously, one way of accomplishing this is to write simple code to the cpu in system card 28 that says "if there is an input (interrupt) from the mux (which you could hook to external interrupt 1 or 2 off of the SMI interrupt on the CPU), the codes see this and says, "read the status—docked or undocked". If docked, the docking station turns over the resources, the CPU quits running on the PCI bus 14 (it doesn't issue any PCI cycles) and throws the mux so that the PCI bus is being driven by the external master and not the CPU in the system card 28. When the mux goes back, then the CPU in system card 28 starts driving the internal PCI bus 14. Thus, in a docked situation with a notebook, notebook may be given partial or full control over the resources of system card 28 and additional cards 30.

The system cards 28 illustrated in FIGS. 5–133, or a modification or alteration thereof, could also be used in docking station 84 illustrated in FIG. 364. The functionality of the system cards, the software to be loaded onto the docking system and the operation of the docking system is substantially the same as previously described in connection with docking station 84. FIGS. 266–316 illustrate block diagrams of various embodiments of cards 30 that can be used in combination with docking station 84 illustrated in FIG. 364. The card slot connector on each card 30 couples to a mating connector in card slot 26 in docking station 58.

Figure 366:
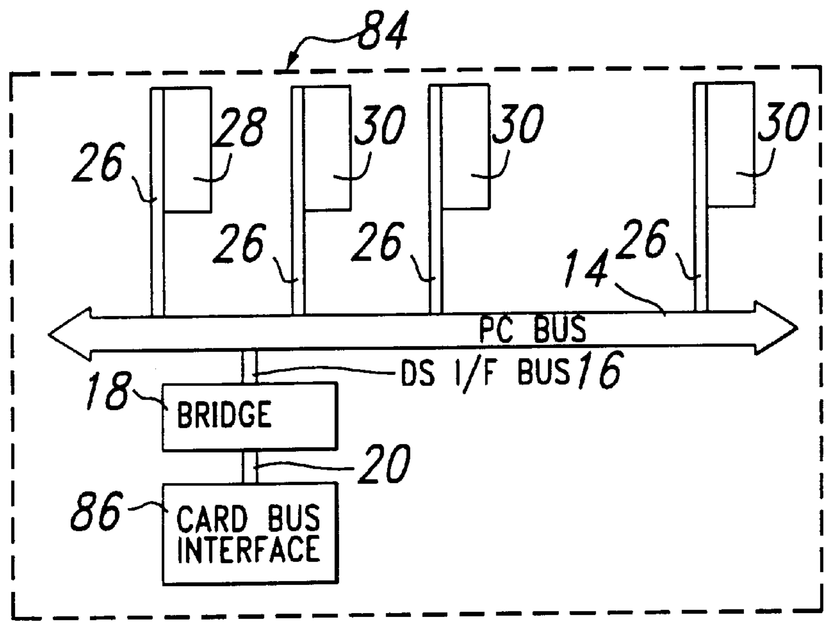
FIG. 366 illustrates an embodiment of the invention in which at least one additional card slot (three actually shown) is added to the docking station of FIG. 362. Each additional card slot is coupleable to a card 30. Each card 30 contains at least one resource that is an addition to the resources available on system card 28.
Figure 367:
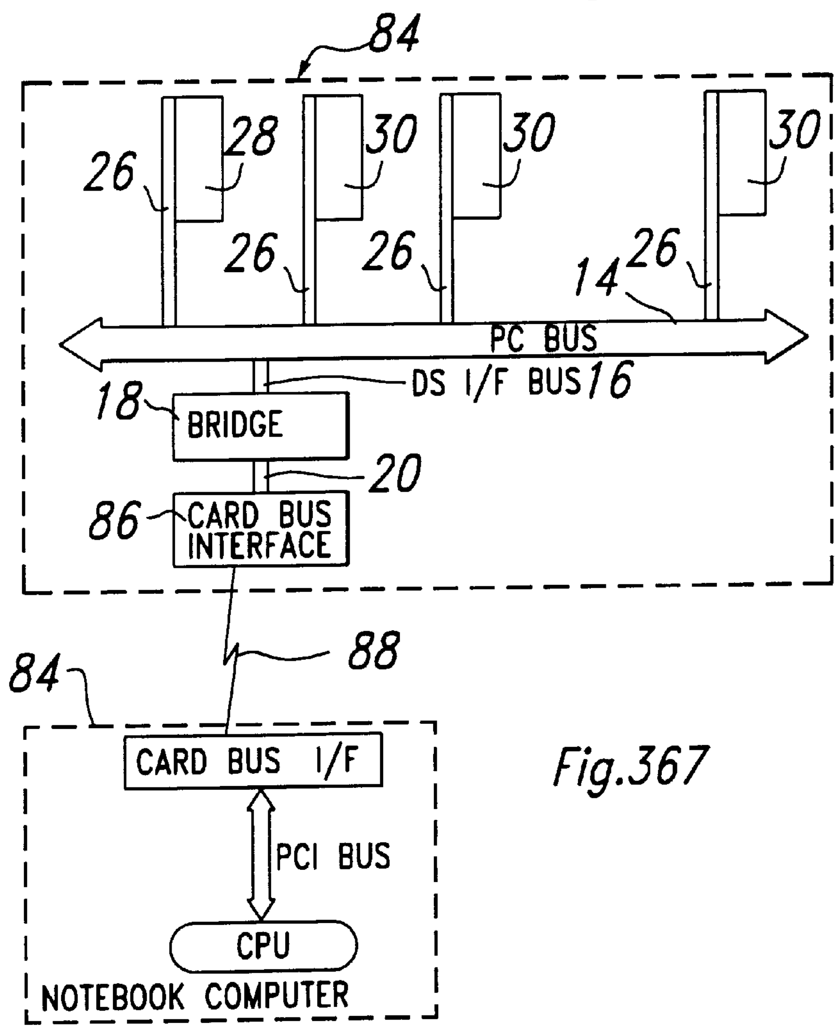
FIG. 367 illustrates a notebook computer card bus docked to the docking station of FIG. 366.
Figure 368:
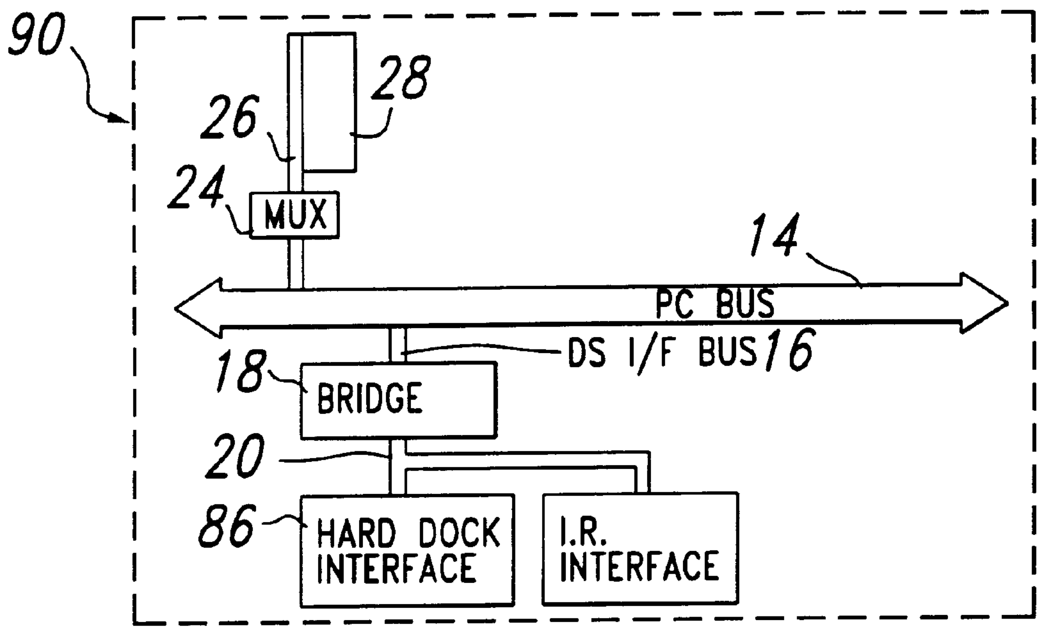
FIG. 368 illustrates a block diagram of a multi-configurable docking station 90 to which a notebook computer may dock via a hard dock interface or an infrared "IR", according to yet another embodiment of the invention.
Figure 369:
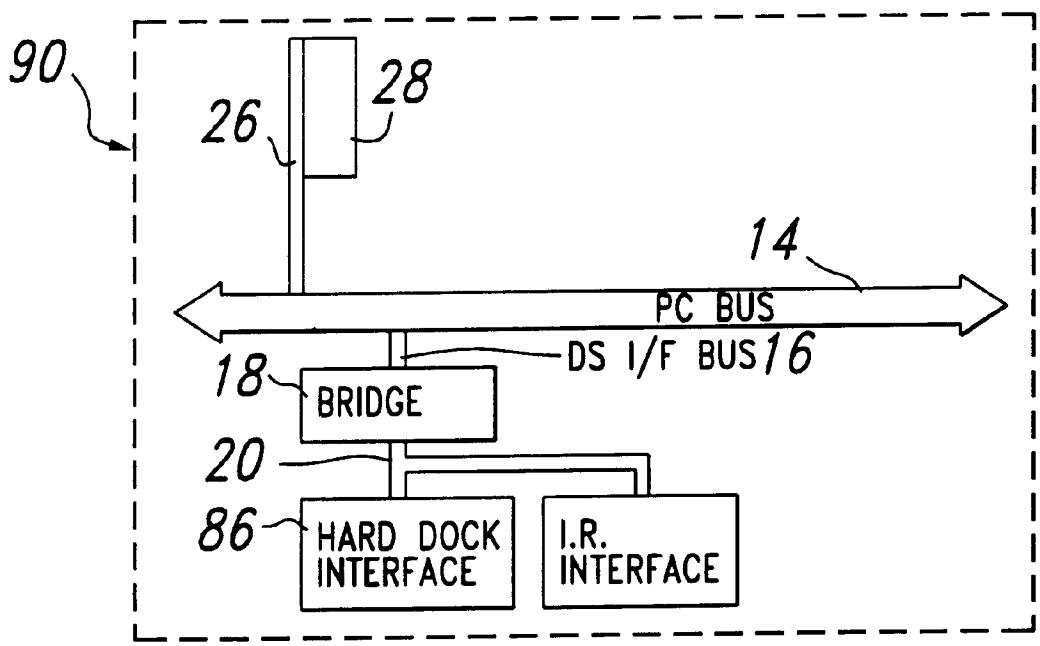
FIG. 369 illustrates an alternative embodiment of a docking station 90 in which a MUX is located on the system card 28, not located separately in the docking station.
Figure 370:
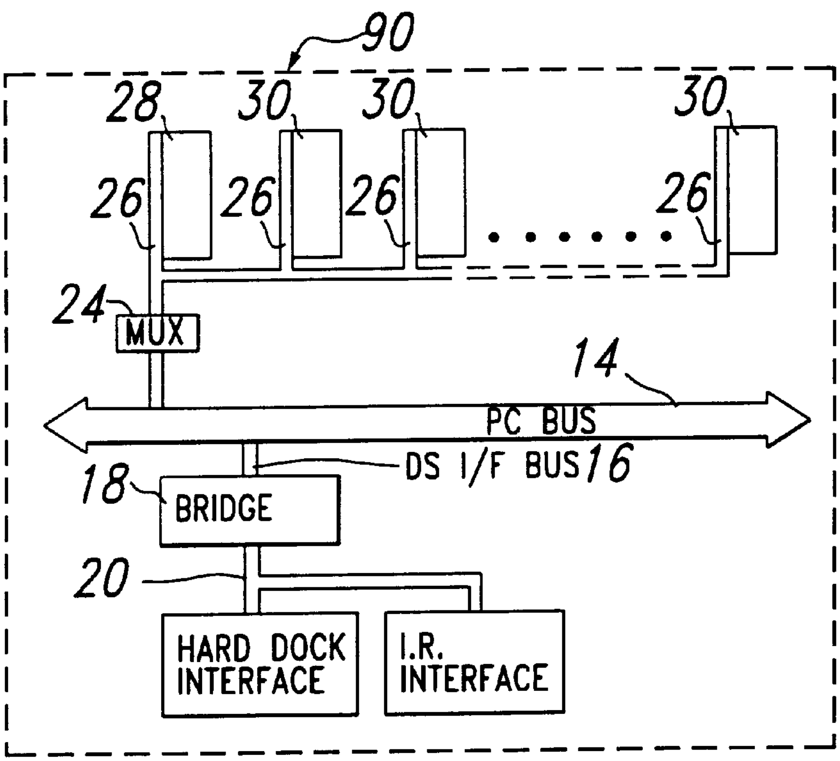
FIG. 370 illustrates an embodiment of the invention in which at least one additional card slot (three actually shown) is added to the docking station of FIG. 368. Each additional card slot 26 is coupled to mux 24. Each additional card slot is coupleable to a card 30. Each card 30 contains at least one resource that is an addition to the resources available on system card 28.
Figure 371:
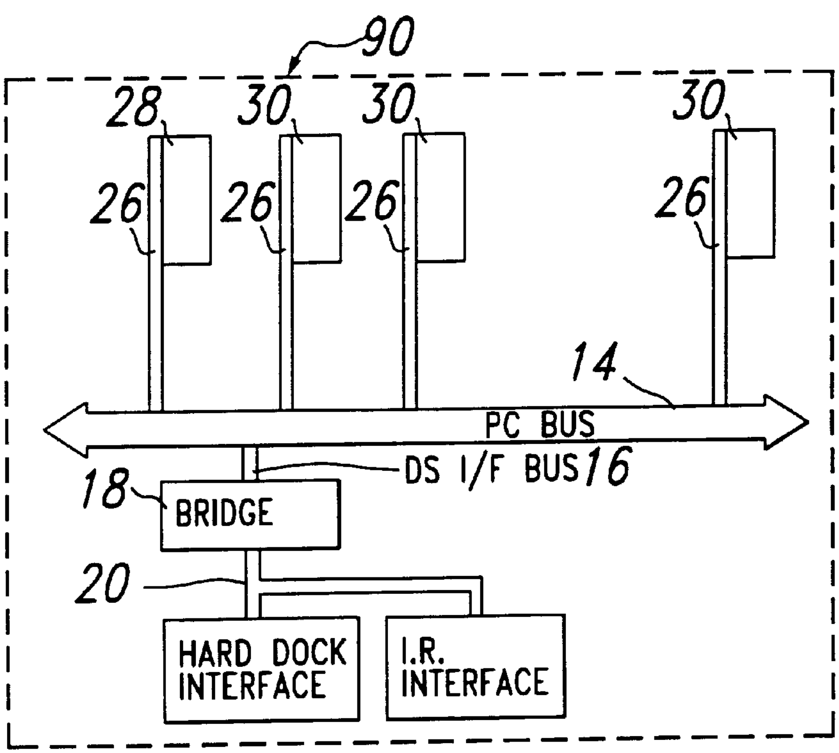
FIG. 371 illustrates an embodiment of the invention in which at least one additional card slot (three actually shown) is added to the docking station of FIG. 369. Each additional card slot is coupleable to a card 30. Each card 30 contains at least one resource that is an addition to the resources available on system card 28.

In yet another embodiment of the invention, illustrated in FIG. 366, at least one additional card slot (three actually shown) are added to the docking station of FIG. 362. Each card slot 26 is coupled to mux 24. Each additional card slot is coupleable to a card 30. Each card 30 is treated as a system resource. When notebook 82 docks to docking station 84, illustrated in FIG. 367, it will pull the pin high on the mux which indicates a docked situation. System card 28 on the other side of mux 24 reads the I/O device and signals that it is being docked. The system pulls mux 24 and lets the cpu in notebook 10 have control over the released resources in docking station 58. As discussed previously, one way of accomplishing this is to write simple code to the cpu in system card 28 that says "if there is an input (interrupt) from the mux (which you could hook to external interrupt 1 or 2 off of the SMI interrupt on the CPU), the codes see this and says, "read the status—docked or undocked". If docked, the docking station turns over the resources, the CPU quits running on the PCI bus 14 (it doesn't issue any PCI cycles) and throws the mux so that the PCI bus is being driven by the external master and not the CPU in the system card 28. When the mux goes back, then the CPU in system card 28 starts driving the internal PCI bus 14. Thus, in a docked situation with a notebook, notebook may be given partial or full control over the resources of system card 28 and additional cards 30.

As with previously described embodiments of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking station 84 illustrated in FIG. 366 (not having a mux separate from system card 28), could utilize the system cards 28 illustrated in FIGS. 5–133 (not having a mux). There were not be a mux in the docking station in this embodiment. Thus, while a mux is preferred, tri-state logic or a software stand PCI interface can also be used.

Assuming that the user has a notebook computer and docking station, with compatible cards and card bus interfaces in both the notebook and docking station, docking may be accomplished. When the notebook and docking station recognize each other, the card bus interface sends out a dock request to the bridge. What does the bridge do? The bridge goes out to the mux and says "we have a configuration cycle". At the same time, the card bus interface in the notebook (remote master) signals the notebook "we have a dock request". The notebook says "go into configuration cycle, send a communication out". Sitting in the notebook (remote master) is the same things, PIC bus, video card and all that. The notebook sends out to the PCI bus, the card bus intercepts the command, sends a signal that says "what is your configuration?" The bridge reports back the configuration and comes back to the notebook. Thus, the entire docking station has been plug-n-play configured from a remote device. If the notebook disconnects while the remote master, the procedure is reversed. The docking station disconnects the PCI configuration cycle for the notebook that is in the remote master (goes away). The docking station reconfigures, gets all of its devices, and the docking station goes back to being a regular desk top system.

MULTIPLE INTERFACE DOCKING CAPABILITY

While the docking station of the present invention has been described thus far having a single docking interface—hard dock, infrared (IR), radio frequency (RF), 1394 high performance serial bus, or card bus, the docking station of the present invention further contemplates two or more docking interfaces in a single docking station. Docking stations having two different type docking interfaces are illustrated in: FIGS. 368–371 (hard dock interface and infrared "IR" interface); FIGS. 372–375 (Hard dock interface and radio frequency "RF" interface); FIGS. 376–379 (hard dock interface and 1394 interface); and FIG. 380–383 (hard dock interface and card bus interface). Other combinations of the infrared, radio frequency, 1394 and card bus interfaces (not including the hard dock interface) are contemplated but are not presently shown.

Docking stations having three different type docking interfaces are illustrated in: FIGS. 384–387 (hard dock interface, infrared "IR" interface, radio frequency "RF" interface); 388–391 (hard dock interface, infrared "IR" interface, 1394 interface); 392–395 (hard dock interface, infrared "IR" interface, card bus interface); 396–399 (hard dock interface, radio frequency "RF" interface, 1394 interface); 400–403 (hard dock interface, radio frequency "RF" interface, card bus interface); 404–407 (hard dock interface, 1394 interface, card bus interface). Other combinations of the infrared, radio frequency, 1394 and card bus interfaces (not including the hard dock interface) are contemplated but are not presently shown.

Docking stations having four different type docking interfaces are illustrated in: FIGS. 424–427 (hard dock interface, infrared "IR" interface, radio frequency "RF" interface, 1394 interface, card bus interface). Other combinations of the infrared, radio frequency, 1394 and card bus interfaces (not including the hard dock interface) are contemplated, particularly with other interfaces that may interface with a PCI bus, but are not presently shown.

In embodiments of the invention having two different type docking interfaces, multi-configurable docking station 90 comprises a high speed PCI bus 14, a docking station interface bus 16 that couples a bridge 18 to PCI bus 14 and data/signal lines or bus 20 that couples interfaces (hard dock and infrared "IR" interfaces; hard dock and radio frequency "RF" interfaces; hard dock and 1394 interfaces; hard dock and card bus interfaces; and any combination of two IR, RF, 1394 and card bus interfaces) to bridge 18. Mux 24 couples PCI bus 14 to card slot 26. A connector on card slot 26 couples to a mating connector on system card 28. PCI bus 14 is preferably a high speed PCI bus (at least 32 bit wide), but may be any bus that provides performance characteristics similar to a high speed PCI bus. As with PCI bus 14, interface bus 16 is also preferably a high speed PCI bus (at least 32 bit wide), but may be any bus that provides performance characteristics similar to a high speed PCI bus. Data/signal lines or bus 20 couple two different type interfaces (hard dock and infrared "IR" interfaces—FIG. 368; hard dock and radio frequency "RF" interfaces—FIG. 372; hard dock and 1394 interfaces—FIG. 376; hard dock and card bus 380 or any combination of two IR, RF, 1394 and card bus interfaces) to bridge 18. As previously discussed in connection with docking stations 12 and 32, mux 24 is a switch with data lines. Mux devices are well known in the art, are commercially available, and have been described in more detail as needed. Card slot 26 is preferably a dedicated card slot for coupling with system card 28, but could just as easily be a circuit board, part of a circuit board, back plane or apparatus capable of coupling with a circuit card (such as system card 28), circuit board, device, apparatus or combination thereof.

A docking notebook computer will have to have at least a corresponding one of the two interfaces to facilitate a connection between the notebook and docking station 90 so that a communication link can be established and docking initiated. Other than the addition of the respective at least one corresponding interface, a docking notebook is substantially the same as notebook computer 10, previously discussed, and should be expected to operate and function in a substantially similar manner.

The system cards 28 illustrated in FIGS. 5–133, or a modification or alteration thereof, could also be used in docking station 90. The functionality of the system cards, the software to be loaded onto the docking system and the operation of the docking system is substantially the same as previously described in connection with docking station 12.

Docking stations 90, illustrated in FIGS. 369, 373, 377, 381 are an alternative embodiment of docking station 90 illustrated in FIGS. 368, 372, 376 and 380, respectively. In these embodiments of the invention, the MUX is located on the system card 28, not located separately in docking station 90. FIGS. 136–263 illustrate system cards 28 that may be used in docking station 90. System cards 28 illustrated in FIGS. 136–263 are the system cards illustrated in FIGS. 5–133, respectively, with the addition of a mux on each card. The docking stations illustrated in FIGS. 369, 373, 377 and 381 operates in substantially the same fashion as the docking stations 368, 372, 376 and 380, respectively.

In other embodiments of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking stations 90 illustrated in FIGS. 369, 373, 377 and 381, (not having a mux separate from system card 28), could utilize the system cards 28 illustrated in FIGS. 5–133 (not having a mux). There would not be a mux in the docking station in this embodiment. Thus, while a mux is preferred, tri-state logic or a software stand PCI interface can also be used.

In yet other embodiments of the invention, illustrated in FIGS. 370, 374, 378 and 382, at least one additional card slot (three actually shown) are added to the docking stations of FIGS. 368, 372, 376 and 380, respectively. Each card slot 26 is coupled to mux 24. Each additional card slot is coupleable to a card 30. Each card 30 is treated as a system resource. When a notebook docks to docking station 90 it will pull the pin high on the mux which indicates a docked situation. System card 28 on the other side of mux 24 reads the I/O device and signals that it is being docked. The system pulls mux 24 and lets the cpu in notebook have control over the released resources in docking station 90. As discussed previously, one way of accomplishing this is to write simple code to the cpu in system card 28 that says "if there is an input (interrupt) from the mux (which you could hook to external interrupt 1 or 2 off of the SMI interrupt on the CPU), the codes see this and says, "read the status —docked or undocked". If docked, the docking station turns over the resources, the CPU quits running on the PCI bus 14 (it doesn't issue any PCI cycles) and throws the mux so that the PCI bus is being driven by the external master and not the CPU in the system card 28. When the mux goes back, then the CPU in system card 28 starts driving the internal PCI bus 14. Thus, in a docked situation with a notebook, notebook may be given partial or full control over the resources of system card 28 and additional cards 30.

The system cards 28 illustrated in FIGS. 5–133, or a modification or alteration thereof, could also be used in docking station 90 illustrated in FIGS. 368, 372, 376 and 380. The functionality of the system cards, the software to be loaded onto the docking system and the operation of the docking system is substantially the same as previously described in connection with docking station 90. FIGS. 266–316 illustrate block diagrams of various embodiments of cards 30 that can be used in combination with docking stations 90 illustrated in FIG. 368, 372, 376 and 380. The card slot connector on each card 30 couples to a mating connector in card slot 26 in docking station 90.

In embodiments of the invention having three different type docking interfaces, multi-configurable docking station 92 comprises a high speed PCI bus 14, a docking station interface bus 16 that couples a bridge 18 to PCI bus 14 and data/signal lines or bus 20 that couples (hard dock, infrared "IR", and radio frequency "RF" interfaces; hard dock, infrared "IR", and 1394 interfaces; hard dock, infrared "IR", and card bus interfaces; hard dock, radio frequency "RF", and 1394 interfaces; hard dock, radio frequency "RF" and card bus interfaces; and hard dock, 1394, and card bus interfaces) to bridge 18. Mux 24 couples PCI bus 14 to card slot 26. A connector on card slot 26 couples to a mating connector on system card 28. PCI bus 14 is preferably a high speed PCI bus (at least 32 bit wide), but may be any bus that provides performance characteristics similar to a high speed PCI bus. As with PCI bus 14, interface bus 16 is also preferably a high speed PCI bus (at least 32 bit wide), but may be any bus that provides performance characteristics similar to a high speed PCI bus. Data/signal lines or bus 20 couple three different type interfaces (hard dock, infrared "IR", and radio frequency "RF" interfaces—FIG. 384; hard dock, infrared "IR", and 1394 interfaces; hard dock, infrared "IR", and card bus interfaces—FIG. 388; hard dock, radio frequency "RF", and 1394 interfaces—FIG. 392; hard dock, radio frequency "RF" and card bus interfaces—FIG. 396;

and hard dock, 1394, and card bus interfaces—FIG. 400; and any combination of three of infrared "IR", radio frequency "RF", 1394, and card bus interfaces) to bridge 18. As previously discussed in connection with docking stations 12 and 32, mux 24 is a switch with data lines. Mux devices are well known in the art, are commercially available, and have been described in more detail as needed. Card slot 26 is preferably a dedicated card slot for coupling with system card 28, but could just as easily be a circuit board, part of a circuit board, back plane or apparatus capable of coupling with a circuit card (such as system card 28), circuit board, device, apparatus or combination thereof.

A docking notebook computer will have to have at least a corresponding one of the three interfaces to facilitate a connection between the notebook and docking station 92 so that a communication link can be established and docking initiated. Other than the addition of the respective at least one corresponding interface, a docking notebook is substantially the same as notebook computer 10, previously discussed, and should be expected to operate and function in a substantially similar manner.

The system cards 28 illustrated in FIGS. 5–133, or a modification or alteration thereof, could also be used in docking station 92. The functionality of the system cards, the software to be loaded onto the docking system and the operation of the docking system is substantially the same as previously described in connection with docking station 12.

Docking stations 92, illustrated in FIGS. 385, 389, 393, and 397 are an alternative embodiment of docking stations 92 illustrated in FIGS. 384, 388, 392, and 396, respectively. In these embodiments of the invention, the MUX is located on the system card 28, not located separately in docking station 92. FIGS. 136–263 illustrate system cards 28 that may be used in docking station 92. System cards 28 illustrated in FIGS. 136–263 are the system cards illustrated in FIGS. 5–133, respectively, with the addition of a mux on each card. The docking stations illustrated in FIGS. 385, 389, 393 and 397 operate in substantially the same fashion as the docking stations 384, 388, 392, and 396, respectively.

In other embodiments of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking stations 92 illustrated in FIGS. 385, 389, 393, and 397, (not having a mux separate from system card 28), could utilize the system cards 28 illustrated in FIGS. 5—133 (not having a mux). There would not be a mux in the docking station in this embodiment. Thus, while a mux is preferred, tri-state logic or a software stand PCI interface can also be used.

In yet other embodiments of the invention, illustrated in FIGS. 386, 390, 394 and 398, at least one additional card slot (three actually shown) are added to the docking stations of FIGS. 384, 388, 392 and 396, respectively. Each card slot 26 is coupled to mux 24. Each additional card slot is coupleable to a card 30. Each card 30 is treated as a system resource. When a notebook docks to docking station 92 it will pull the pin high on the mux which indicates a docked situation. System card 28 on the other side of mux 24 reads the I/O device and signals that it is being docked. The system pulls mux 24 and lets the cpu in notebook have control over the released resources in docking station 92. As discussed previously, one way of accomplishing this is to write simple code to the cpu in system card 28 that says "if there is an input (interrupt) from the mux (which you could hook to external interrupt 1 or 2 off of the SMI interrupt on the CPU), the codes see this and says, "read the status—docked or undocked". If docked, the docking station turns over the resources, the CPU quits running on the PCI bus 14 (it doesn't issue any PCI cycles) and throws the mux so that the PCI bus is being driven by the external master and not the CPU in the system card 28. When the mux goes back, then the CPU in system card 28 starts driving the internal PCI bus 14. Thus, in a docked situation with a notebook, notebook may be given partial or full control over the resources of system card 28 and additional cards 30.

The system cards 28 illustrated in FIGS. 5–133, or a modification or alteration thereof, could also be used in docking station 92 illustrated in FIGS. 386, 390, 394 and 398. The functionality of the system cards, the software to be loaded onto the docking system and the operation of the docking system is substantially the same as previously described in connection with docking station 92. FIGS. 266–316 illustrate block diagrams of various embodiments of cards 30 that can be used in combination with docking stations 92 illustrated in FIG. 386, 390, 394, and 398. The card slot connector on each card 30 couples to a mating connector in card slot 26 in docking station 90.

In still other embodiments of the invention, illustrated in FIGS. 387, 391, 395, and 399, at least one additional card slot (three actually shown) are added to the docking station of FIG. 385. Each card slot 26 is coupled to mux 24. Each additional card slot is coupleable to a card 30. Each card 30 is treated as a system resource. When a notebook having at least one corresponding interface docks to docking station 92, it will pull the pin high on the mux which indicates a docked situation. System card 28 on the other side of mux 24 reads the I/O device and signals that it is being docked. The system pulls mux 24 and lets the cpu in notebook have control over the released resources in docking station 92. As discussed previously, one way of accomplishing this is to write simple code to the cpu in system card 28 that says "if there is an input (interrupt) from the mux (which you could hook to external interrupt 1 or 2 off of the SMI interrupt on the CPU), the codes see this and says, "read the status—docked or undocked". If docked, the docking station turns over the resources, the CPU quits running on the PCI bus 14 (it doesn't issue any PCI cycles) and throws the mux so that the PCI bus is being driven by the external master and not the CPU in the system card 28. When the mux goes back, then the CPU in system card 28 starts driving the internal PCI bus 14. Thus, in a docked situation with a notebook, notebook may be given partial or full control over the resources of system card 28 and additional cards 30.

As with previously described embodiments of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking station 92 (not having a mux separate from system card 28), could utilize the system cards 28 illustrated in FIGS. 5–133 (not having a mux). There were not be a mux in the docking station in this embodiment. Thus, while a mux is preferred, tri-state logic or a software stand PCI interface can also be used.

Assuming that the user has a notebook computer and docking station, with at least one corresponding interface in both the notebook and docking station, docking may be accomplished. When the notebook and docking station recognize each other, the corresponding interface sends out a dock request to the bridge. What does the bridge do? The bridge goes out to the mux and says "we have a configuration cycle". At the same time, the utilized interface in the notebook (remote master) signals the notebook "we have a dock request". The notebook says "go into configuration cycle, send a communication out". Sitting in the notebook (remote master) is the same things, PIC bus, video card and all that. The notebook sends out to the PCI bus, the interface intercepts the command, sends a signal that says "what is your configuration?" The bridge reports back the configuration and comes back to the notebook. Thus, the entire docking station has been plug-n-play configured from a docked device. If the notebook disconnects while the remote master, the procedure is reversed. The docking station disconnects the PCI configuration cycle for the notebook that is in the remote master (goes away). The docking station reconfigures, gets all of its devices, and the docking station goes back to being a regular desk top system.

In embodiments of the invention having four different type docking interfaces, multi-configurable docking station 94 comprises a high speed PCI bus 14, a docking station interface bus 16 that couples a bridge 18 to PCI bus 14 and data/signal lines or bus 20 that couples (hard dock, infrared "IR", radio frequency "RF", and 1394 interfaces; hard dock, infrared "IR", radio frequency "RF", and card bus interfaces; hard dock, infrared "IR", 1394, and card bus interfaces; hard dock, radio frequency "RF", 1394 interfaces and card bus interfaces) to bridge 18. Mux 24 couples PCI bus 14 to card slot 26. A connector on card slot 26 couples to a mating connector on system card 28. PCI bus 14 is preferably a high speed PCI bus (at least 32 bit wide), but may be any bus that provides performance characteristics similar to a high speed PCI bus. As with PCI bus 14, interface bus 16 is also preferably a high speed PCI bus (at least 32 bit wide), but may be any bus that provides performance characteristics similar to a high speed PCI bus. Data/signal lines or bus 20 couple four different type interfaces (hard dock, infrared "IR", radio frequency "RF", and 1394 interfaces—FIG. 408; hard dock, infrared "IR", radio frequency "RF", and card bus interfaces; hard dock, infrared "IR", 1394, and card bus interfaces—FIG. 412; hard dock, radio frequency "RF", 1394 interfaces and card bus interfaces—FIG. 416; and any other combination infrared "IR", radio frequency "RF", 1394, and card bus interfaces) to bridge 18. As previously discussed in connection with docking stations 12 and 32, mux 24 is a switch with data lines. Mux devices are well known in the art, are commercially available, and have been described in more detail as needed. Card slot 26 is preferably a dedicated card slot for coupling with system card 28, but could just as easily be a circuit board, part of a circuit board, back plane or apparatus capable of coupling with a circuit card (such as system card 28), circuit board, device, apparatus or combination thereof.

A docking notebook computer will have to have at least a corresponding one of the three interfaces to facilitate a connection between the notebook and docking station 94 so that a communication link can be established and docking initiated. Other than the addition of the respective at least one corresponding interface, a docking notebook is substantially the same as notebook computer 10, previously discussed, and should be expected to operate and function in a substantially similar manner.

The system cards 28 illustrated in FIGS. 5–133, or a modification or alteration thereof, could also be used in docking station 94. The functionality of the system cards, the software to be loaded onto the docking system and the operation of the docking system is substantially the same as previously described in connection with docking station 12.

Docking stations 94, illustrated in FIGS. 409, 413, 417, and 421 are an alternative embodiment of docking stations 94 illustrated in FIGS. 408, 412, 416, and 420, respectively. In these embodiments of the invention, the MUX is located on the system card 28, not located separately in docking station 92. FIGS. 136–263 illustrate system cards 28 that may be used in docking station 94. System cards 28 illustrated in FIGS. 136–263 are the system cards illustrated in FIGS. 5–133, respectively, with the addition of a mux on each card. The docking stations illustrated in FIGS. 409, 413, 417 and 421 operate in substantially the same fashion as the docking stations 408, 412, 416, and 420, respectively.

In other embodiments of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking stations 94 illustrated in FIGS. 409, 413, 417, and 421, (not having a mux separate from system card 28), could utilize the system cards 28 illustrated in FIGS. 5–133 (not having a mux). There would not be a mux in the docking station in this embodiment. Thus, while a mux is preferred, tri-state logic or a software stand PCI interface can also be used.

In yet other embodiments of the invention, illustrated in FIGS. 410, 414, 418 and 422, at least one additional card slot (three actually shown) are added to the docking stations of FIGS. 408, 412, 416 and 420, respectively. Each card slot 26 is coupled to mux 24. Each additional card slot is coupleable to a card 30. Each card 30 is treated as a system resource. When a notebook docks to docking station 94 it will pull the pin high on the mux which indicates a docked situation. System card 28 on the other side of mux 24 reads the I/0 device and signals that it is being docked. The system pulls mux 24 and lets the cpu in notebook have control over the released resources in docking station 94. As discussed previously, one way of accomplishing this is to write simple code to the cpu in system card 28 that says "if there is an input (interrupt) from the mux (which you could hook to external interrupt 1 or 2 off of the SMI interrupt on the CPU), the codes see this and says, "read the status—docked or undocked". If docked, the docking station turns over the resources, the CPU quits running on the PCI bus 14 (it doesn't issue any PCI cycles) and throws the mux so that the PCI bus is being driven by the external master and not the CPU in the system card 28. When the mux goes back, then the CPU in system card 28 starts driving the internal PCI bus 14. Thus, in a docked situation with a notebook, notebook may be given partial or full control over the resources of system card 28 and additional cards 30.

The system cards 28 illustrated in FIGS. 5–133, or a modification or alteration thereof, could also be used in docking station 94 illustrated in FIGS. 410, 414, 418 and 422. The functionality of the system cards, the software to be loaded onto the docking system and the operation of the docking system is substantially the same as previously described in connection with docking station 94. FIGS. 266–316 illustrate block diagrams of various embodiments of cards 30 that can be used in combination with docking stations 94 illustrated in FIG. 410, 414, 418, and 422. The card slot connector on each card 30 couples to a mating connector in card slot 26 in docking station 94.

In still other embodiments of the invention, illustrated in FIGS. 411, 415, 419, and 423, at least one additional card slot (three actually shown) are added to the docking stations of FIGS. 409, 413, 417, and 421, respectively. Each card slot 26 is coupled to mux 24. Each additional card slot is coupleable to a card 30. Each card 30 is treated as a system resource. When a notebook having at least one corresponding interface docks to docking station 94, it will pull the pin high on the mux which indicates a docked situation. System card 28 on the other side of mux 24 reads the I/O device and signals that it is being docked. The system pulls mux 24 and lets the cpu in notebook have control over the released resources in docking station 94. As discussed previously, one way of accomplishing this is to write simple code to the cpu in system card 28 that says "if there is an input (interrupt) from the mux (which you could hook to external interrupt 1 or 2 off of the SMI interrupt on the CPU), the codes see this and says, "read the status—docked or undocked". If docked, the docking station turns over the resources, the CPU quits running on the PCI bus 14 (it doesn't issue any PCI cycles) and throws the mux so that the PCI bus is being driven by the external master and not the CPU in the system card 28. When the mux goes back, then the CPU in system card 28 starts driving the internal PCI bus 14. Thus, in a docked situation with a notebook, notebook may be given partial or full control over the resources of system card 28 and additional cards 30.

As with previously described embodiments of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking station 94 (not having a mux separate from system card 28), could utilize the system cards 28 illustrated in FIGS. 5–133 (not having a mux). There were not be a mux in the docking station in this embodiment. Thus, while a mux is preferred, tri-state logic or a software stand PCI interface can also be used.

Assuming that the user has a notebook computer and docking station, with at least one corresponding interface in both the notebook and docking station, docking may be accomplished. When the notebook and docking station recognize each other, the corresponding interface sends out a dock request to the bridge. What does the bridge do? The bridge goes out to the mux and says "we have a configuration cycle". At the same time, the utilized interface in the notebook (remote master) signals the notebook "we have a dock request". The notebook says "go into configuration cycle, send a communication out". Sitting in the notebook (remote master) is the same things, PIC bus, video card and all that. The notebook sends out to the PCI bus, the interface intercepts the command, sends a signal that says "what is your configuration?" The bridge reports back the configuration and comes back to the notebook. Thus, the entire docking station has been plug-n-play configured from a docked device. If the notebook disconnects while the remote master, the procedure is reversed. The docking station disconnects the PCI configuration cycle for the notebook that is in the remote master (goes away). The docking station reconfigures, gets all of its devices, and the docking station goes back to being a regular desk top system.

In embodiments of the invention having five different type docking interfaces, and the capacity for adding more, multi-configurable docking station 96 comprises a high speed PCI bus 14, a docking station interface bus 16 that couples a bridge 18 to PCI bus 14 and data/signal lines or bus 20 that couples (hard dock, infrared "IR", radio frequency "RF", 1394, and card bus interfaces) to bridge 18. Mux 24 couples PCI bus 14 to card slot 26. A connector on card slot 26 couples to a mating connector on system card 28. PCI bus 14 is preferably a high speed PCI bus (at least 32 bit wide), but may be any bus that provides performance characteristics similar to a high speed PCI bus. As with PCI bus 14, interface bus 16 is also preferably a high speed PCI bus (at least 32 bit wide), but may be any bus that provides performance characteristics similar to a high speed PCI bus. Data/signal lines or bus 20 couple five different type interfaces (hard dock, infrared "IR", radio frequency "RF", 1394, card bus interfaces and N interface—FIGS. 424–427. As previously discussed in connection with docking stations 12 and 32, mux 24 is a switch with data lines. Mux devices are well known in the art, are commercially available, and have been described in more detail as needed. Card slot 26 is preferably a dedicated card slot for coupling with system card 28, but could just as easily be a circuit board, part of a circuit board, back plane or apparatus capable of coupling with a circuit card (such as system card 28), circuit board, device, apparatus or combination thereof.

A docking notebook computer will have to have at least a corresponding one of the five interfaces to facilitate a connection between the notebook and docking station 96 so that a communication link can be established and docking initiated. Other than the addition of the respective at least one corresponding interface, a docking notebook is substantially the same as notebook computer 10, previously discussed, and should be expected to operate and function in a substantially similar manner.

The system cards 28 illustrated in FIGS. 5–133, or a modification or alteration thereof, could also be used in docking station 96. The functionality of the system cards, the software to be loaded onto the docking system and the operation of the docking system is substantially the same as previously described in connection with docking station 12.

Docking stations 96, illustrated in FIG. 425 is an alternative embodiment of docking station 96 illustrated in FIG. 424. In these embodiments of the invention, the MUX is located on the system card 28, not located separately in docking station 96. FIGS. 136–263 illustrate system cards 28 that may be used in docking station 94. System cards 28 illustrated in FIGS. 136–263 are the system cards illustrated in FIGS. 5–133, respectively, with the addition of a mux on each card. The docking station illustrated in FIGS. 425 operates in substantially the same fashion as docking station 424.

In other embodiments of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking stations 96 illustrated in FIG. 425, (not having a mux separate from system card 28), could utilize the system cards 28 illustrated in FIGS. 5–133 (not having a mux). There would not be a mux in the docking station in this embodiment. Thus, while a mux is preferred, tri-state logic or a software stand PCI interface can also be used.

In yet other embodiments of the invention, illustrated in FIG. 426, at least one additional card slot (three actually shown) are added to the docking station of FIG. 424. Each card slot 26 is coupled to mux 24. Each additional card slot is coupleable to a card 30. Each card 30 is treated as a system resource. When a notebook docks to docking station 96 it will pull the pin high on the mux which indicates a docked situation. System card 28 on the other side of mux 24 reads the I/O device and signals that it is being docked. The system pulls mux 24 and lets the cpu in notebook have control over the released resources in docking station 96. As discussed previously, one way of accomplishing this is to write simple code to the cpu in system card 28 that says "if there is an input (interrupt) from the mux (which you could hook to external interrupt 1 or 2 off of the SMI interrupt on the CPU), the codes see this and says, "read the status—docked or undocked". If docked, the docking station turns over the resources, the CPU quits running on the PCI bus 14 (it doesn't issue any PCI cycles) and throws the mux so that the PCI bus is being driven by the external master and not the CPU in the system card 28. When the mux goes back, then the CPU in system card 28 starts driving the internal PCI bus 14. Thus, in a docked situation with a notebook, notebook may be given partial or full control over the resources of system card 28 and additional cards 30.

In still other embodiments of the invention, illustrated in FIG. 427, at least one additional card slot (three actually shown) are added to the docking station of FIG. 425. Each card slot 26 is coupled to mux 24. Each additional card slot is coupleable to a card 30. Each card 30 is treated as a system resource. When a notebook having at least one corresponding interface docks to docking station 96, it will pull the pin high on the mux which indicates a docked situation. System card 28 on the other side of mux 24 reads the I/O device and signals that it is being docked. The system pulls mux 24 and lets the cpu in notebook have control over the released resources in docking station 94. As discussed previously, one way of accomplishing this is to write simple code to the cpu in system card 28 that says "if there is an input (interrupt) from the mux (which you could hook to external interrupt I or 2 off of the SMI interrupt on the CPU), the codes see this and says, "read the status—docked or undocked". If docked, the docking station turns over the resources, the CPU quits running on the PCI bus 14 (it doesn't issue any PCI cycles) and throws the mux so that the PCI bus is being driven by the external master and not the CPU in the system card 28. When the mux goes back, then the CPU in system card 28 starts driving the internal PCI bus 14. Thus, in a docked situation with a notebook, notebook may be given partial or full control over the resources of system card 28 and additional cards 30.

The system cards 28 illustrated in FIGS. 5–133, or a modification or alteration thereof, could also be used in docking station 96 illustrated in FIGS. 424–427. The functionality of the system cards, the software to be loaded onto the docking system and the operation of the docking system is substantially the same as previously described in connection with docking station 96. FIGS. 266–316 illustrate block diagrams of various embodiments of cards 30 that can be used in combination with docking stations 96 illustrated in FIGS. 426 and 427. The card slot connector on each card 30 couples to a mating connector in card slot 26 in docking station 96.

As with previously described embodiments of the invention, hardware (tri-state), logic or PCI bus master cycles programmed in the notebook, docking station, or both, can be use in lieu of the mux. It is possible to drive the AT bus of the PCI bus with a cpu with a bus master cycle. The mux itself is a function. As an example, the software on the notebook could give a bus master cycle in and the docking station could give a bus master cycle out—it all depends on which one is driving the PCI bus. In this embodiment, the docking station 96 (not having a mux separate from system card 28), could utilize the system cards 28 illustrated in FIGS. 5—133 (not having a mux). There were not be a mux in the docking station in this embodiment. Thus, while a mux is preferred, tri-state logic or a software stand PCI interface can also be used.

Assuming that the user has a notebook computer and docking station, with at least one corresponding interface in both the notebook and docking station, docking may be accomplished. When the notebook and docking station recognize each other, the corresponding interface sends out a dock request to the bridge. What does the bridge do? The bridge goes out to the mux and says "we have a configuration cycle". At the same time, the utilized interface in the notebook (remote master) signals the notebook "we have a dock request". The notebook says "go into configuration cycle, send a communication out". Sitting in the notebook (remote master) is the same things, PIC bus, video card and all that. The notebook sends out to the PCI bus, the interface intercepts the command, sends a signal that says "what is your configuration?" The bridge reports back the configuration and comes back to the notebook. Thus, the entire docking station has been plug-n-play configured from a docked device. If the notebook disconnects while the remote master, the procedure is reversed. The docking station disconnects the PCI configuration cycle for the notebook that is in the remote master (goes away). The docking station reconfigures, gets all of its devices, and the docking station goes back to being a regular desk top system.

In all embodiments of the invention having multiple type interfaces, the bridge: 1) controls what devices are being allocated, and 2) makes sure that there is a continuation of the signals on the bus strong enough to support the other devices. The interface itself can be very dumb, take the default position of what the bridge will pass on, or the interface can be very intelligent and filter what the bridge gets and what the notebook gets on the other side. As an example, if a notebook is to dock via RF, the docking station should know that the notebook will not take the monitor and keyboard away from the docking station, if they exist, because, since the notebook is already being driven by a keyboard and display (thus, to do so would not make any sense). Thus, the bridge acts as a filter. The reverse is also possible. We could say, O.K., let the notebook be, when it docks, the PCI device to the intelligent docking station. This means that when a dock request to the intelligent docking station comes out and does a plug-n-play request to the notebook, the notebook reports "I've got the following processes, such as wireless com. disc drive, etc". Now, it is the docking station that utilizes notebook resources, rather than the converse. In this situation the notebook might say to the docking station "I don't have a keyboard and I don't have a monitor", which means that the user can still use the notebook keyboard but the hard drive and some other thing might end up under the control of the docking station. But in reality, the notebook will end looking like a big disk and make a disk request across the PCI device. The disk request being in the form of a new PCI notation or identifier and then suck what ever e-mail or files that are off the notebook into the docking station, manipulate the information and then decide whether or not to ship it back. Who the master is strictly system independent. But is obvious to you that if you are docking multiple notebooks, probably, the docking station needs to be the master rather than the converse. If I'm docking one notebook to a docking station (hard dock) it could go either way. If a wireless dock, probably the notebook is the master because the user is at the notebook. But this is strictly protocol and can be altered depending upon the implementation chosen.

In embodiments of the invention having multiple type interfaces, especially in cases of five or six interfaces), the bridge drives the interface bus, which could be a PCI bus with sideband signals (sideband signals might contain things such as "I want a monitor, or I don't want a monitor" or information that says, "I'm an RF or IR or card bus dock" it identifies the type of interface it is to the bridge. So, when the bridge gets the information and sends it back to the interface, it might know who to channel it to, or, you could identify the interfaces with I.D. numbers so that the bridge directs the information back out to the interface by an I.D. number. The actual implementation of the protocol of the software and how you implement the hardware is variable. Say one is an I.D. versus another that is a signal. Both accomplish the same thing, i.e., that it identifies the type of interface that it is and have the interface be intelligent about the devices that it can support, that it wants and that it filters the correct combination between two computing devices. The novelty of the invention is the intelligence, filtering and decision tree processes.

While implementations of preferred embodiments of the present invention have been shown and described, various modifications and alternate embodiments will occur to those skilled in the art. As an example, all of the implementations of the invention show a bridge. A bridge used because of extra load and/or drive capacity for the PCI bus. But a bridge may be omitted in system designed to solve all the loading issues, all the hardware conflicts e.g., addressing issues. A bridge is presently used because it is more cost effective because it is shareable by many different slots, devices and interfaces. Nevertheless, it is possible to design around the bridge. A bridge may be replaced by a PCI bus having infinite loads. A docking station, according to the invention, having a PCI bus with infinite loading would not need a bridge.

Similarly, as previously mentioned, a docking station does not have to have a mux on a minimum system. You could instead have tri-stated or intelligently tri-stated logic. You could drive the AT bus of the PCI bus with a cpu with a bus master cycle. The mux itself is a function. A function by hardware (tri-state) or a logic or it is replaced with PCI bus master cycles programmed in the notebook, docking station, or both. As an example, the software on the notebook could give a bus master cycle in and the docking station could give a bus master cycle out—all depends on who is driving the PCI bus. If you are doing a proximity type dock—most assuredly, the PCI bus master could come from the RF card that is plugged in to the main pc, because the main pc will still be controlling the PCI bus, so the card slots, like PC card RF, IF, on the diagram, could be generating PCI bus master cycles to take over the bus. Thus, the notebook computer be the master, or it could reverse and let the docking station be the master—thus the docking station could do the PCI master into the notebook. Thus, you can do sharing, bridging, muxing, master slave, in either direction. As a result, muxes are optional, with tri-stating or software standard PCI interfaces being optional.

While described embodiments of the invention have described a docking situation where one notebook computer docks with one docking station, the invention also contemplates situations having multiple notebook simultaneously docked to the docking station. Thus, there might be one notebook computer hard docked to the docking station while another is RF docked (could also be multiple notebooks RF docked via a multi-drop situation), one is IR docked, etc. The docking station can handle more than one notebook at a time due to the PCI bus. The display in the dock can also be programmed now to be a monitor for all the notebooks connected—states, share video and open windows to each notebook user. The opportunities are endless.

The various interfaces described can be part of dedicated interface cards for coupling with interface card slots on bus 20—similar to system cards 28 and corresponding card slots, but could just as easily be a circuit board, part of a circuit board, back plane or apparatus capable of coupling with a circuit card, circuit board, device, apparatus or combination thereof.

The present invention contemplates multiple cards feeding through one mux, since the PCI specification allows you to have multiple processor cards per se, but not multiple processors that think they are processing the core operating system. Multiprocessing cpu are not common right now, so, we are currently only talking one mux to keep the cpu from thinking he's operating the system resources. It is possible to have multi system cards each with a processor in it, but it does become complicated from a software point of view because the operating systems that pc are dealing with right now don't understand multi-processor systems. You would need drivers to control which cpu controls the bus at any one time.

Many of the embodiments of the invention will need software support in terms of device drivers depending upon the type and complexity of system selected—but this is to be expected The PNP bios can be modified as needed.

What is claimed:

1. A computer docking station, comprising:

a provision for user input;

a provision for output;

a microprocessor coupled to said user input and said output;

an interface coupled to said microprocessor, said interface facilitating docking between said docking station and a stand alone portable computer, and docking station resources coupled to said microprocessor, said resources being under the control of said microprocessor when said docking station is a stand alone device and said resources being capable of being placed under the control of a central processing unit in said portable computer when said portable computer is docked to said computer docking station.

2. The docking station of claim 1, wherein said user input is coupled to a keyboard.

3. The docking station of claim 1, wherein said output is coupled to a display device.

4. The docking station of claim 1, wherein said user input is coupled to a keyboard and said output is coupled to a display device.

5. The docking station of claim 1, further comprising memory for storing at least program instructions.

6. The docking station of claim 1, further comprising core logic coupled to said microprocessor.

7. The docking station of claim 1, wherein said interface is an electrical connector that is directly connectable to a corresponding electrical connector in said portable computer.

8. The docking station of claim 1, wherein said interface facilitates docking via radio frequency "RF" communications.

9. The docking station of claim 1, wherein said interface facilitates docking via a 1394 high performance serial bus.

10. The docking station of claim 1, wherein said interface facilitates docking via a card bus interface.

11. The docking station of claim 1, wherein said interface facilitates docking via one of group of two or more different types of docking interfaces.

12. The docking station of claim 1, wherein a PCI bus couples said microprocessor to said interface.

13. The docking station of claim 12 wherein said microprocessor is on a system card that is connected to said PCI bus.

14. The docking station of claim 12, wherein said docking station resources are available on cards that are coupleable to said PCI bus.

15. The docking station of claim 1 wherein a PCI bus couples said microprocessor to a bridge and said bridge is coupled to said interface.

16. The docking station of claim 1 wherein a mux couples said microprocessor to a PCI bus and a bridge couples said interface to said PCI bus.

17. The docking station of claim 16 wherein said mux and said microprocessor are on a system card that is connected to said PCI bus.

18. The docking station of claim 16, wherein said microprocessor is on a system card that is connected to said mux.

19. The computer docking station of claim 1, wherein said stand alone portable computer further comprises:

a provision for user input;

a provision for output;

a microprocessor coupled to said user input and said output;

an interface coupled to said microprocessor, said interface facilitating docking between said portable computer and said docking station, and portable computer resources coupled to said microprocessor, said resources being under the control of said microprocessor when said portable computer is a stand alone device and said resources being capable of being placed under the control of a central processing unit in said docking station when said portable computer is docked to said computer docking station.

20. The portable computer of claim 19, wherein said user input is coupled to a keyboard.

21. The portable computer of claim 19, wherein said output is coupled to a display device.

22. The portable computer of claim 19, wherein said user input is coupled to a keyboard and said output is coupled to a display device.

23. The portable computer of claim 19, further comprising memory for storing at least program instructions.

24. The portable computer of claim 19, further comprising core logic coupled to said microprocessor.

25. The portable computer of claim 19, wherein said interface is an electrical connector that is directly connectable to a corresponding electrical connector in said docking station.

26. The portable computer of claim 19, wherein said interface facilitates docking via radio frequency "RF" communication.

27. A computer docking, comprising:

a provision for user input;

a provision for output;

a microprocessor coupled to said user input and said output;

an interface coupled to said microprocessor, said interface facilitating docking between said docking station and a stand alone portable computer, and docking station resources coupled to said microprocessor, said resources being under the control of said microprocessor when said docking station is a stand alone device, said docking station further being capable of taking control of resources in said portable computer when said portable computer is docked to said computer docking station.

28. A computer docking station that is a stand alone computer having control over docking station resources prior to docking with a stand alone portable computer, is capable of placing docking station resources under the control of a docked portable computer, and returns to being a stand alone computer when the portable computer undocks from said docking station.

* * * * *